US008257620B2

(12) United States Patent
Cranor et al.

(10) Patent No.: US 8,257,620 B2
(45) Date of Patent: Sep. 4, 2012

(54) BLUE/VIOLET DIPHENYLANTHRACENE CHEMILUMINESCENT FLUORESCERS

(75) Inventors: Earl Cranor, Loongmeadow, MA (US); Linda Jacob, Woodbridge, CT (US)

(73) Assignee: Cyalume Technologies, Inc., West Springfield, MA (US)

( * ) Notice: Subject to any disclaimer, the term of this patent is extended or adjusted under 35 U.S.C. 154(b) by 127 days.

(21) Appl. No.: 12/822,657

(22) Filed: Jun. 24, 2010

(65) Prior Publication Data

US 2010/0327240 A1 Dec. 30, 2010

Related U.S. Application Data

(60) Provisional application No. 61/220,072, filed on Jun. 24, 2009.

(51) Int. Cl.
*C07C 25/22* (2006.01)
*C09K 3/00* (2006.01)

(52) U.S. Cl. ........... 252/700; 570/129; 570/183; 585/26

(58) Field of Classification Search .................. 570/127, 570/129, 183; 585/26; 252/700
See application file for complete search history.

(56) References Cited

U.S. PATENT DOCUMENTS 3,391,068 A 7/1968 Rauhut (Continued)

FOREIGN PATENT DOCUMENTS

EP 1312605 5/2003

(Continued)

OTHER PUBLICATIONS

Hirano et al. Tetrahedron Letters 39 (1998) 5541-5544.*

(Continued)

*Primary Examiner* — James J Seidleck
*Assistant Examiner* — Vu A Nguyen
(74) *Attorney, Agent, or Firm* — McHale & Slavin, P.A.

(57) ABSTRACT

Compounds are disclosed for the production of chemiluminescent light, particularly for the production of blue/violet light within the range of about 390 nm to less than 438 nm, and most particularly to the use of compounds composed of symmetrically and asymmetrically substituted anthracenes which are effective for increasing the production of such blue/violet light when used as fluorescers in conjunction with chemiluminescent systems. These systems utilize derivatives of 9,10-diphenylanthracene containing one or more fluorines As shown in General Formulae 1-3. The variables shown in Formulae 1-3 are defined in the specification.

(1)

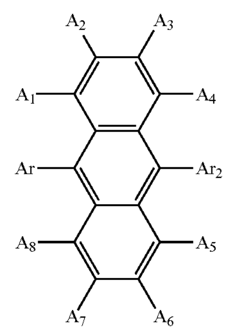

(2)

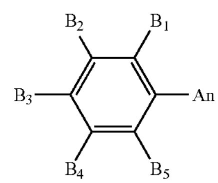

(3)

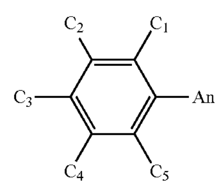

11 Claims, 331 Drawing Sheets

U.S. PATENT DOCUMENTS

| | | | |
|---|---|---|---|
| 3,391,069 | A | 7/1968 | Rauhut |
| 3,557,233 | A | 1/1971 | Zweig et al. |
| 3,597,362 | A | 8/1971 | Bollyky et al. |
| 3,729,426 | A | 4/1973 | Zweig et al. |
| 3,749,679 | A | 7/1973 | Rauhut |
| 3,775,336 | A | 11/1973 | Kasulin et al. |
| 3,888,786 | A | 6/1975 | Maulding |
| 3,948,797 | A | 4/1976 | Vega |
| 3,970,660 | A | 7/1976 | Bollyky |
| 3,974,368 | A | 8/1976 | Rauhut |
| 4,017,415 | A | 4/1977 | Doering |
| 4,076,645 | A | 2/1978 | Vega |
| 4,678,608 | A | 7/1987 | Dugliss |
| 4,717,511 | A | 1/1988 | Koroscil |
| 4,859,369 | A | 8/1989 | Baretz et al. |
| 5,122,306 | A | 6/1992 | Van Moer et al. |
| 5,232,635 | A | 8/1993 | Van Moer et al. |
| 5,597,517 | A | 1/1997 | Chopdekar et al. |
| 6,740,263 | B2 | 5/2004 | Park et al. |
| 6,815,094 | B2 | 11/2004 | Lee et al. |
| 2004/0161633 | A1 | 8/2004 | Seo et al. |
| 2005/0224768 | A1 | 10/2005 | Park et al. |
| 2007/0176544 | A1 | 8/2007 | Koike et al. |
| 2008/0308776 | A1 | 12/2008 | Bindra et al. |

FOREIGN PATENT DOCUMENTS

| | | |
|---|---|---|
| EP | 1380556 | 1/2004 |

OTHER PUBLICATIONS

Tannaci et al, 9/10-Dichlorooctafluoroanthracene as a Building Block for n-Type Organic Semiconductors, J. Org. Chem. 2007, pp. 5567-5573, vol. 72.

Mallory et al, Nuclear Spin-Spin Coupling via Nonbonded Interactions. 6. F-F Coupling through an Intervening Phenyl Group, J. Am. Chem. Soc. 1990, pp. 2577-2581, vol. 112.

Cairncross et al, Pentafluorophenylcopper Tetramer, A reagent for Synthesis of Fluorinated Aromatic Compounds, Organic Syntheses, Coll., 1988, p. 875, vol. 6.

David J. St. Jean, Jr., et al, A Tandem Cross-Coupling/SnAr Approach to Functionalized Carbazoles, Org. Lett., 2007, pp. 4893-4896, vol. 9. No. 23.

Shengqian Ma, et al, Metal-Organic Framework from an Anthracene Derivative Containing Nanoscopic Cages Exhibiting High Methane Uptake, J. Am. Chem. Soc. 2008, pp. 1012-1016, vol. 130.

Kelvin L. Billingsley and Stephen L. Buchwald, An Improved System for the Palladium-Catalyzed Borylation of Aryl Halides with Pinacol Borane, J. Org. Chem., 2008, pp. 5589-5591, vol. 73.

Marc Lafrance, Daniel Shore, and Keith Fagnou, Mild and General Conditions for the Cross-Coupling of Aryl Halides with Pentafluorobenzene and Other Pertluoroaromatics, Org. Lett., 2006, pp. 5097-5100, vol. 8, No. 22.

D. Zehm et al, “Molecular switches flipped by oxygen”, Angew. Chem. Int. Ed., 46:7689-7692 (2007).

J. Tannaci et al, “9,10-disubstituted octafluoroanthracene derivatives via palladium-catalyzed cross-coupling”, J. Org. Chem., 73:7895-7900 (2008).

Y. Matsubara et al, “Meso-disubstituted anthracenes with fluorine-containing groups: synthesis, light-emitting characteristics, and photostability”, Organic Letters, 10(24):5541-5544 (2008).

S. Kotha et al, “Synthesis of symmetrical and unsymmetrical 9,10-diarylanthracene derivatives via bis-suzuki-miyaura cross-coupling reaction”, Synthesis, 4:549-557 (2004).

* cited by examiner

Emission Spectra

DPHA - 9,10-diphenylanthracene
3,4,5-FA - 9,10-bis(3,4,5-trifluorophenyl)anthracene
Penta-FA - 9,10-bis(2,3,4,5,6-pentafluorophenyl)anthracene
9-MTF-10-Ph – 9-(2,3,5,6-tetrafluoro-4-methoxyphenyl)-10-phenylanthracene

BLUE/VIOLET DIPHENYLANTHRACENE CHEMILUMINESCENT FLUORESCERS

CROSS-REFERENCE TO RELATED APPLICATIONS

The present application claims priority to, and the benefit of U.S. Provisional Application No. 61/220,072, filed on Jun. 24, 2009, the contents of which is incorporated by reference herein in its entirety.

FIELD OF THE INVENTION

This invention relates to the production of chemiluminescent light, particularly to the production of blue/violet light within the range of about 390 nm to less than 438 nm, and most particularly to the use of compounds composed of symmetrically and asymmetrically substituted anthracenes which are effective for increasing the production of such blue/violet light when used as fluorescers in conjunction with chemiluminescent systems.

BACKGROUND OF THE INVENTION

The principle techniques for the production of chemiluminescent light comprising the reaction of an oxalate solution including a dye with a solution of hydrogen peroxide containing a suitable catalyst have been well described in the following U.S. Pat. Nos. 6,740,263; 5,232,635; 4,717,511; 4,678,608; 3,888,786; 3,775,336; 3,749,679; 3,597,362; 3,557,233; 3,391,068; 3,391,069, which are incorporated herein by reference.

Chemiluminescence is produced by a reaction, in the liquid phase, of an activator such as hydrogen peroxide with a fluorescent agent and an oxalate. Optionally, other secondary compounds can be present such as catalysts, dyes etc. The production of chemiluminescent light by the reaction of a catalyzed hydrogen peroxide solution with a fluorescer solution is well known in the art. Blue, green and yellow chemiluminescent light has been produced depending upon the particular fluorescer employed in the fluorescer solution. Examples of these prior art chemiluminescent light-systems can be found in one or more of the following U.S. Pat. Nos. 3,749,679; 3,391,068; 3,974,368; 3,557,233; 3,597,362; 3,775,336; 3,888,786.

Historically, the light output of blue chemiluminescent devices has been based upon 9,10-diphenylanthracene (DPHA) and 2-chloro-9,10-bis(4-methoxyphenyl)anthracene (BPEN). However, although the light output is measured from 400-500 nm, most of the substituted 9,10-diphenylanthracene derivatives have chemiluminescent emission maxima greater than 445 nm. The most common blue used in chemiluminescent devices is BPEN with an emission maximum of 451 nm. None of the reported non-polymeric substituted diphenylanthracene dyes used for chemiluminescence has a listed emission maximum below DPHA (438 nm). This invention teaches the development of dyes suitable for oxalate/peroxide chemiluminescent systems with a spectrum having an emission maximum at a wavelength below the one observed for DPHA, but at wavelengths greater than the ultraviolet region. This would enable the production of a chemiluminescent system with greater output in the violet region of the visible spectrum, particularly, a chemiluminescent system which produces light having an emission maximum from about 390 nm to less than 438 nm without the need for filters to protect the observer from ultraviolet radiation.

DESCRIPTION OF THE PRIOR ART

U.S. Pat. No. 3,888,786 to Maulding relates to a chemiluminescent system to obtain chemiluminescent light by reacting an oxalic-type compound of the group consisting of an oxalic-type ester with a hydroperoxide compound in the presence of a solvent and chloro, fluoro, or lower alkyl bis(phenylethynyl)-substituted aromatic compound as a fluorescer. Similarly, U.S. Pat. Nos. 3,729,426, 3,948,797, 4,017,415 and 5,122,306 teach the use of substituted anthracene derivatives such as 9,10-bis(phenylethynyl)anthracene, 9,10-bis(4-methoxyphenyl)-2-chloroanthracene, monochloro-substituted 9,10-bis(phenylethynyl)anthracenes such as 1-chloro-9,10-bis(phenylethynyl)anthracene, dichloro-substituted 9,10-bis(phenylethynyl)anthracenes such as 1,8-dichloro-9,10-bis(phenylethynyl)anthracene, 1,5-dichloro-9,10-bis(phenylethynyl)anthracene, 2,3-dichloro-9,10-bis(phenylethynyl)anthracene, 9,10-diphenylanthracene and the like, as suitable fluorescers for chemiluminescent systems. U.S. Pat. No. 3,970,660 to Bollyky is directed toward a chemiluminescent system comprising (1) derivatives of a polycarbonyl compound substituted with at least one nitrogen-containing hetero group and which may have an alkanol or amine substituent, (2) a hydroperoxide compound, (3) a diluent, and (4) a fluorescer, inclusive of halogen substituted anthracenes, said ingredients in combination producing visible chemiluminescent light and a process of producing such light. U.S. Pat. No. 4,076,645 to Vega teaches compositions and methods for producing chemiluminescence by the reaction of bis(6-carbopentoxy-2,4,5-trichlorophenyl)oxalate with a peroxide in presence of 9,10-bis(phenylethynyl)anthracene the initial luminosity on mixing these reaction components in a suitable diluent is increased by using the specific concentration of bis-oxalate ester component in the range from 0.05 to 0.09 mole per liter in the reaction mixture.

U.S. Pat. No. 4,859,369 to Baretz et al, teaches aqueous chemiluminescent systems, inclusive of halogen substituted anthracene fluorescers including those emitting in the blue region of the spectrum chemiluminescent systems, which have been found to exhibit improved chemiluminescence due to the presence of minor amounts of a water-soluble polymer.

U.S. Pat. No. 5,232,635 to Van Moer et al is directed toward new derivatives of anthracene for the emission of a blue chemiluminescent light. The derivatives are of 9,10-bisphenylanthracene substituted at the 2 position of the anthracene ring and on the phenyl groups including 9,10-bis(4-fluorophenyl)-2-fluoroanthracene. The production of turquoise chemiluminescent light is also disclosed by mixing said derivatives with a green 9,10-bis(phenylethynyl) anthracene.

U.S. Pat. No. 6,740,263 to Park et al describes an anthracene and chemiluminescent compositions as shown below. Wherein, R is an alkyl group having 1-8 carbon atoms, and $X^1$ and $X^2$ are independently hydrogen or a halogen.

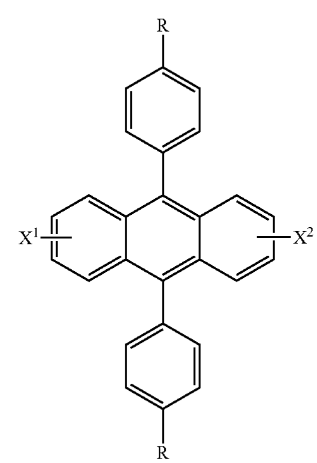

The disclosure of Park et al relates to an anthracene compound and a chemiluminescent composition comprising the compound, and more particularly to a novel anthracene compound, which is capable of emitting a blue light of a high intensity for a prolonged period of time compared with conventional anthracene compounds used as luminescent dyes in chemiluminescent compositions emitting blue light, and a chemiluminescent composition comprising the anthracene compound.

The above referenced prior art disclosures fail to teach or suggest the novel compounds as instantly disclosed, nor do they teach a chemiluminescent system which produces light having an emission maximum from about 390 nm to less than 438 nm.

SUMMARY OF THE INVENTION

It is a primary objective of the instant invention to teach new species of fluoro-substituted 9,10-diphenylanthracenes including symmetrically and/or asymmetrically substituted constituents.

It is a further objective of the instant invention to provide fluorescer compounds based upon symmetrical and asymmetrical 9,10-diphenylanthracene derivatives of Formula (1), where the substituents on the anthracene labeled $A^1$, $A^2$, $A^3$, $A^4$, $A^5$, $A^6$, $A^7$, and $A^8$ are either fluorine or hydrogen.

(1)

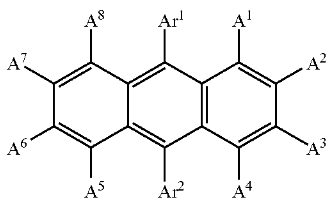

Furthermore, if $Ar^1$ and $Ar^2$ are the same, at least two of the substituents, $B^1$, $B^2$, $B^3$, $B^4$, and $B^5$, as shown in FIG. 2, are not hydrogen, wherein $B^1$, $B^2$, $B^4$, and $B^5$ are either hydrogen or fluorine and $B^3$ is either hydrogen, fluorine, trifluoromethyl, or an alkoxy group with 1-10 carbons.

(2)

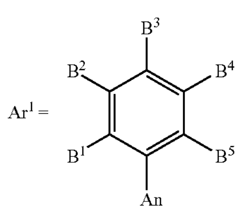

Additionally, if $Ar^1$ and $Ar^2$ are not the same, $Ar^1$ will meet the conditions described above and the second ring, as shown in FIG. 3, may be completely substituted with hydrogen or wherein at least one of the substituents, $C^1$, $C^2$, $C^3$, $C^4$, and $C^5$ which are not hydrogen, wherein $C^1$, $C^2$, $C^4$, and $C^5$ are either hydrogen or fluorine and $C^3$ is either hydrogen, fluorine, trifluoromethyl, or an alkoxy group with 1-10 carbons.

(3)

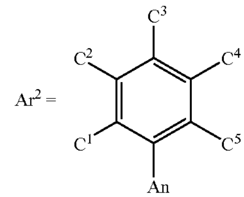

It is a further objective of the instant invention to provide a chemiluminescent composition comprised of a solution of the fluorescer and oxalate, which when mixed with a solution of hydrogen peroxide in an appropriate solvent provides a chemiluminescent system exhibiting improved light output in the spectral region of about 390 nm to less than 438 nm particularly, a chemiluminescent system which produces light having an emission maximum from about 390 nm to less than 438 nm, and more specifically a chemiluminescent system which produces light having an emission maximum in the region from about 400 nm to about 420 nm.

In accordance with the present invention, the oxalate compound is a bis(phenyl) oxalate ester having the formula:

in which the phenyl groups(P) are substituted by at least one carbalkoxy group of the formula

in which R is (a) an alkyl group (1-18 carbons, straight chain, branched chain, cyclic) or (b) a substituted alkyl group, where said substituents are selected from the group consisting of fluoro, chloro, trifluoromethyl, alkoxy, cyano, carbalkoxy, and phenyl; and in which (2) the phenyl groups P, are substituted by at least two additional substituents selected from the group consisting of fluoro, chloro, bromo, cyano, trifluoromethyl, carbalkoxy, nitro, alkoxy, alkoxy methyl, methyl, and higher alkyl, said additional substituents being selected so that the sum of their Hammett sigma constants for phenols lies between 1.0 and 2.

In a preferred embodiment the oxalate is bis(2,4,5-trichloro-6-carbopentoxyphenyl)oxalate.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

As follows.

FIG. 1 illustrates a 9,10-bis(2,3,4,5,6-pentafluorophenyl)anthracene;

FIG. 88 illustrates a 9,10-bis(3,4-difluorophenyl)-1,2,3,4,5,6,7,8-octafluoroanthracene;

FIG. 89 illustrates a 9-(2,3,4,5,6-pentafluorophenyl)-10-phenylanthracene;

FIG. 123 illustrates a 9-(2,6-difluoro-4-methoxyphenyl)-10-(2,4-difluorophenyl)anthracene;

FIG. 124 illustrates a 9-(3,4-difluorophenyl)-10-phenylanthracene;

FIG. 125 illustrates a 9-(3,4-difluorophenyl)-10-(4-methoxyphenyl)anthracene;

FIG. 126 illustrates a 9-(3,4-difluorophenyl)-10-[2,3,5,6-tetrafluoro-4-(trifluoromethyl)phenyl]anthracene;

FIG. 127 illustrates a 9-(2,4-difluorophenyl)-10-(3,4-difluorophenyl)anthracene, FIG. 128 illustrates a 9-phenyl-10-[2,3,5,6-tetrafluoro-4-(trifluoromethyl)phenyl]anthracene;

FIG. 129 illustrates a 9-(4-methoxyphenyl)-10-[2,3,5,6-tetrafluoro-4-(trifluoromethyl)phenyl]anthracene;

FIG. 130 illustrates a 9-(2,4-difluorophenyl)-10-[2,3,5,6-tetrafluoro-4-(trifluoromethyl)phenyl]anthracene;

FIG. 131 illustrates a 9-(2,4-difluorophenyl)-10-phenylanthracene;

FIG. 132 illustrates a 9-(2,4-difluorophenyl)-10-(4-methoxyphenyl)anthracene;

FIG. 133 illustrates a 1-fluoro-9-(2,3,4,5,6-pentafluorophenyl)-10-phenylanthracene;

FIG. 134 illustrates a 1-fluoro-9-(4-methoxyphenyl)-10-(2,3,4,5,6-pentafluorophenyl)anthracene;

FIG. 135 illustrates a 1-fluoro-9-(2,3,4,5,6-pentafluorophenyl)-10-(2,3,5,6-tetrafluorophenyl)anthracene;

Figure 136:
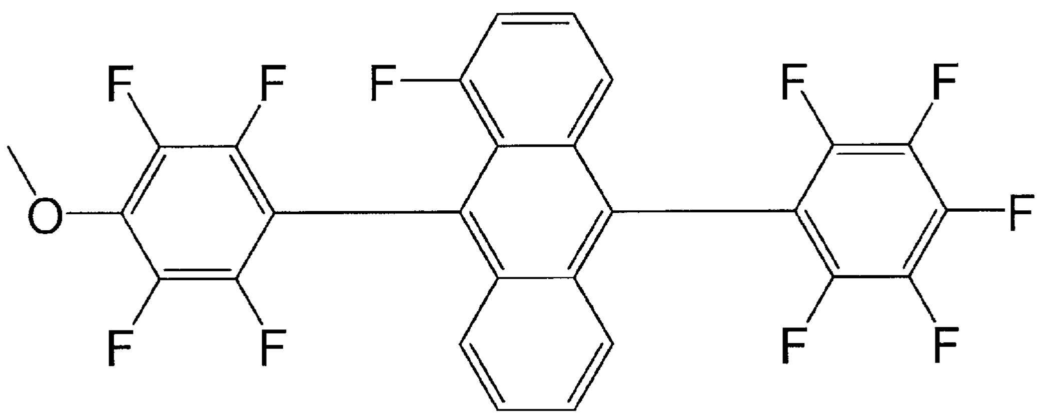
Figure 137:
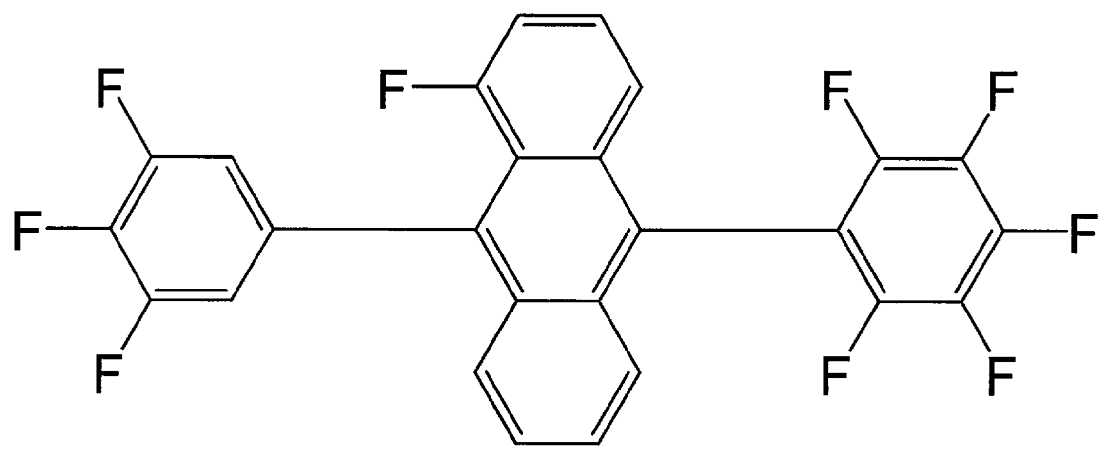
Figure 138:
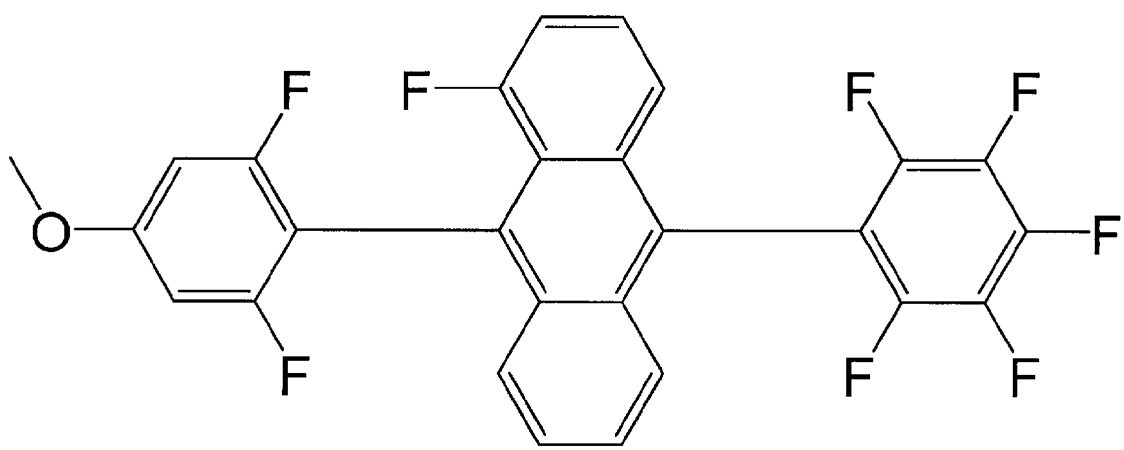
Figure 139:
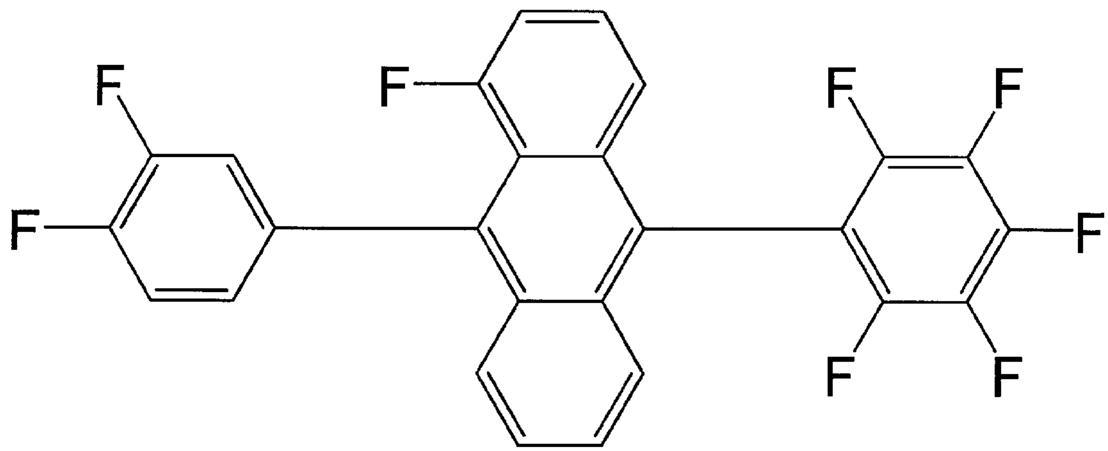
Figure 140:
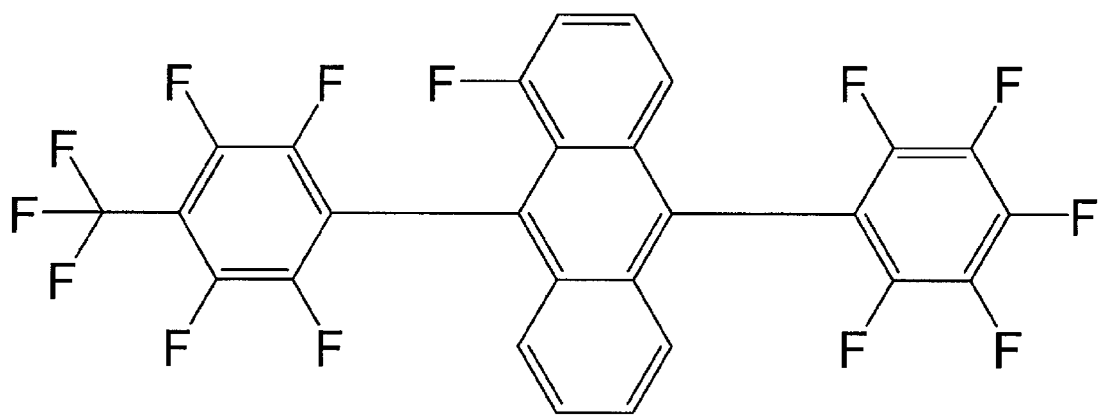
Figure 141:
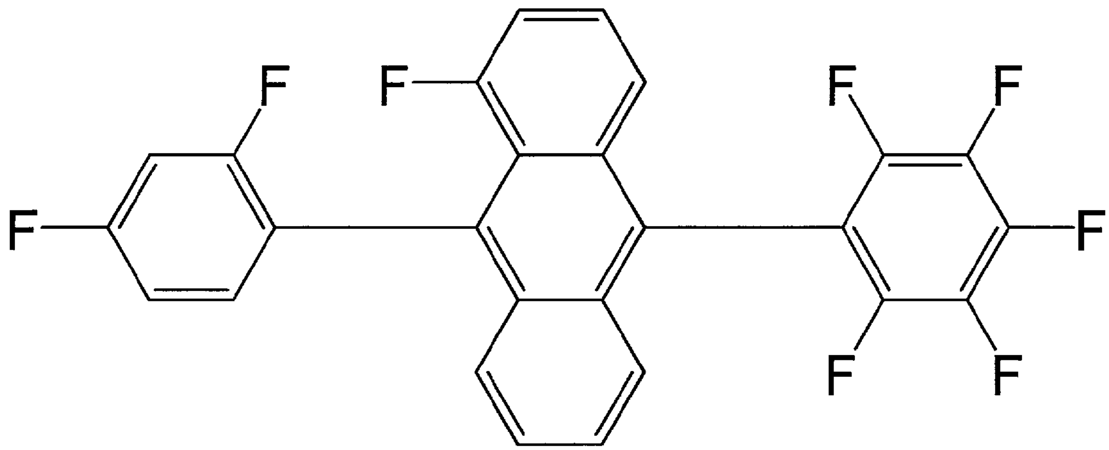
Figure 142:
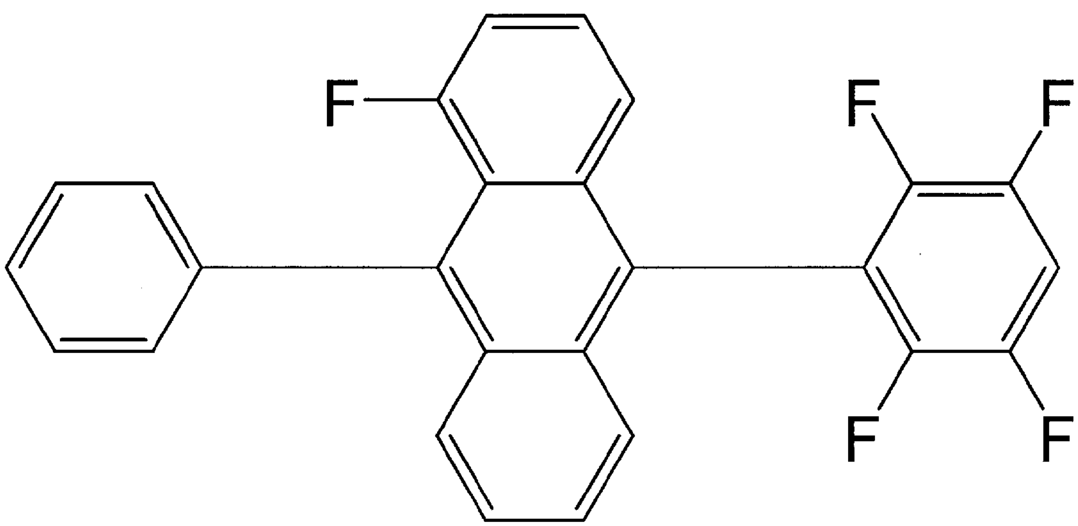
Figure 143:
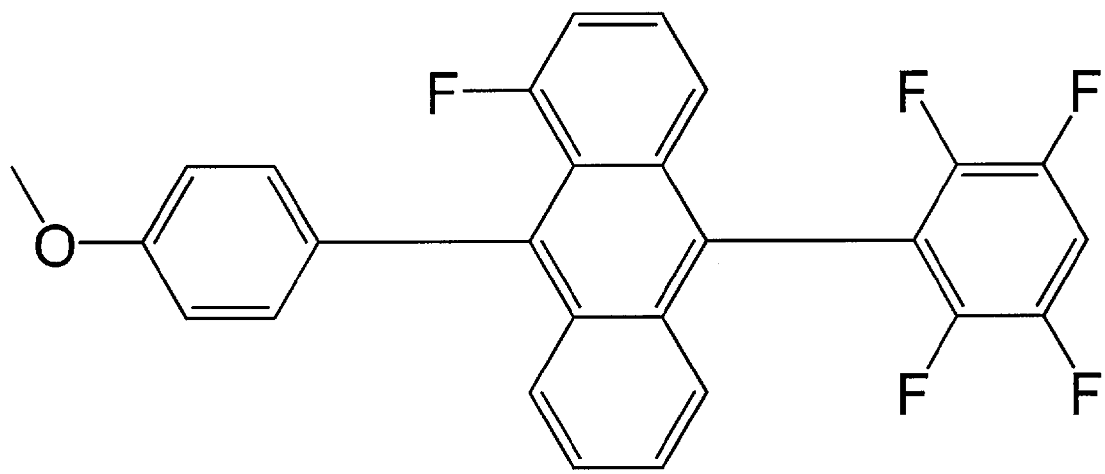
Figure 144:
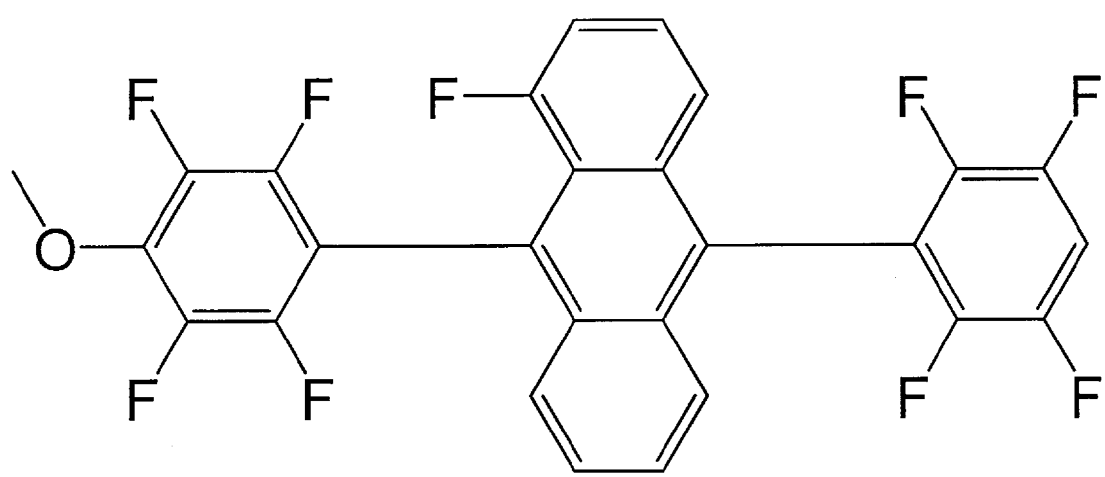
Figure 145:
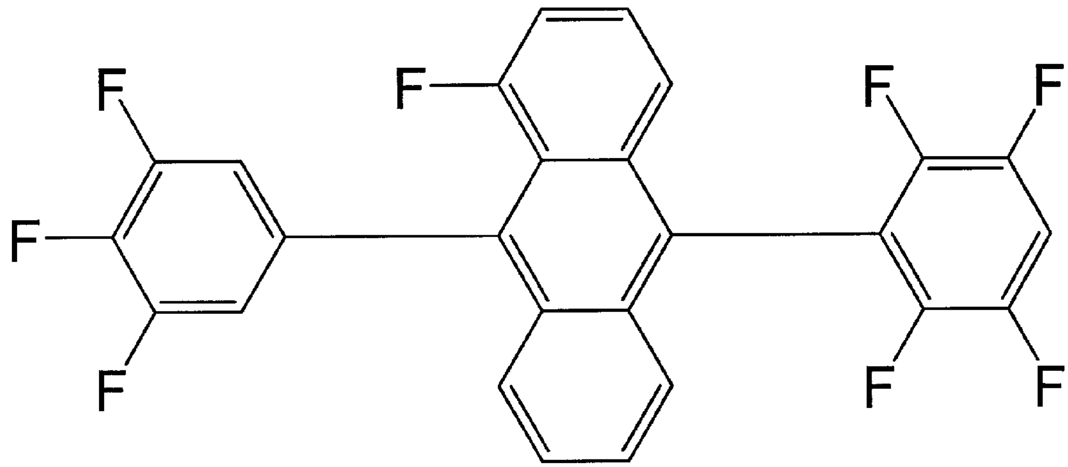
Figure 146:
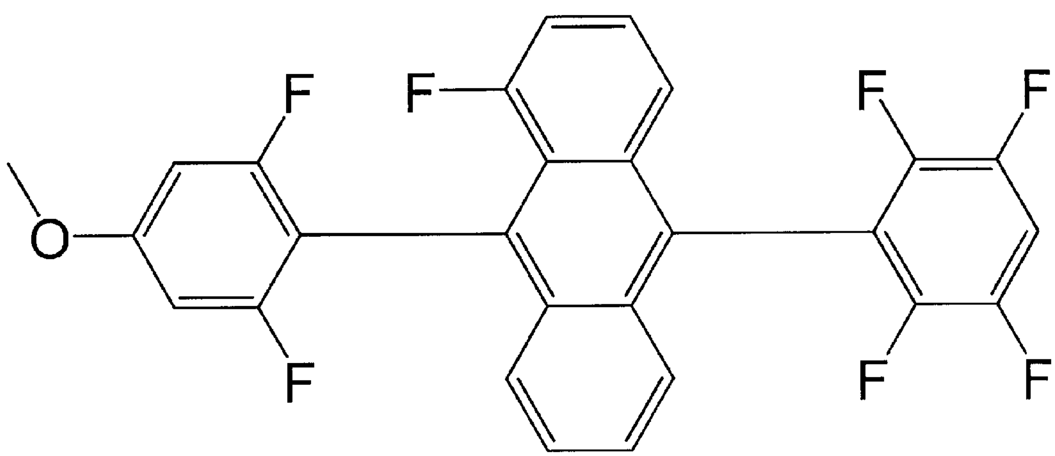
Figure 147:
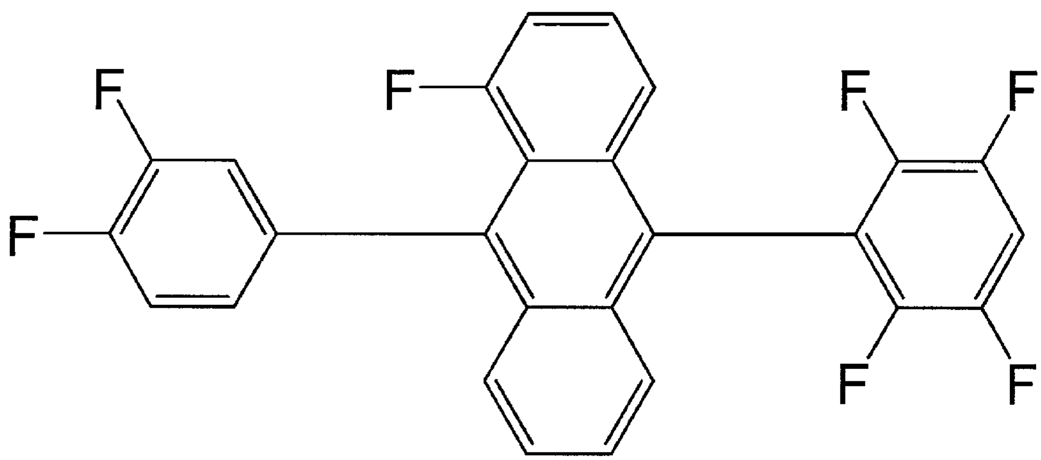
Figure 148:
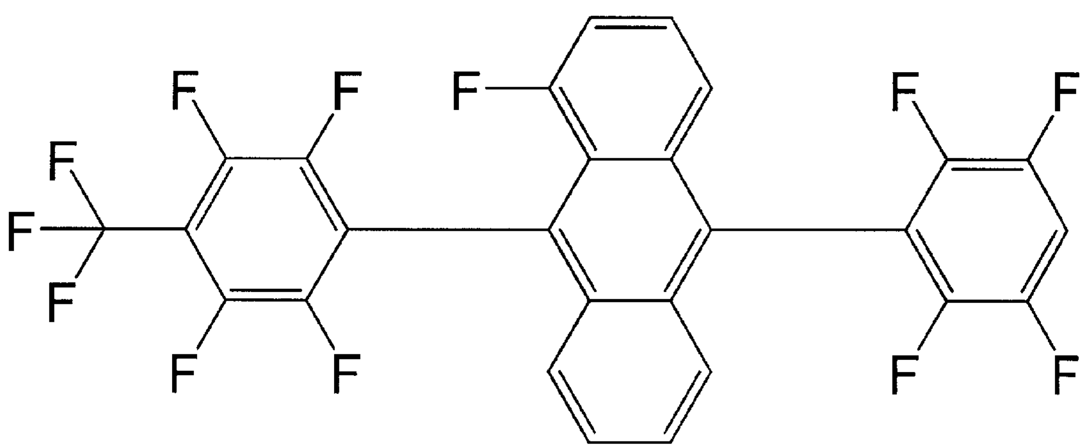
Figure 149:
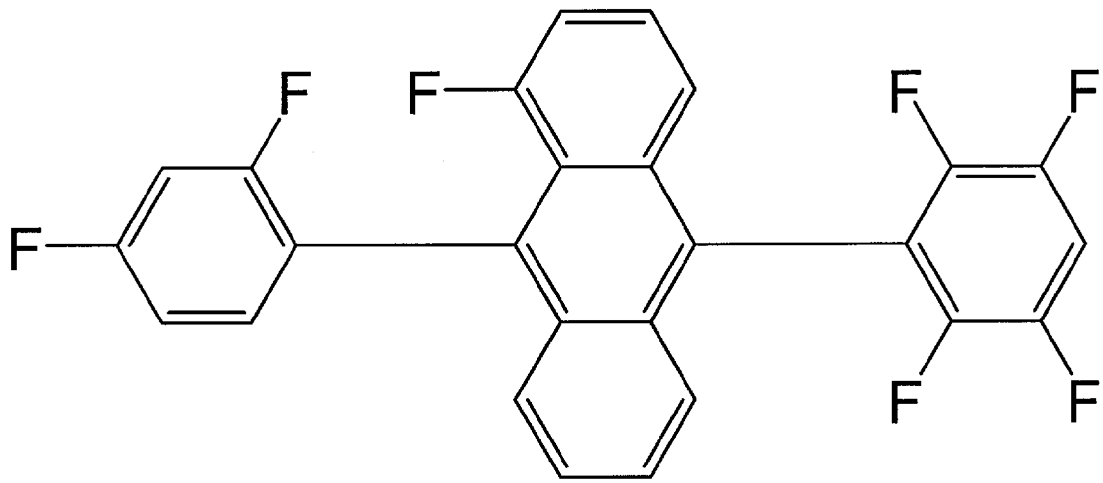
Figure 150:
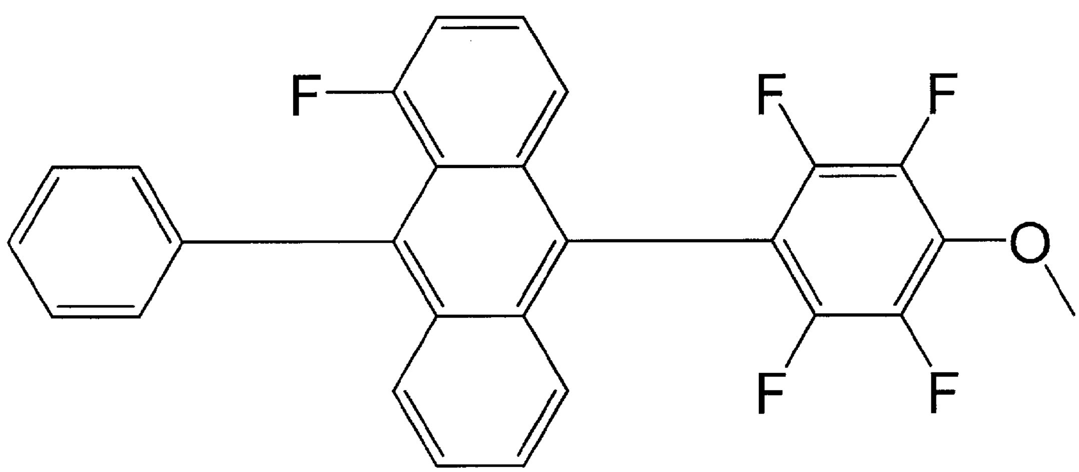
Figure 151:
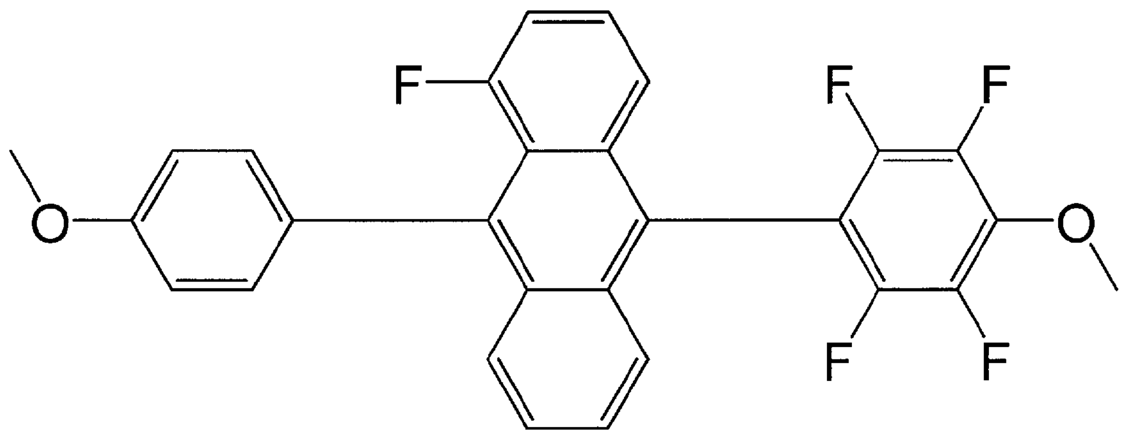
Figure 152:
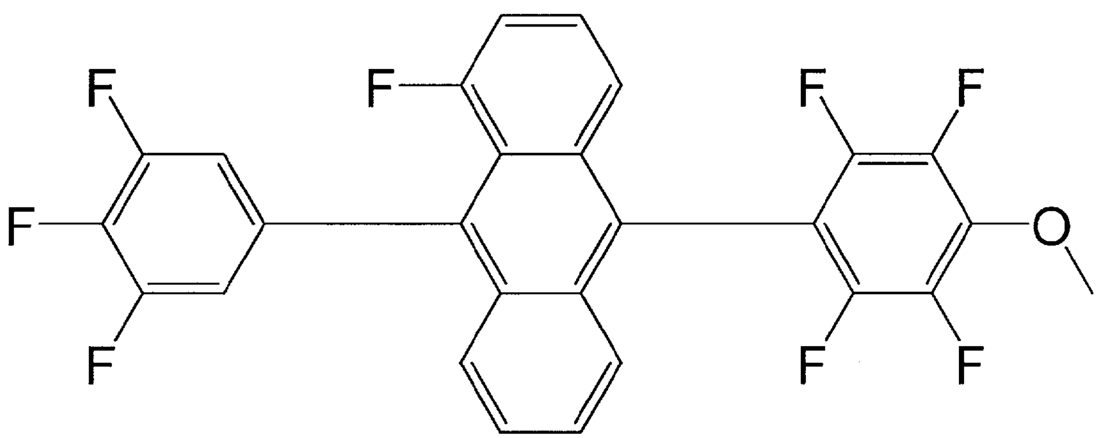
Figure 153:
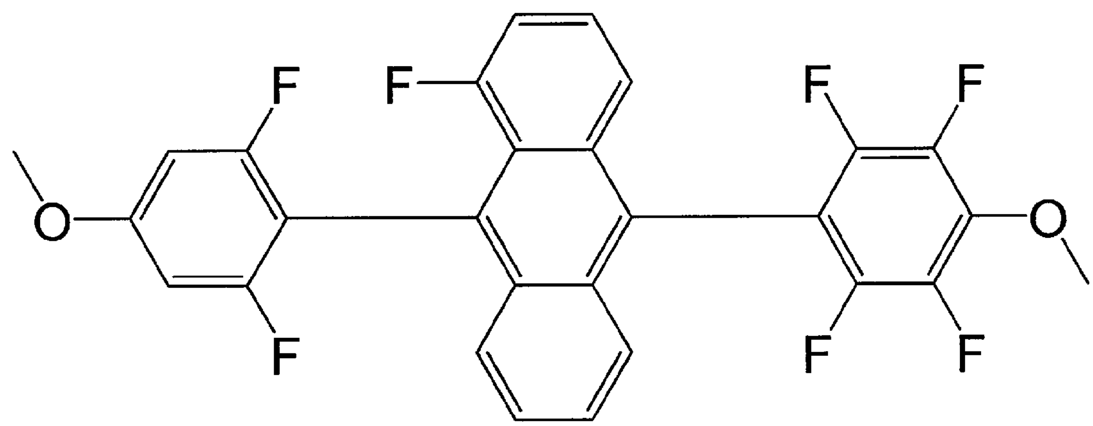
Figure 154:
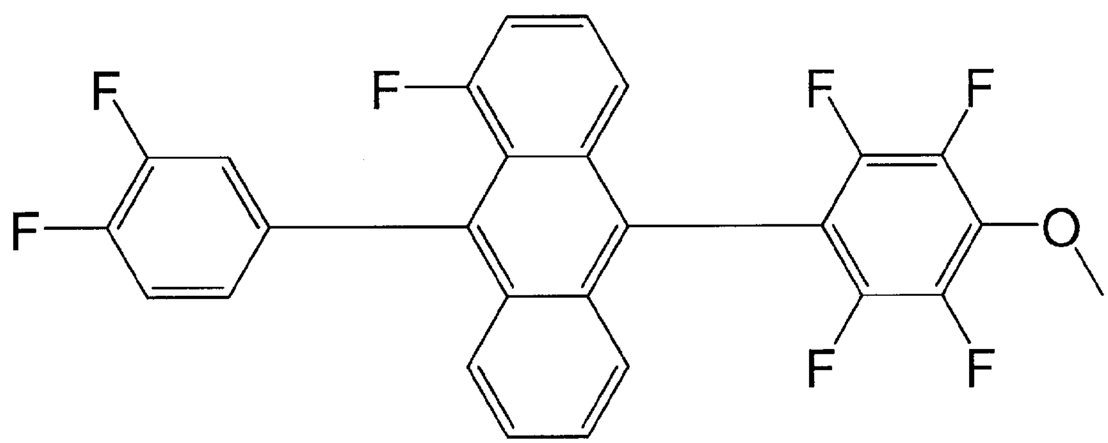
Figure 155:
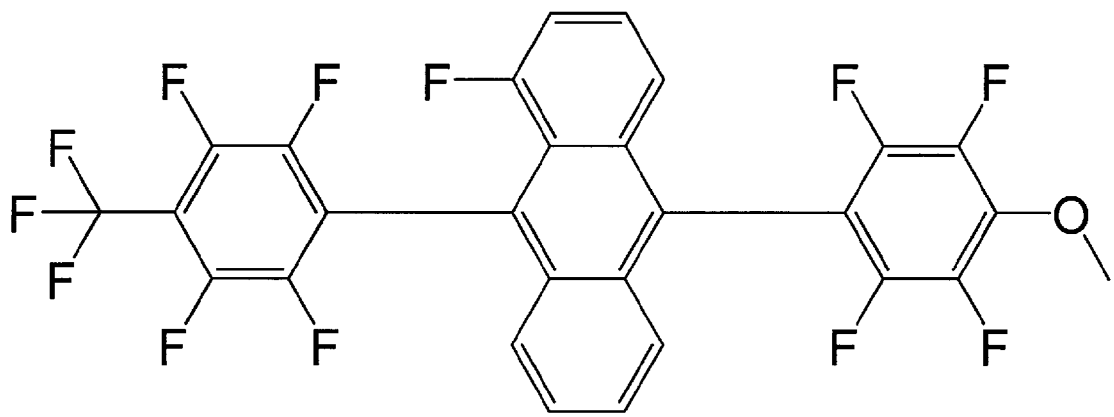
Figure 156:
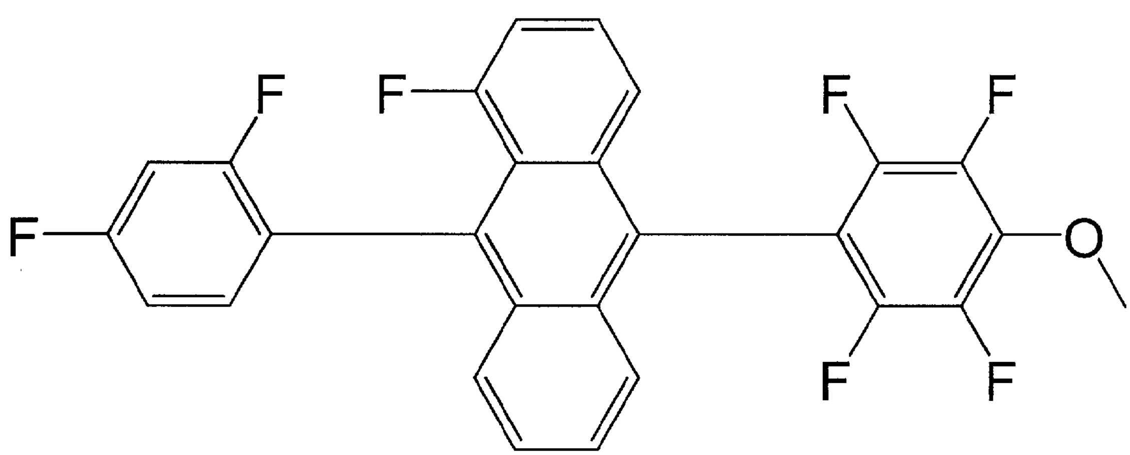
Figure 157:
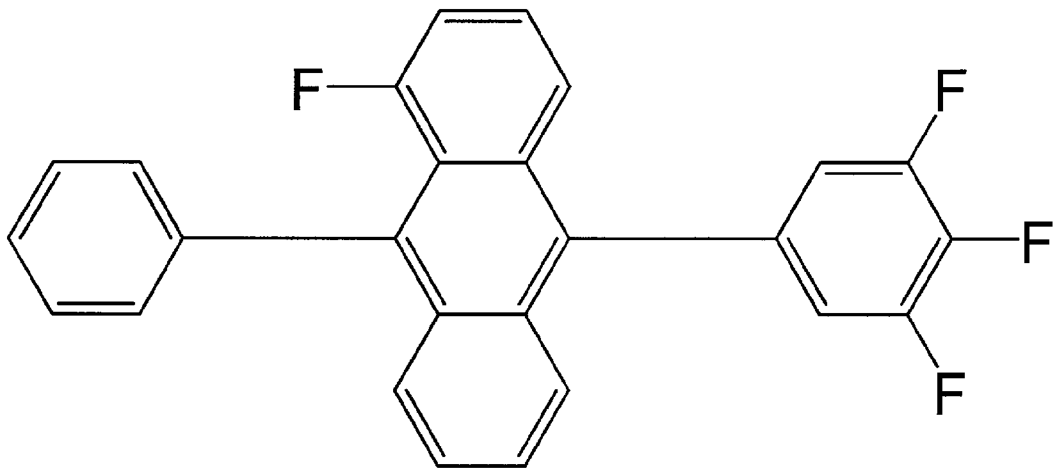
Figure 158:
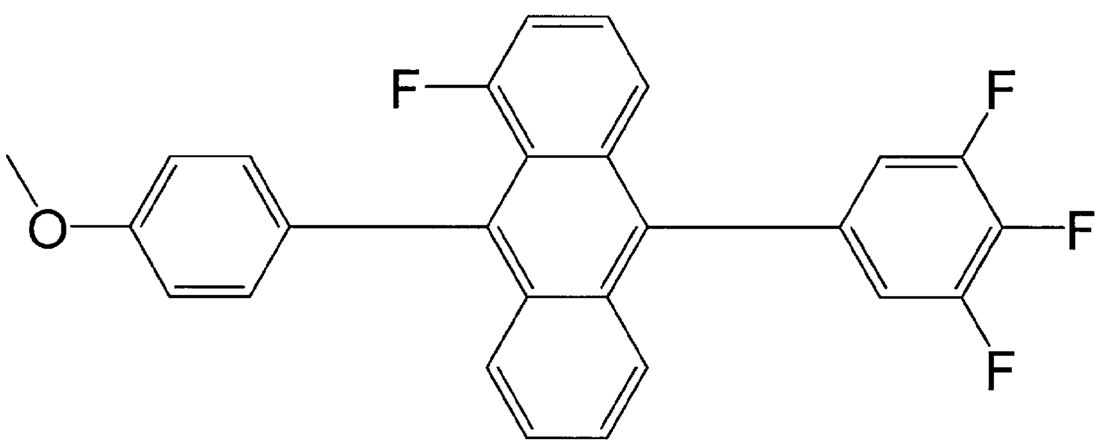
Figure 159:
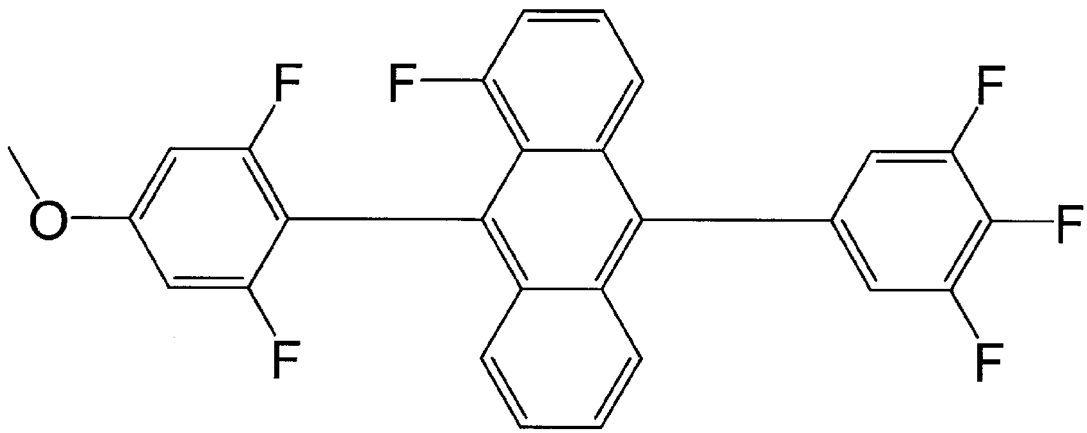
Figure 160:
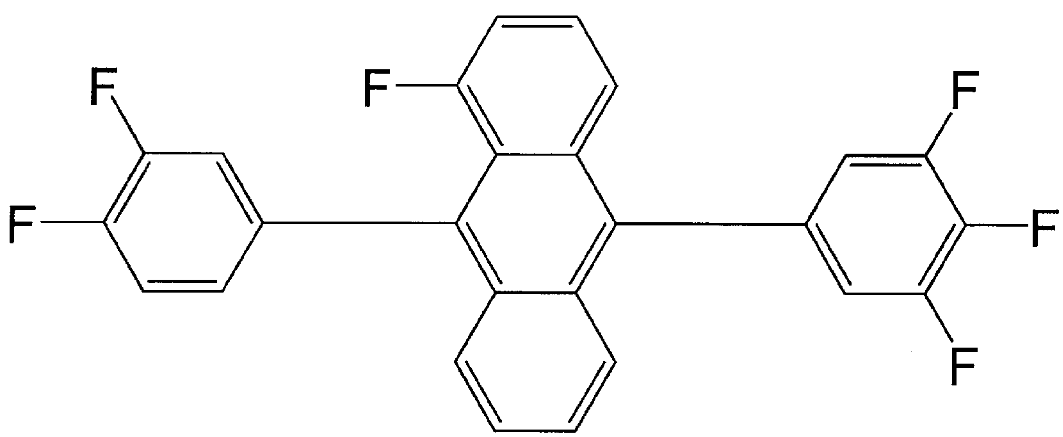
Figure 161:
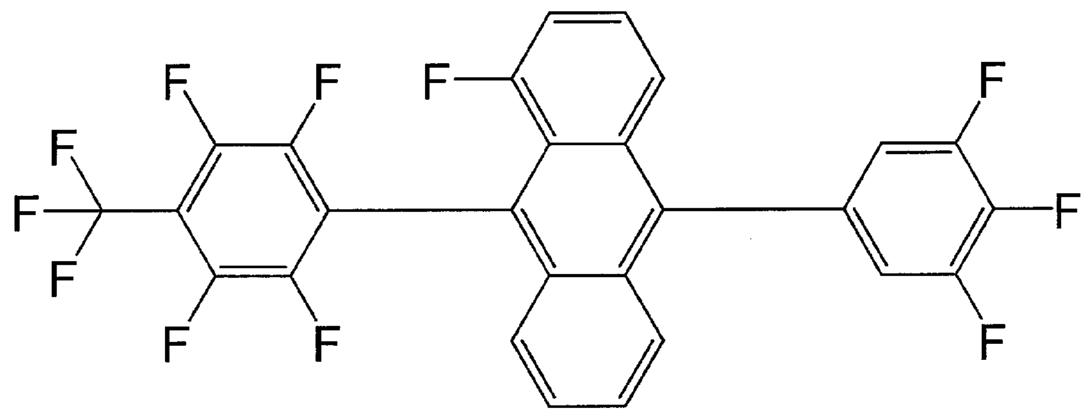
Figure 162:
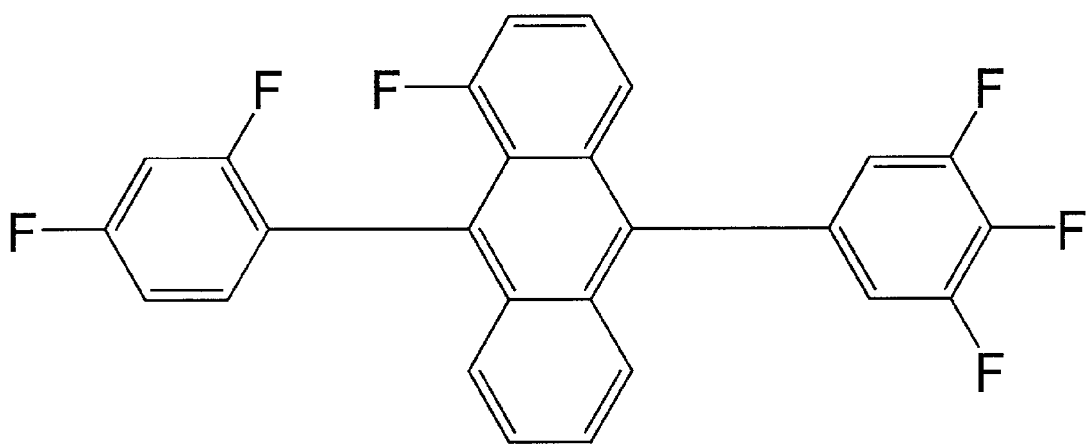
Figure 163:
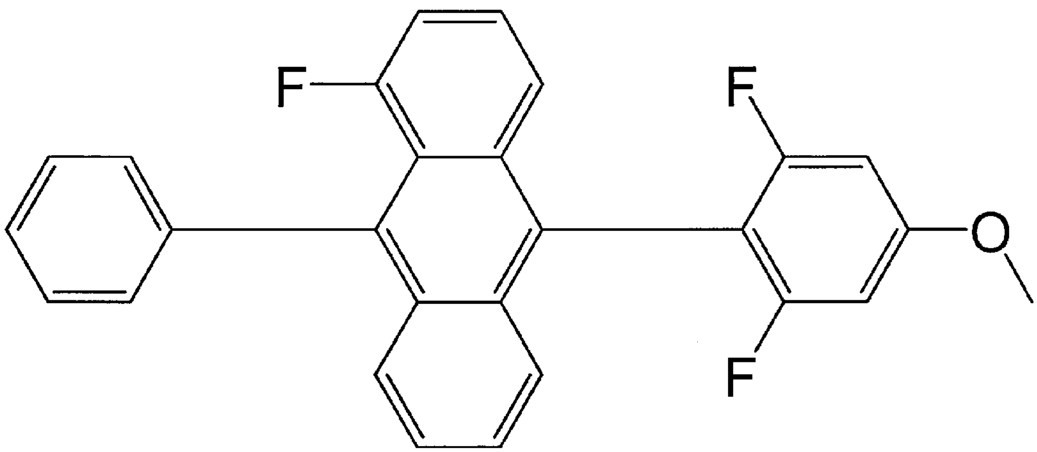
Figure 164:
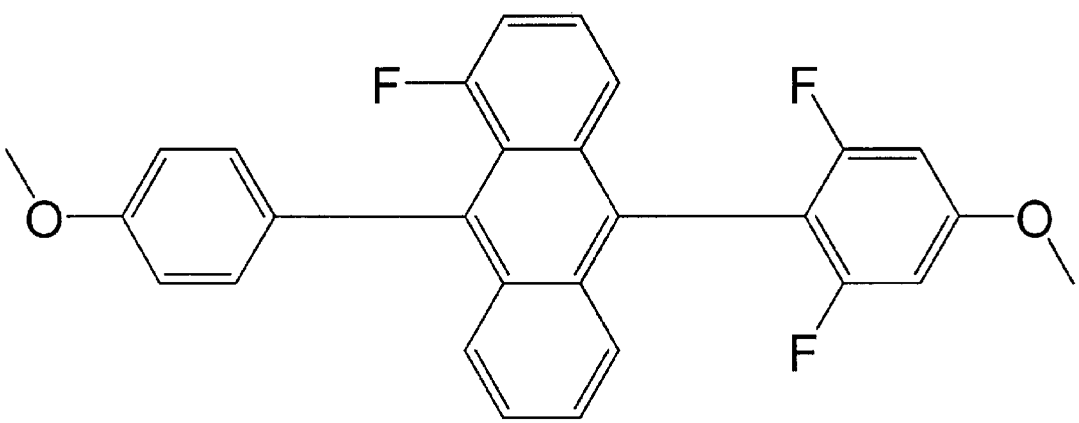
Figure 165:
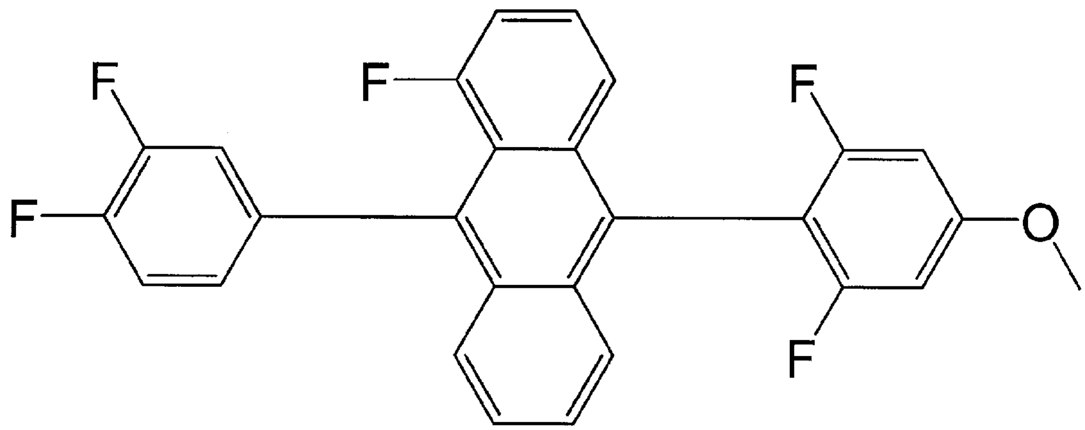
Figure 166:
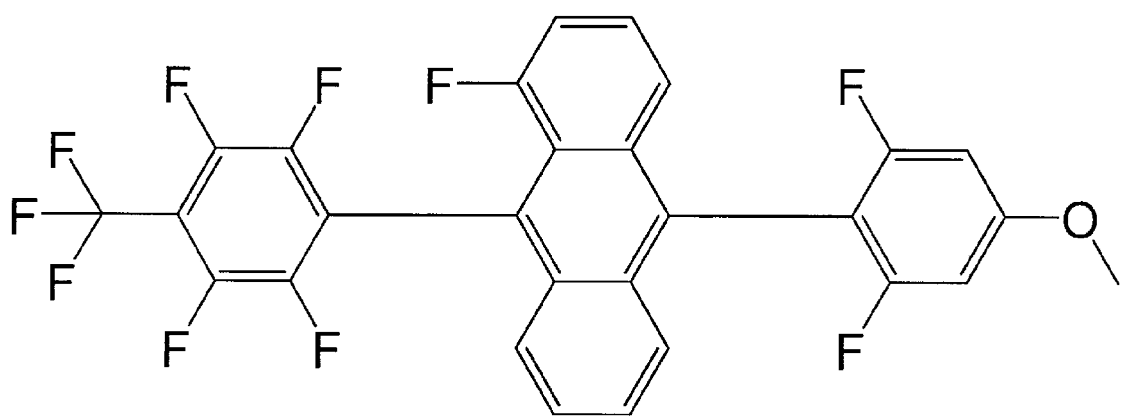
Figure 167:
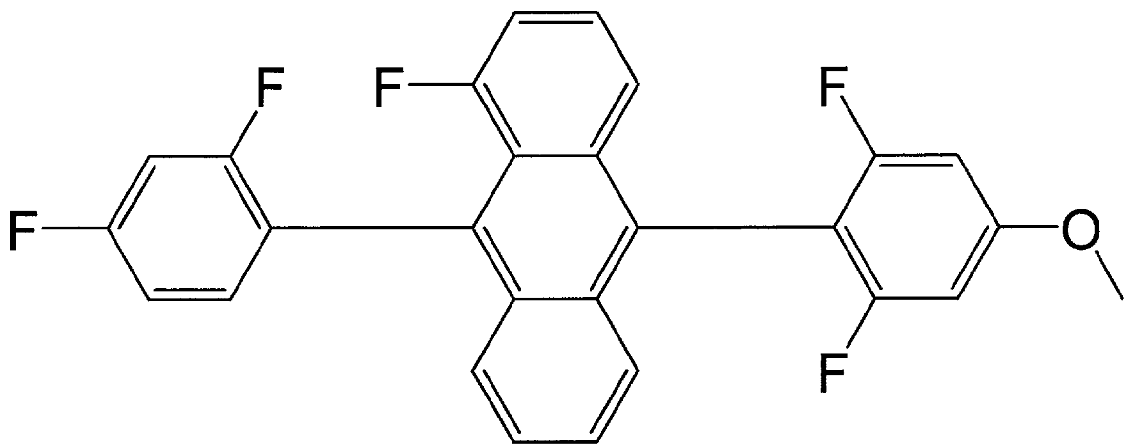
Figure 168:
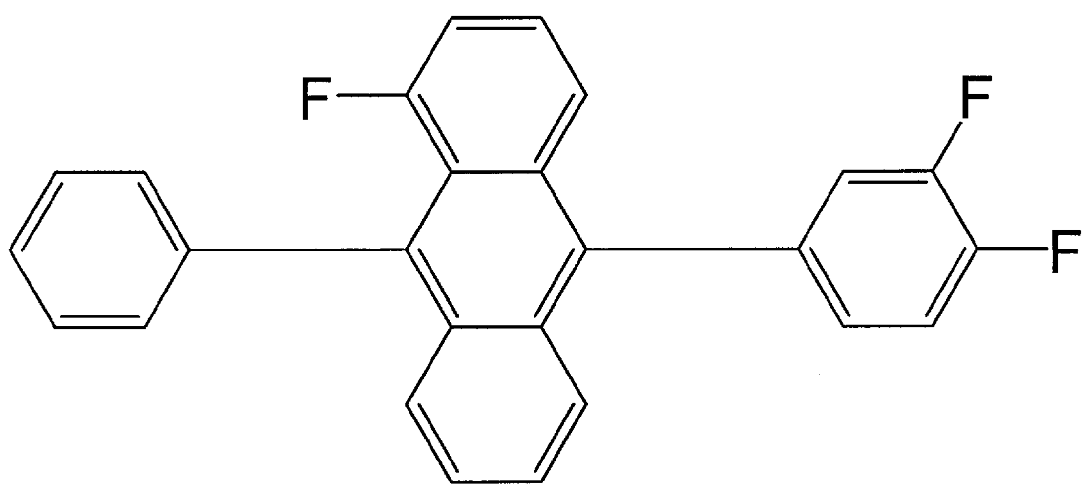
Figure 169:
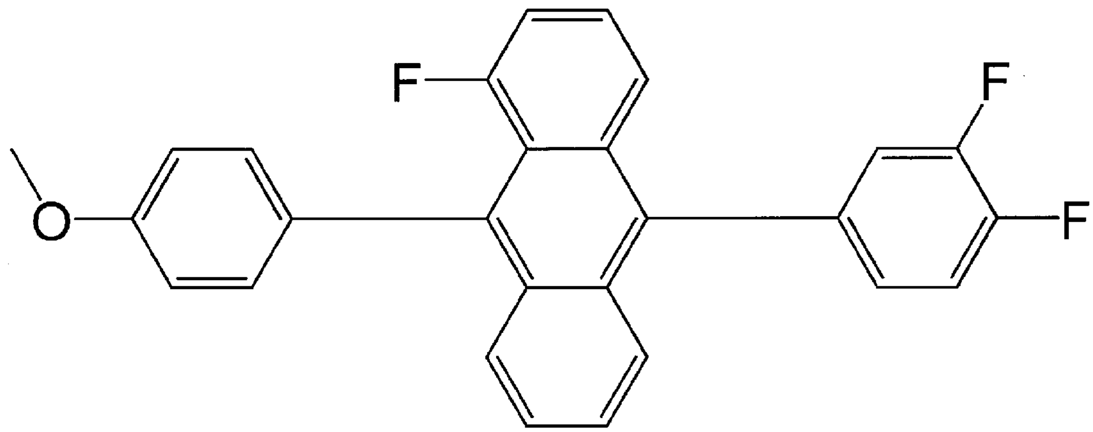
Figure 170:
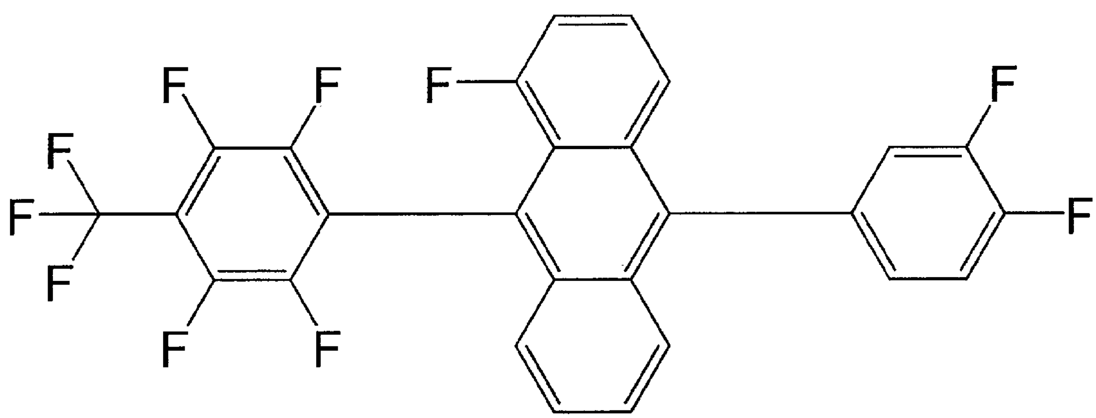
Figure 171:
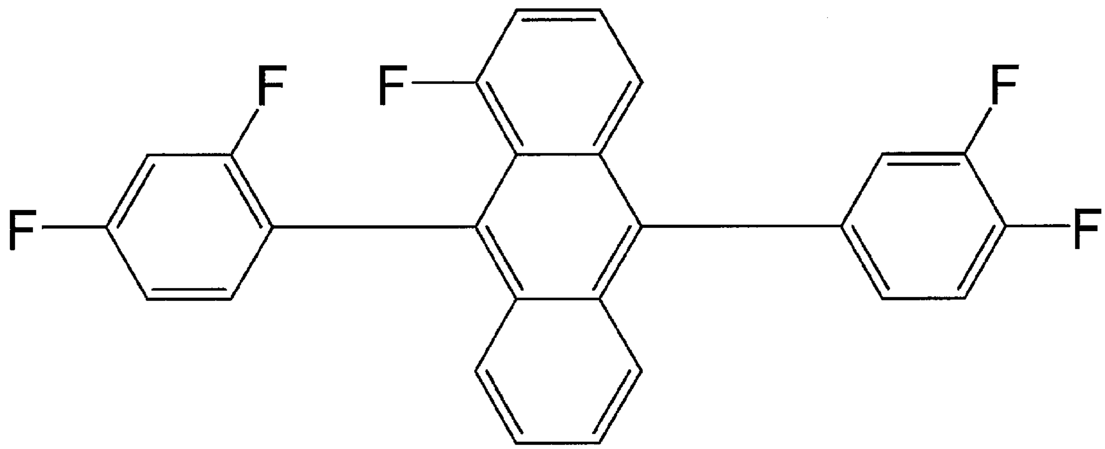
Figure 172:
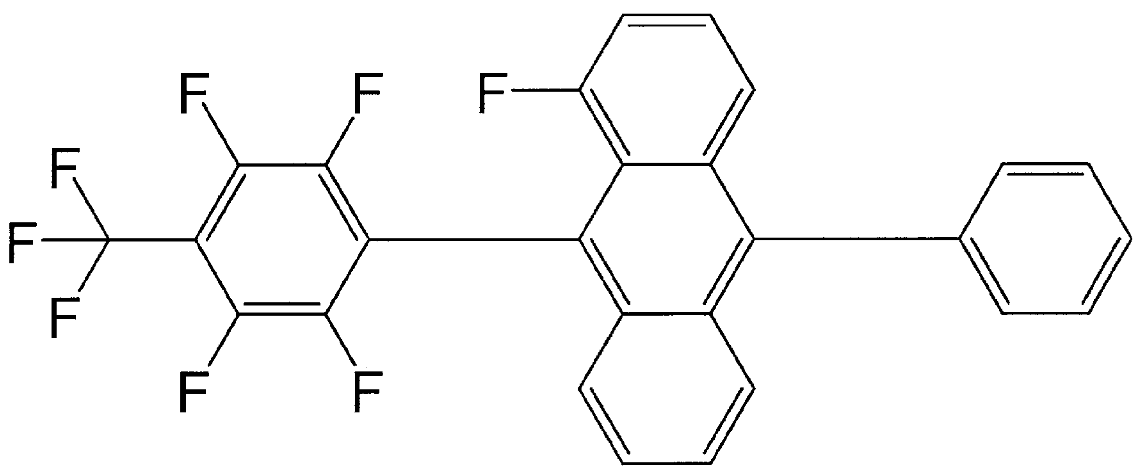
Figure 173:
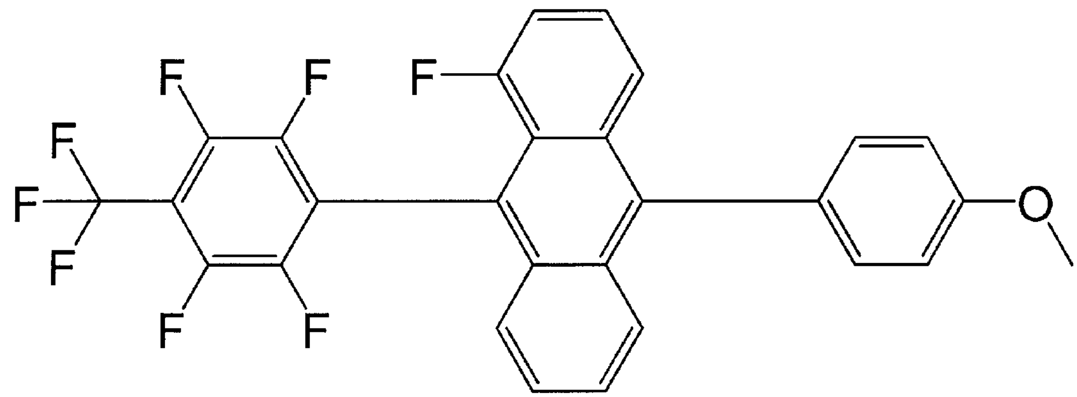
Figure 174:
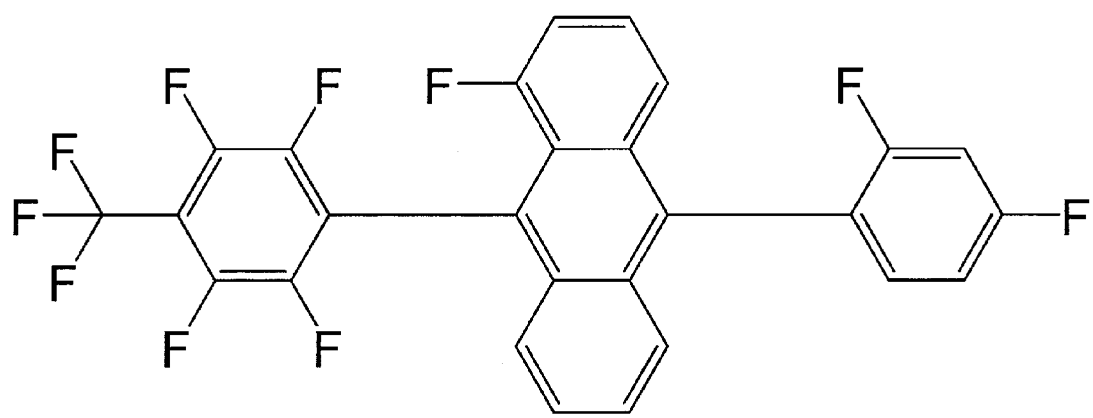
Figure 175:
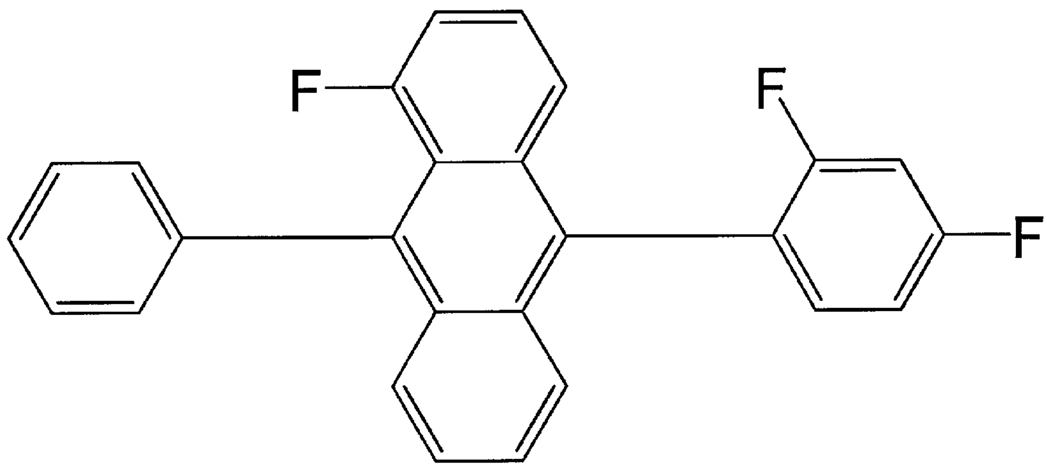
Figure 176:
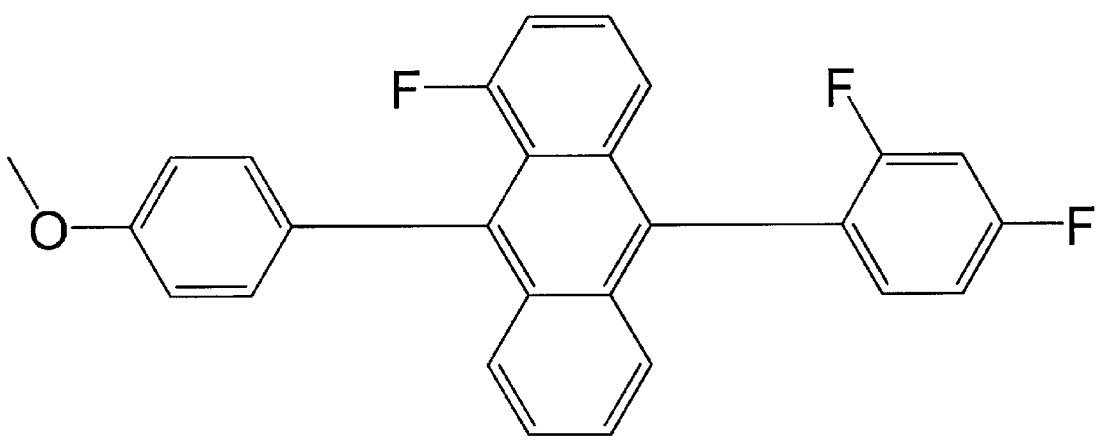
Figure 177:
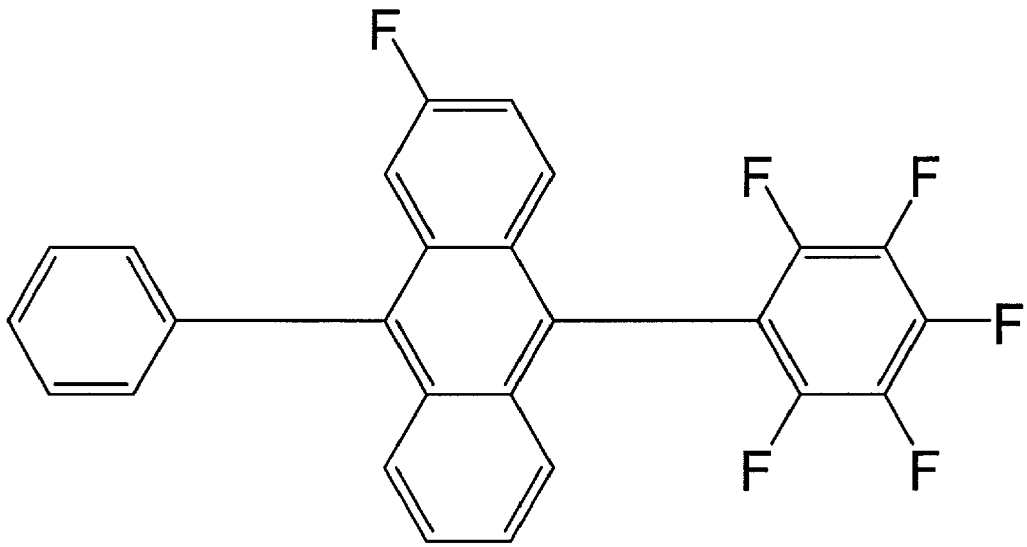
Figure 178:
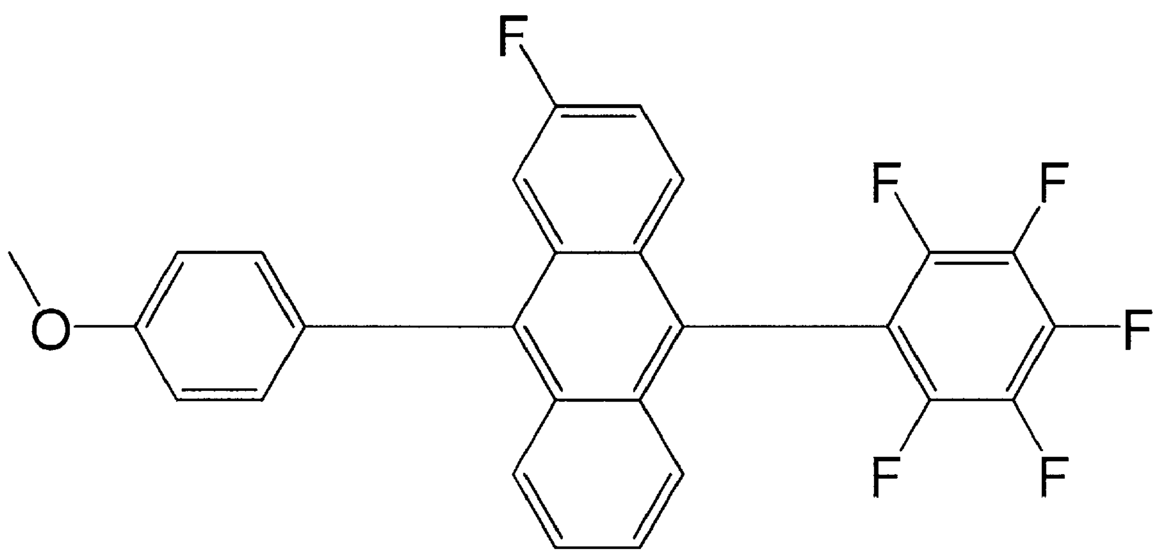
Figure 179:
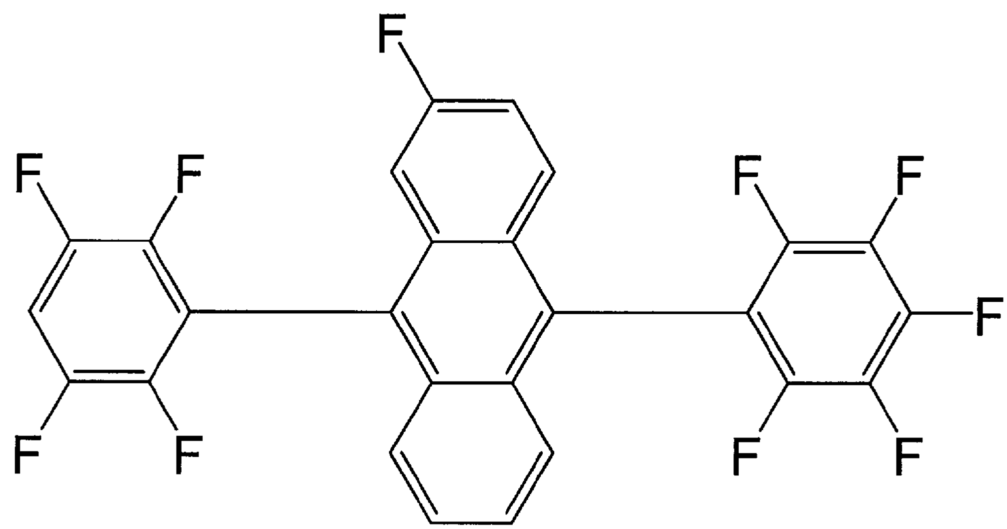
Figure 180:
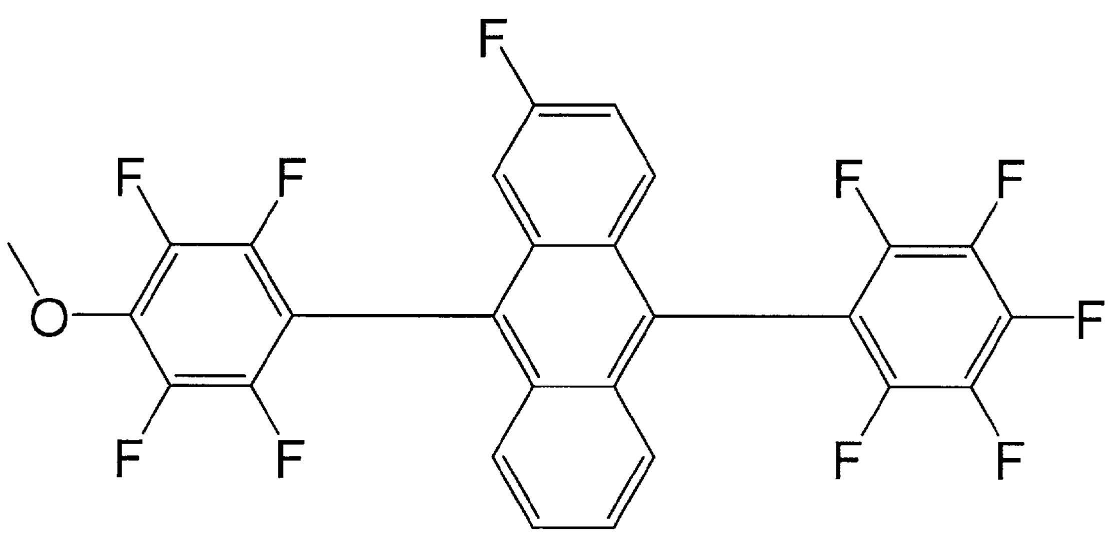
Figure 181:
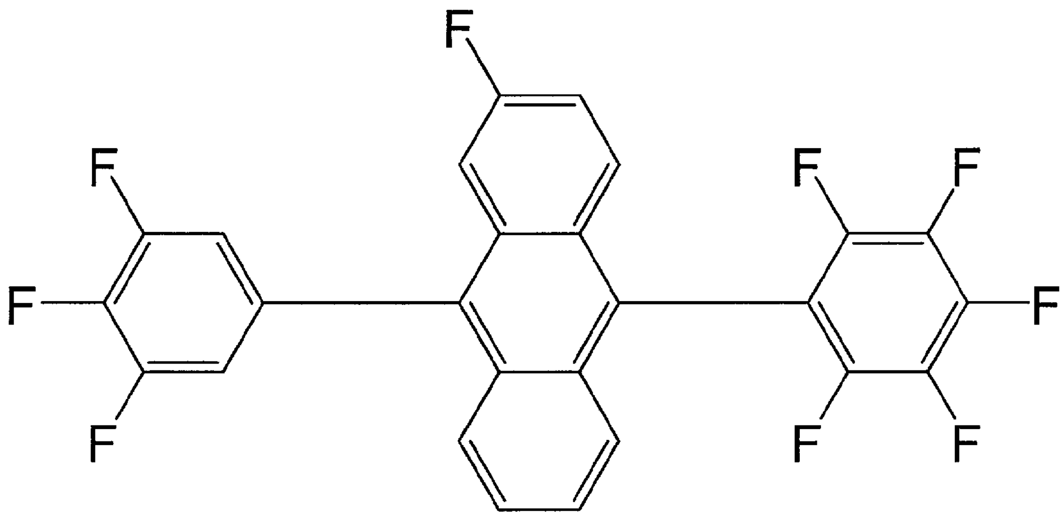
Figure 182:
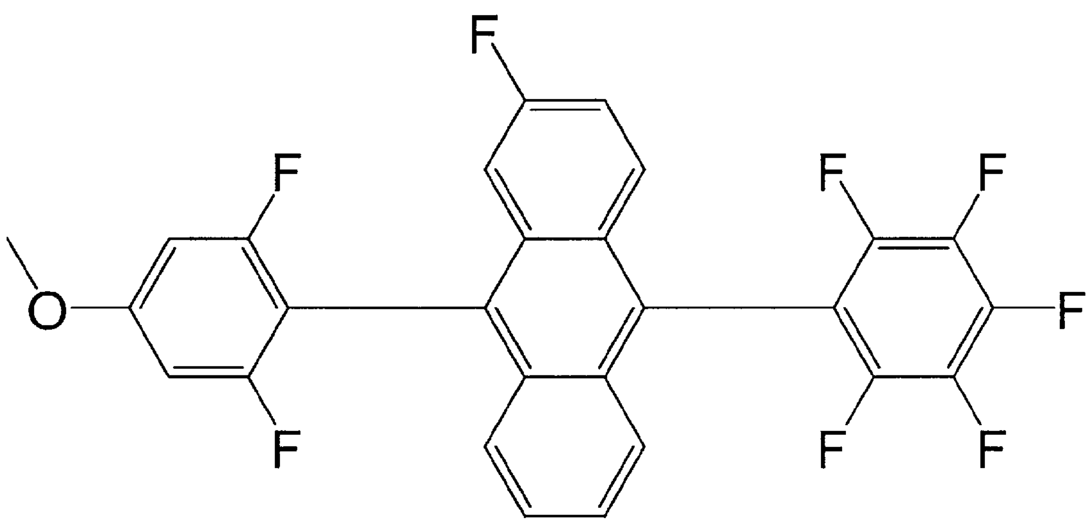
Figure 183:
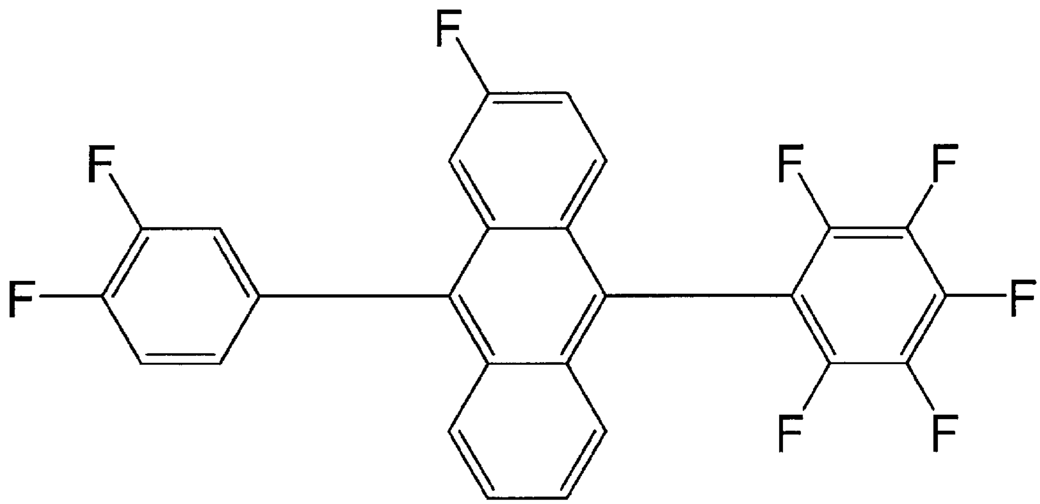
Figure 184:
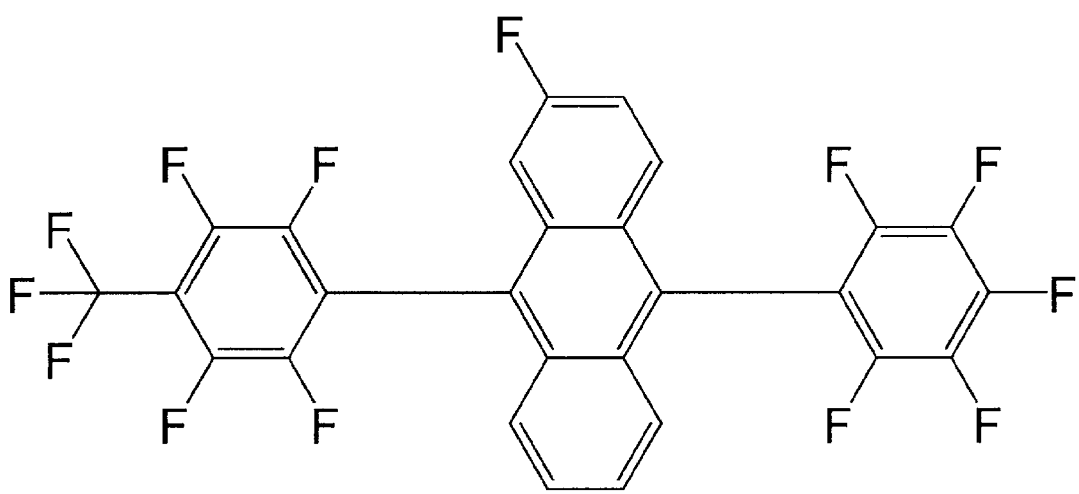
Figure 185:
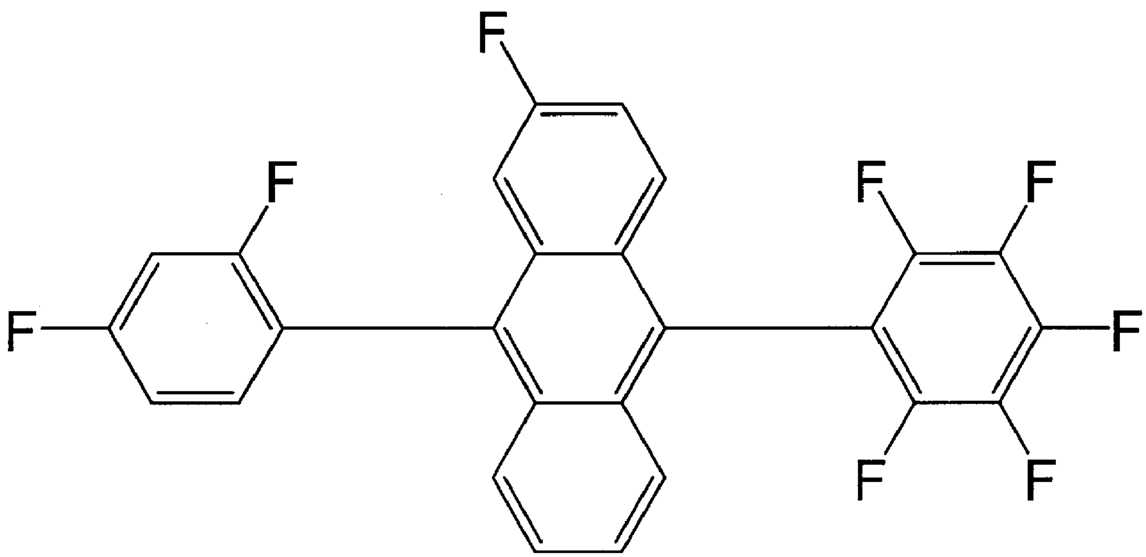
Figure 186:
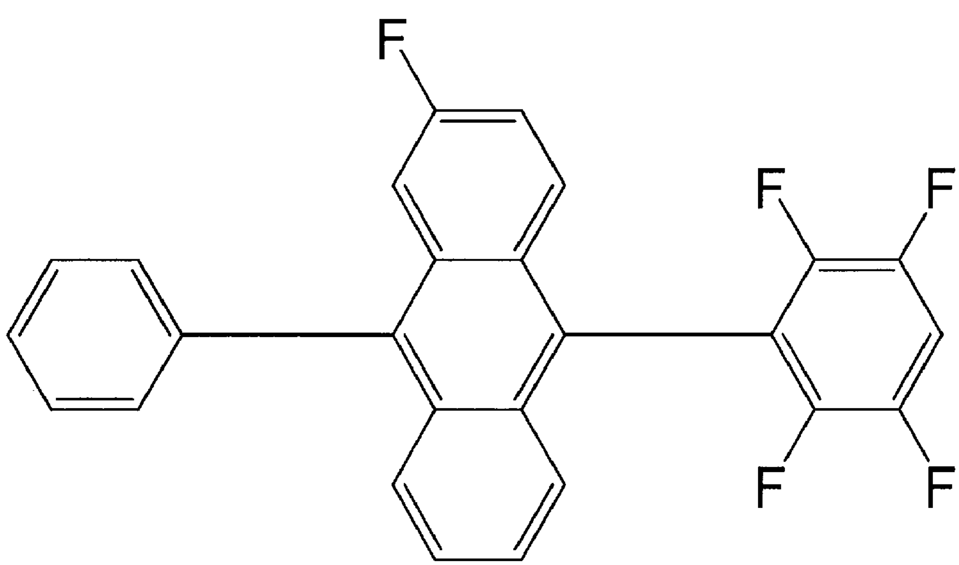
Figure 187:
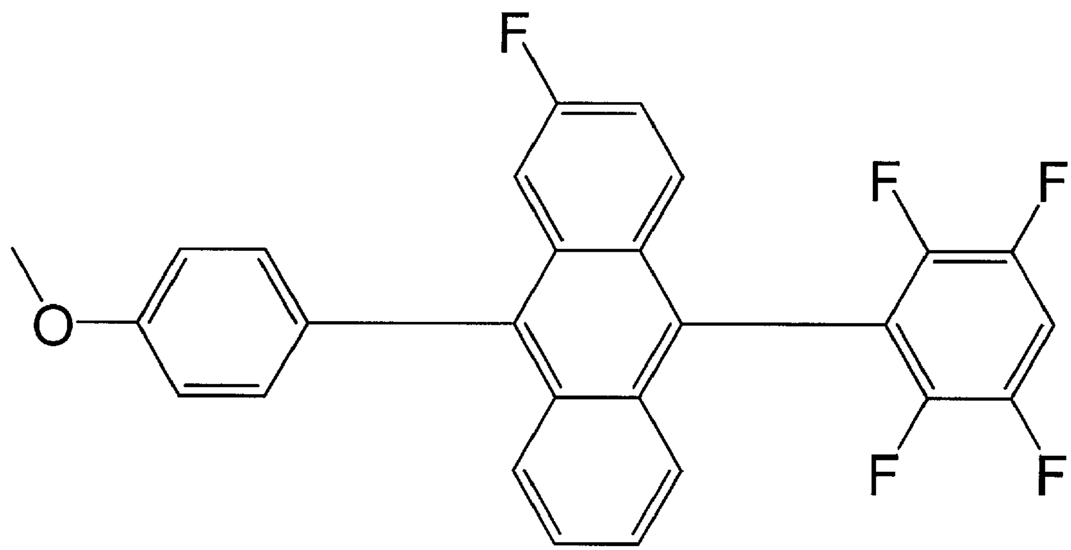
Figure 188:
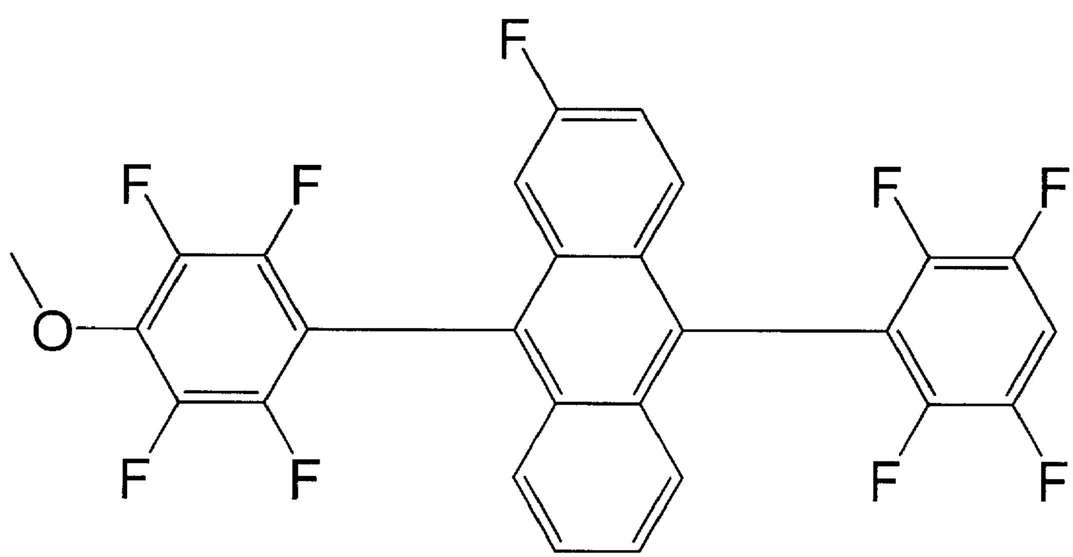
Figure 189:
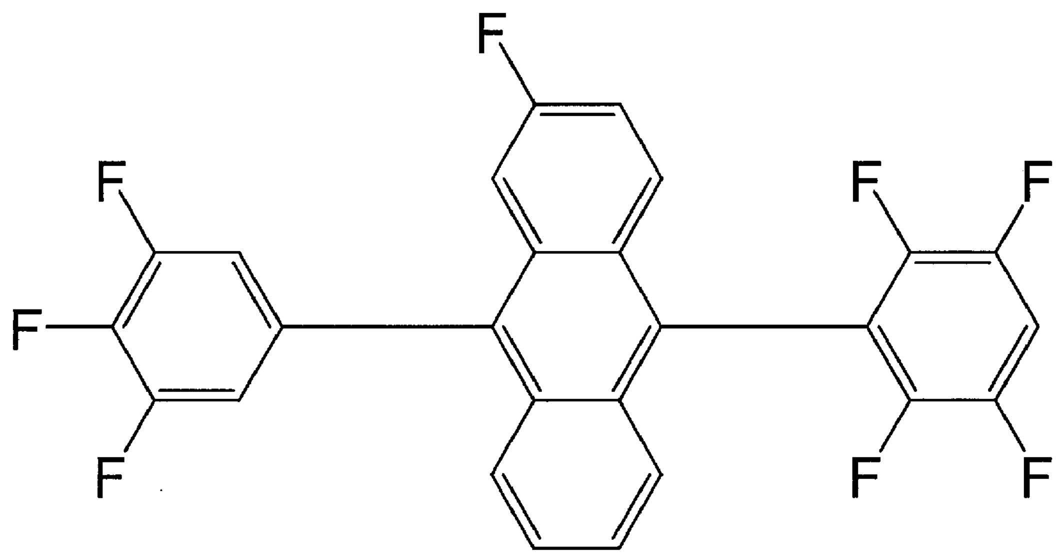
Figure 190:
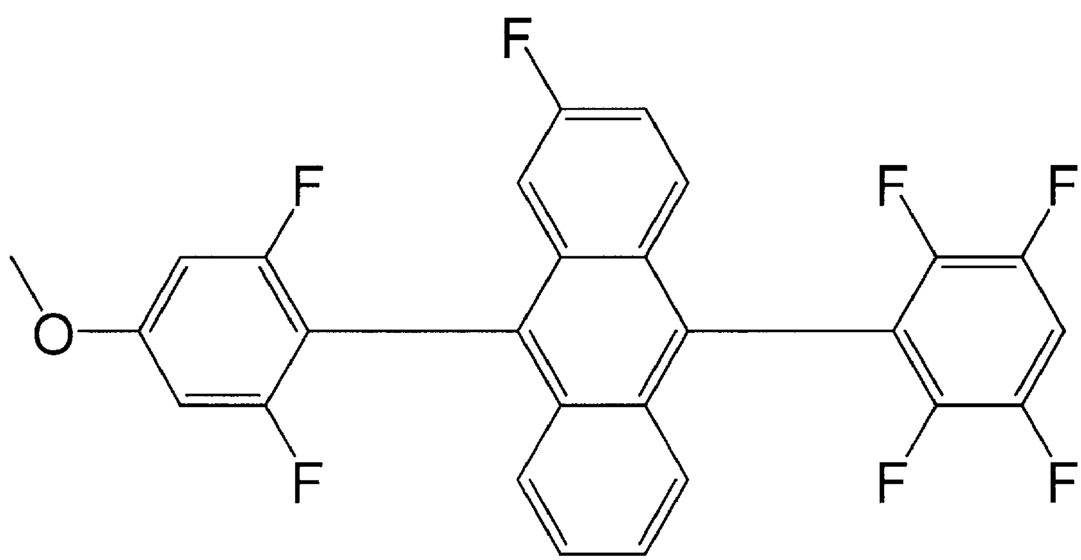
Figure 191:
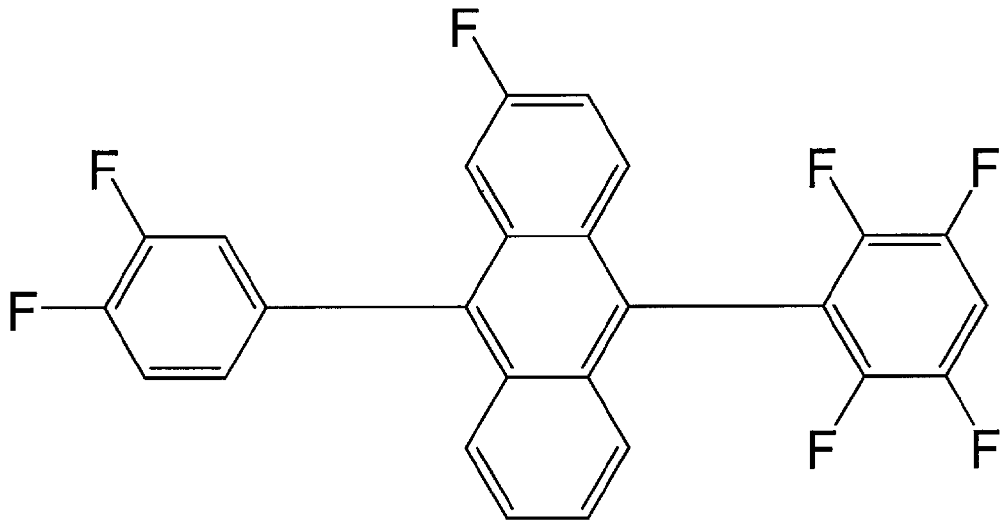
Figure 192:
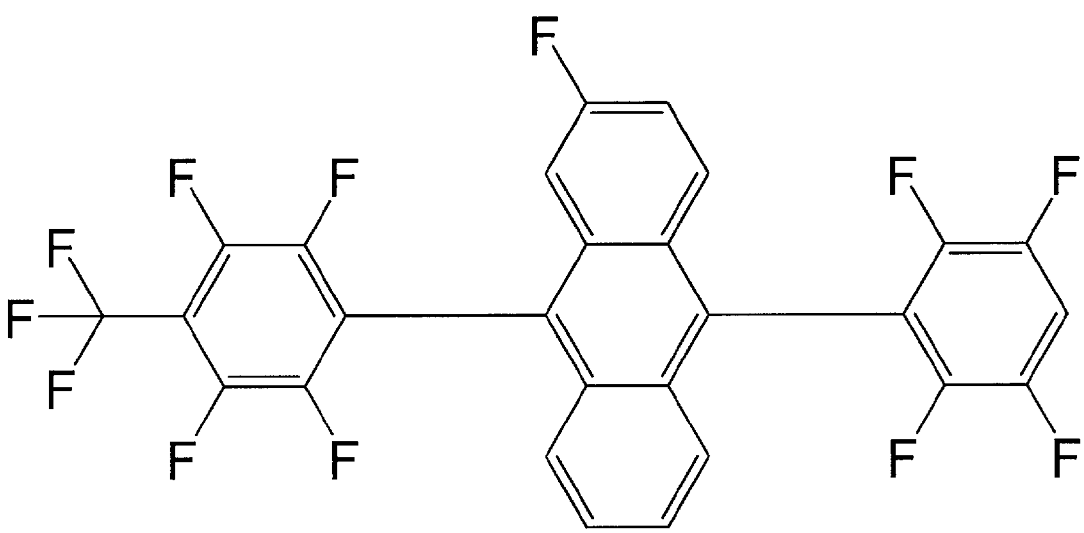
Figure 193:
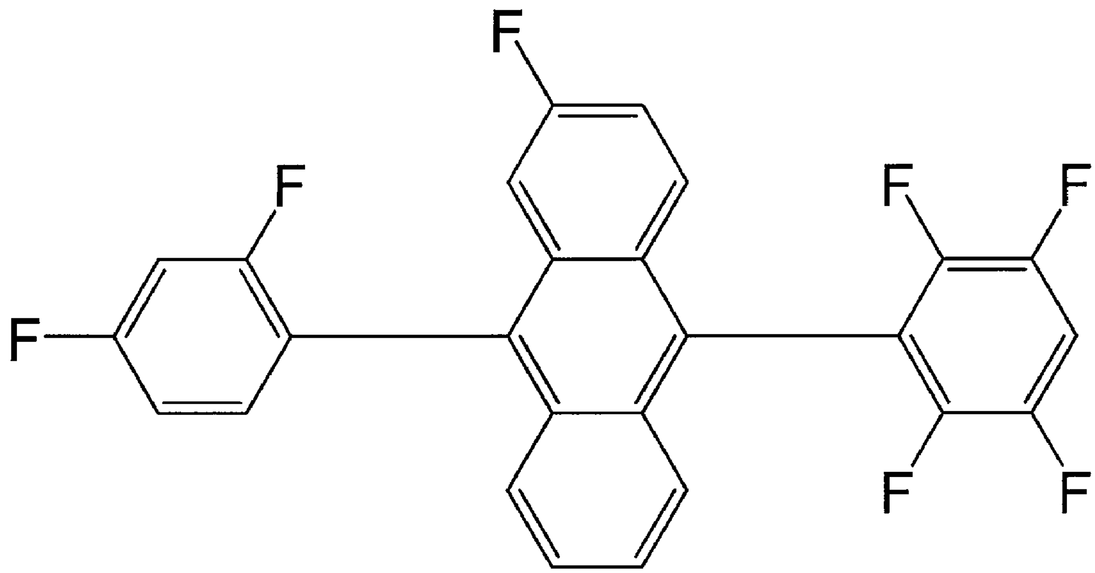
Figure 194:
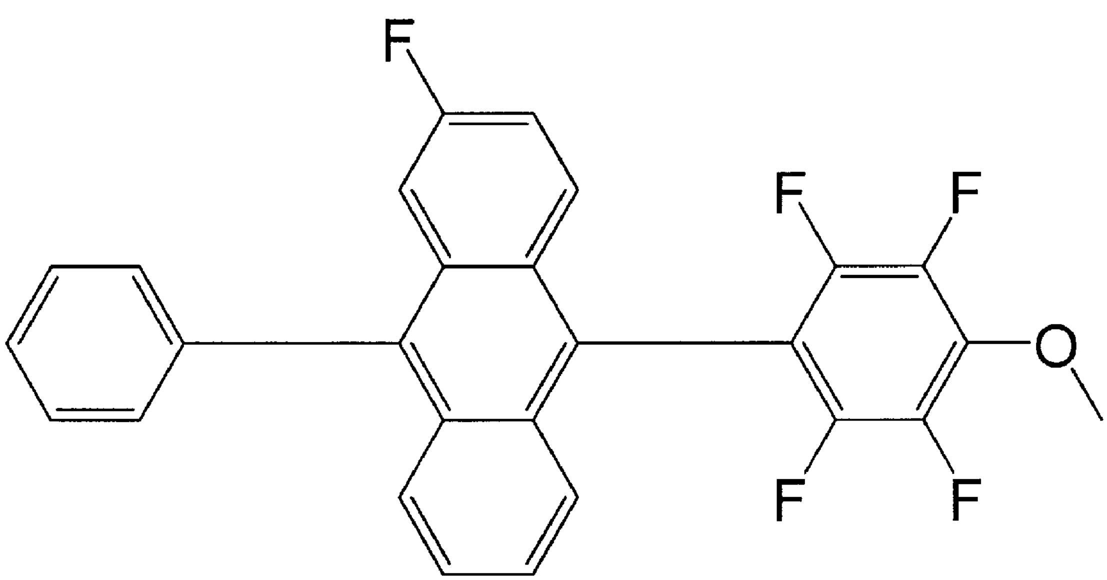
Figure 195:
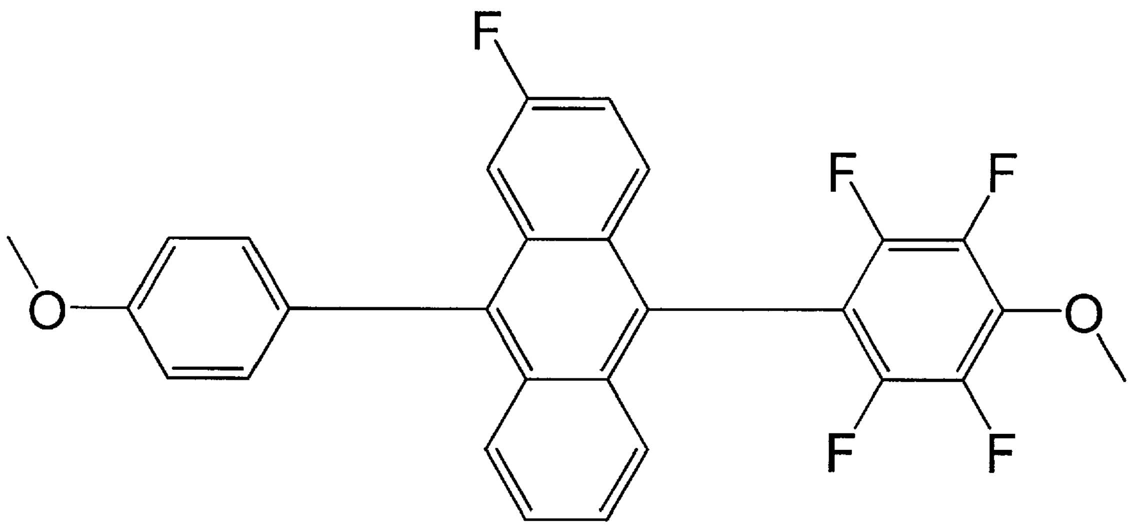
Figure 196:
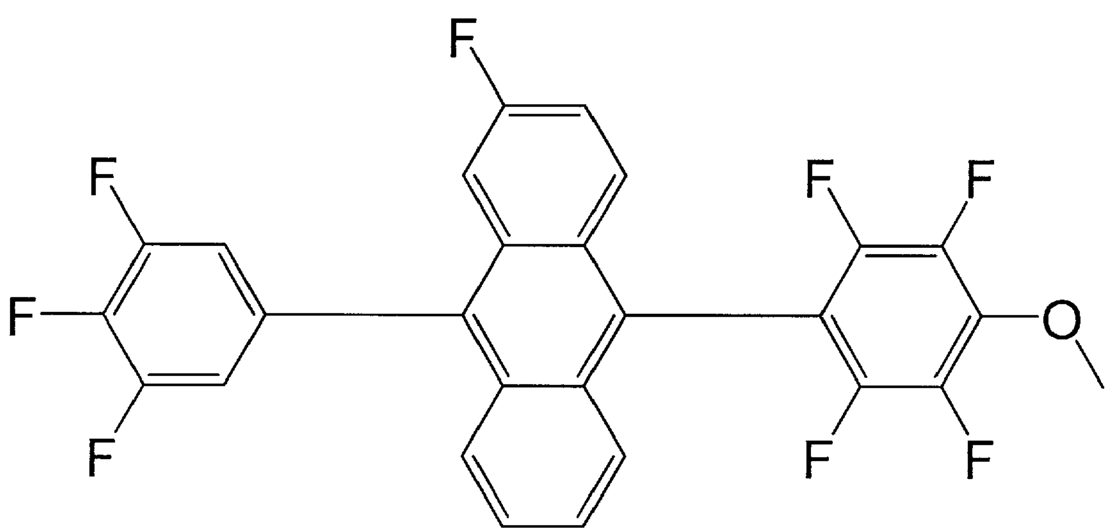
Figure 197:
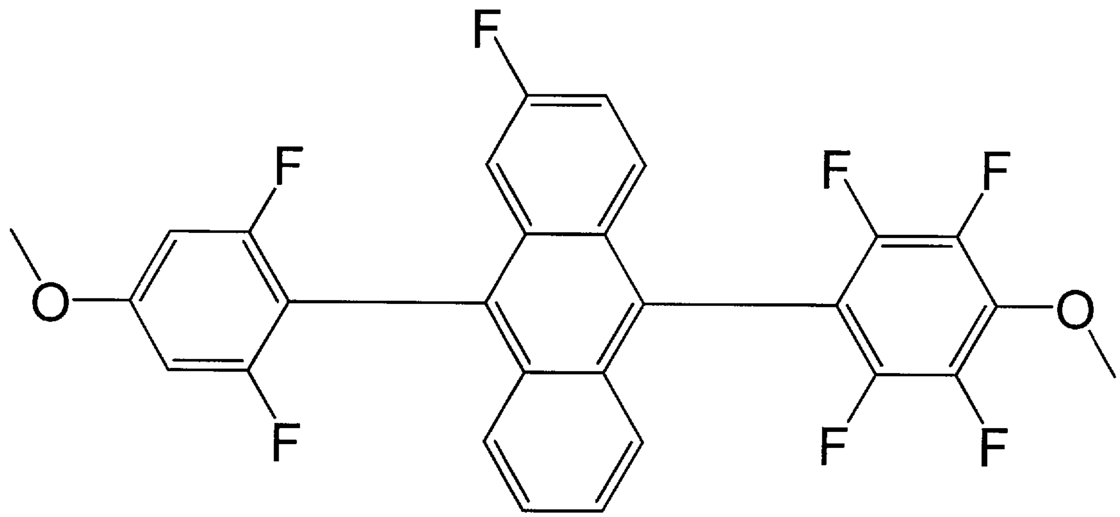
Figure 198:
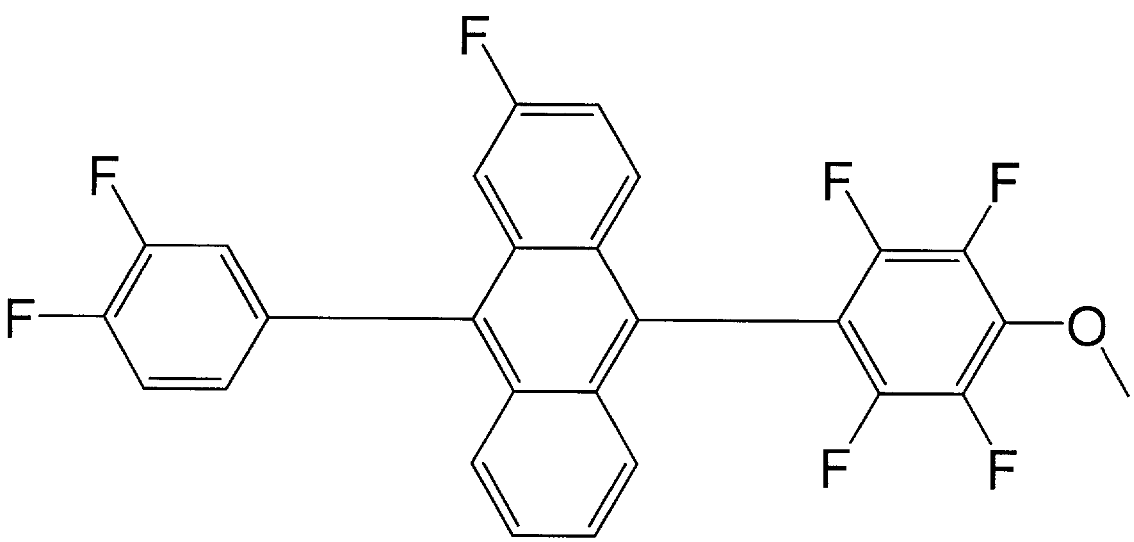
Figure 199:
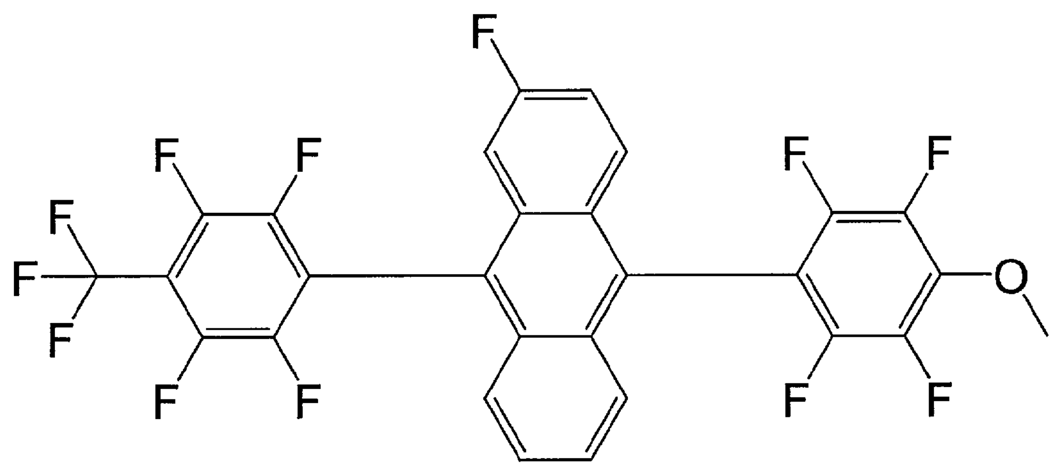
Figure 200:
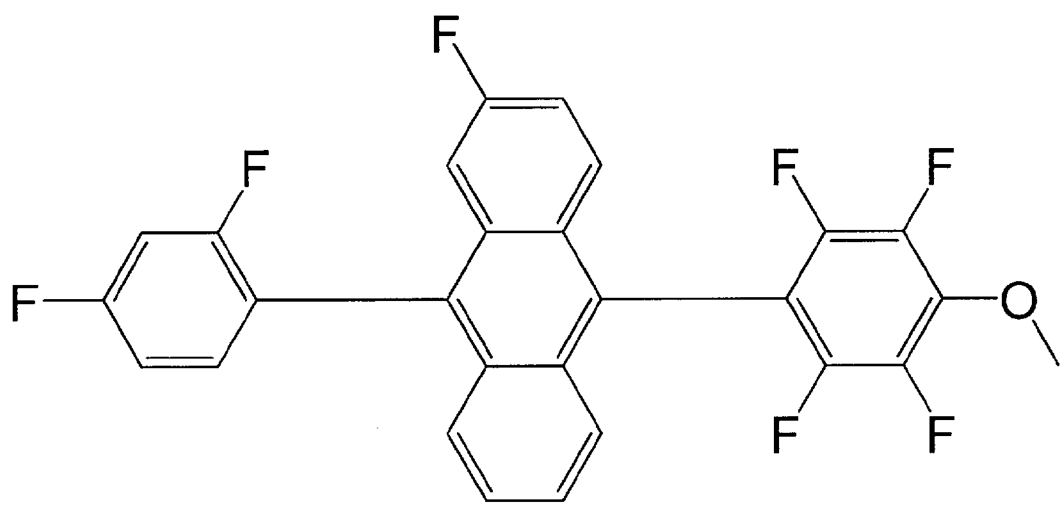
Figure 201:
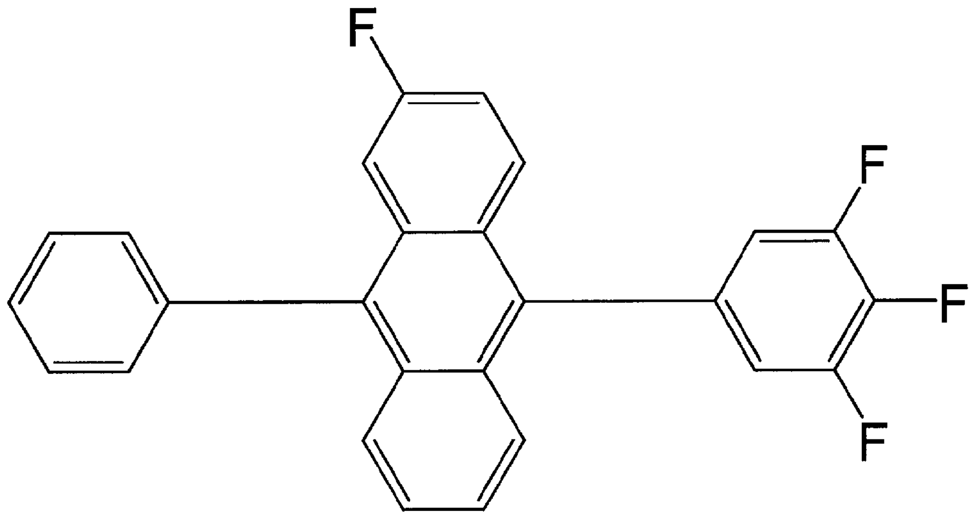
Figure 202:
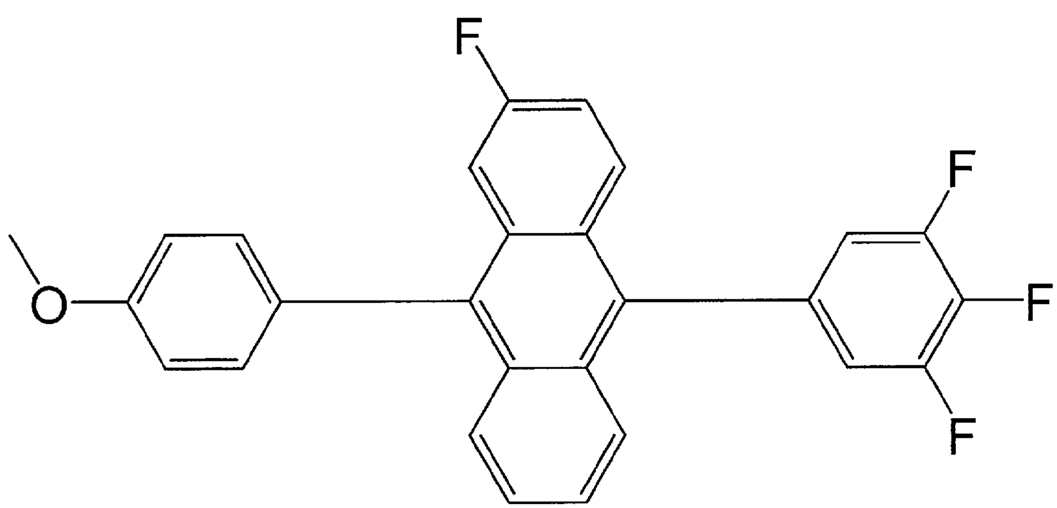
Figure 203:
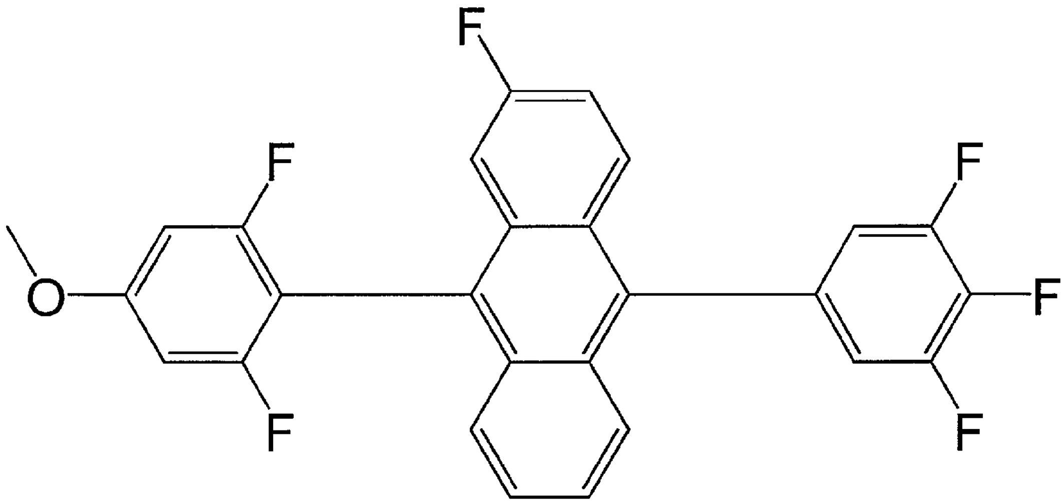
Figure 204:
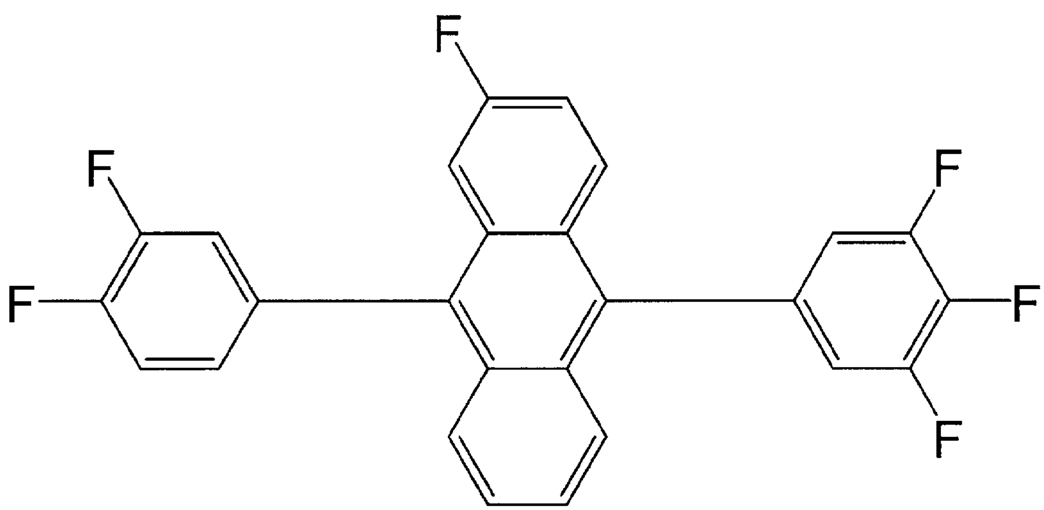
Figure 205:
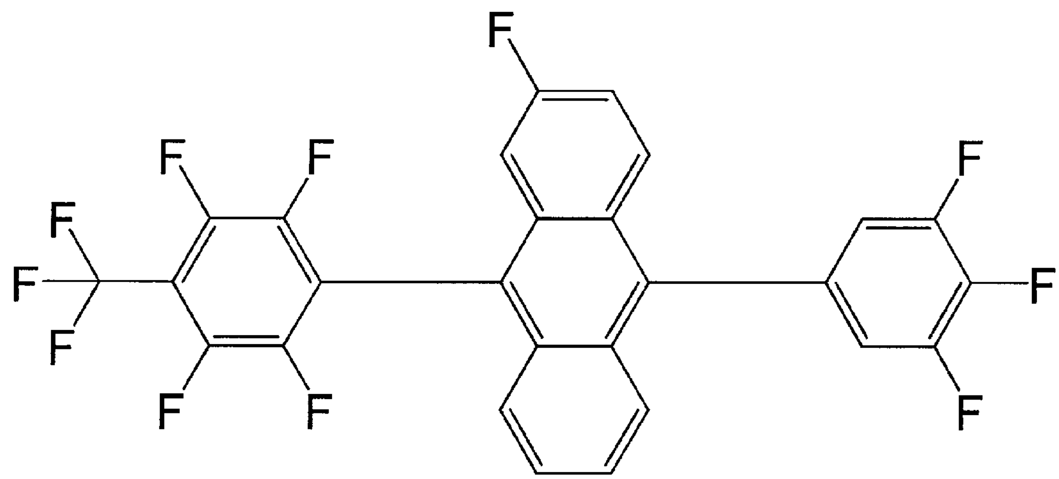
Figure 206:
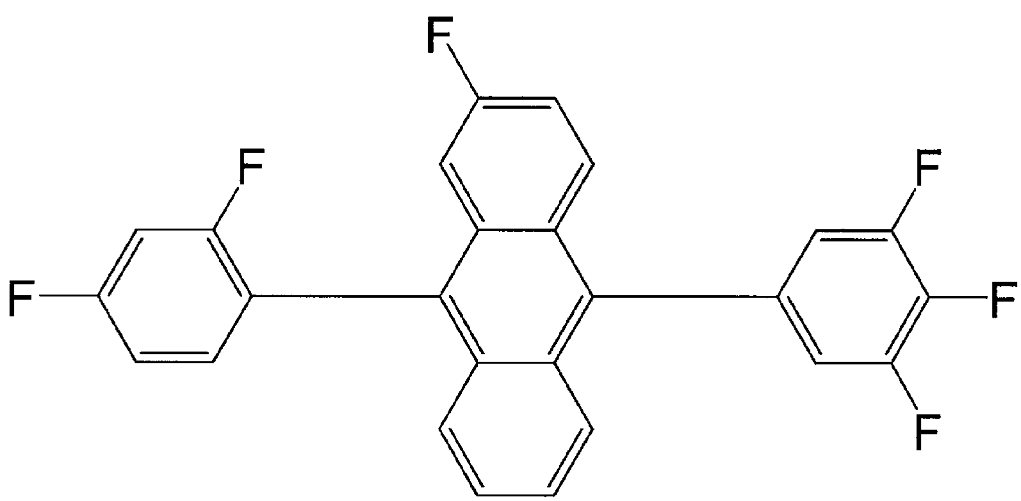
Figure 207:
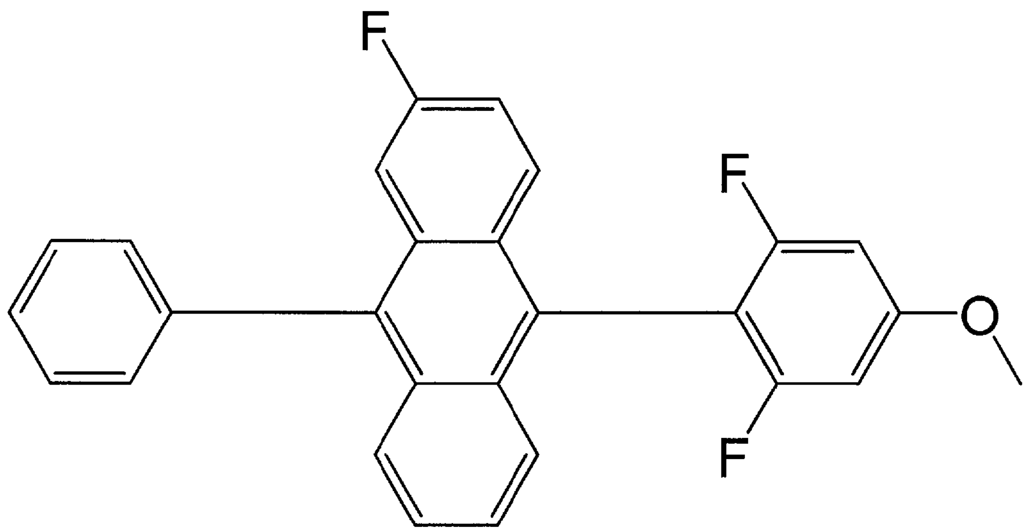
Figure 208:
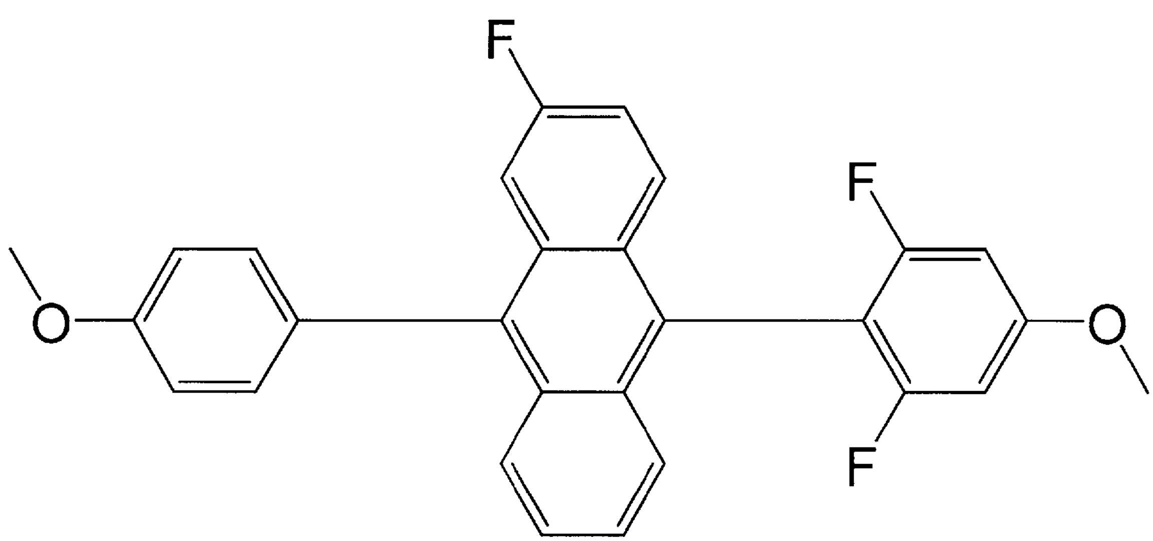
Figure 209:
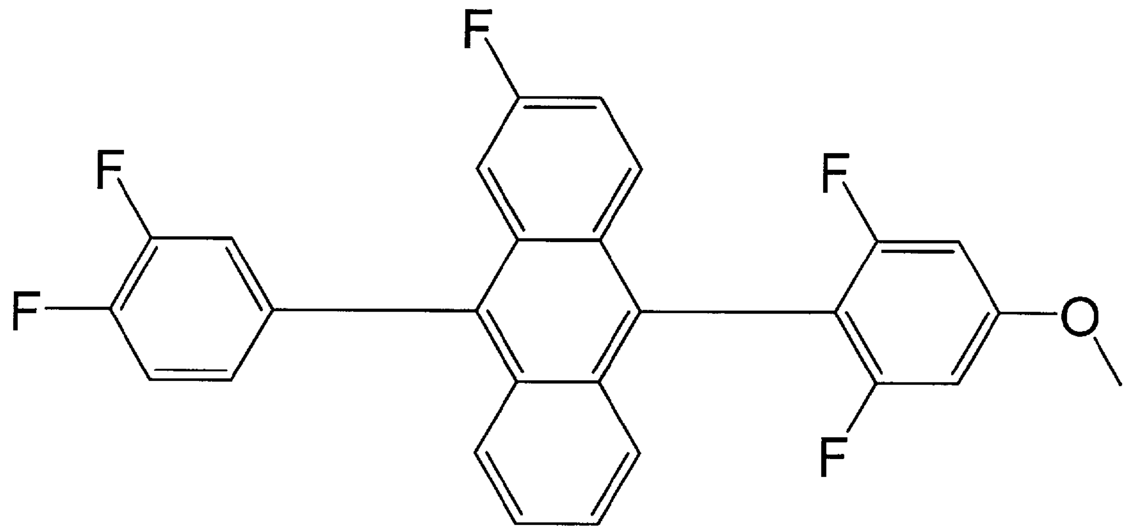
Figure 210:
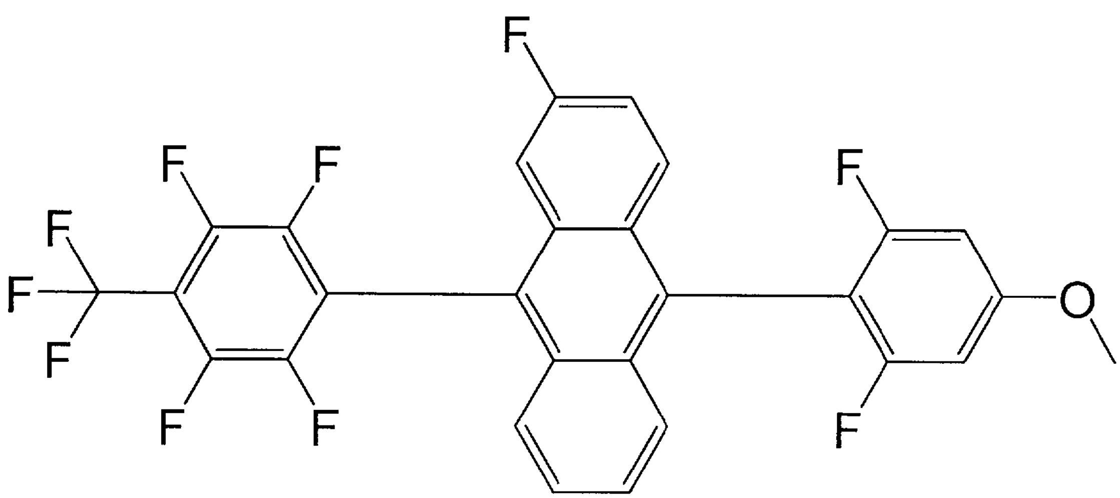
Figure 211:
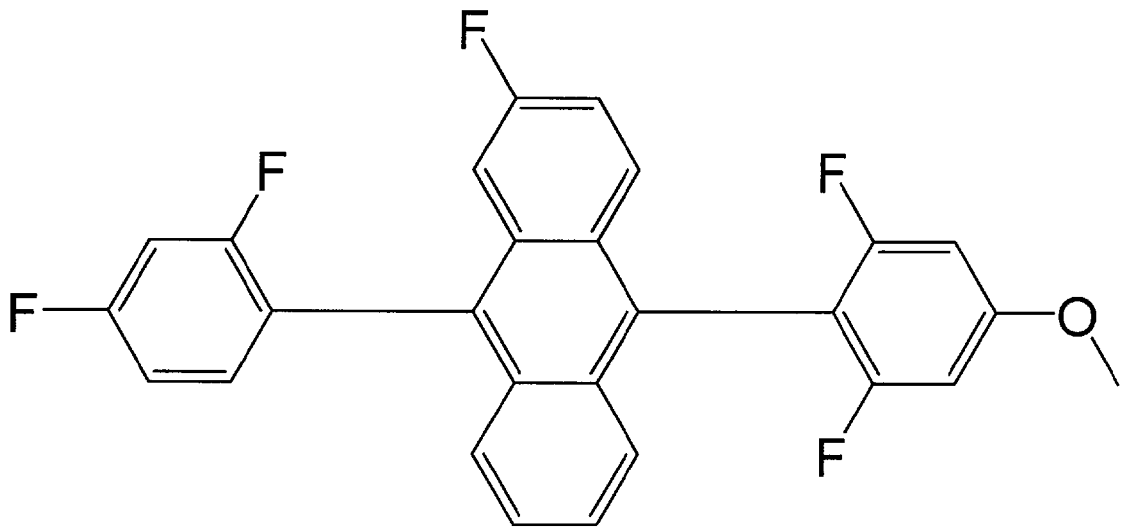
Figure 212:
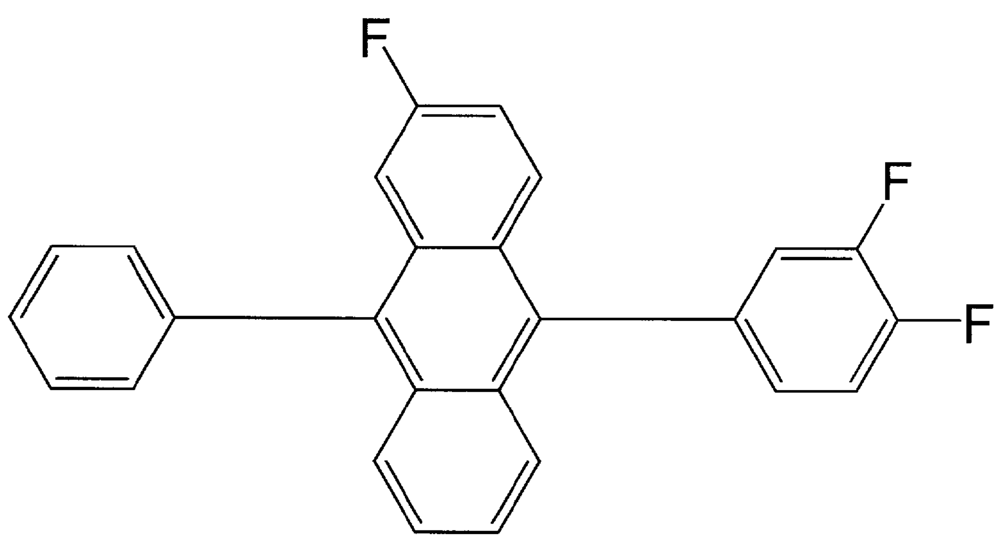
Figure 213:
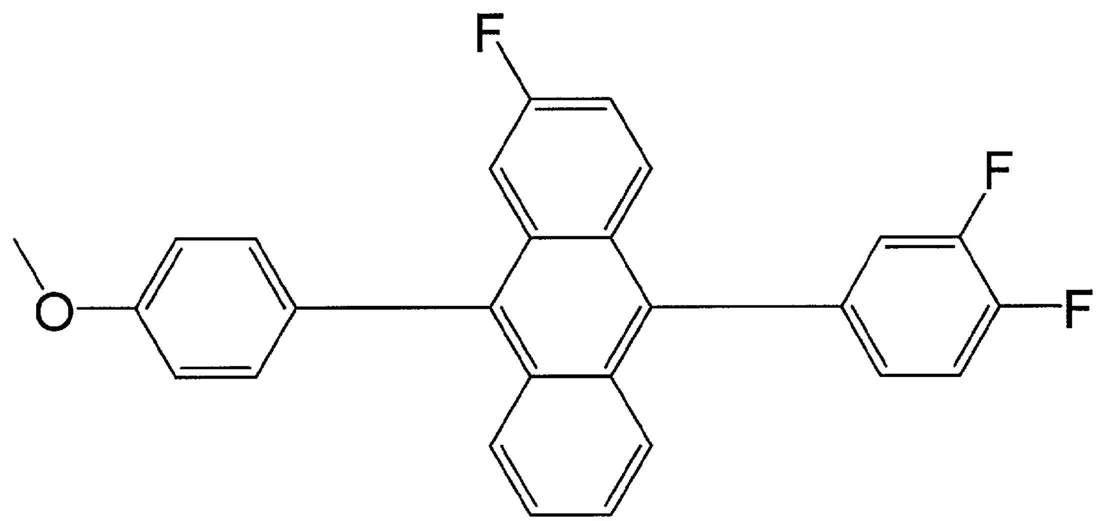
Figure 214:
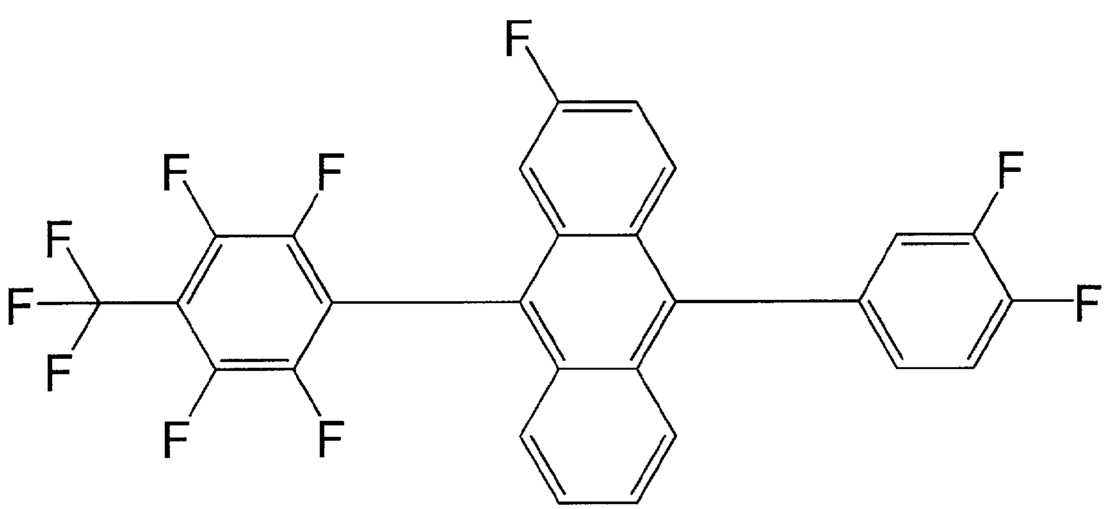
Figure 215:
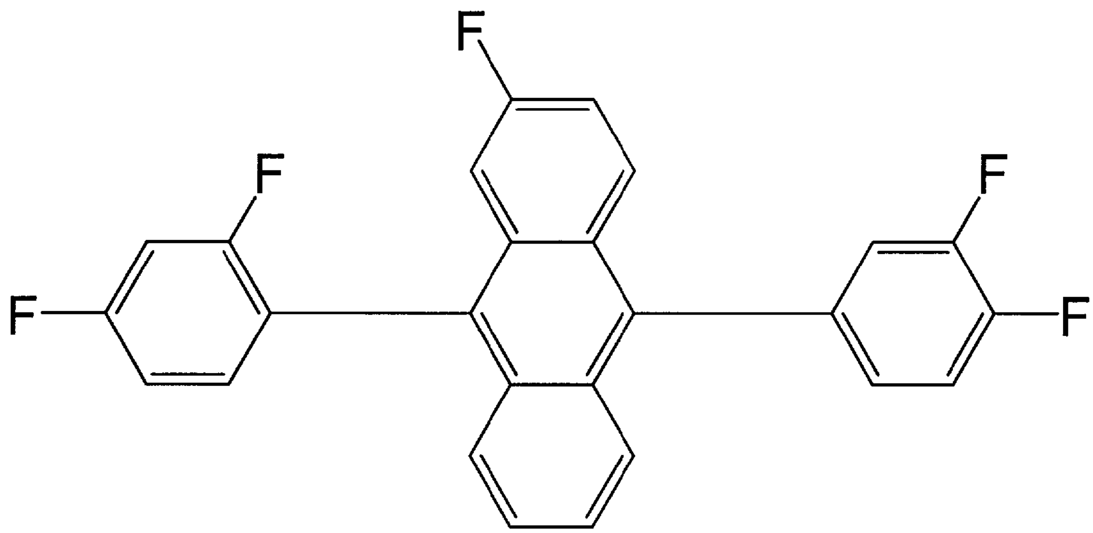
Figure 216:
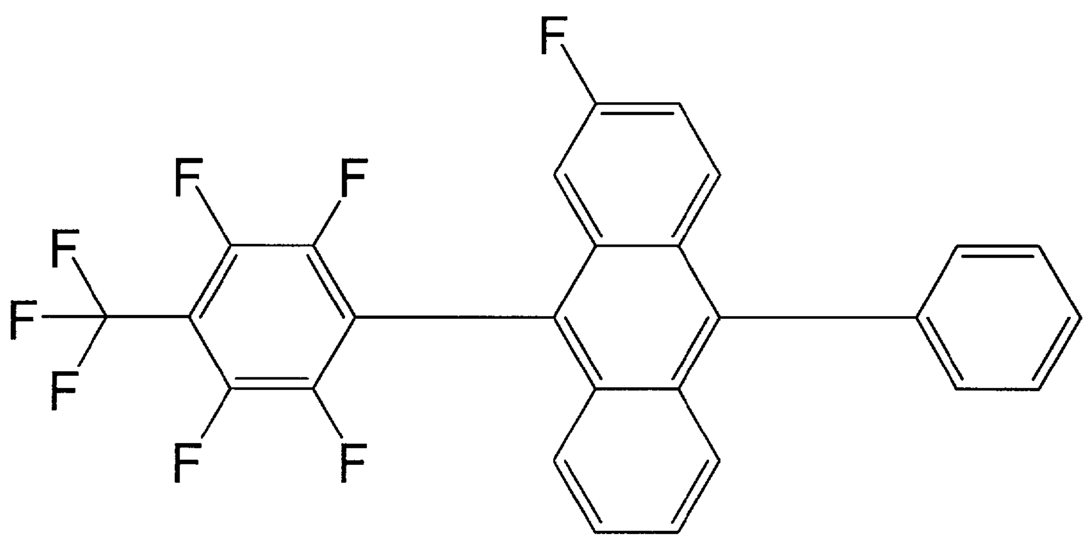
Figure 217:
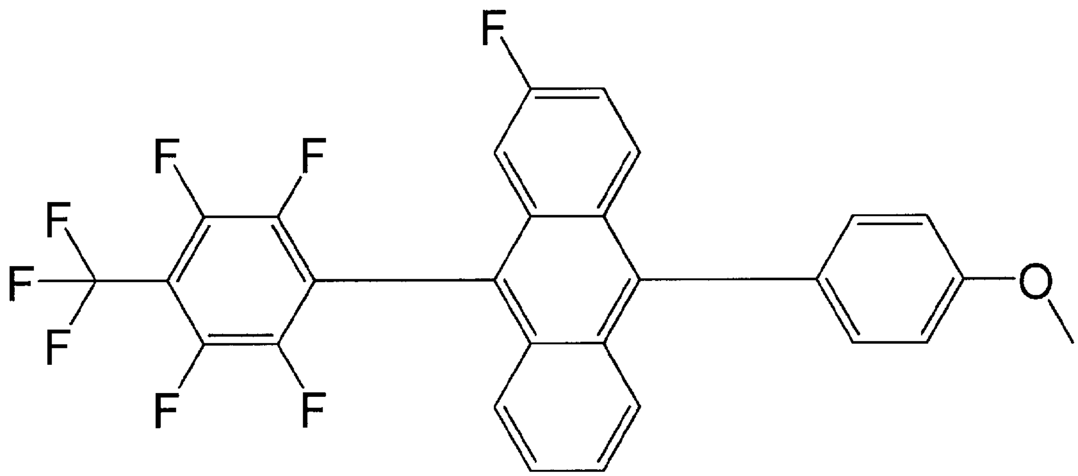
Figure 218:
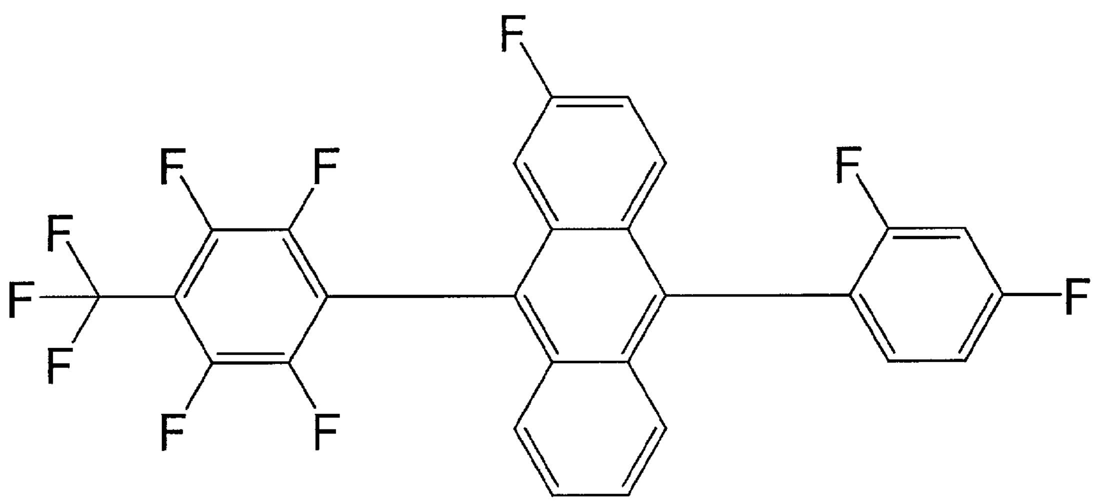
Figure 219:
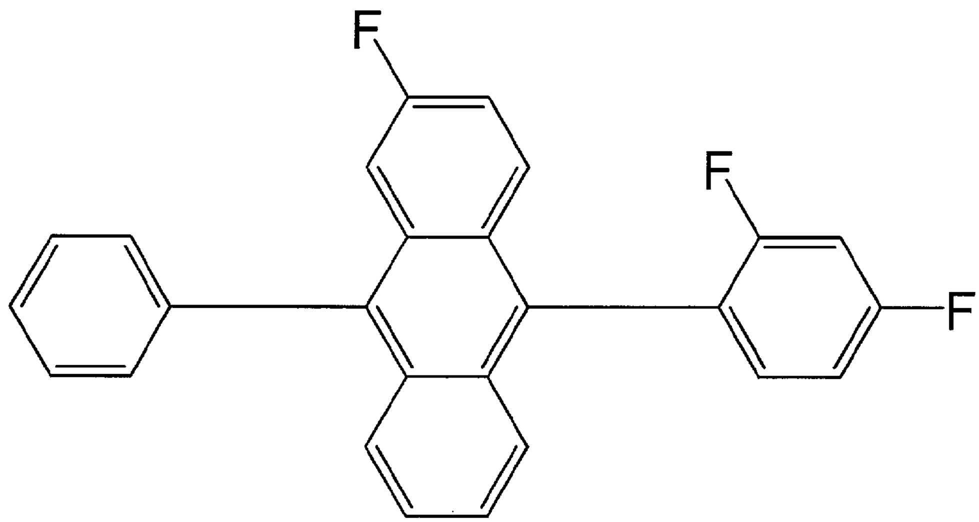
Figure 220:
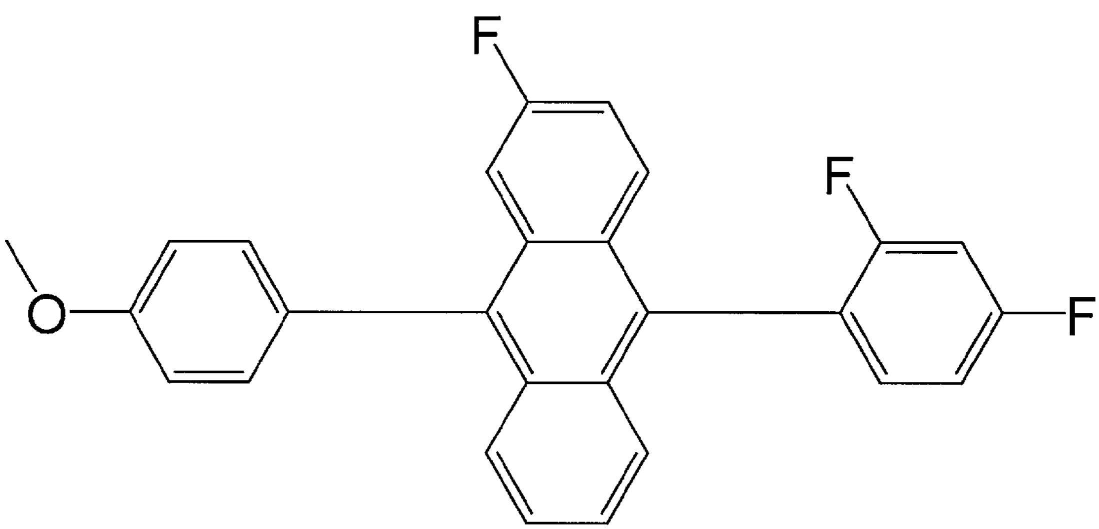
Figure 221:
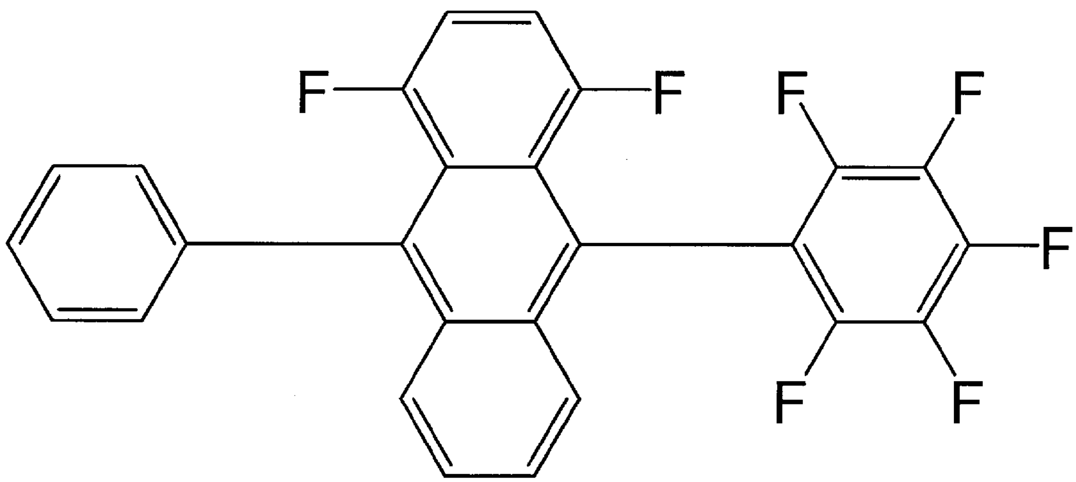
Figure 222:
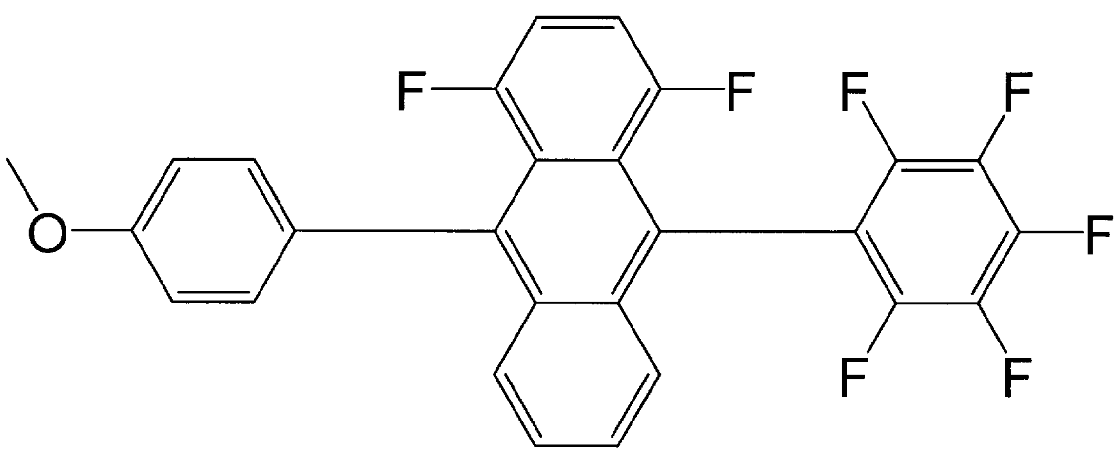
Figure 223:
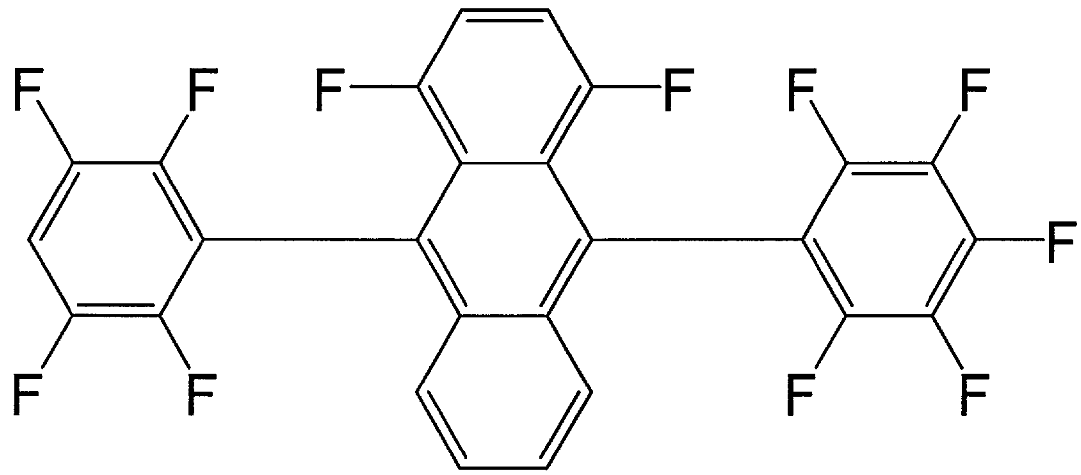
Figure 224:
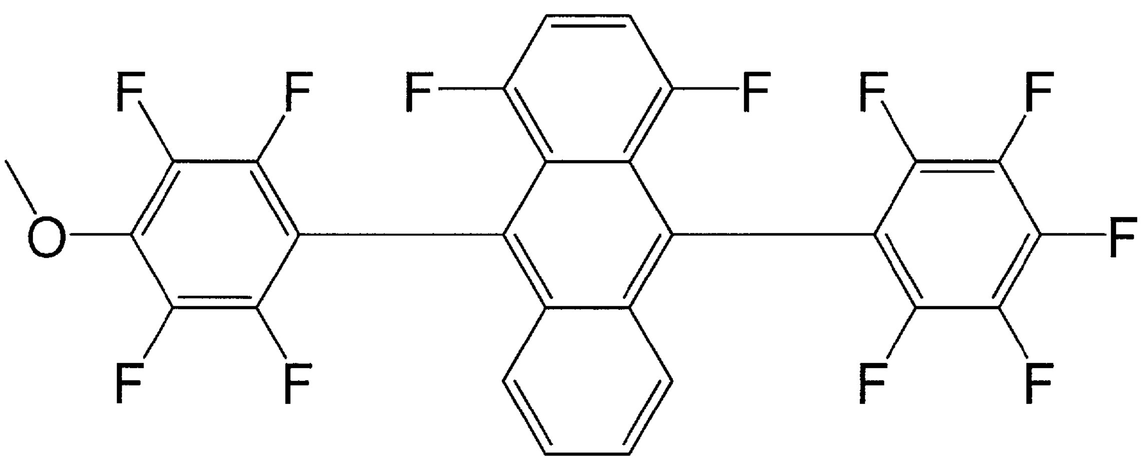
Figure 225:
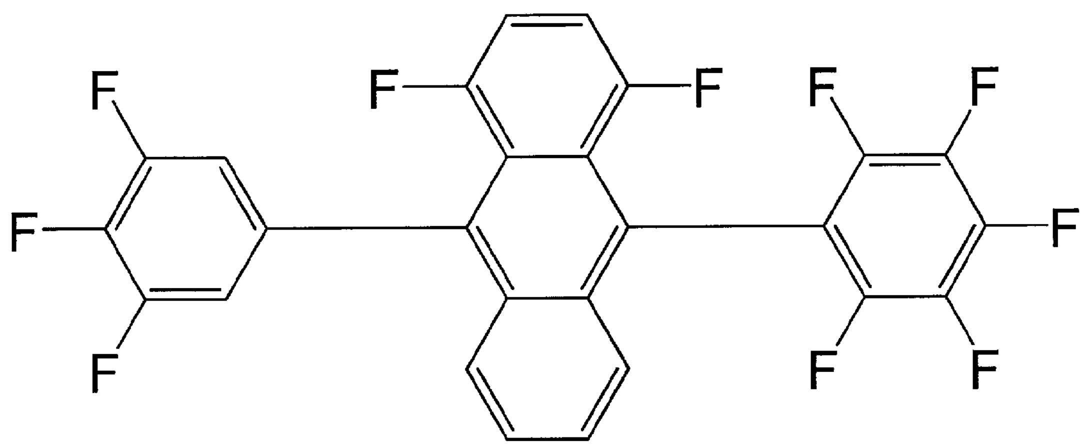
Figure 226:
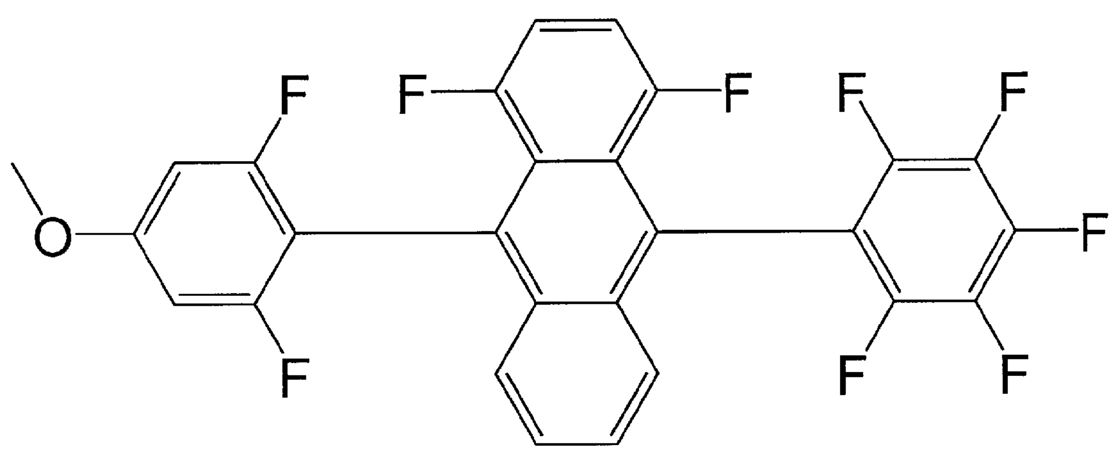
Figure 227:
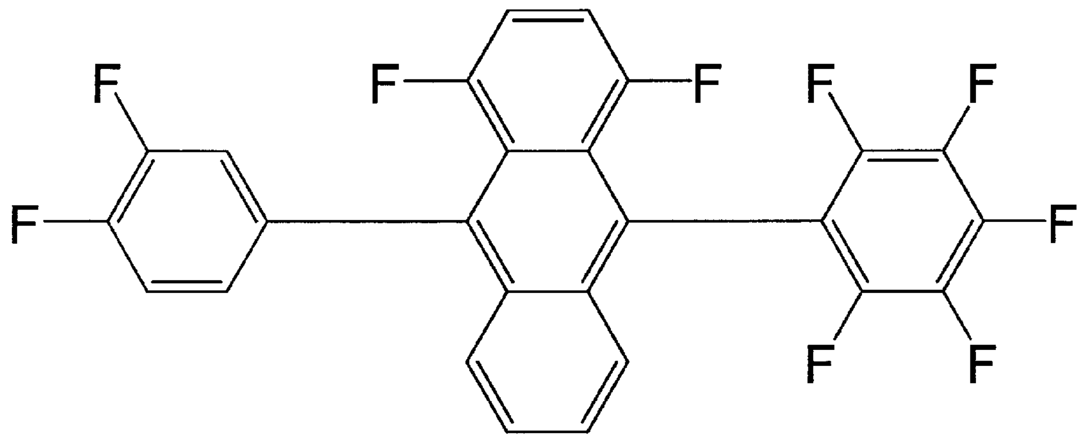
Figure 228:
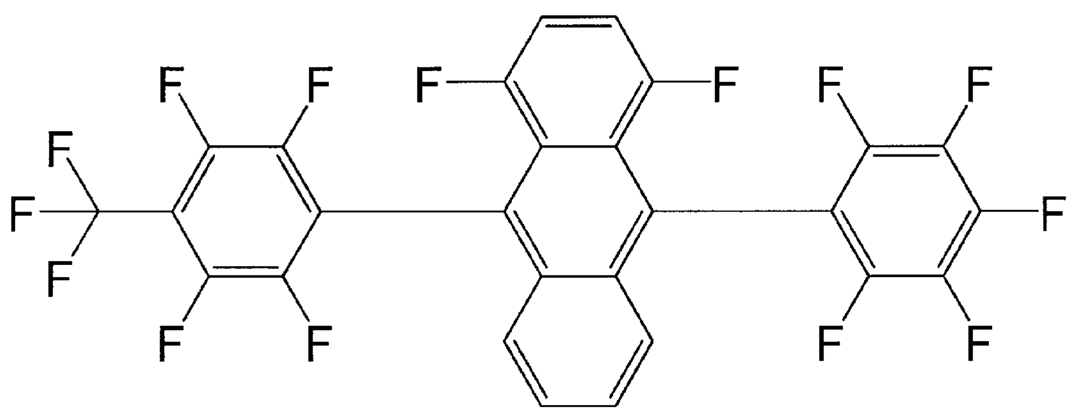
Figure 229:
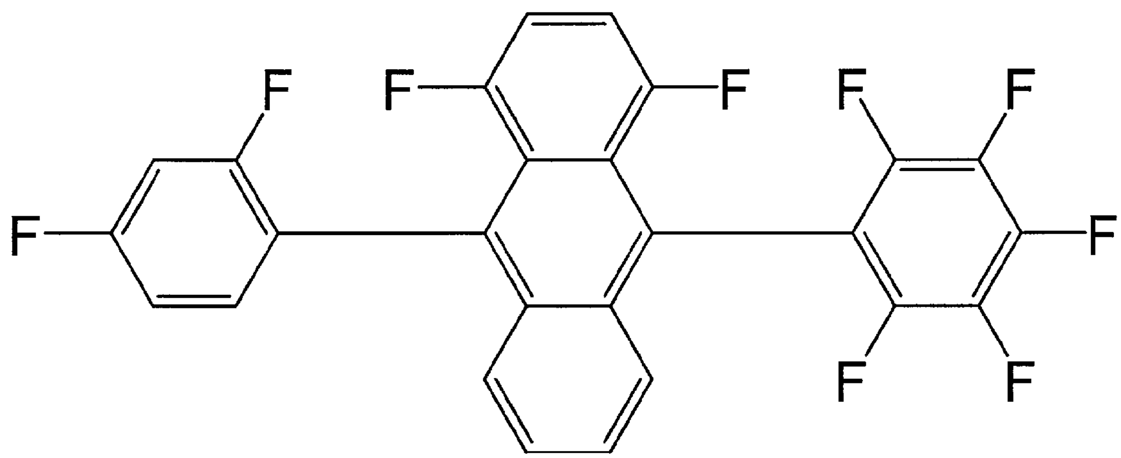
Figure 230:
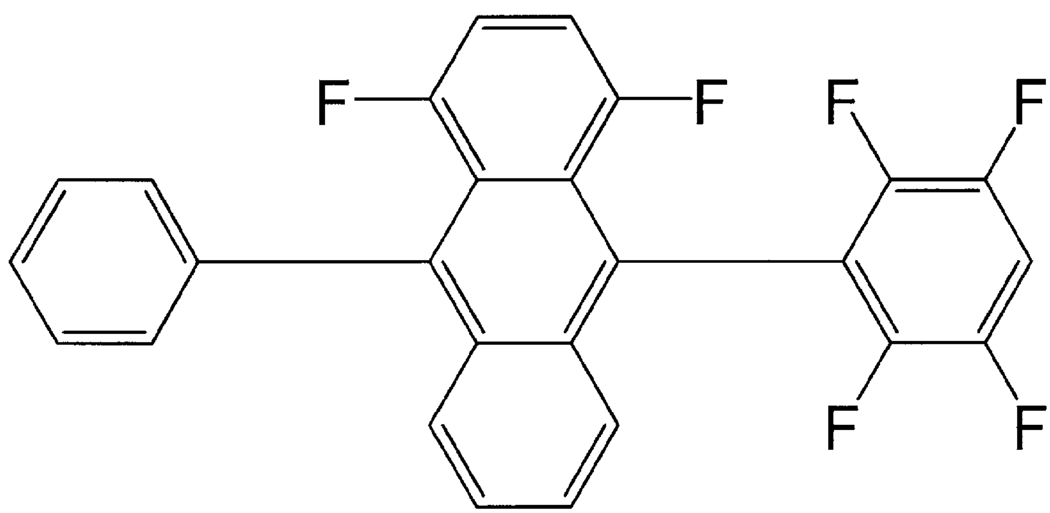
Figure 231:
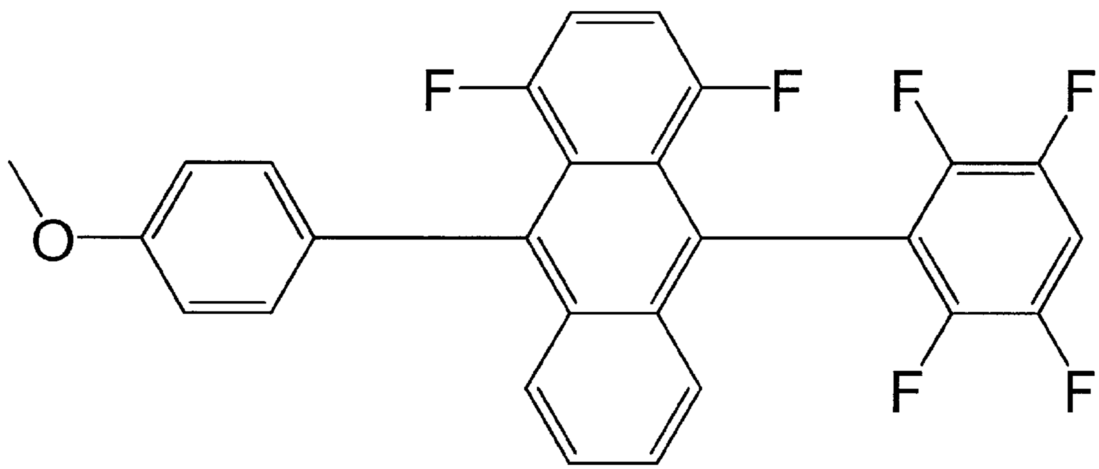
Figure 232:
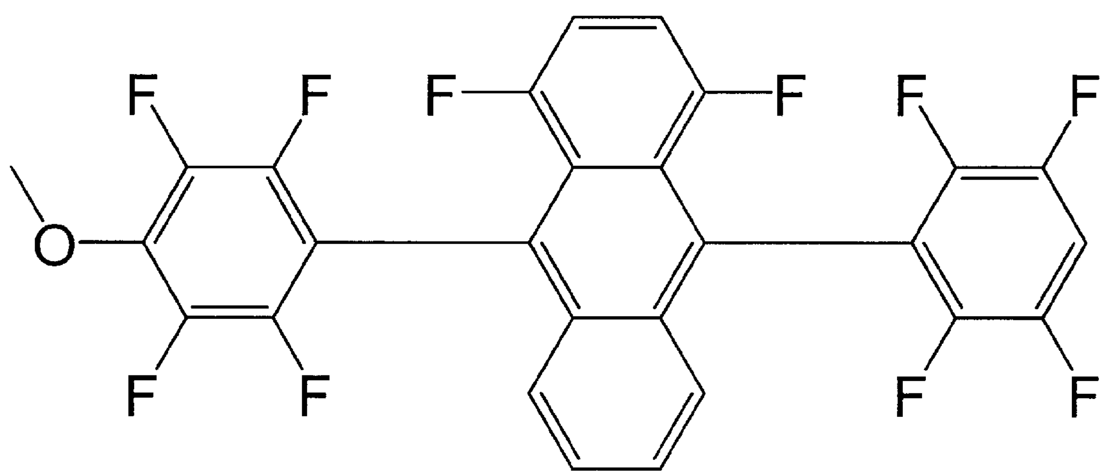
Figure 233:
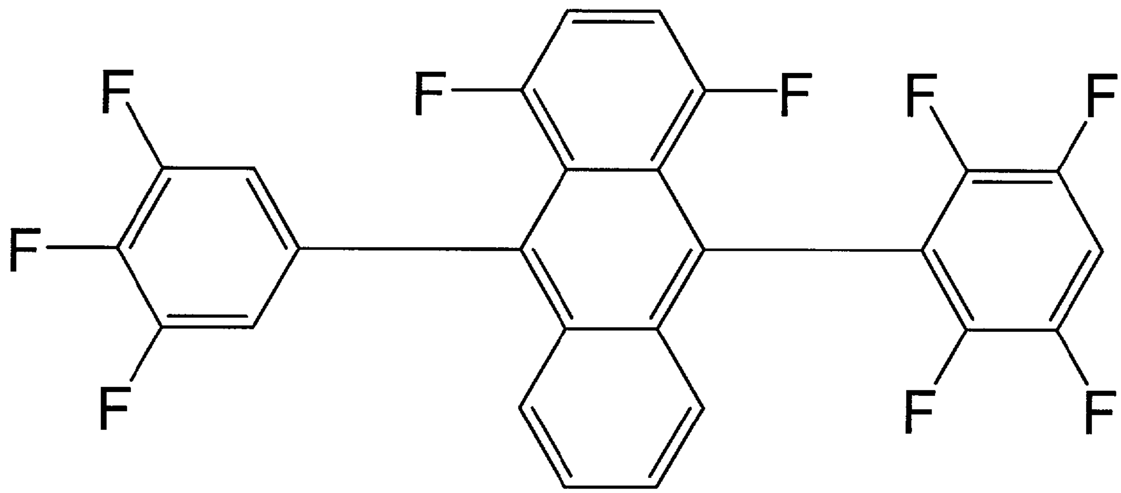
Figure 234:
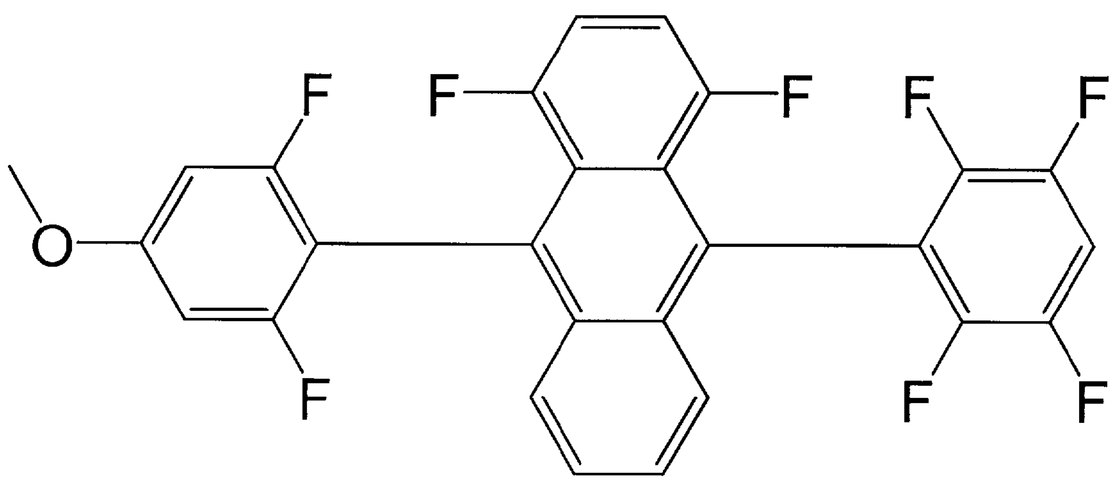
Figure 235:
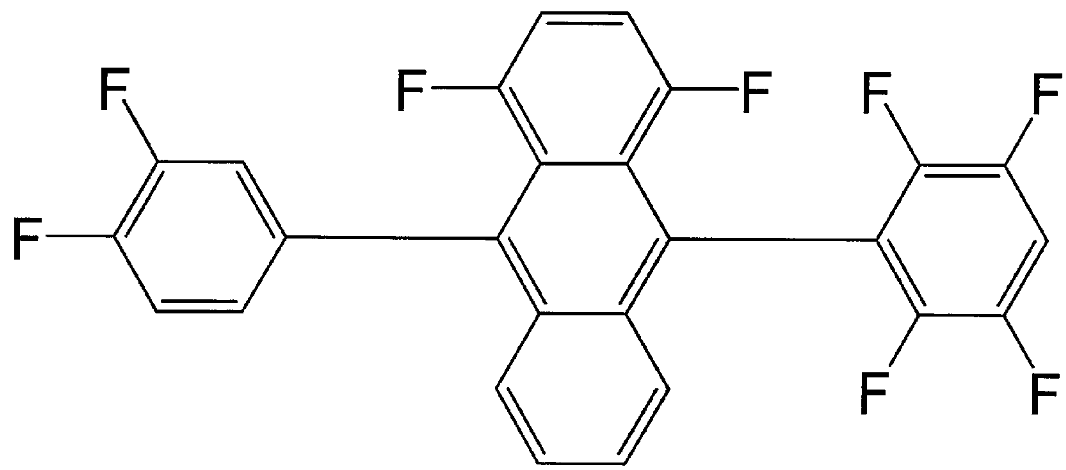
Figure 236:
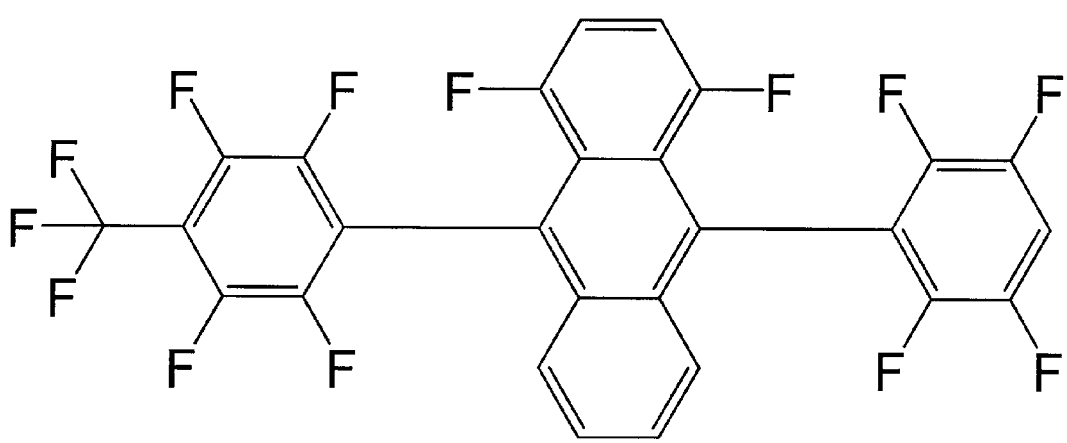
Figure 237:
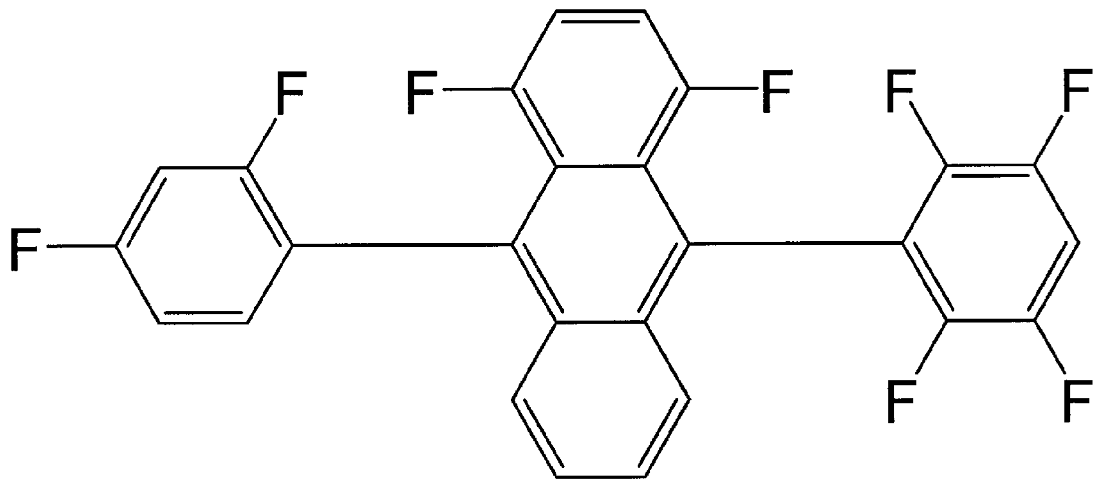
Figure 238:
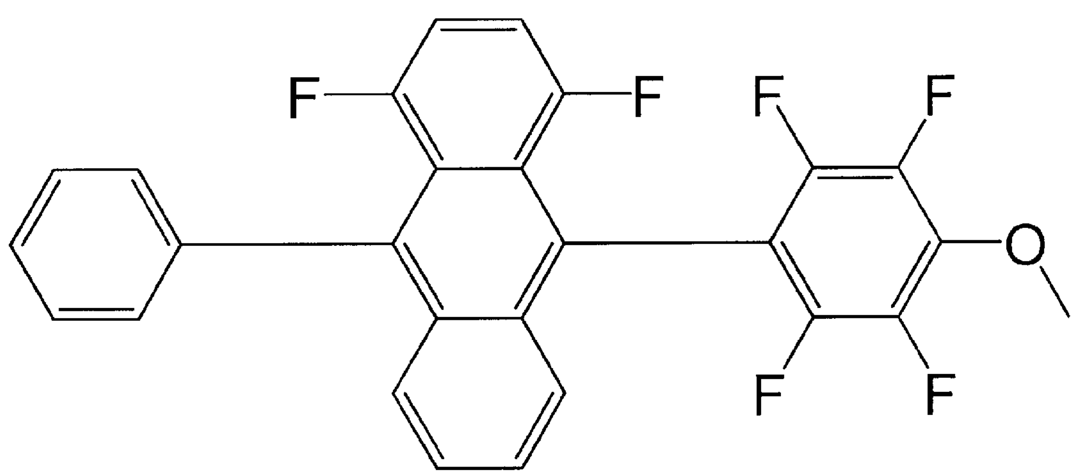
Figure 239:
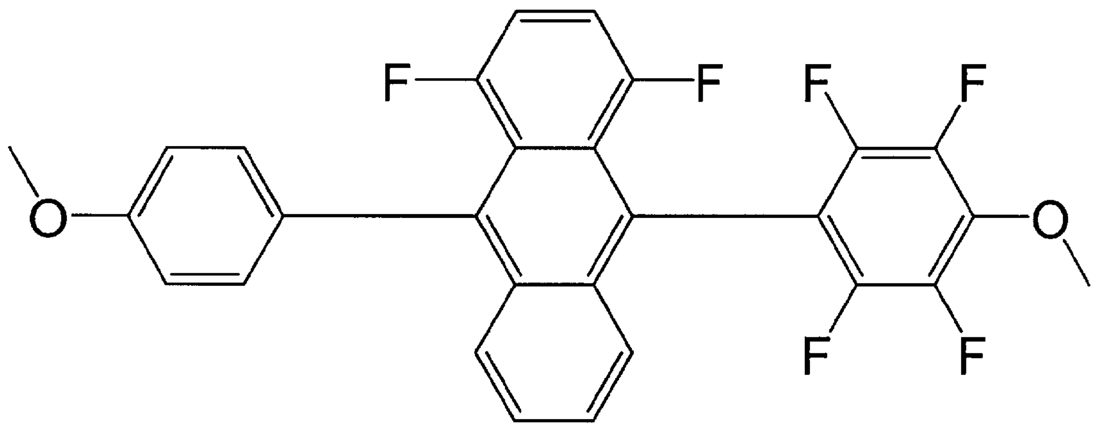
Figure 240:
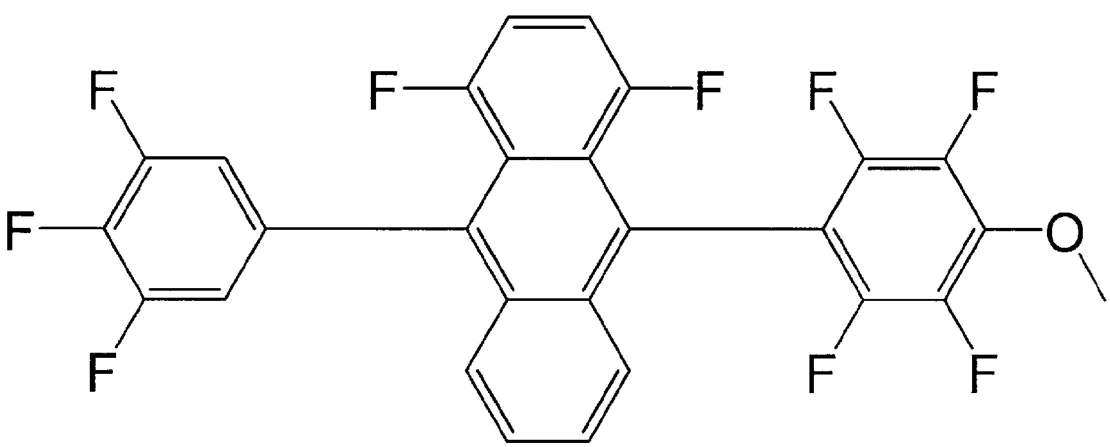
Figure 241:
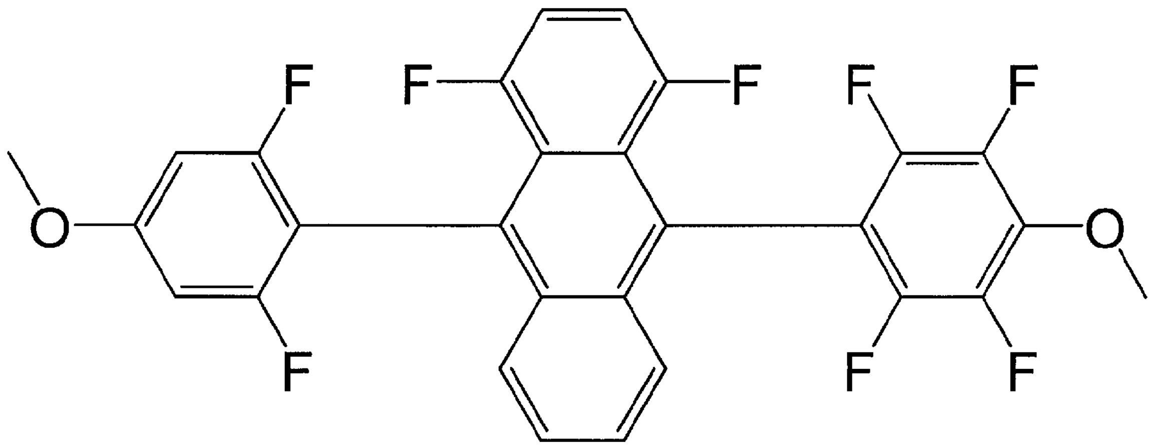
Figure 242:
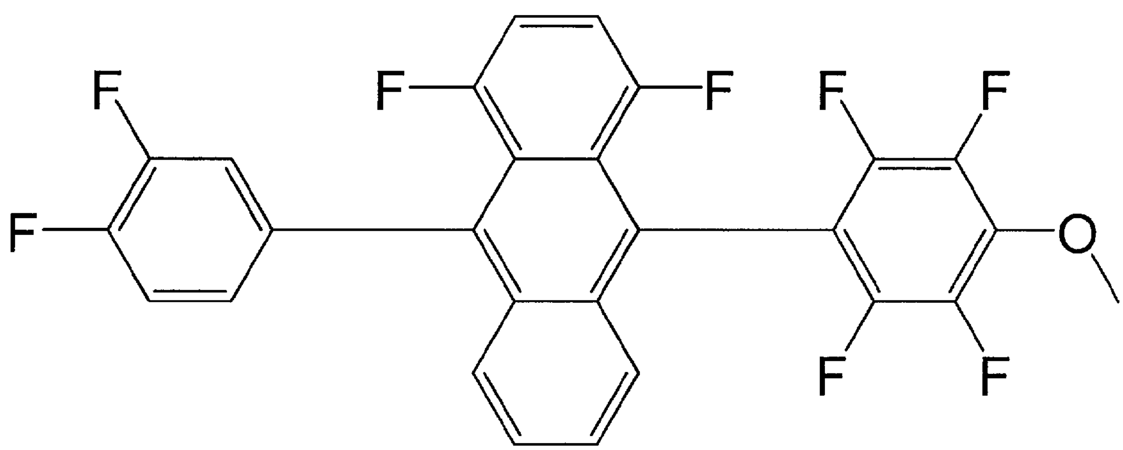
Figure 243:
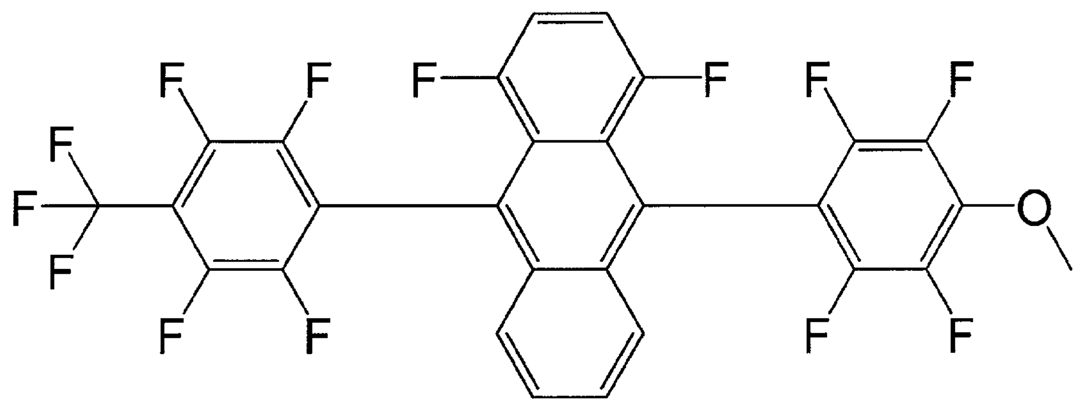
Figure 244:
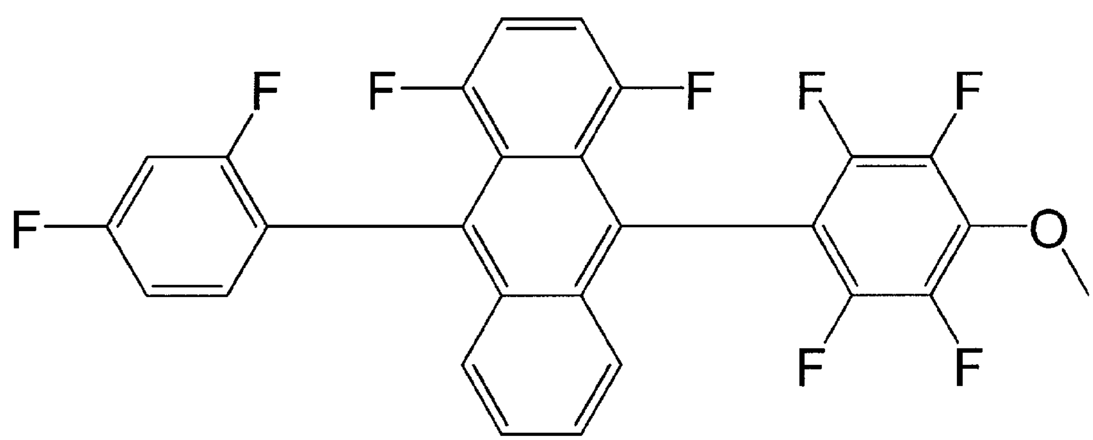
Figure 245:
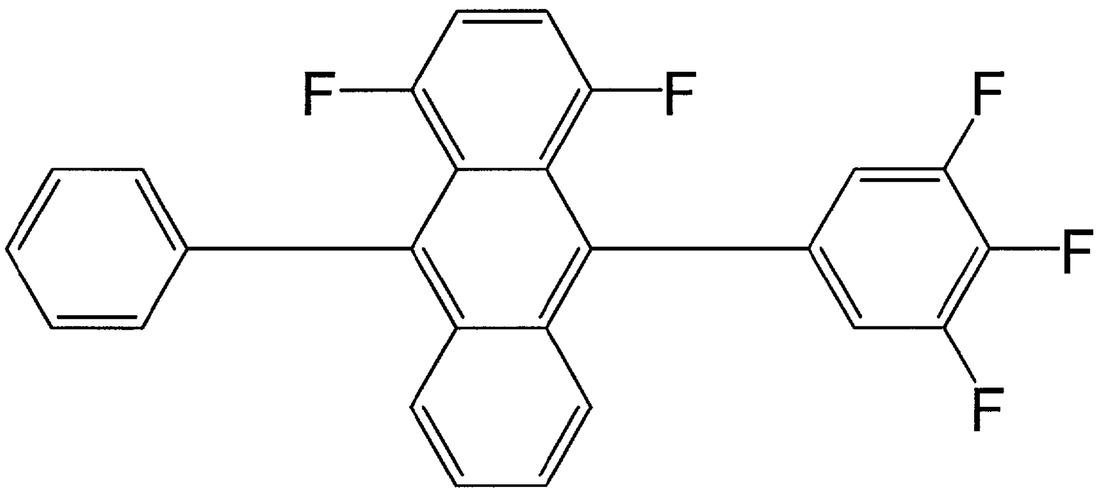
Figure 246:
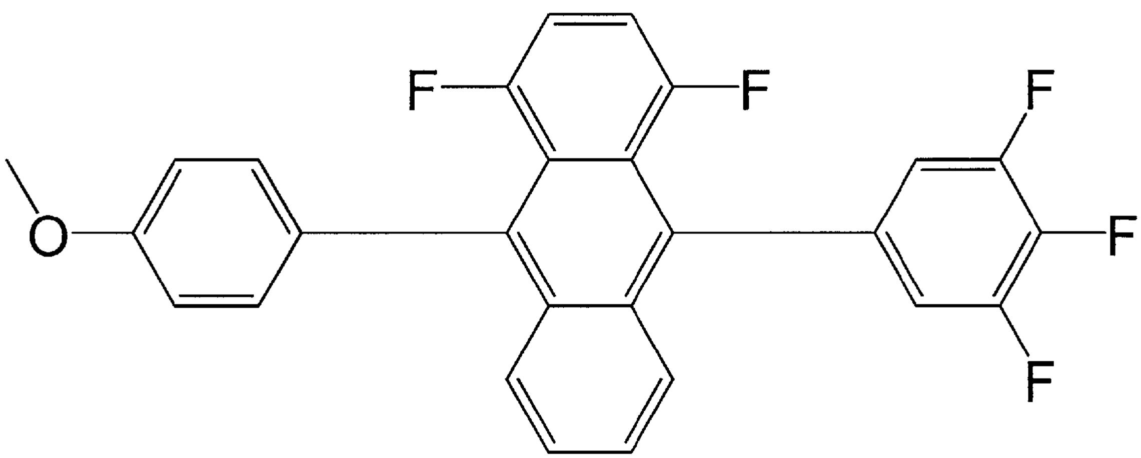
Figure 247:
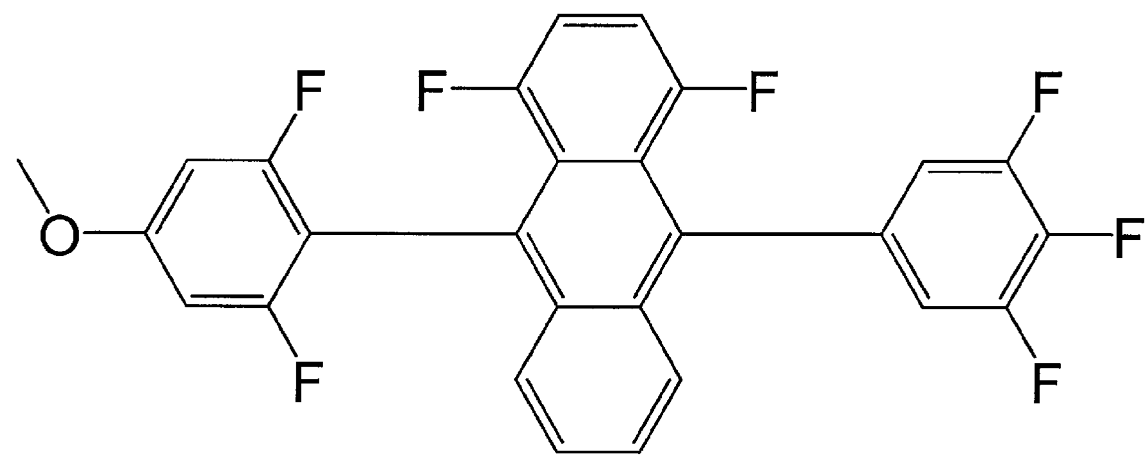
Figure 248:
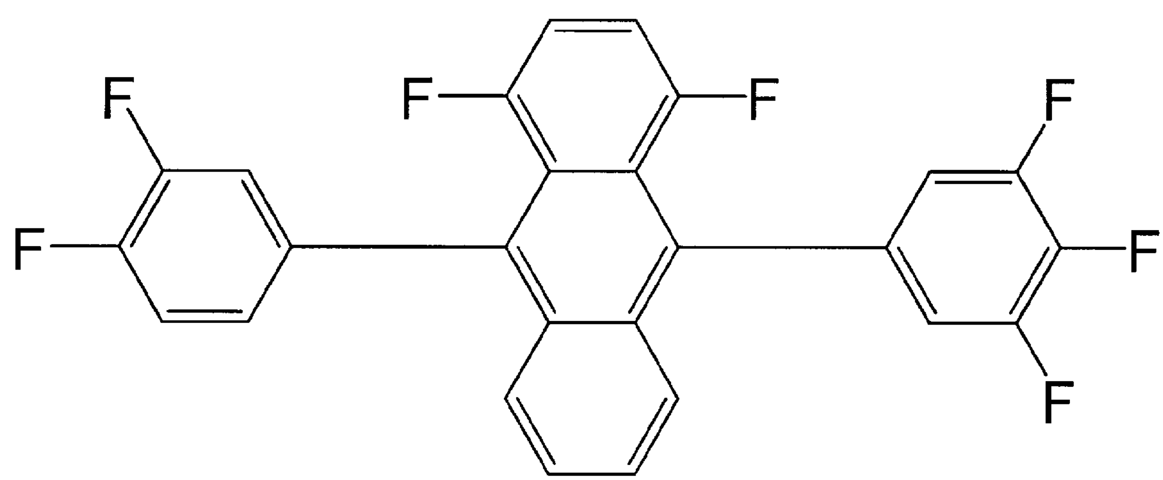
Figure 249:
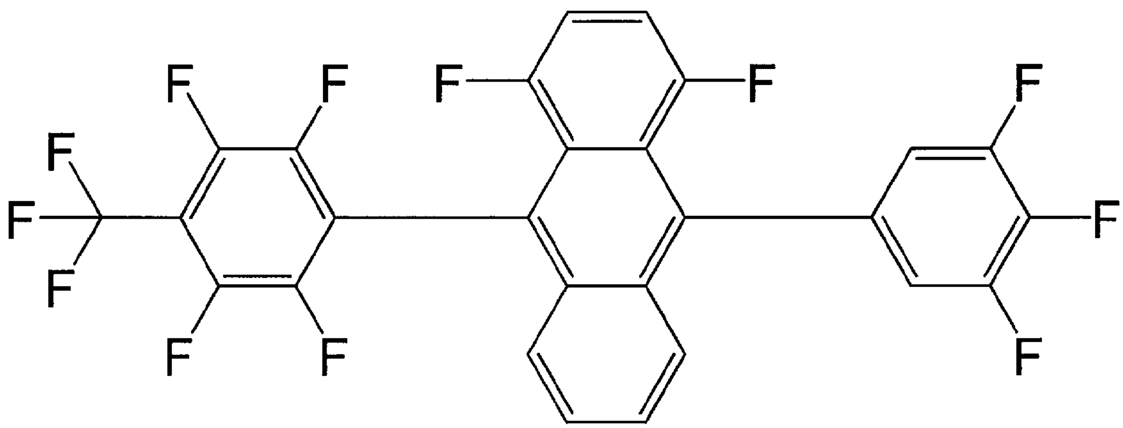
Figure 250:
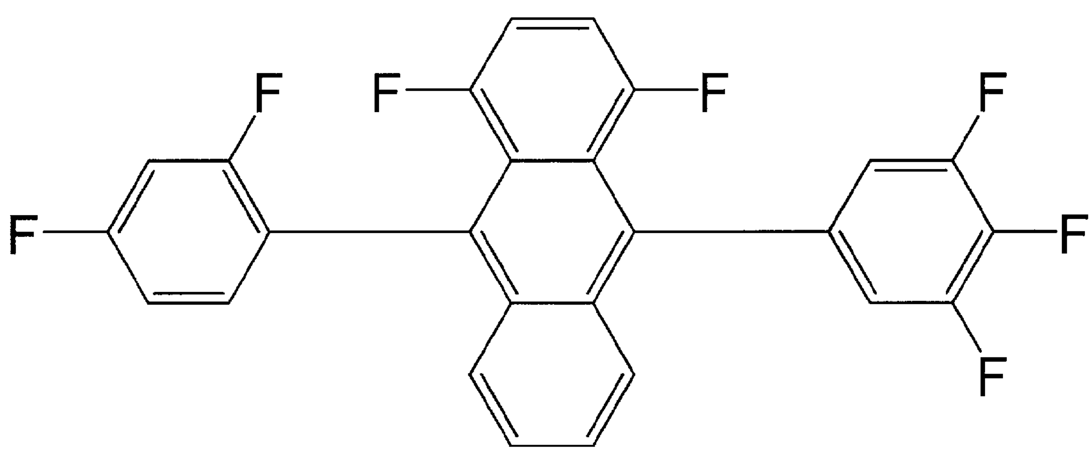
Figure 251:
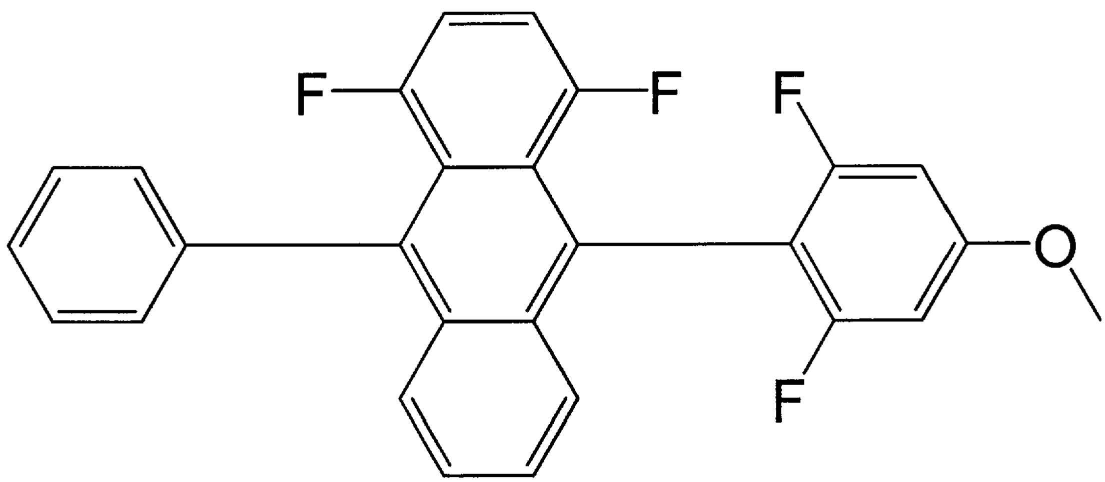
Figure 252:
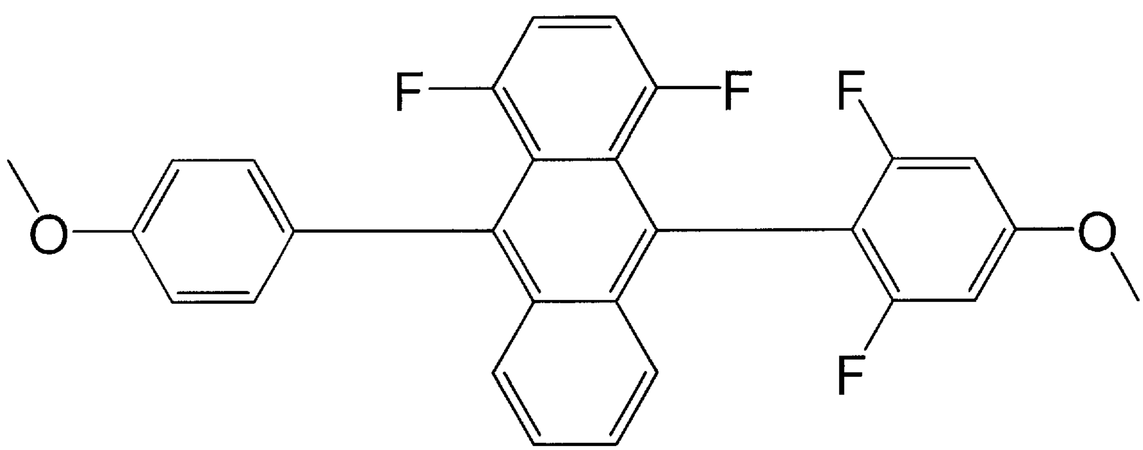
Figure 253:
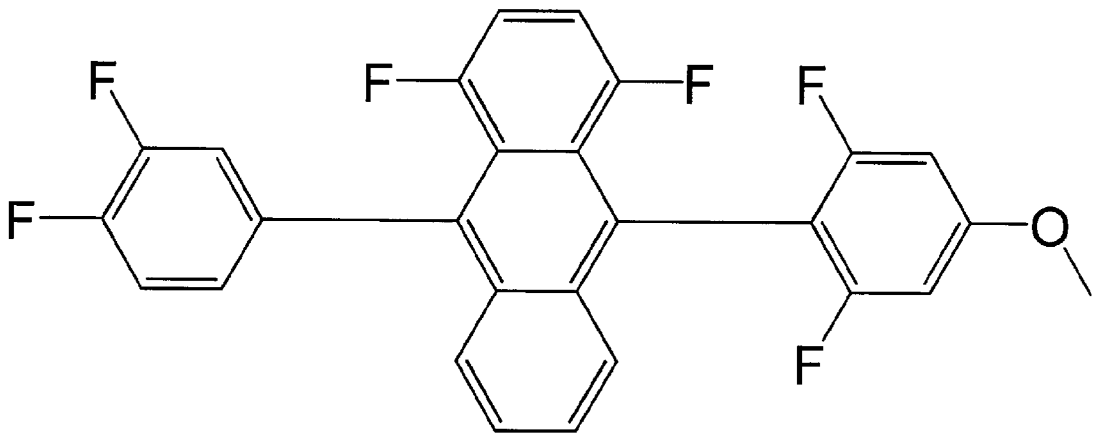
Figure 254:
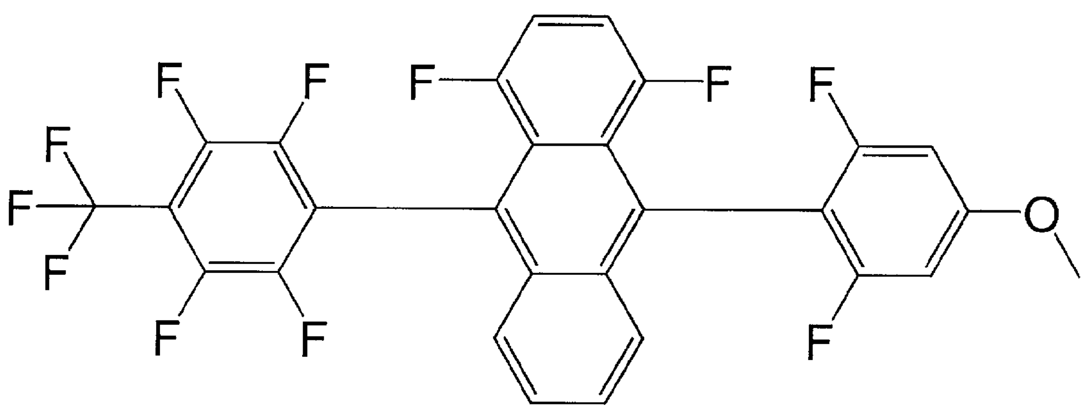
Figure 255:
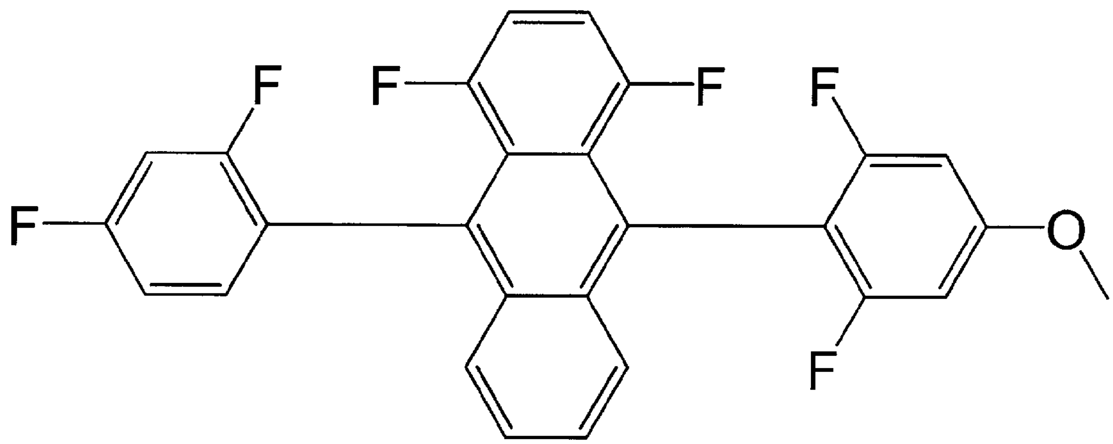
Figure 256:
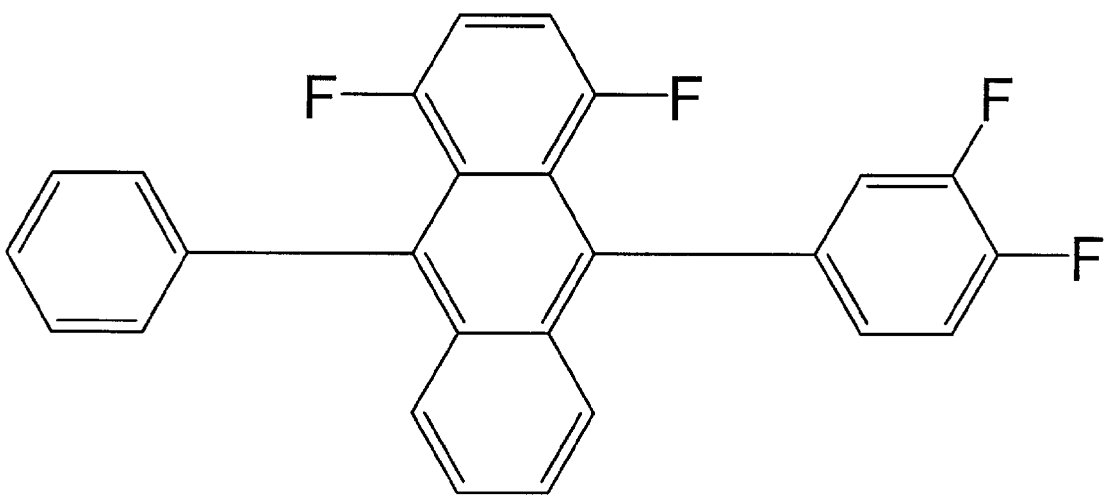
Figure 257:
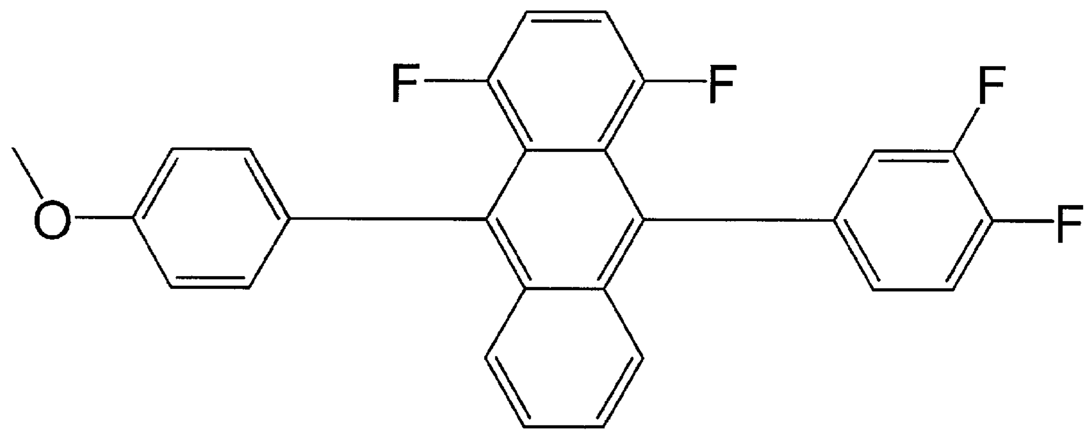
Figure 258:
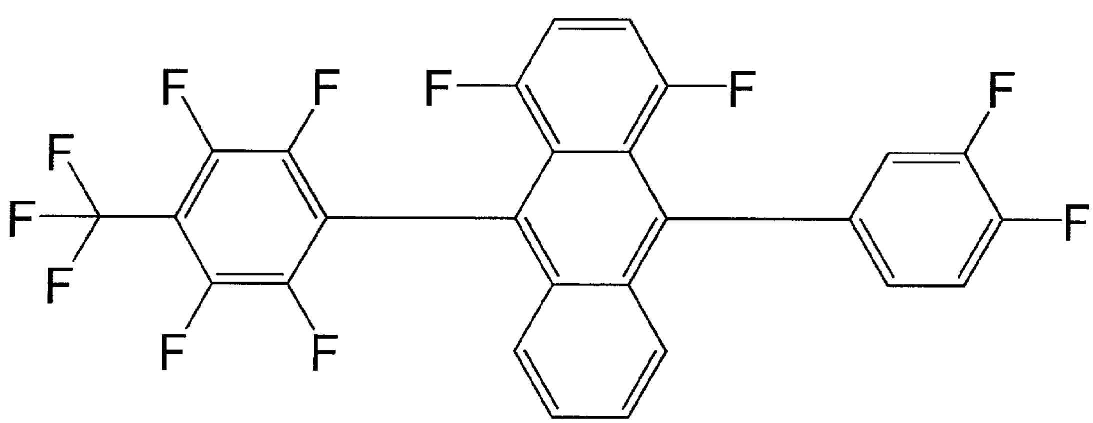
Figure 259:
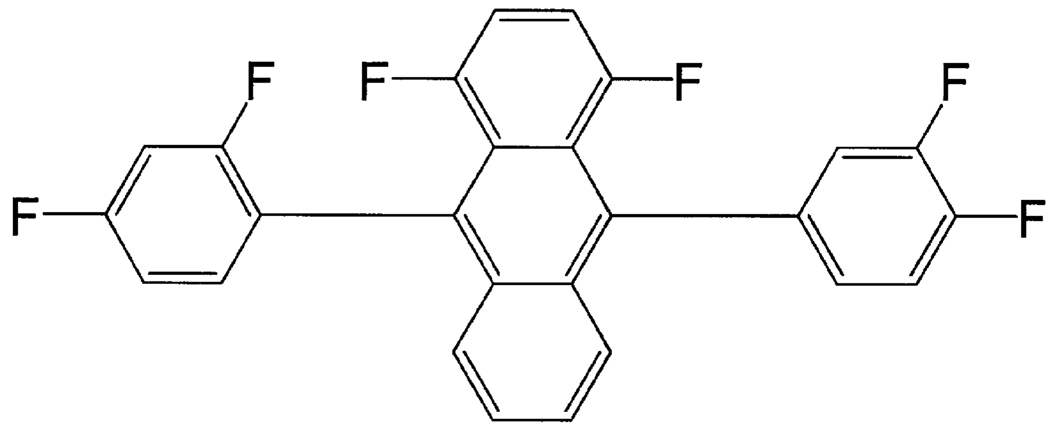
Figure 260:
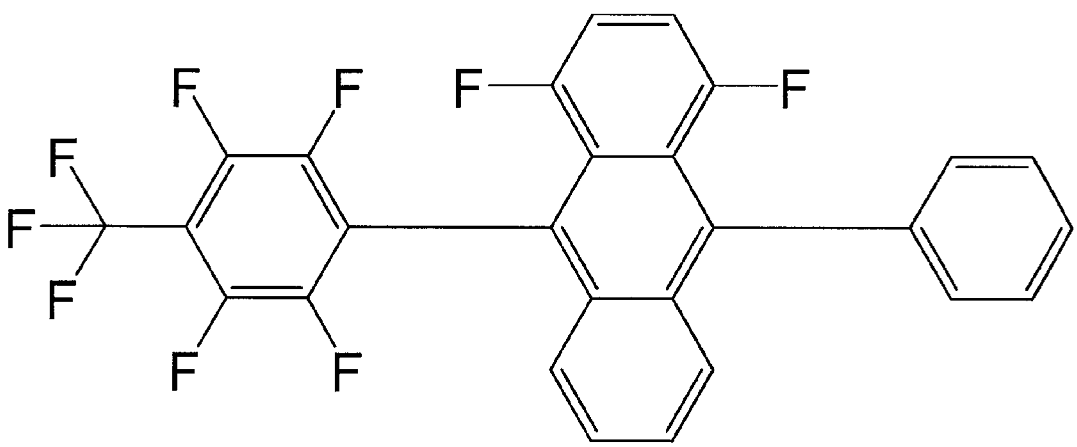
Figure 261:
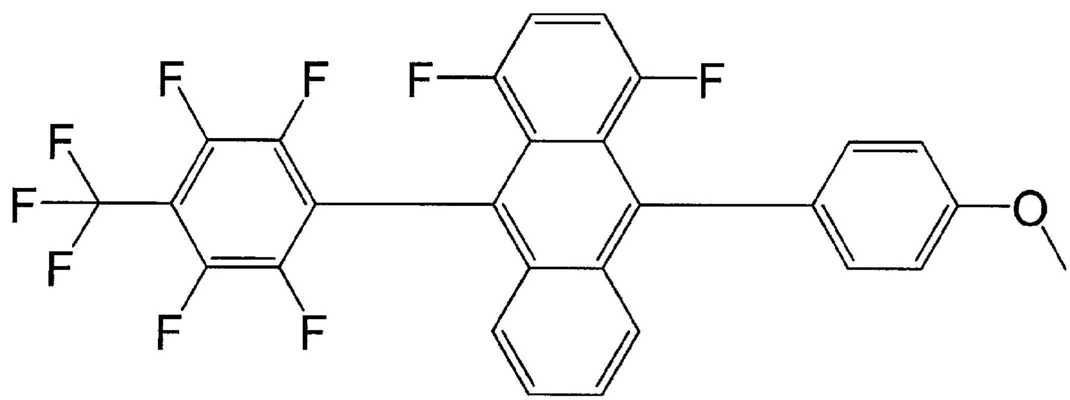
Figure 262:
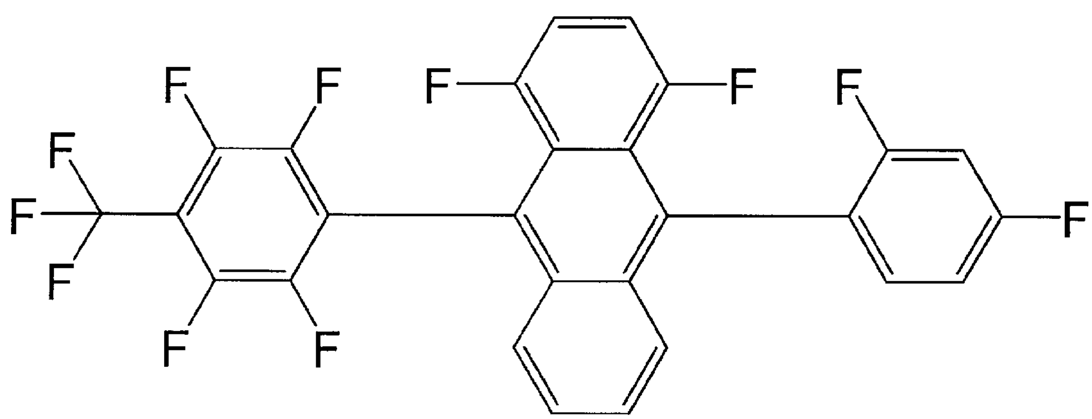
Figure 263:
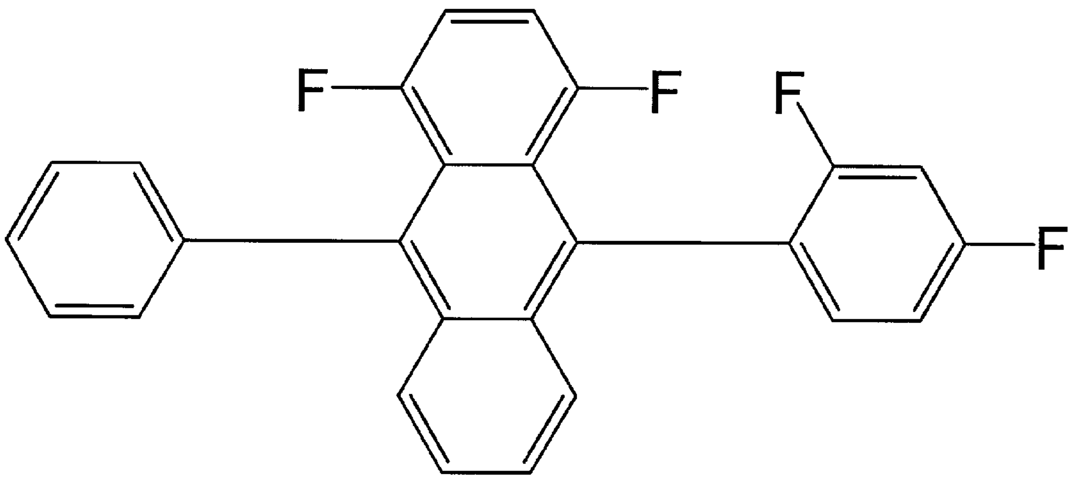
Figure 264:
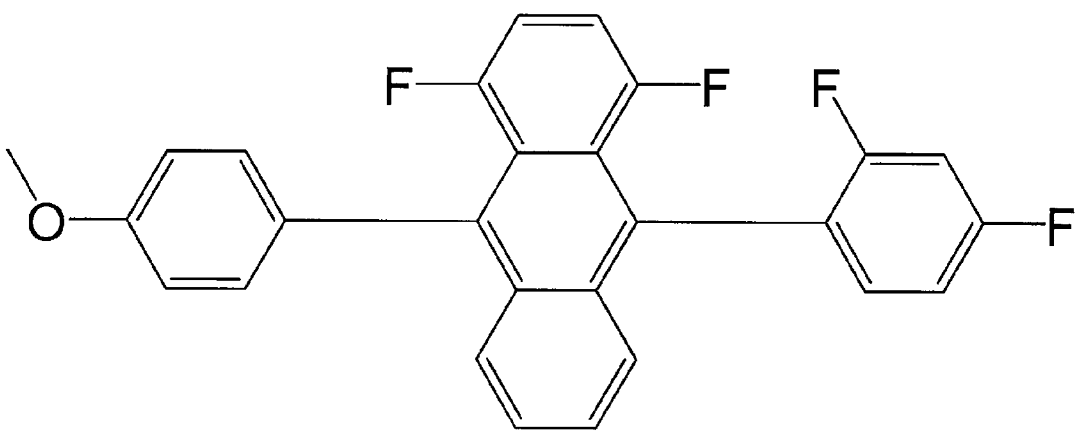
Figure 265:
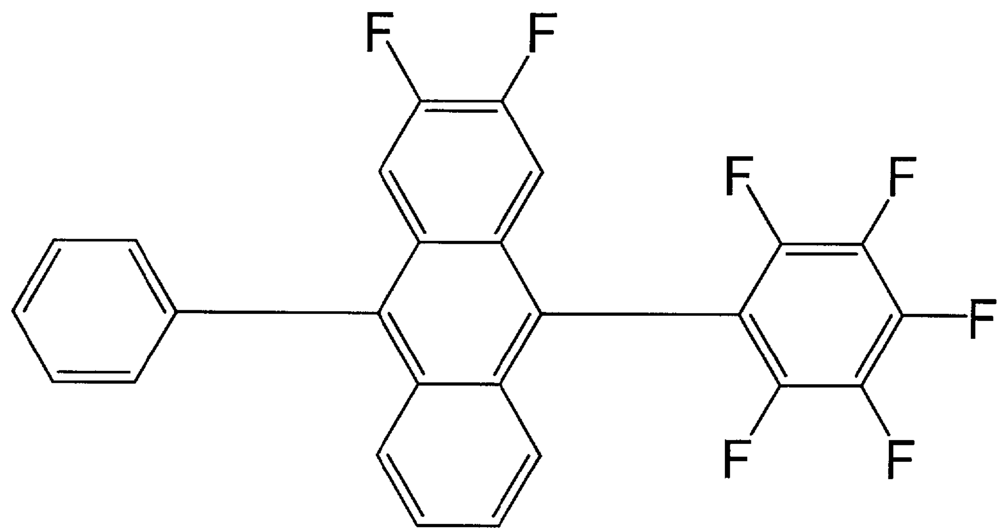
Figure 266:
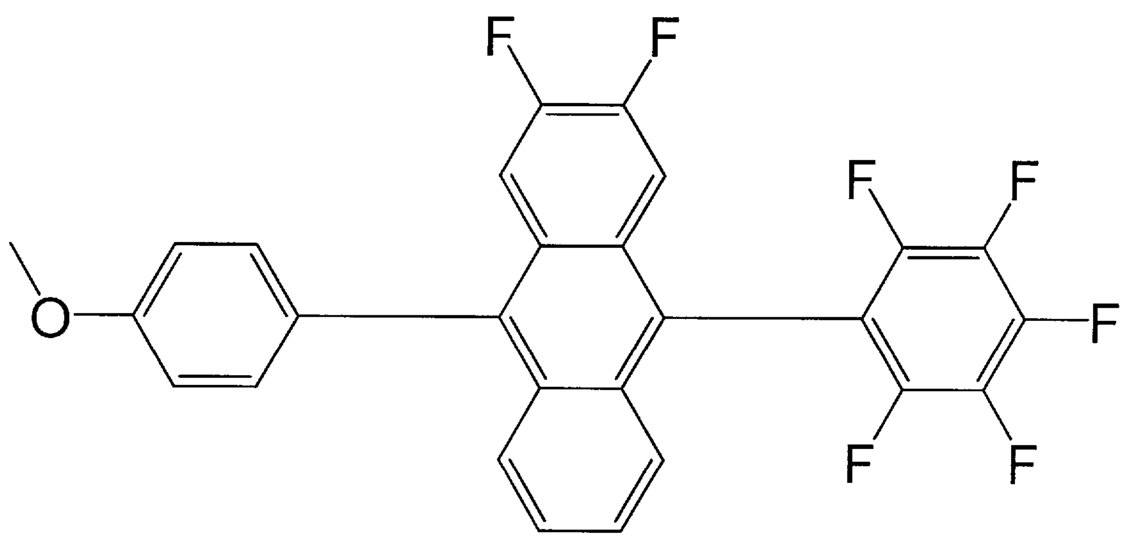
Figure 267:
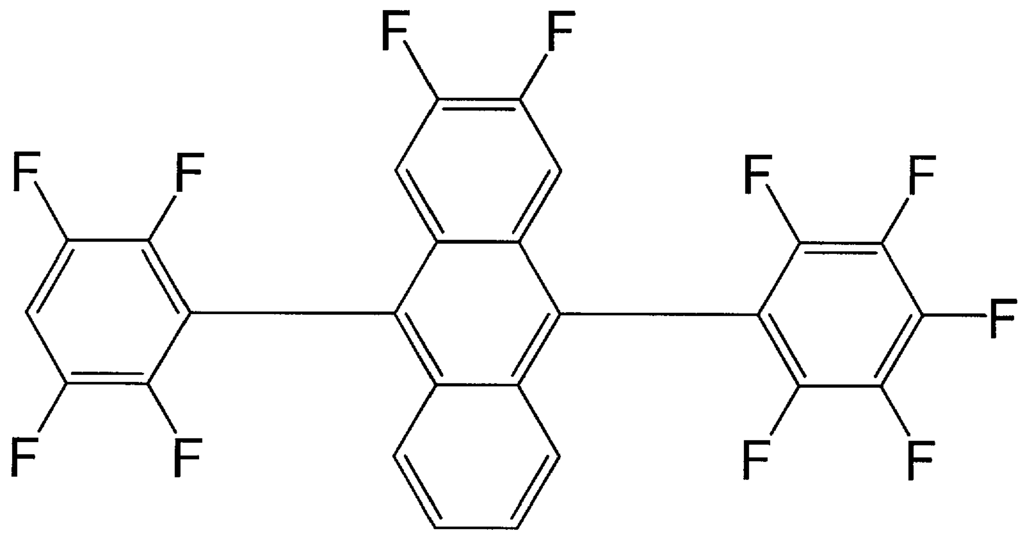
Figure 268:
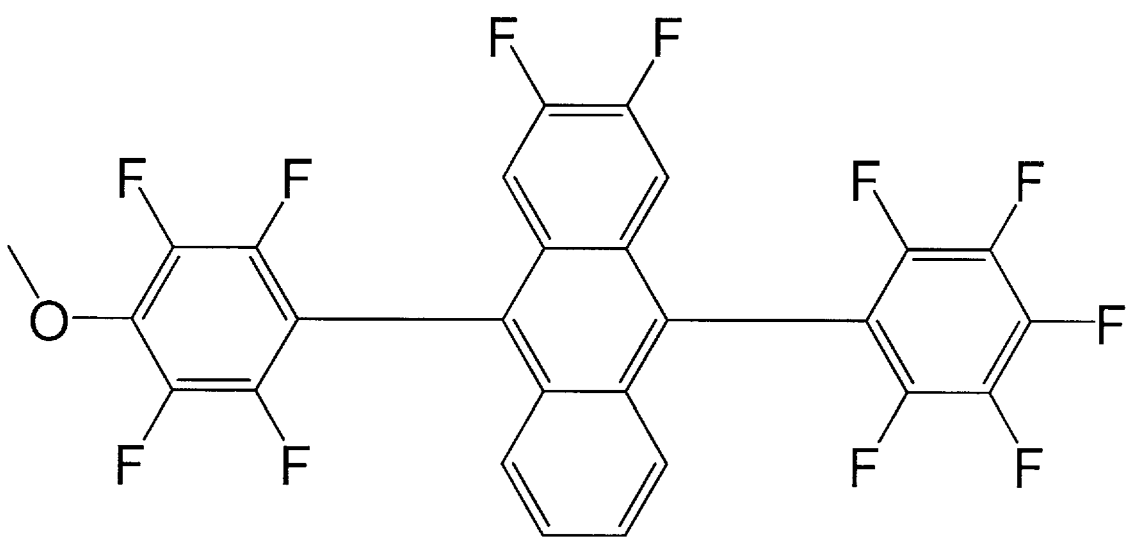
Figure 269:
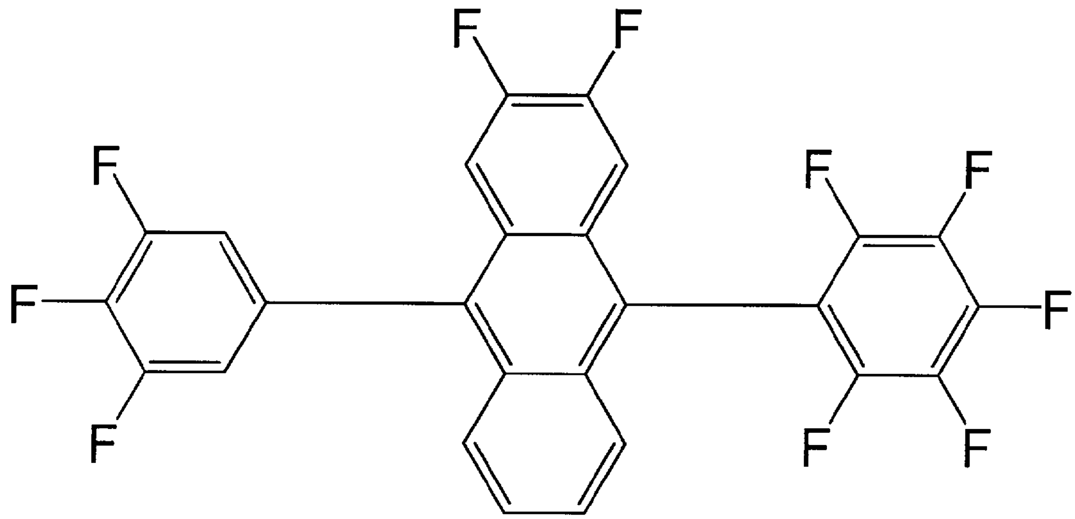
Figure 270:
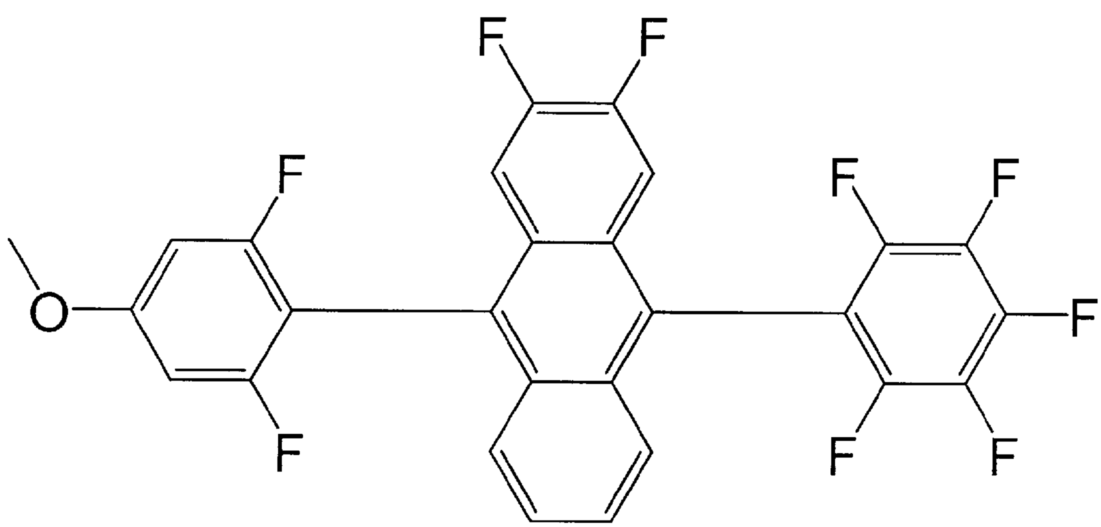
Figure 271:
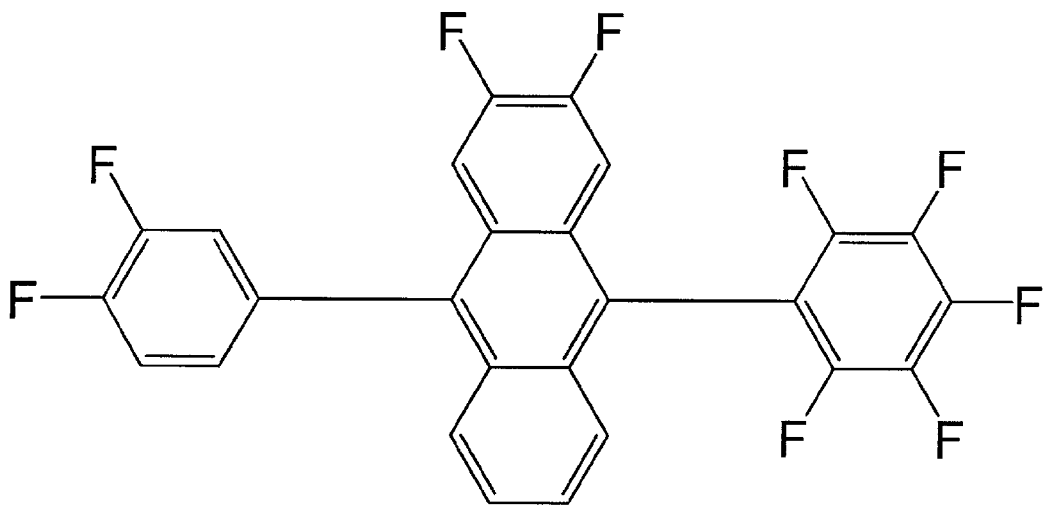
Figure 272:
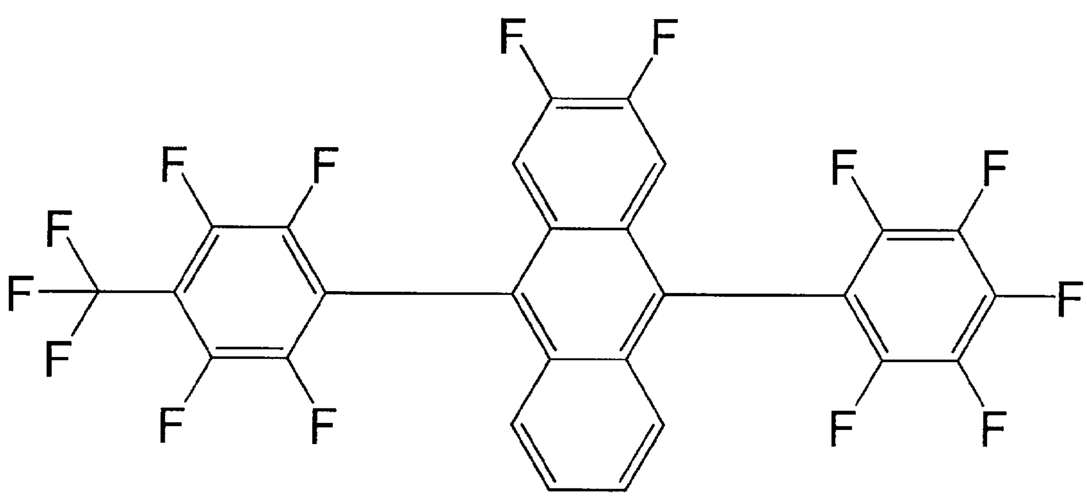
Figure 273:
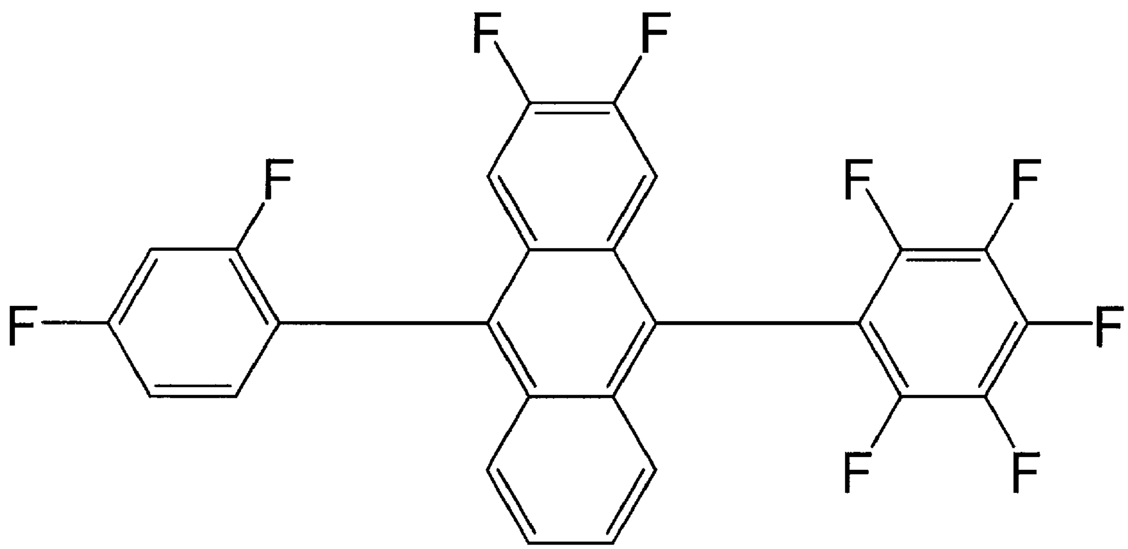
Figure 274:
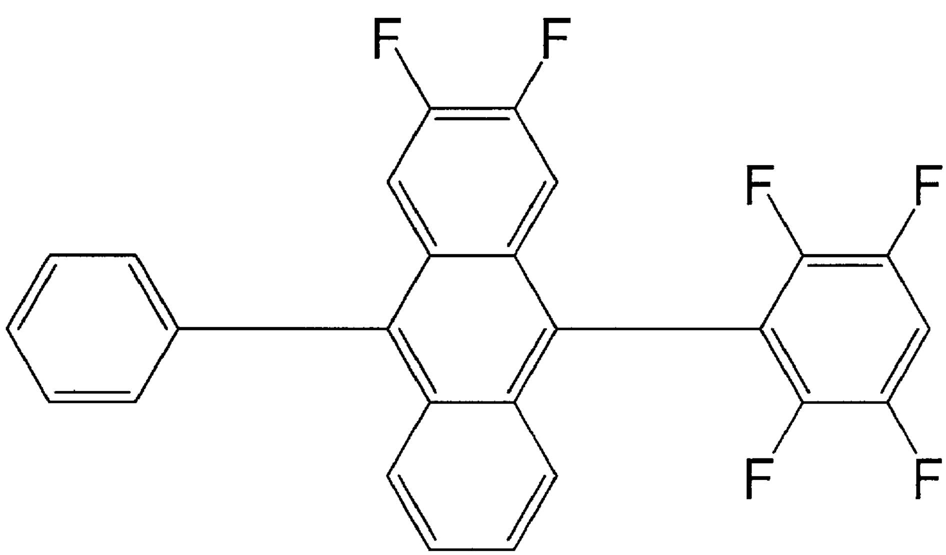
Figure 275:
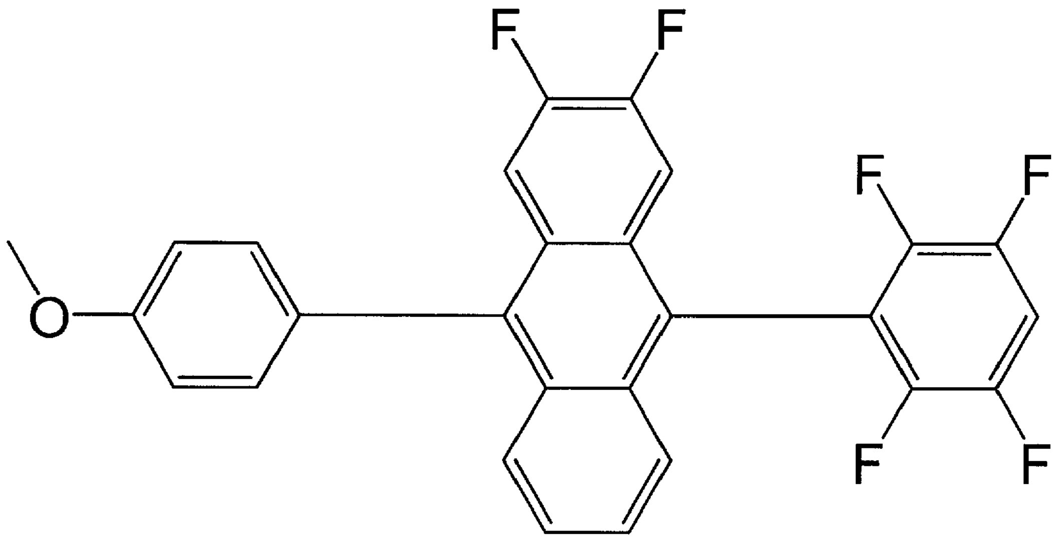
Figure 276:
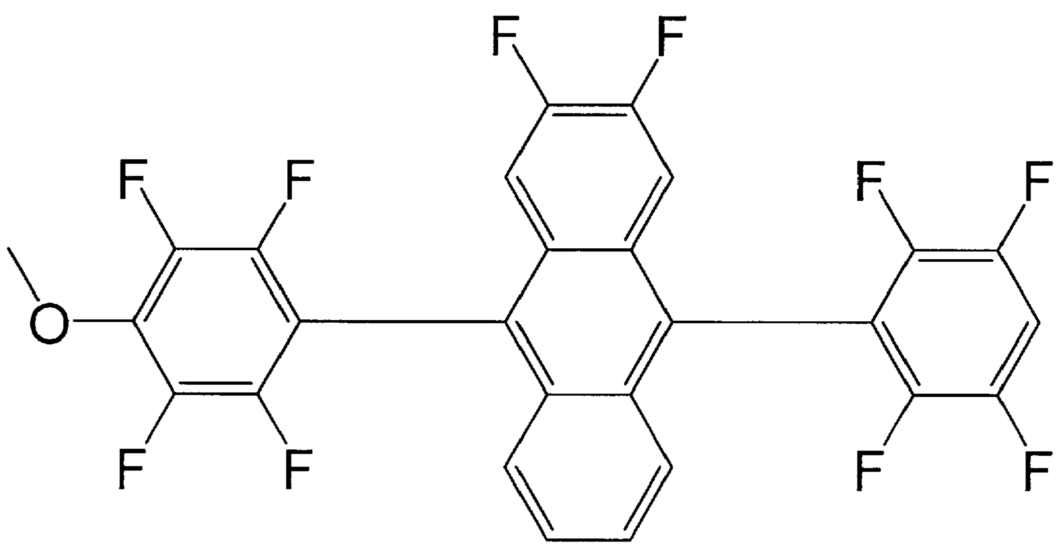
Figure 277:
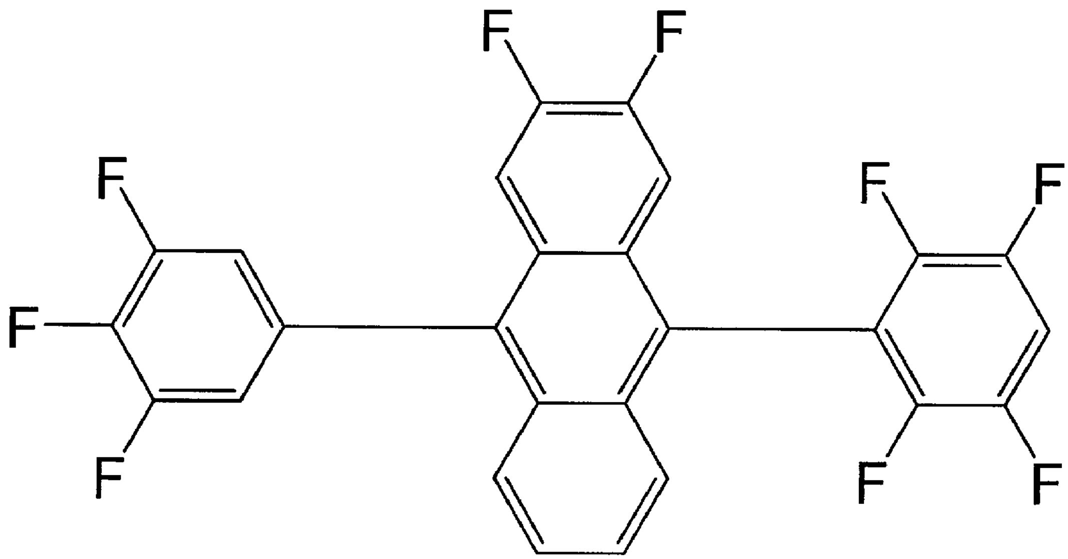
Figure 278:
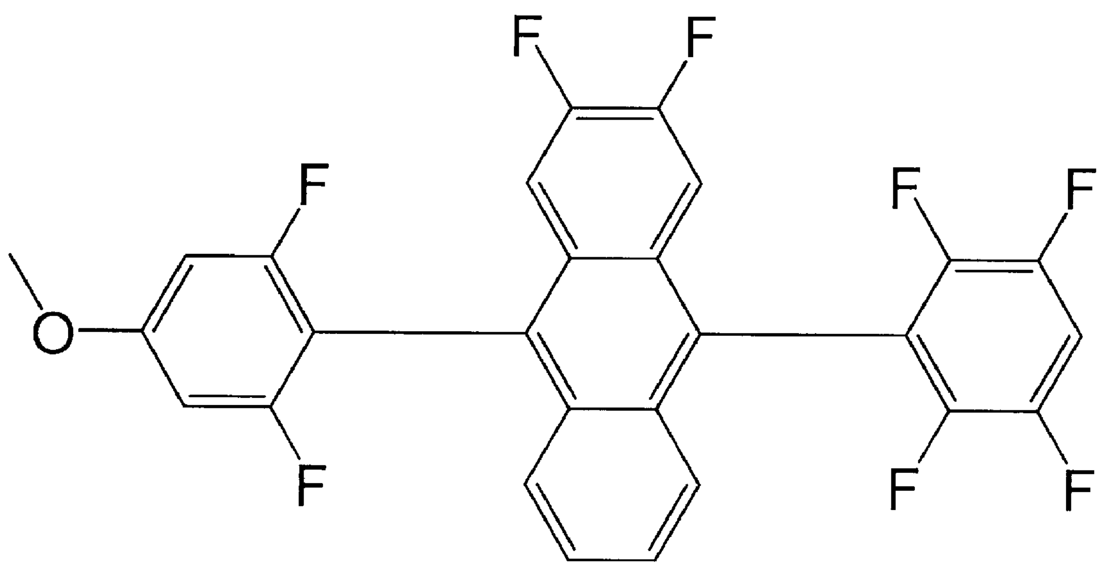
Figure 279:
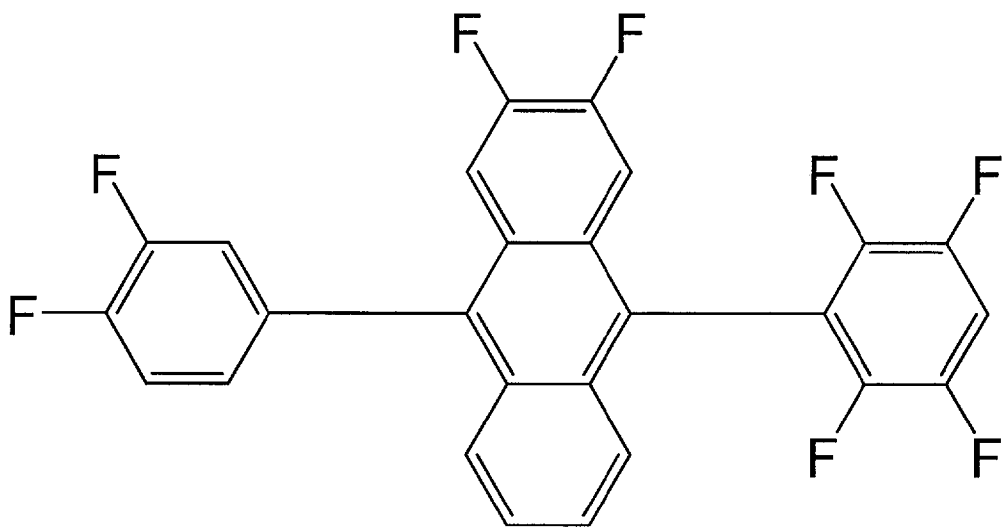
Figure 280:
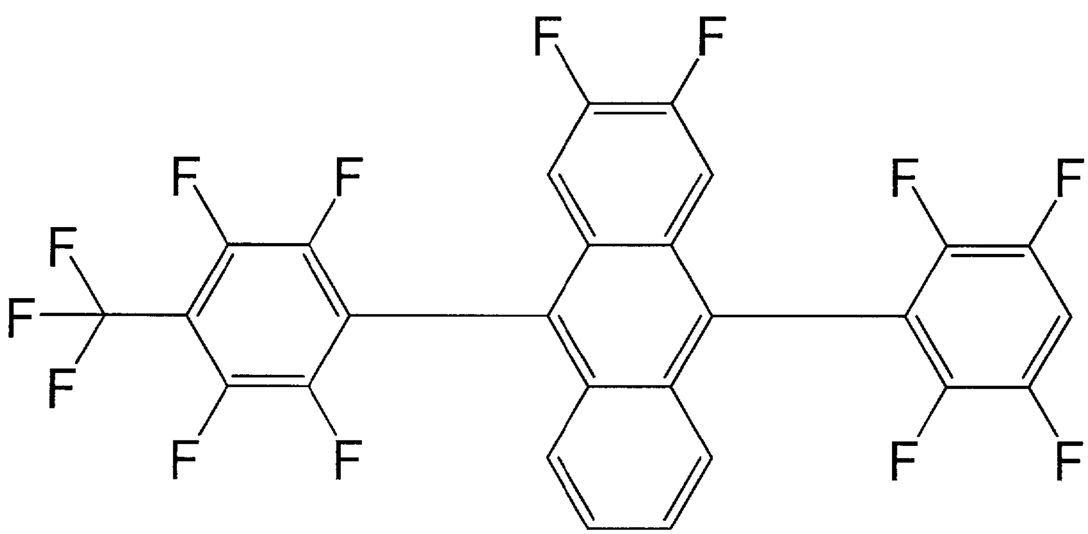
Figure 281:
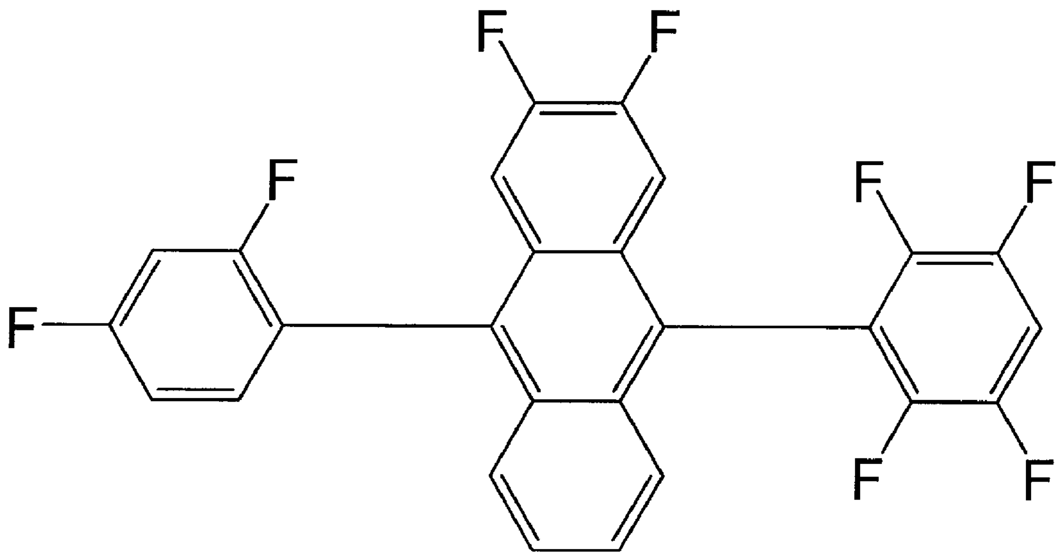
Figure 282:
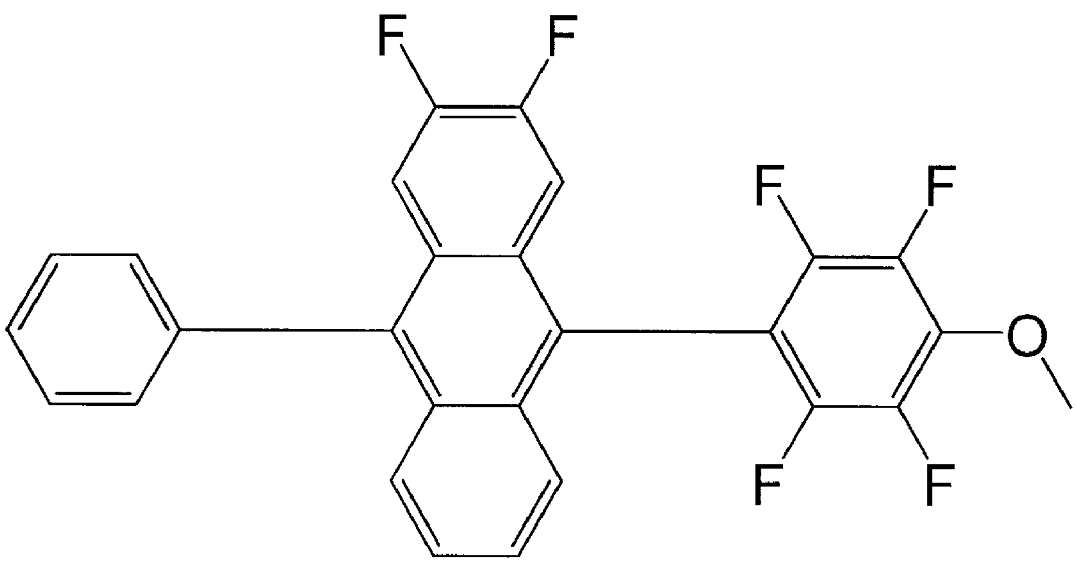
Figure 283:
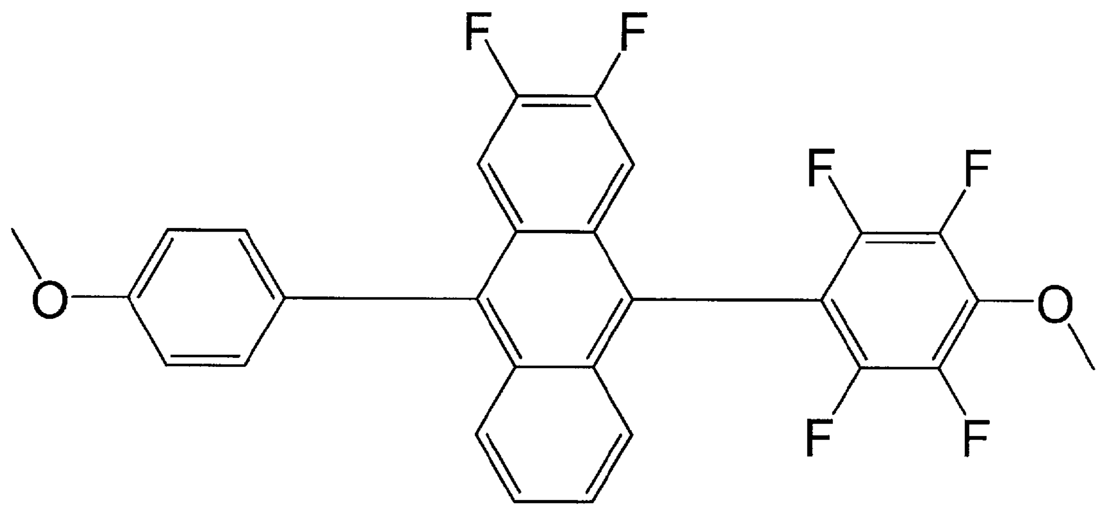
Figure 284:
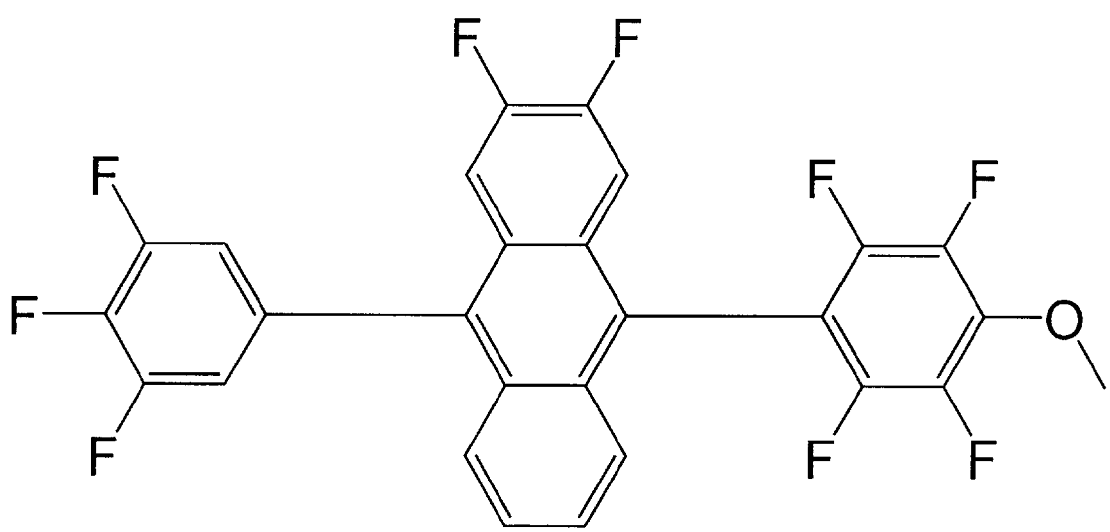
Figure 285:
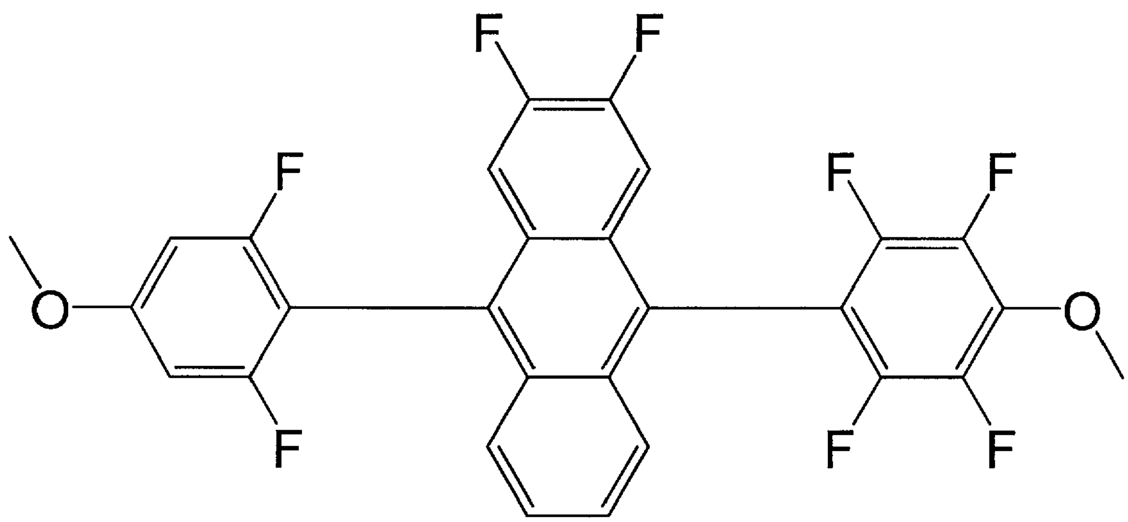
Figure 286:
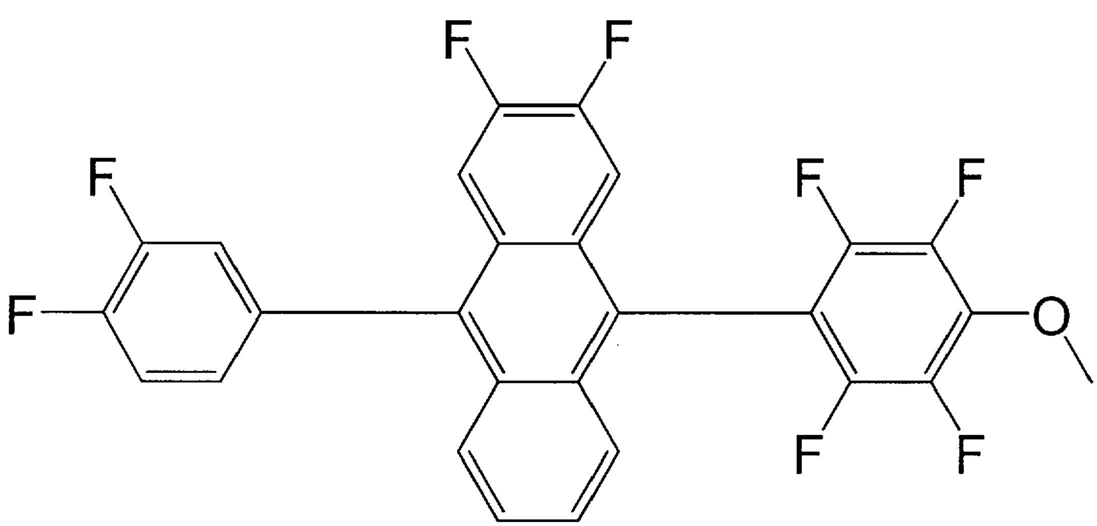
Figure 287:
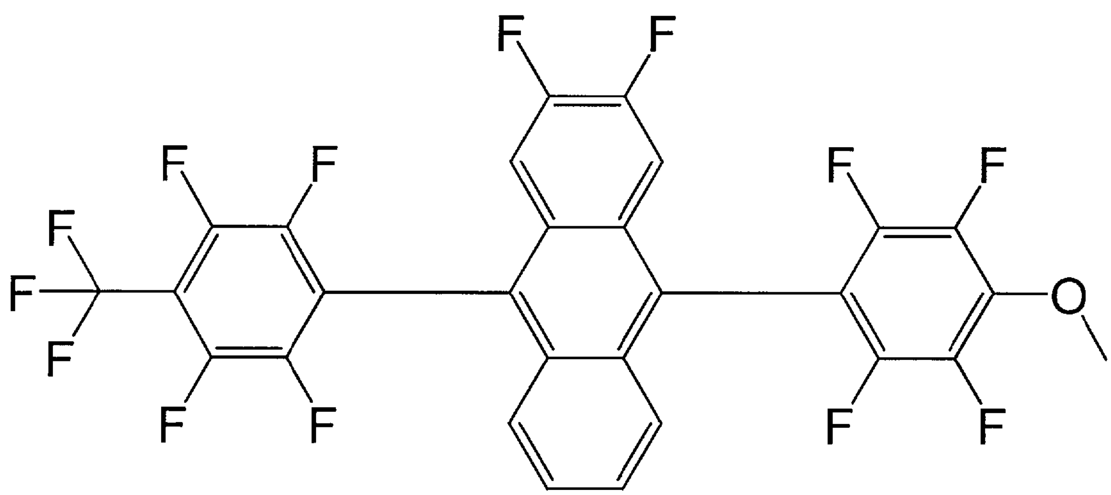
Figure 288:
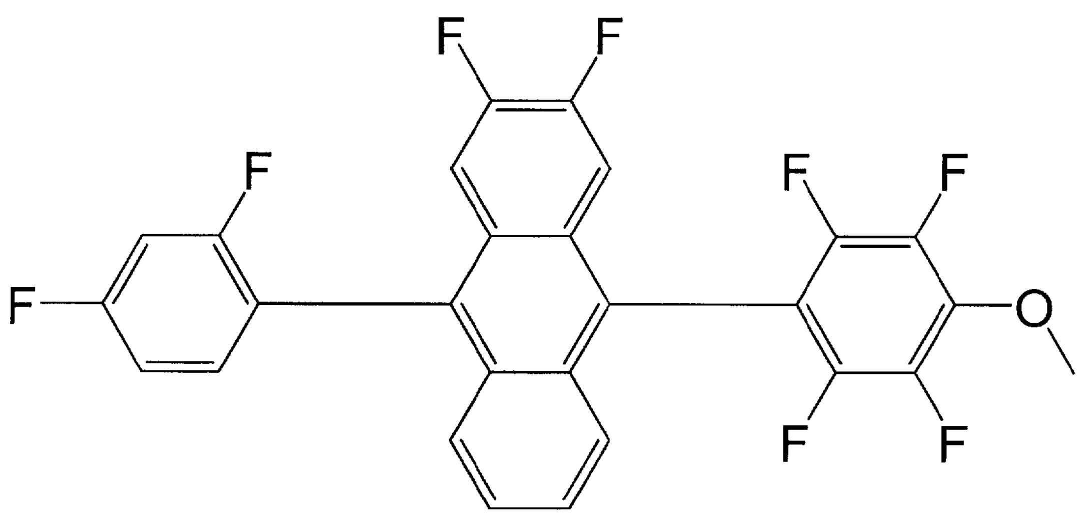
Figure 289:
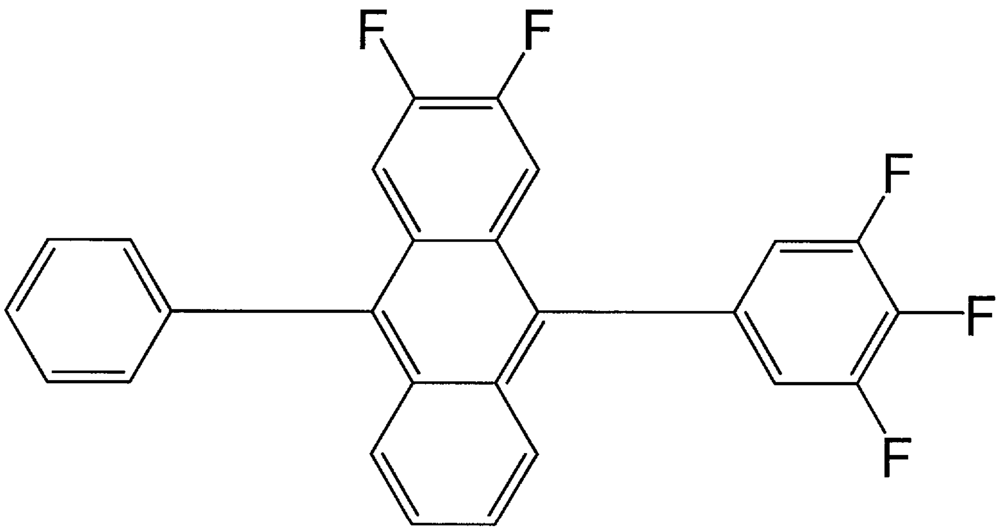
Figure 290:
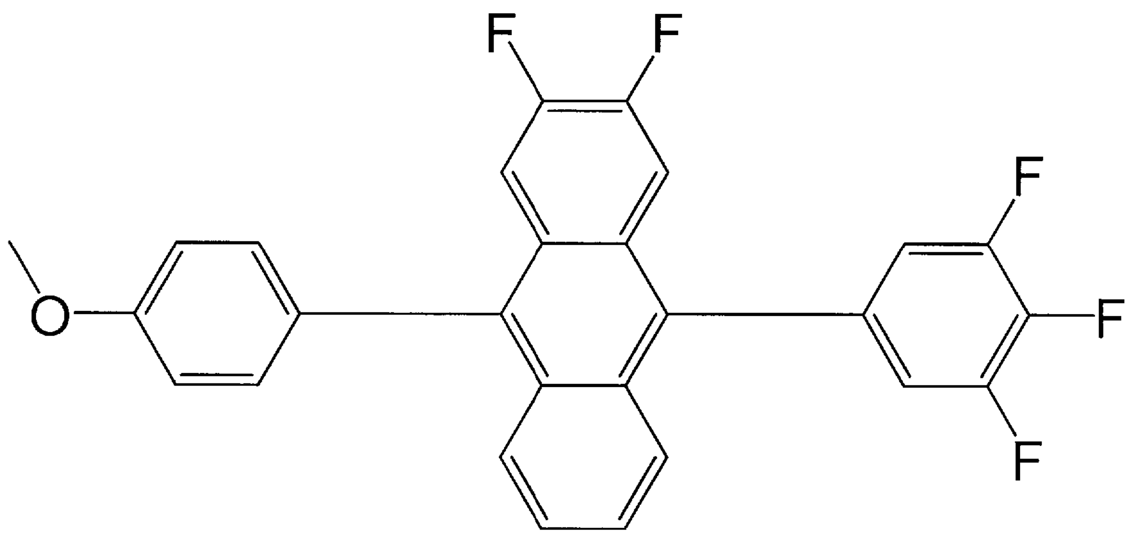
Figure 291:
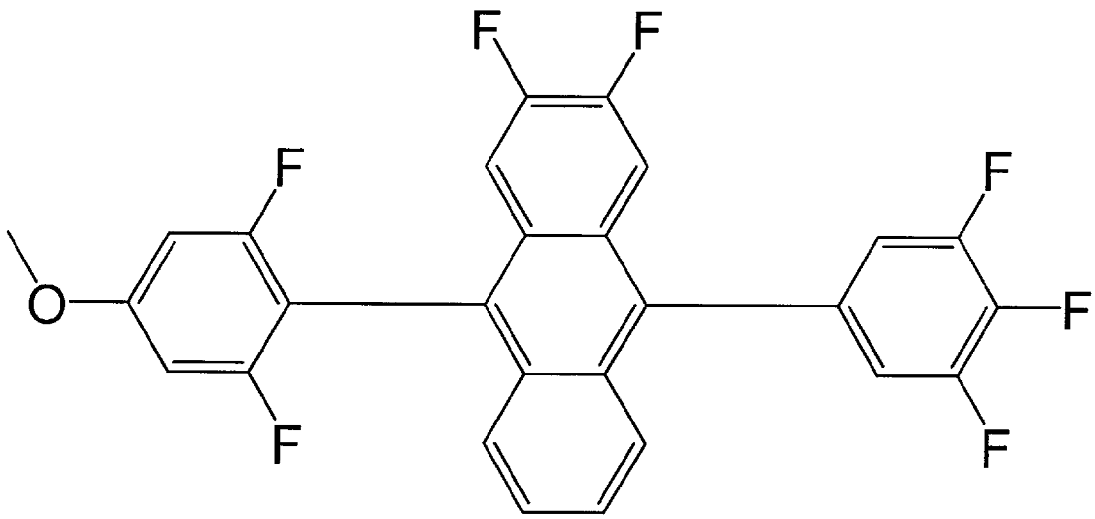
Figure 292:
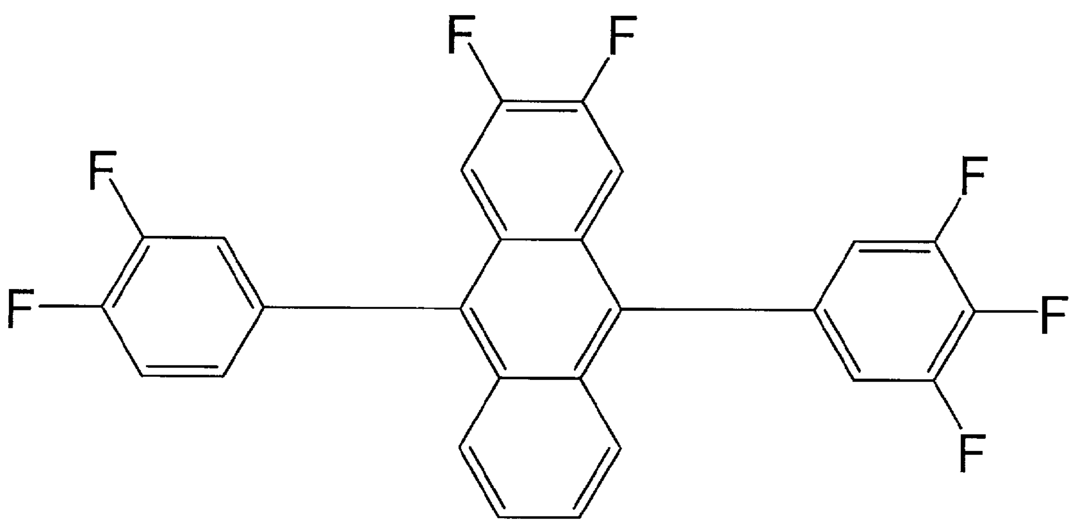
Figure 293:
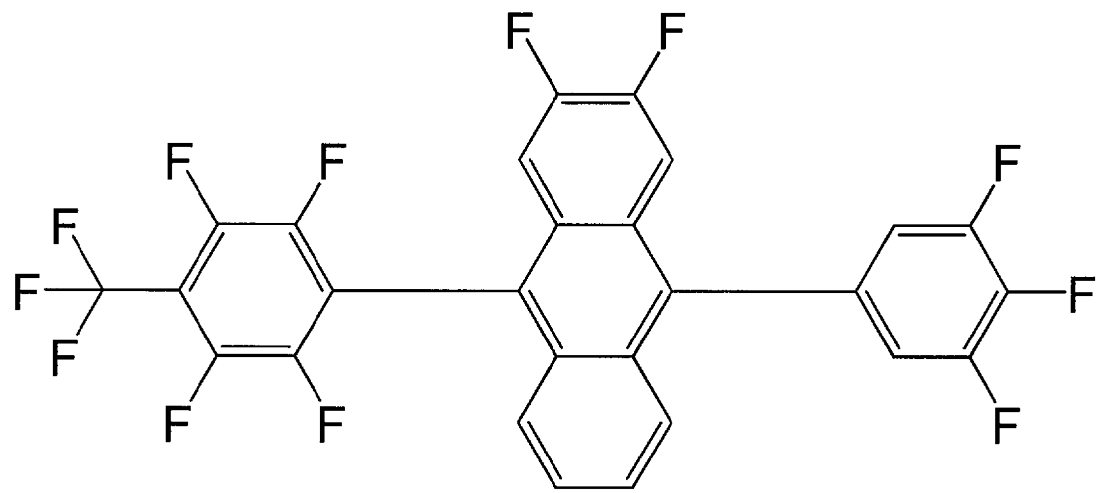
Figure 294:
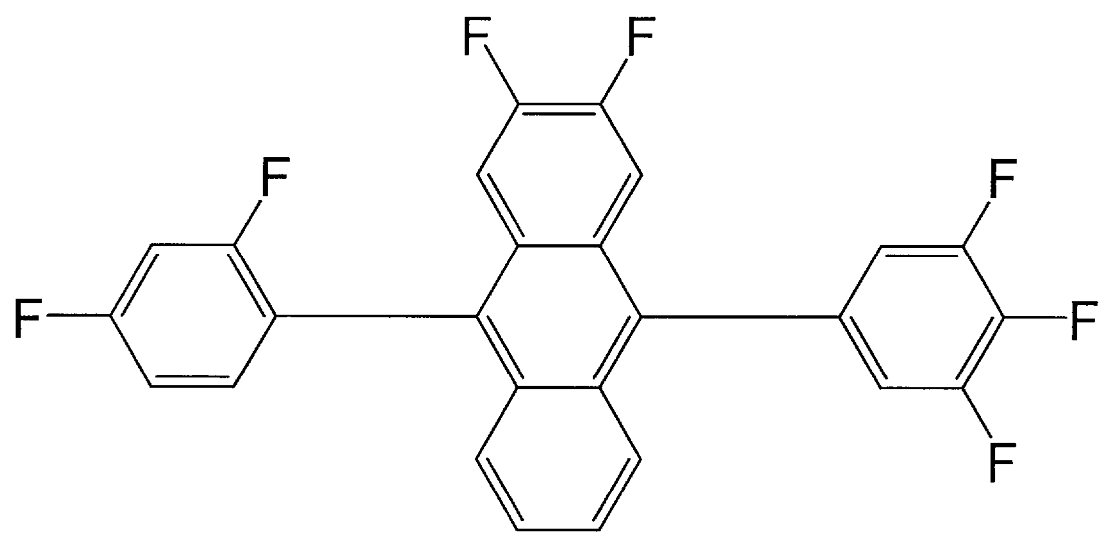
Figure 295:
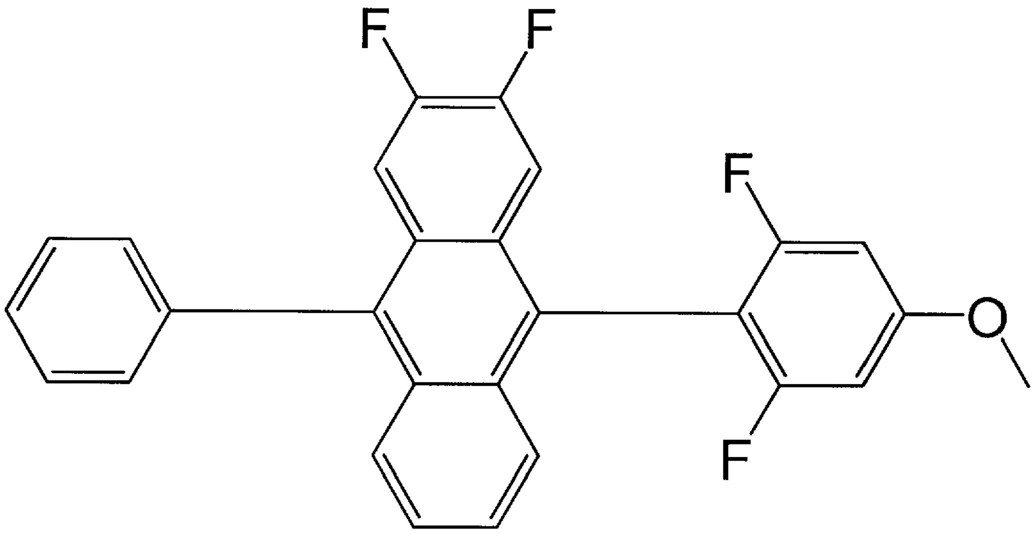
Figure 296:
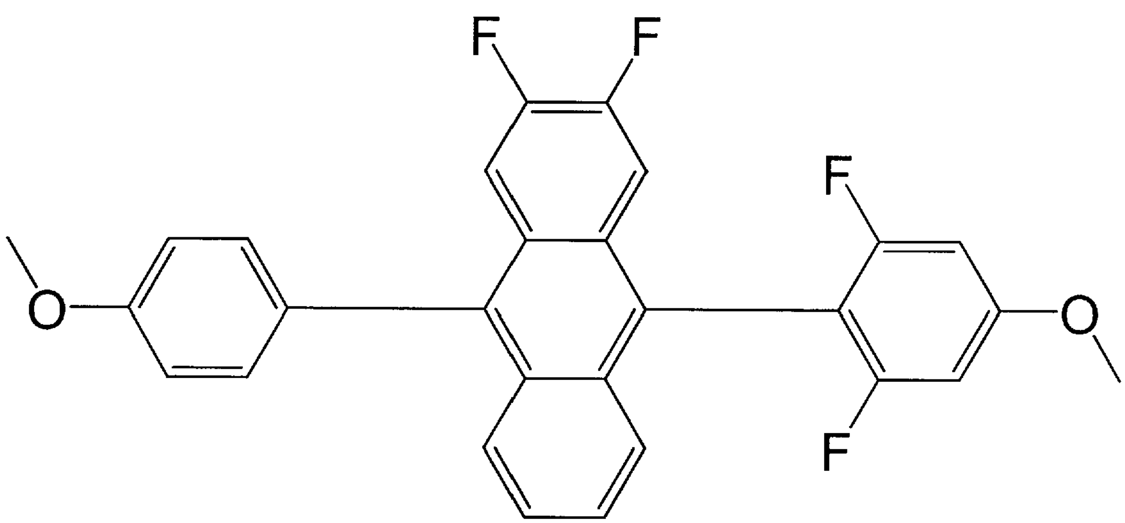
Figure 297:
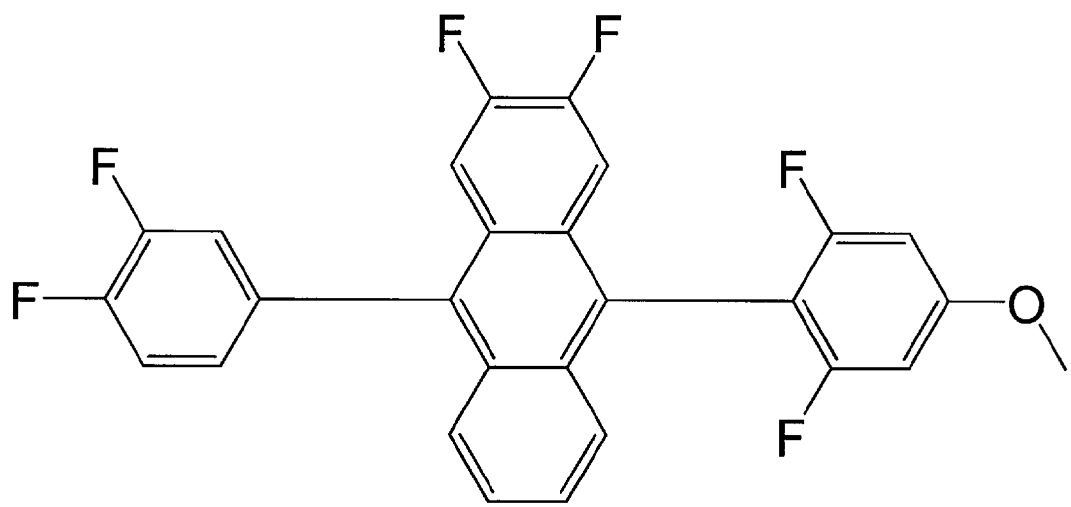
Figure 298:
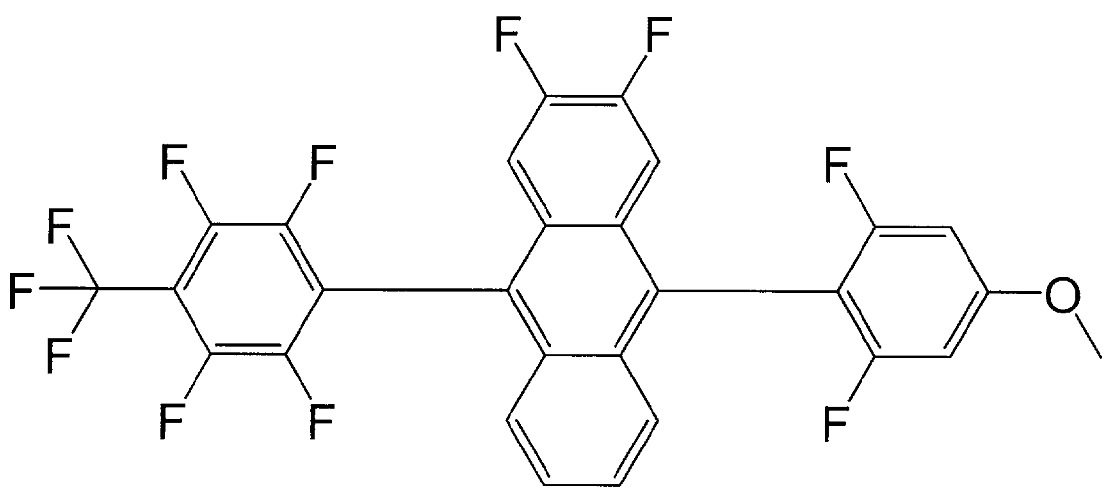
Figure 299:
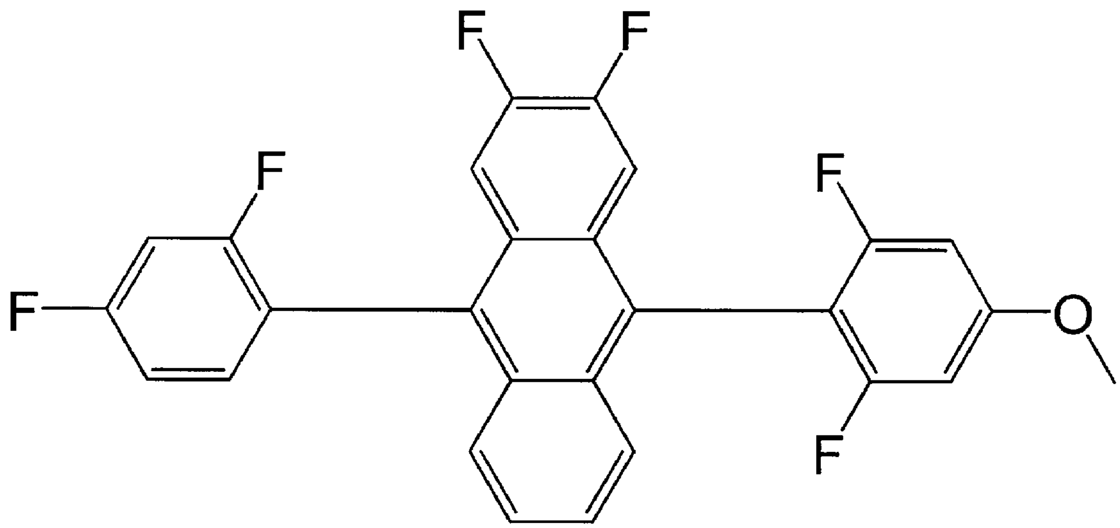
Figure 300:
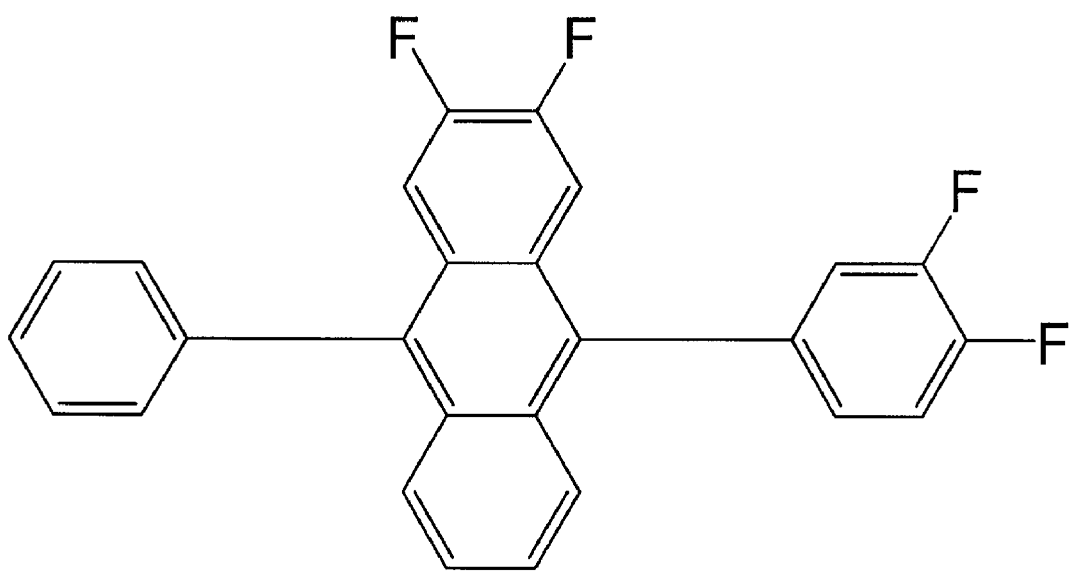
Figure 301:
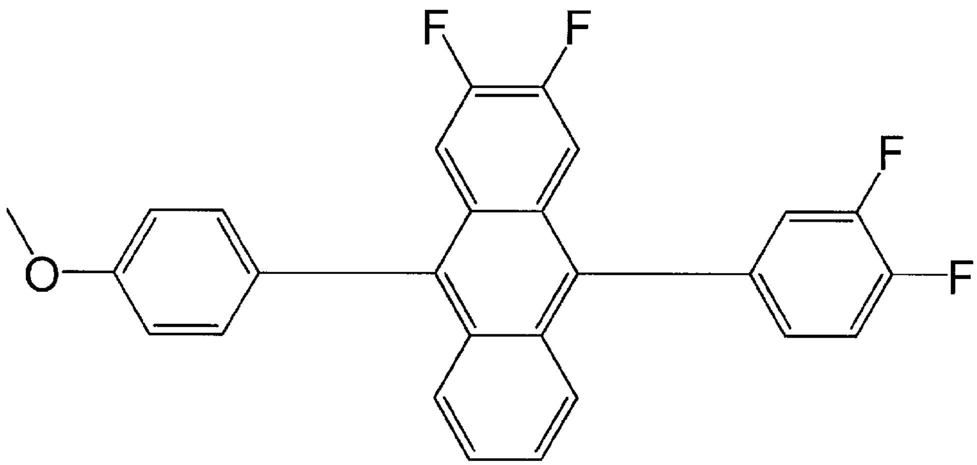
Figure 302:
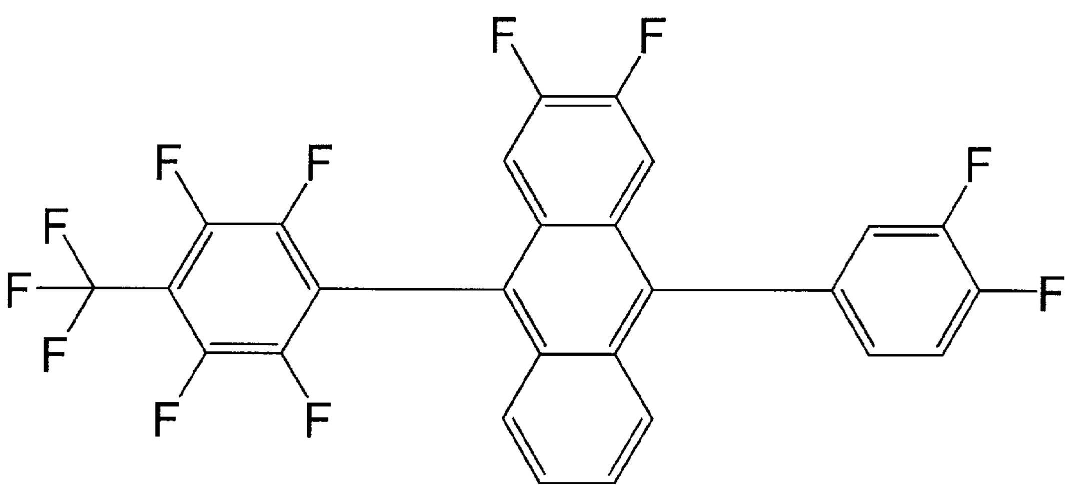
Figure 303:
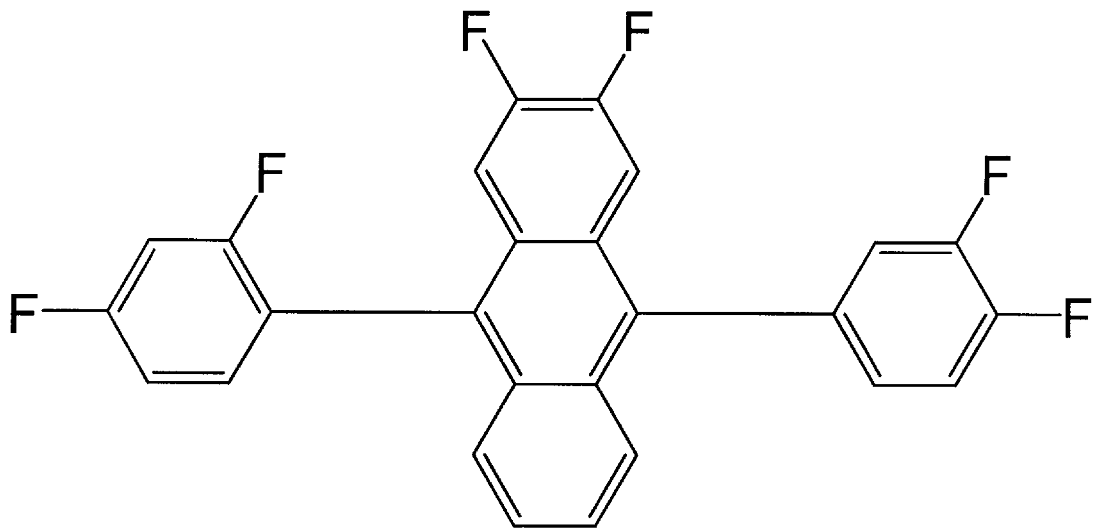
Figure 304:
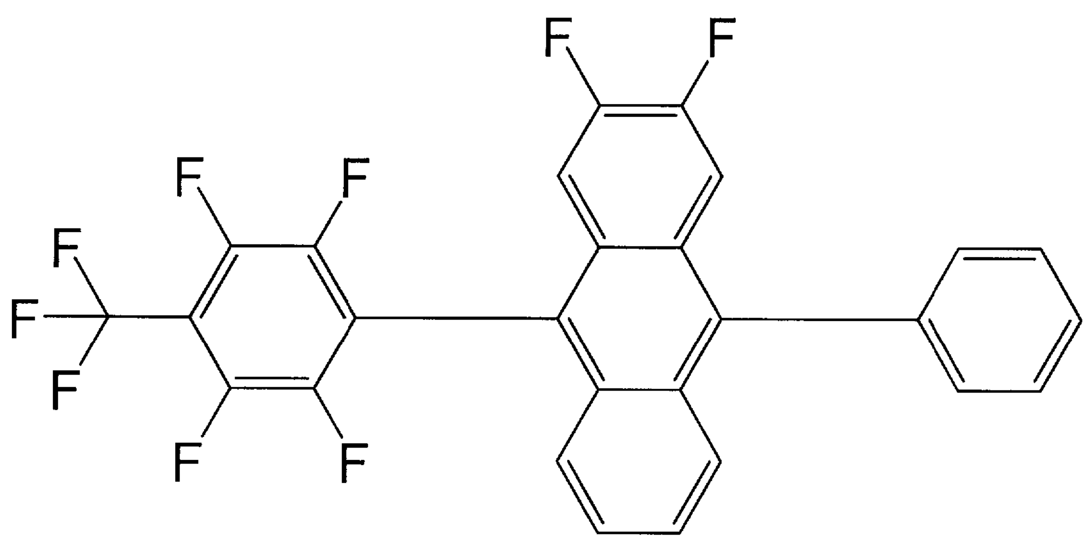
Figure 305:
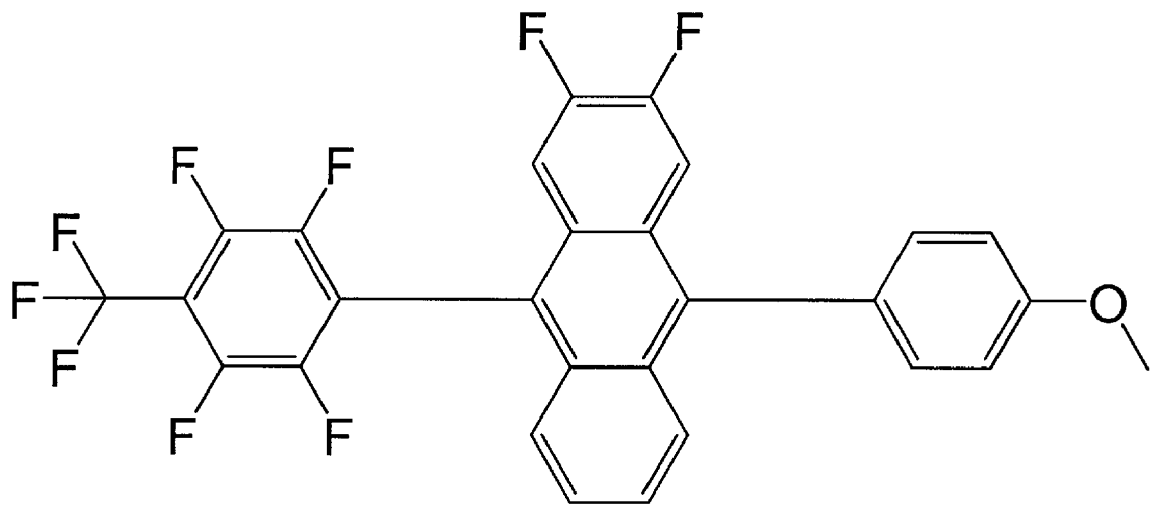
Figure 306:
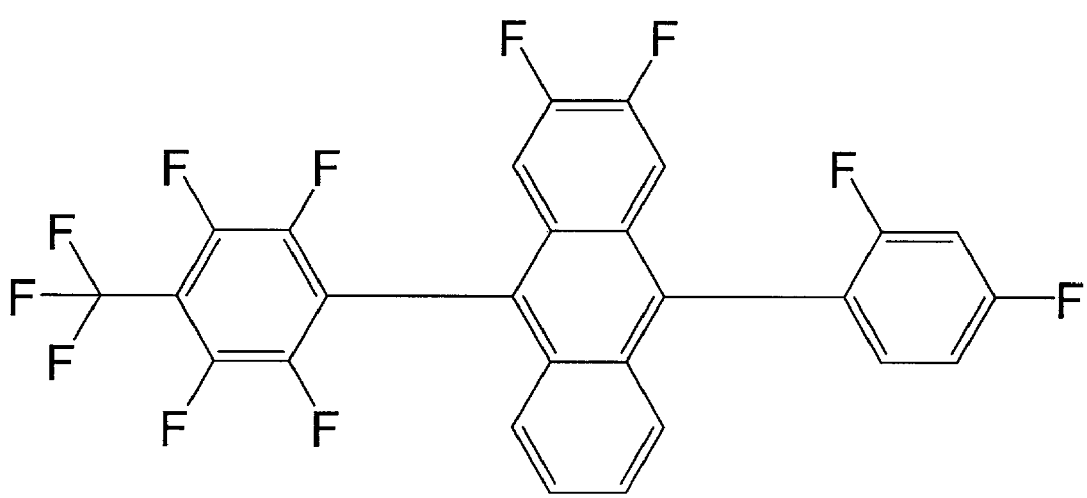
Figure 307:
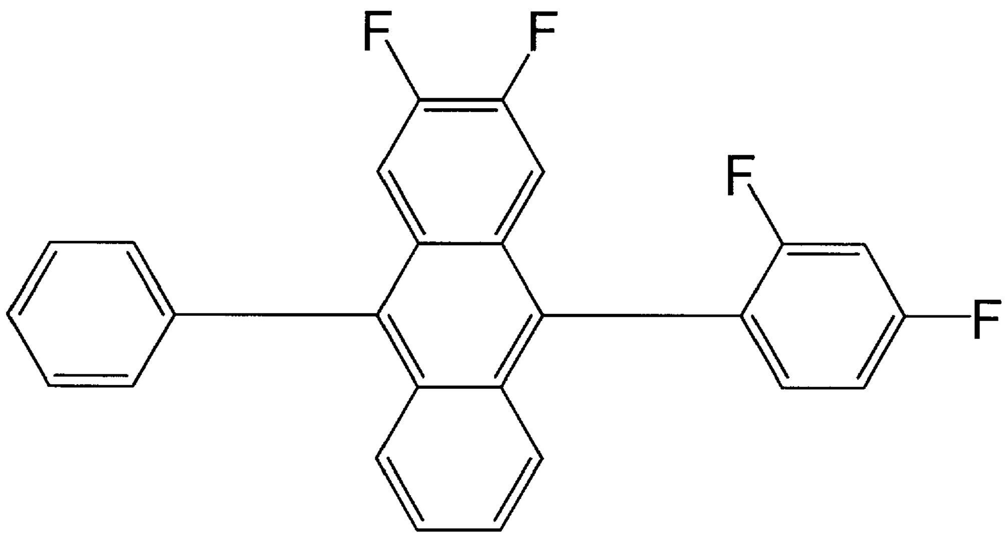
Figure 308:
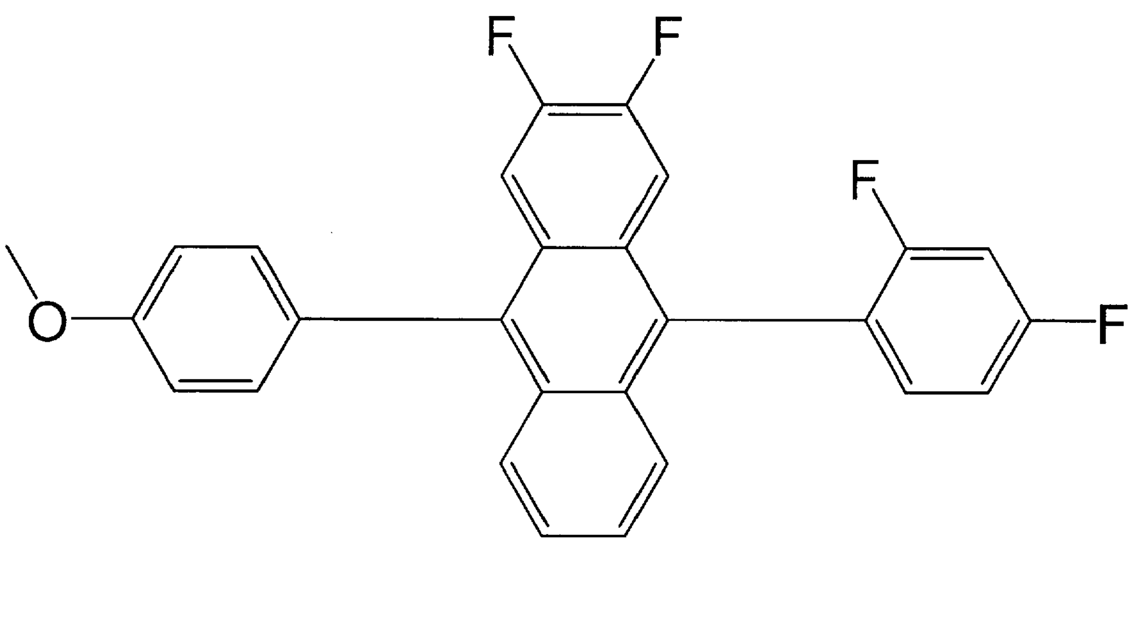
Figure 309:
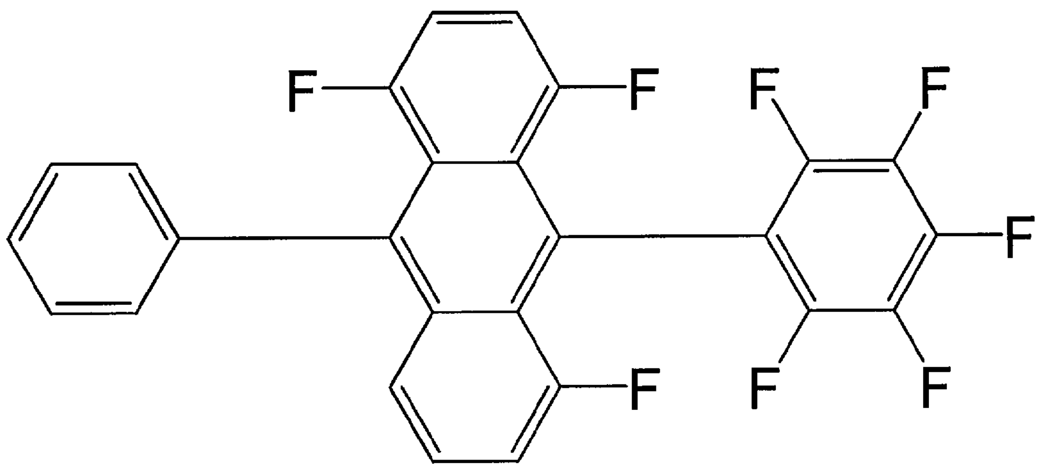
Figure 310:
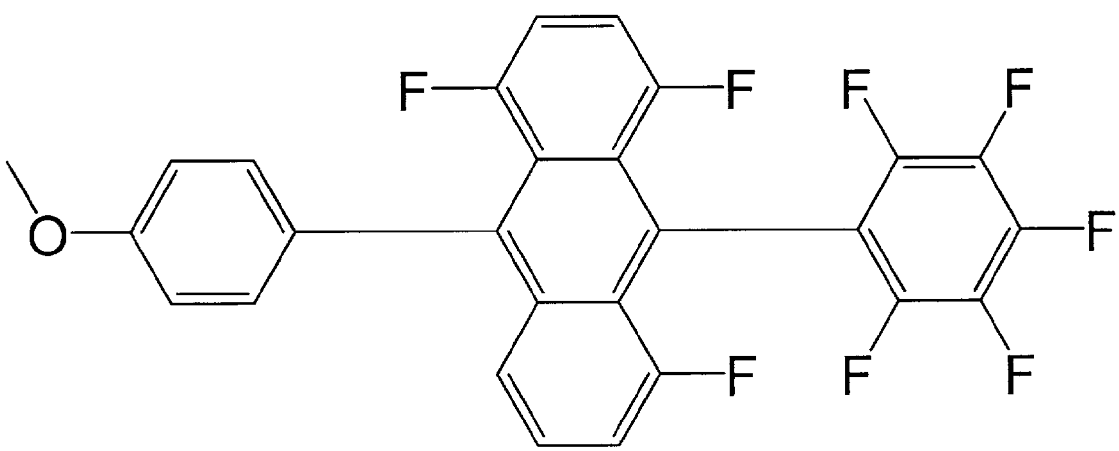
Figure 311:
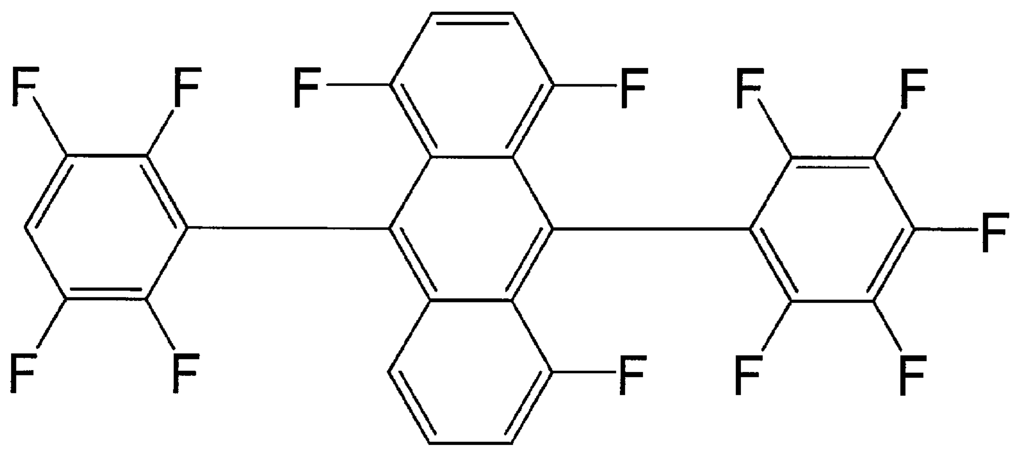
Figure 312:
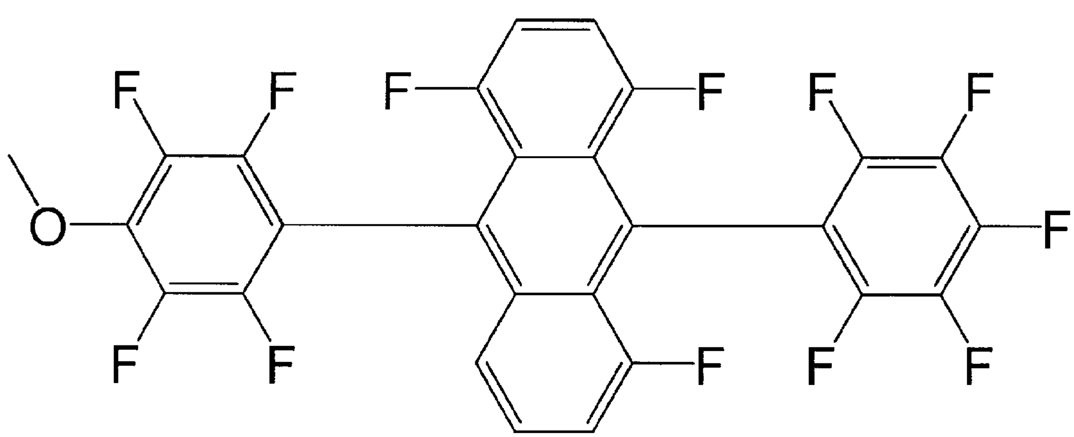
Figure 313:
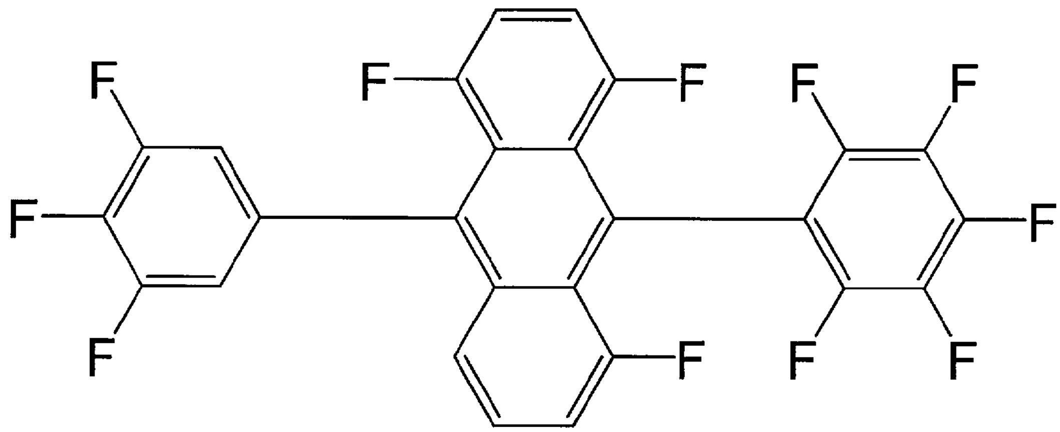
Figure 314:
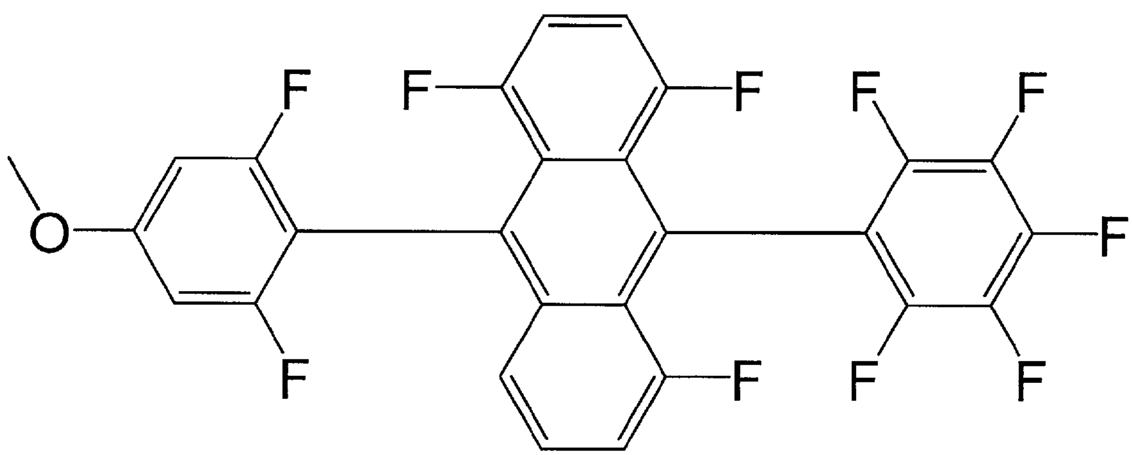
Figure 315:
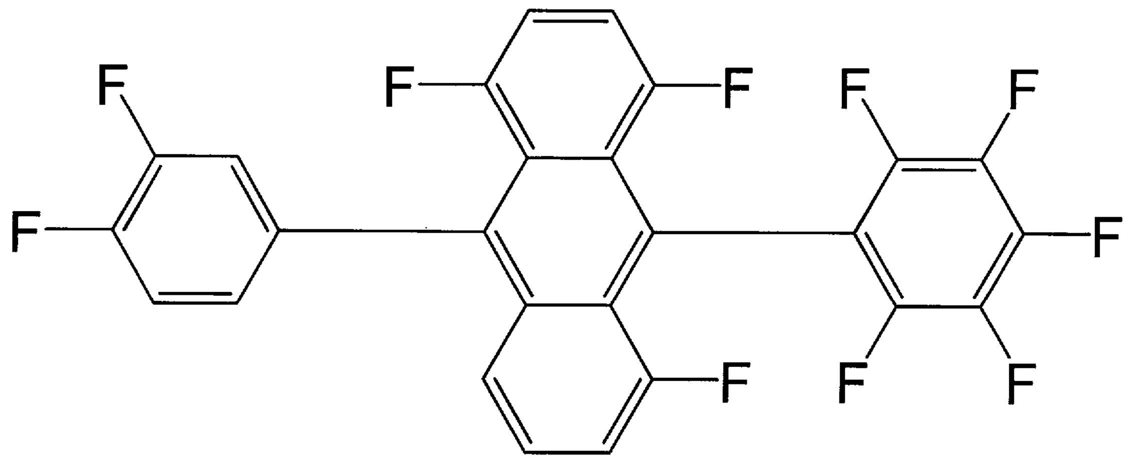
Figure 316:
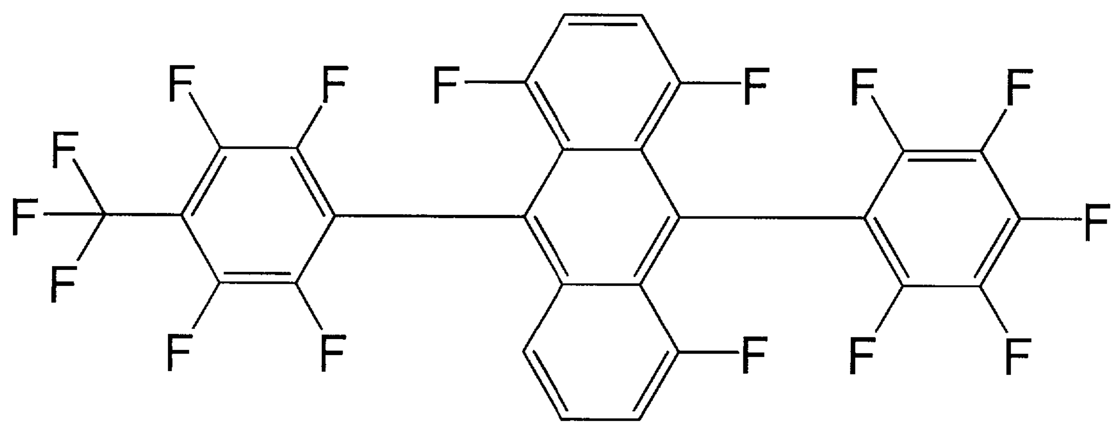
Figure 317:
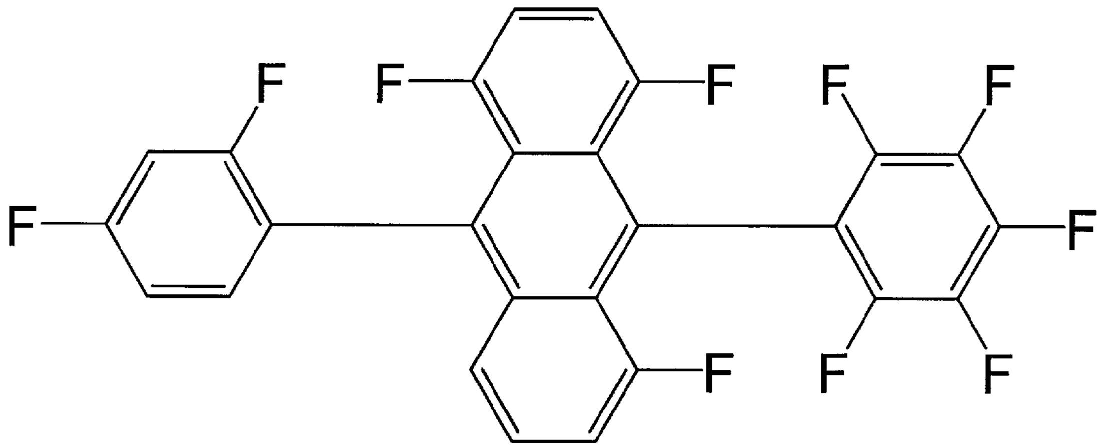
Figure 318:
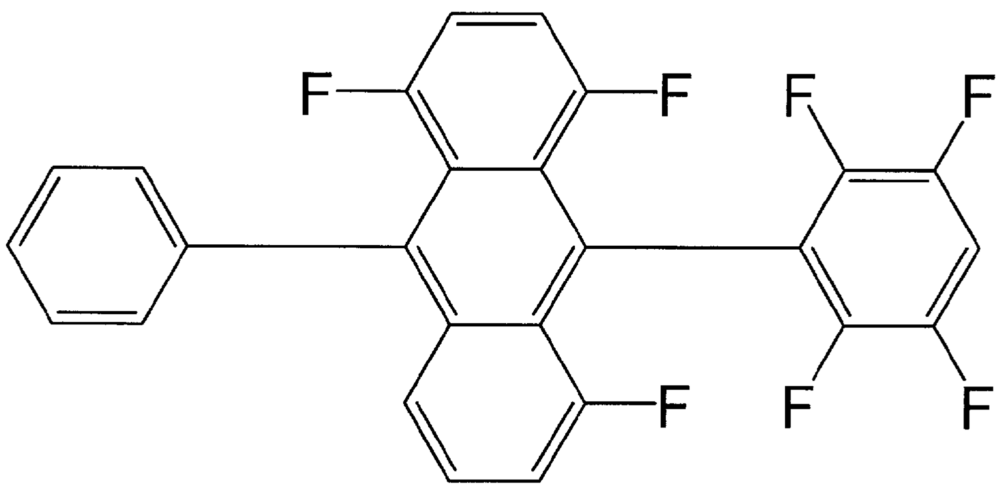
Figure 319:
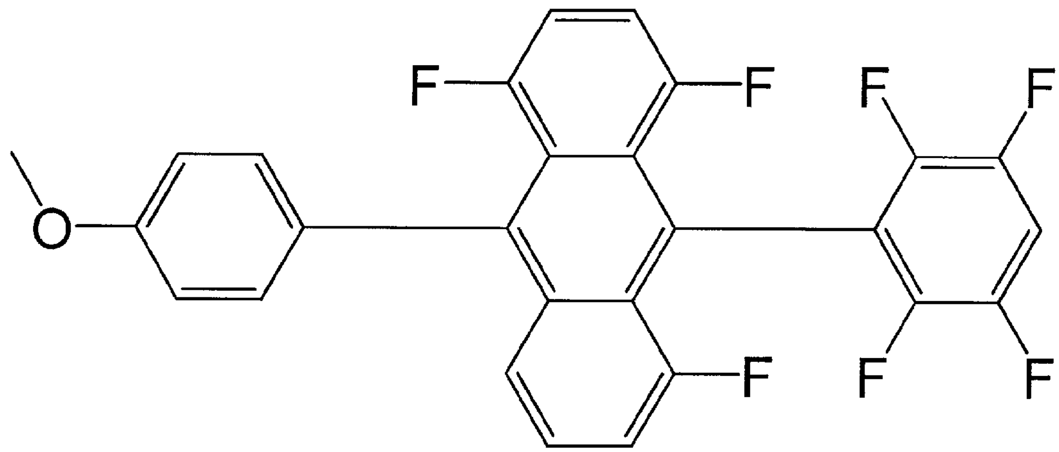
Figure 320:
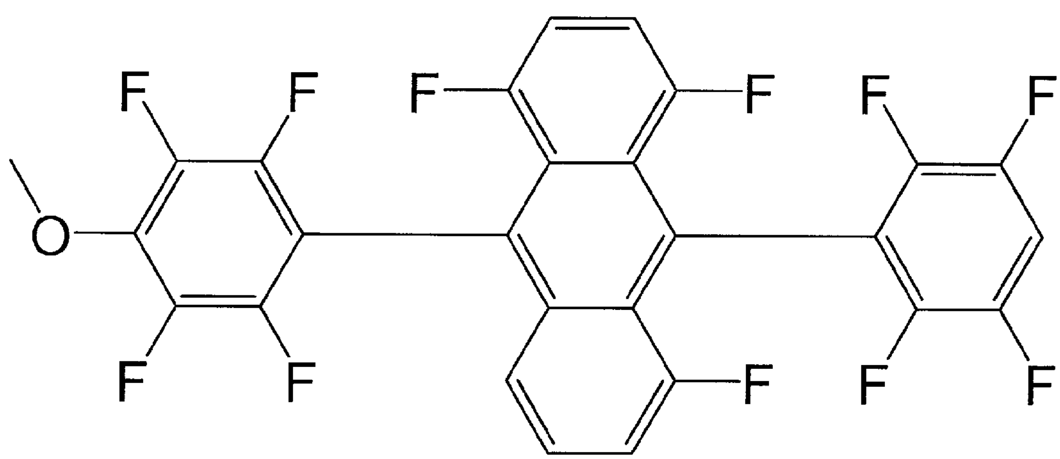
Figure 321:
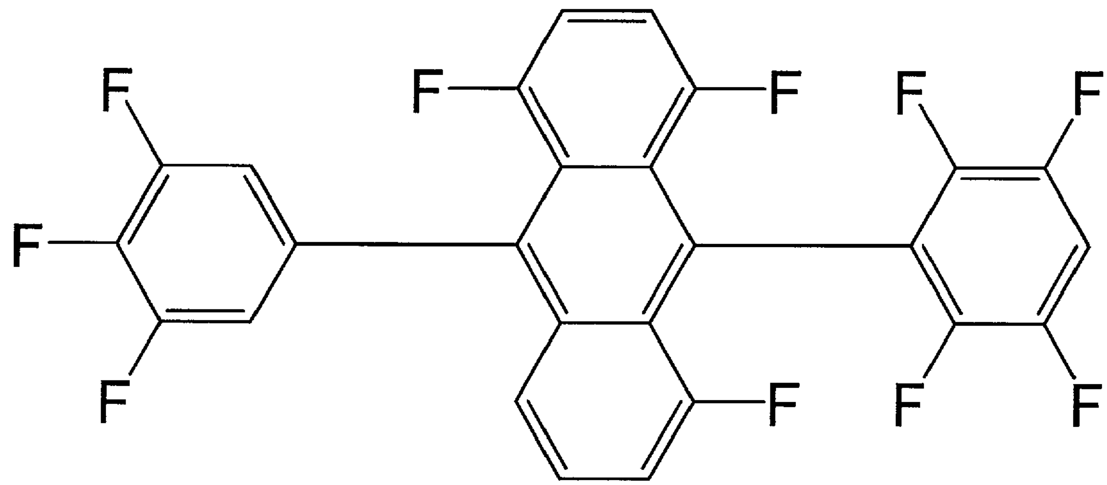
Figure 322:
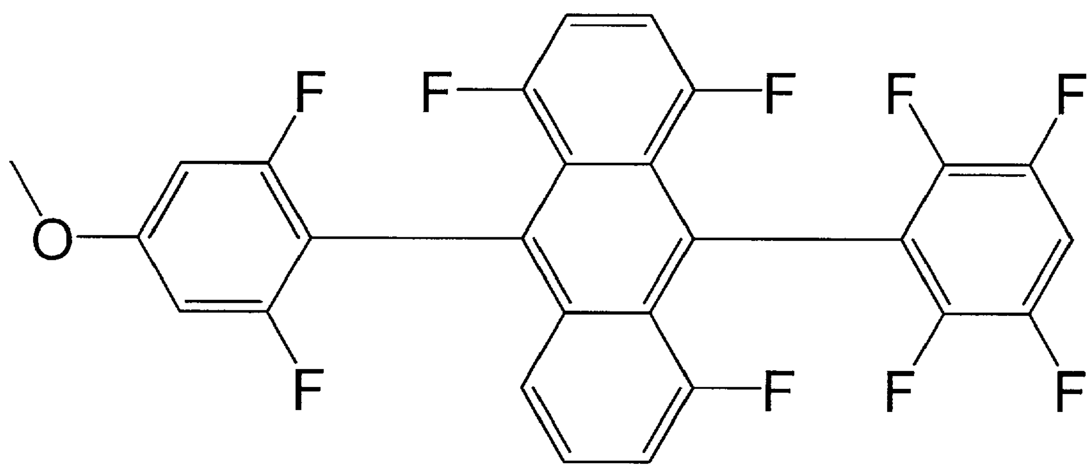
Figure 323:
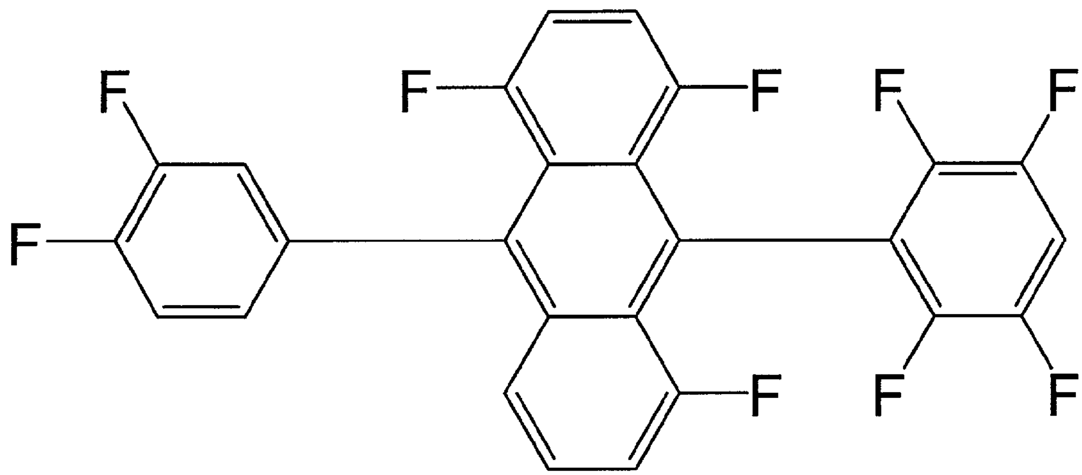
Figure 324:
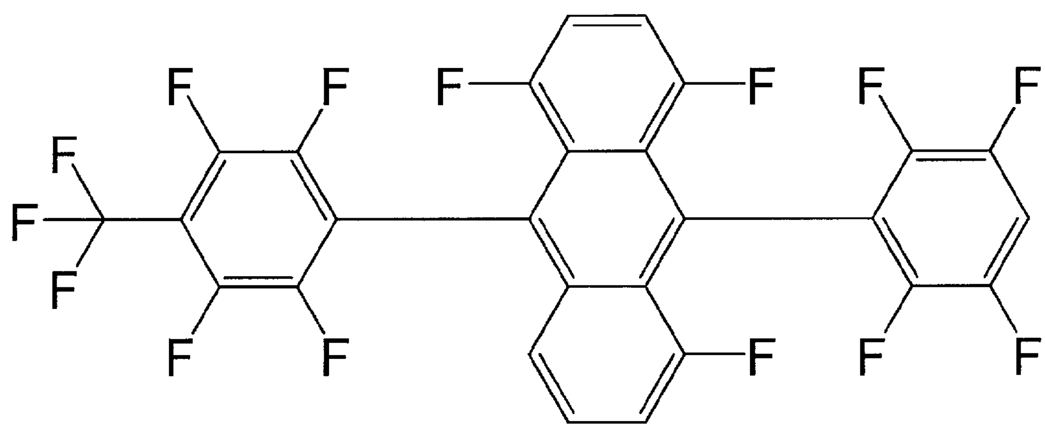
Figure 325:
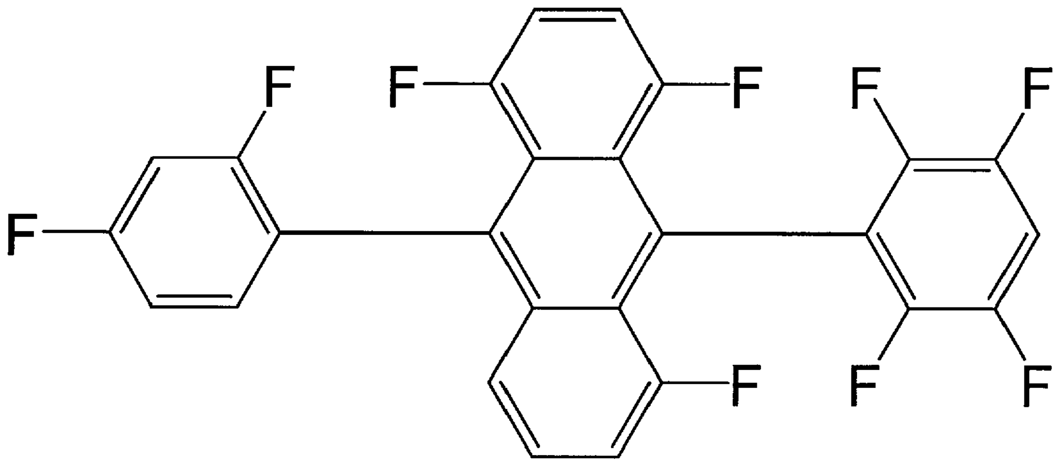
Figure 326:
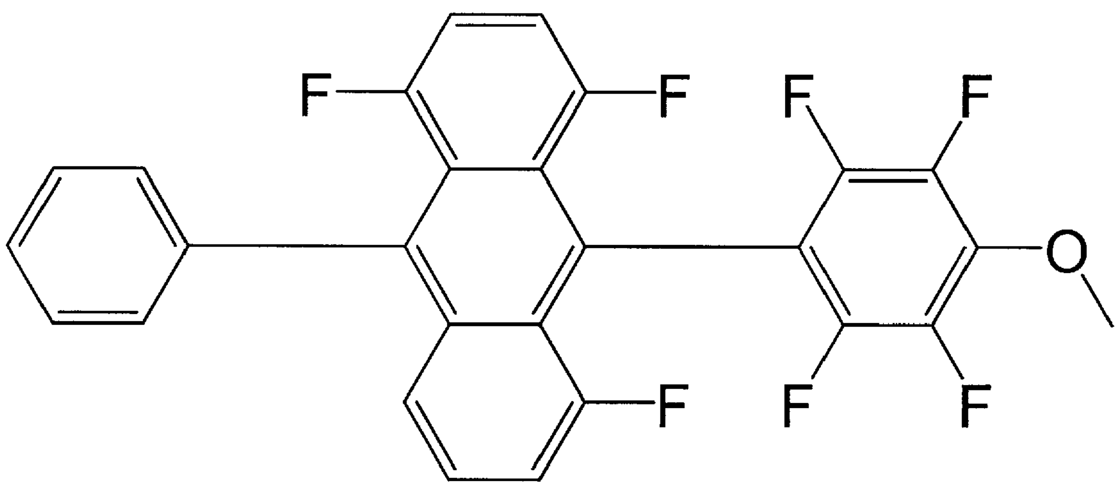
Figure 327:
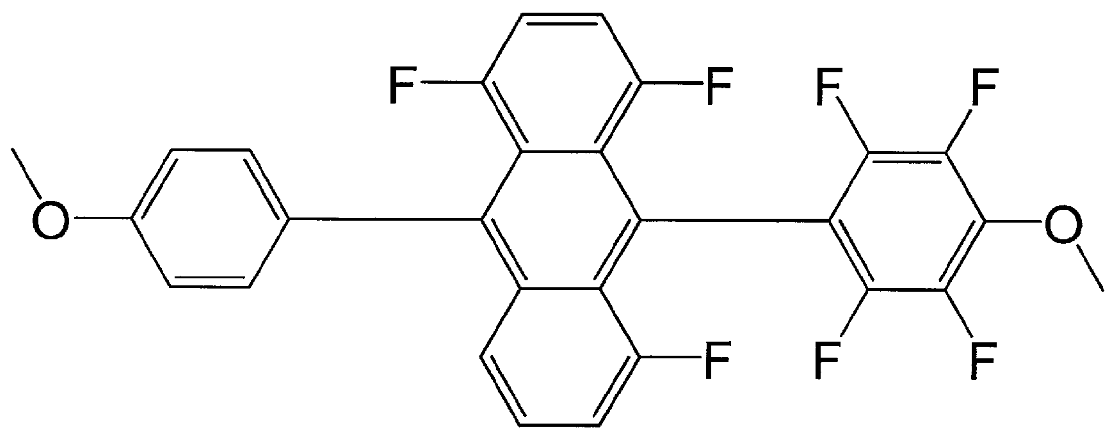
Figure 328:
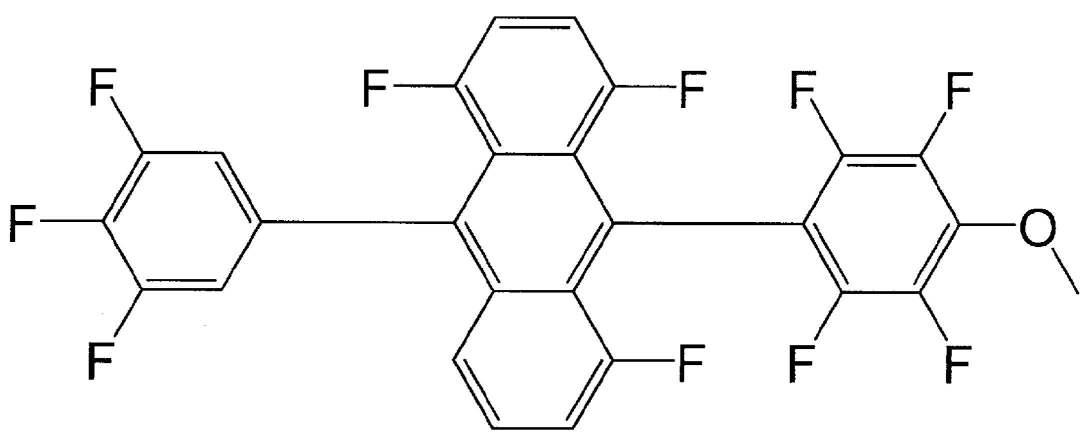
Figure 329:
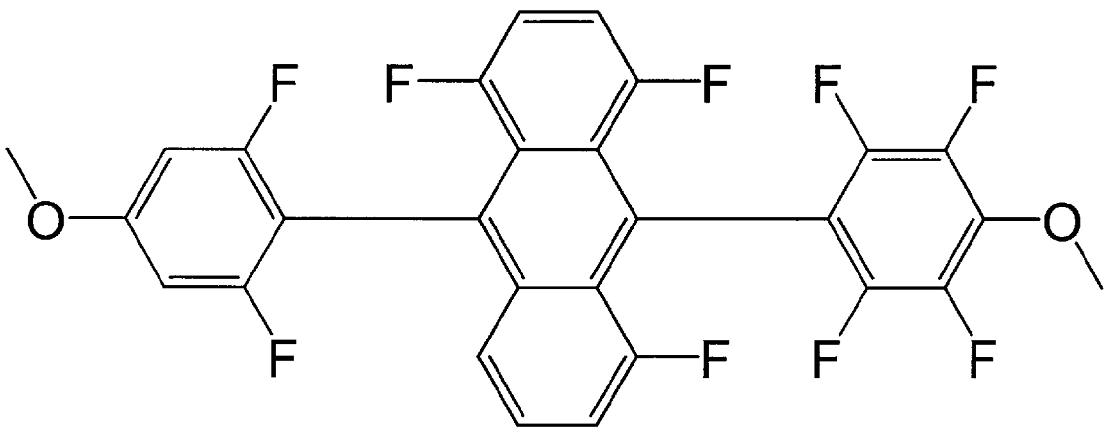
Figure 330:
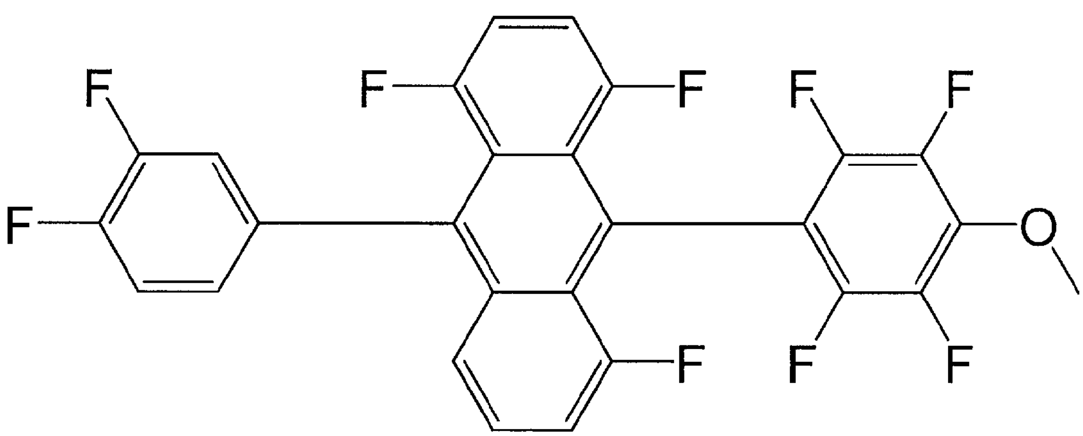
Figure 331:
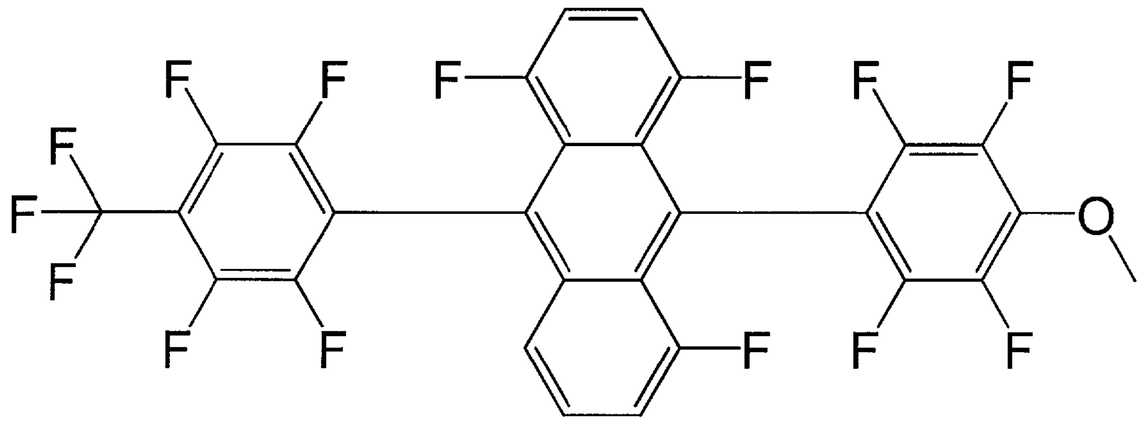
Figure 332:
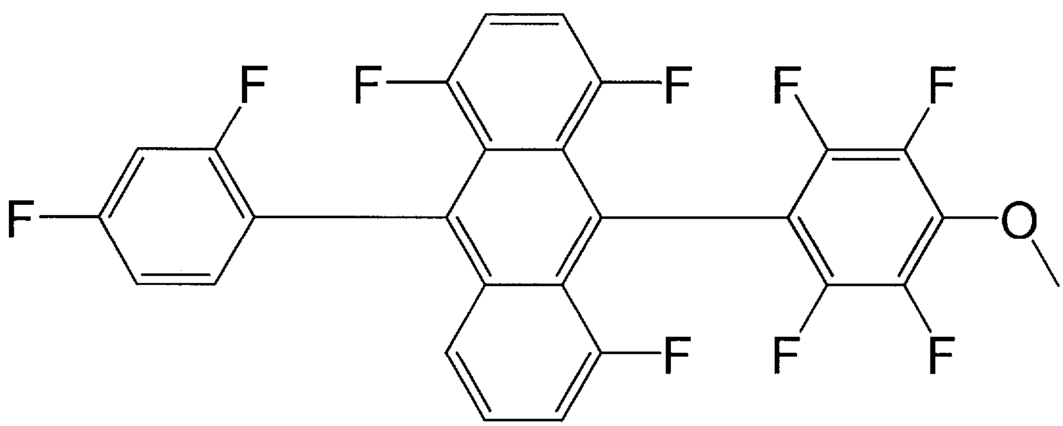
Figure 333:
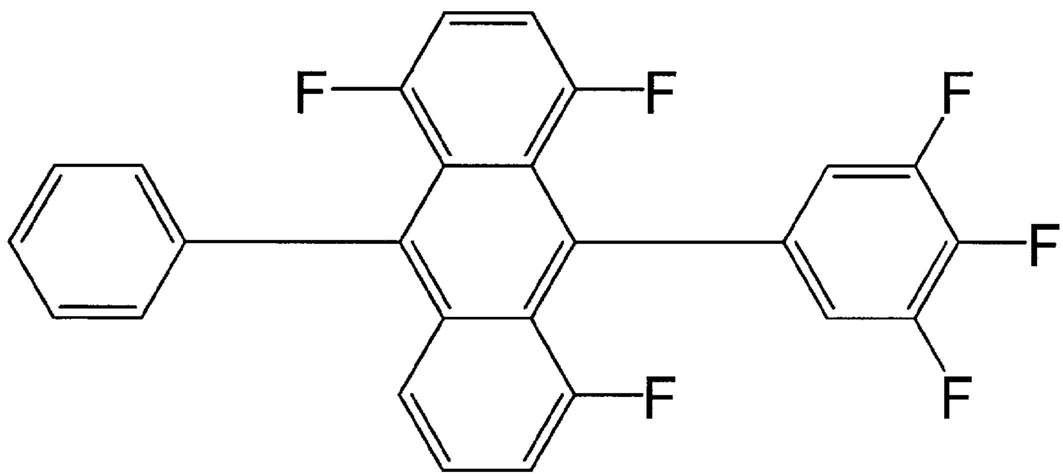
Figure 334:
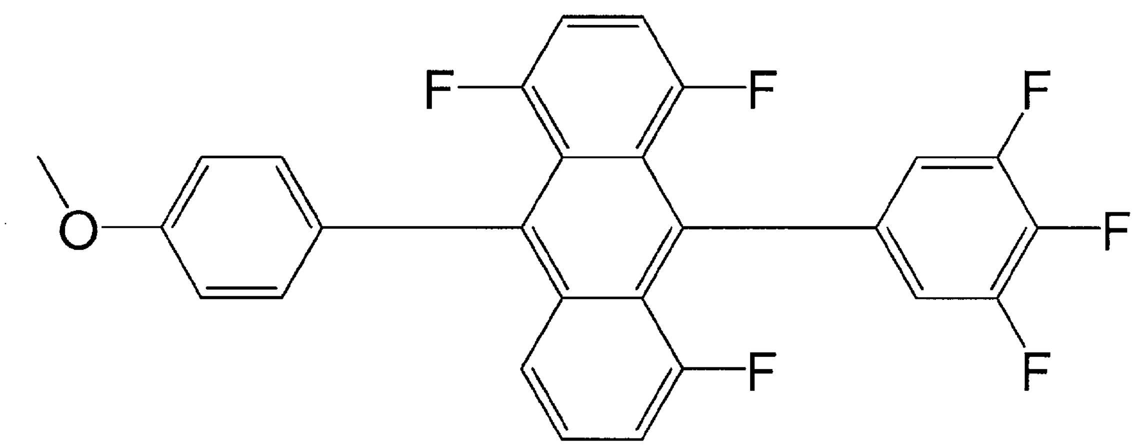
Figure 335:
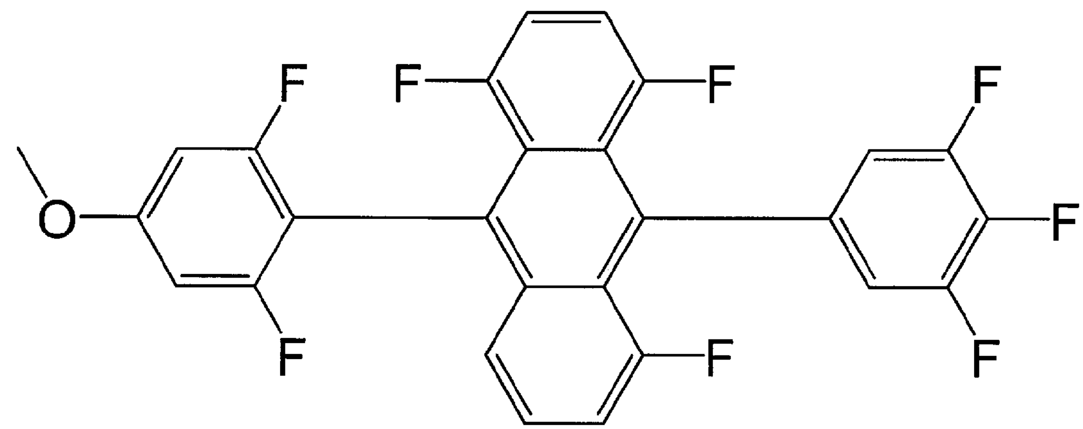
Figure 336:
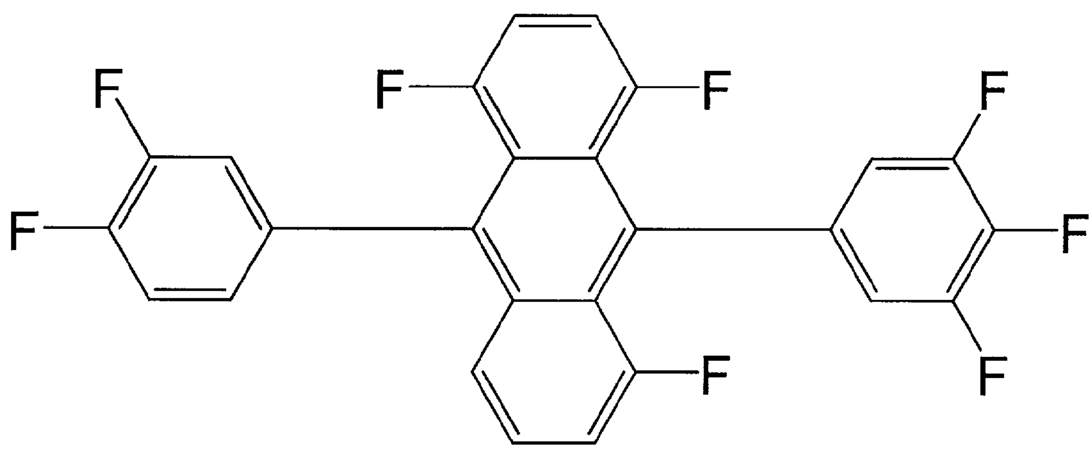
Figure 337:
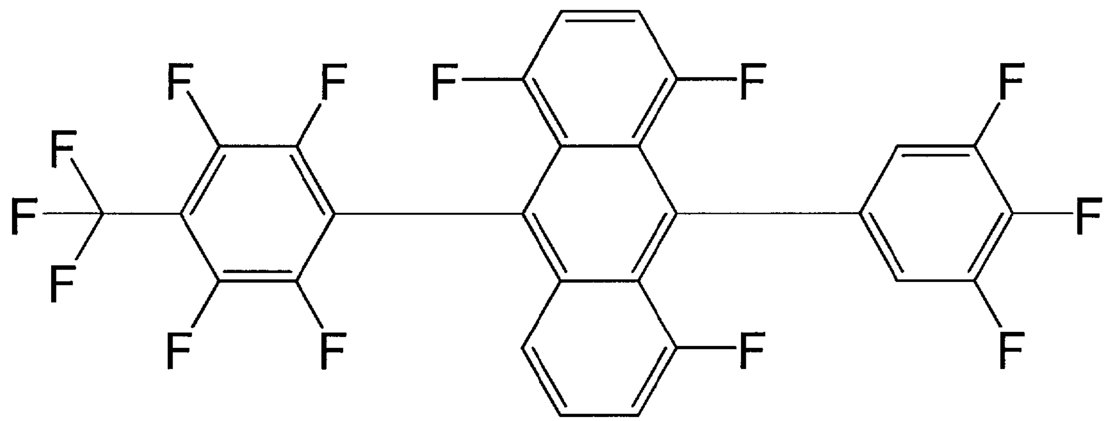
Figure 338:
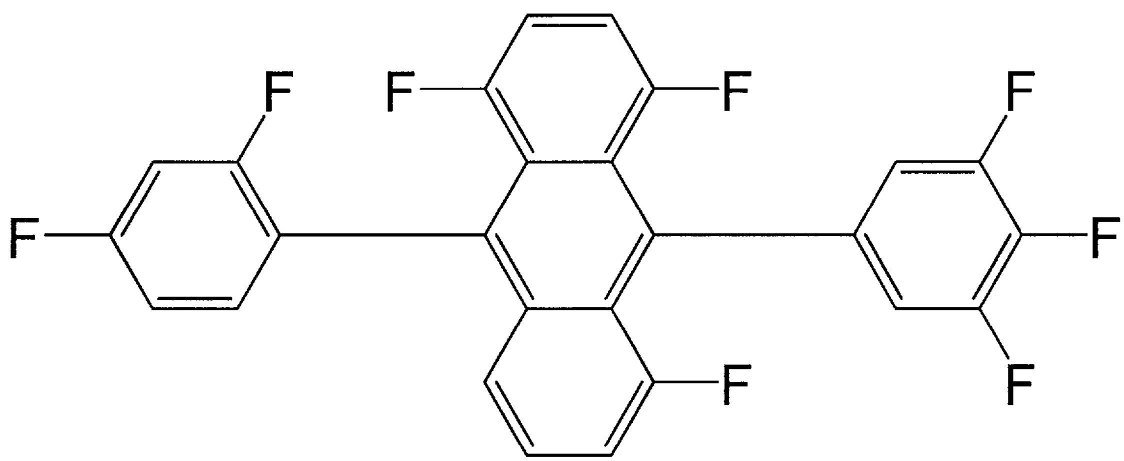
Figure 339:
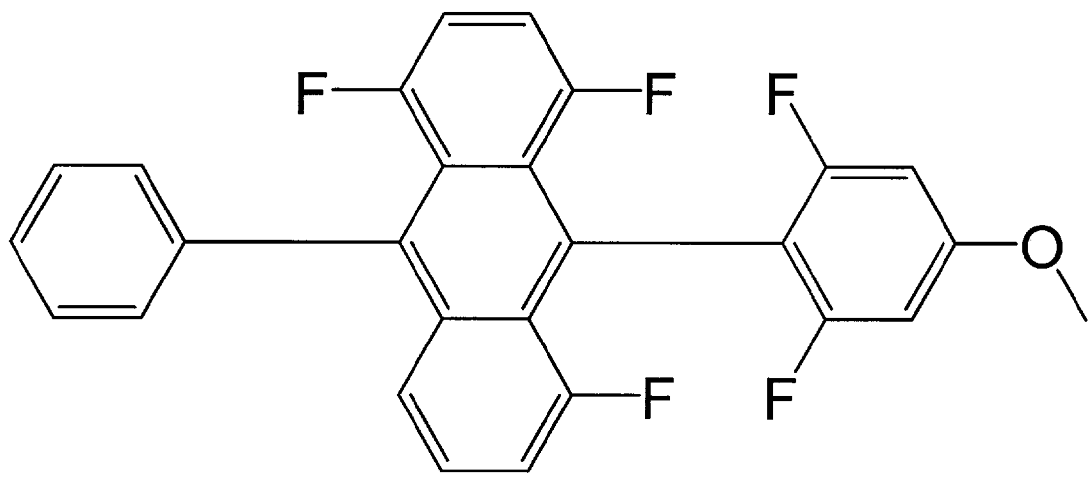
Figure 340:
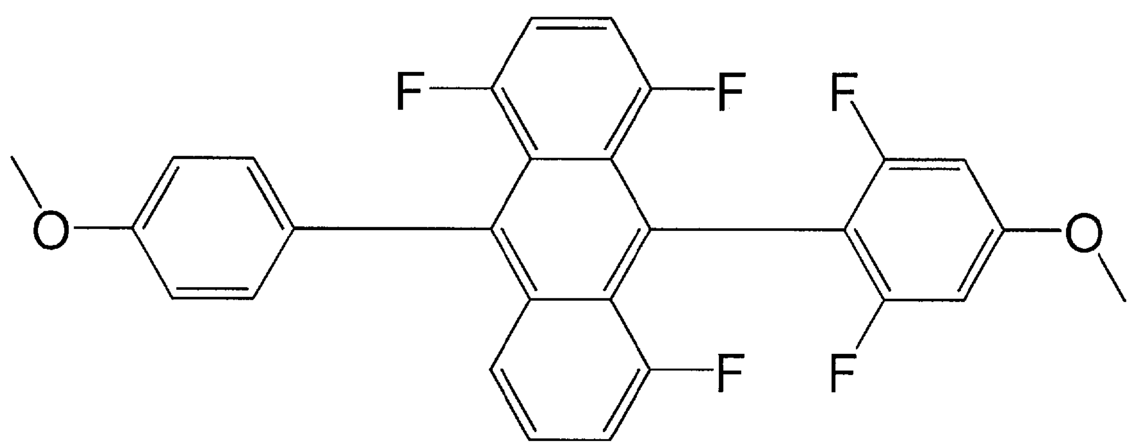
Figure 341:
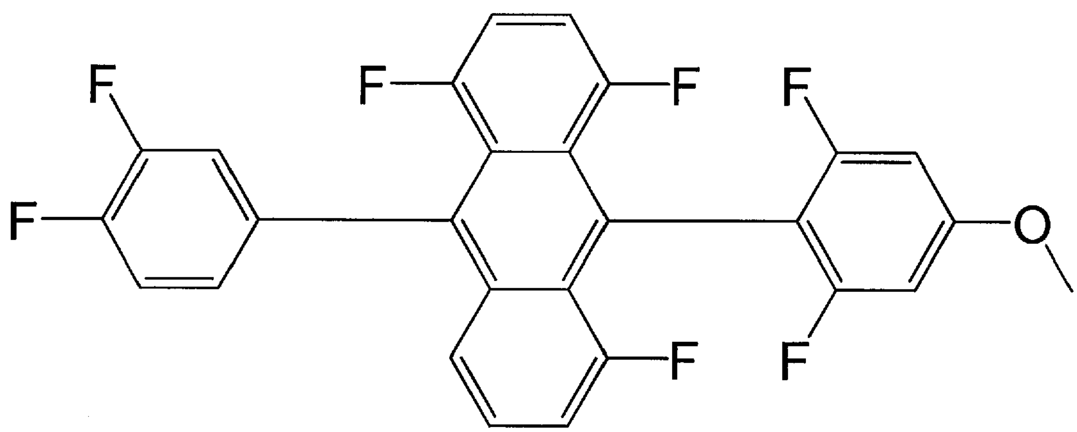
Figure 342:
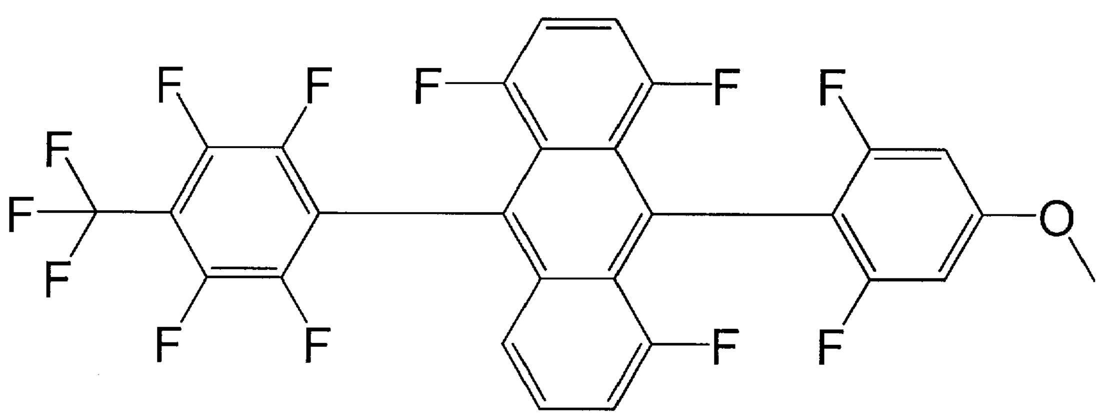
Figure 343:
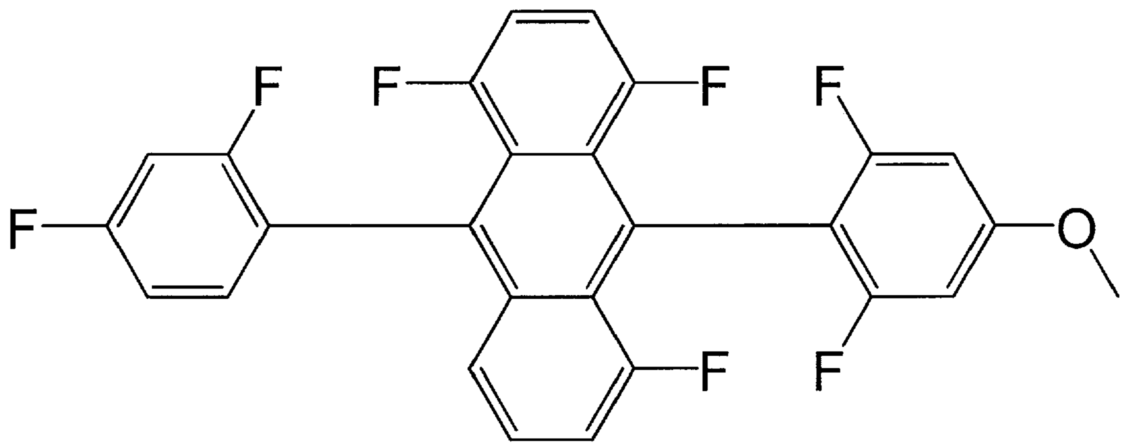
Figure 344:
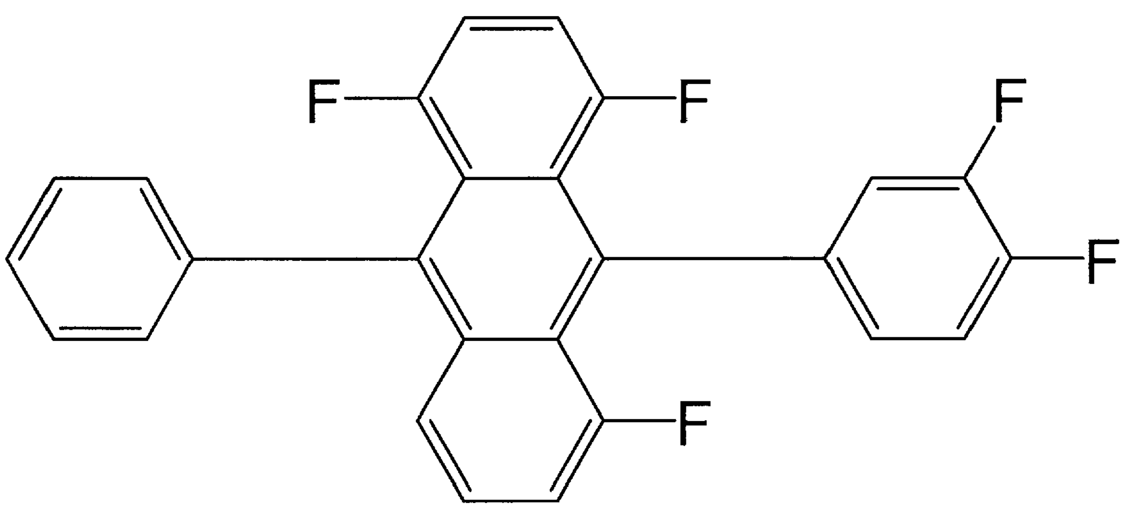
Figure 345:
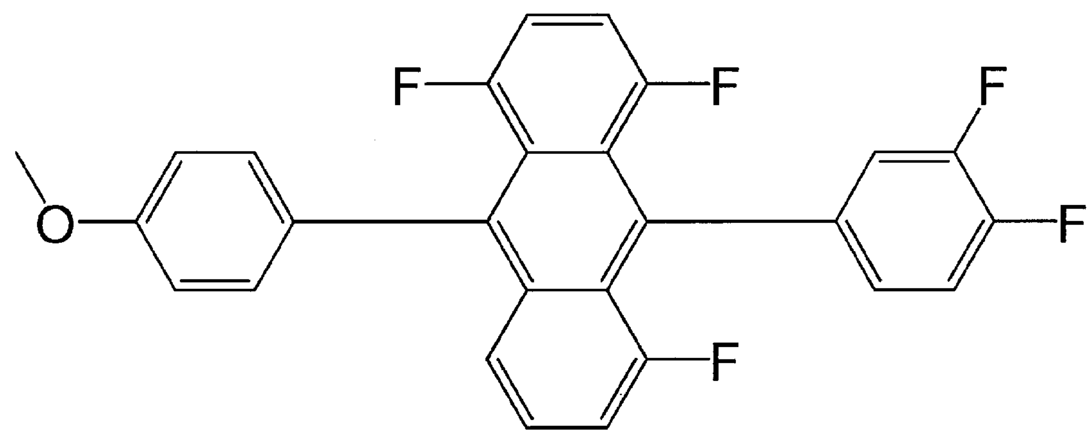
Figure 346:
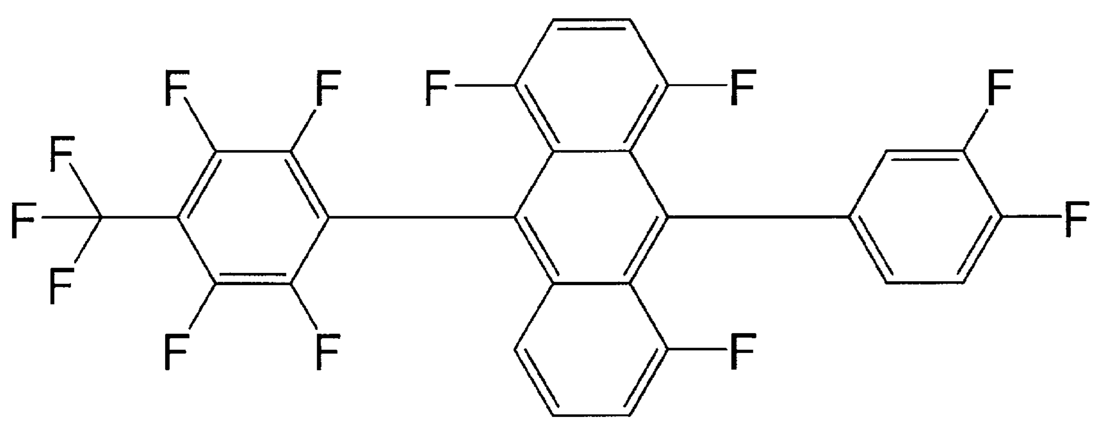
Figure 347:
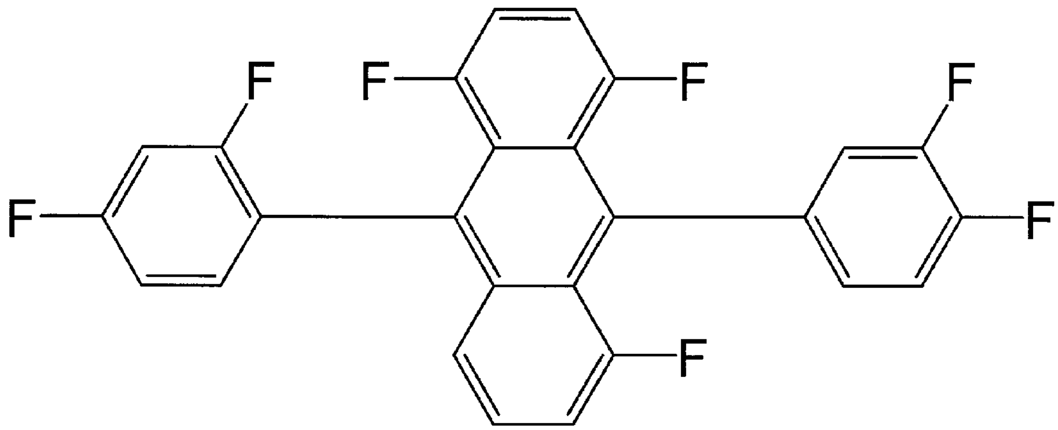
Figure 348:
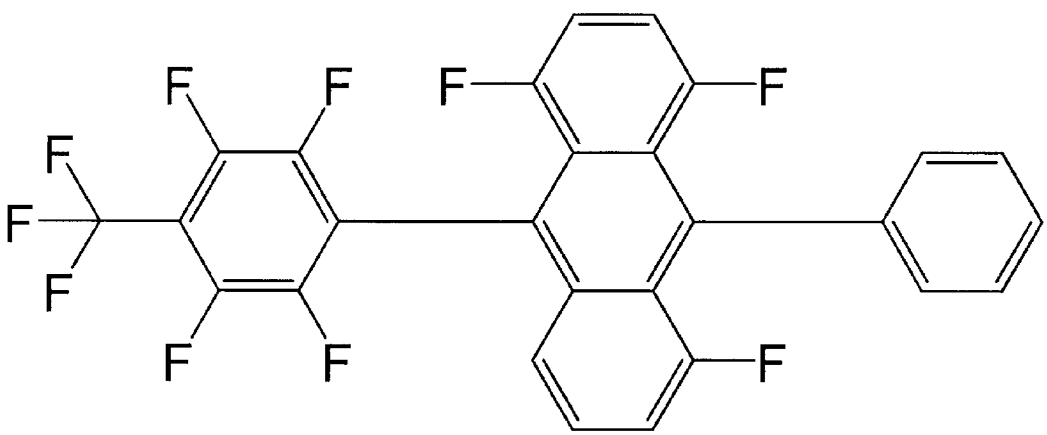
Figure 349:
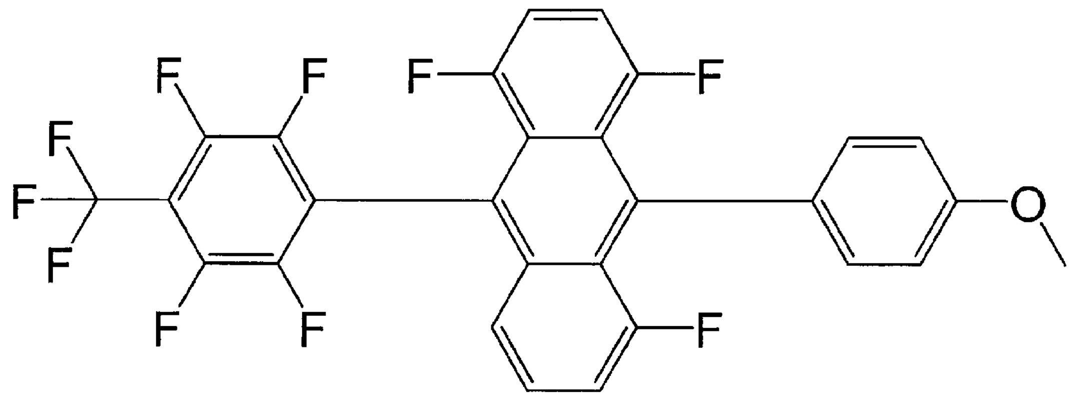
Figure 350:
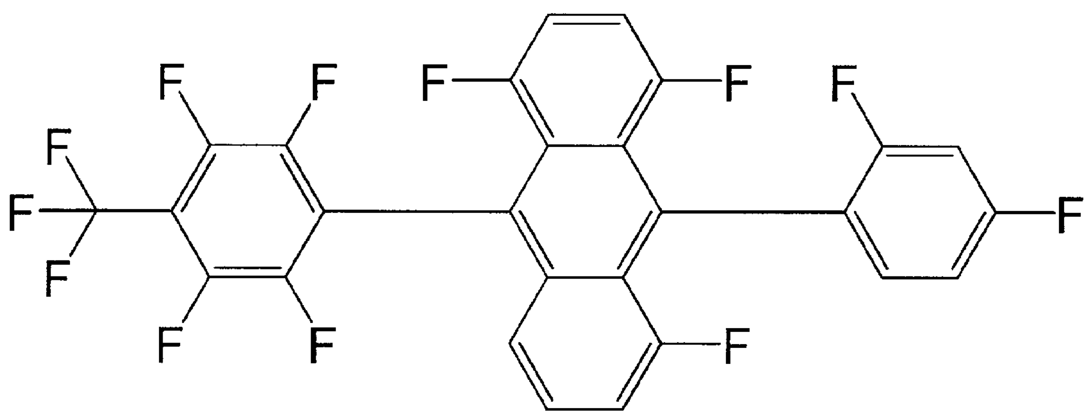
Figure 351:
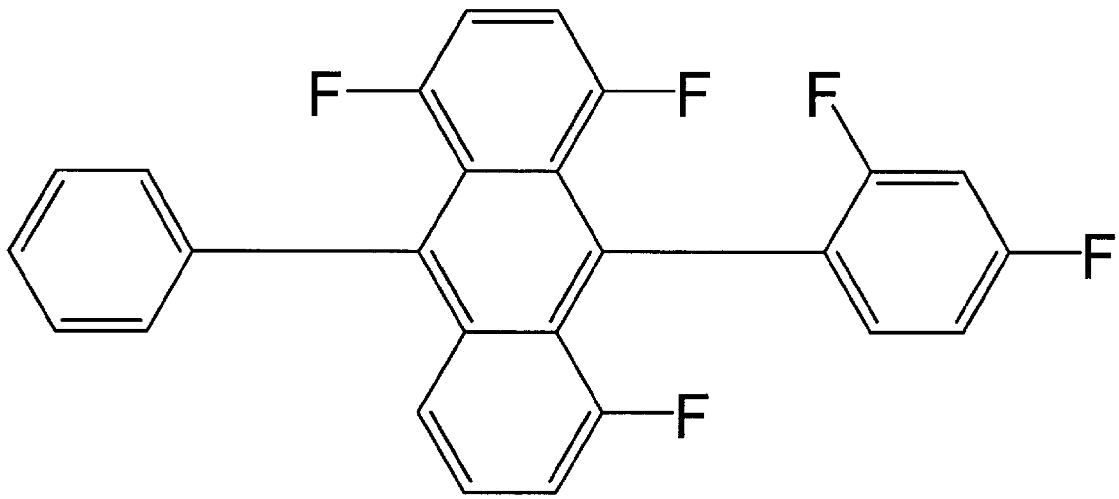
Figure 352:
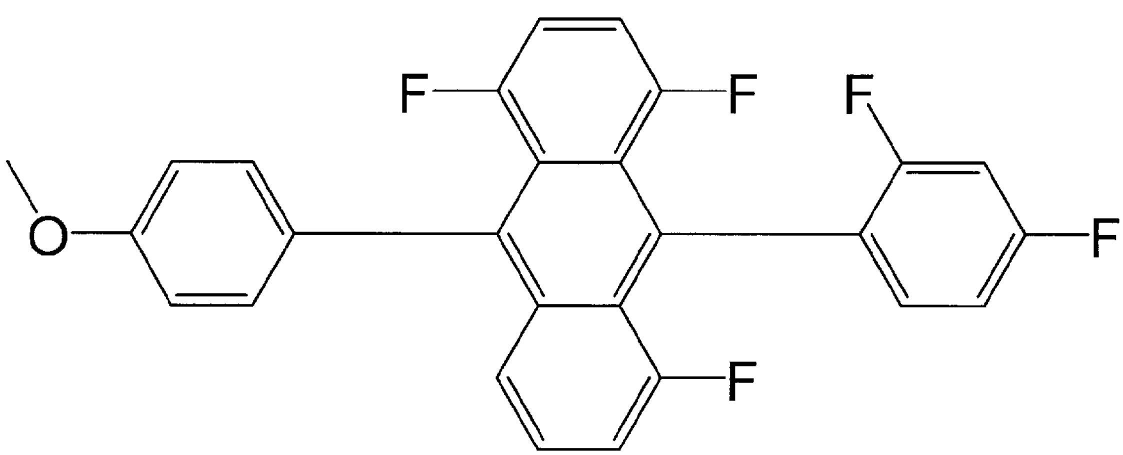
Figure 353:
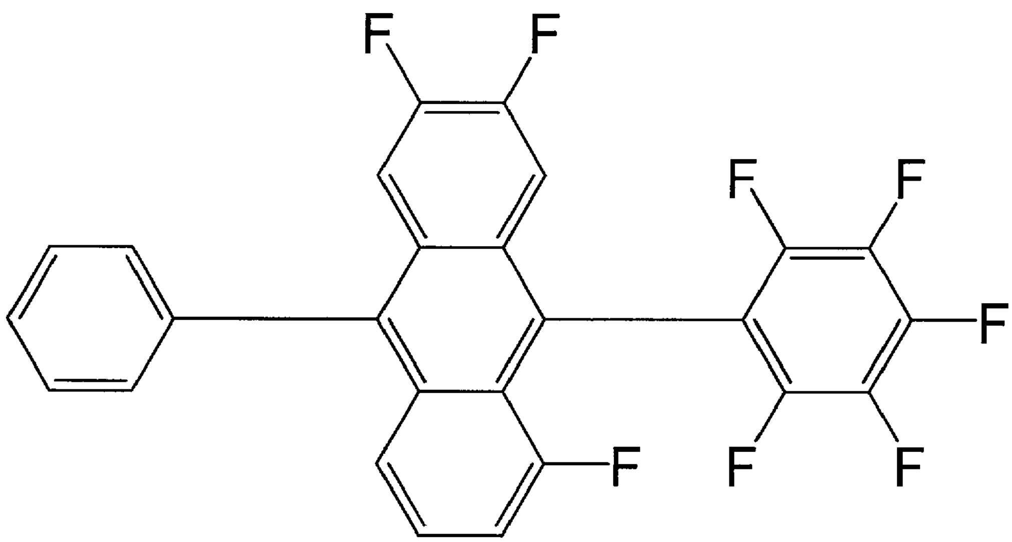
Figure 354:
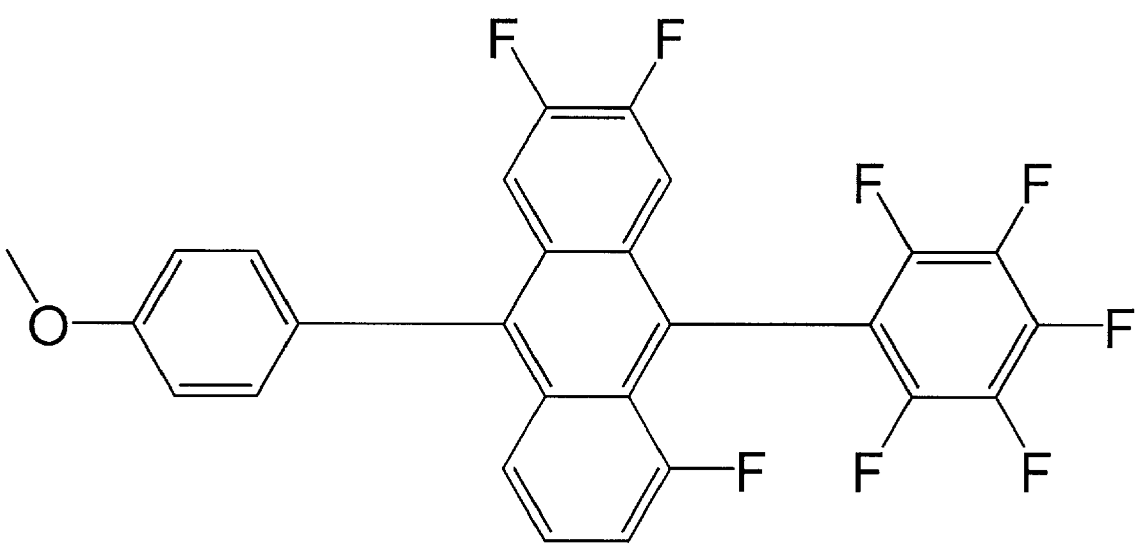
Figure 355:
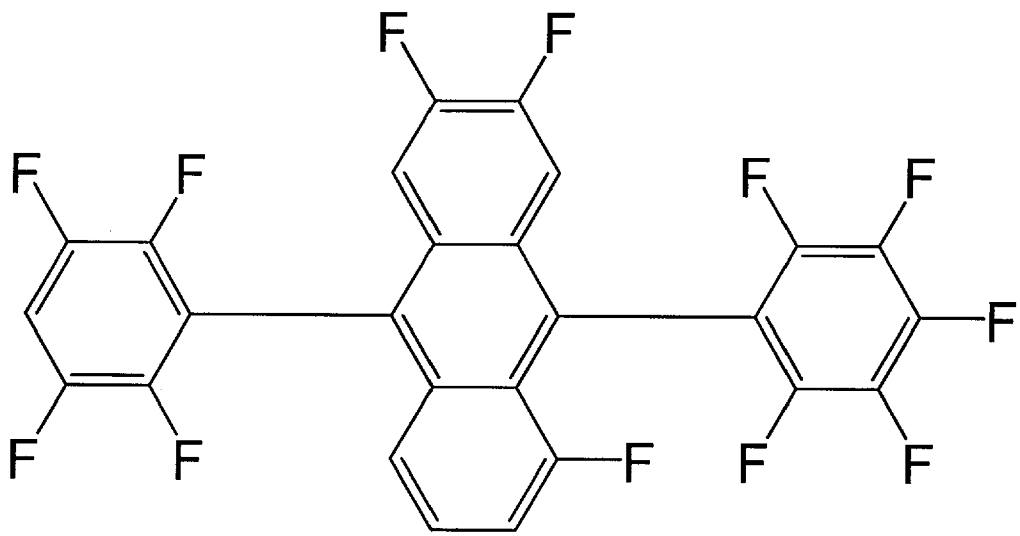
Figure 356:
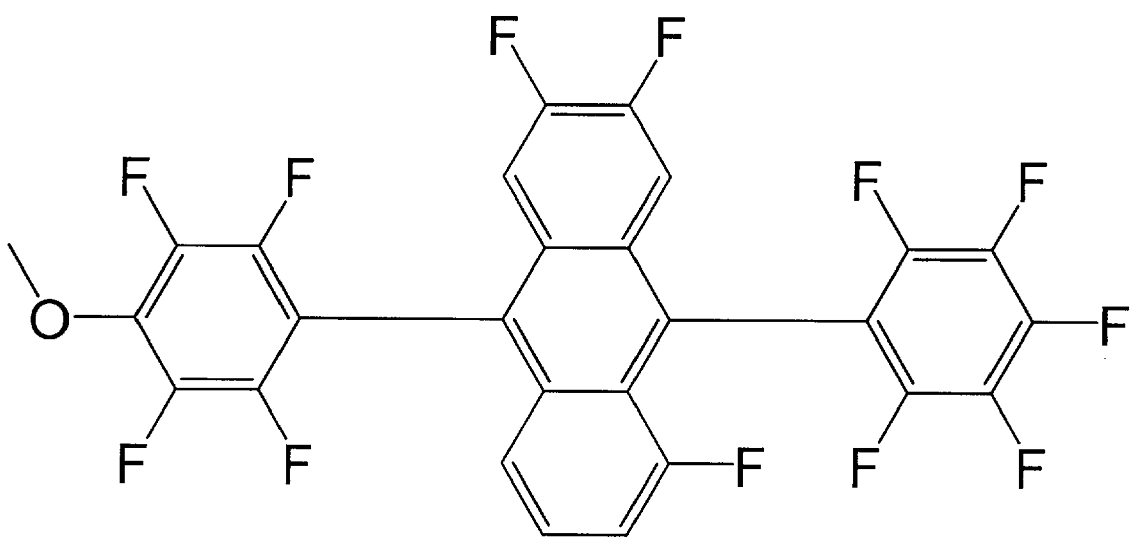
Figure 357:
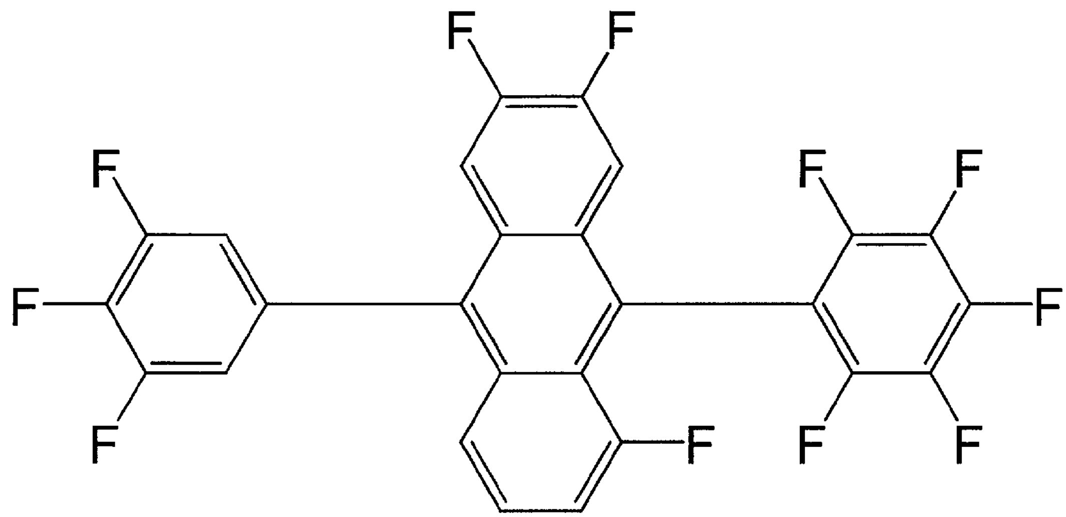
Figure 358:
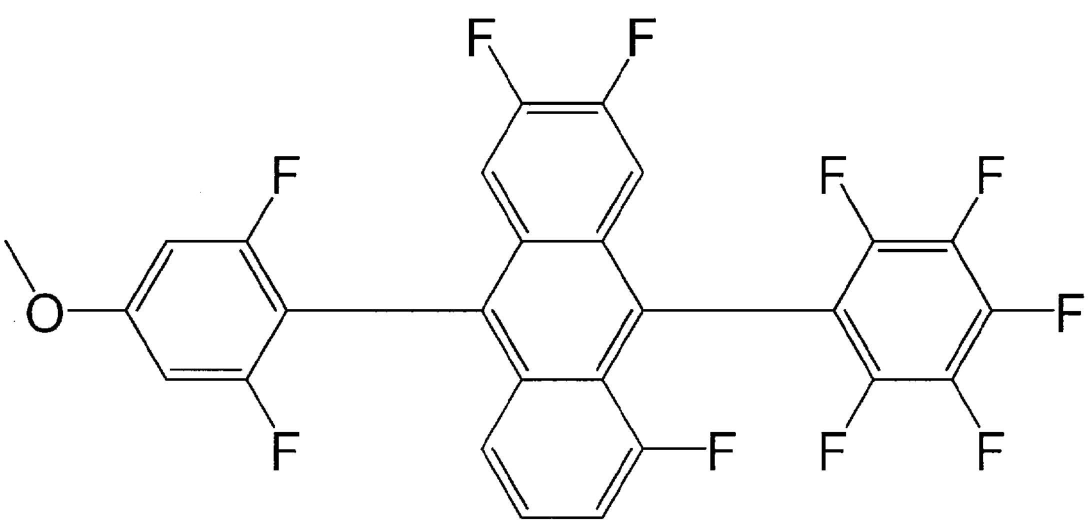
Figure 359:
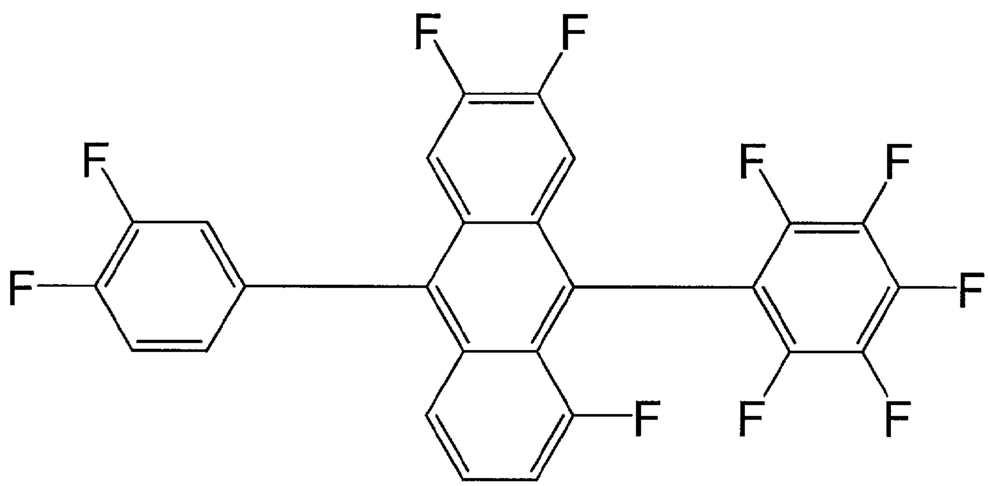
Figure 360:
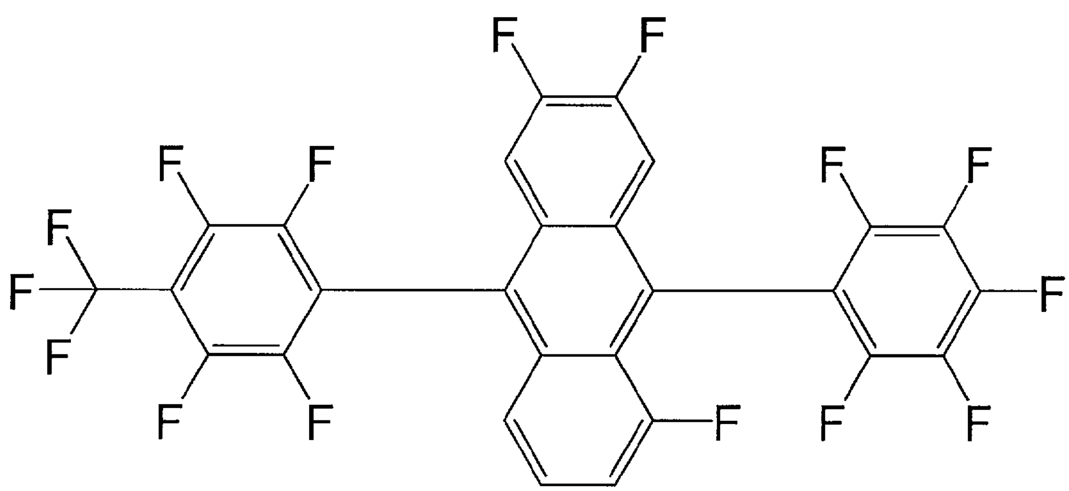
Figure 361:
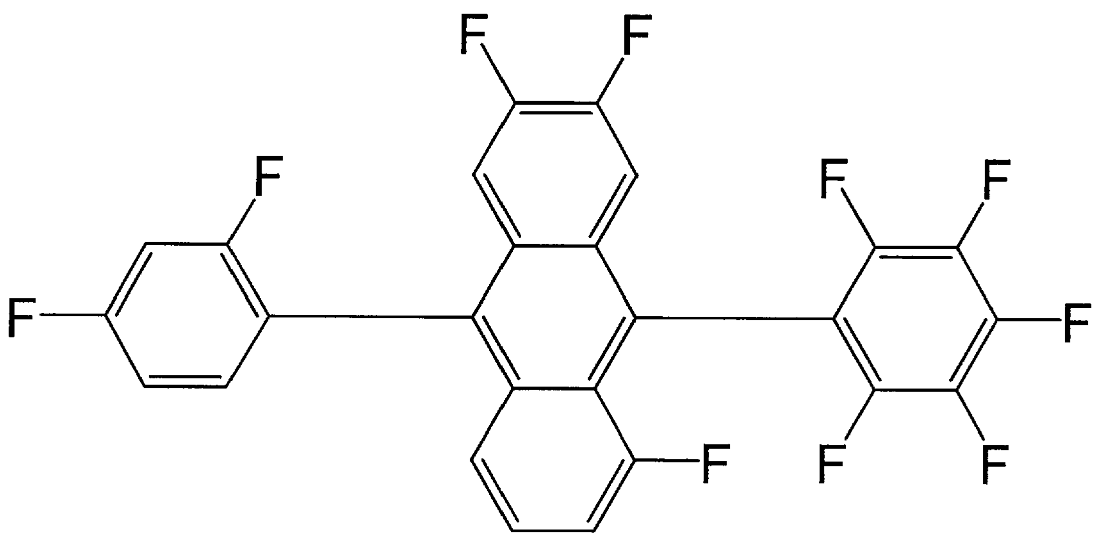
Figure 362:
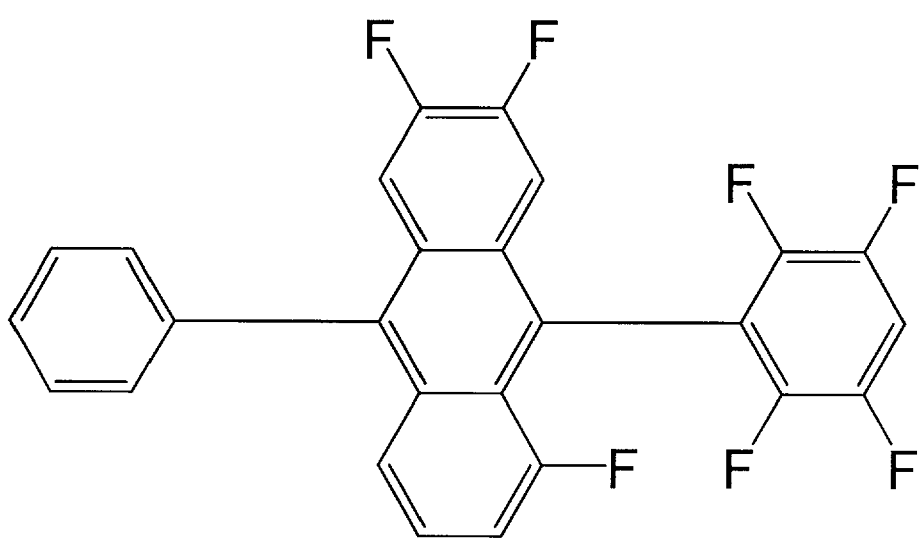
Figure 363:
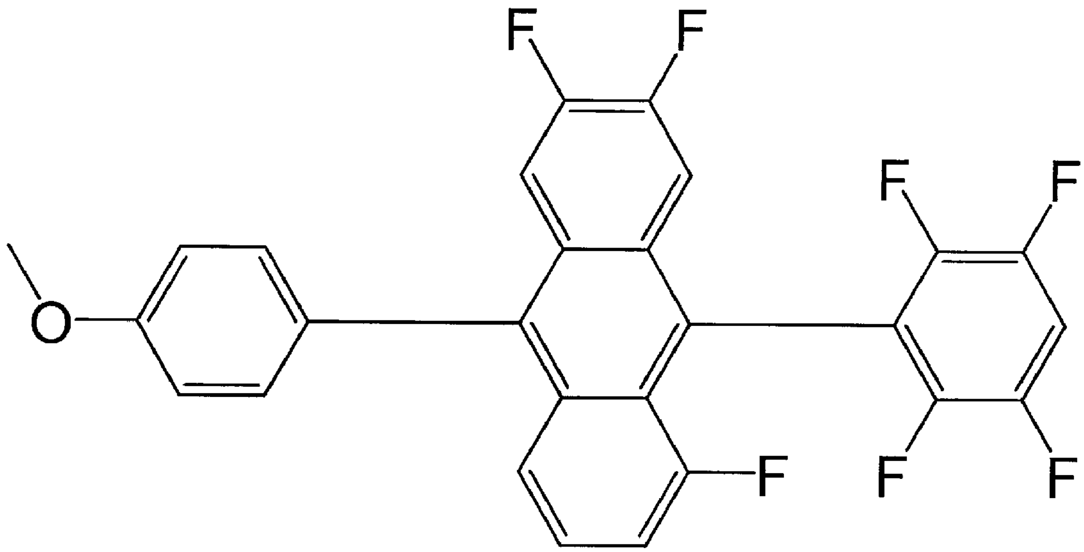
Figure 364:
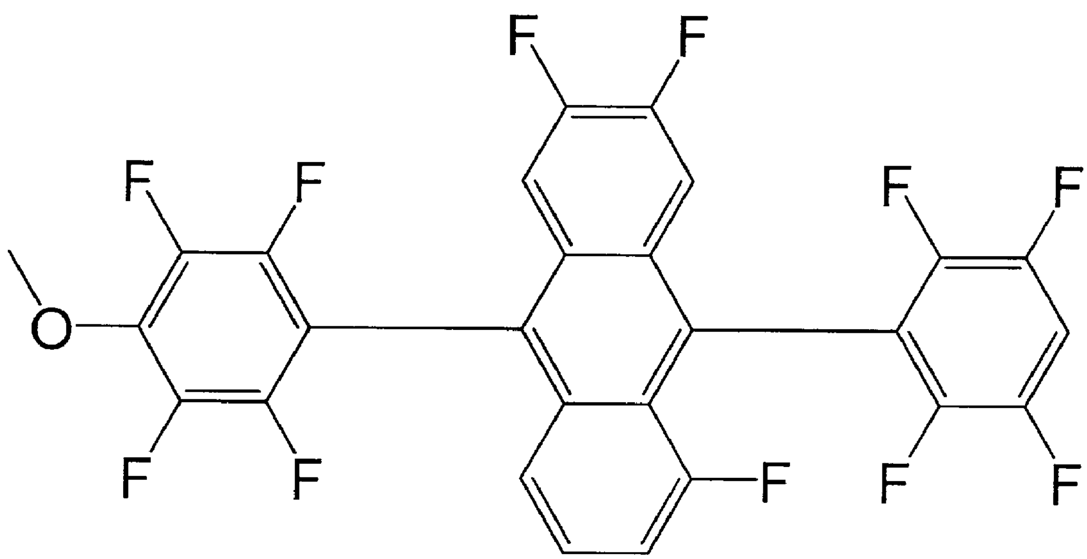
Figure 365:
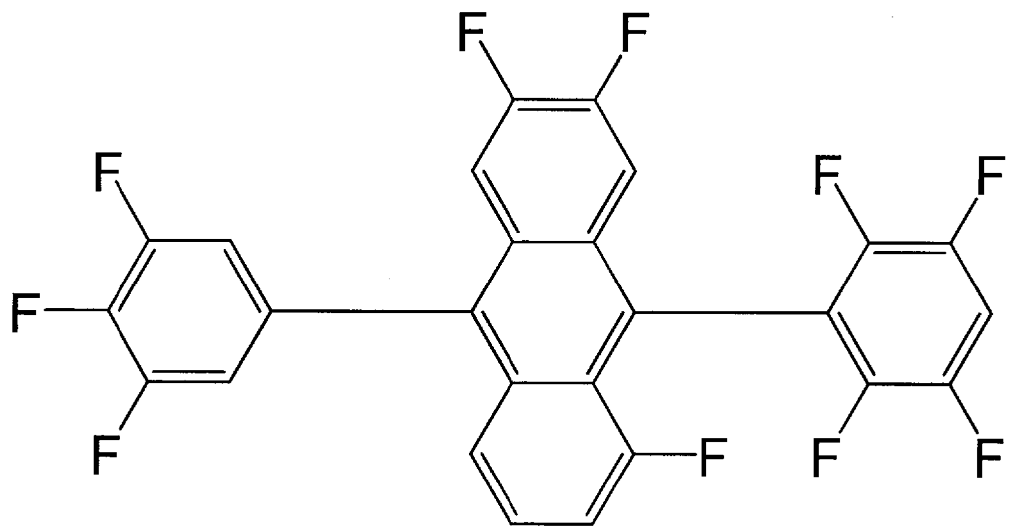
Figure 366:
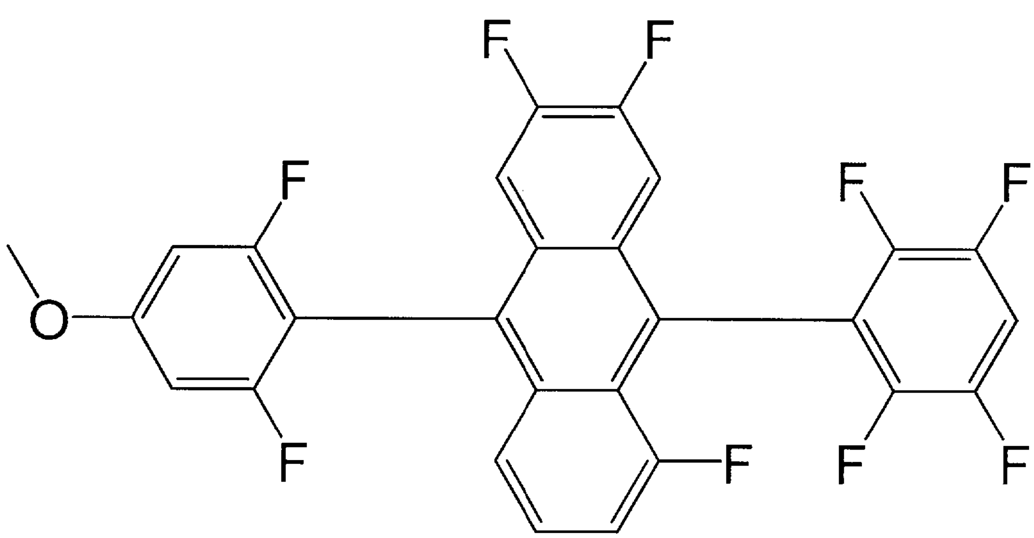
Figure 367:
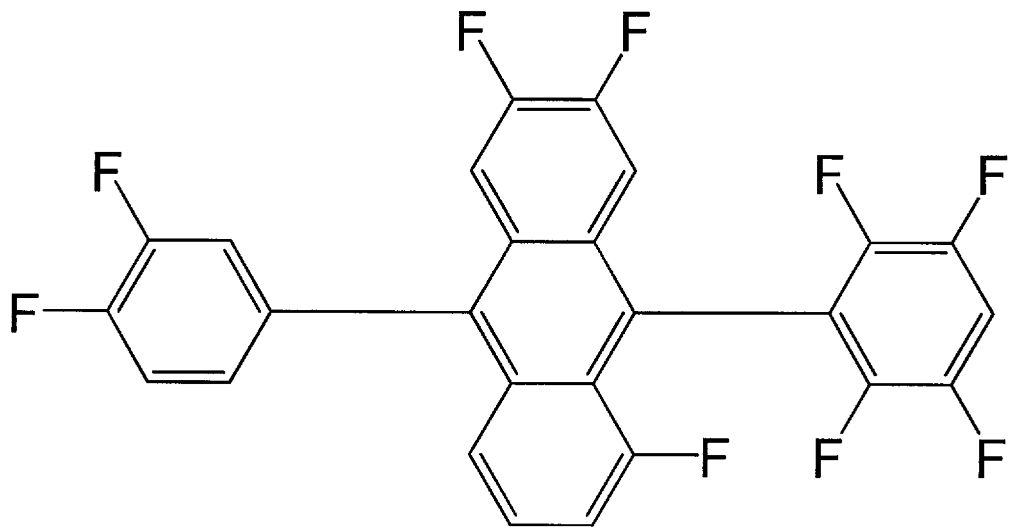
Figure 368:
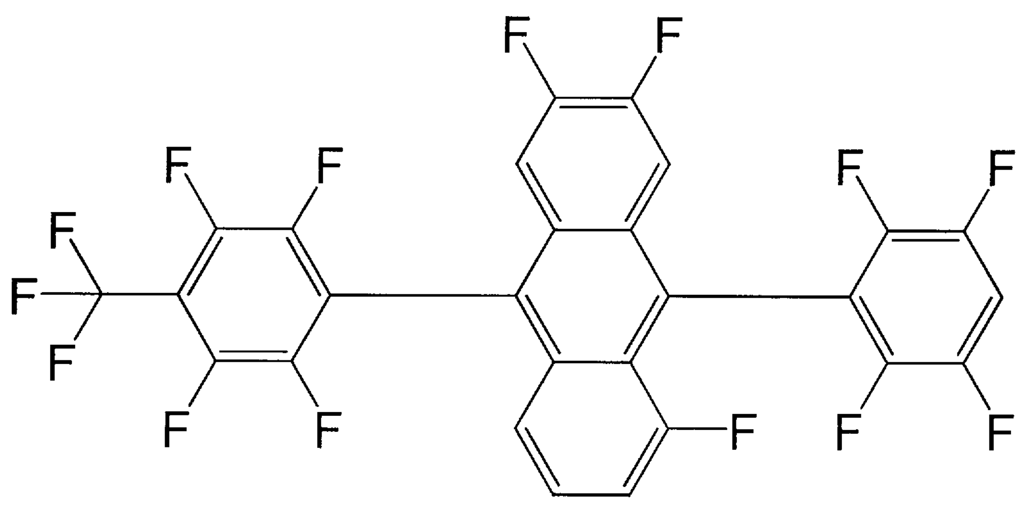
Figure 369:
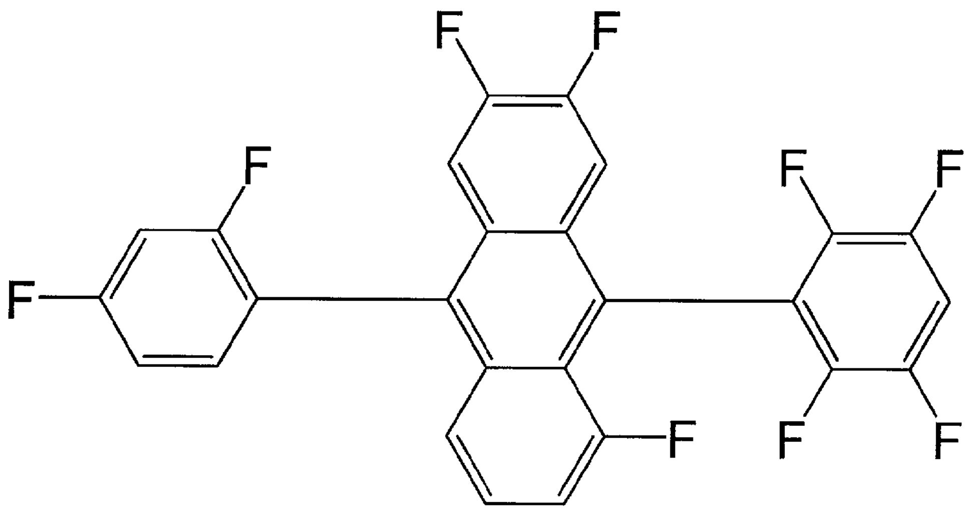
Figure 370:
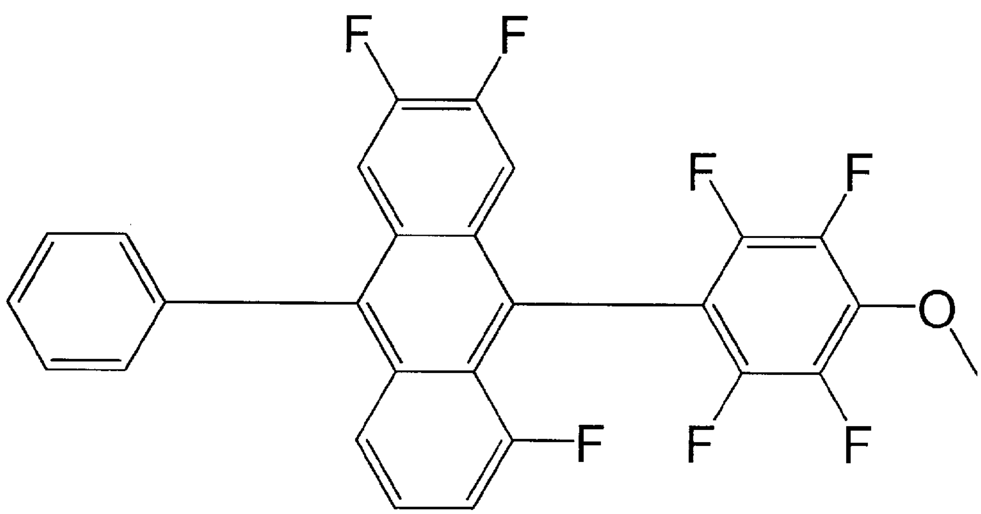
Figure 371:
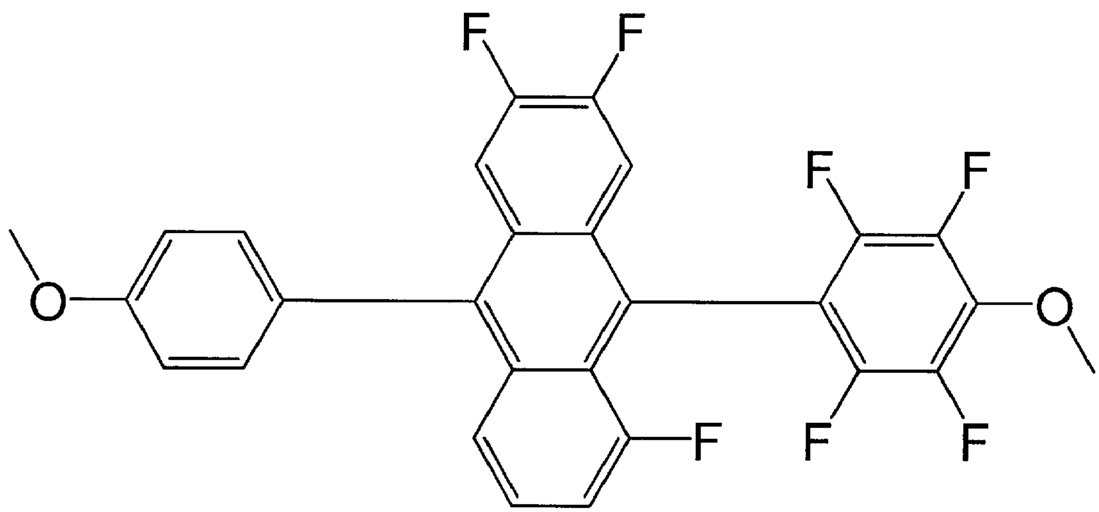
Figure 372:
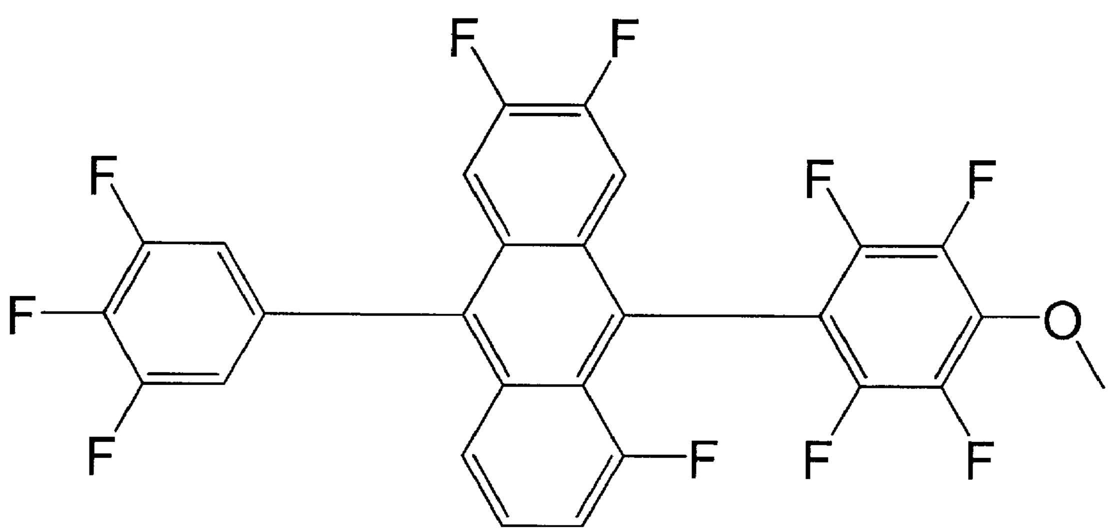
Figure 373:
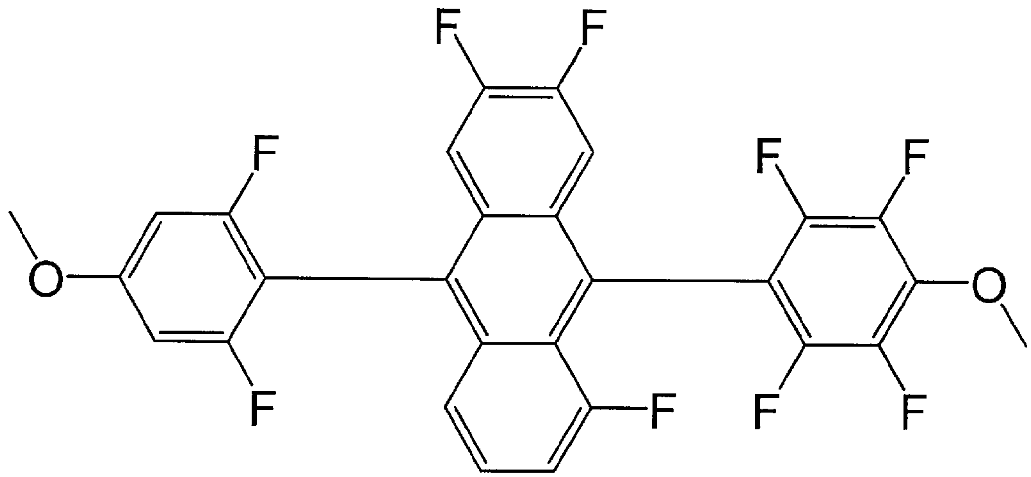
Figure 374:
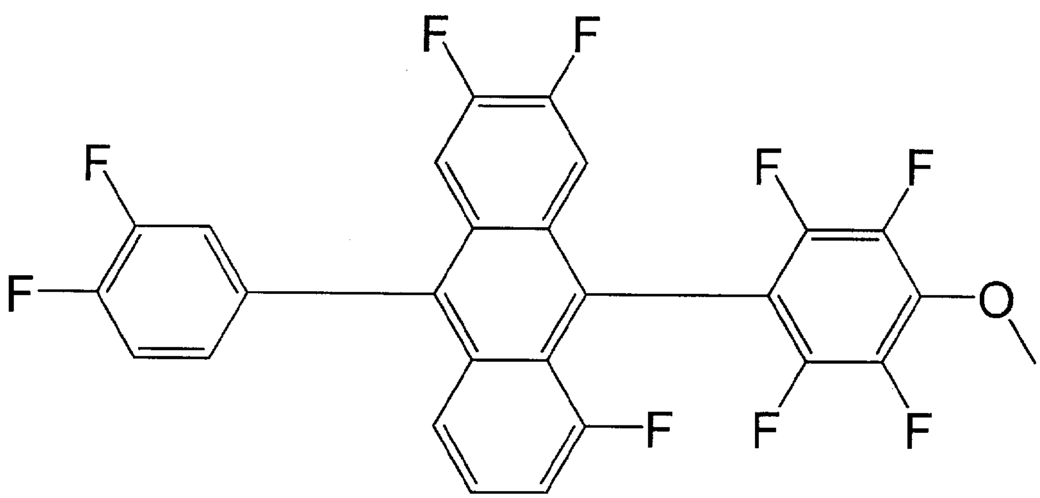
Figure 375:
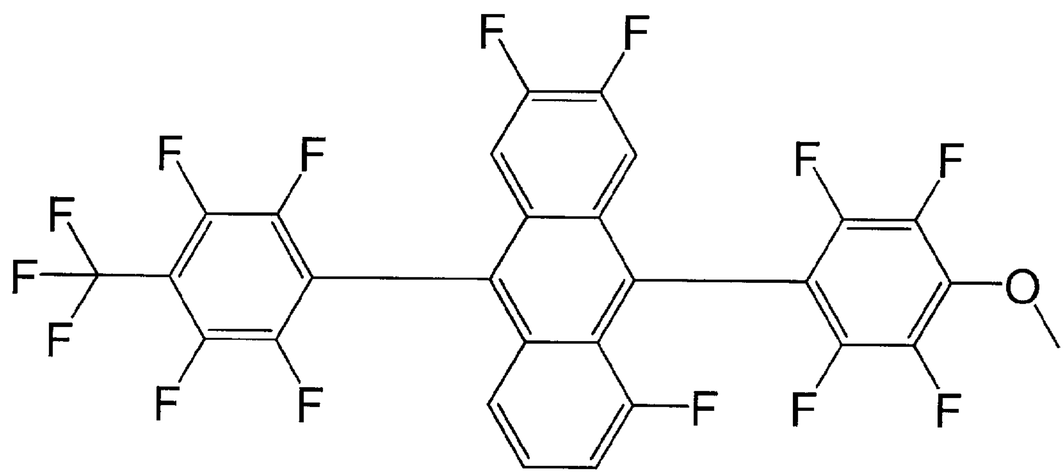
Figure 376:
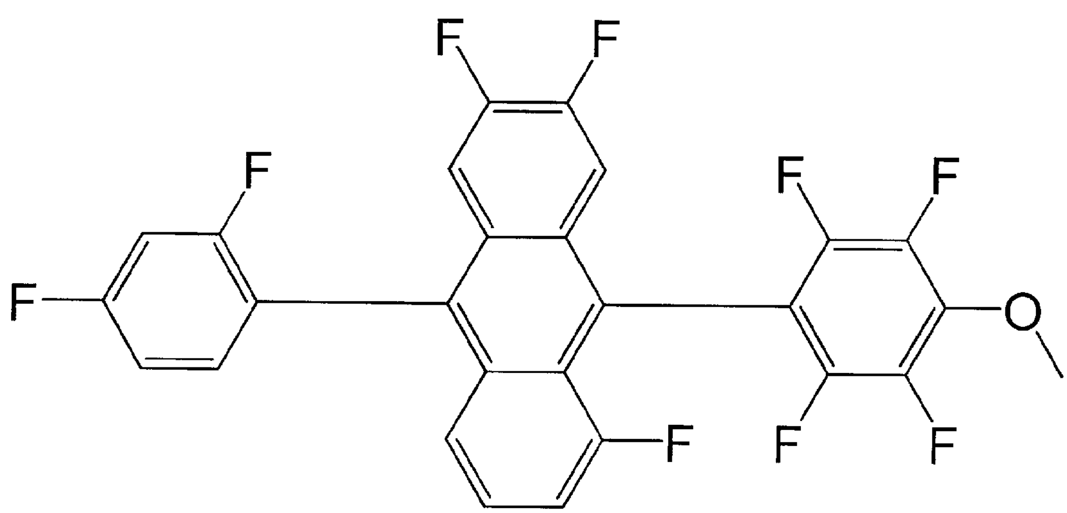
Figure 377:
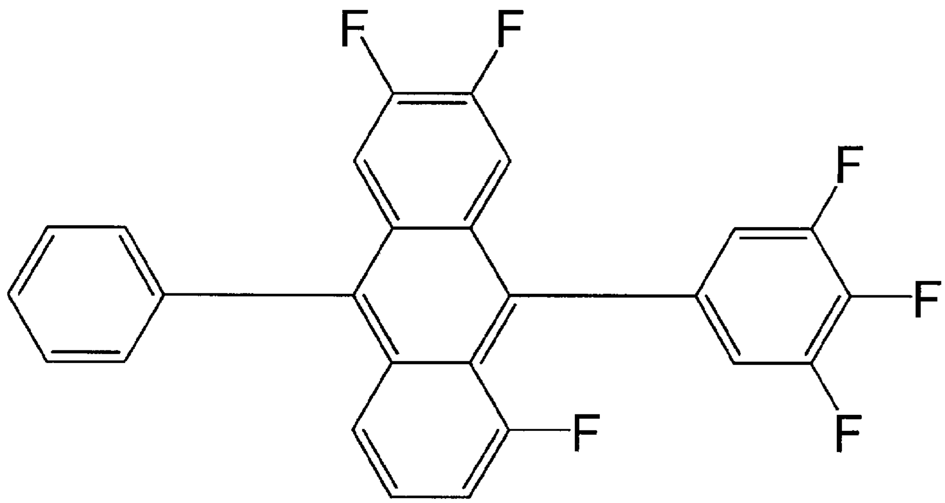
Figure 378:
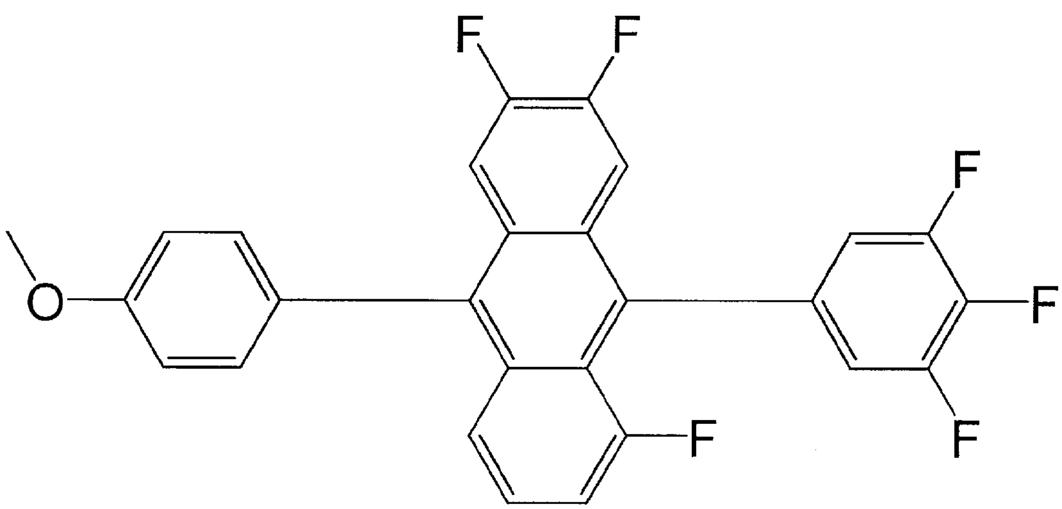
Figure 379:
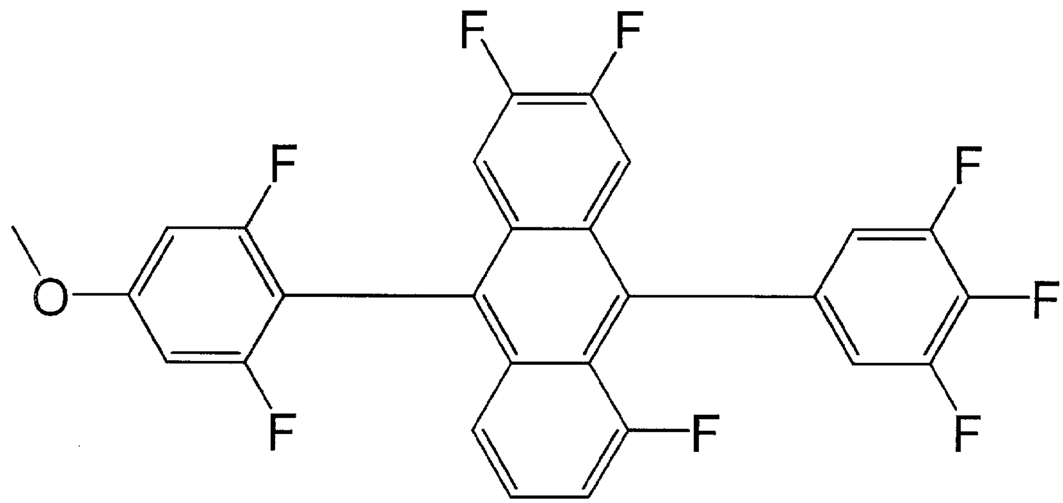
Figure 380:
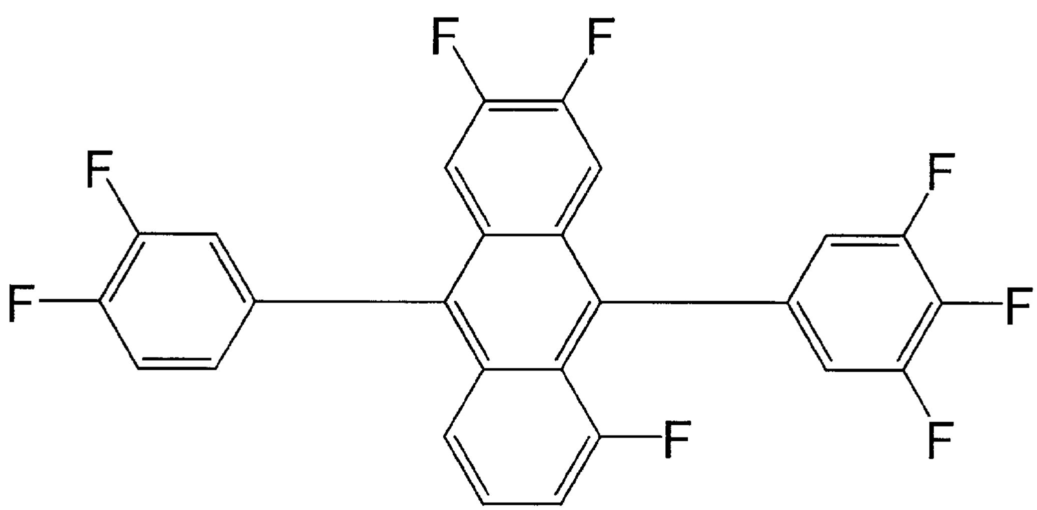
Figure 381:
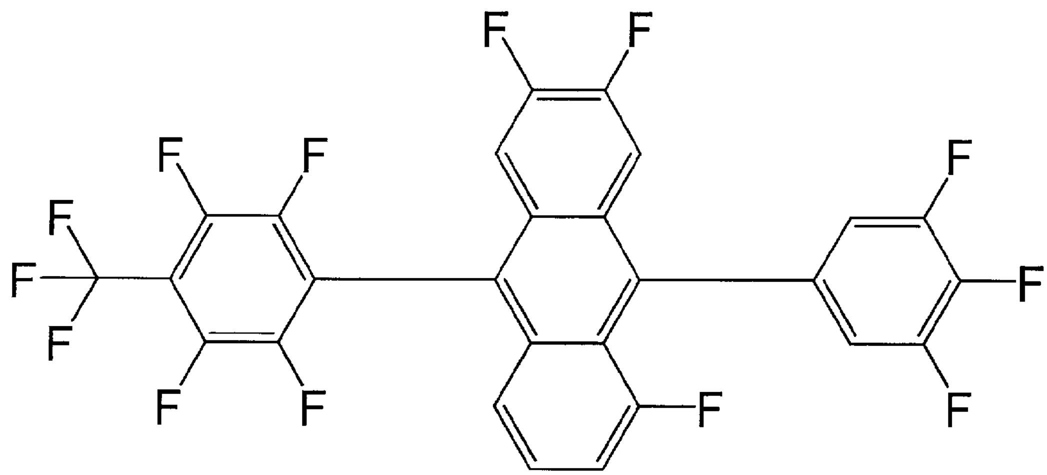
Figure 382:
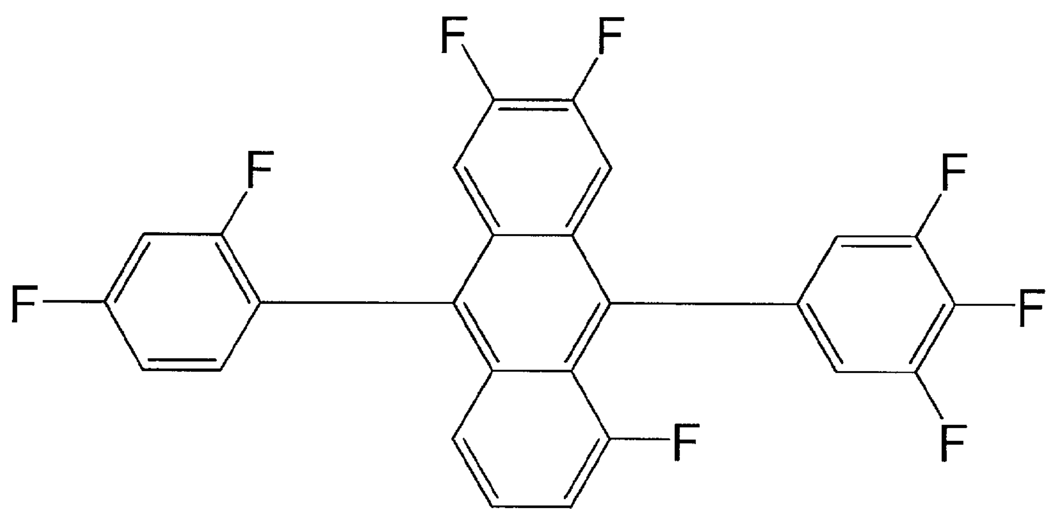
Figure 383:
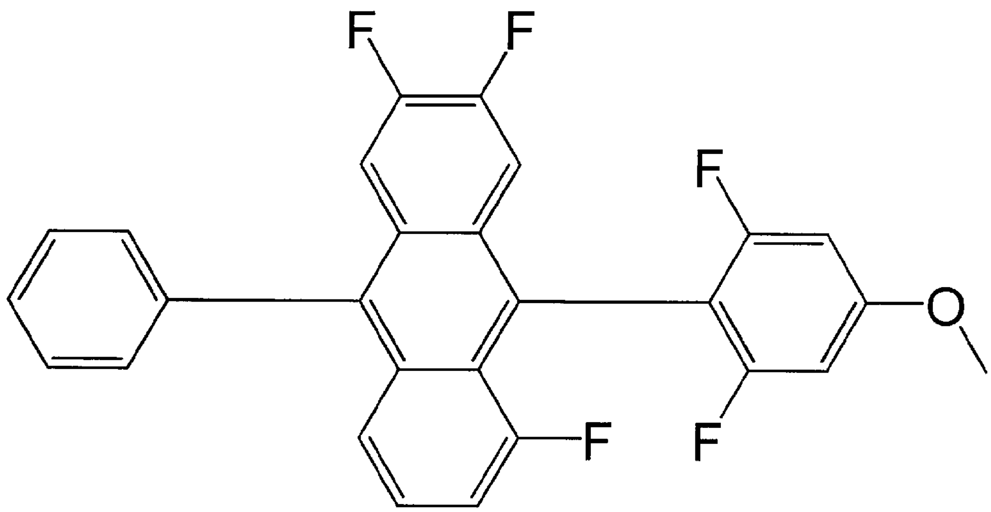
Figure 384:
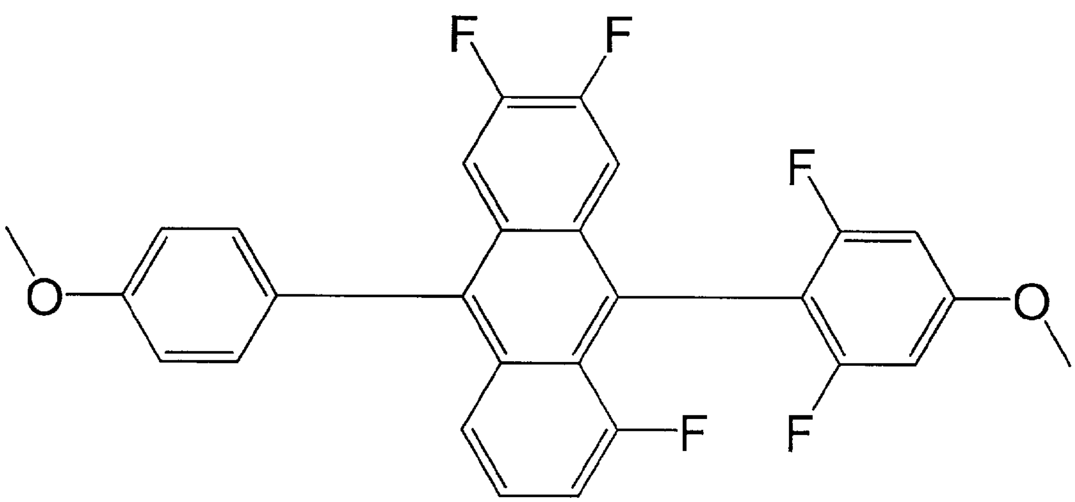
Figure 385:
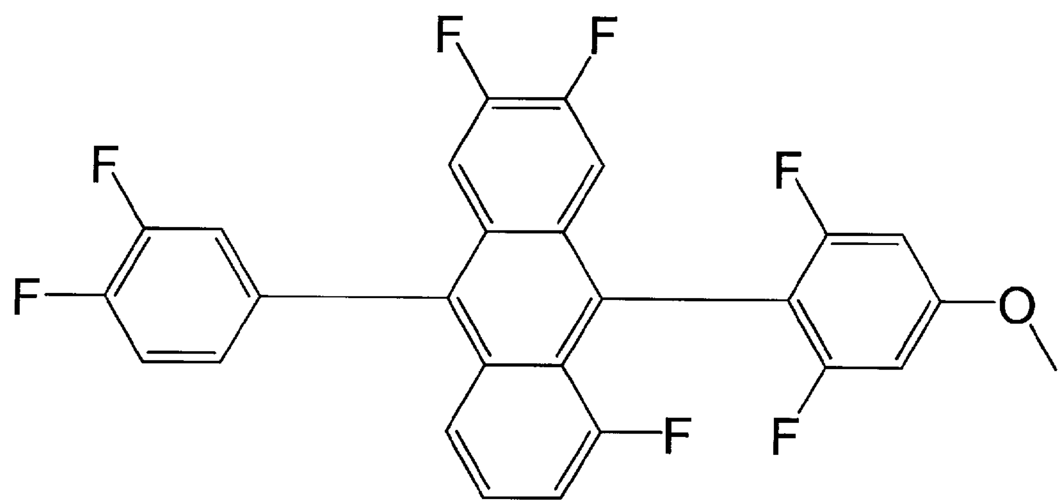
Figure 386:
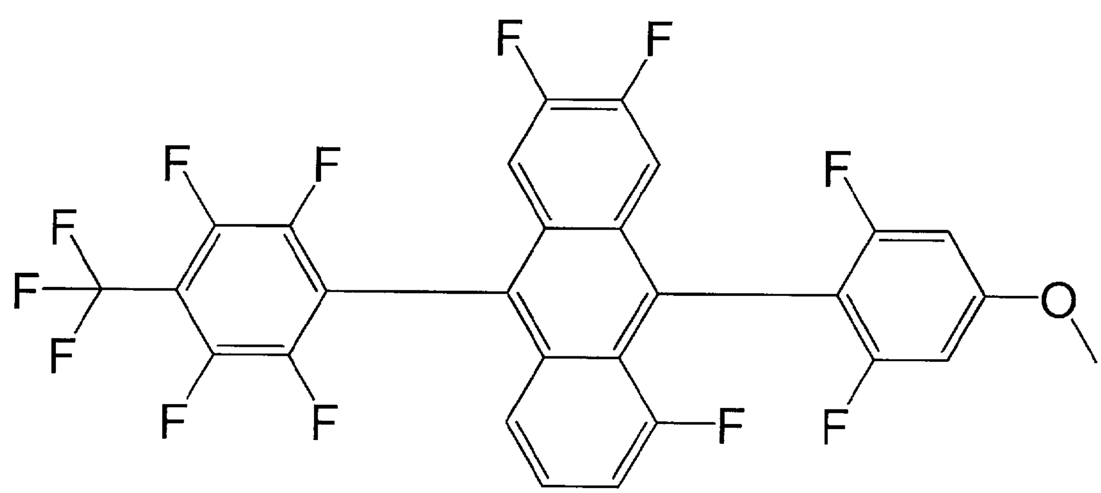
Figure 387:
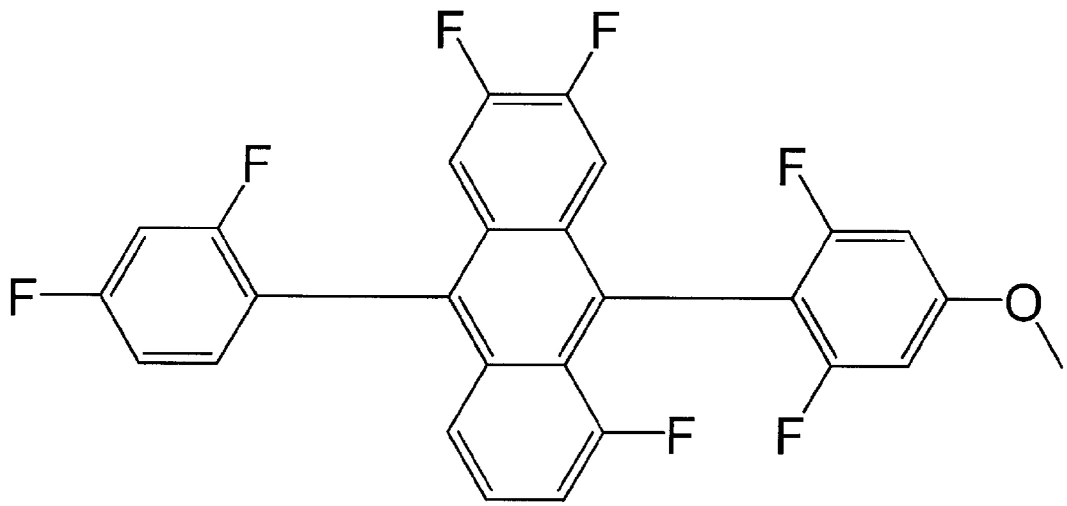
Figure 388:
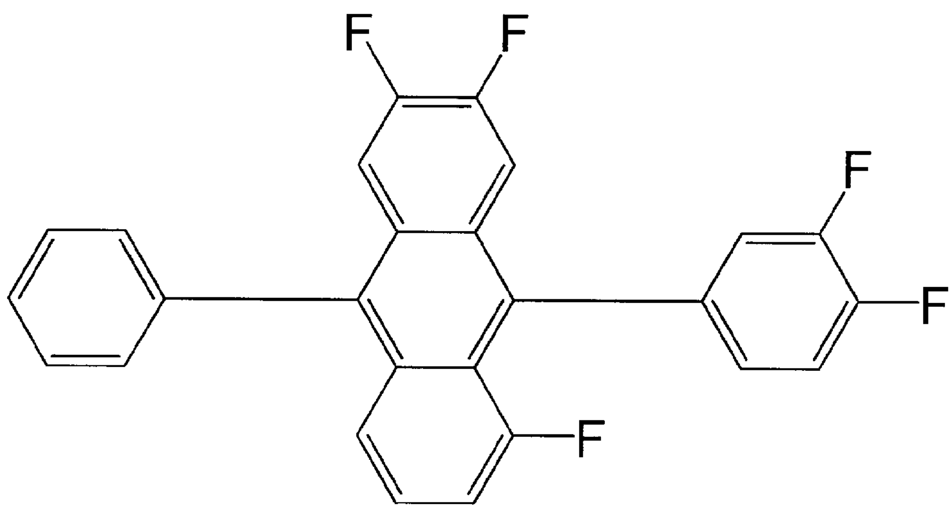
Figure 389:
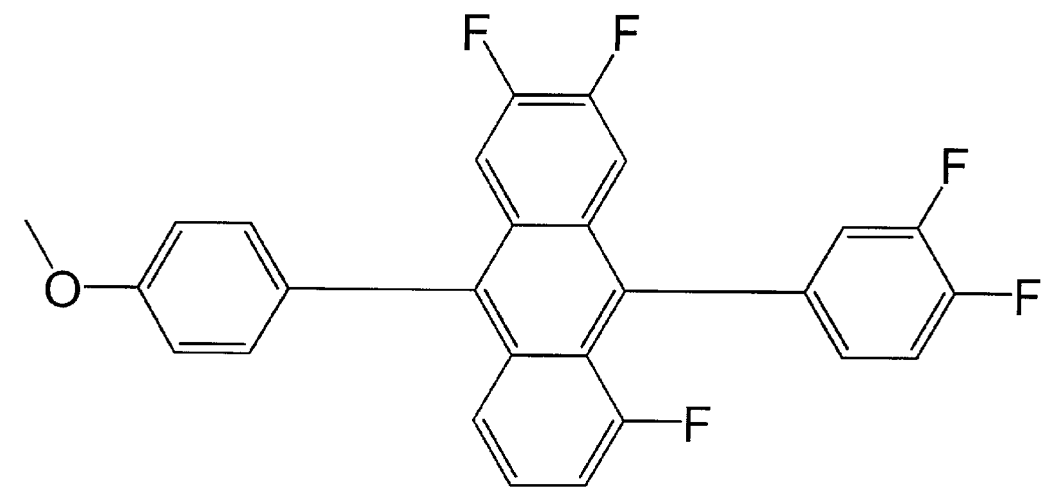
Figure 390:
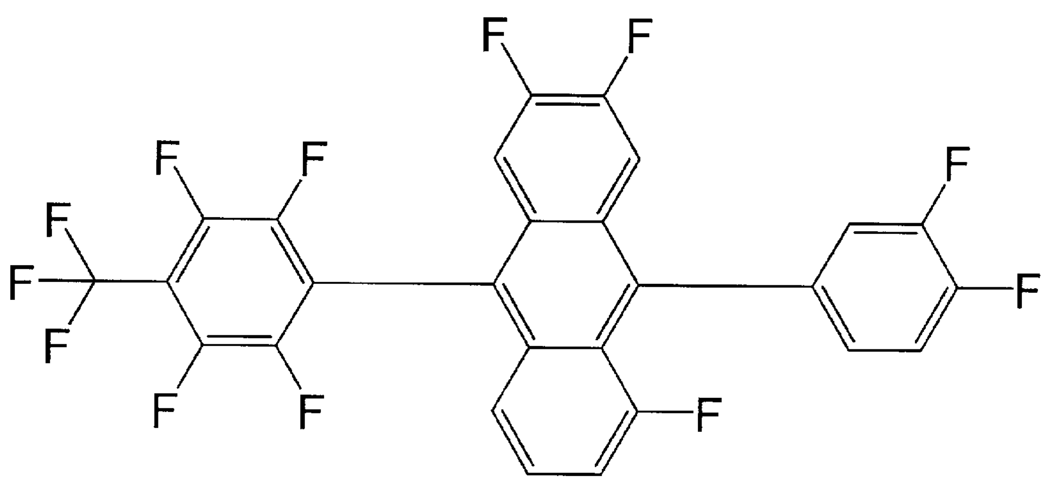
Figure 391:
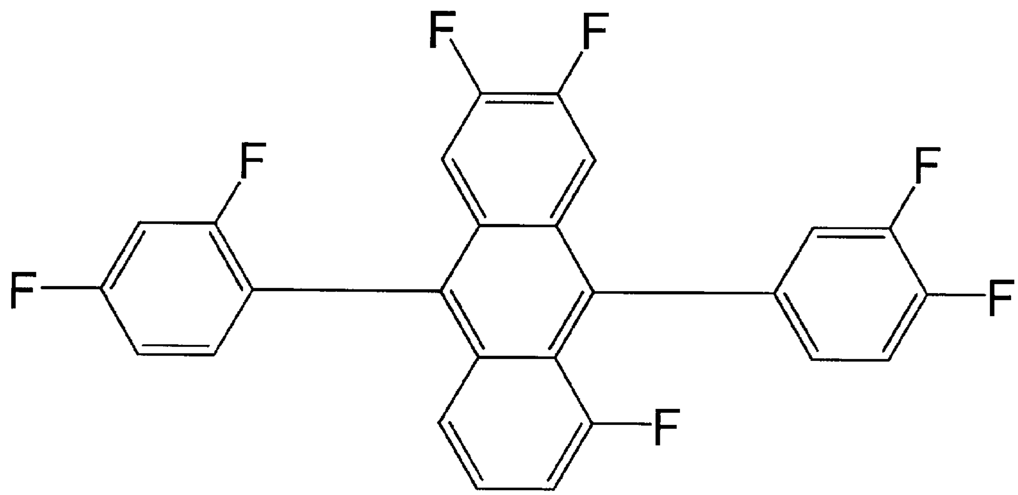
Figure 392:
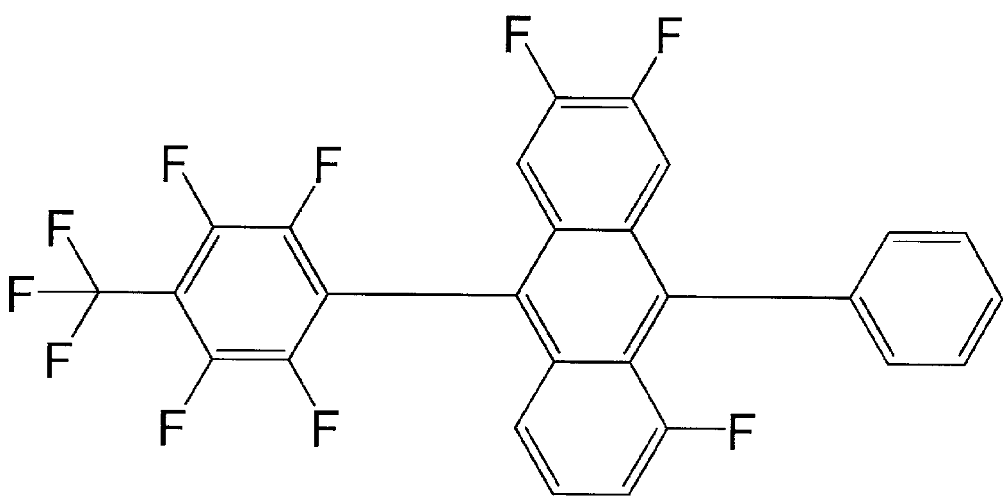
Figure 393:
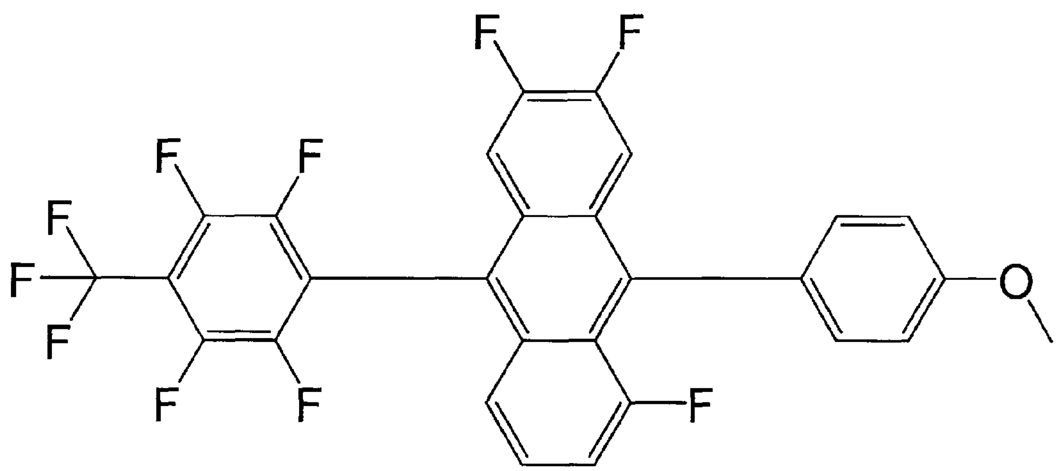
Figure 394:
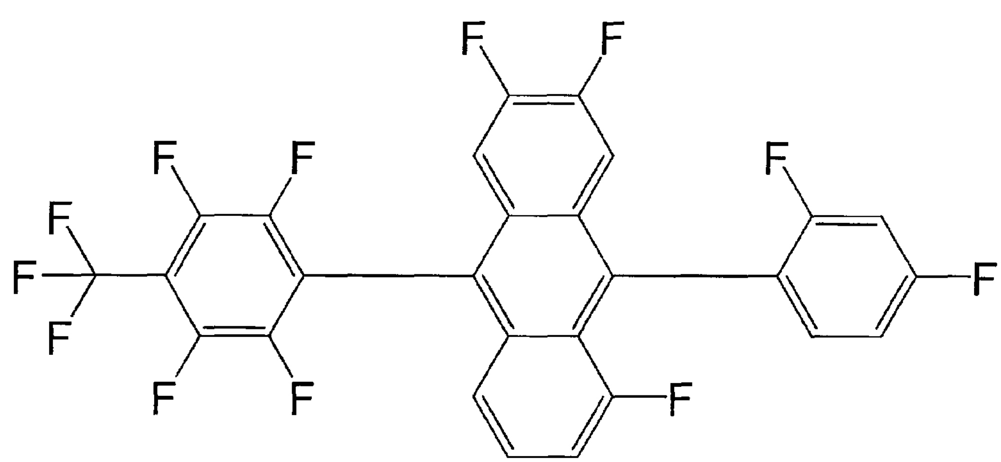
Figure 395:
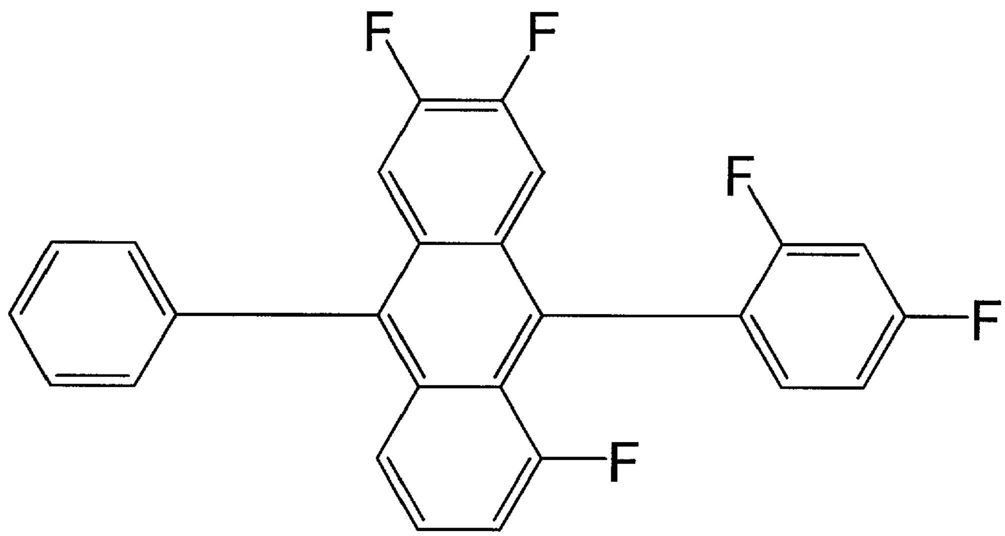
Figure 396:
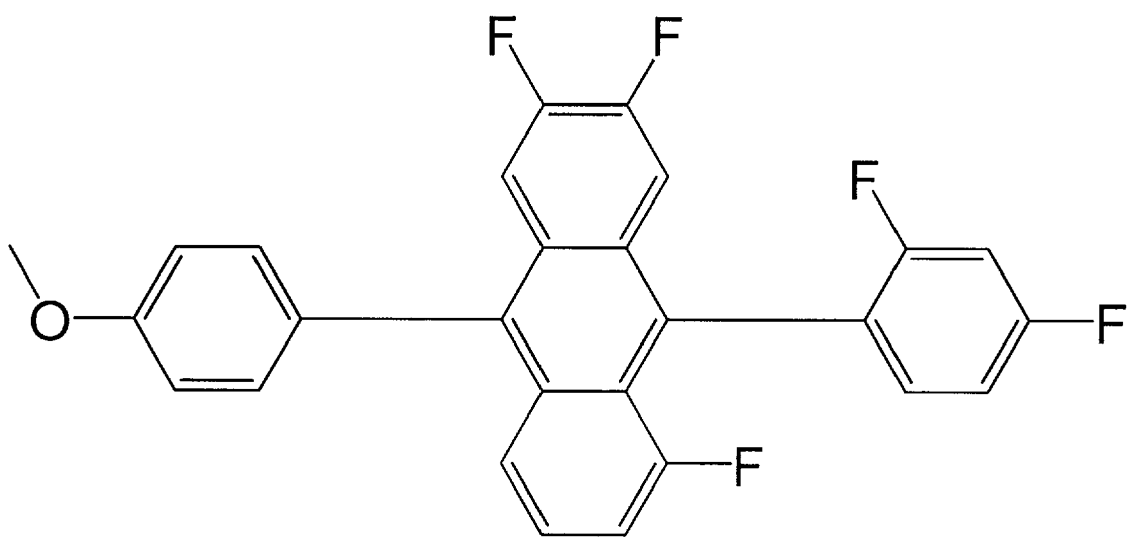
Figure 397:
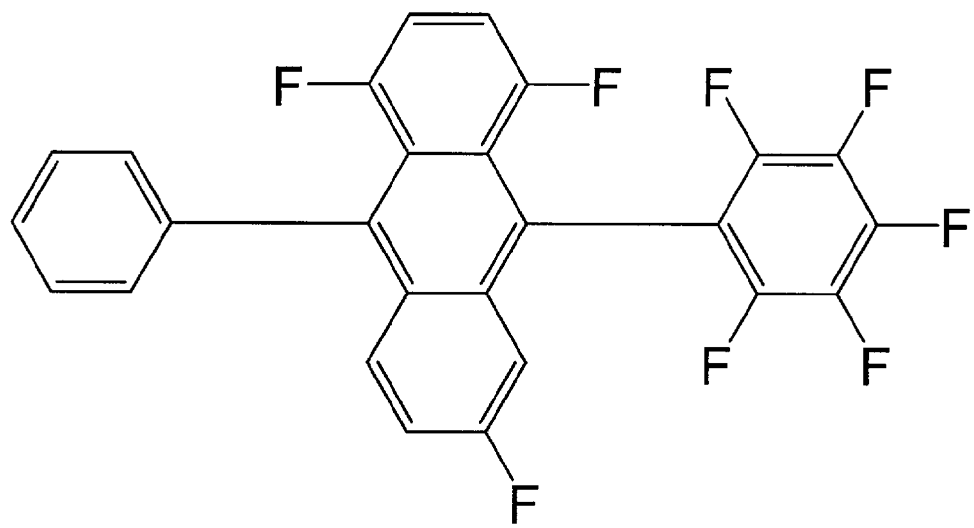
Figure 398:
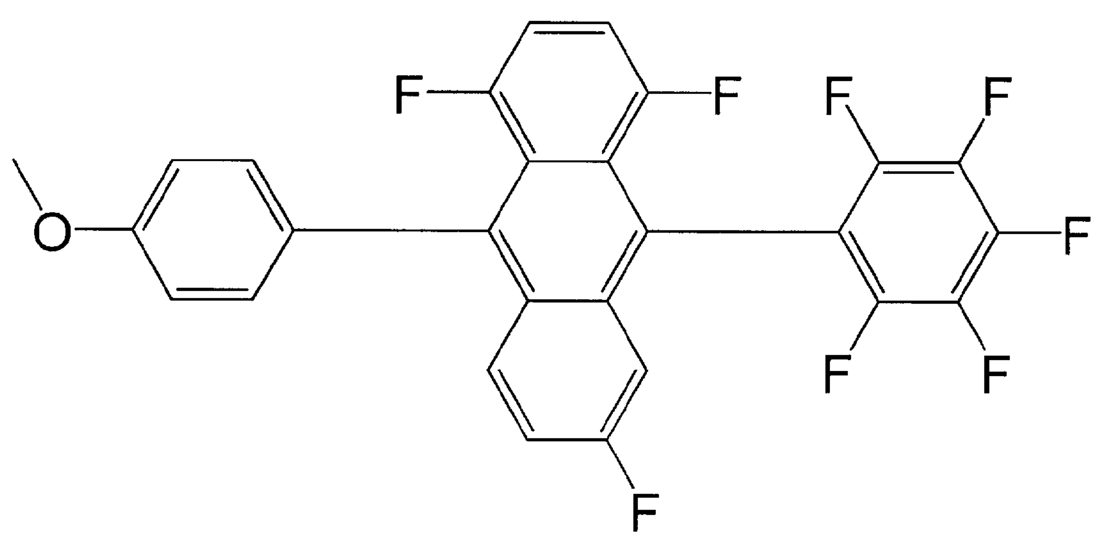
Figure 399:
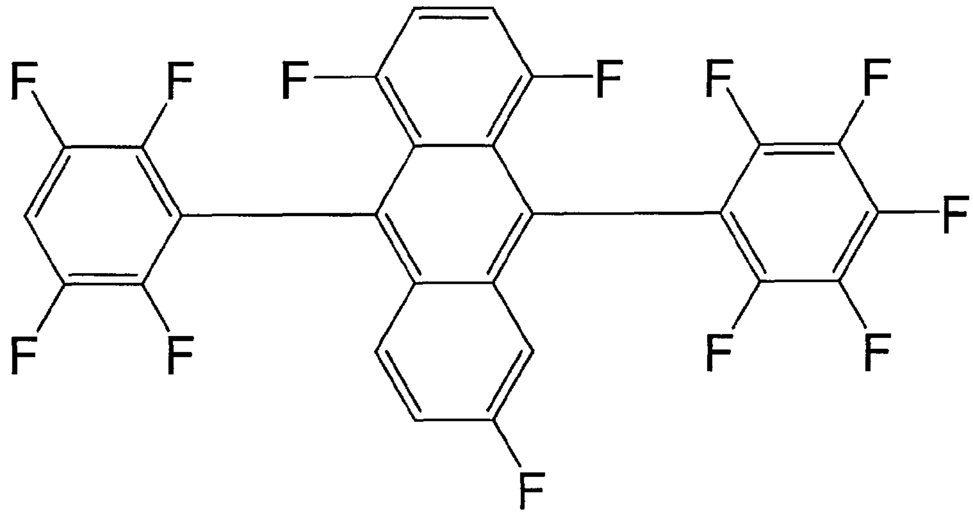
Figure 400:
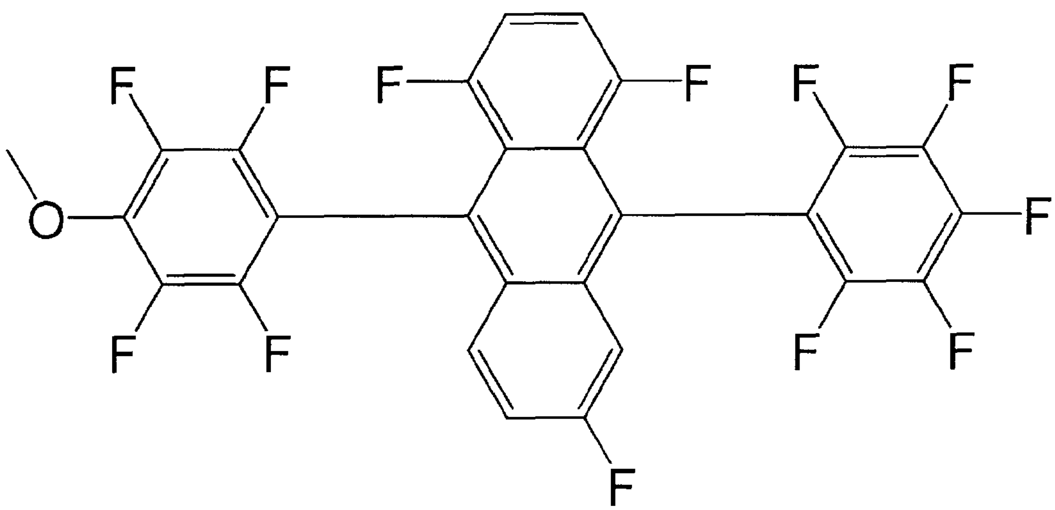
Figure 401:
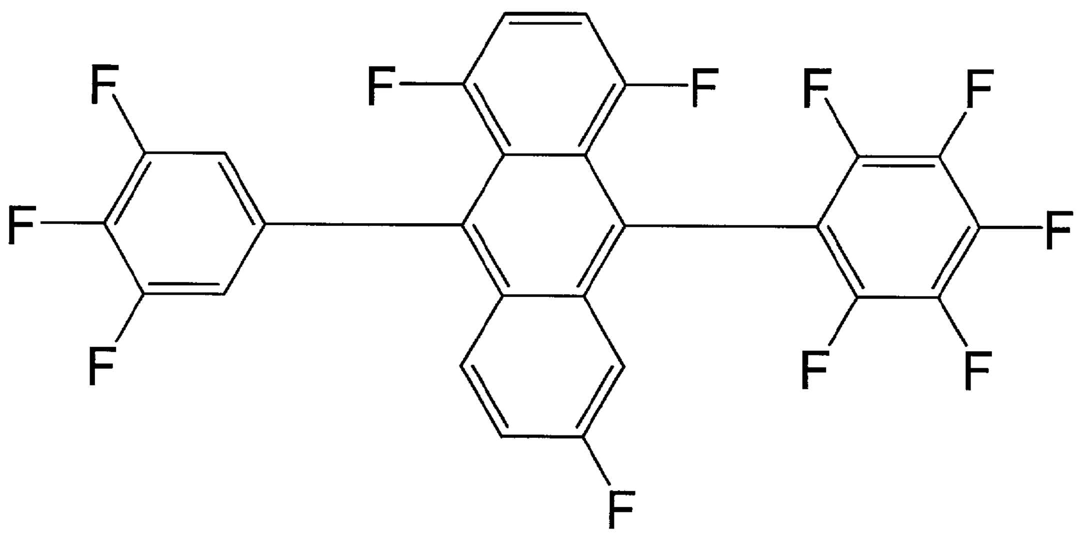
Figure 402:
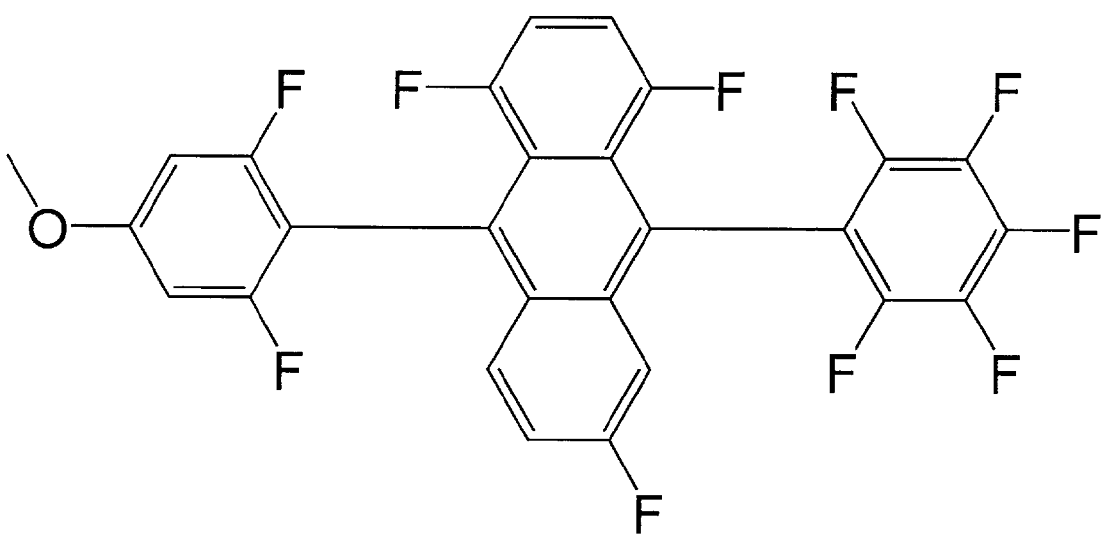
Figure 403:
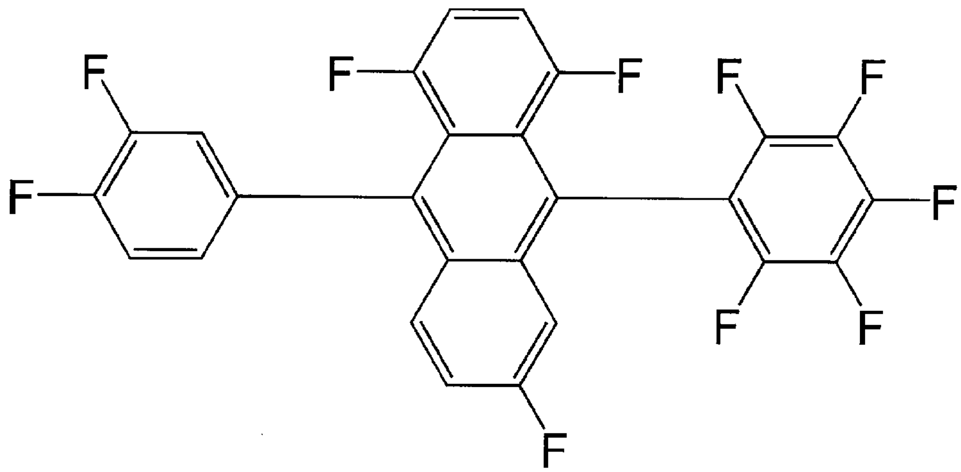
Figure 404:
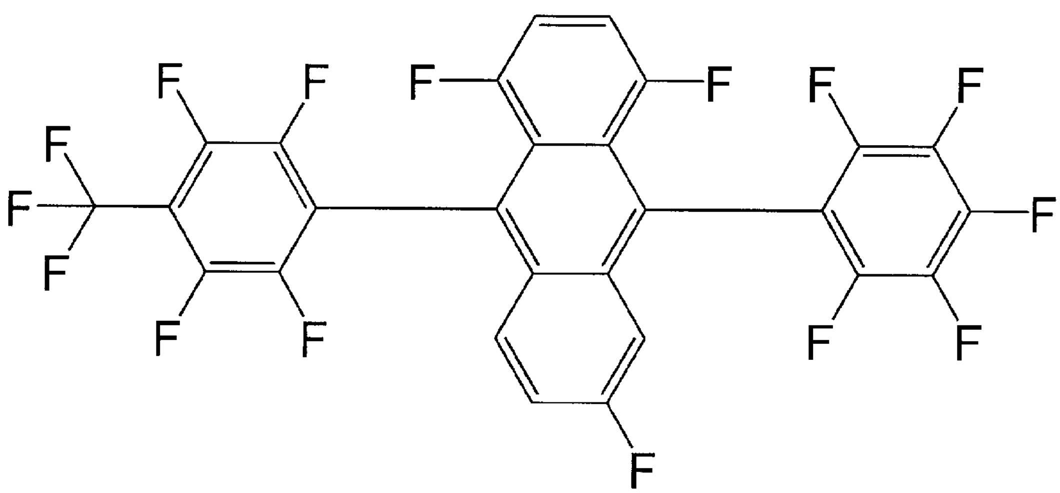
Figure 405:
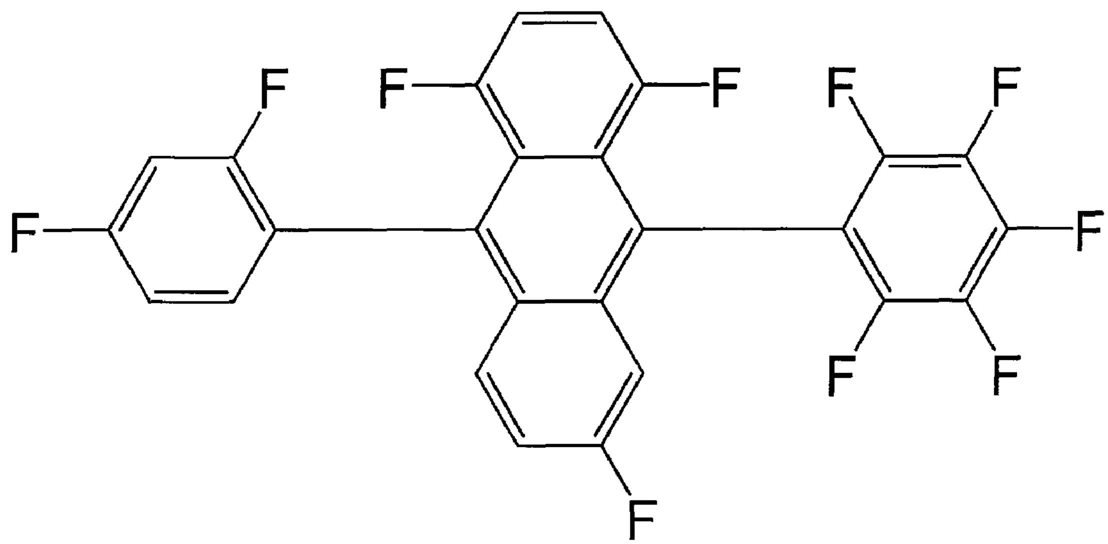
Figure 406:
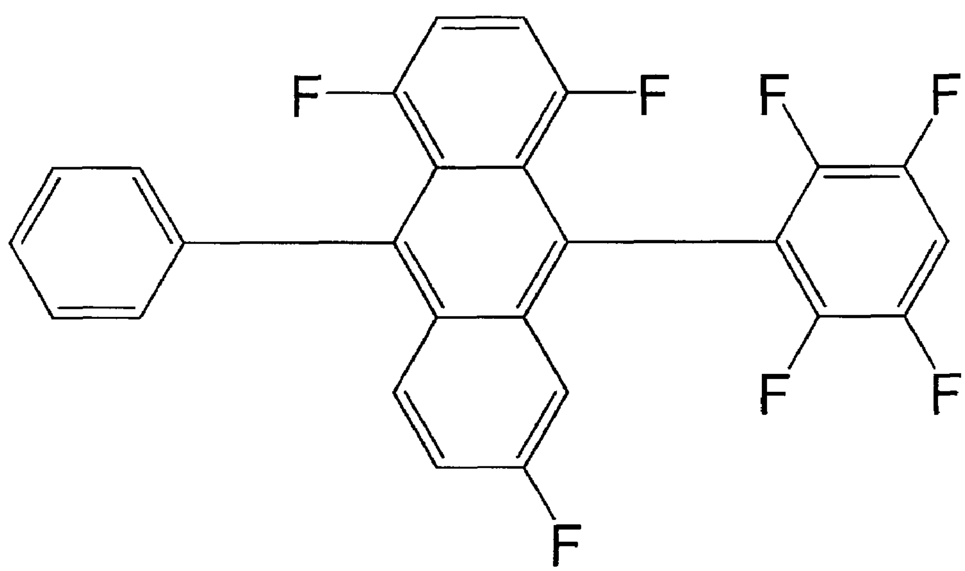
Figure 407:
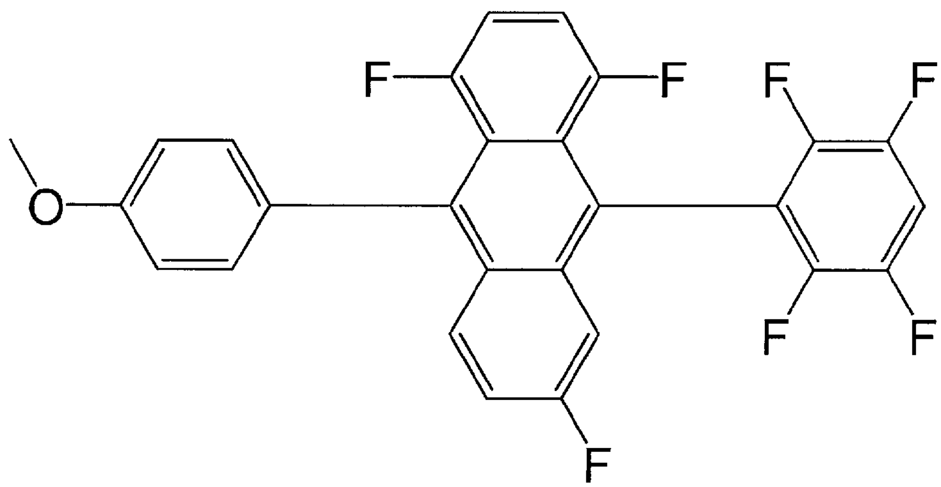
Figure 408:
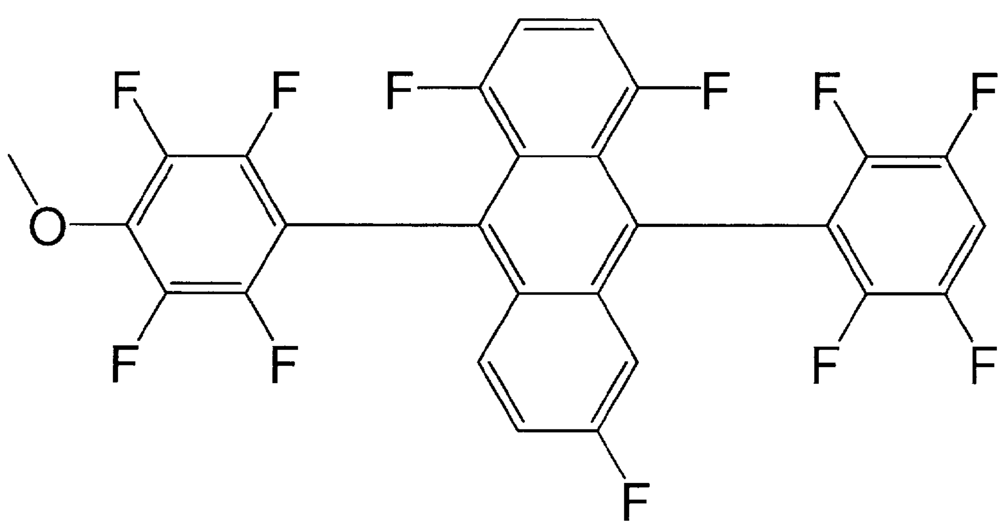
Figure 409:
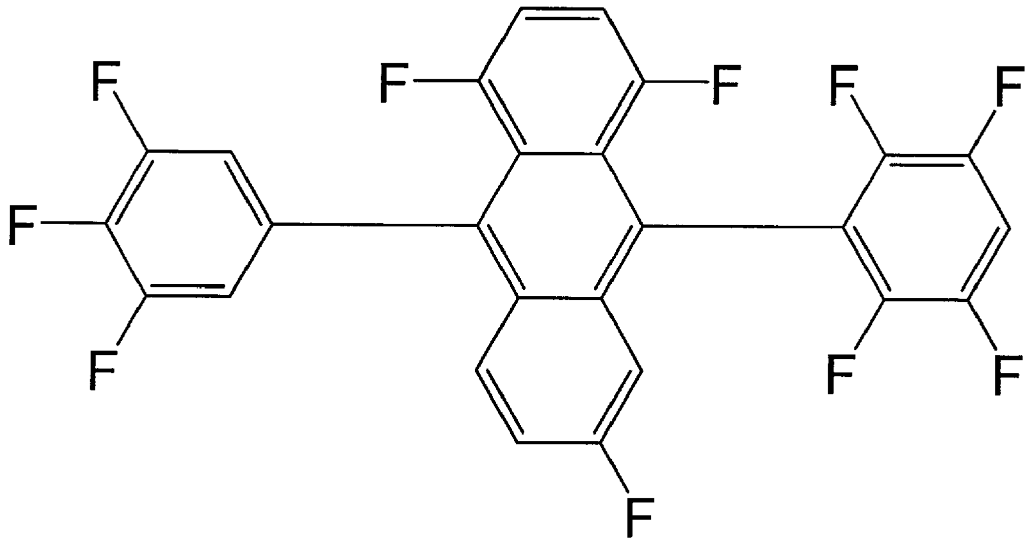
Figure 410:
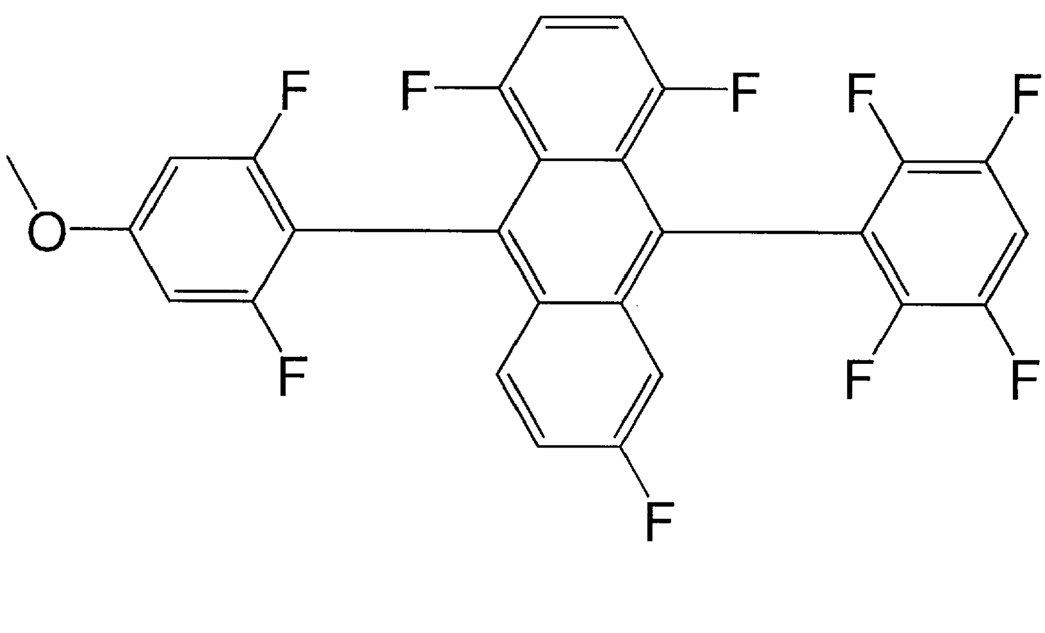
Figure 411:
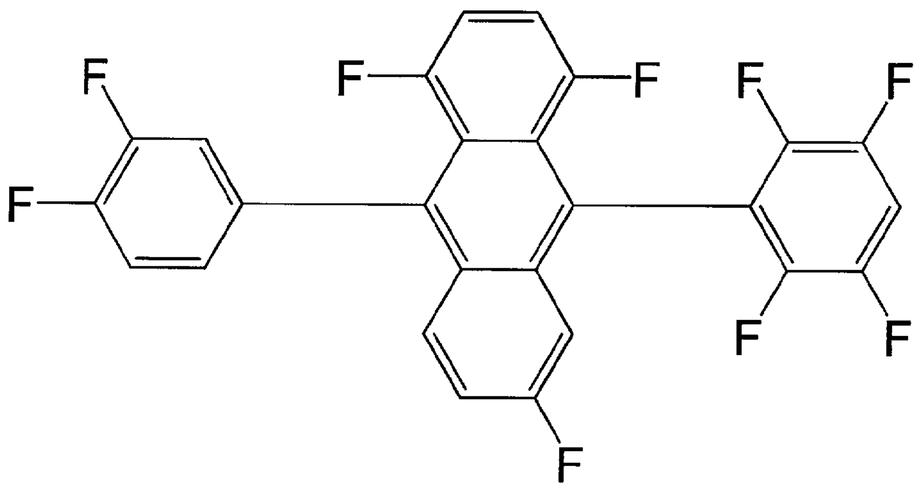
Figure 412:
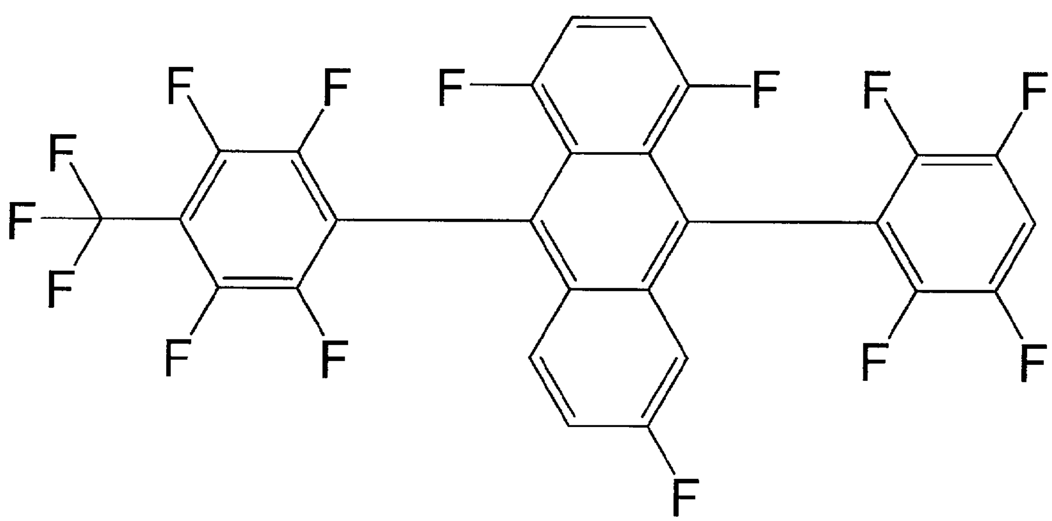
Figure 413:
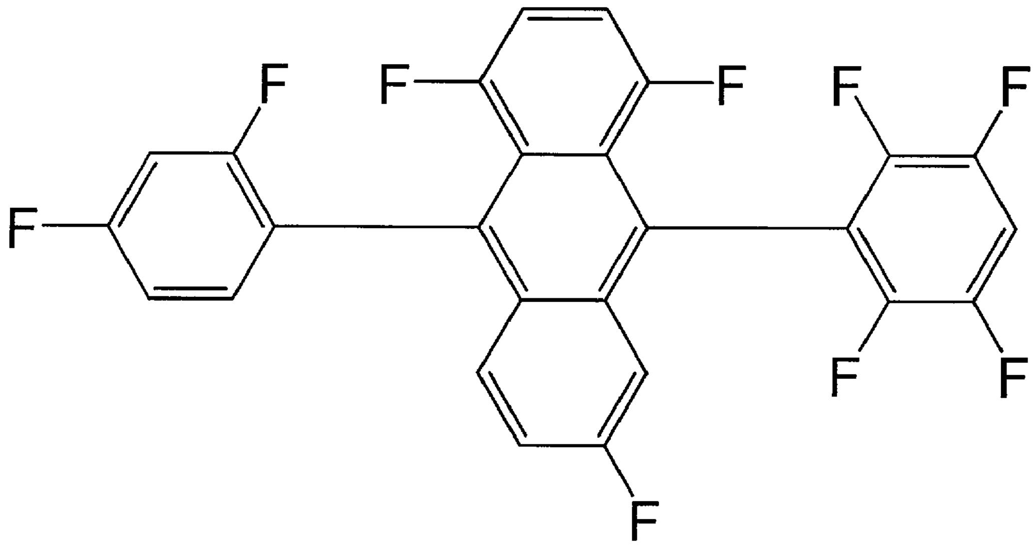
Figure 414:
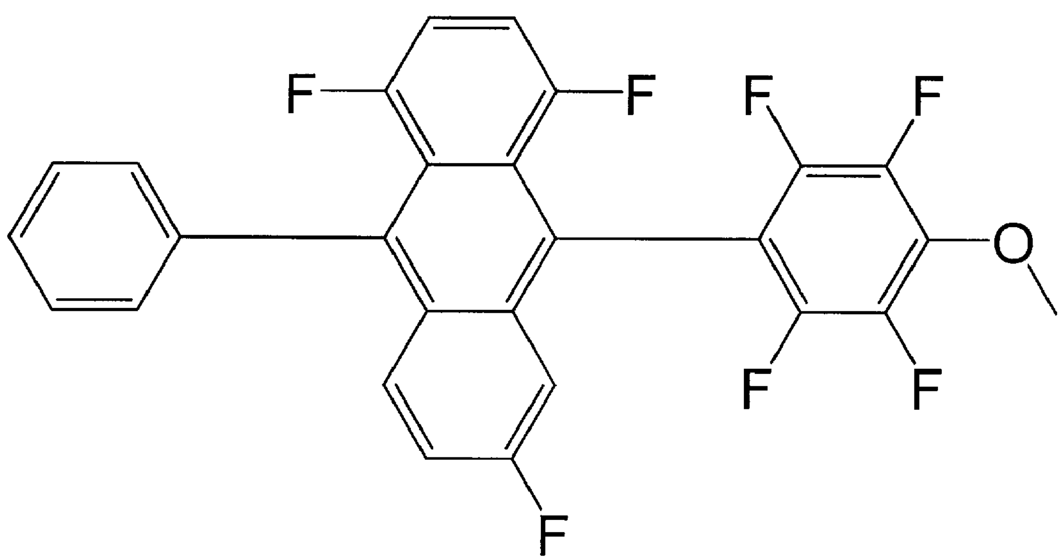
Figure 415:
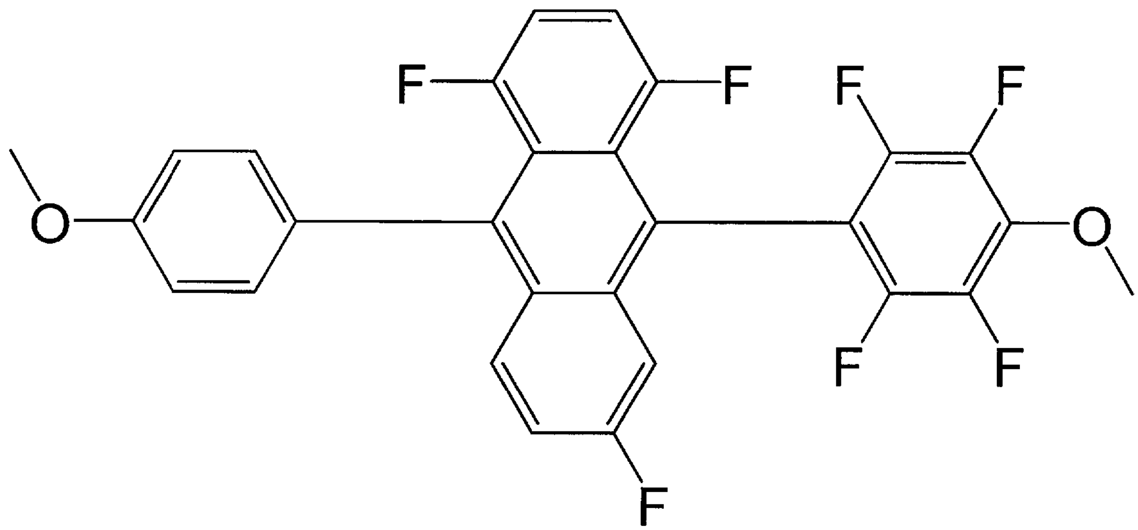
Figure 416:
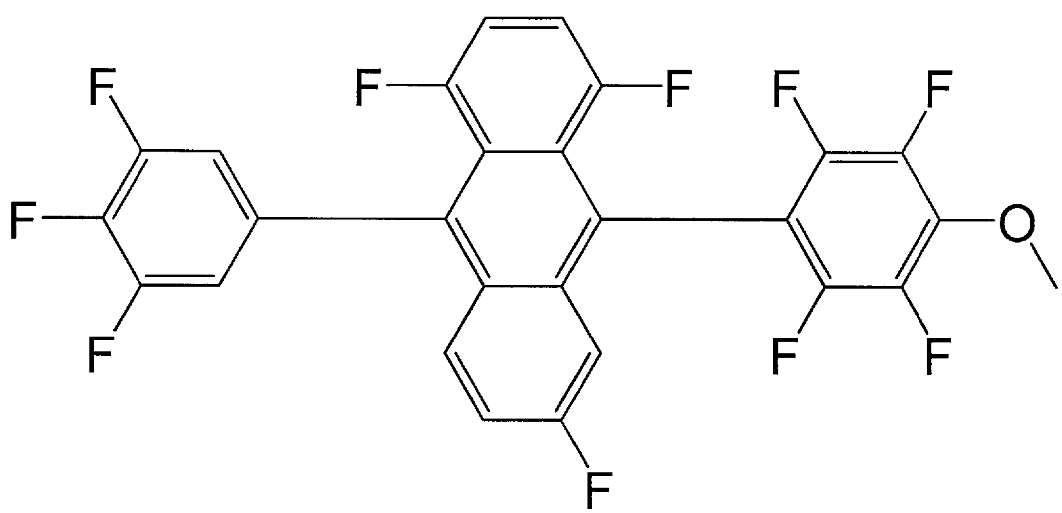
Figure 417:
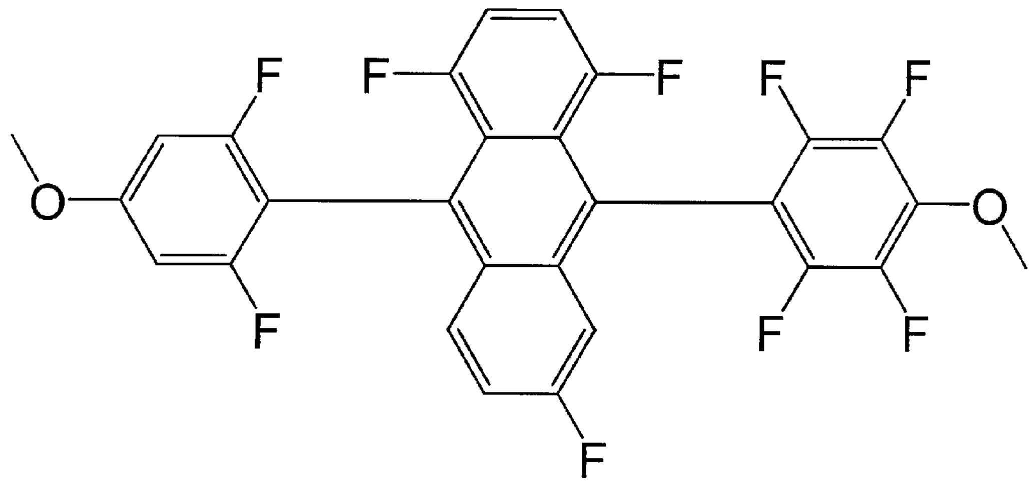
Figure 418:
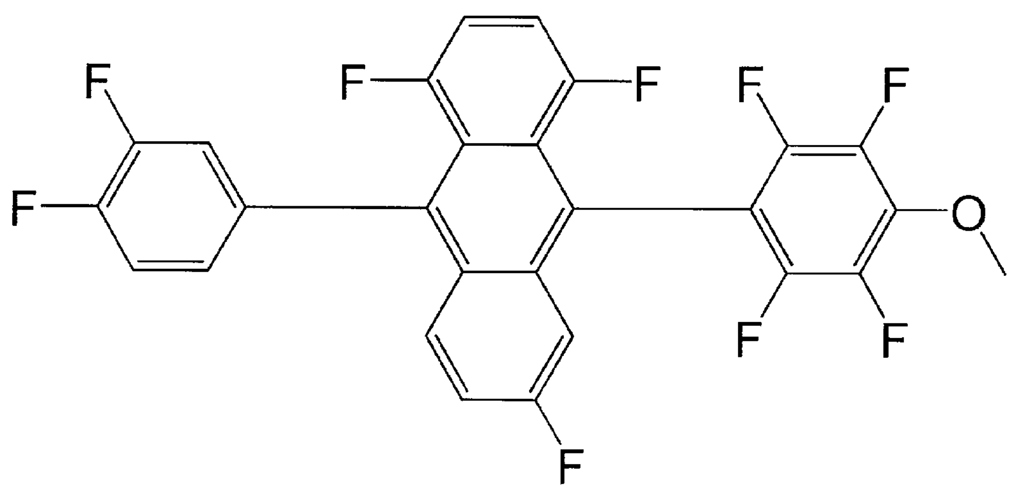
Figure 419:
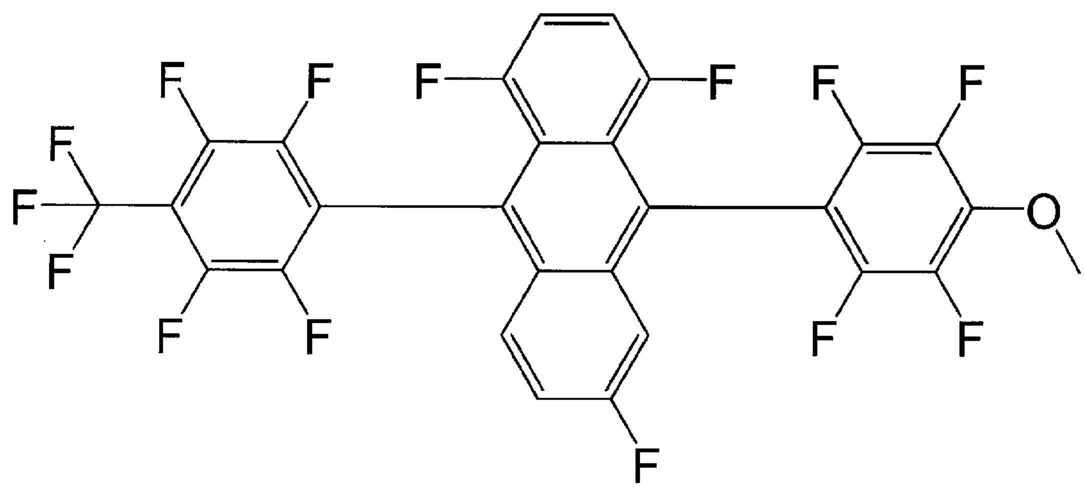
Figure 420:
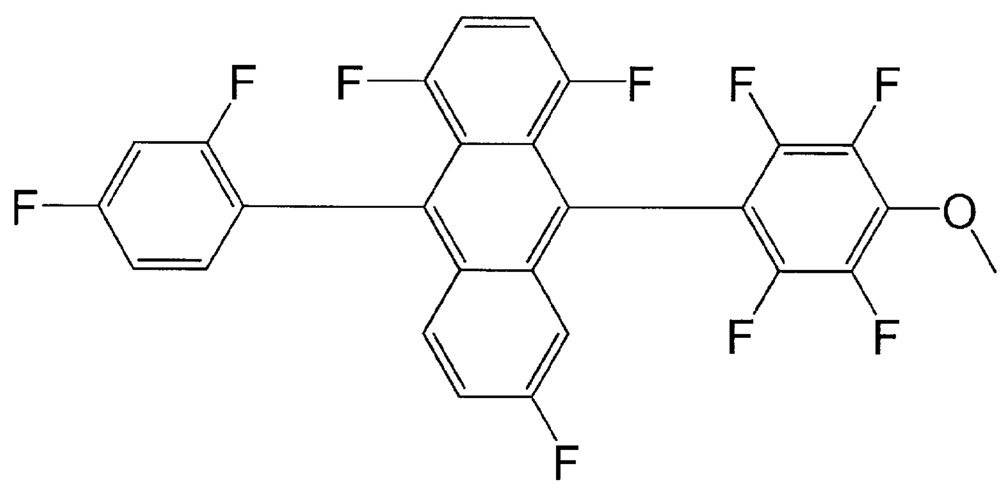
Figure 421:
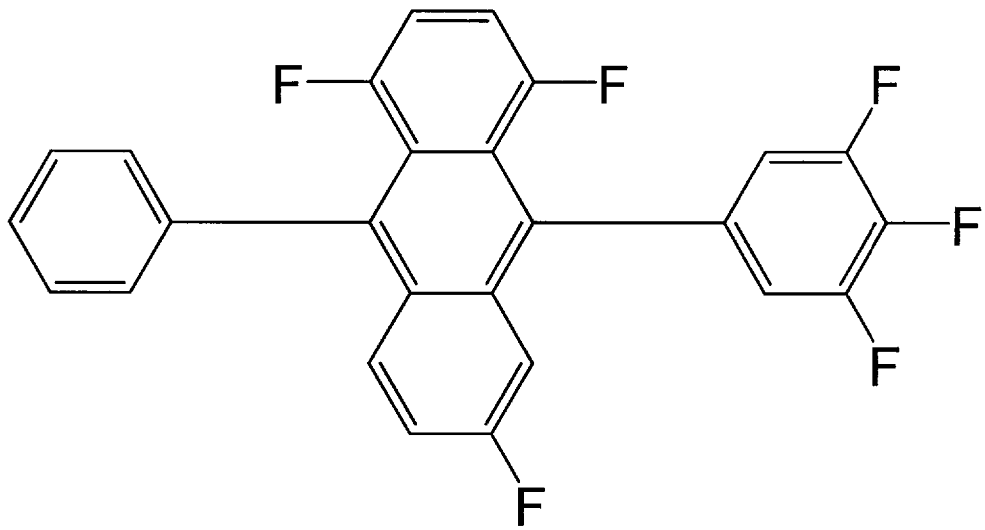
Figure 422:
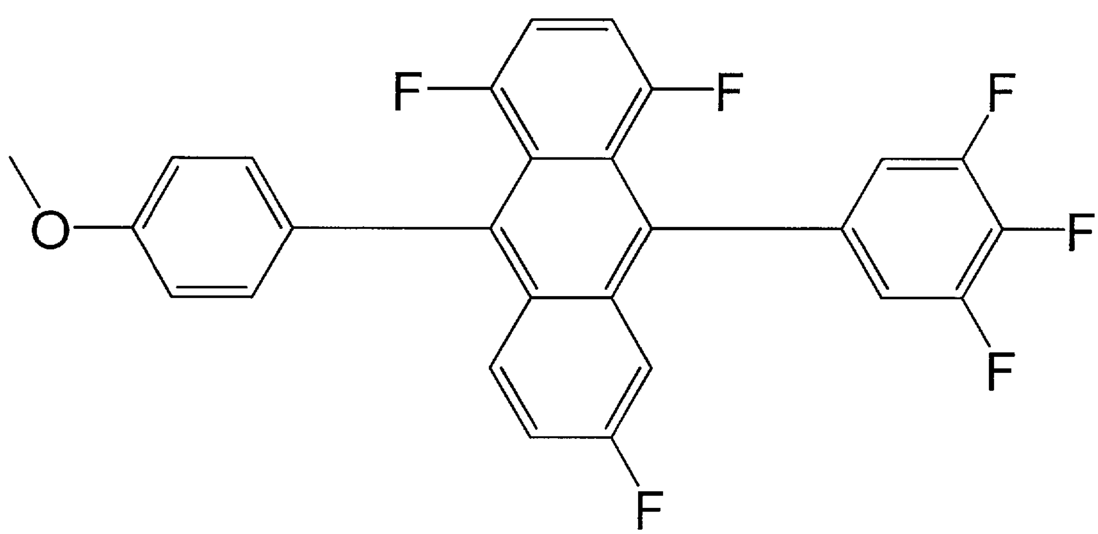
Figure 423:
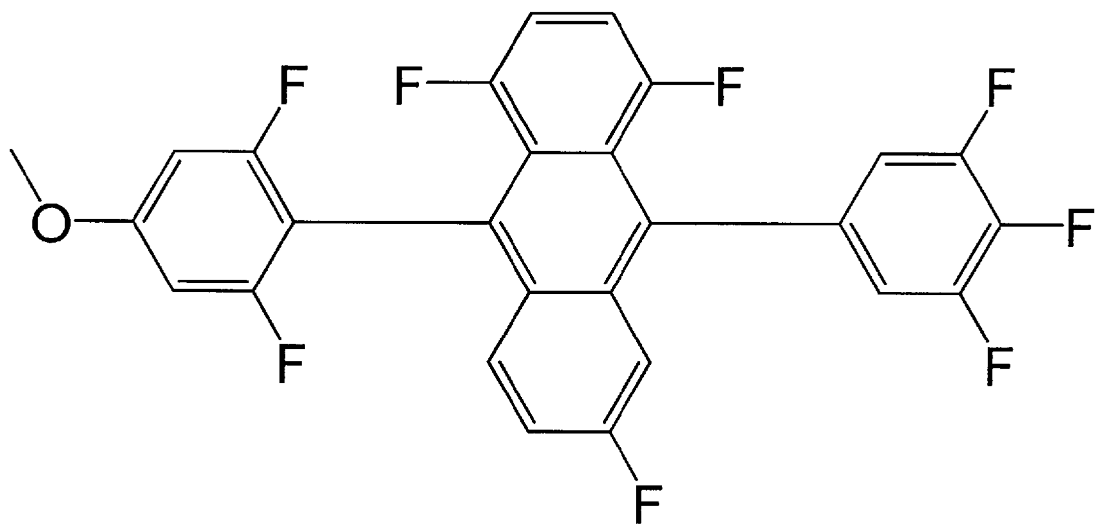
Figure 424:
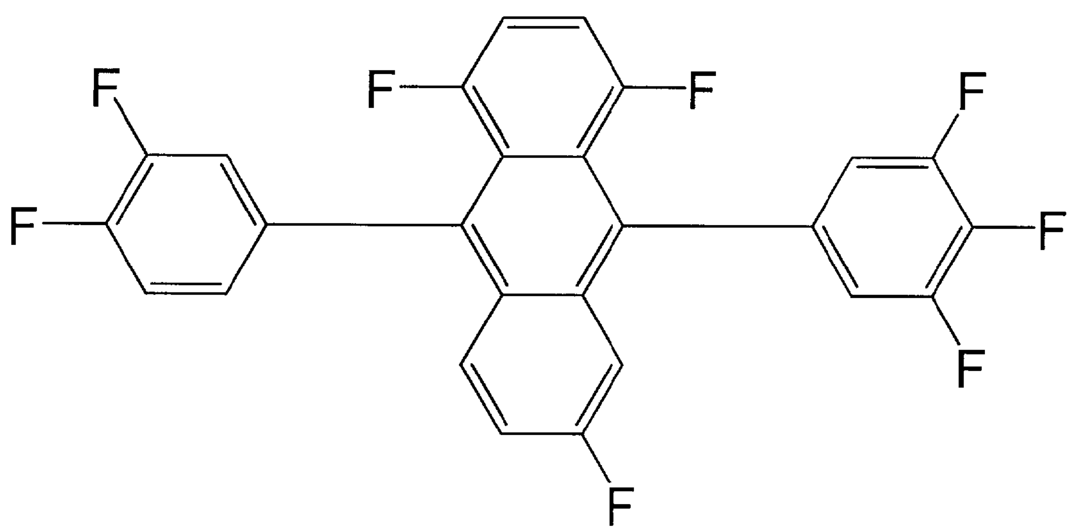
Figure 425:
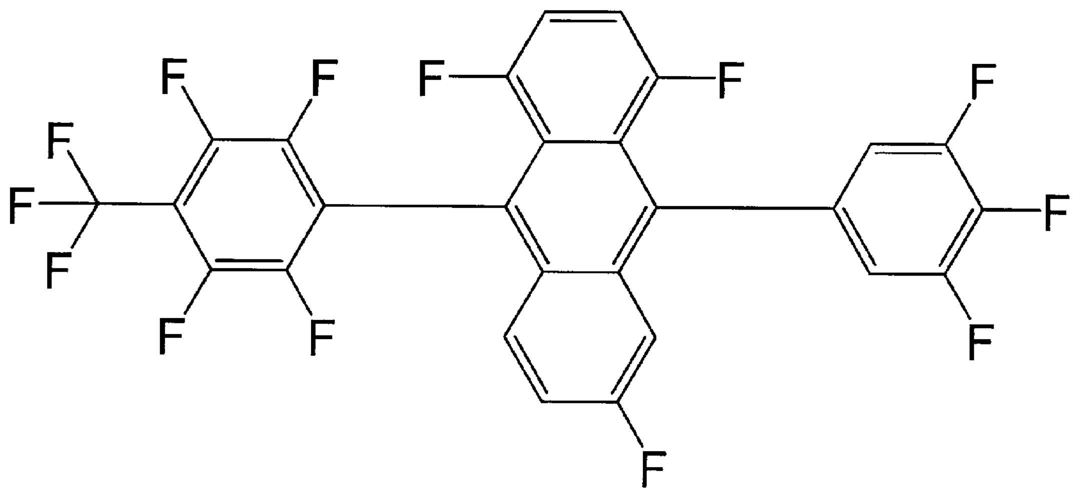
Figure 426:
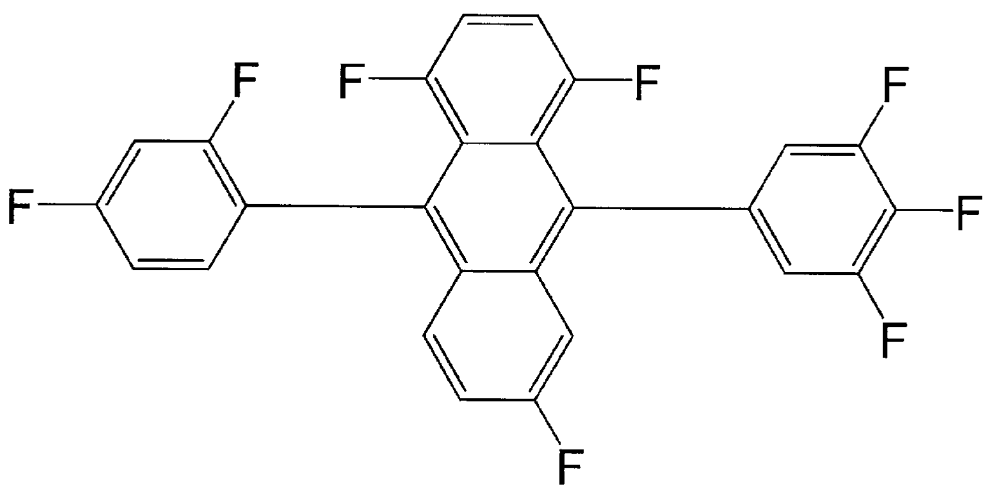
Figure 427:
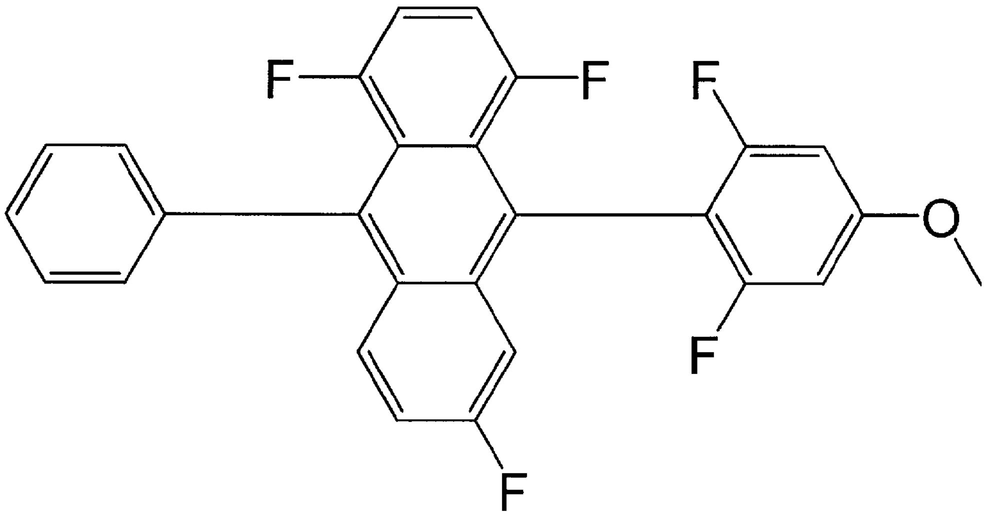
Figure 428:
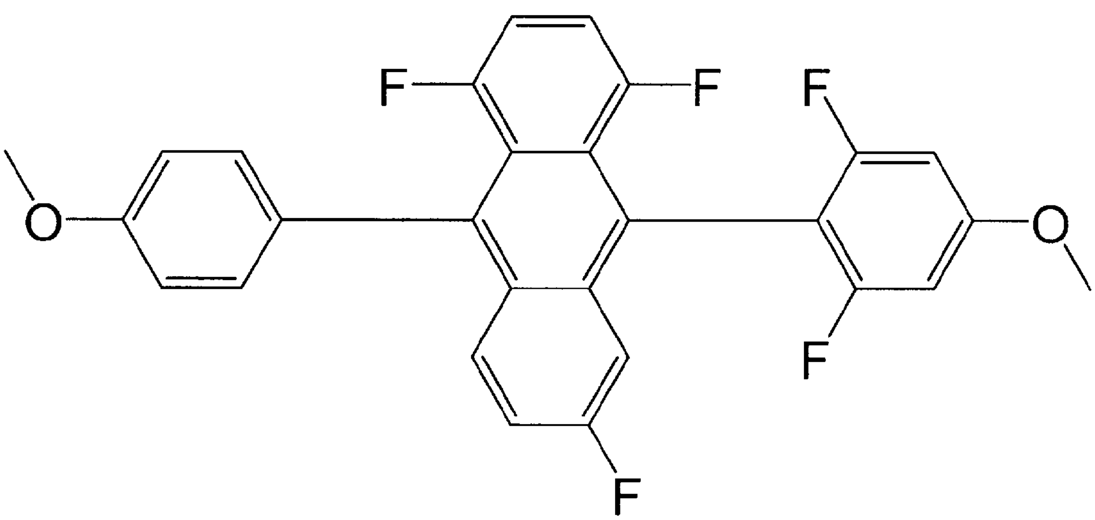
Figure 429:
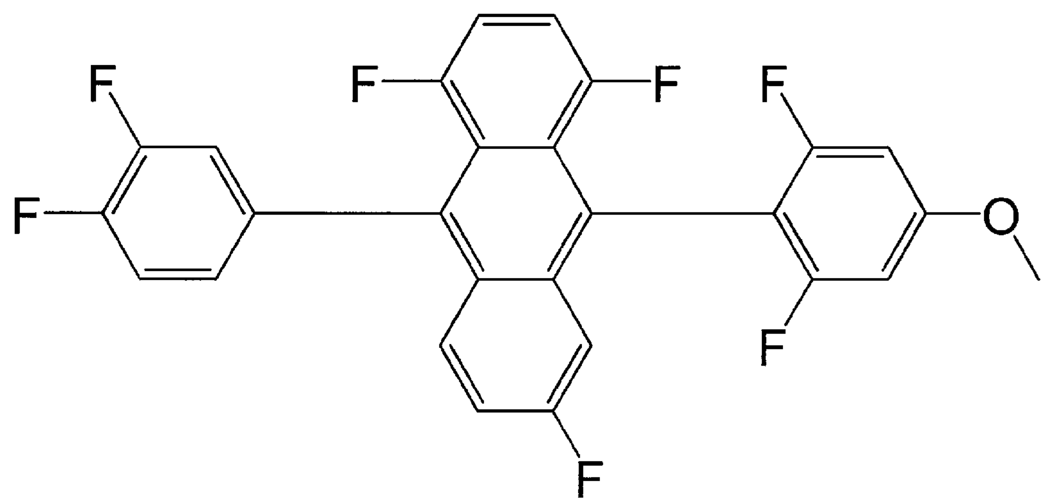
Figure 430:
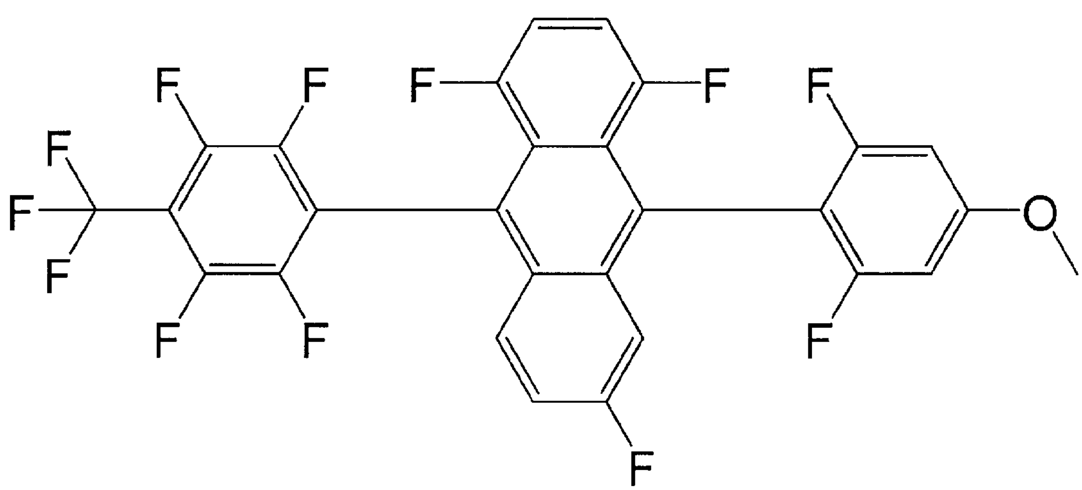
Figure 431:
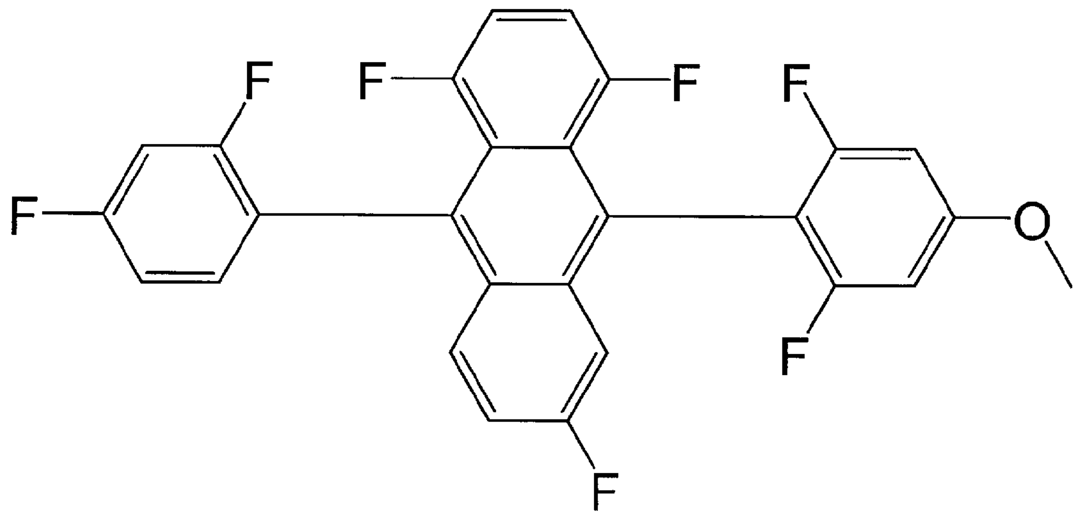
Figure 432:
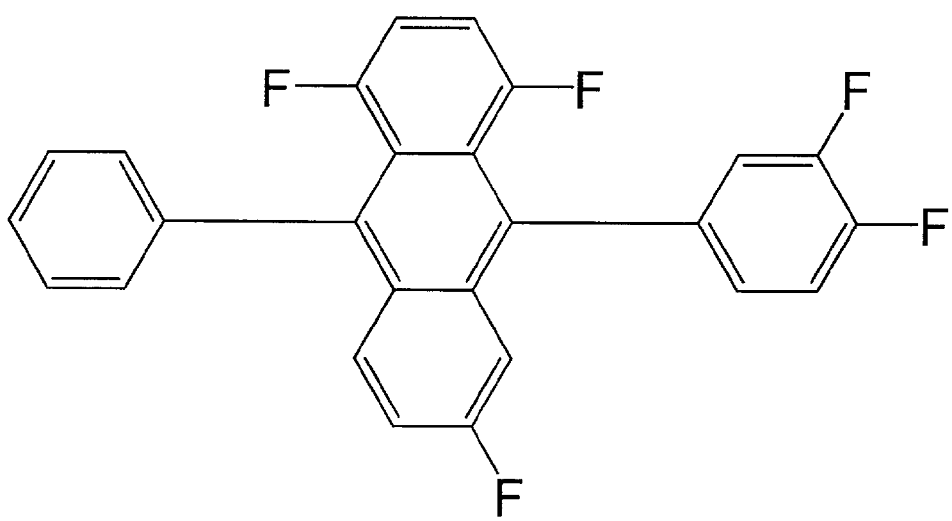
Figure 433:
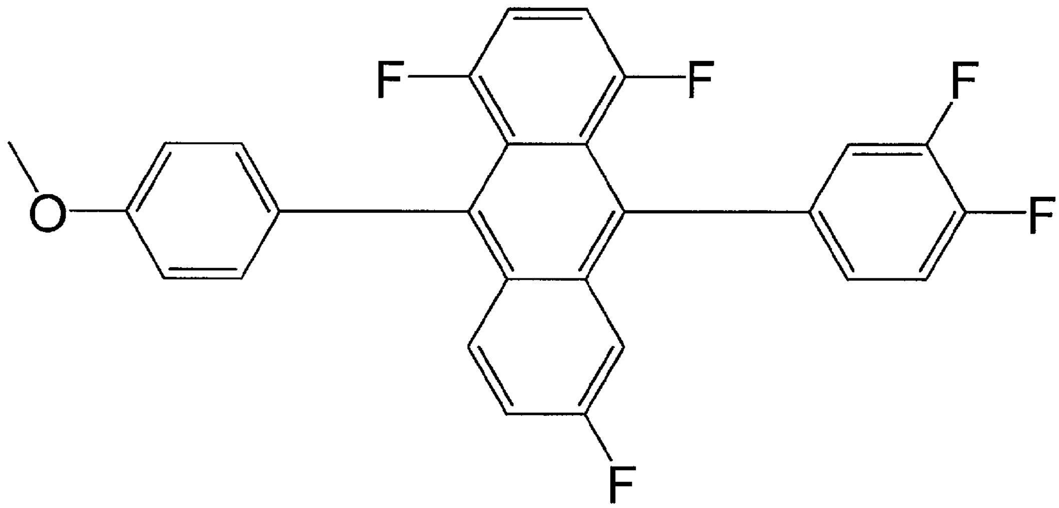
Figure 434:
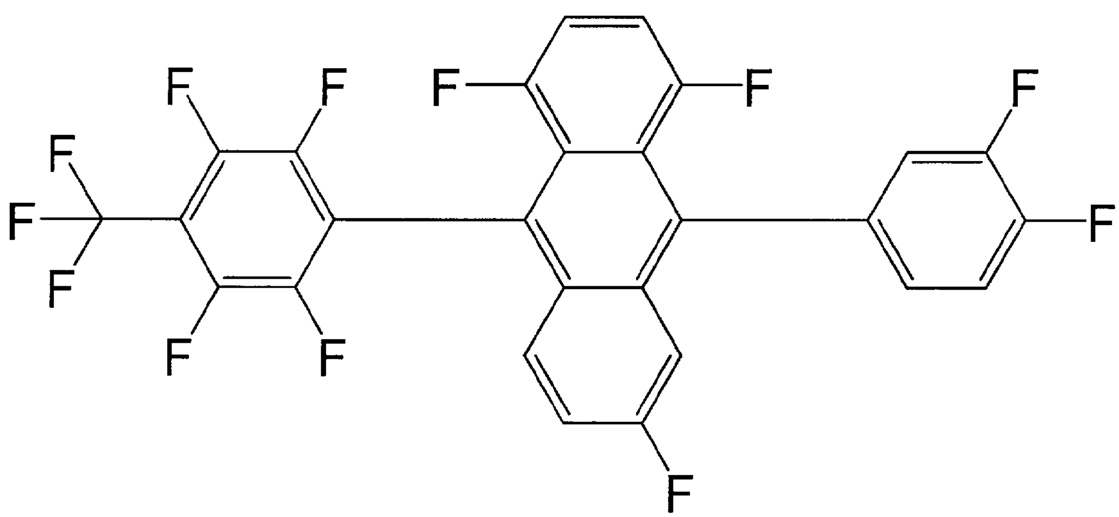
Figure 435:
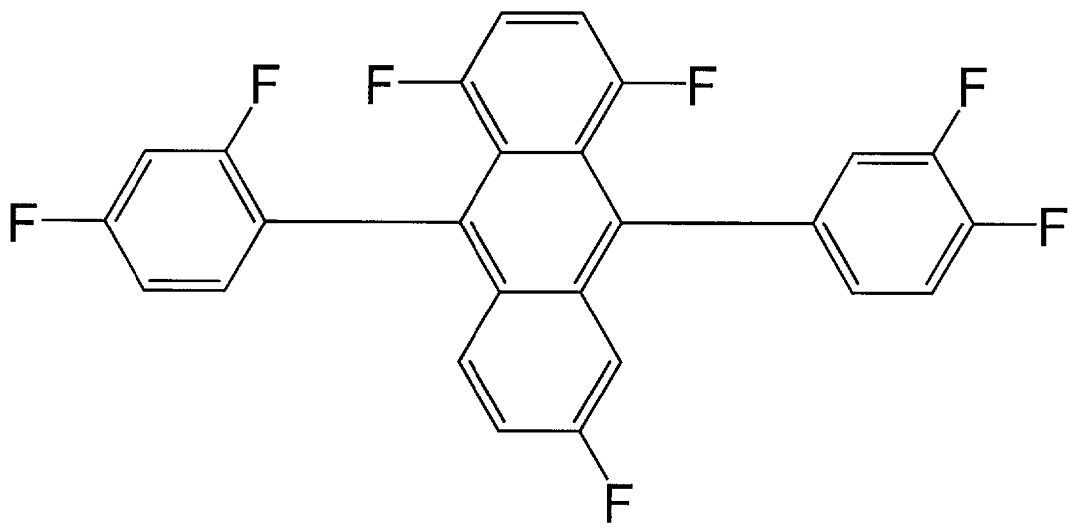
Figure 436:
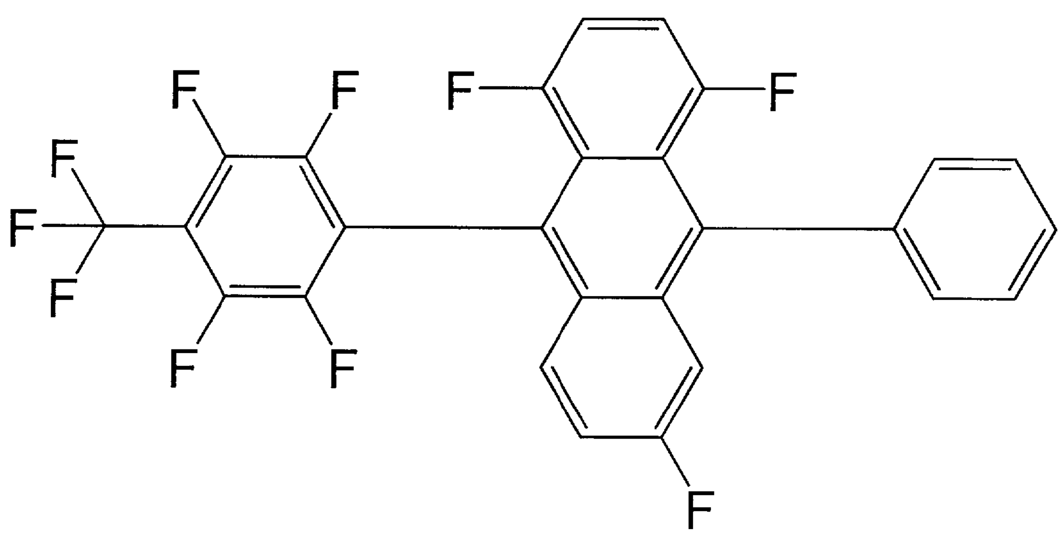
Figure 437:
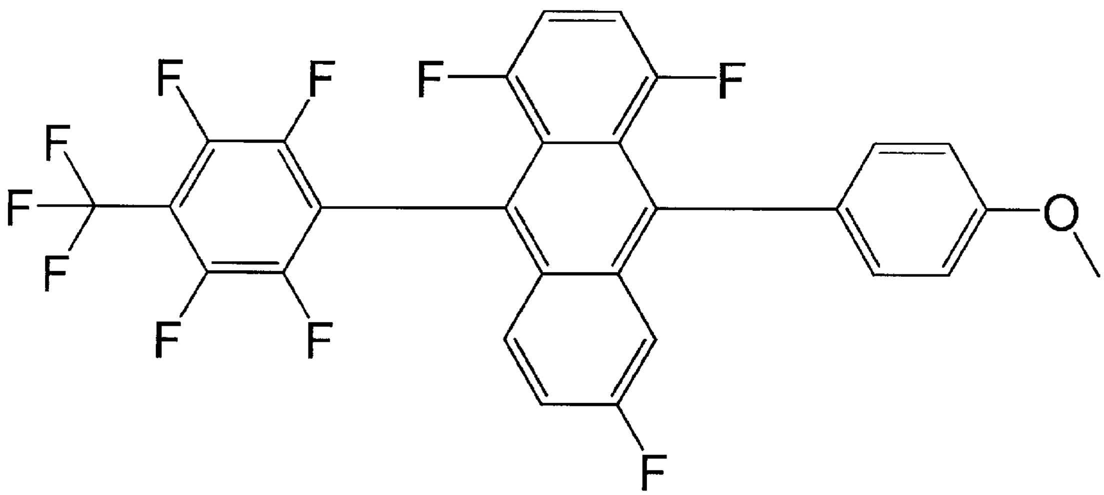
Figure 438:
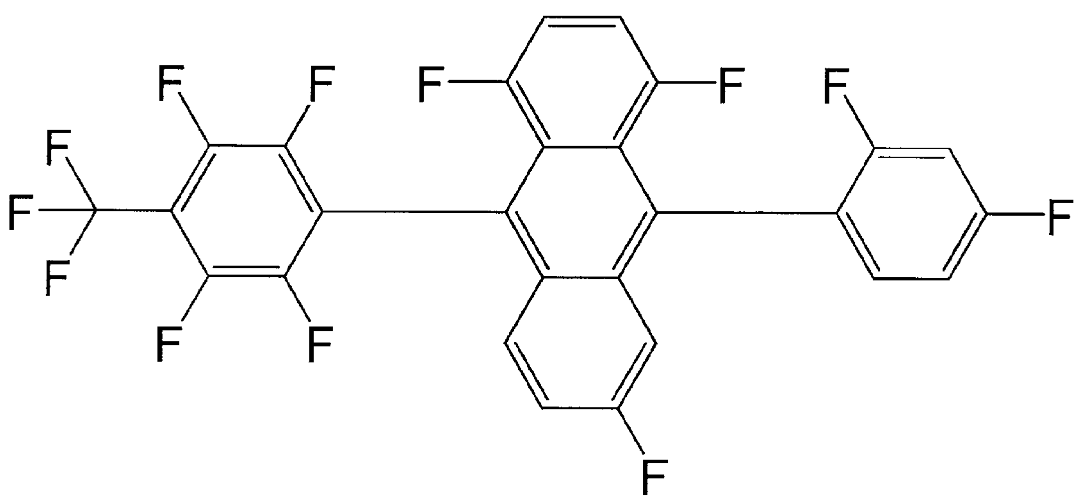
Figure 439:
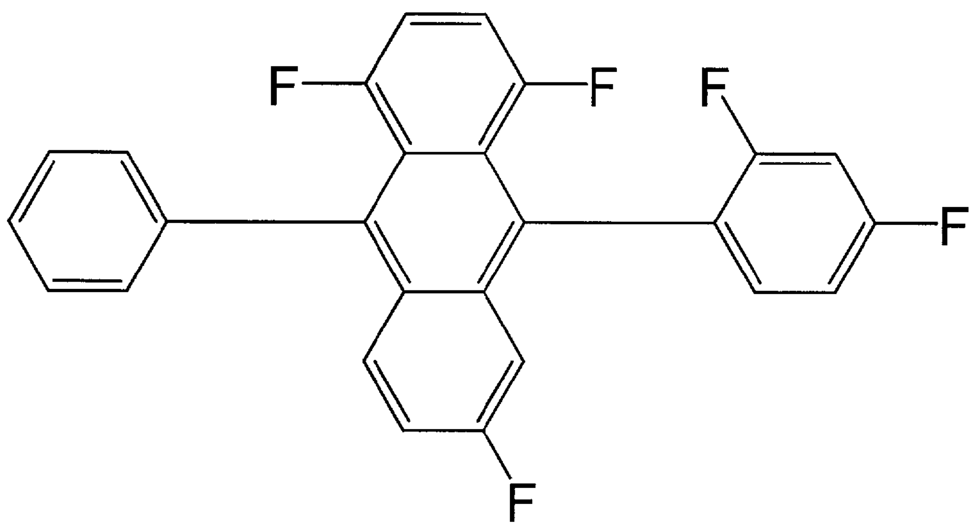
Figure 440:
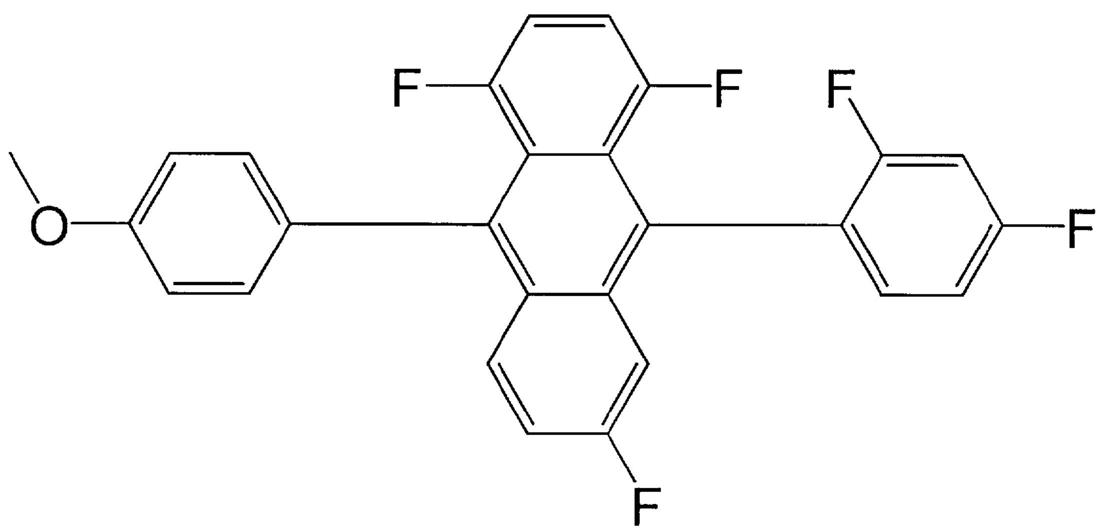
Figure 441:
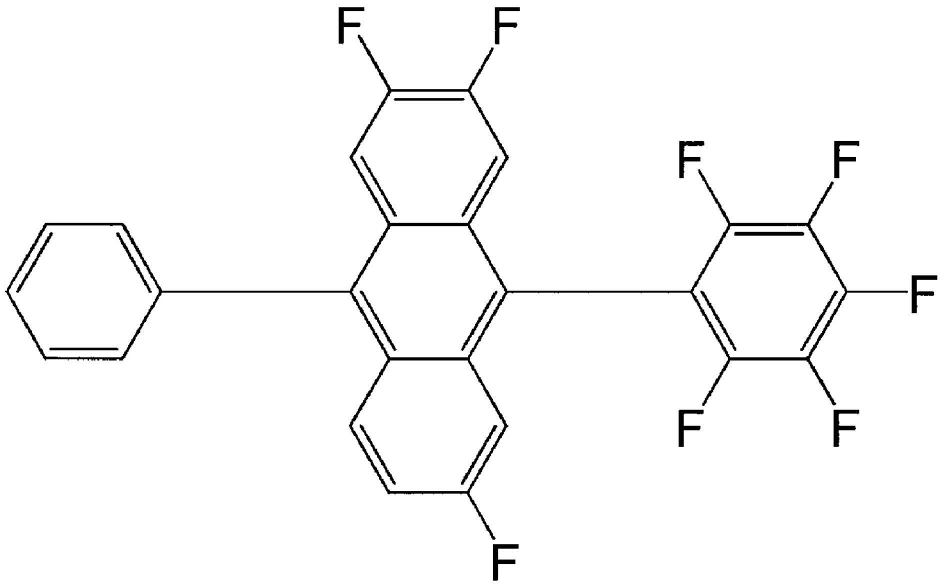
Figure 442:
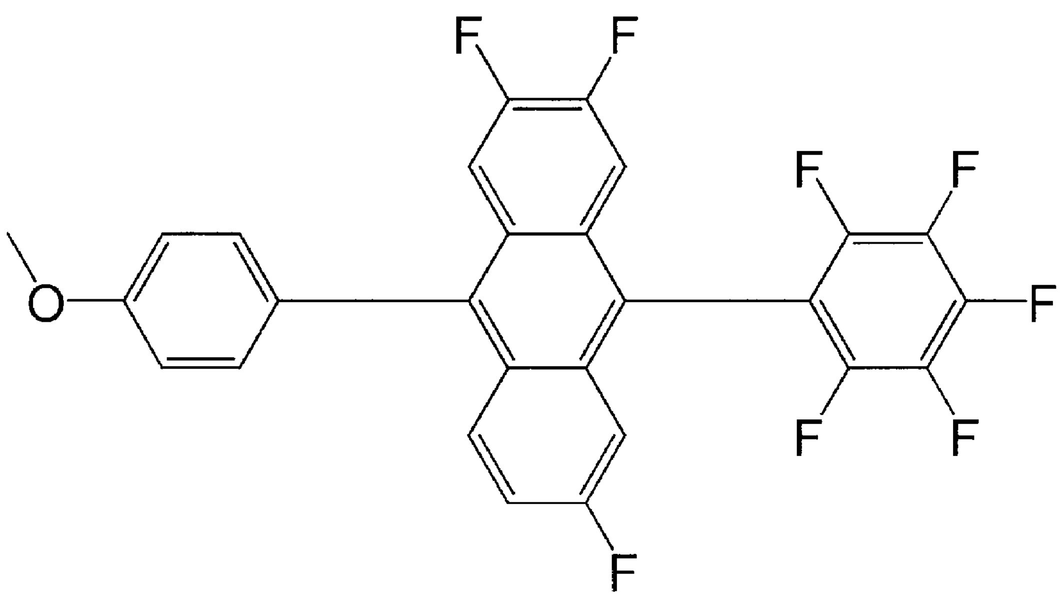
Figure 443:
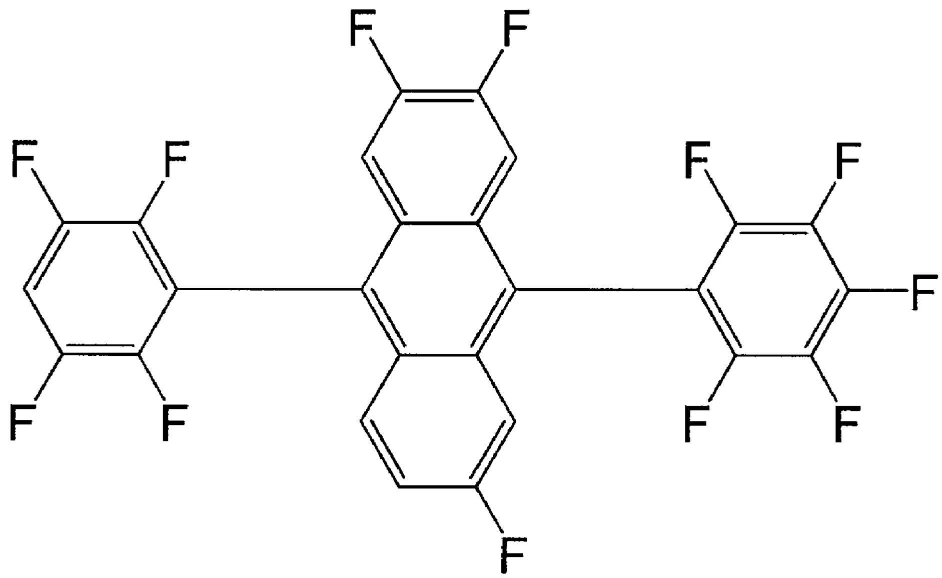
Figure 444:
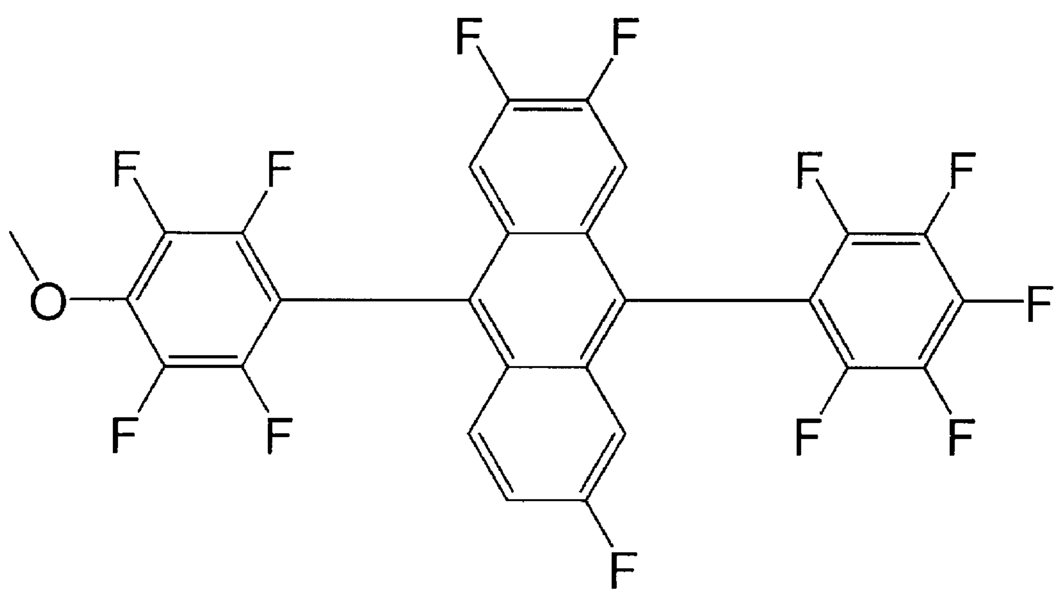
Figure 445:
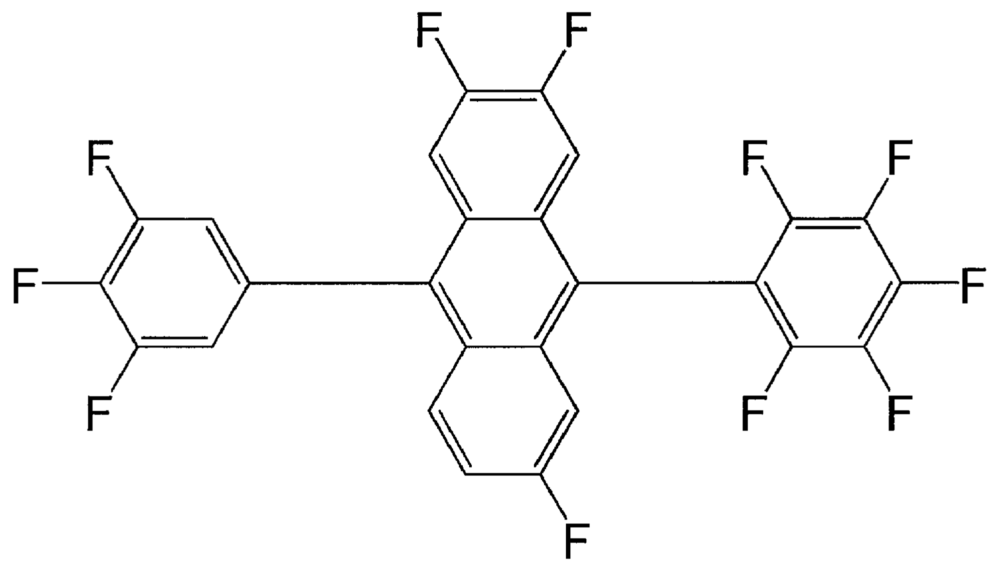
Figure 446:
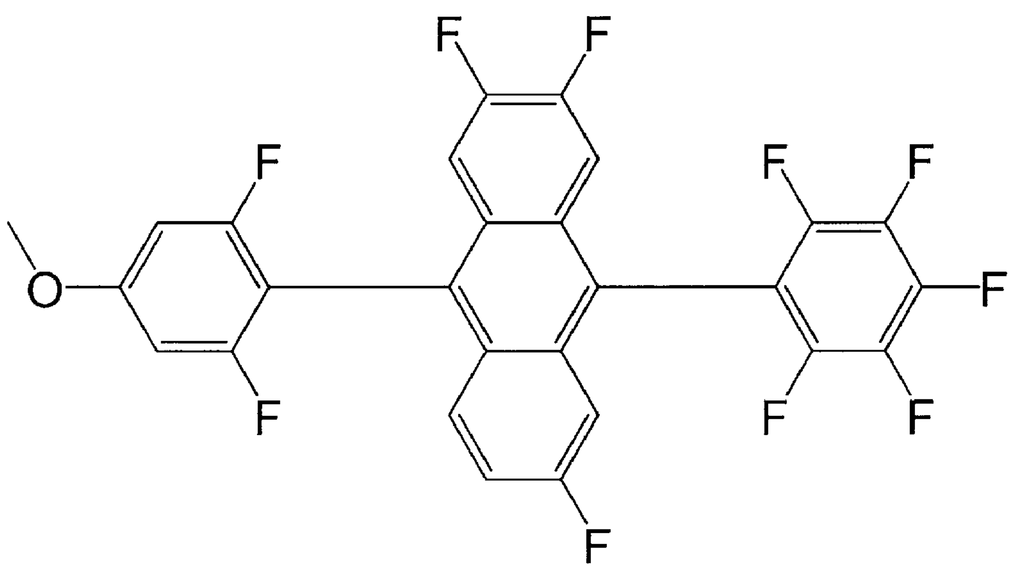
Figure 447:
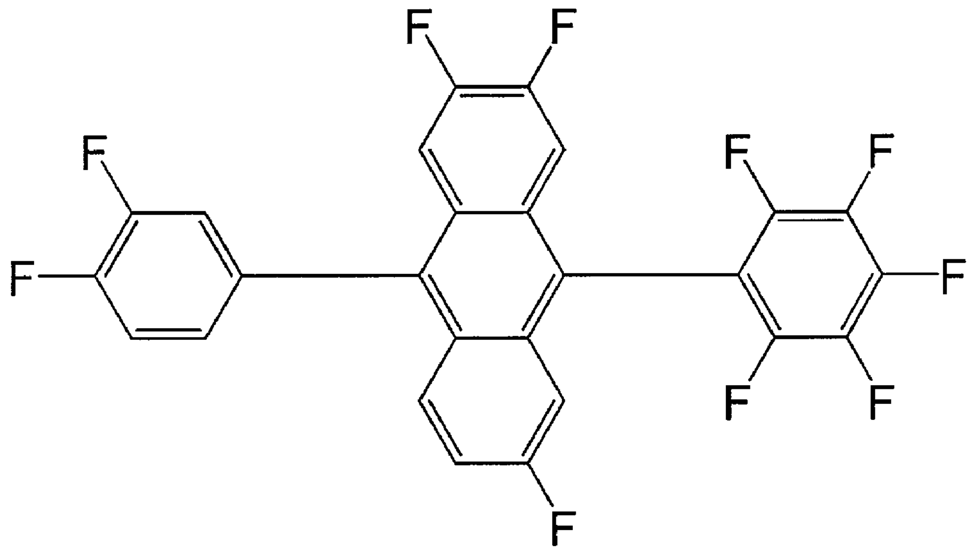
Figure 448:
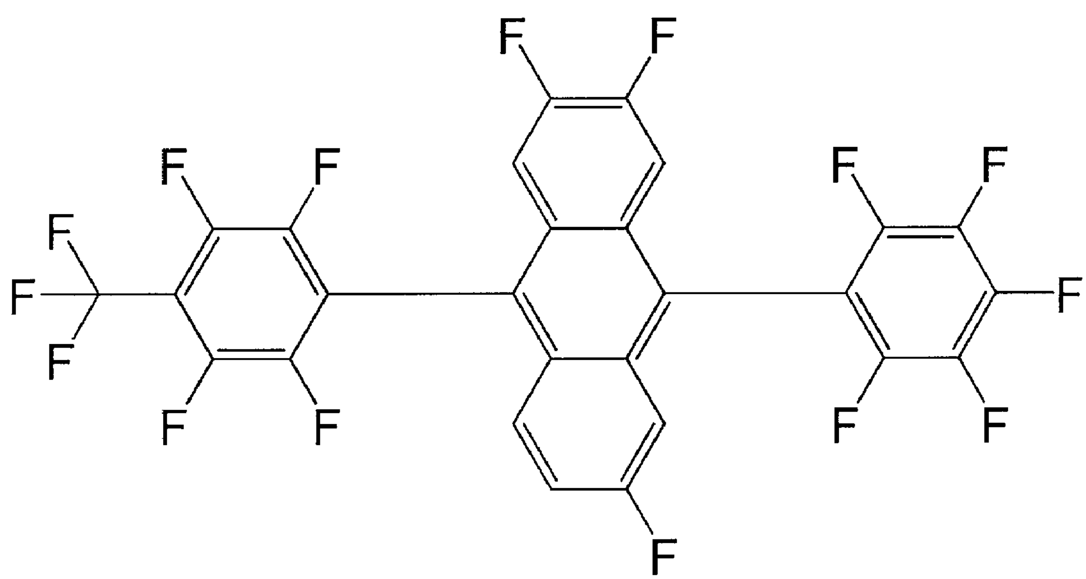
Figure 449:
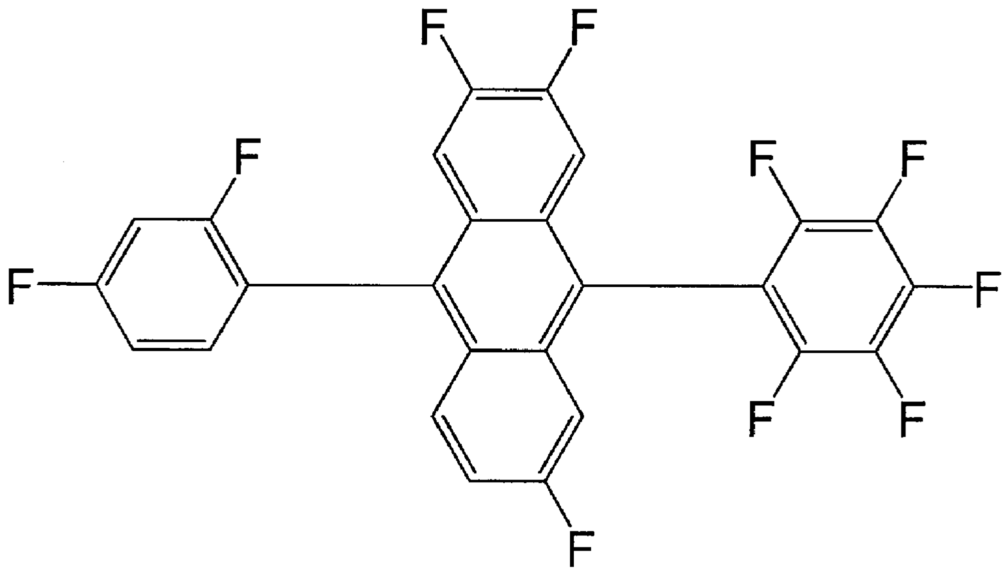
Figure 450:
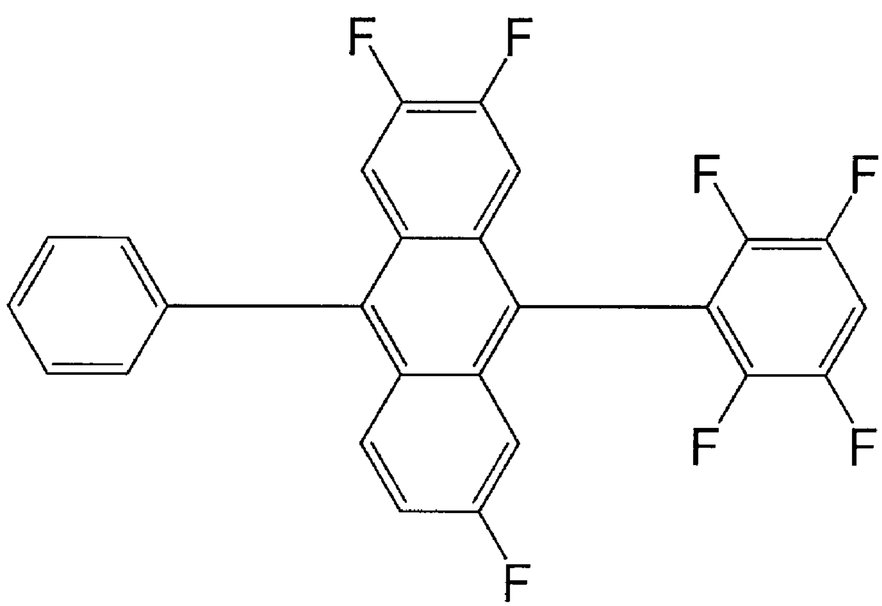
Figure 451:
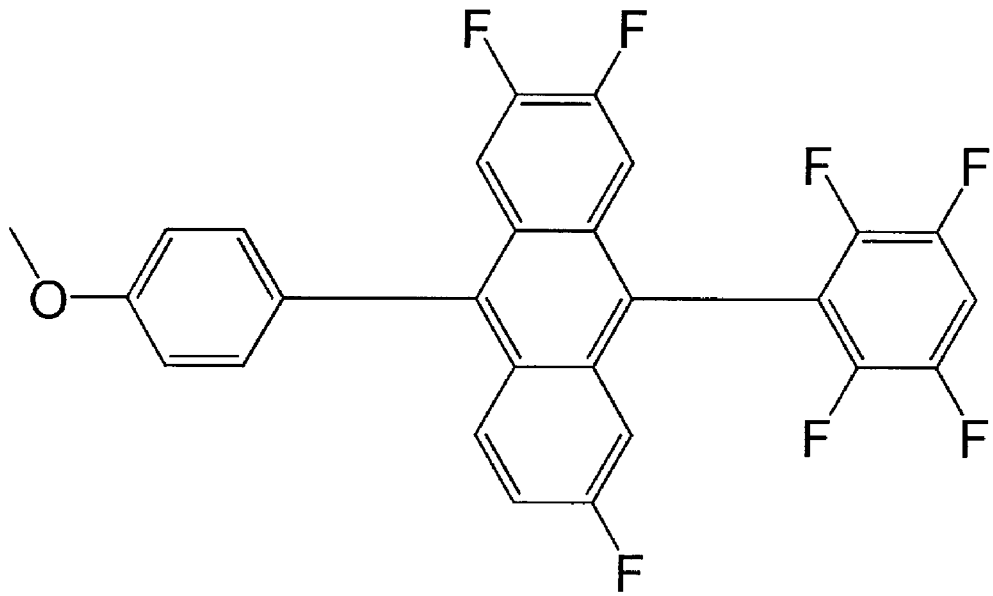
Figure 452:
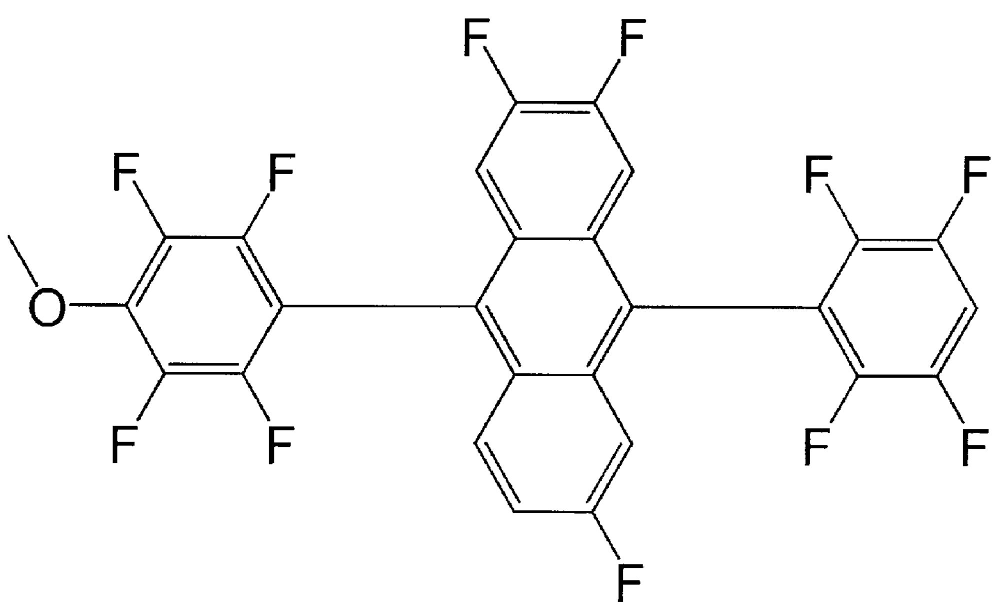
Figure 453:
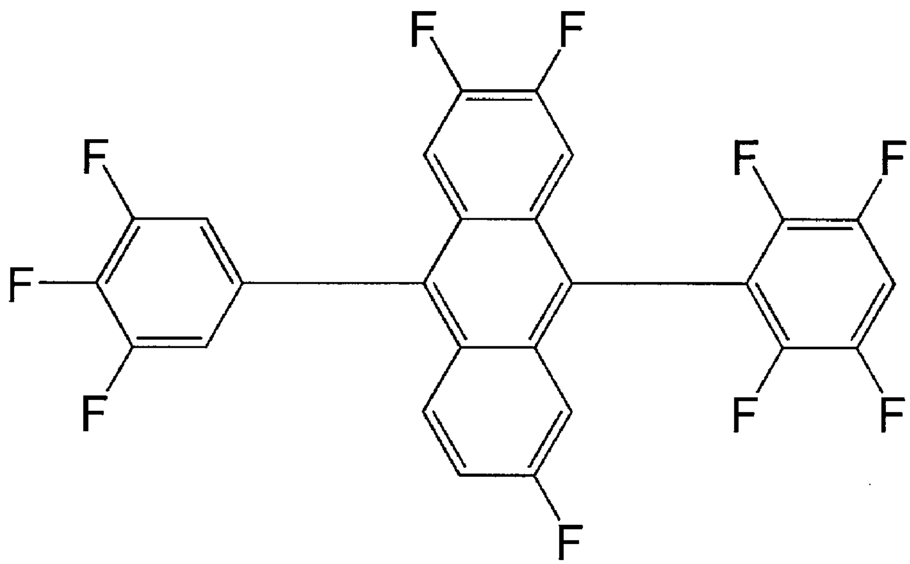
Figure 454:
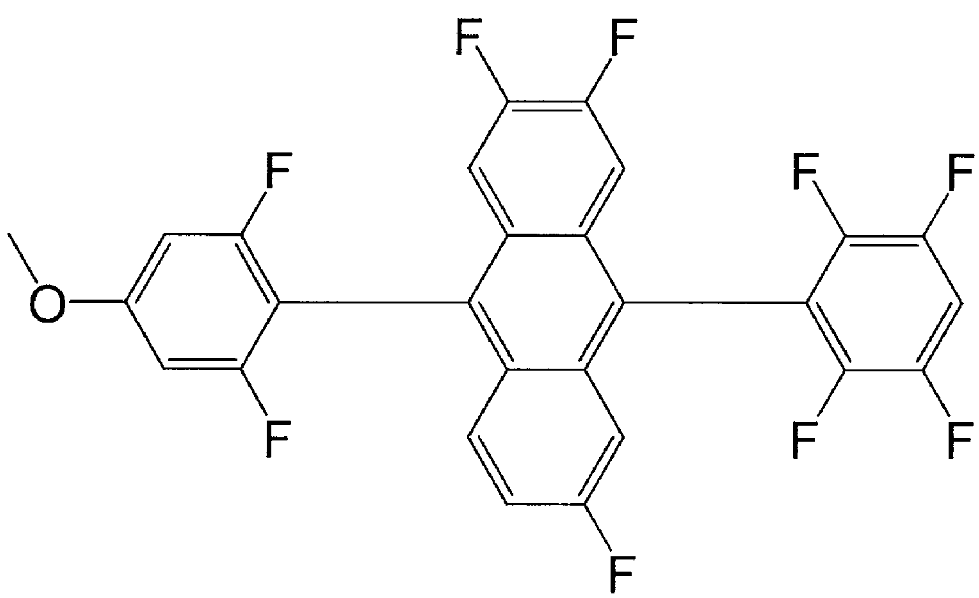
Figure 455:
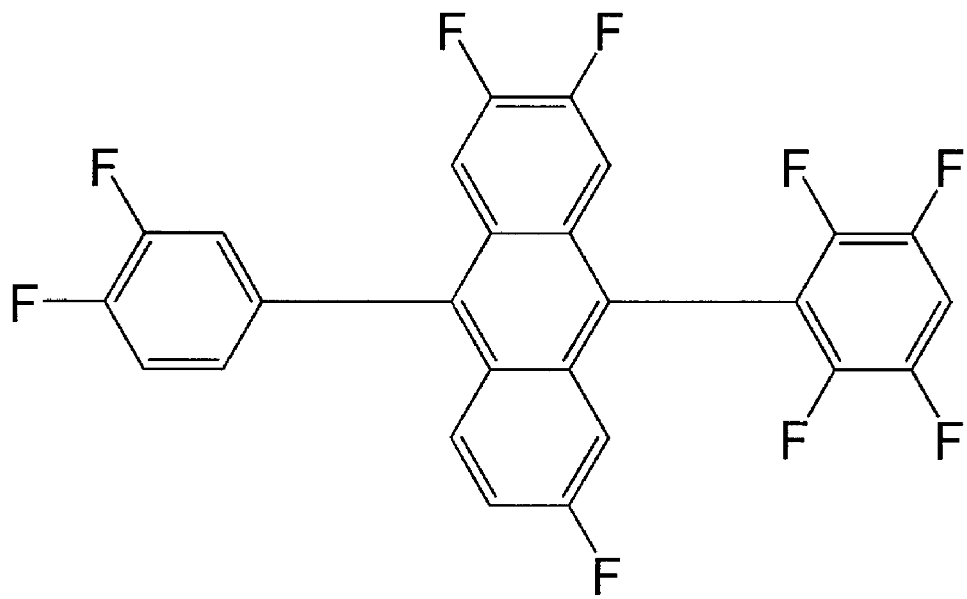
Figure 456:
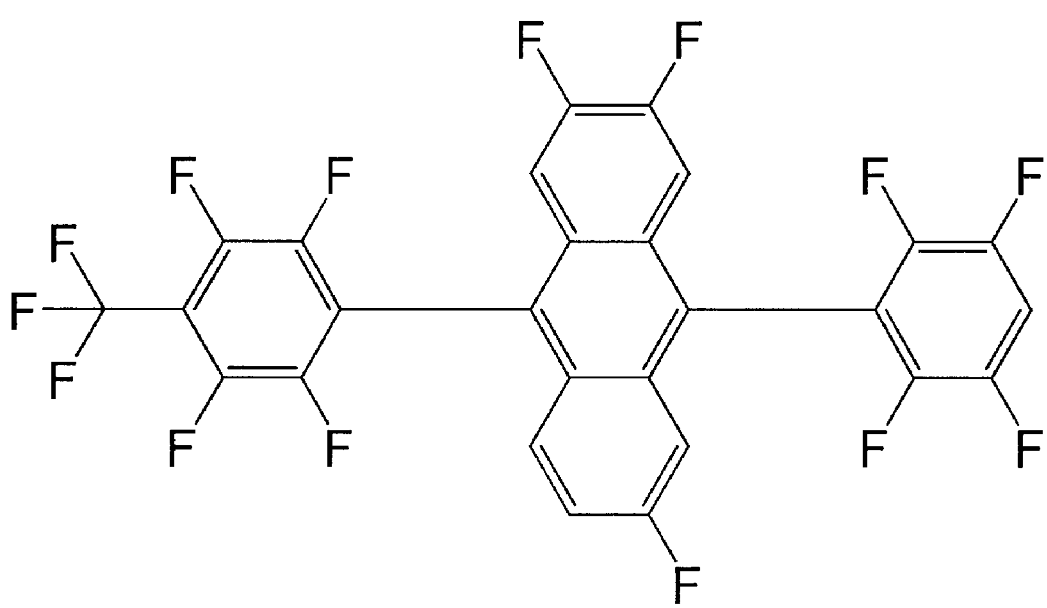
Figure 457:
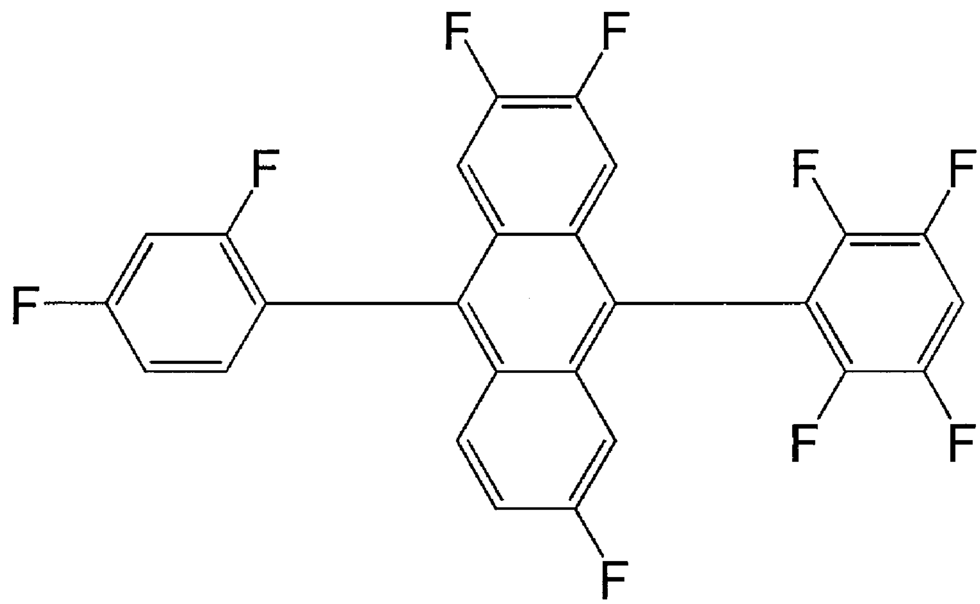
Figure 458:
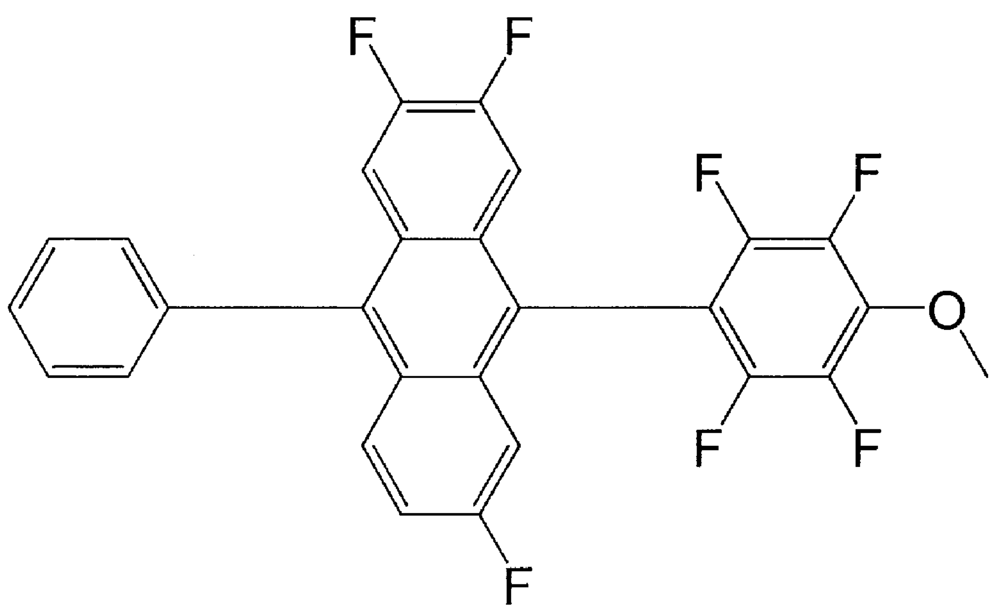
Figure 459:
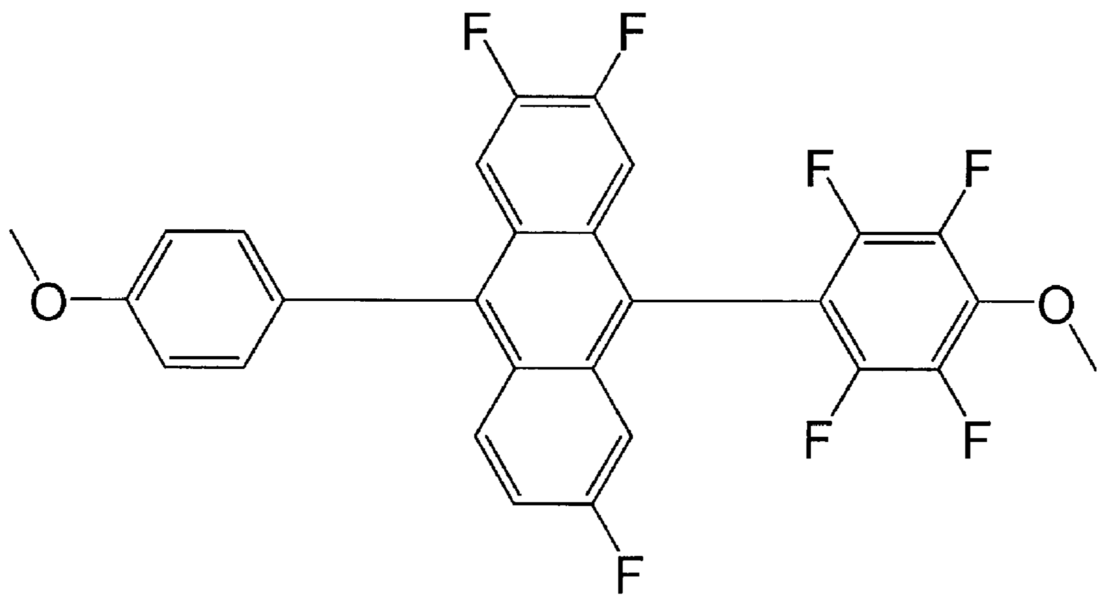
Figure 460:
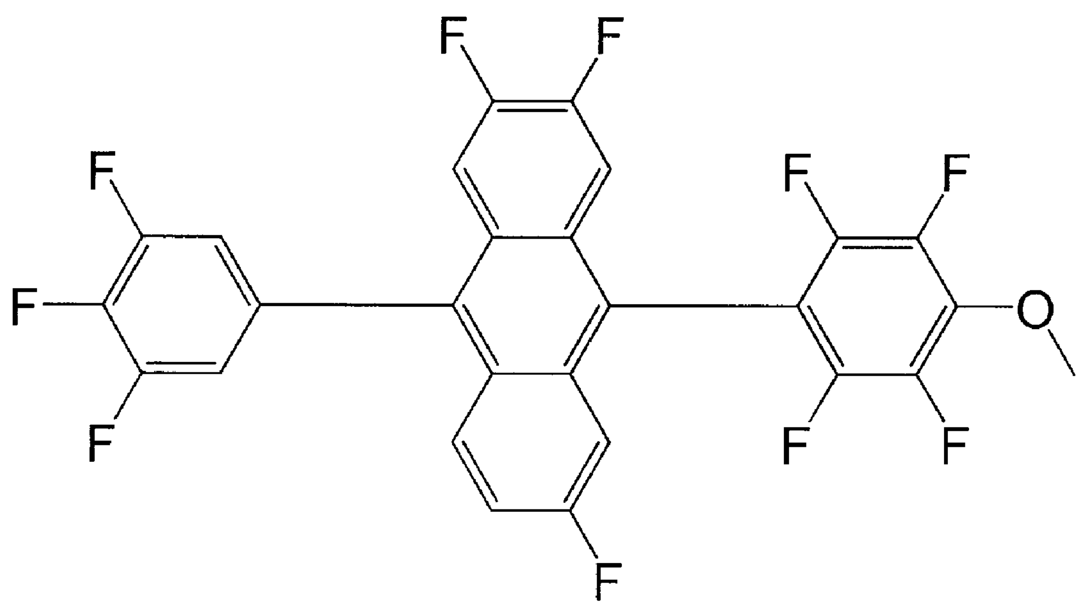
Figure 461:
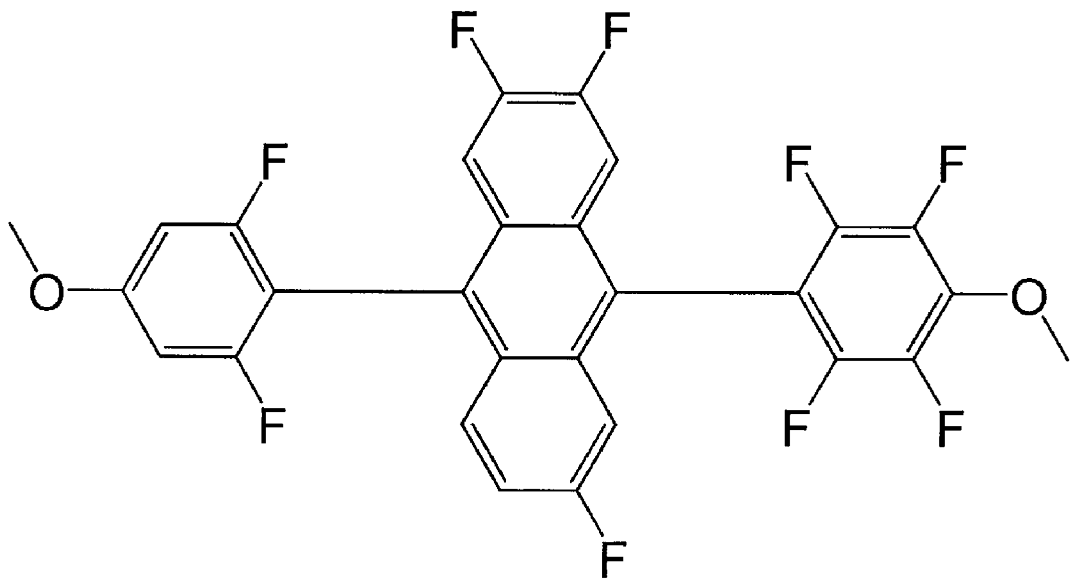
Figure 462:
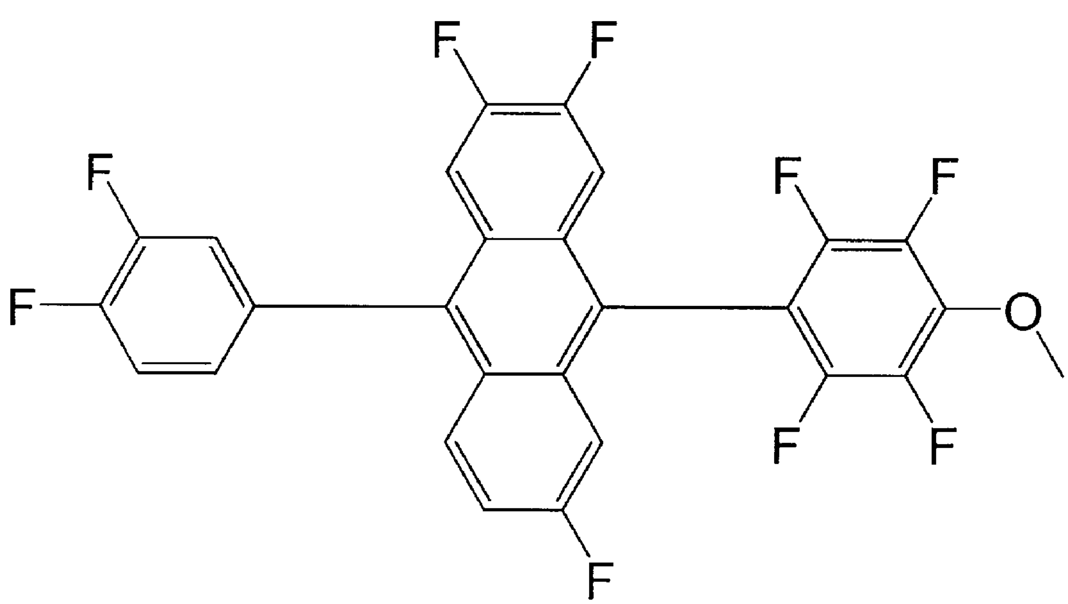
Figure 463:
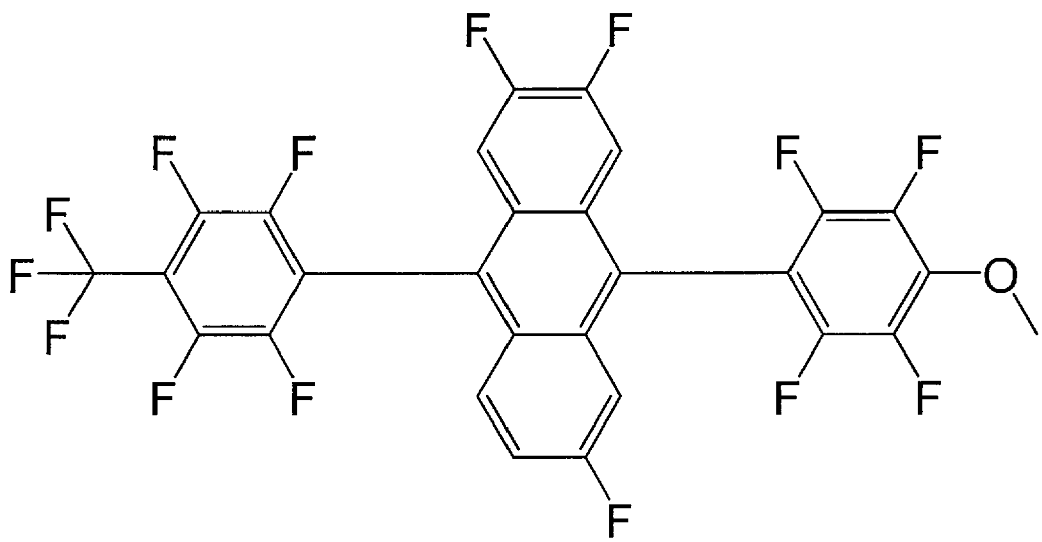
Figure 464:
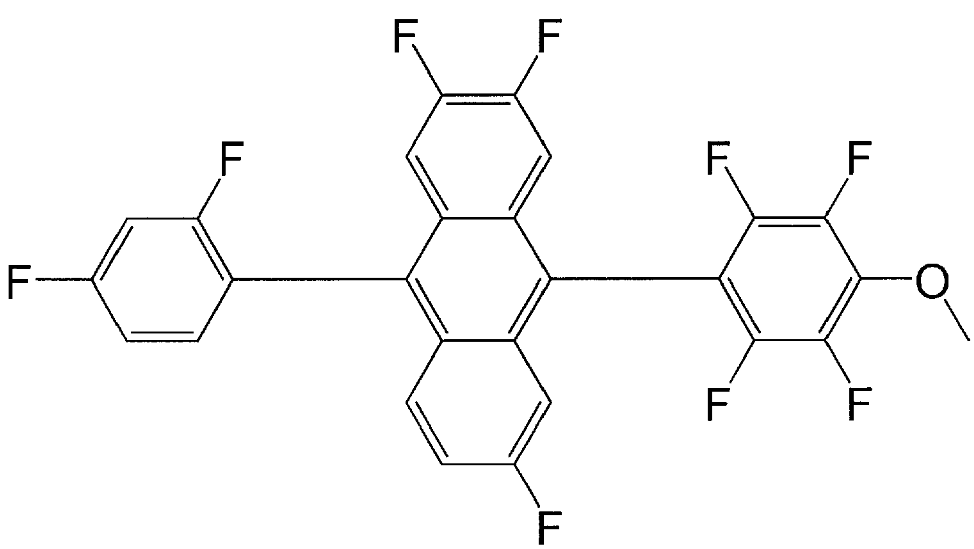
Figure 465:
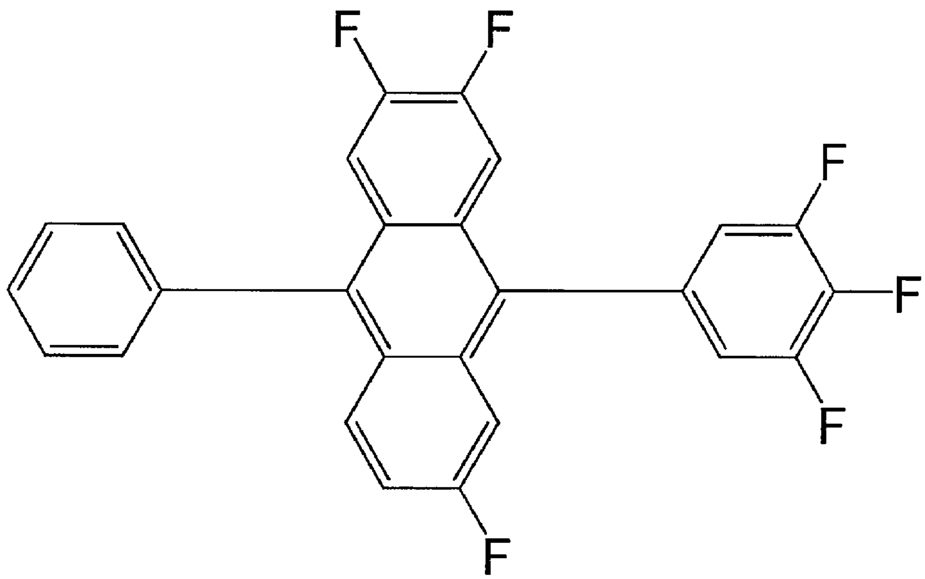
Figure 466:
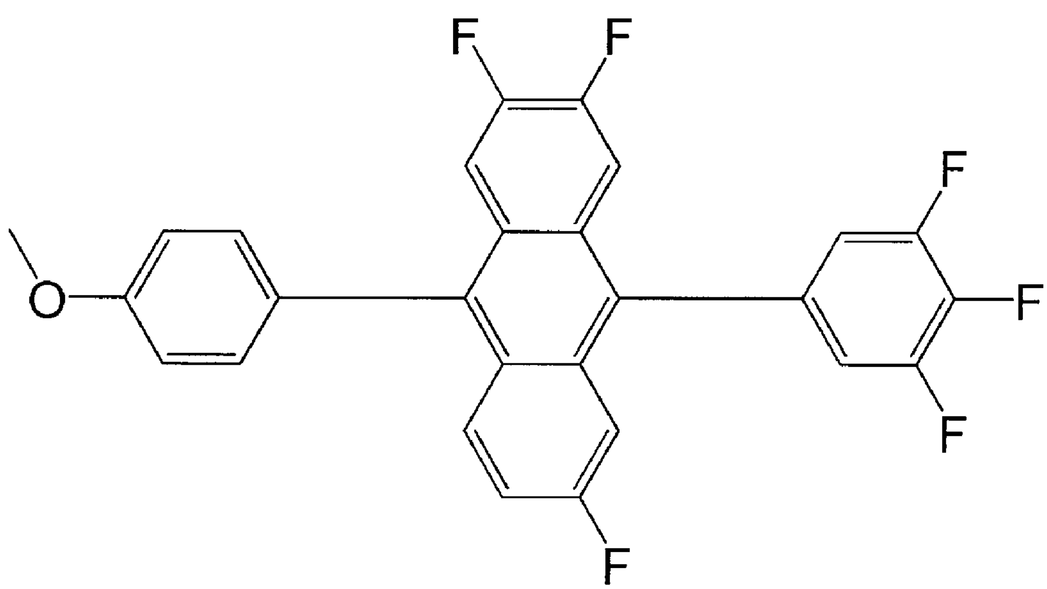
Figure 467:
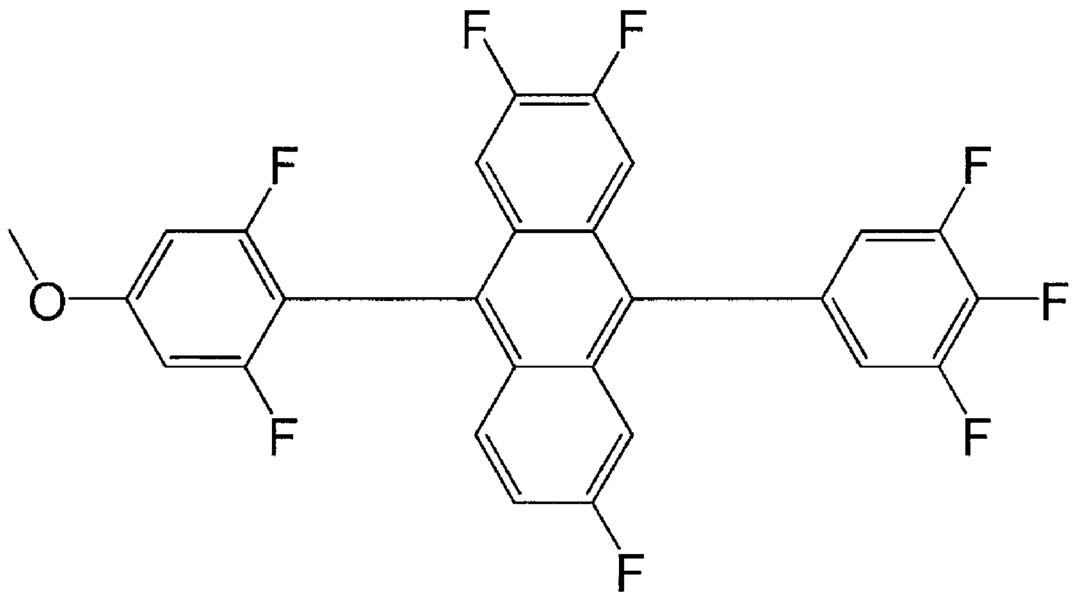
Figure 468:
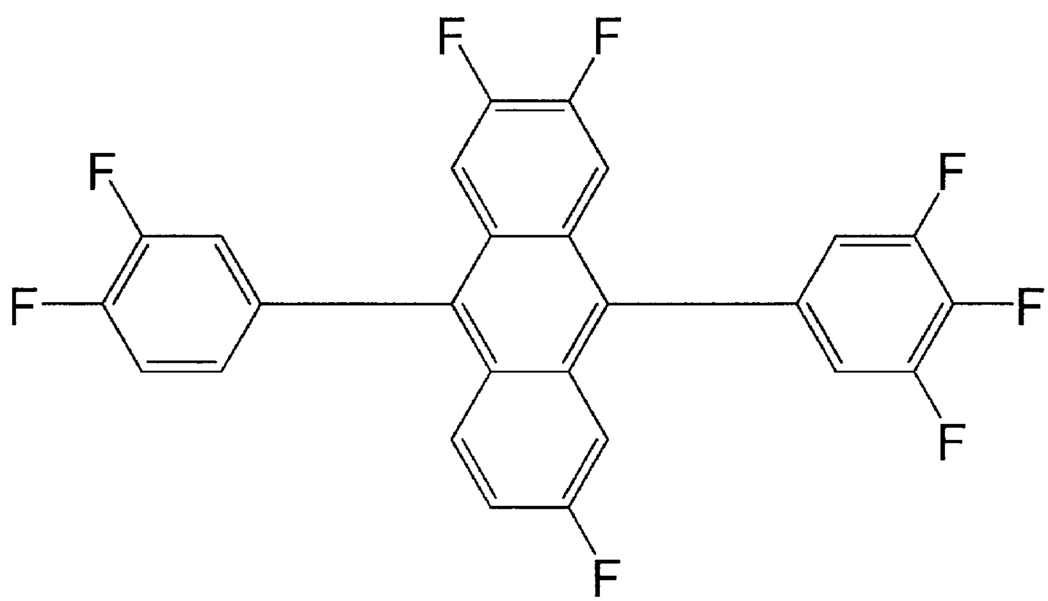
Figure 469:
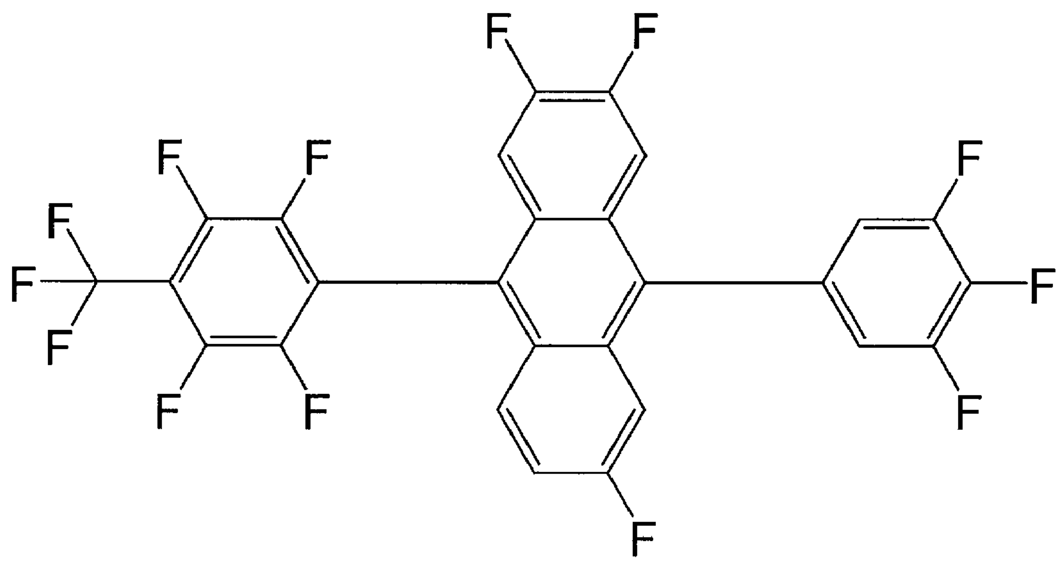
Figure 470:
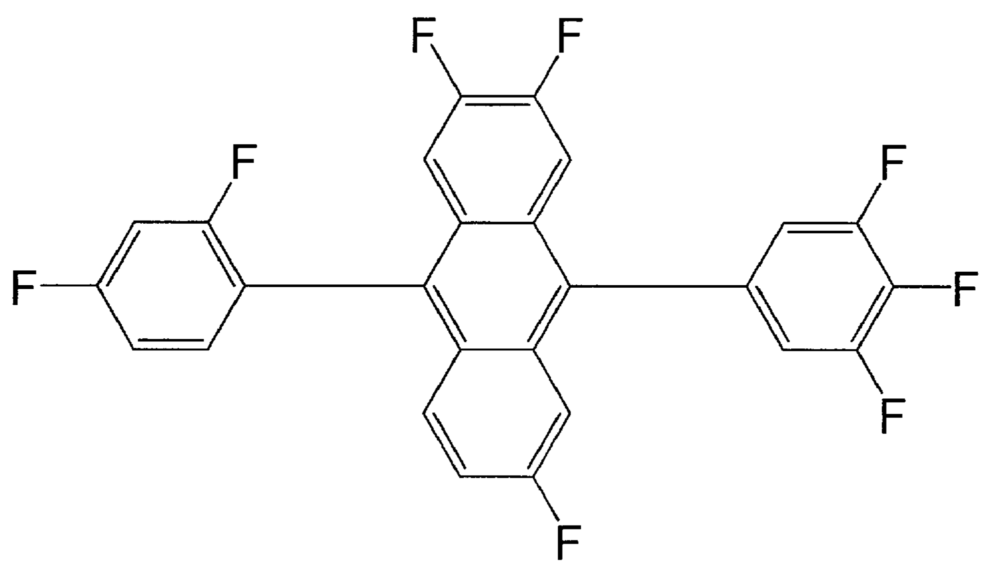
Figure 471:
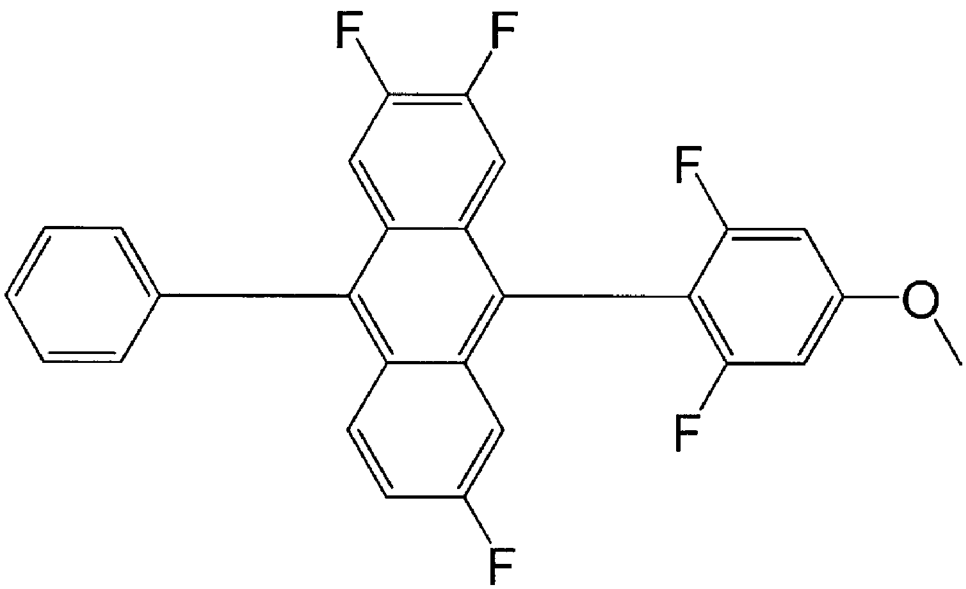
Figure 472:
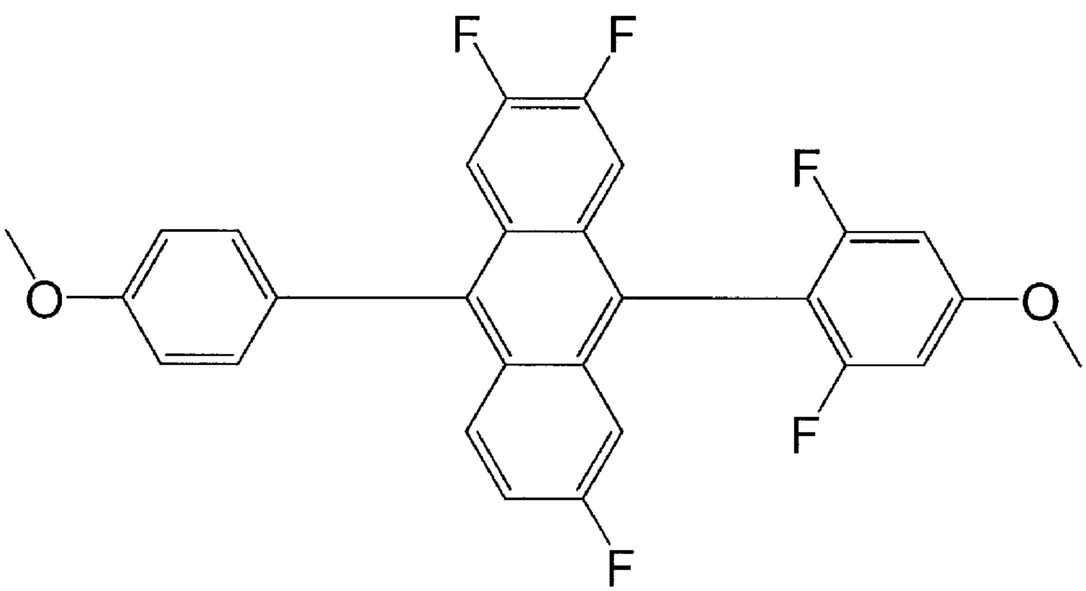
Figure 473:
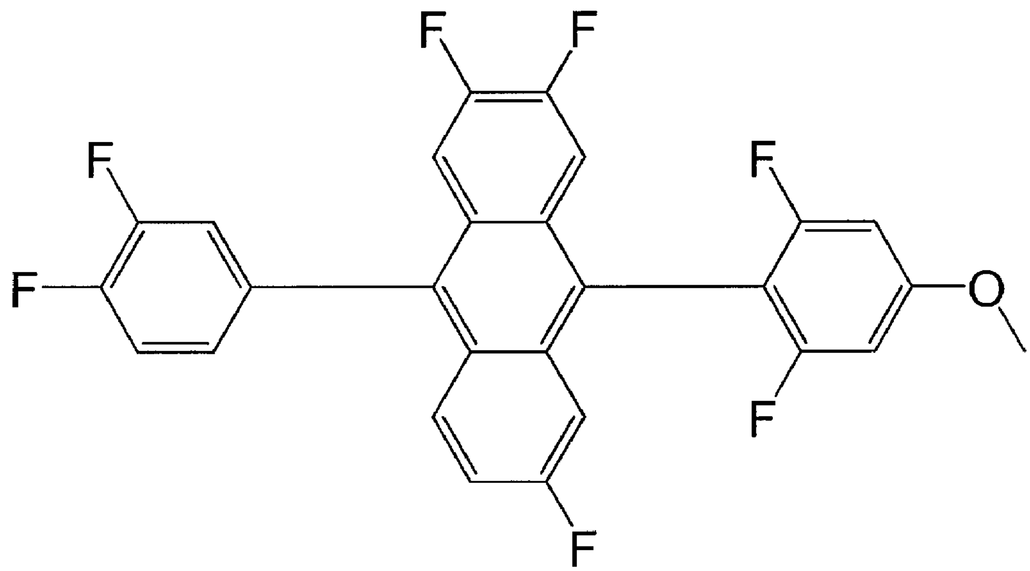
Figure 474:
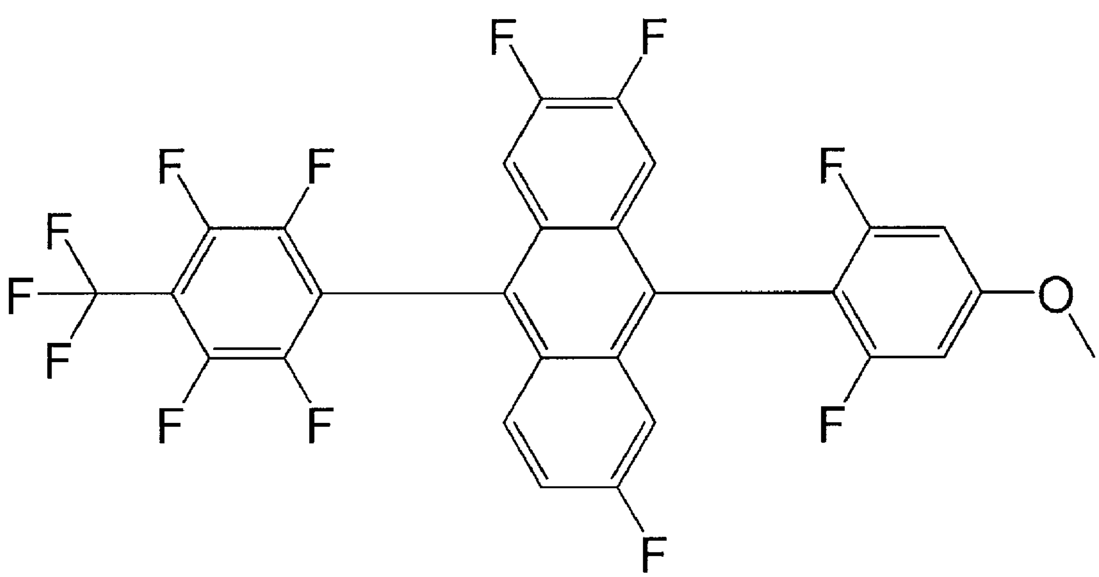
Figure 475:
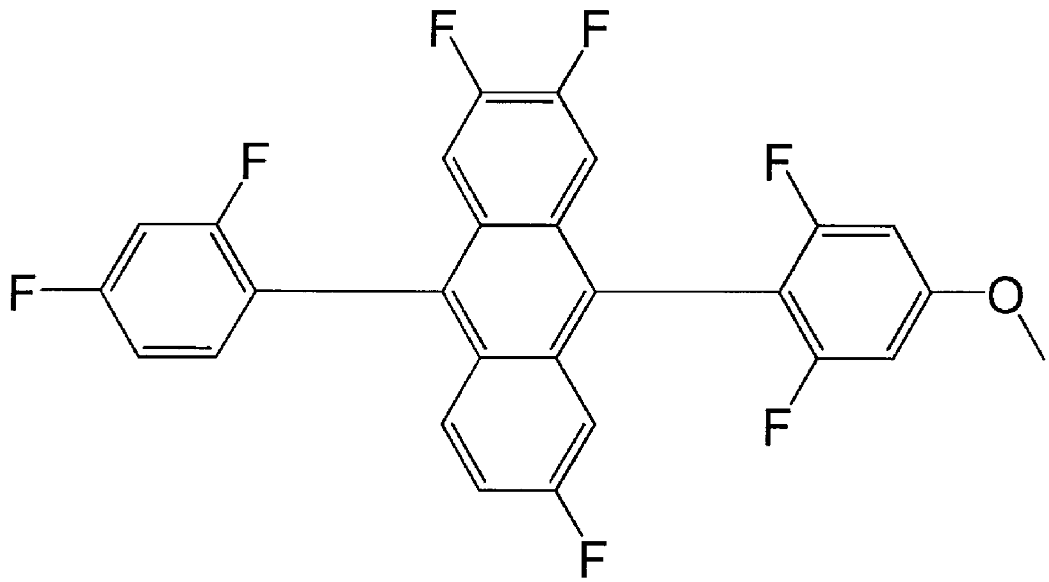
Figure 476:
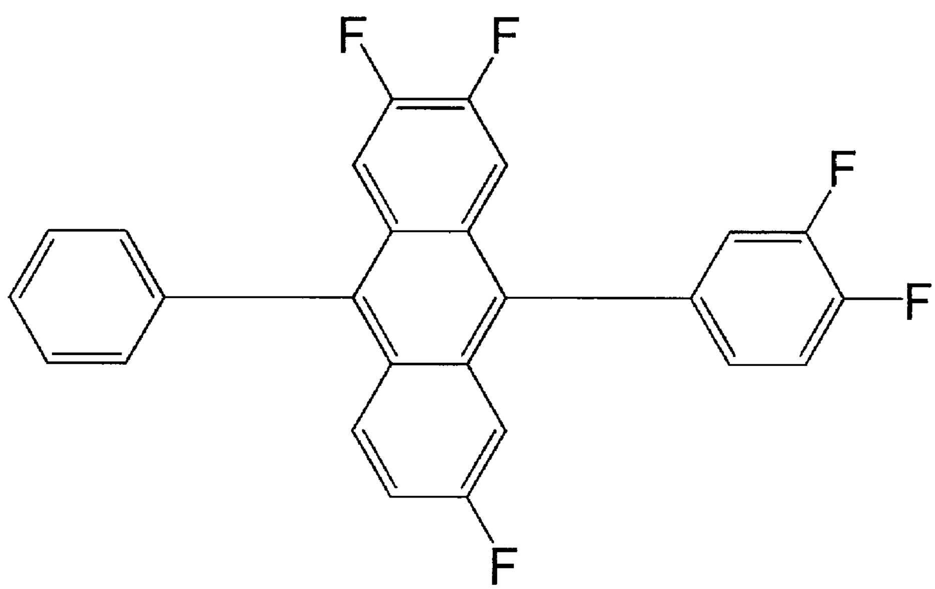
Figure 477:
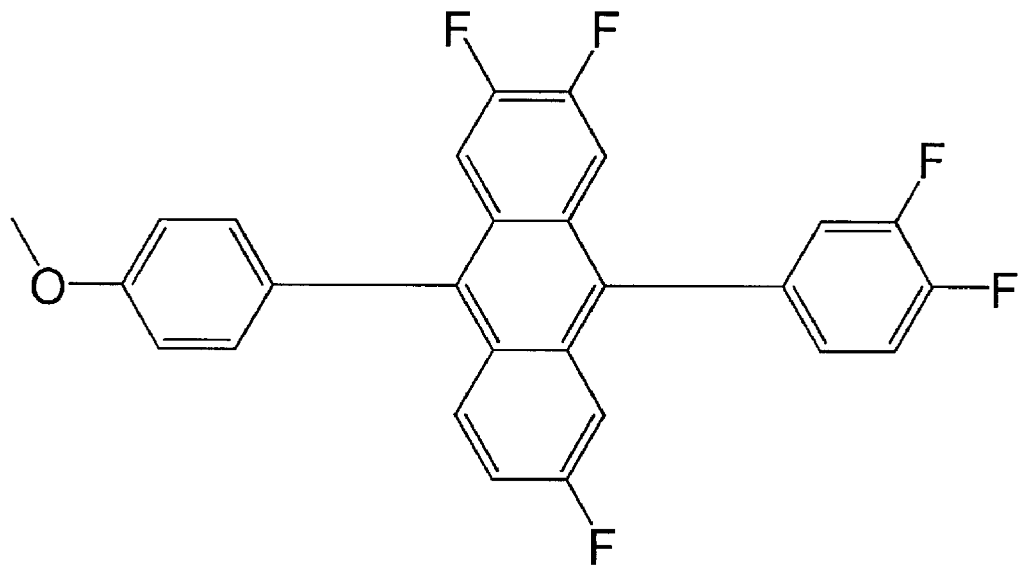
Figure 478:
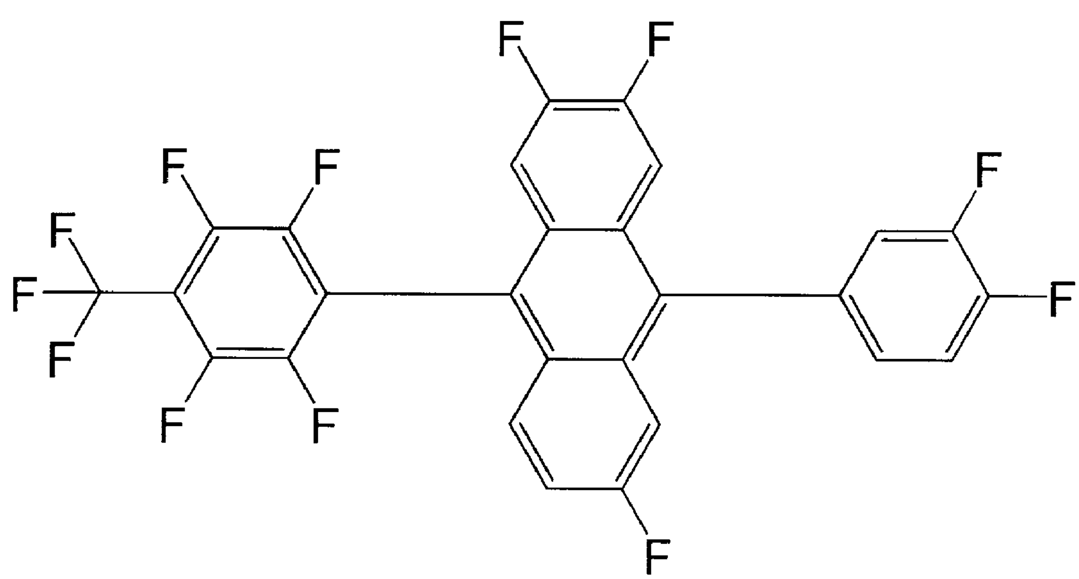
Figure 479:
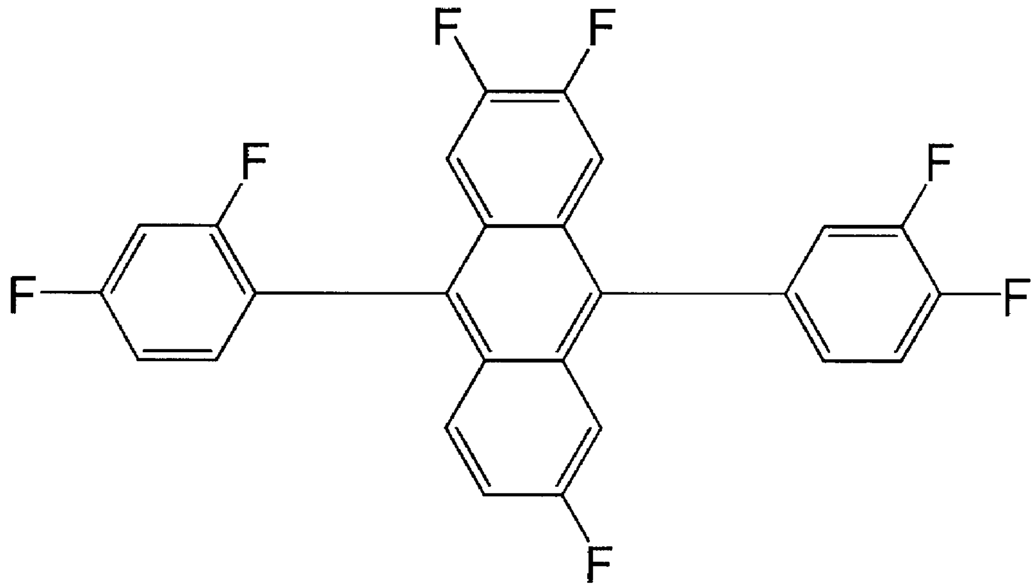
Figure 480:
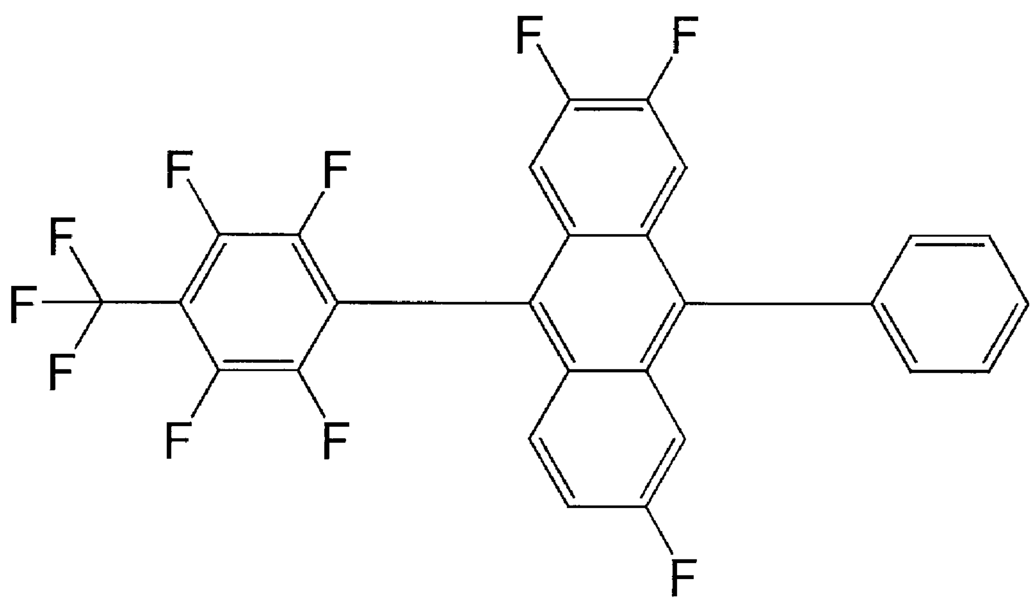
Figure 481:
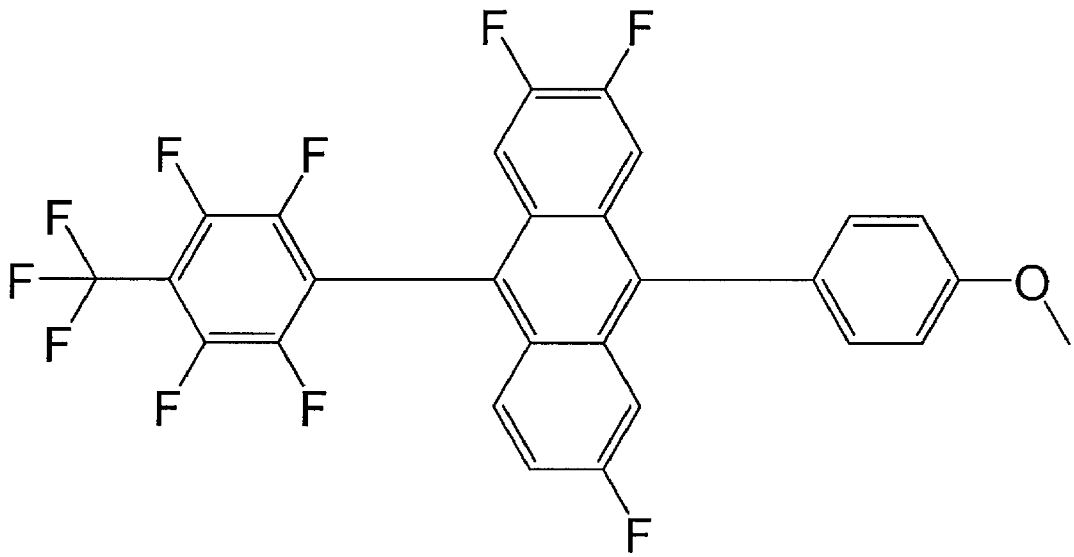
Figure 482:
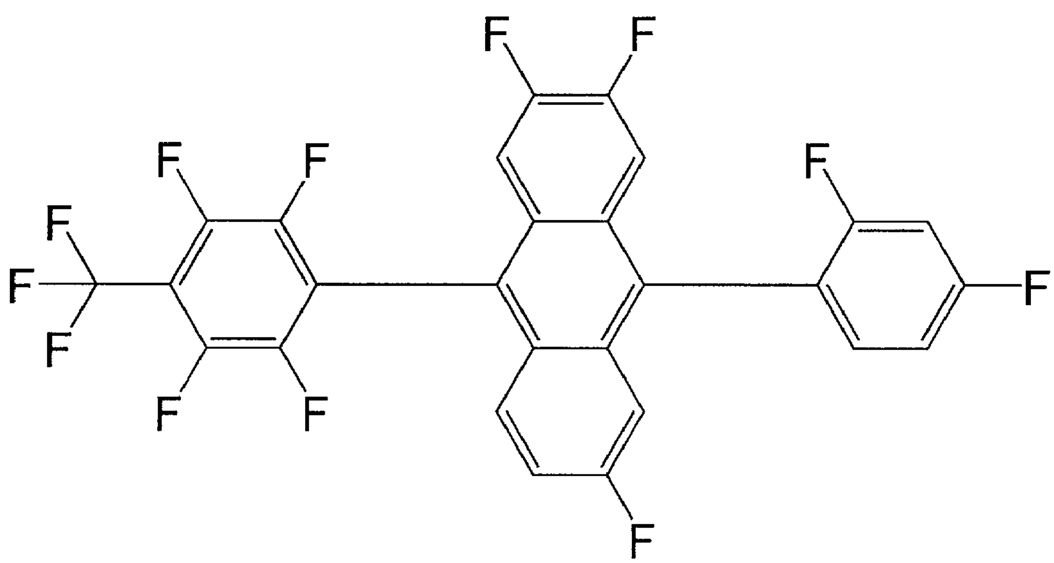
Figure 483:
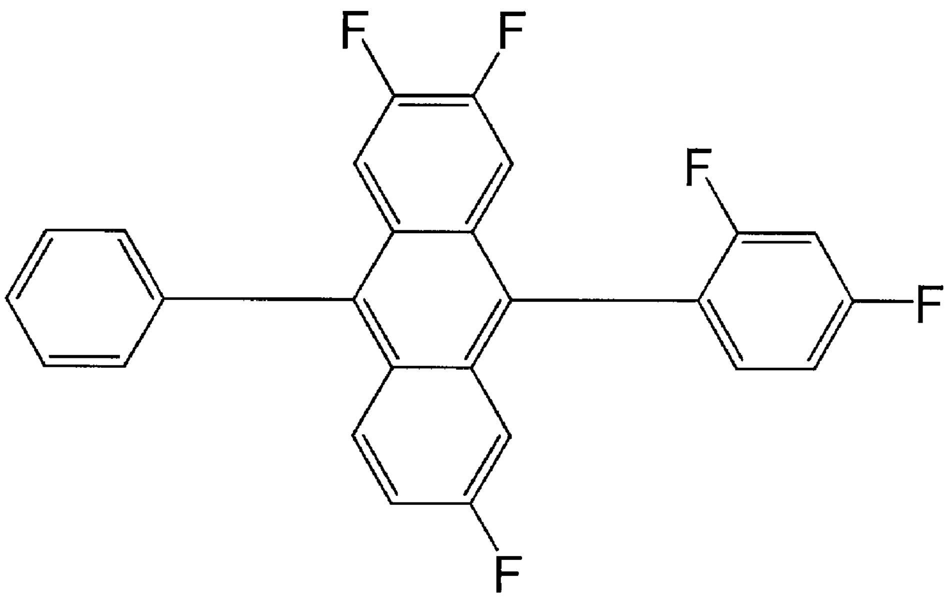
Figure 484:
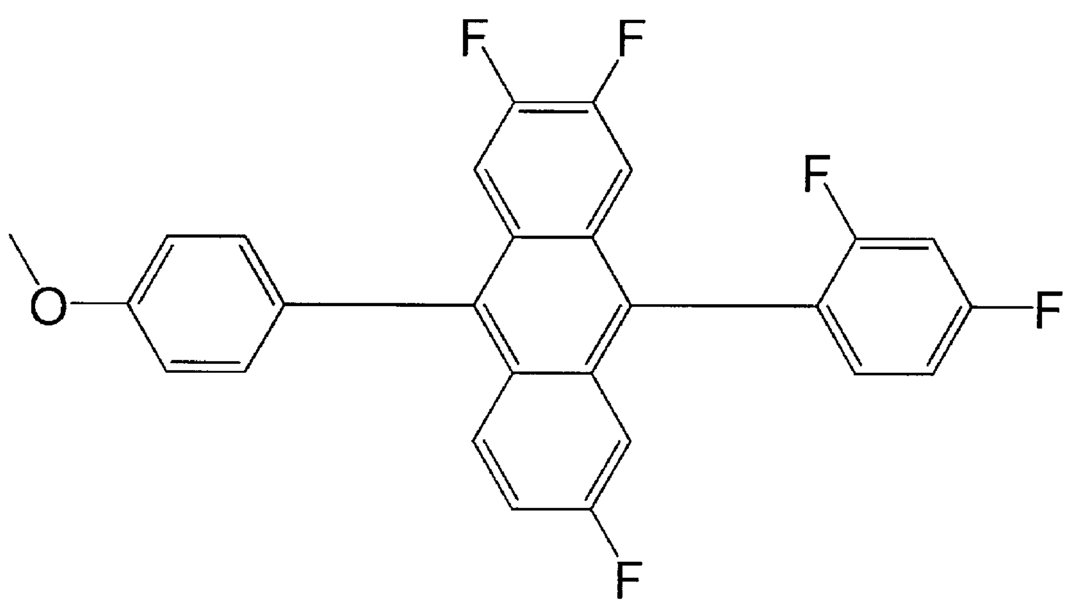
Figure 485:
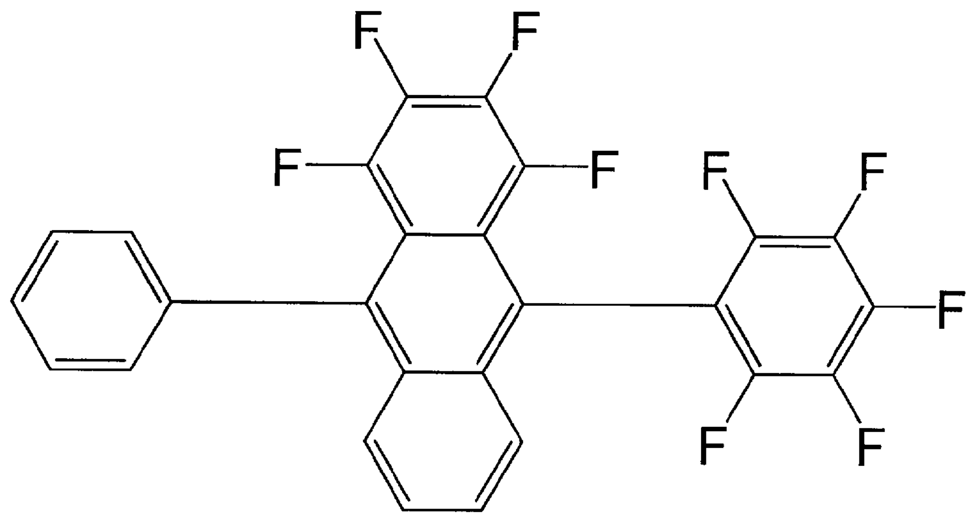
Figure 486:
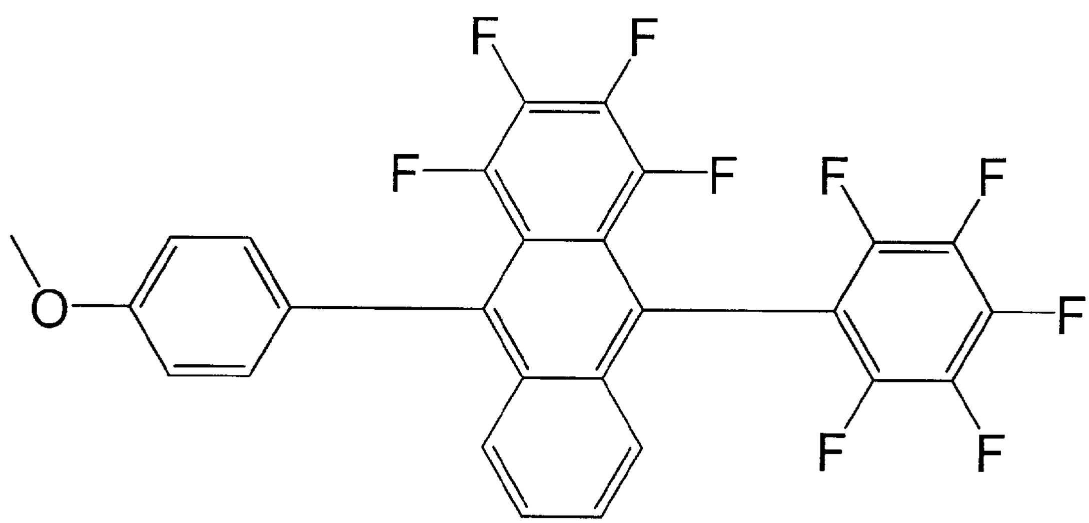
Figure 487:
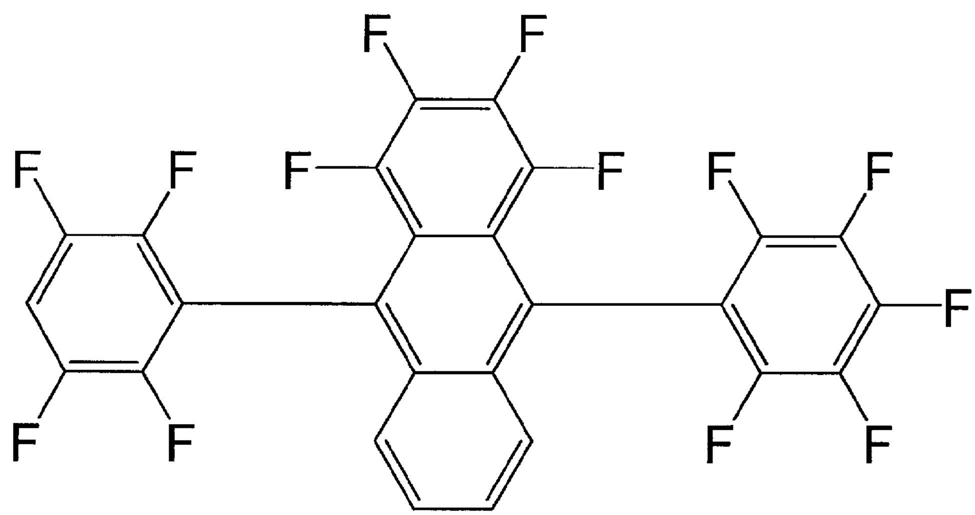
Figure 488:
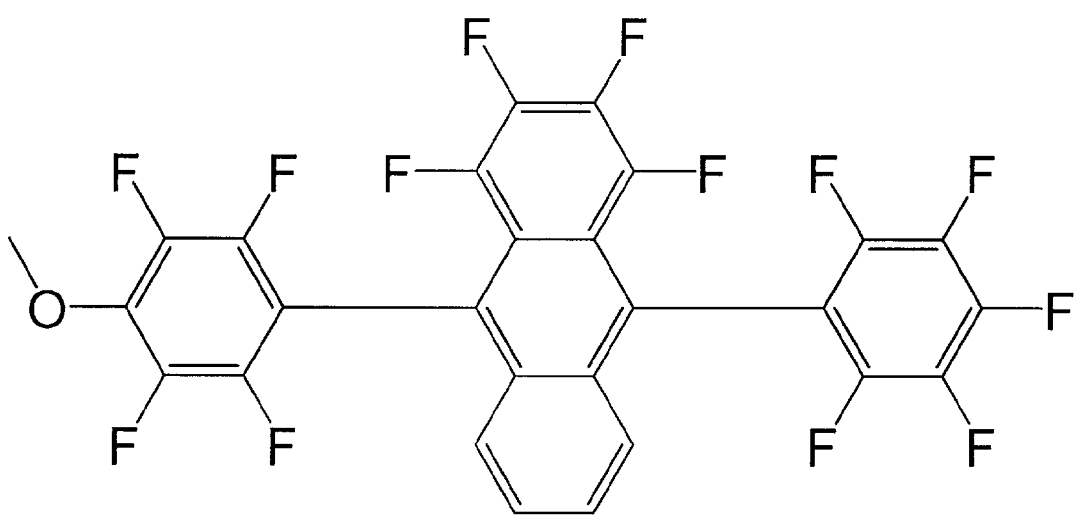
Figure 489:
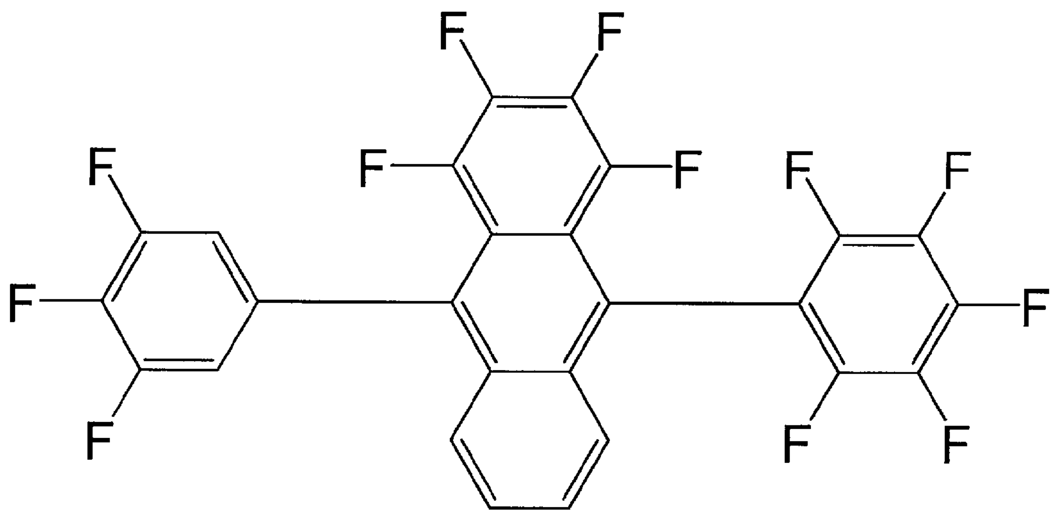
Figure 490:
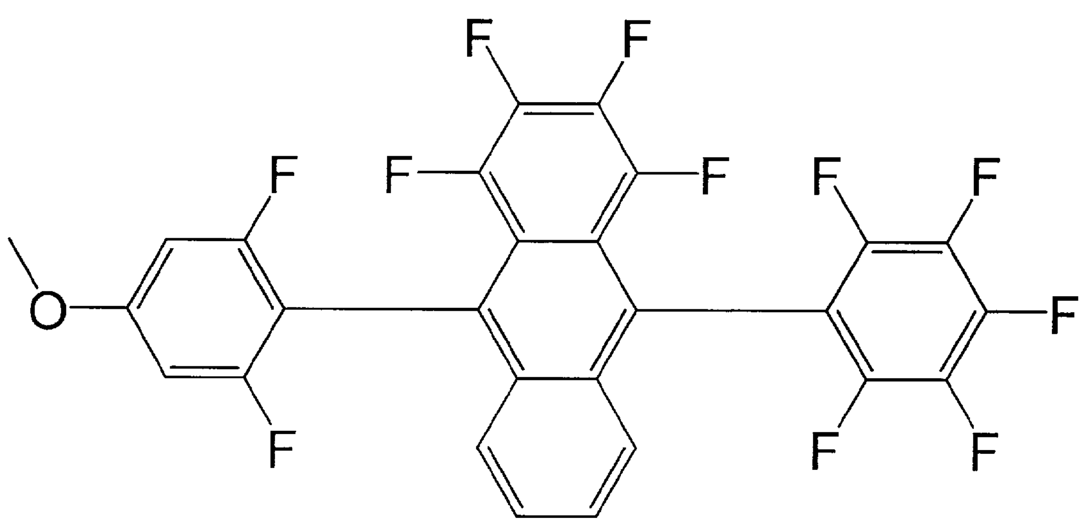
Figure 491:
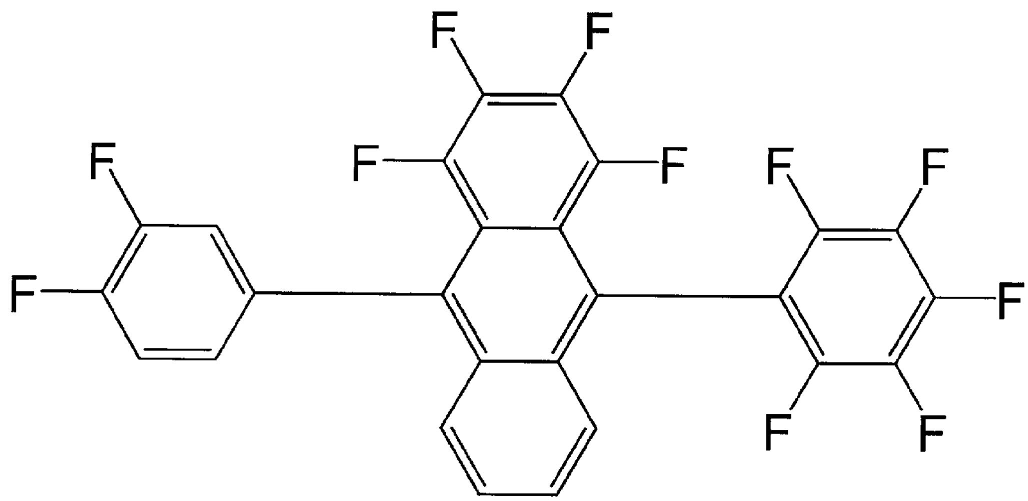
Figure 492:
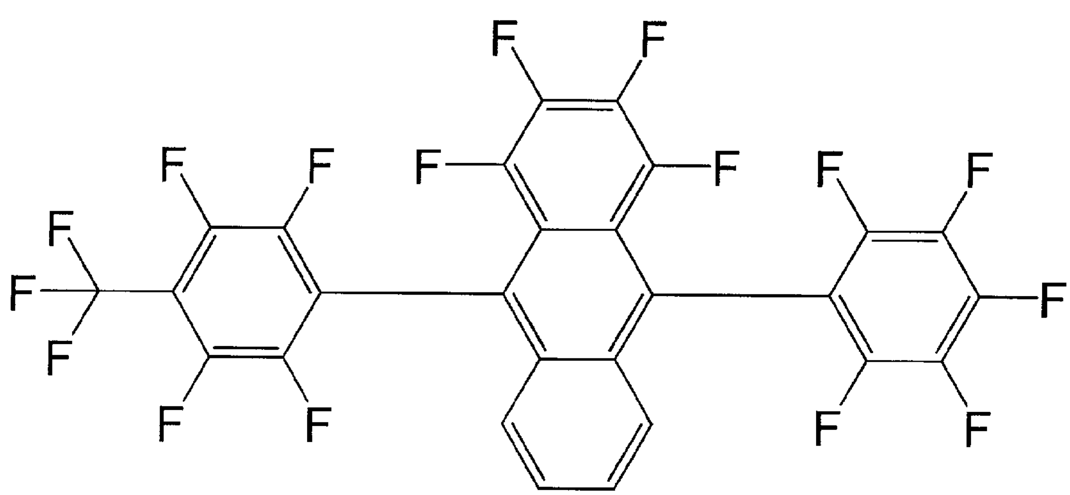
Figure 493:
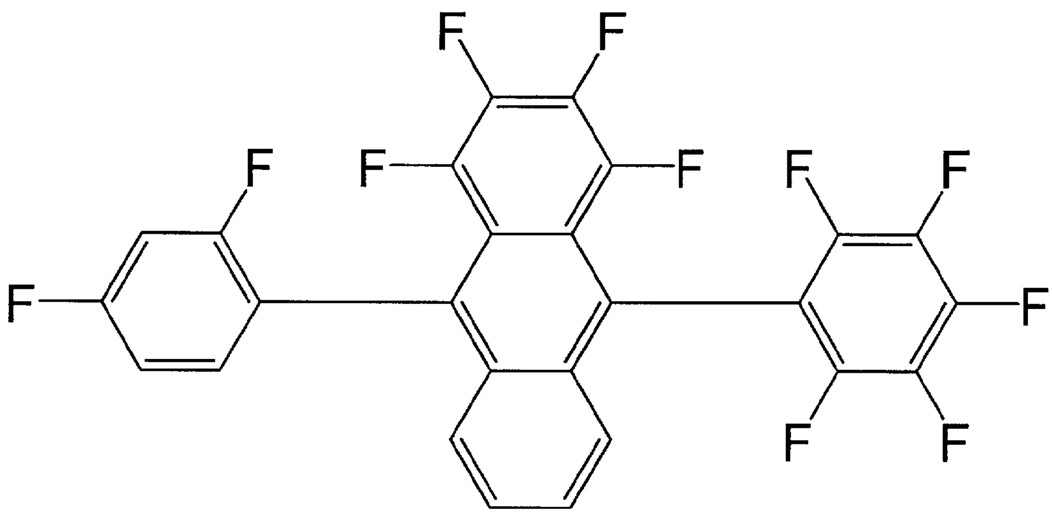
Figure 494:
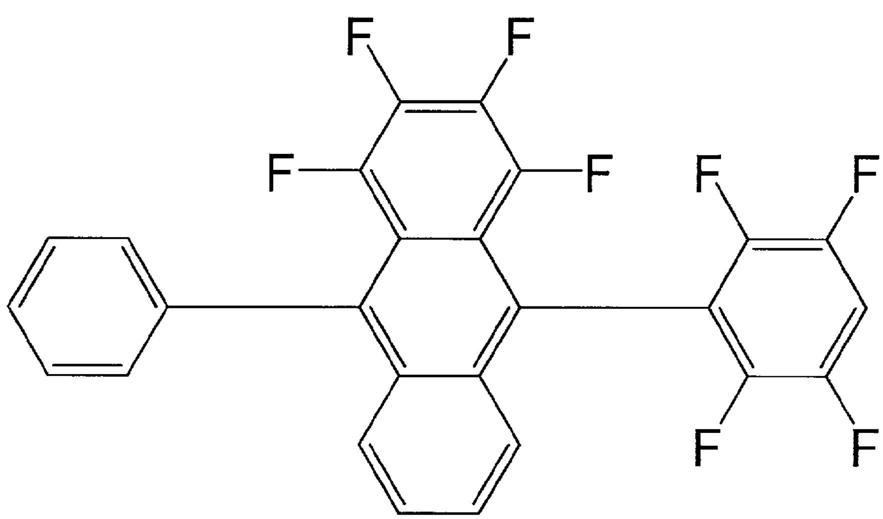
Figure 495:
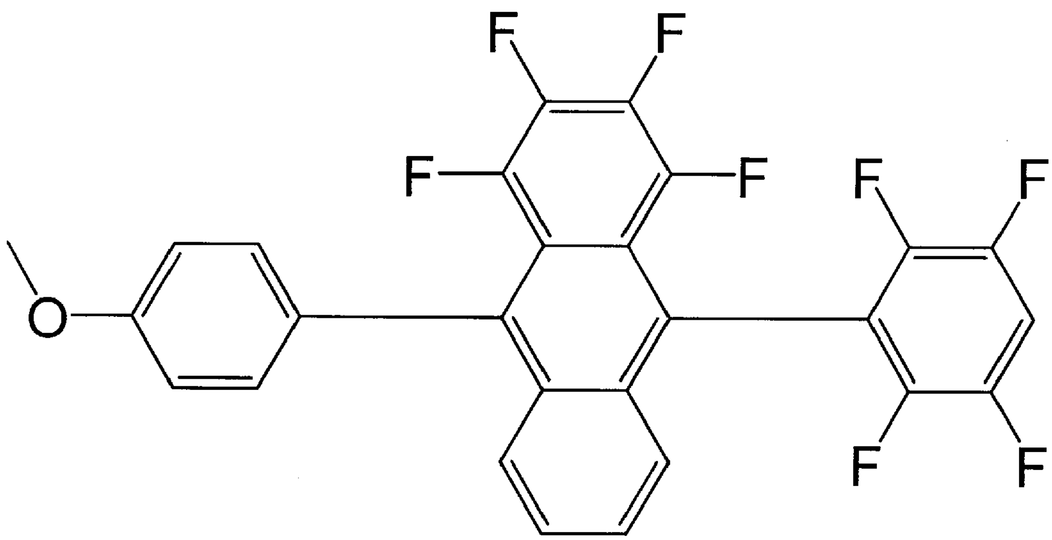
Figure 496:
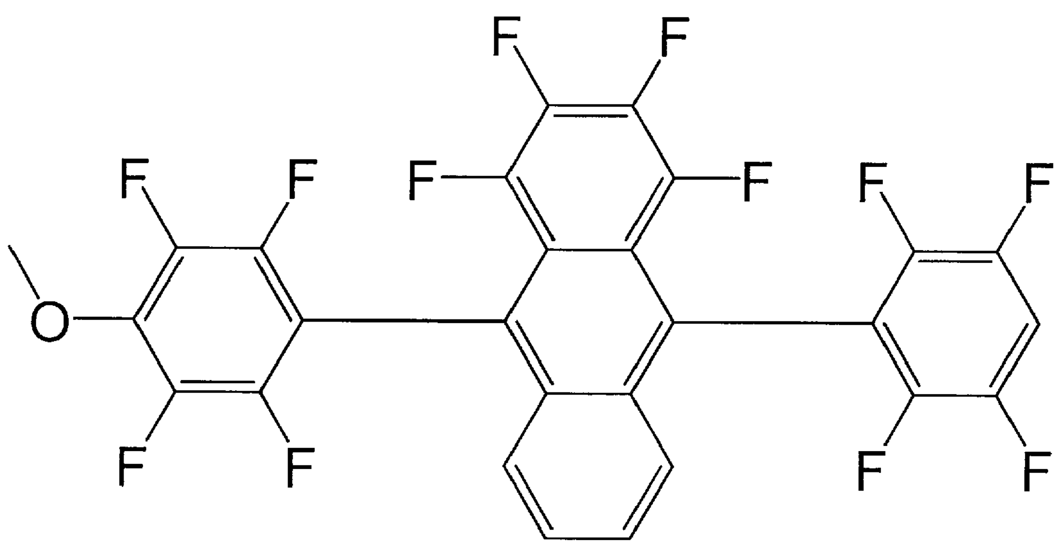
Figure 497:
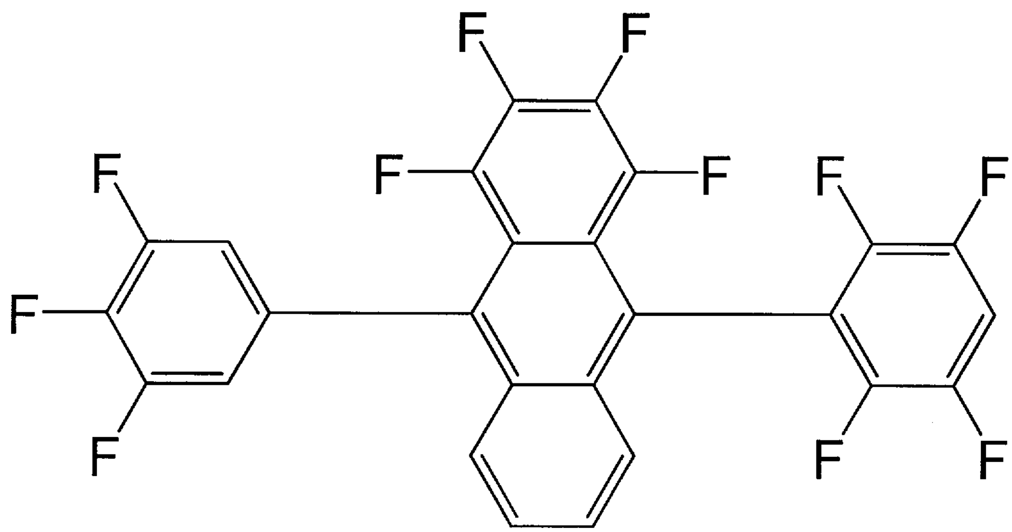
Figure 498:
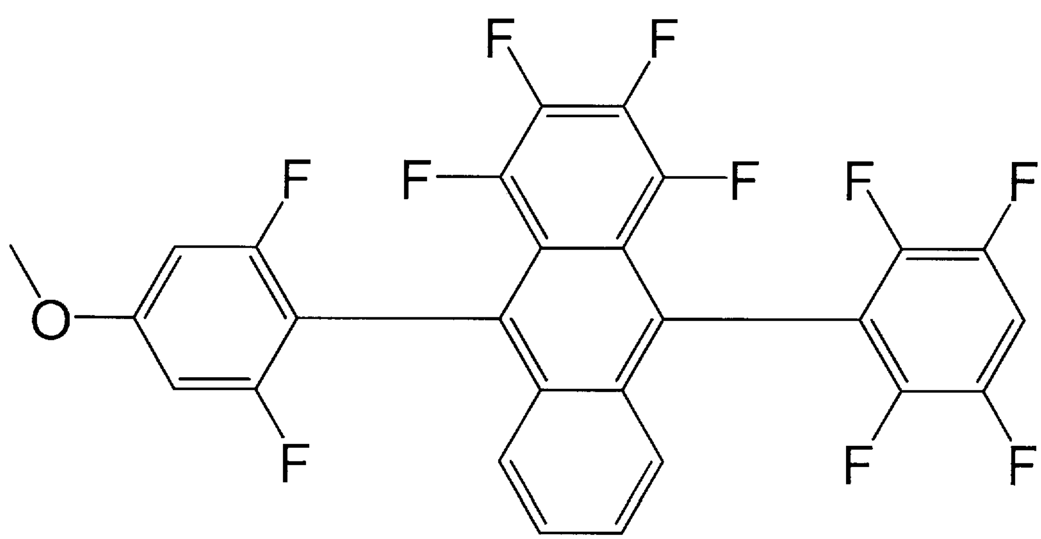
Figure 499:
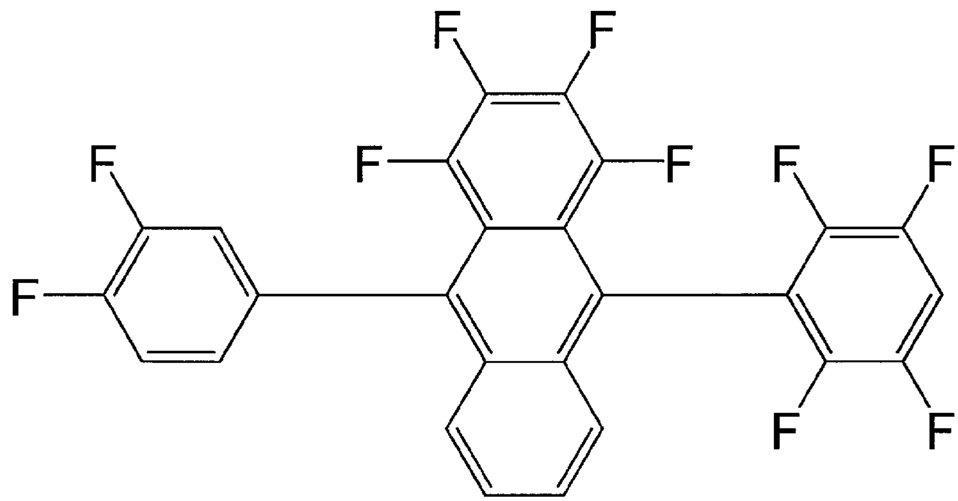
Figure 500:
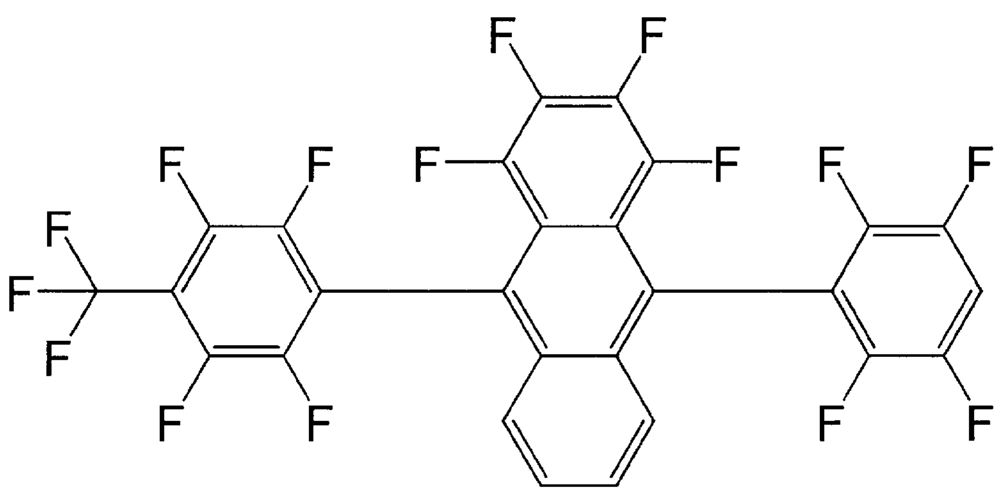
Figure 501:
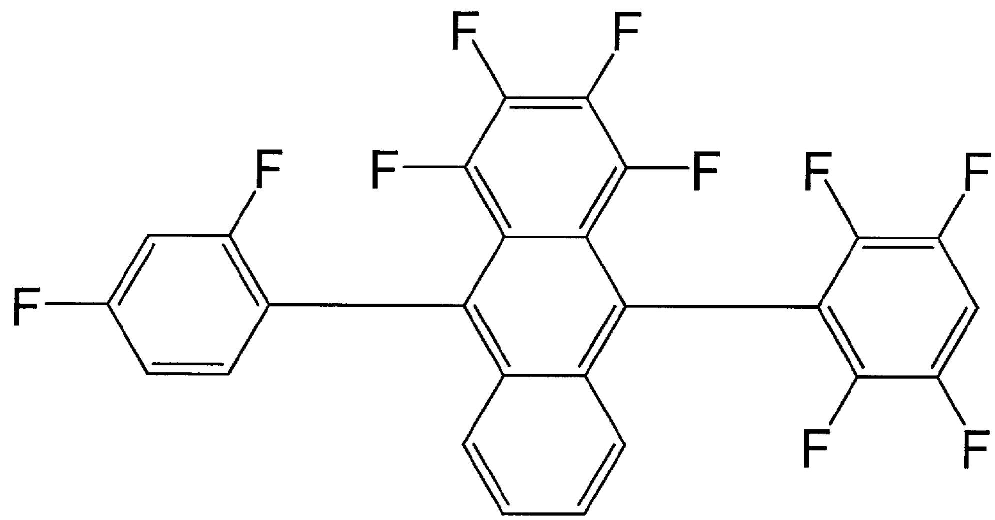
Figure 502:
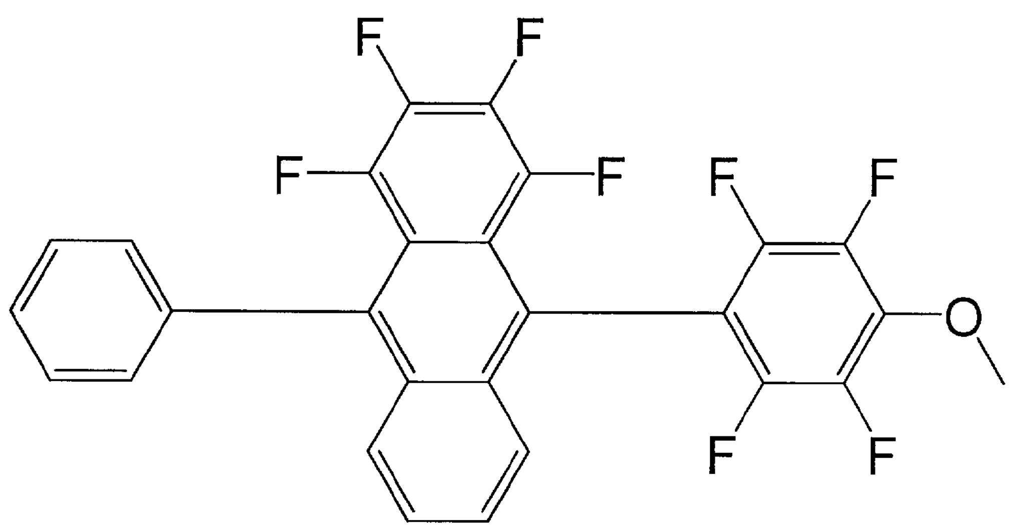
Figure 503:
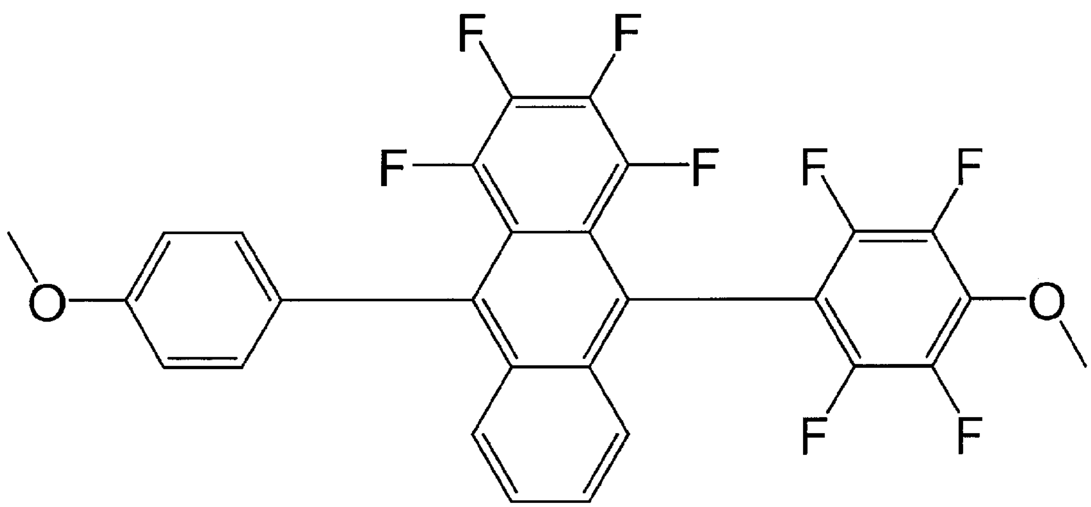
Figure 504:
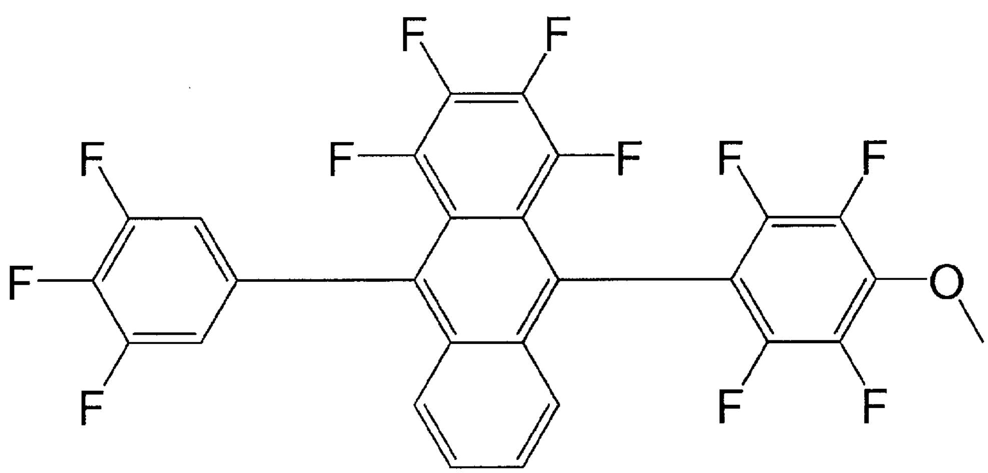
Figure 505:
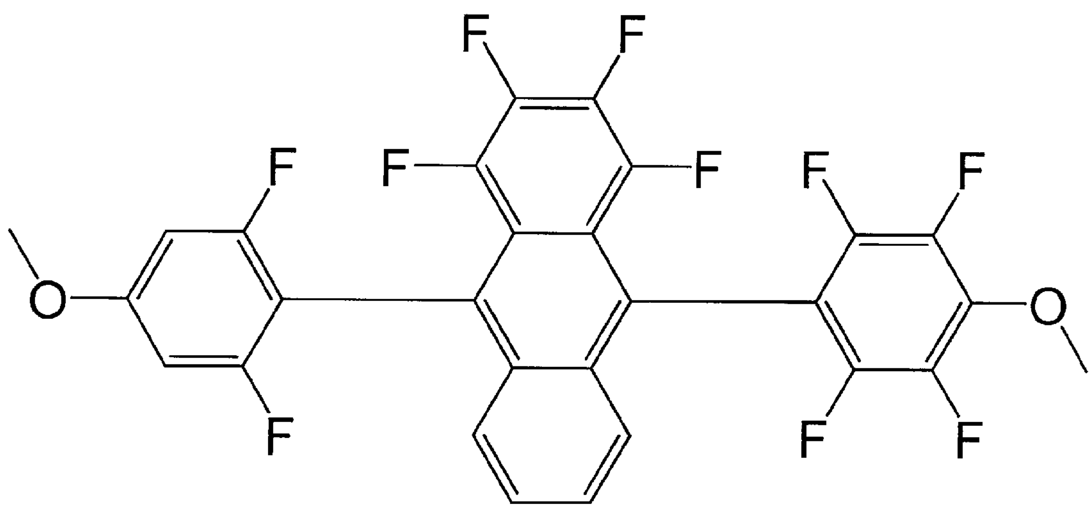
Figure 506:
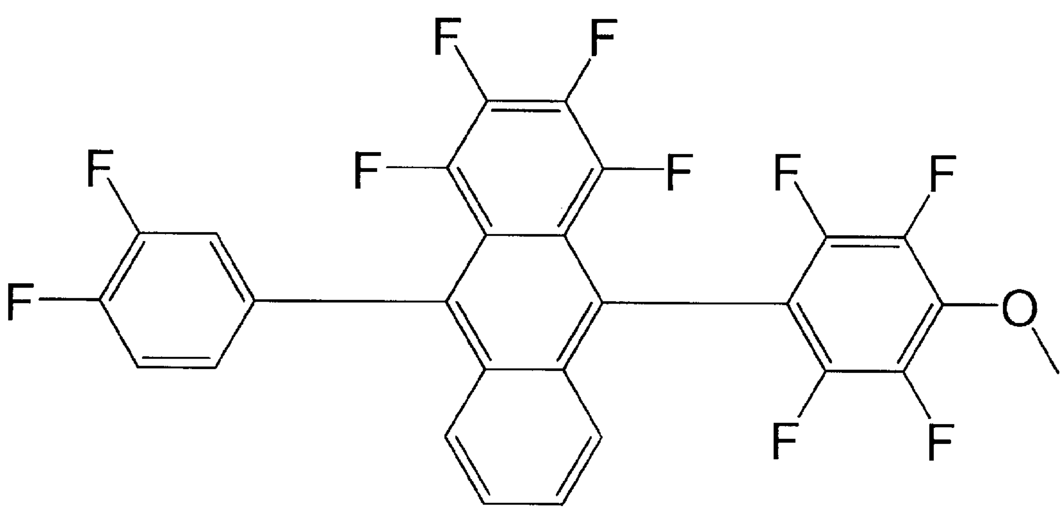
Figure 507:
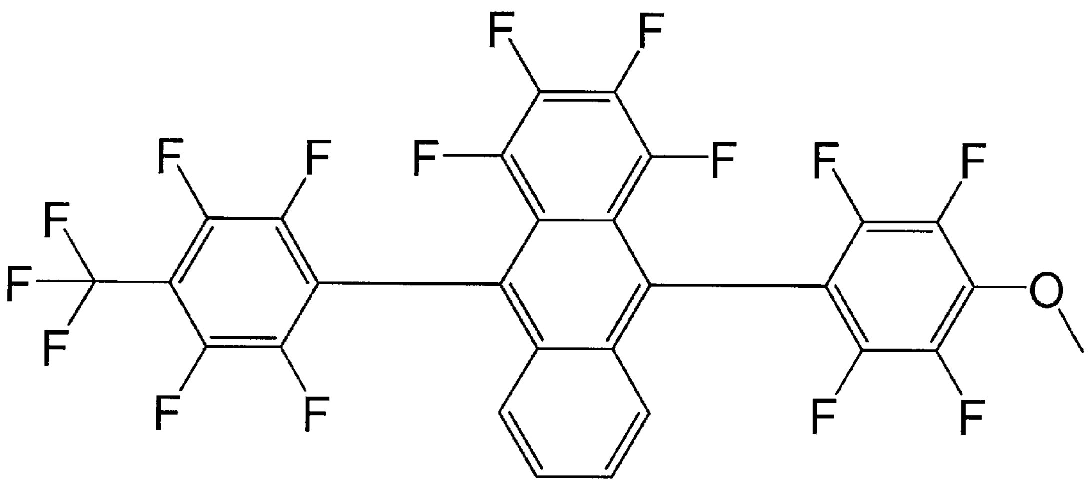
Figure 508:
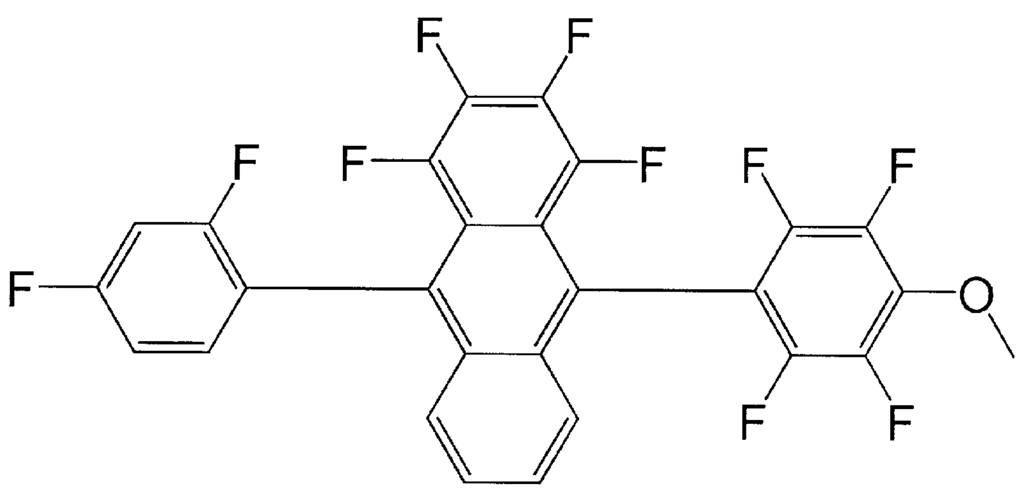
Figure 509:
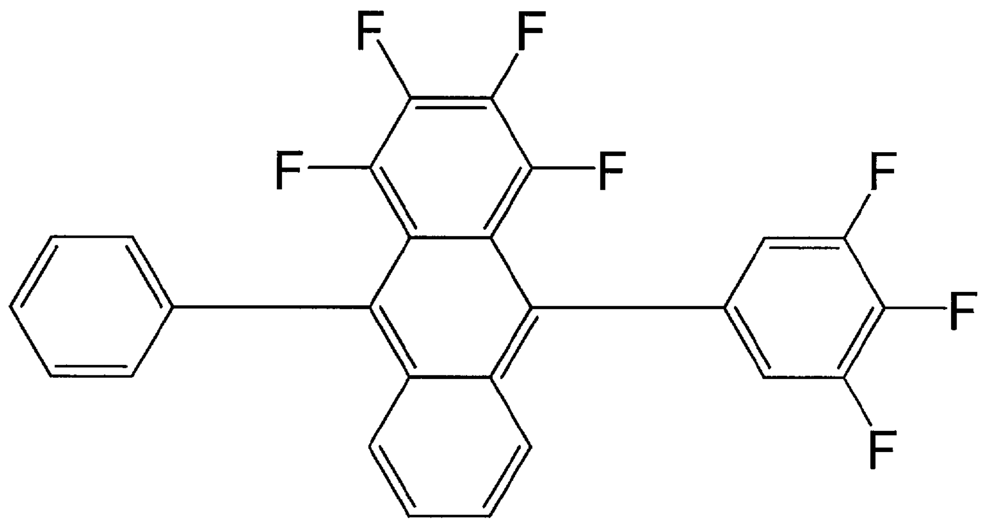
Figure 510:
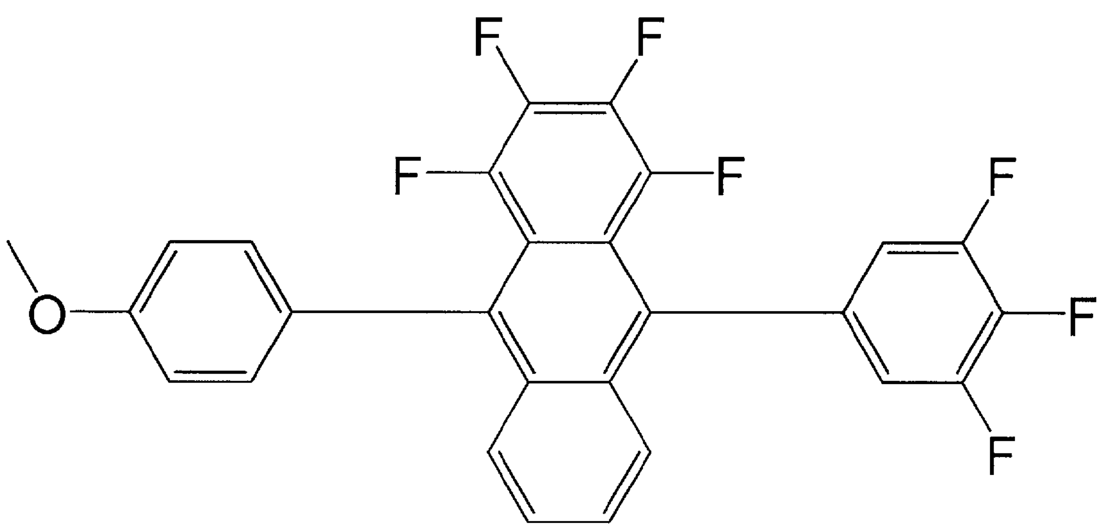
Figure 511:
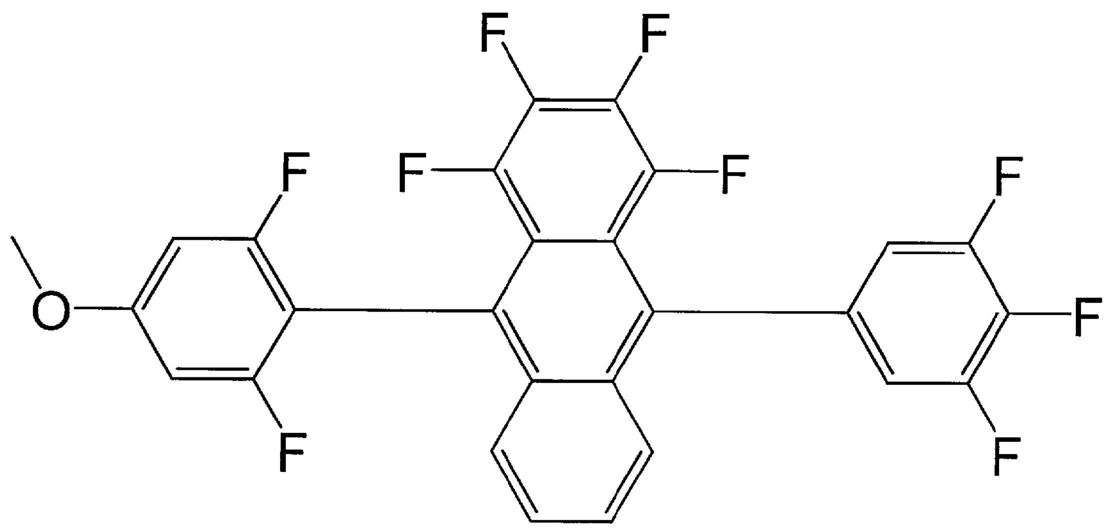
Figure 512:
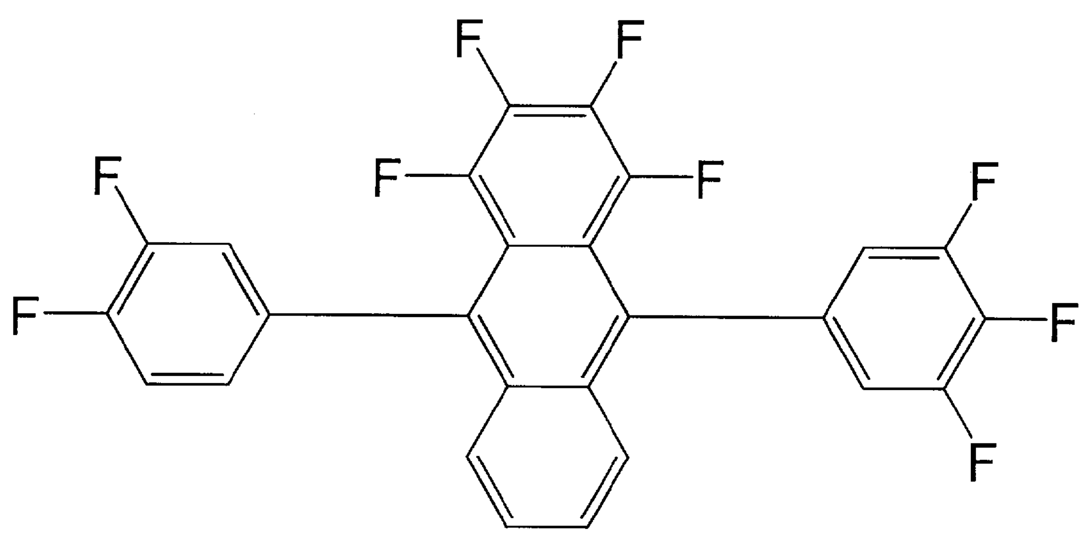
Figure 513:
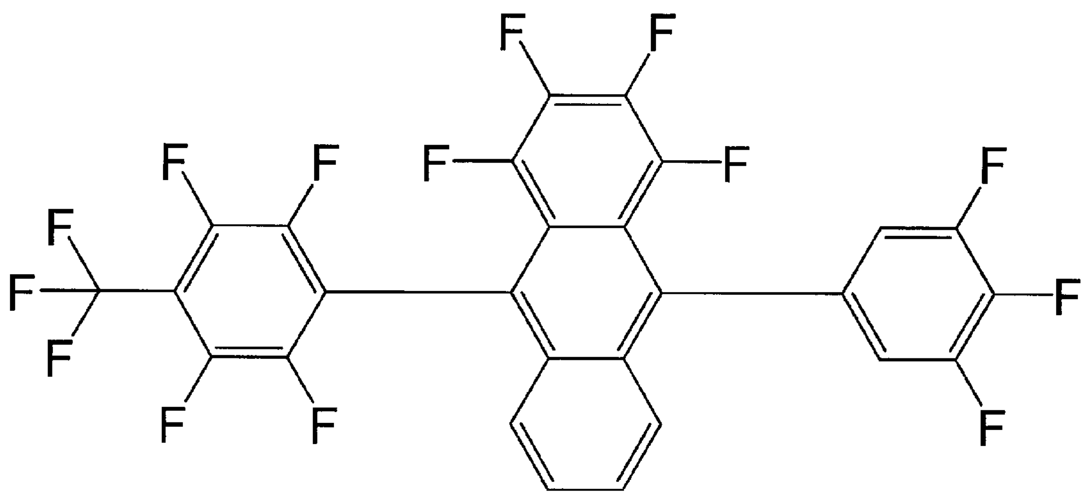
Figure 514:
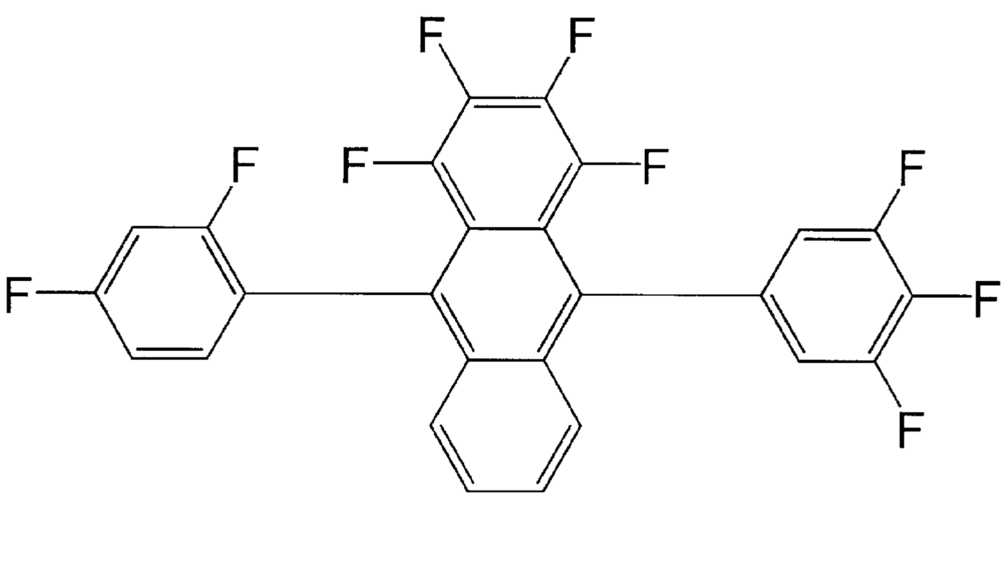
Figure 515:
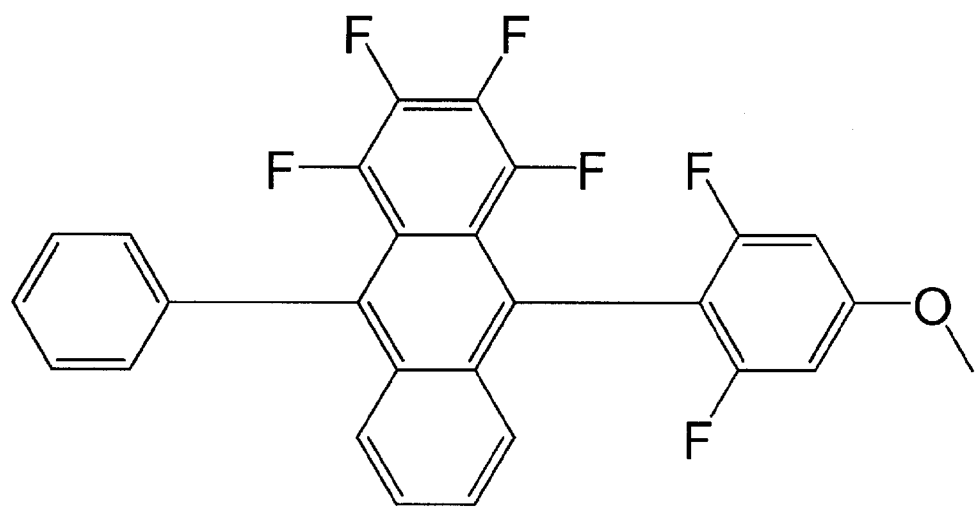
Figure 516:
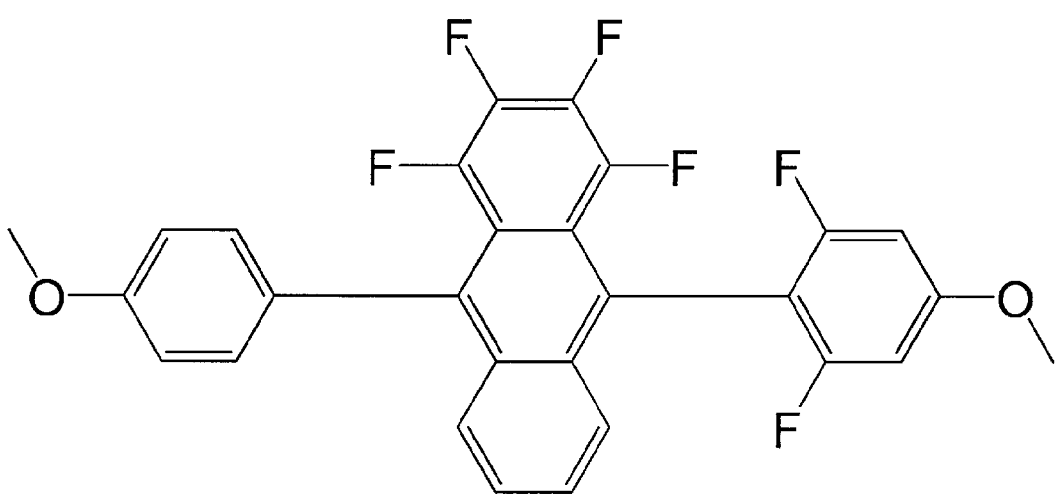
Figure 517:
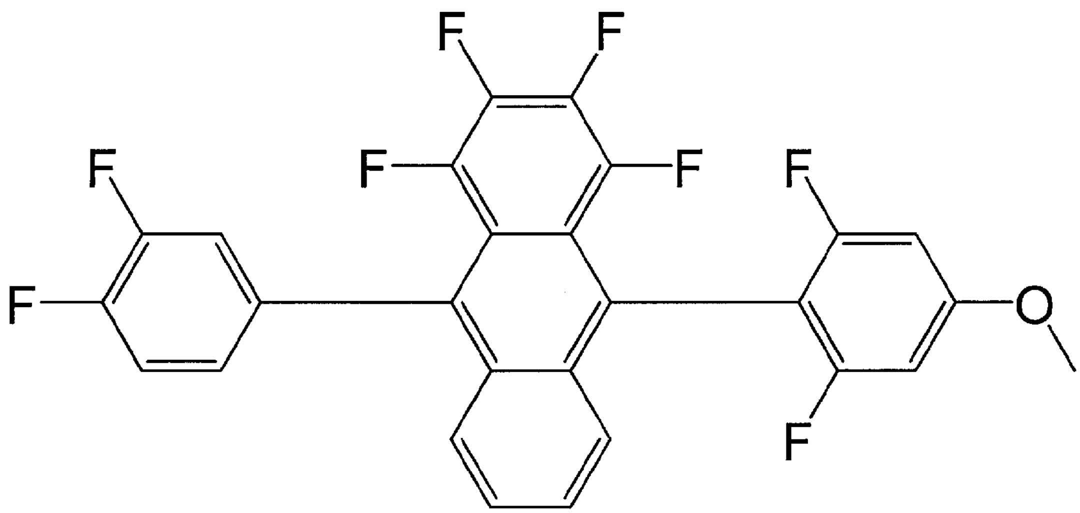
Figure 518:
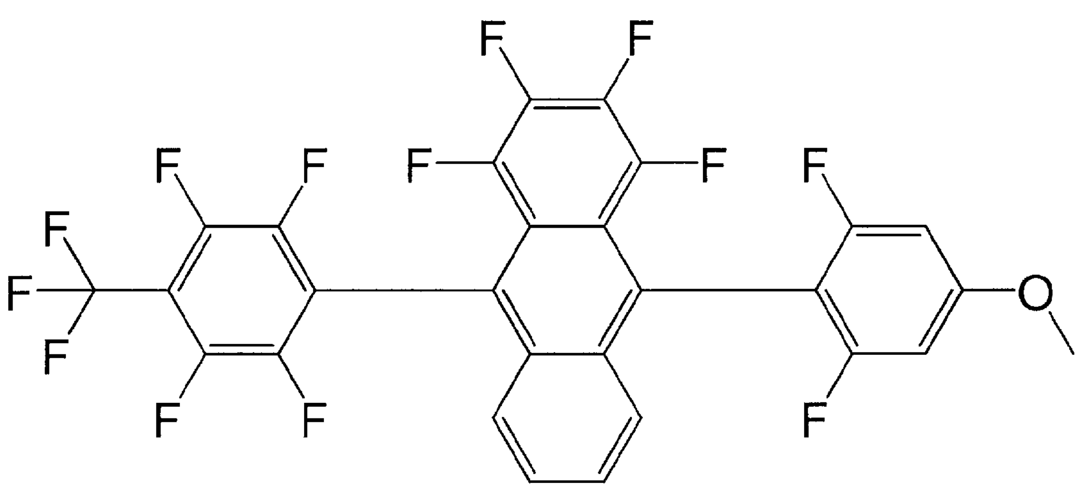
Figure 519:
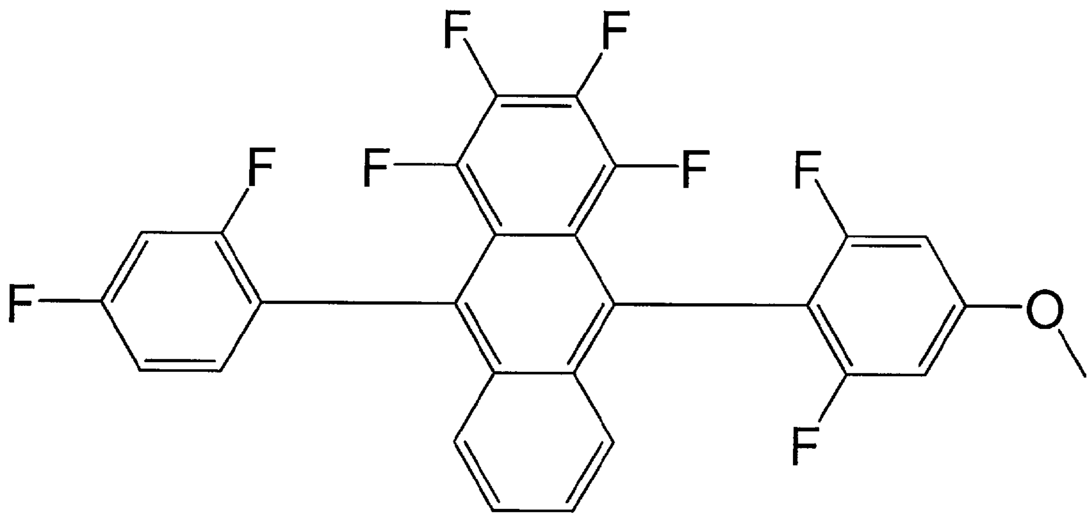
Figure 520:
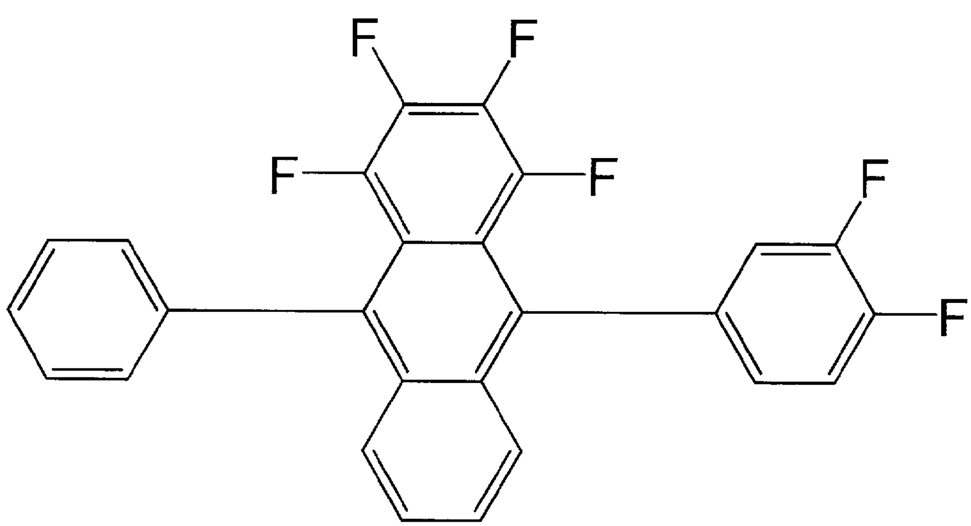
Figure 521:
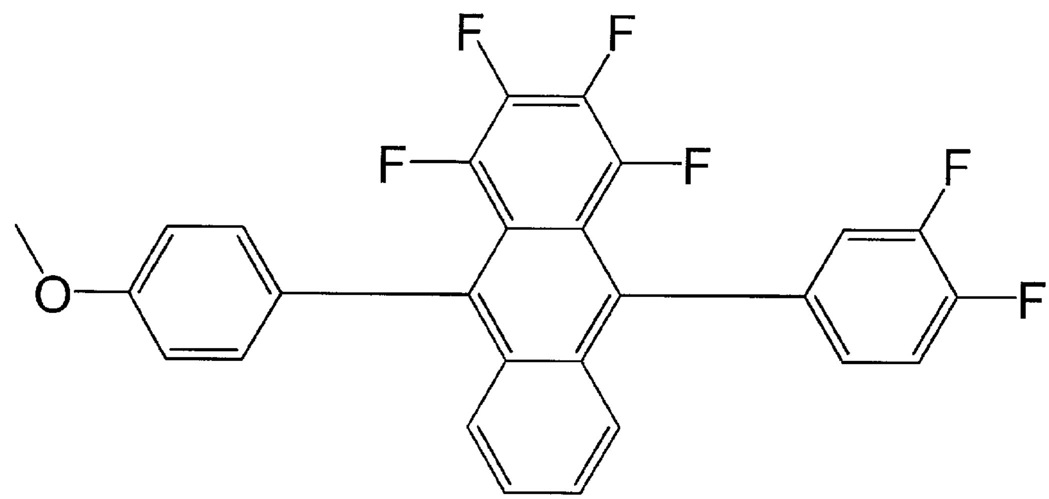
Figure 522:
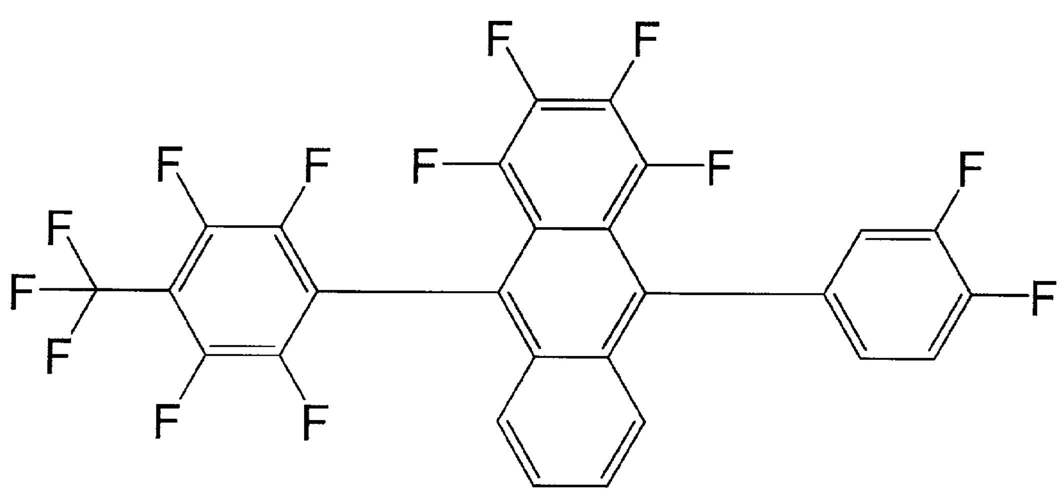
Figure 523:
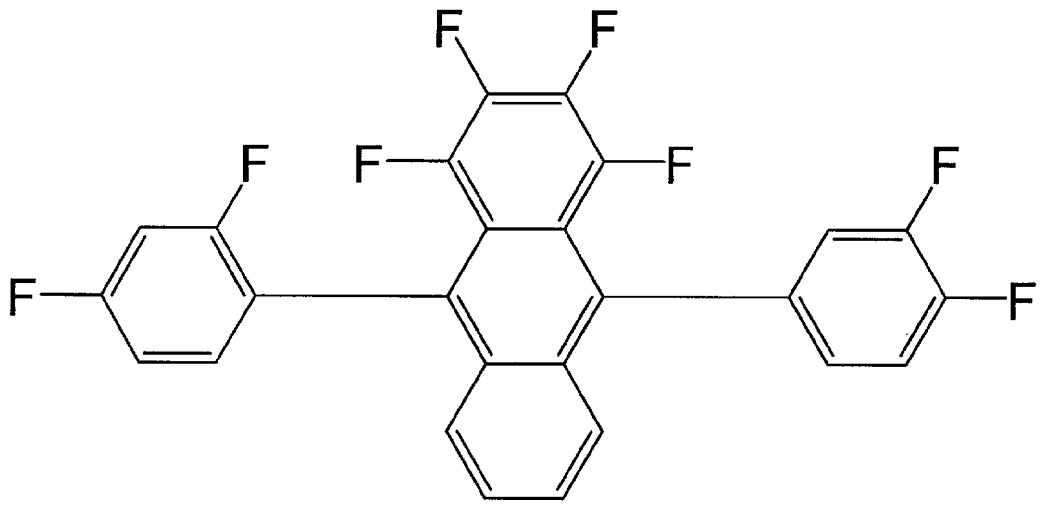
Figure 524:
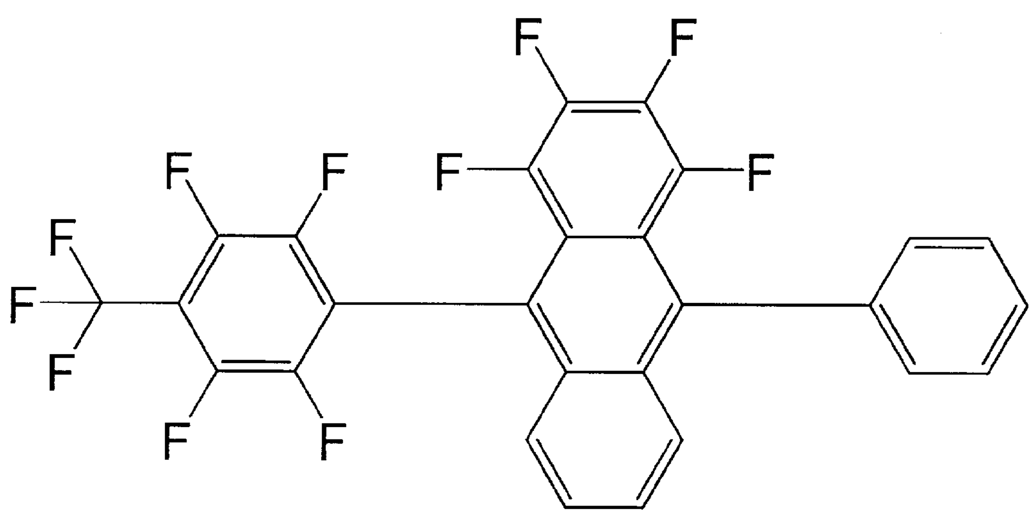
Figure 525:
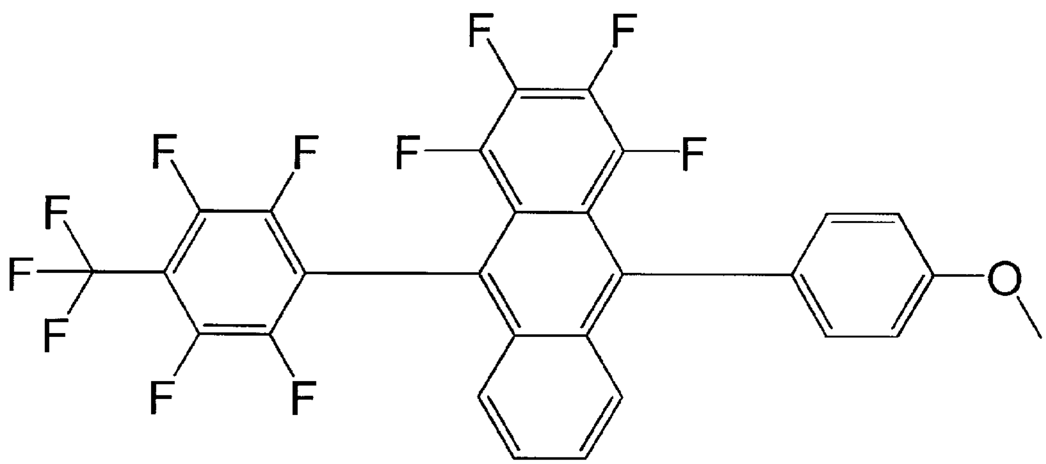
Figure 526:
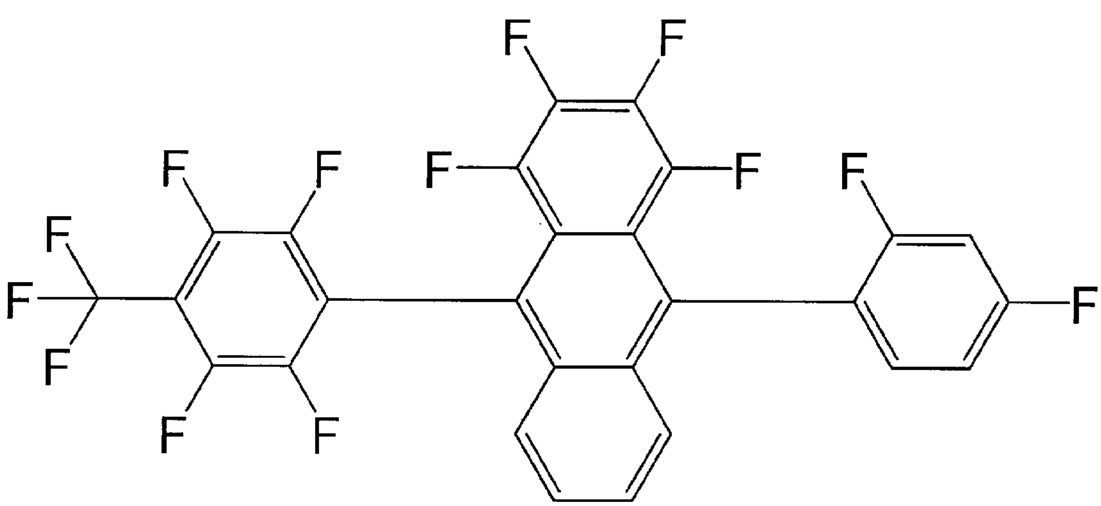
Figure 527:
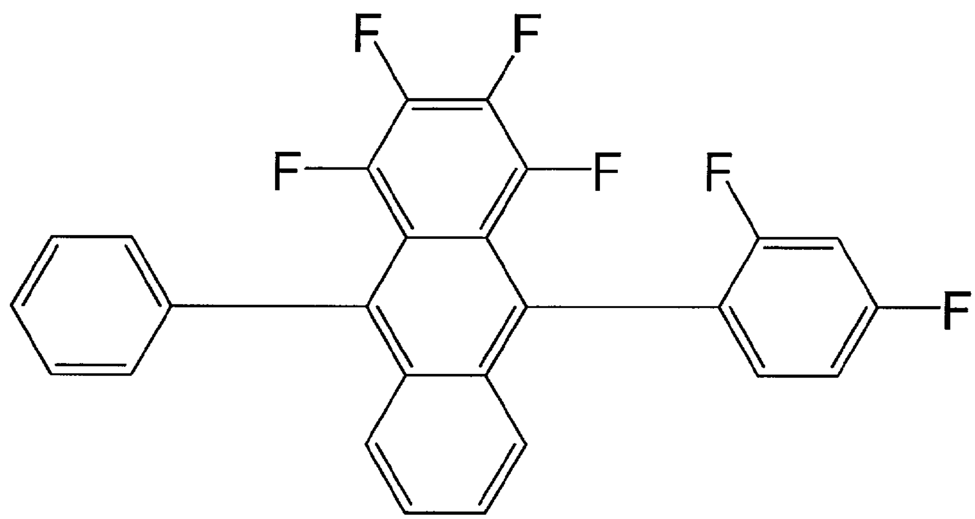
Figure 528:
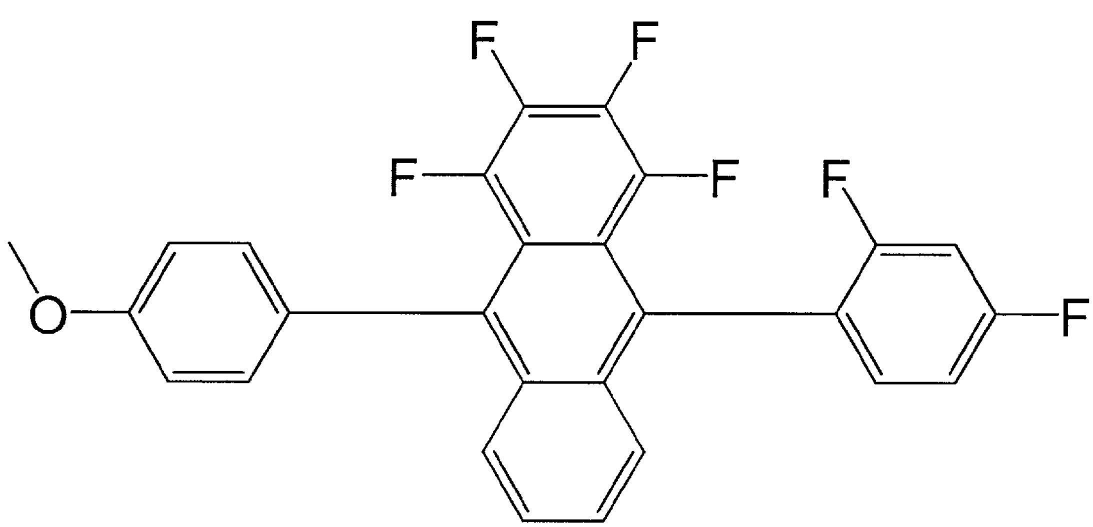
Figure 529:
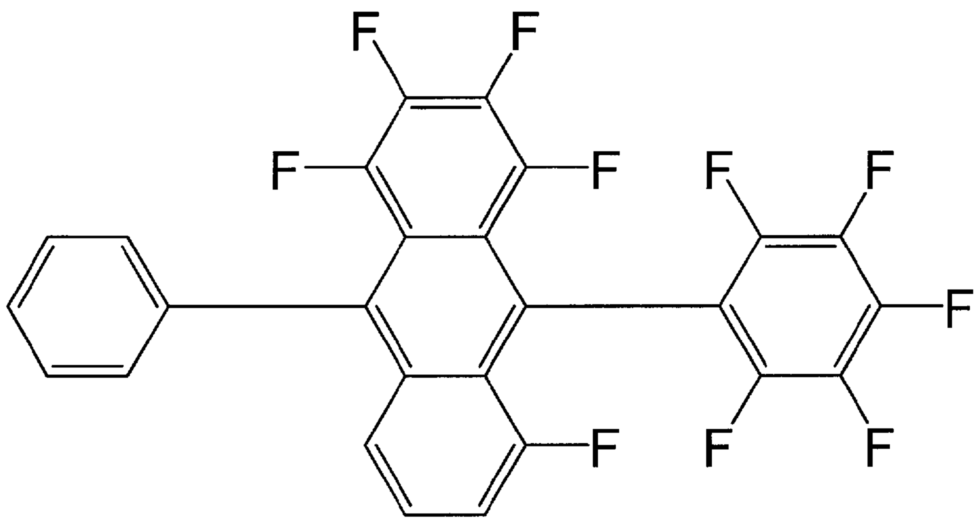
Figure 530:
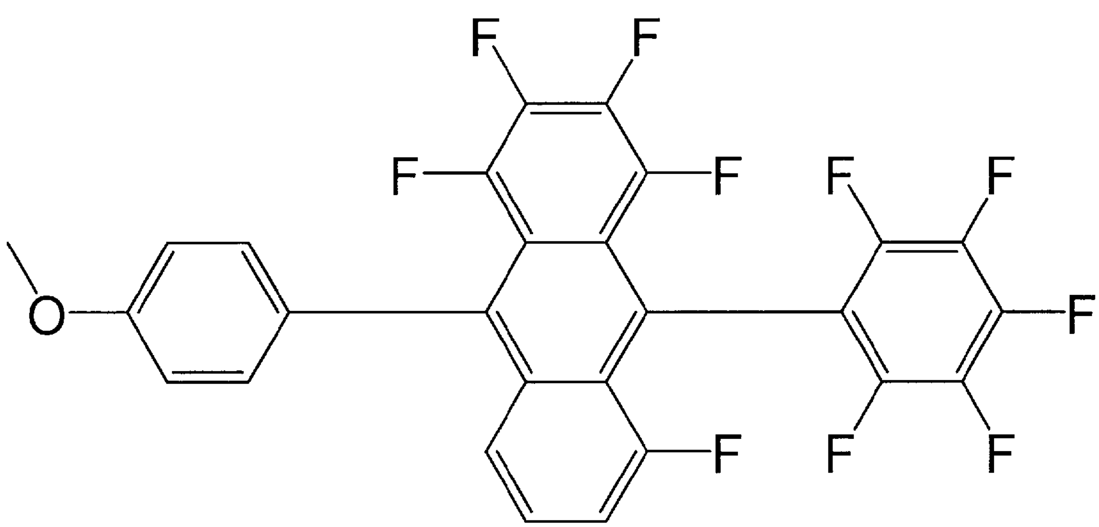
Figure 531:
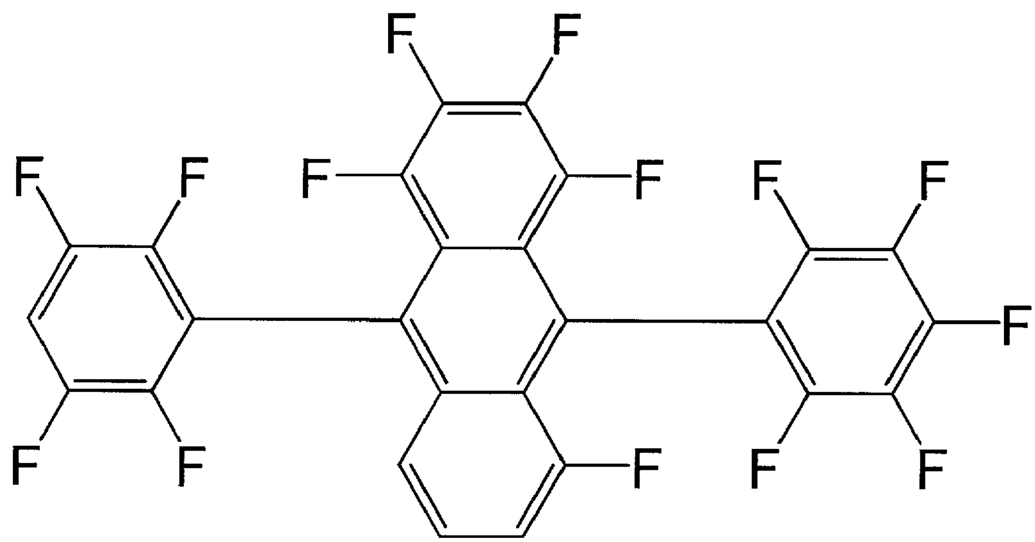
Figure 532:
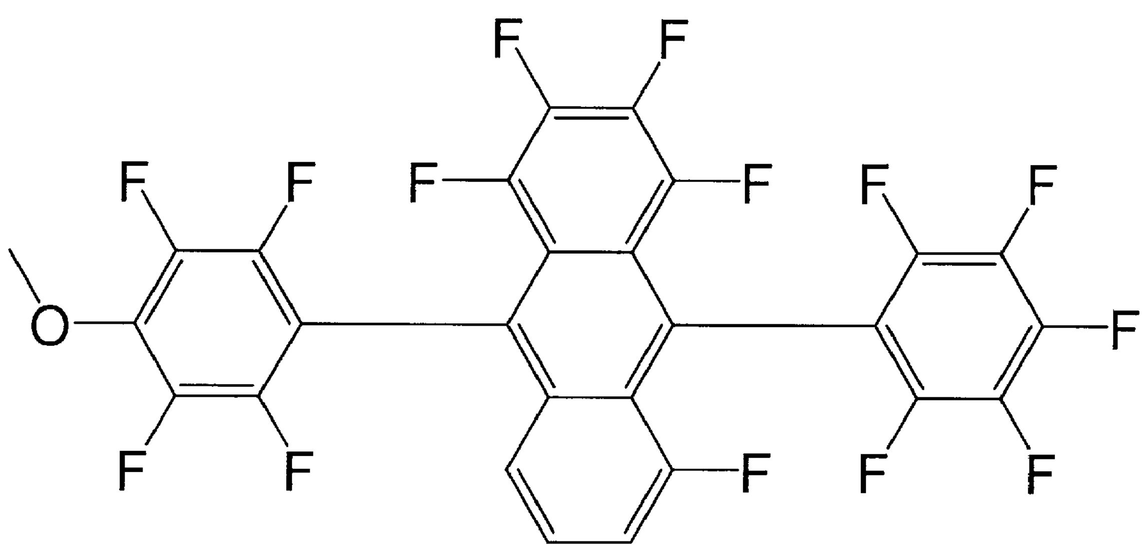
Figure 533:
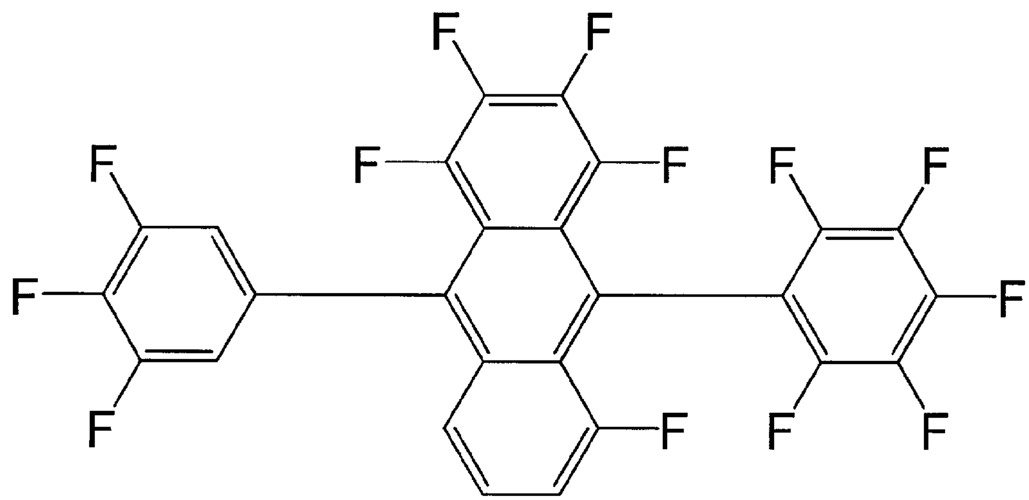
Figure 534:
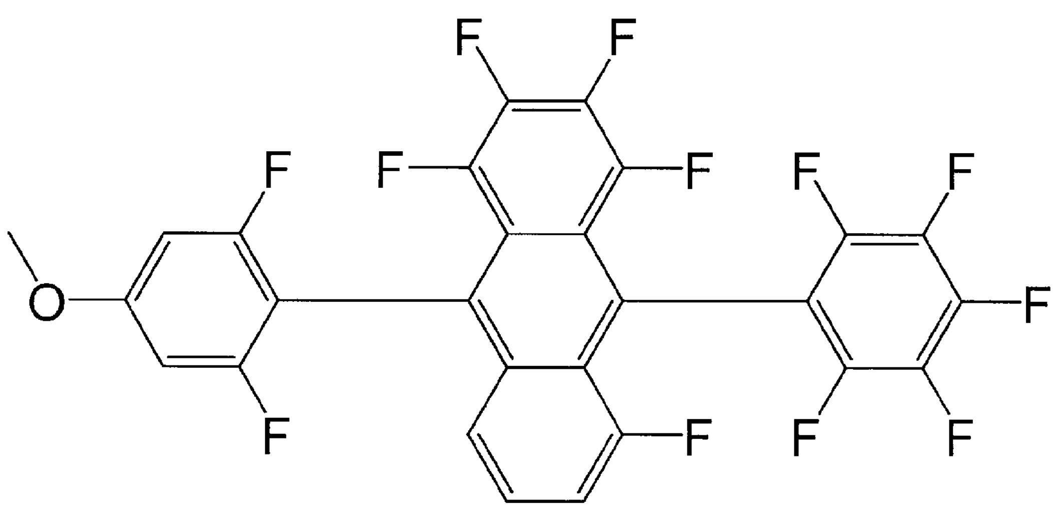
Figure 535:
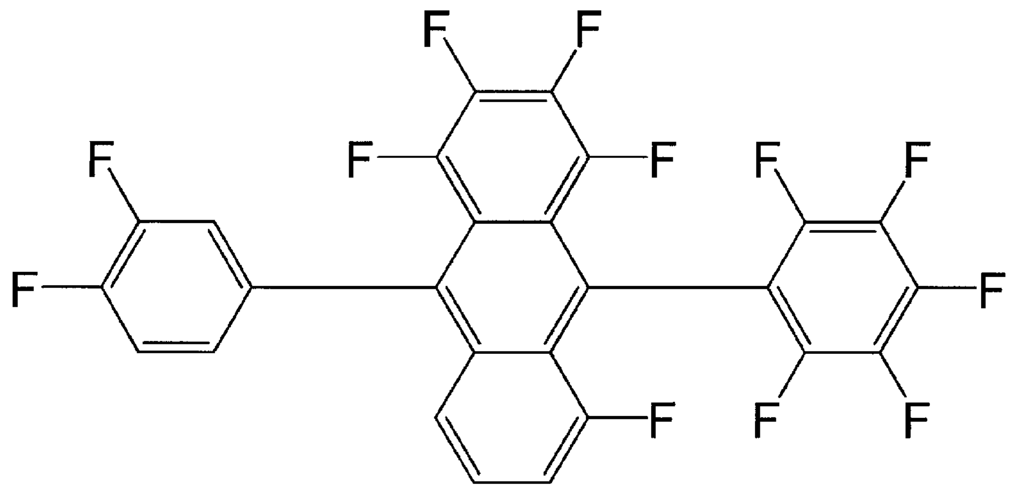
Figure 536:
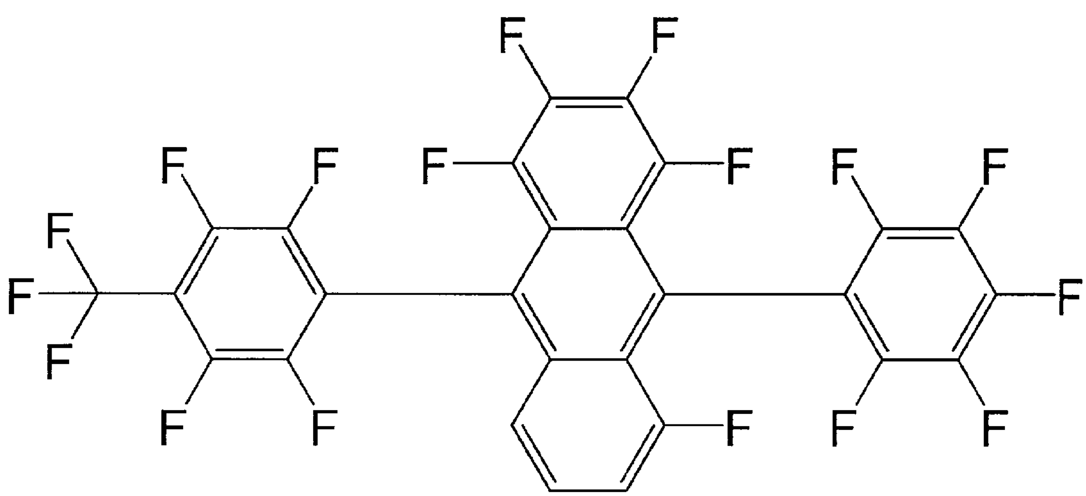
Figure 537:
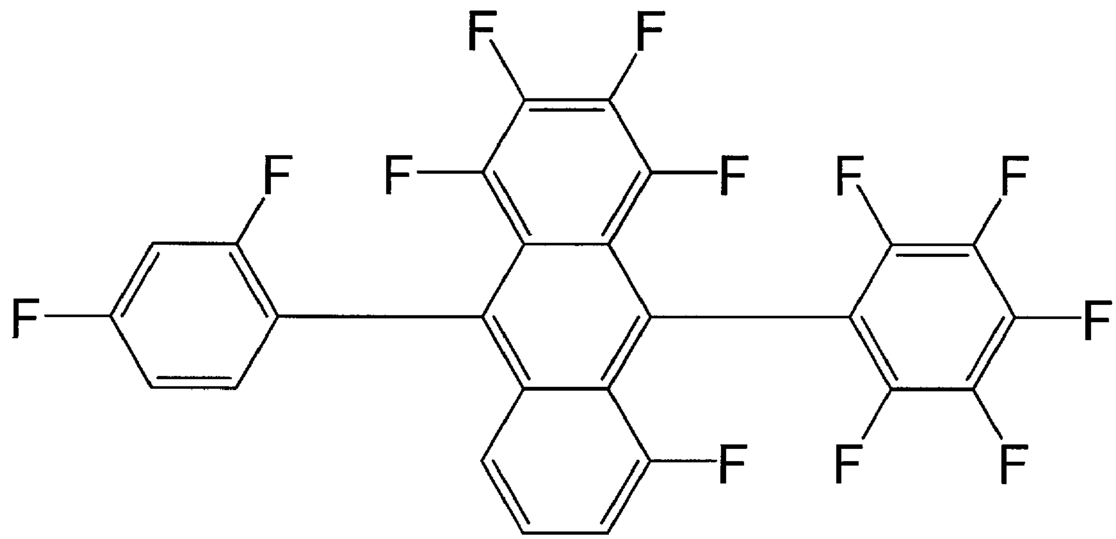
Figure 538:
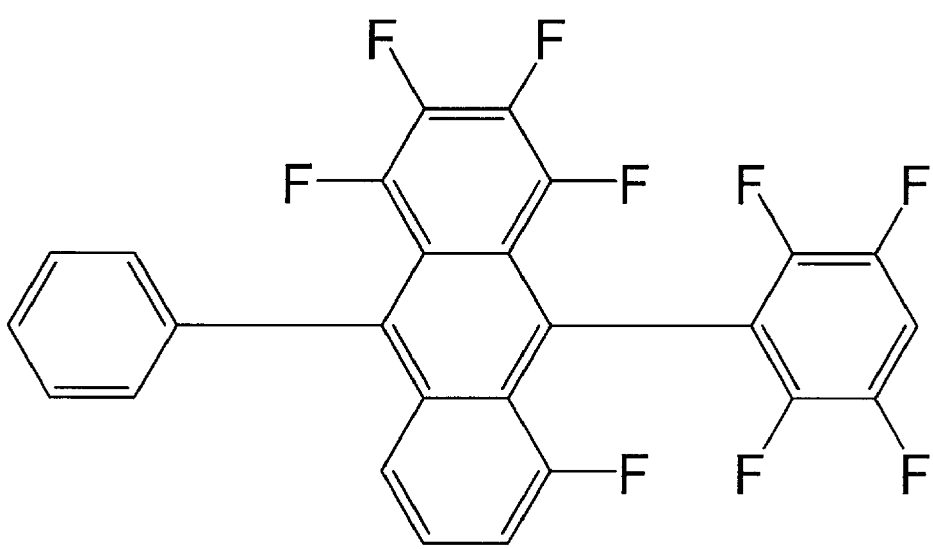
Figure 539:
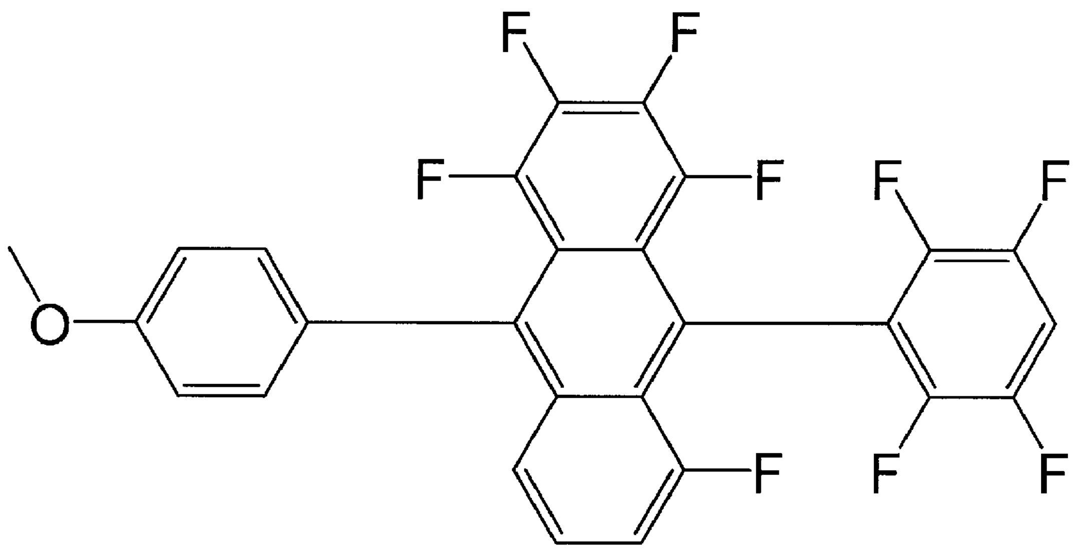
Figure 540:
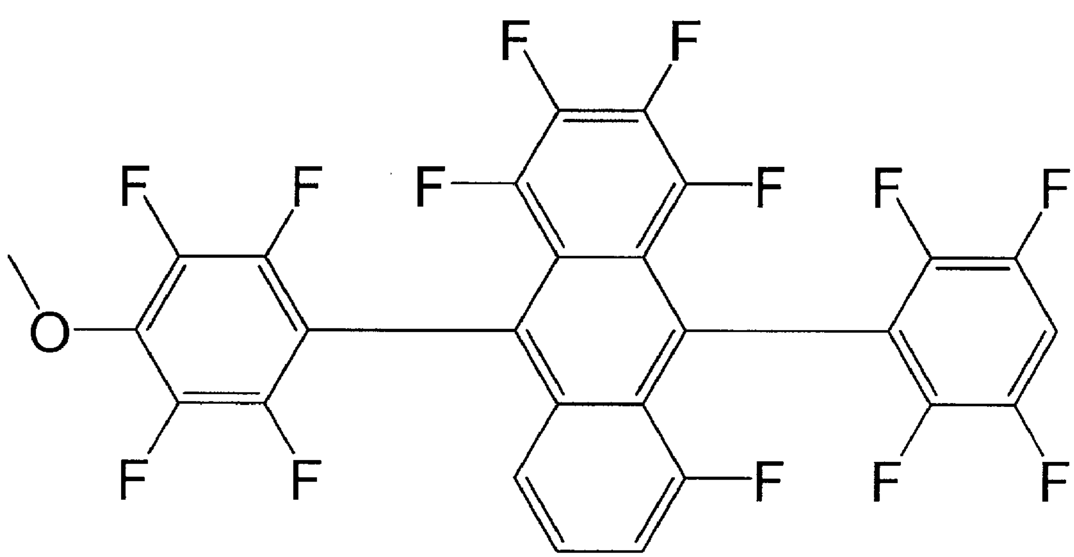
Figure 541:
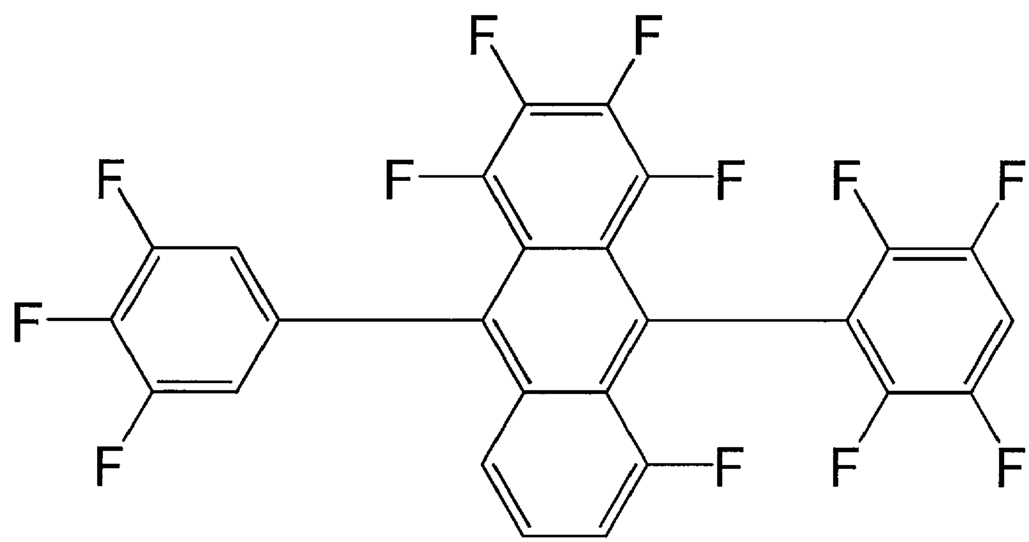
Figure 542:
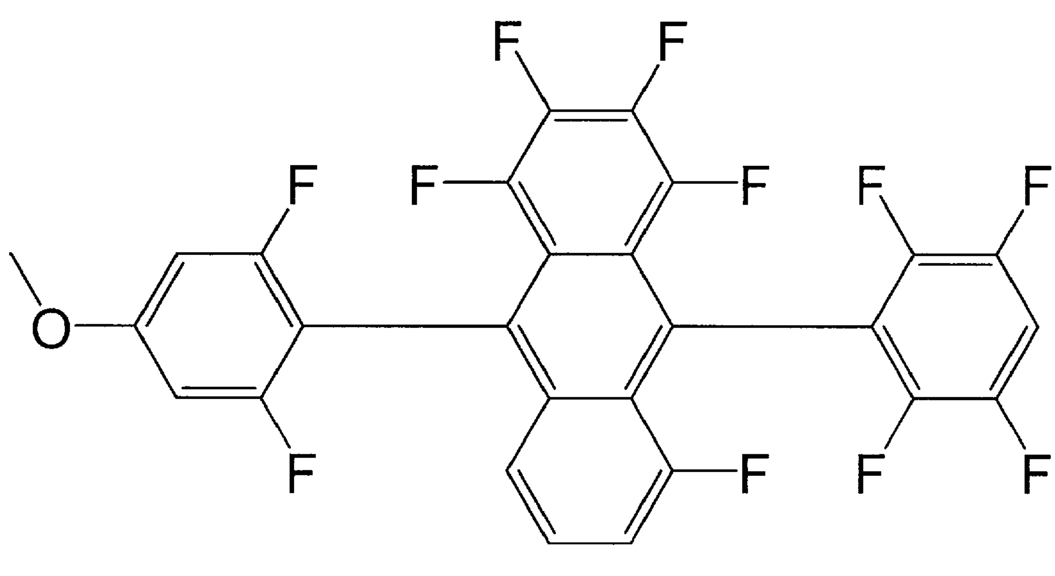
Figure 543:
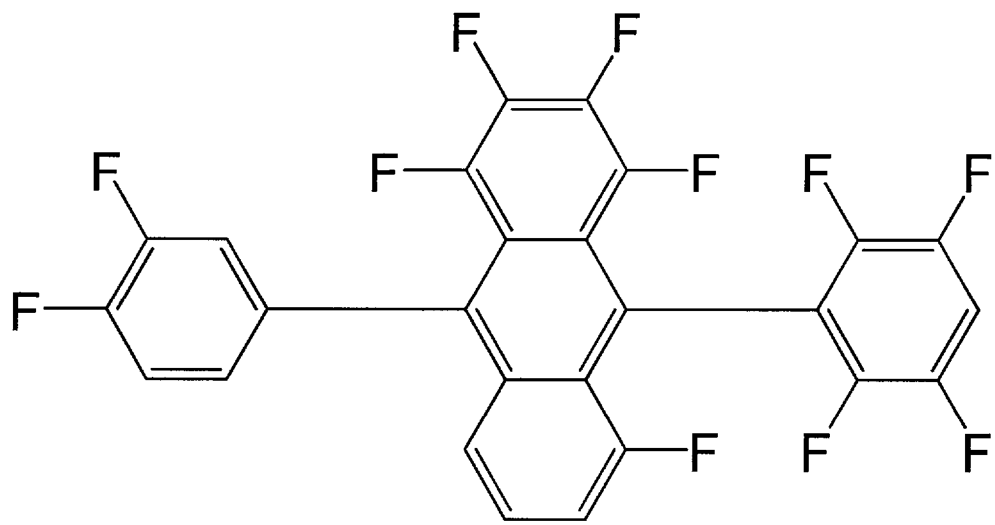
Figure 544:
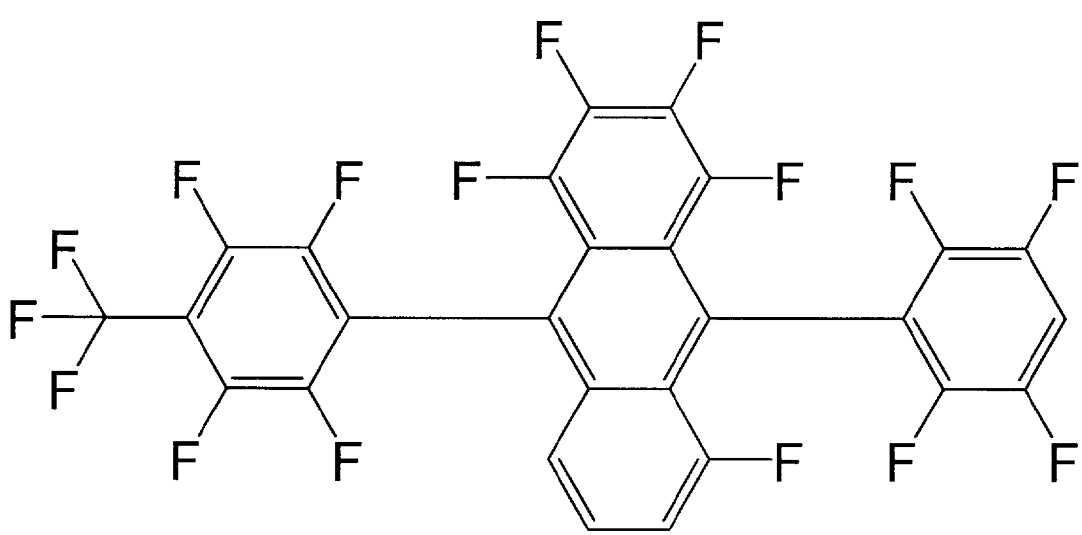
Figure 545:
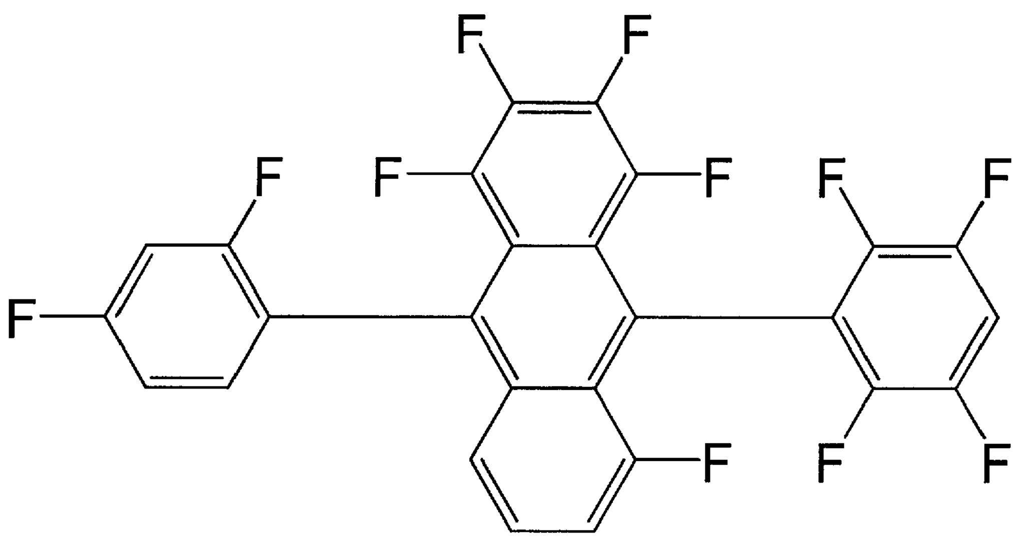
Figure 546:
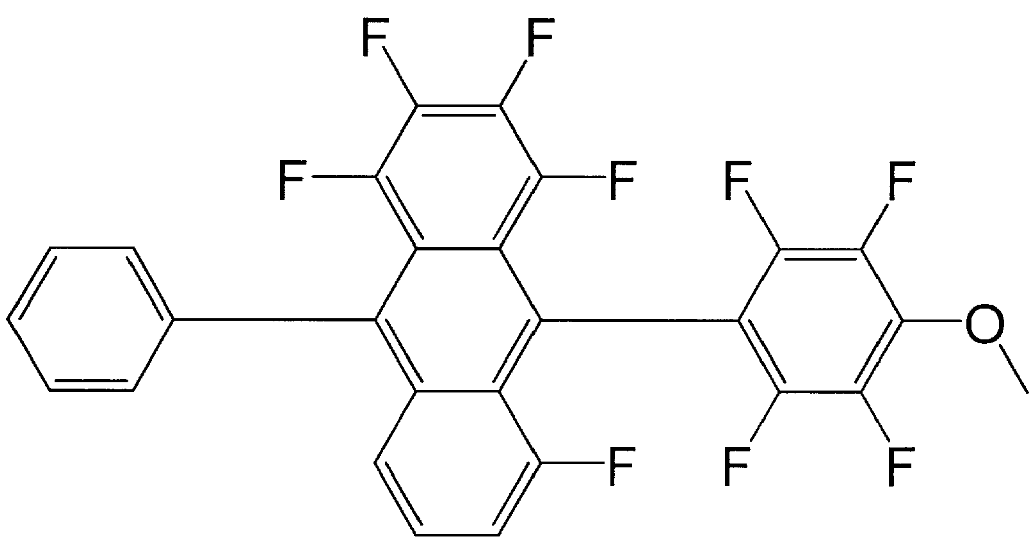
Figure 547:
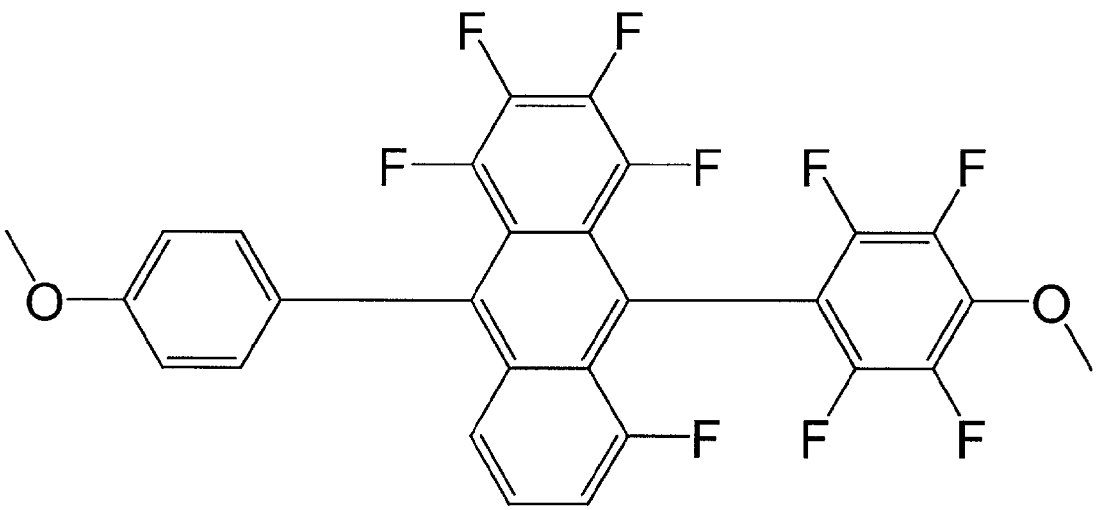
Figure 548:
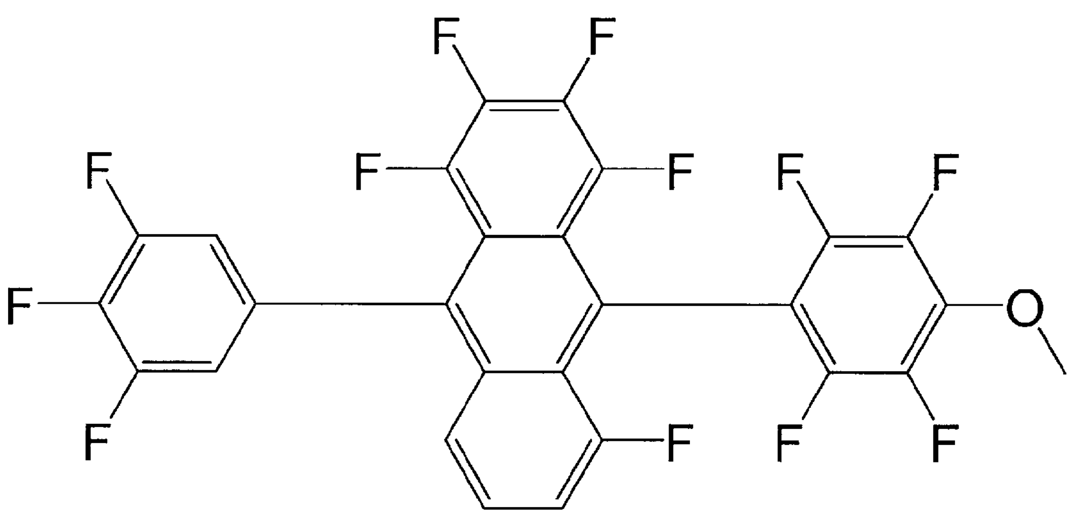
Figure 549:
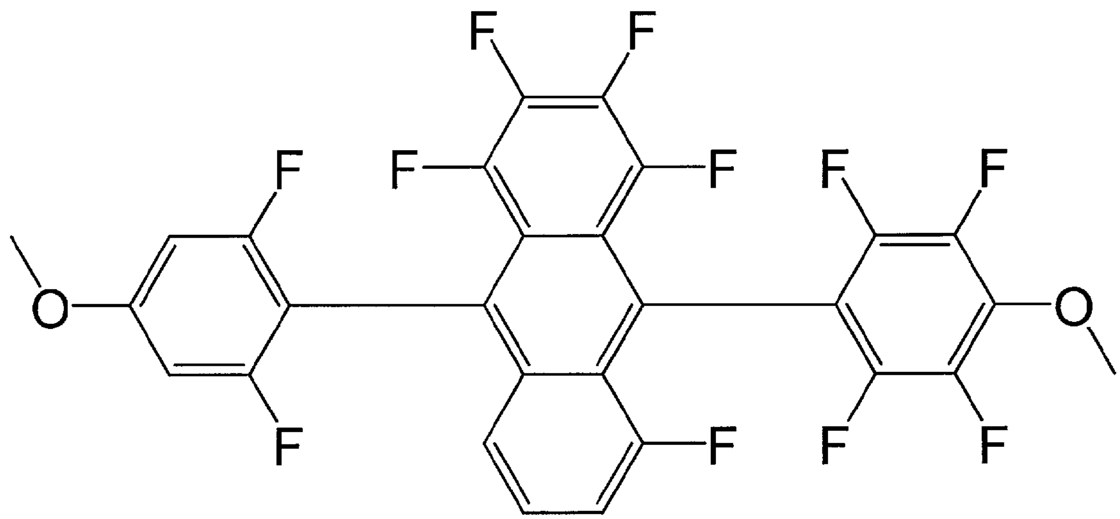
Figure 550:
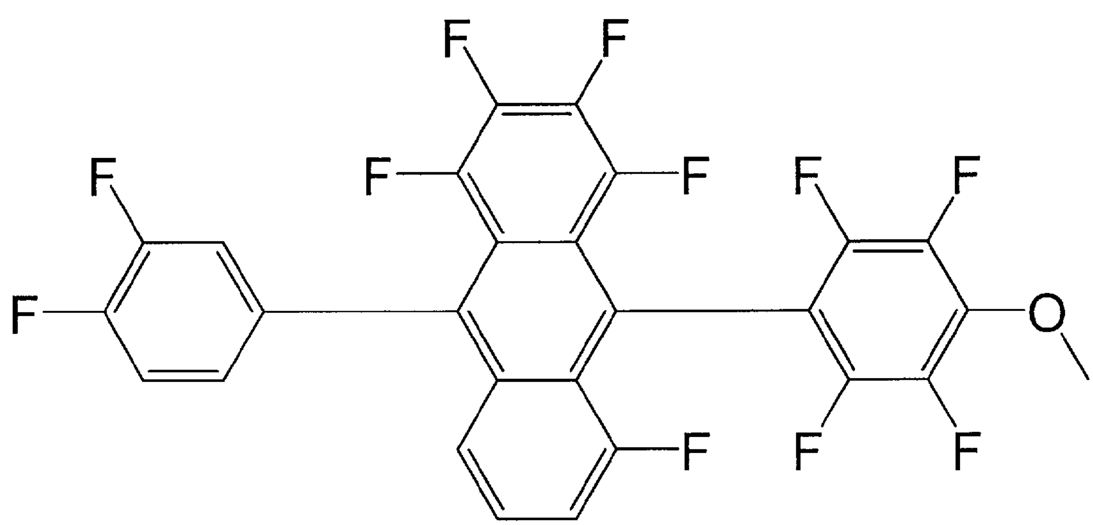
Figure 551:
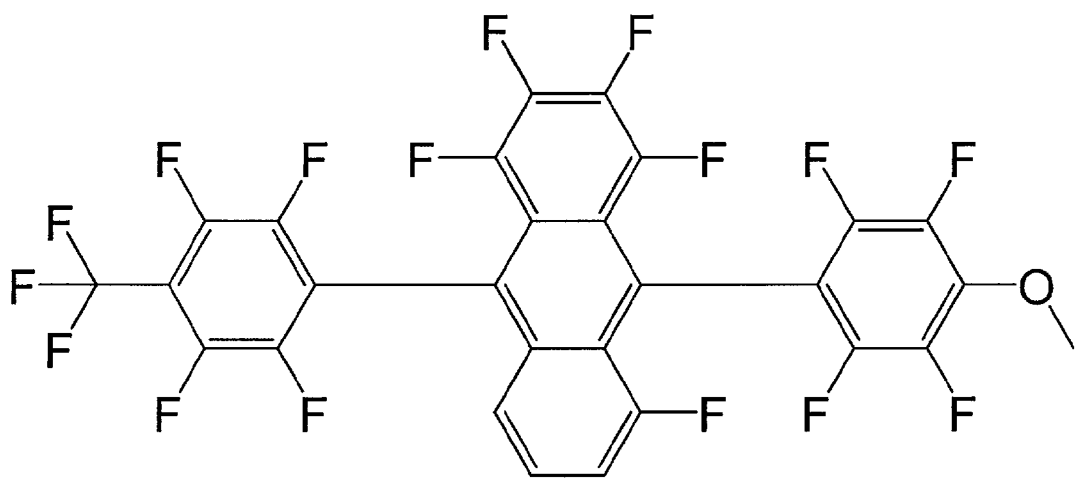
Figure 552:
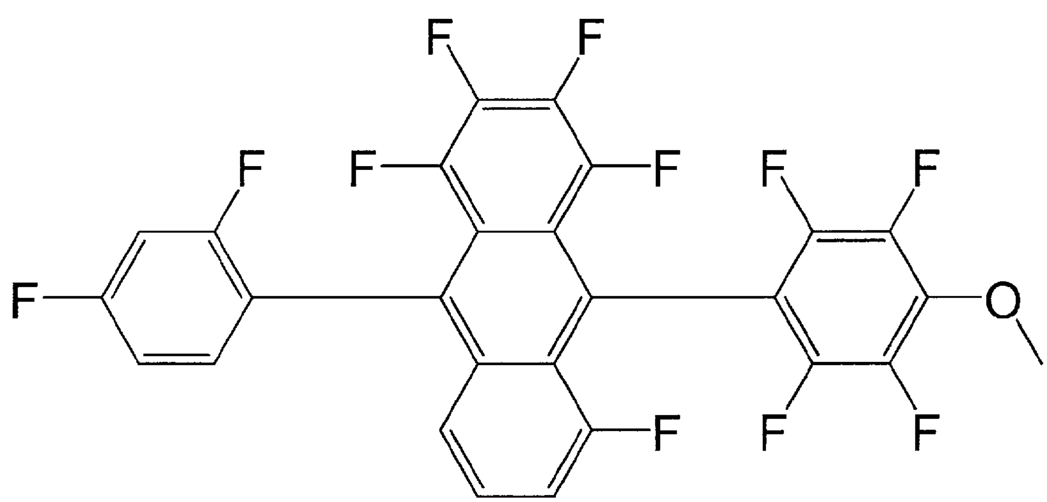
Figure 553:
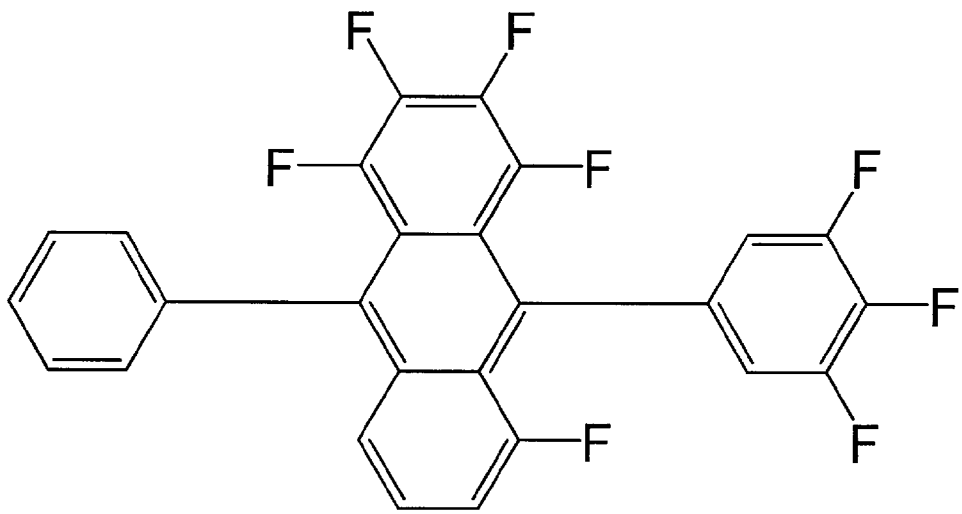
Figure 554:
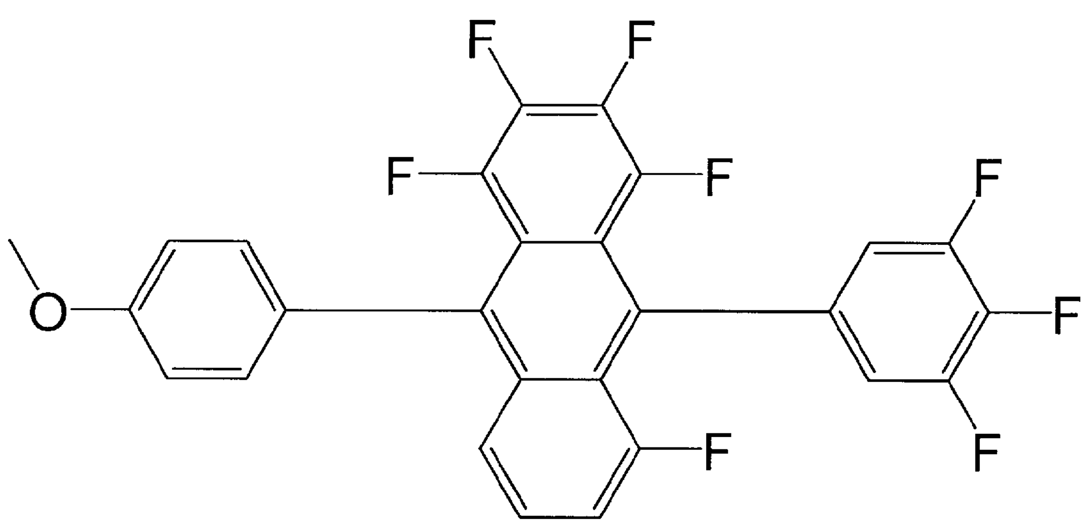
Figure 555:
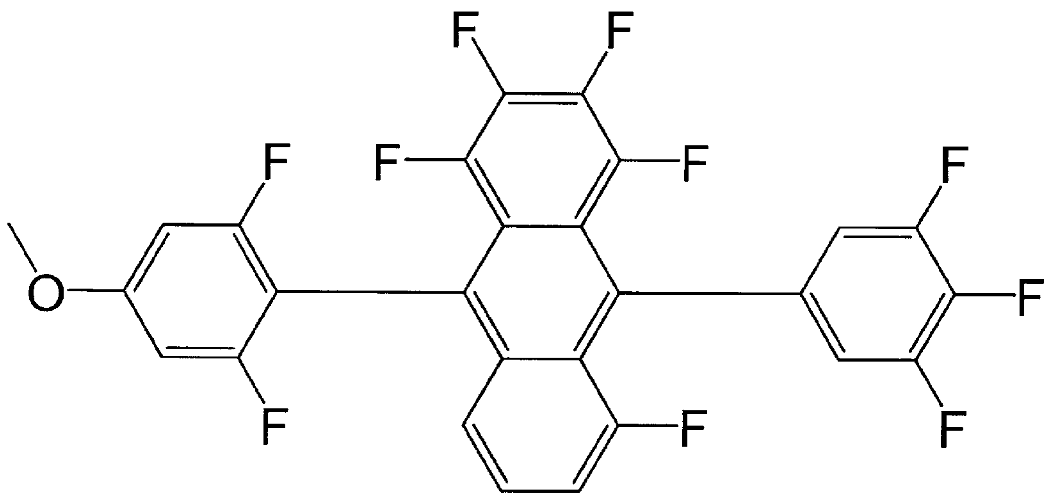
Figure 556:
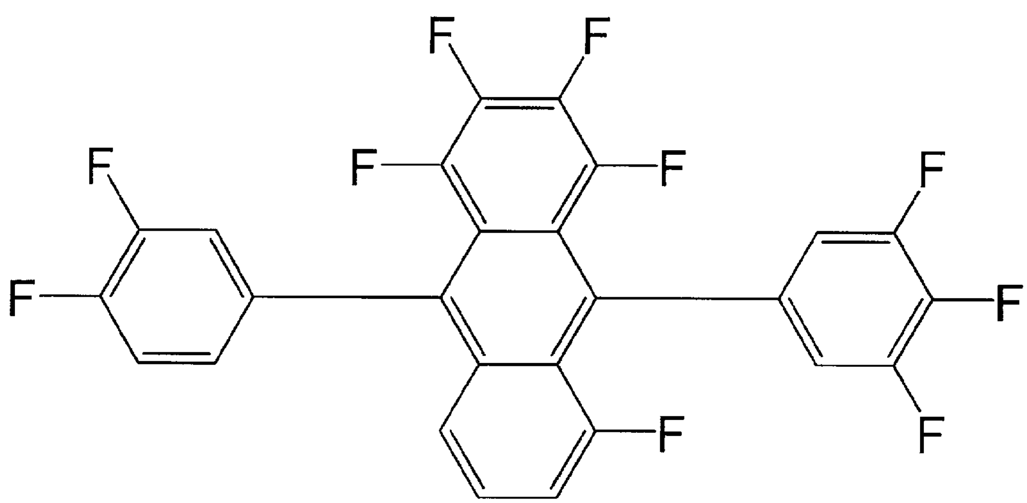
Figure 557:
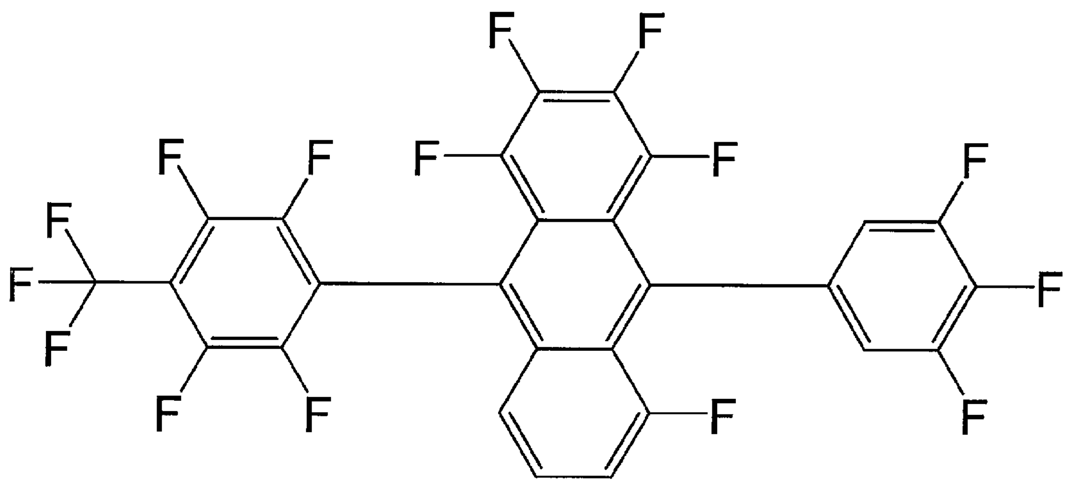
Figure 558:
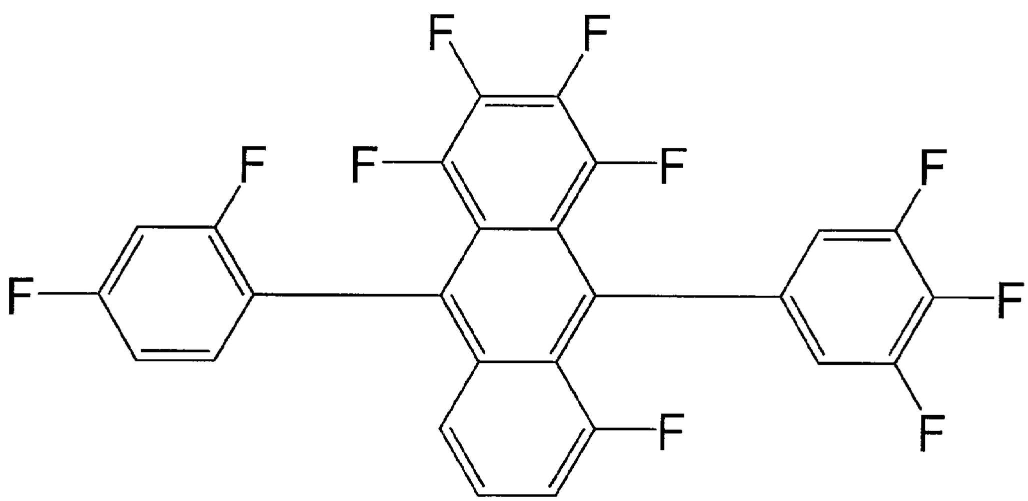
Figure 559:
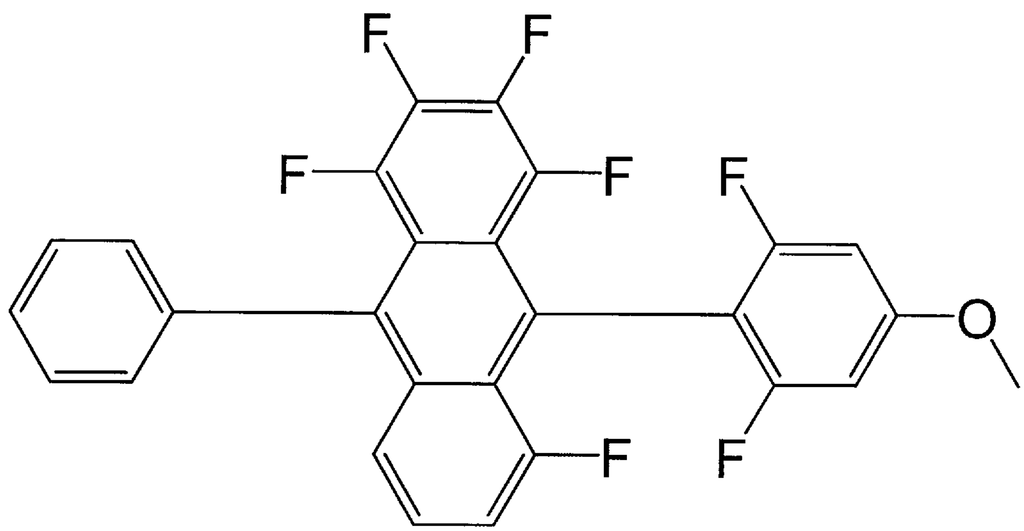
Figure 560:
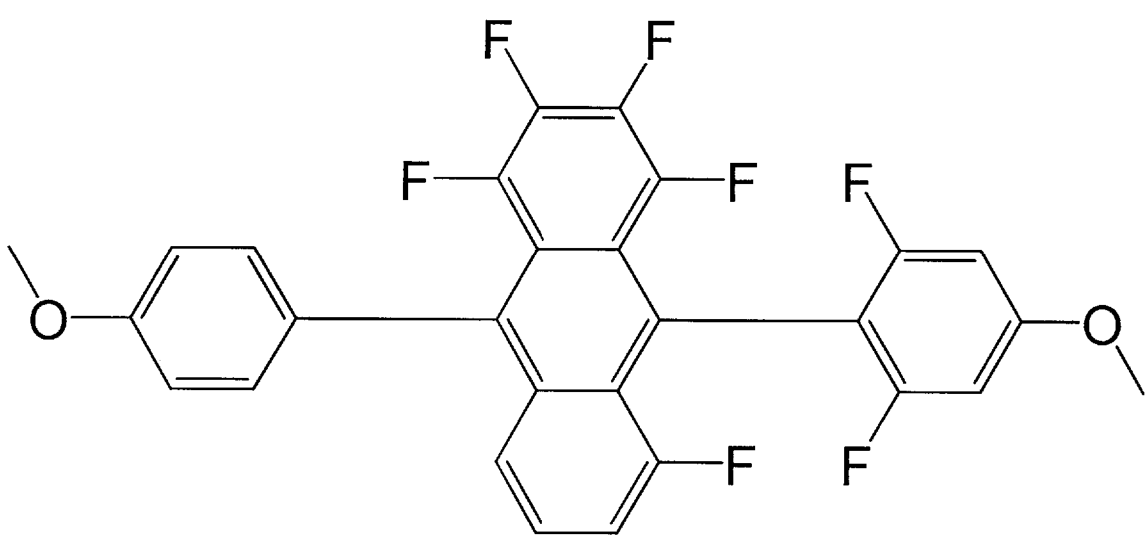
Figure 561:
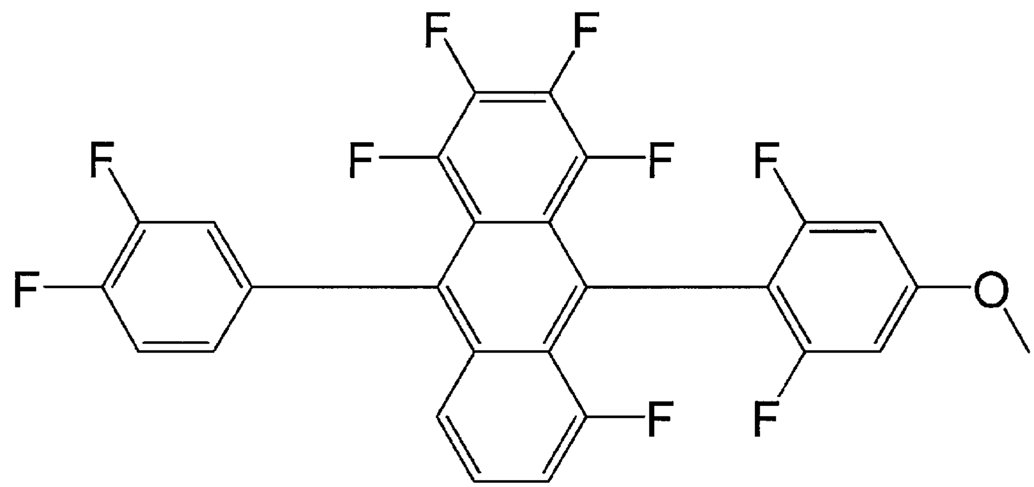
Figure 562:
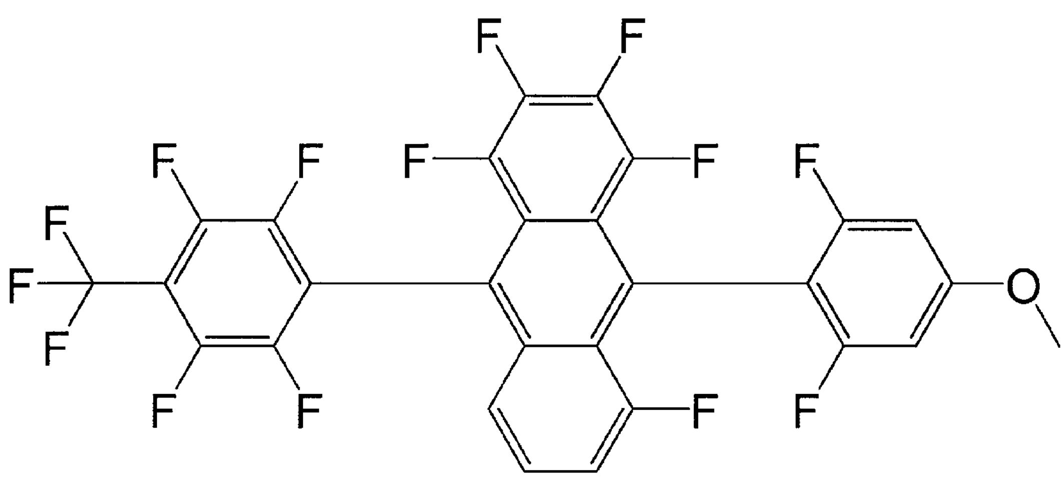
Figure 563:
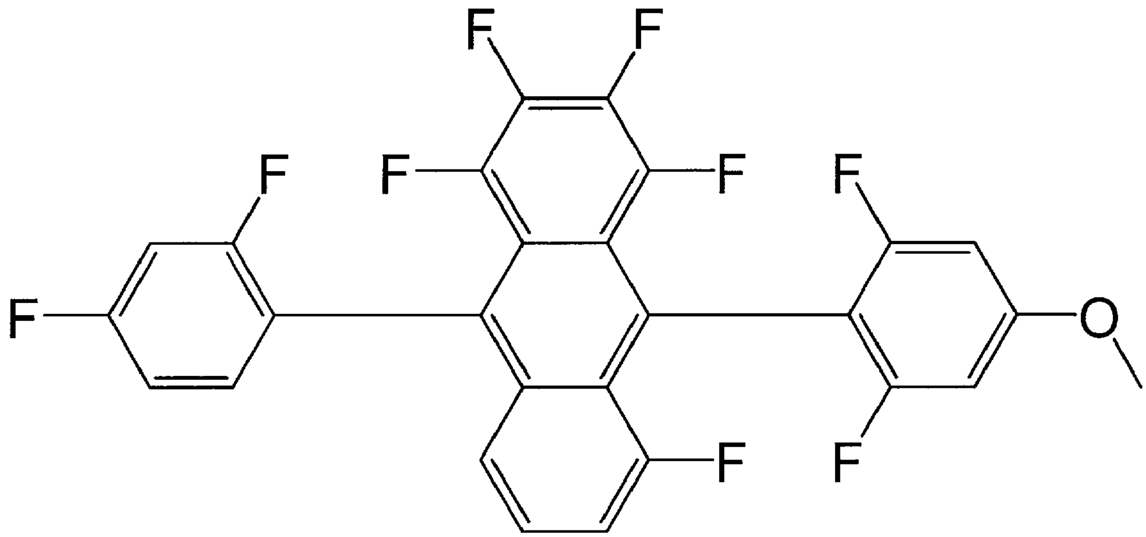
Figure 564:
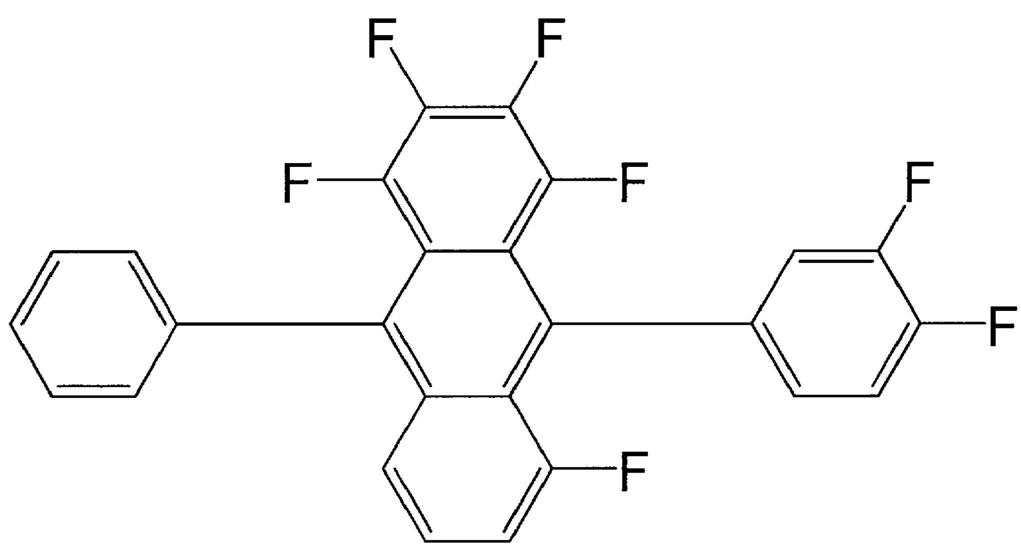
Figure 565:
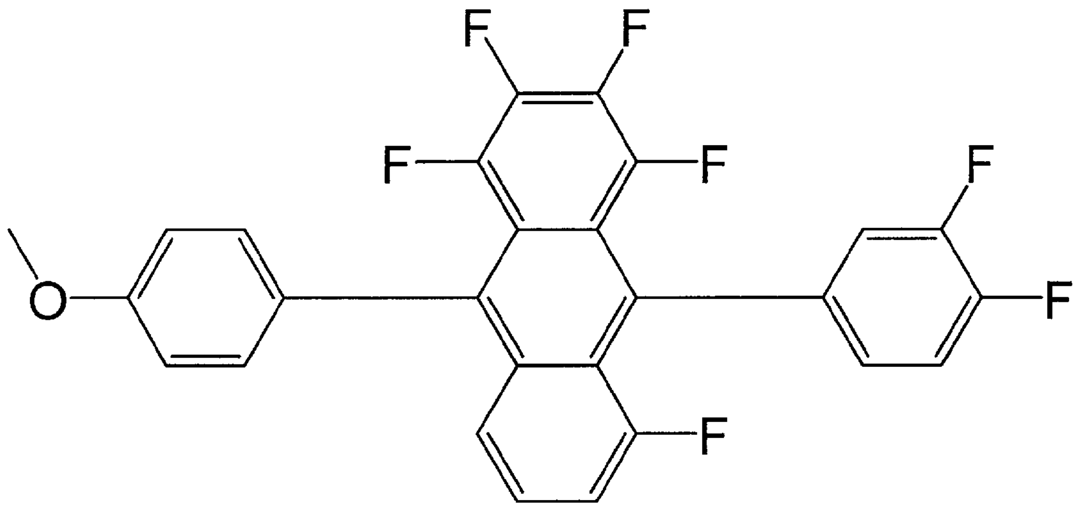
Figure 566:
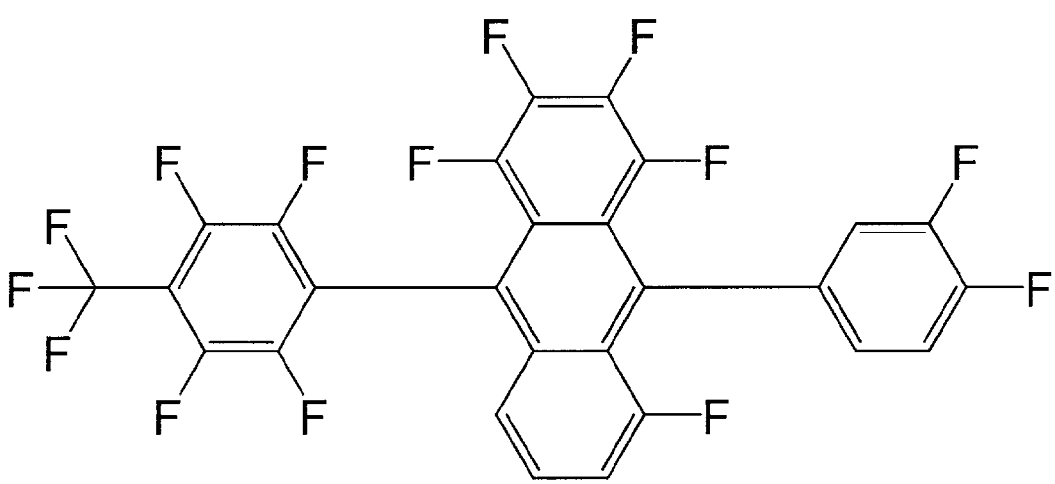
Figure 567:
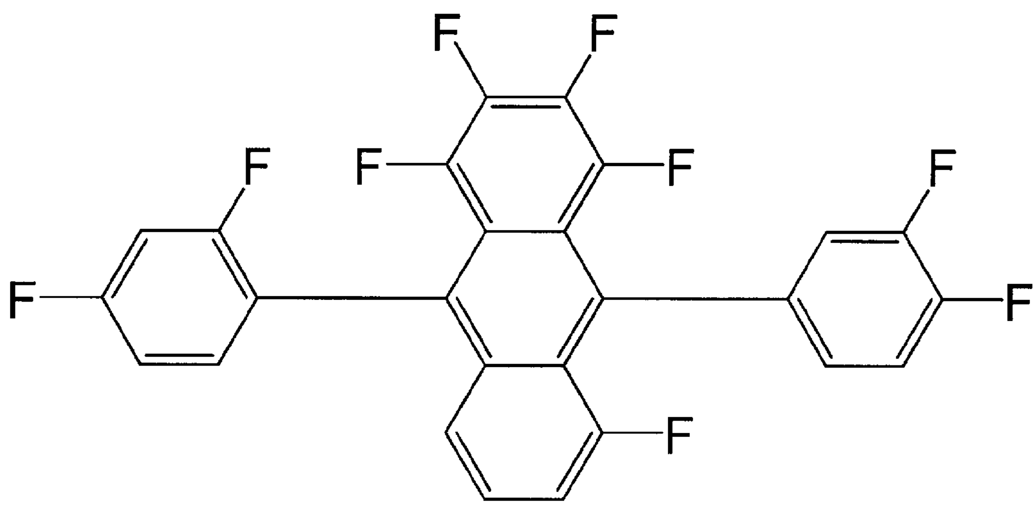
Figure 568:
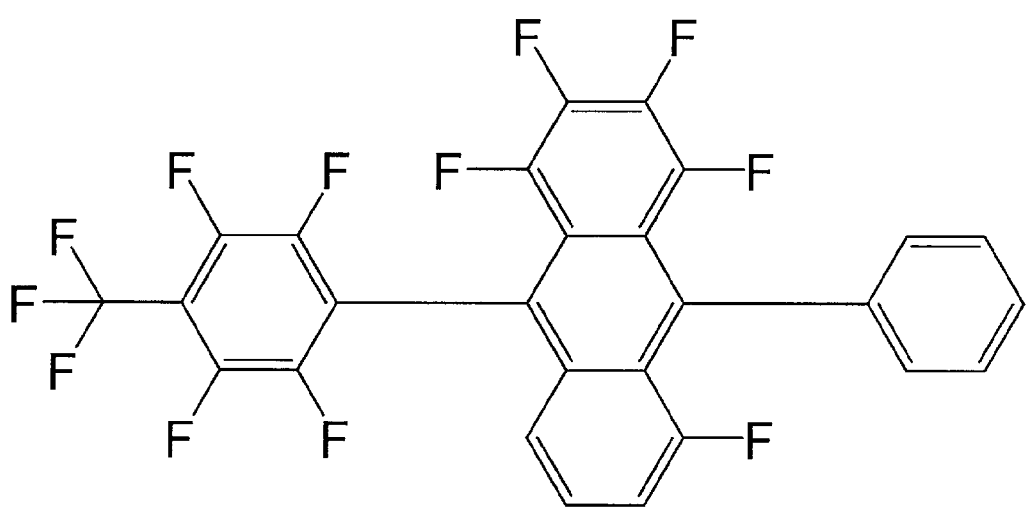
Figure 569:
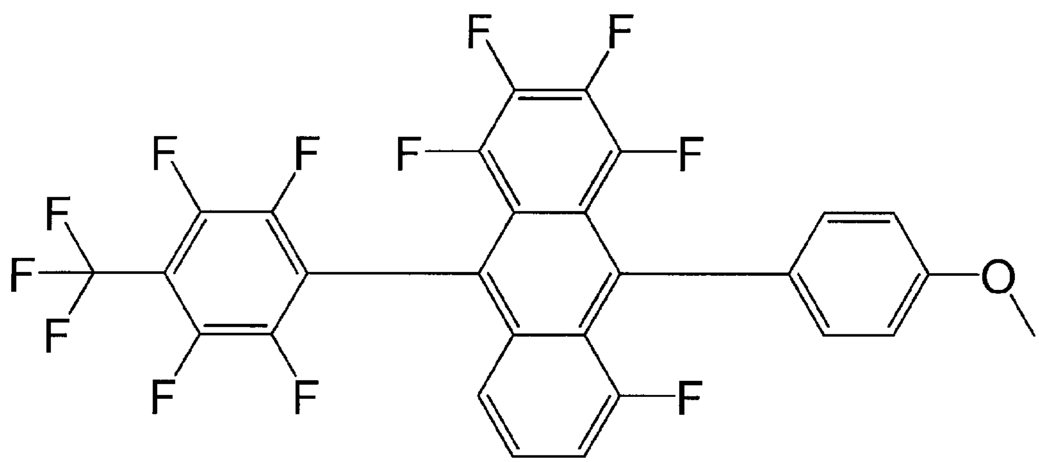
Figure 570:
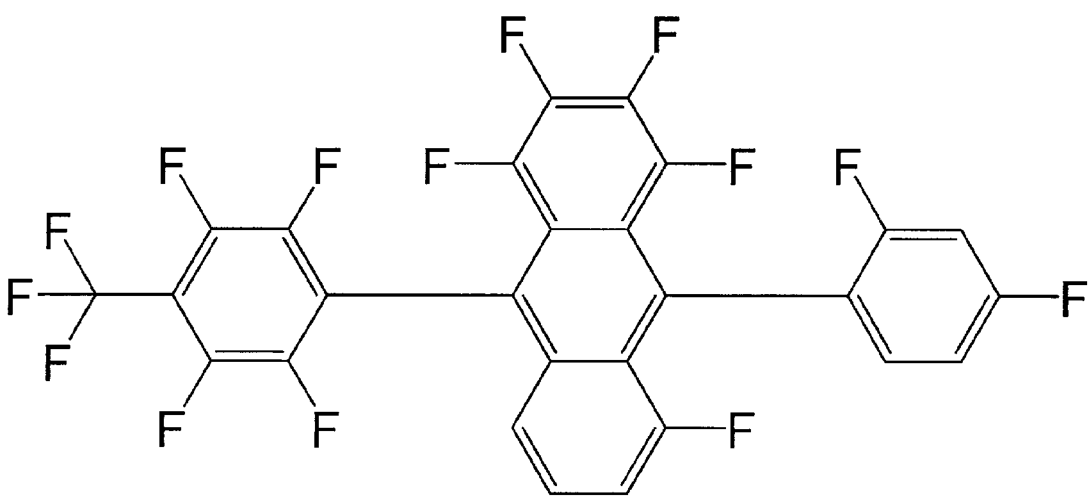
Figure 571:
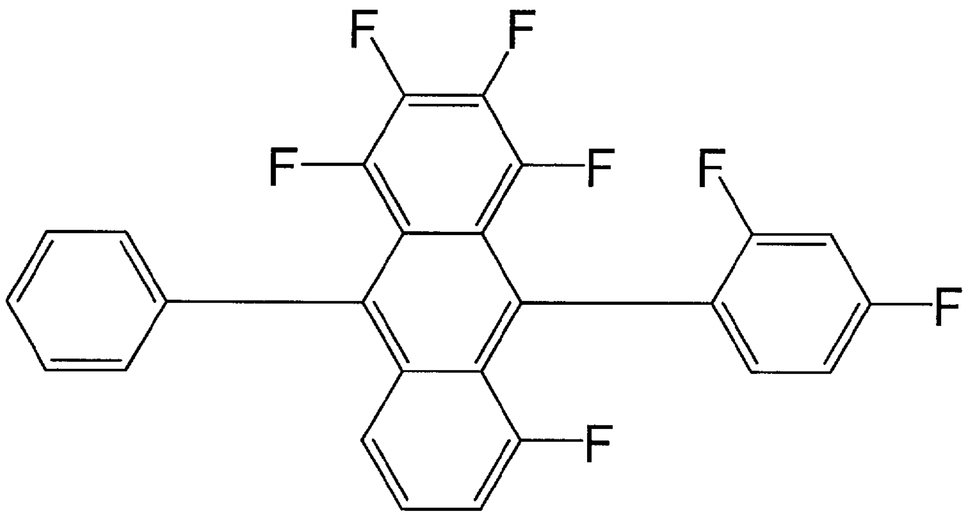
Figure 572:
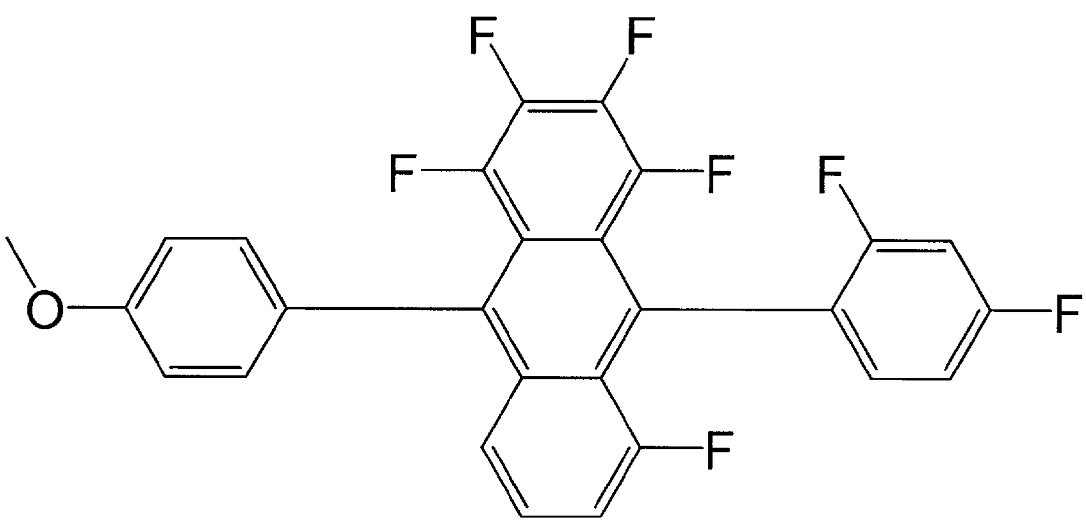
Figure 573:
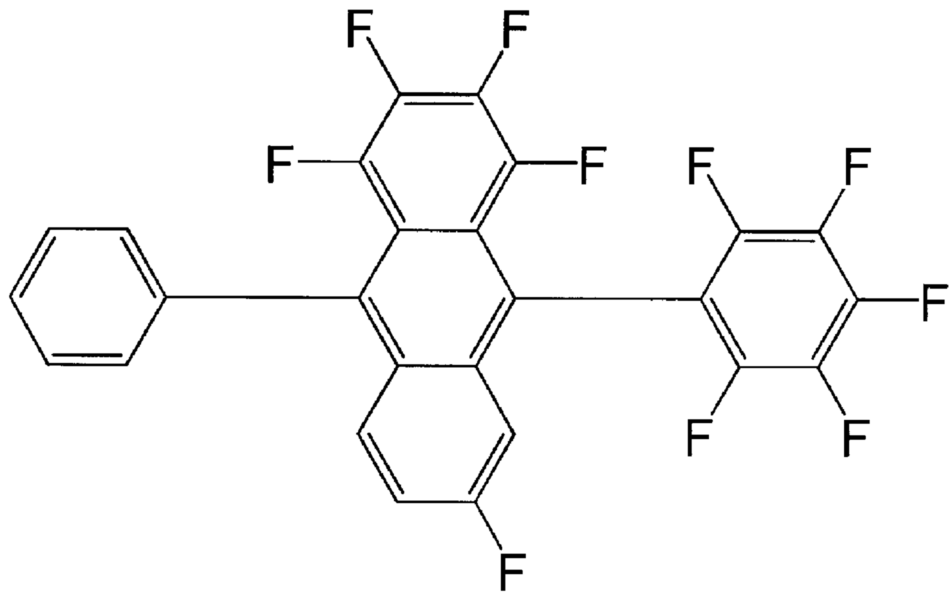
Figure 574:
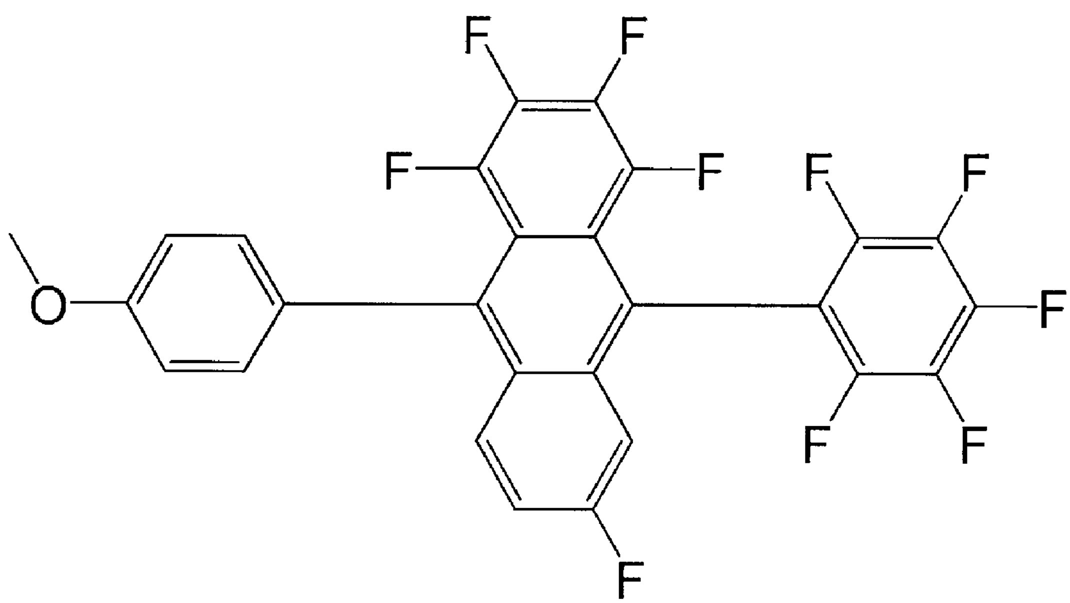
Figure 575:
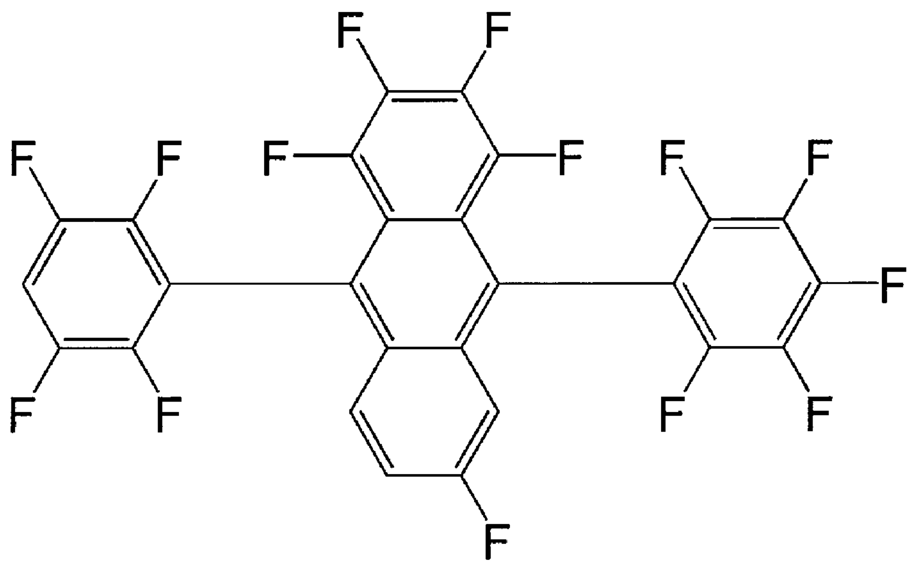
Figure 576:
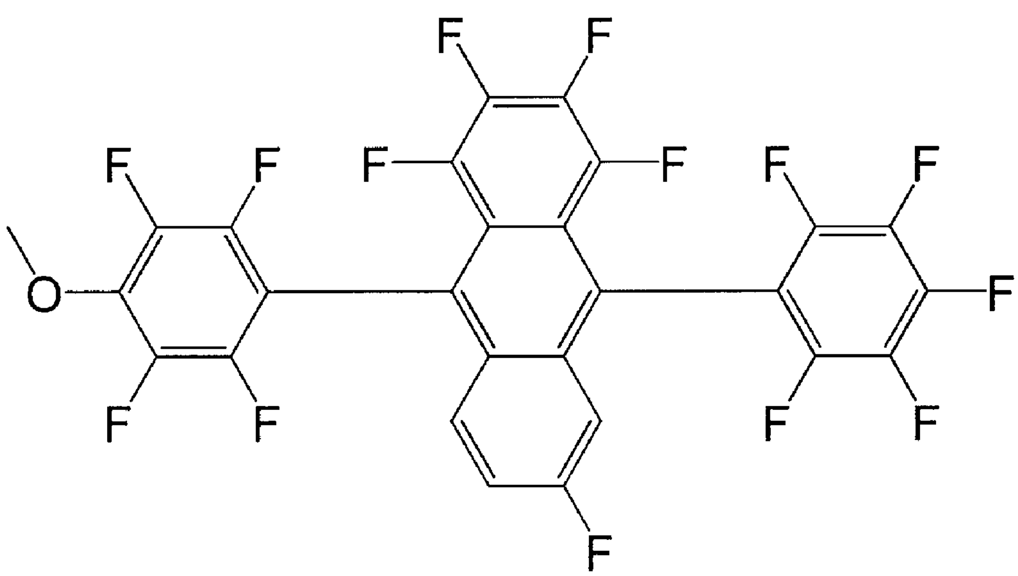
Figure 577:
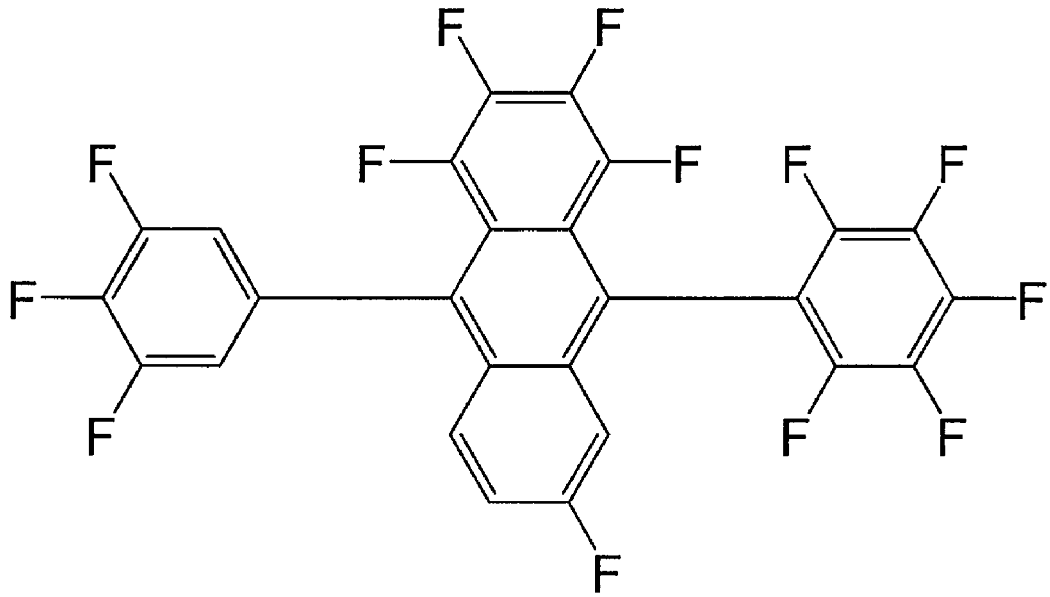
Figure 578:
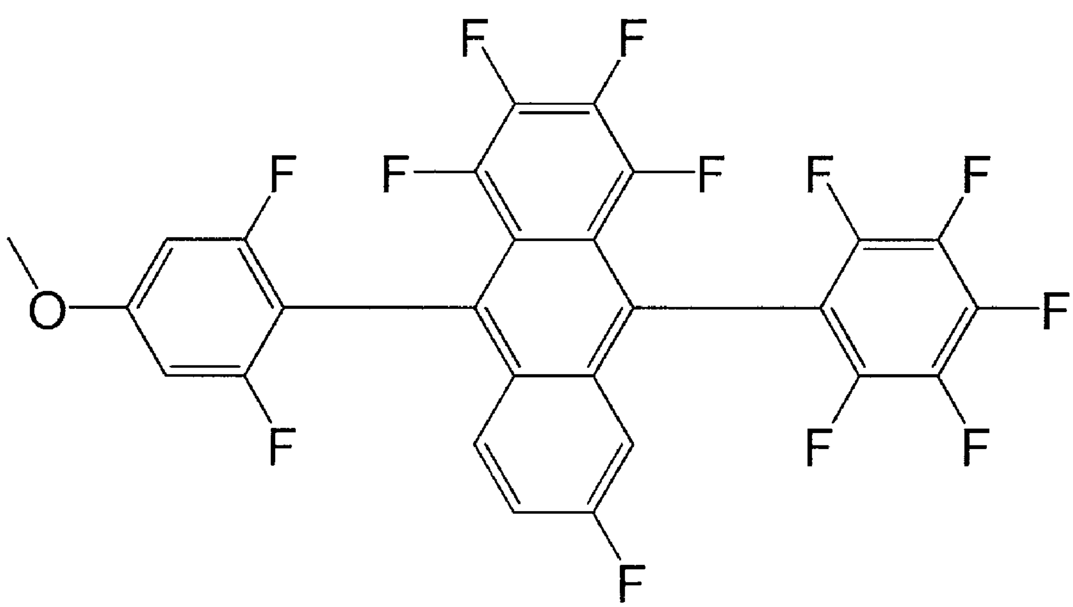
Figure 579:
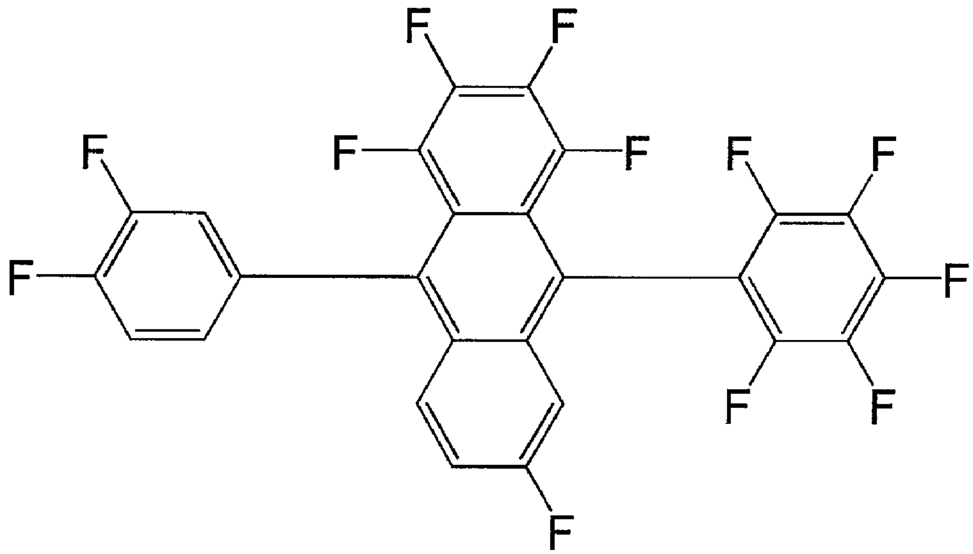
Figure 580:
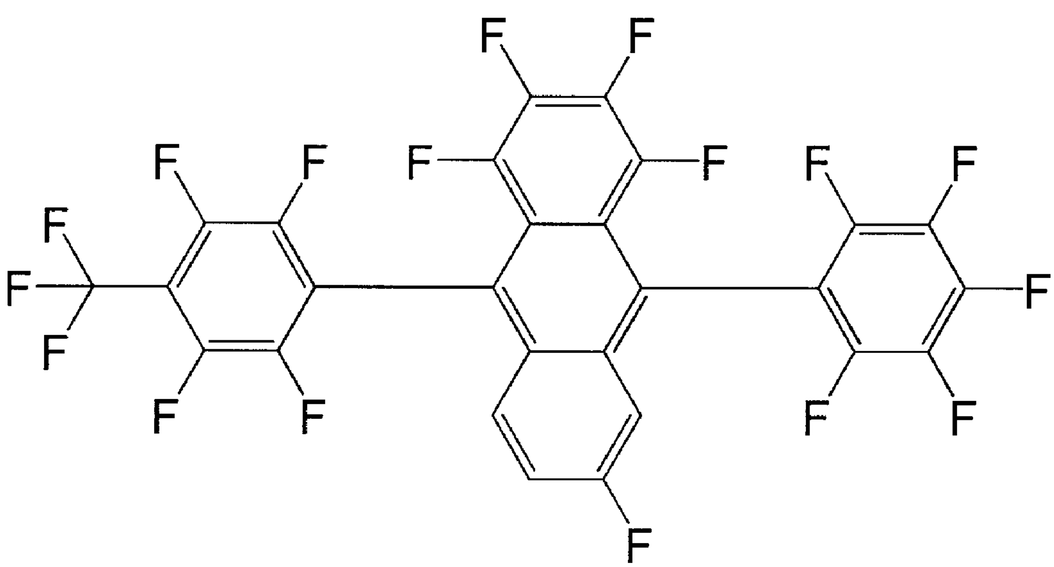
Figure 581:
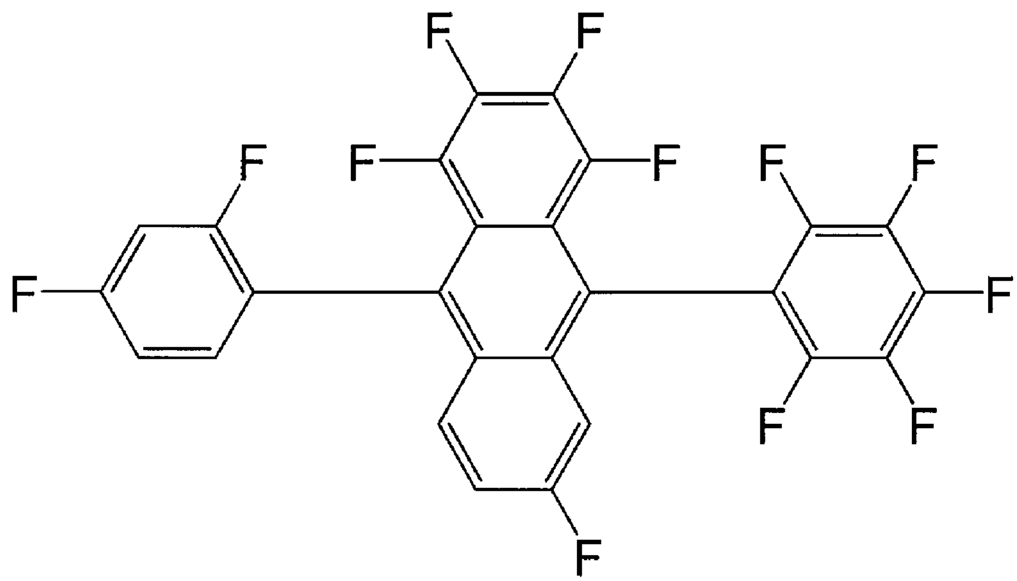
Figure 582:
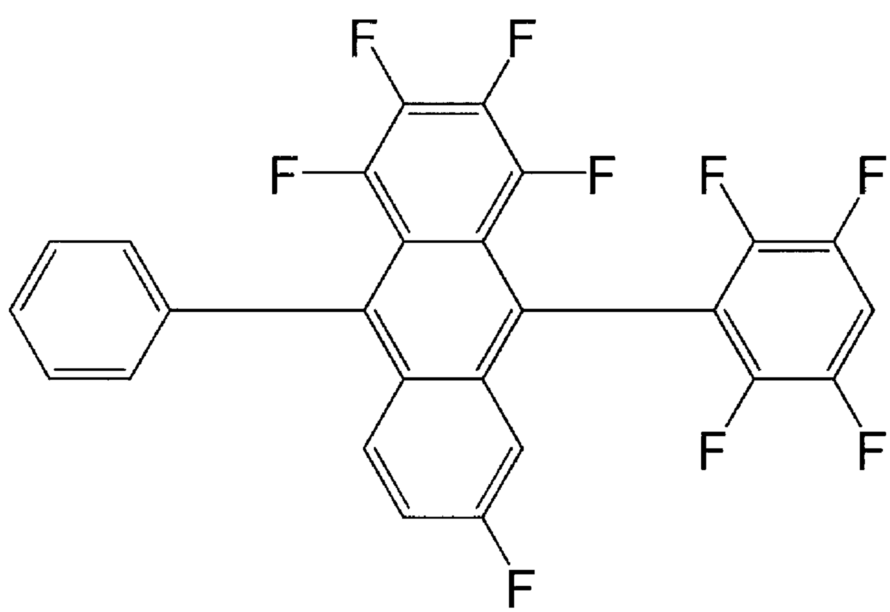
Figure 583:
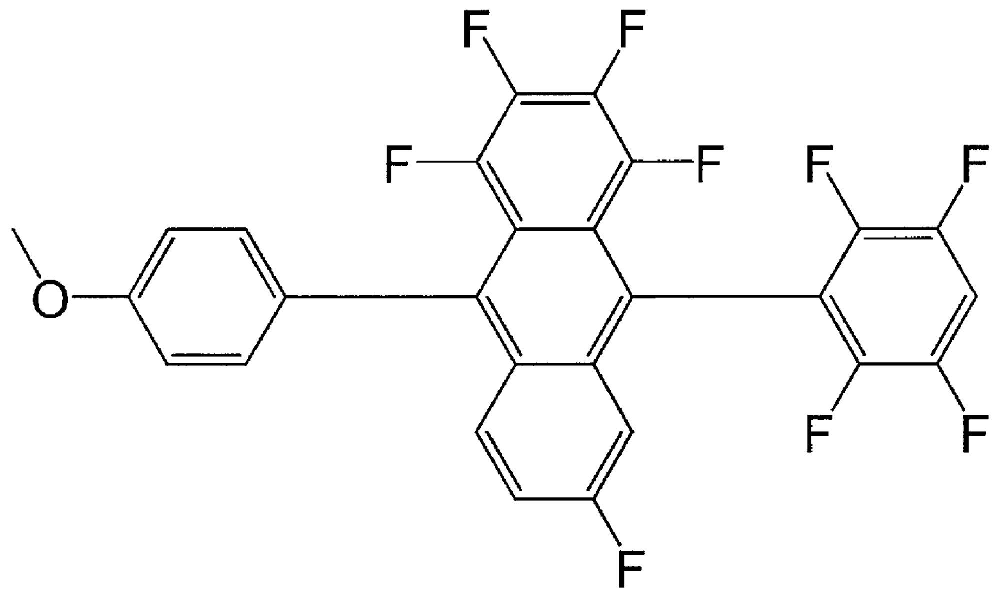
Figure 584:
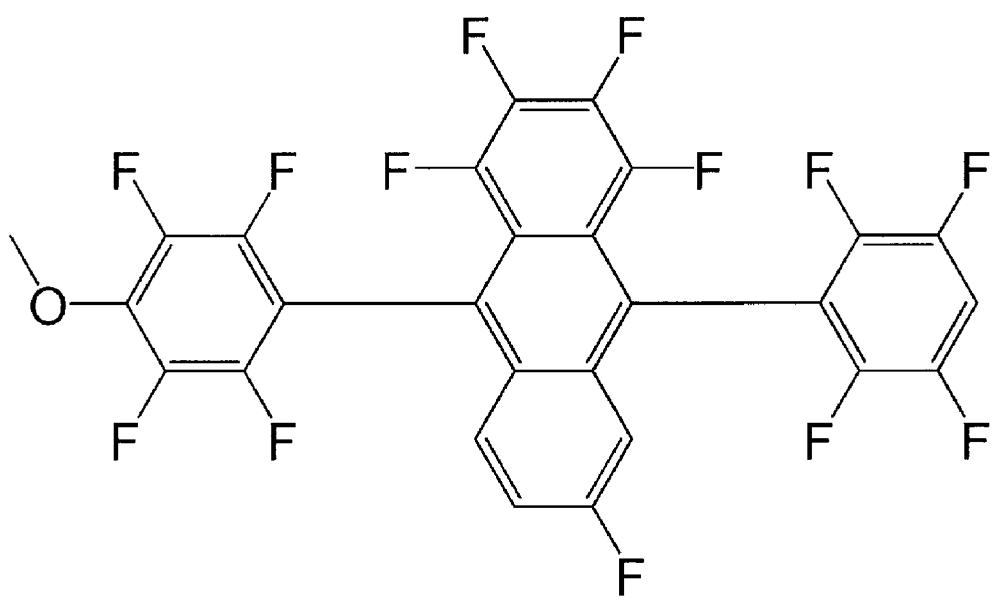
Figure 585:
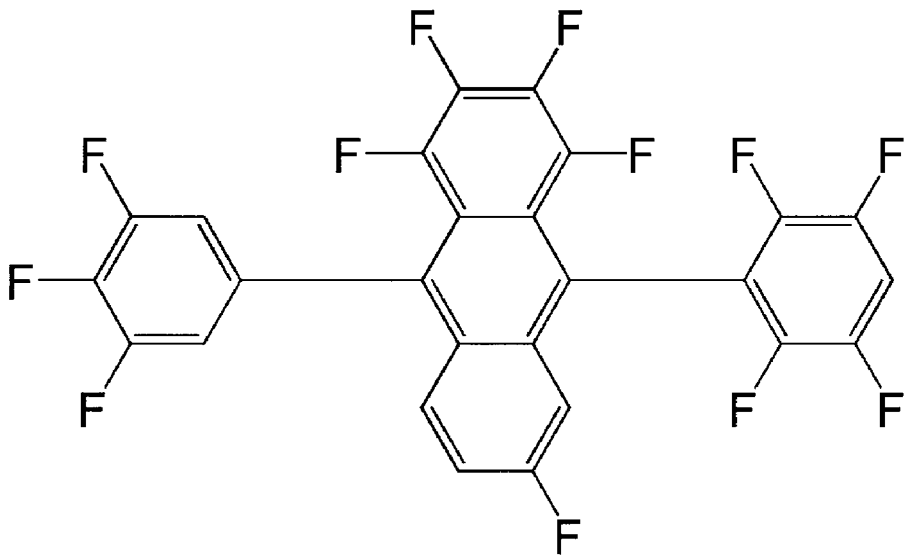
Figure 586:
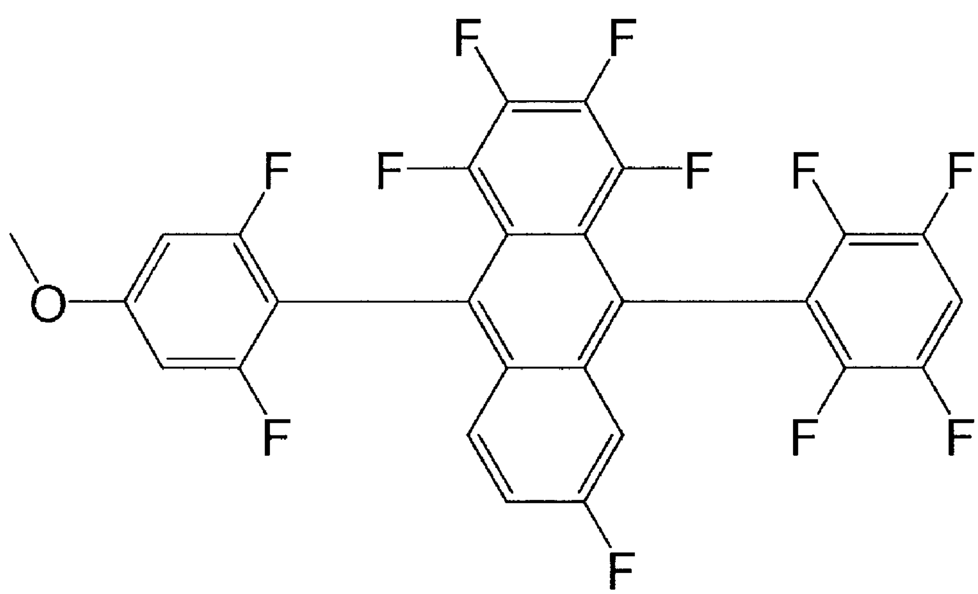
Figure 587:
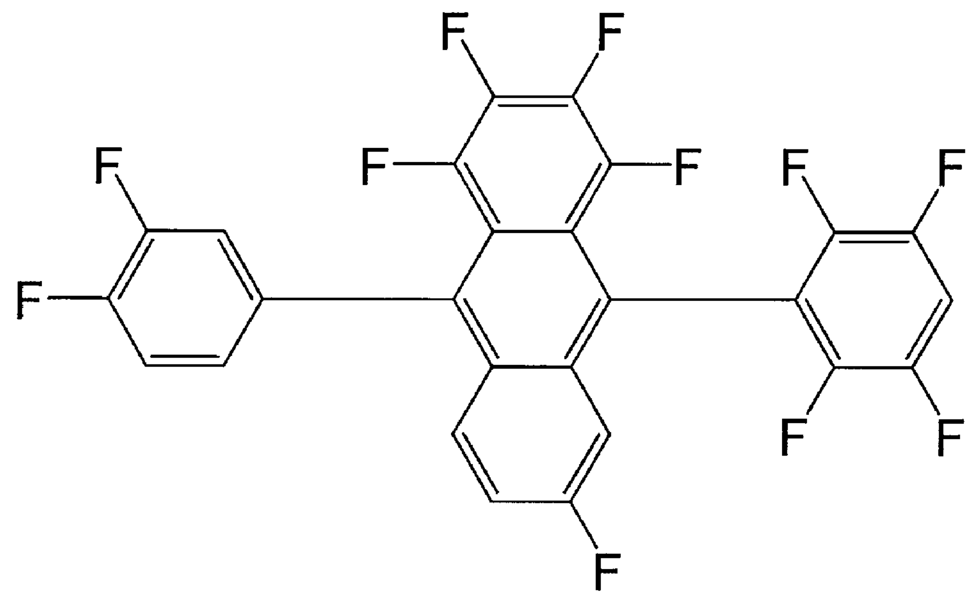
Figure 588:
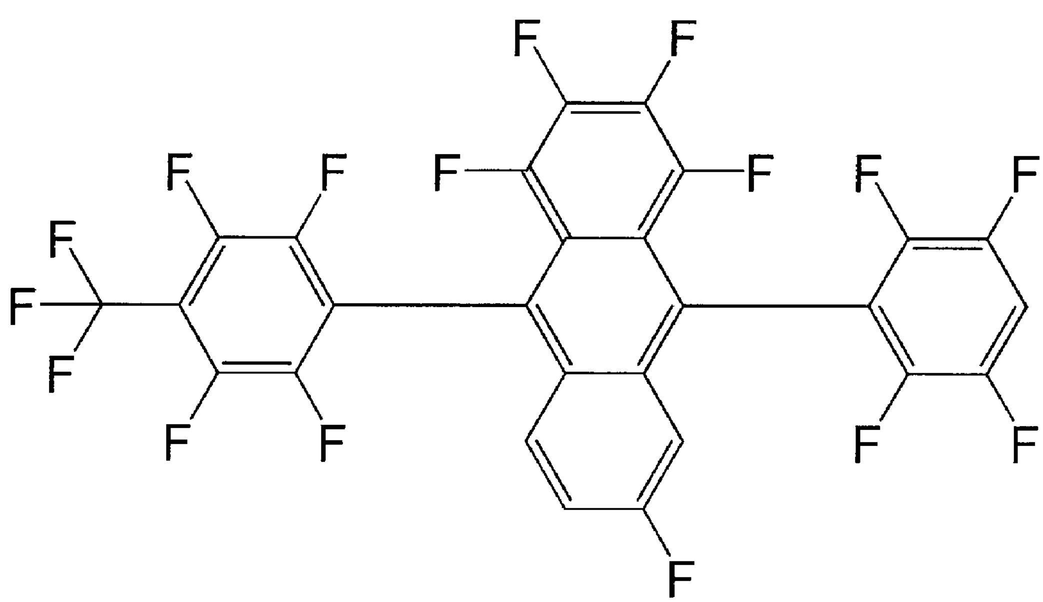
Figure 589:
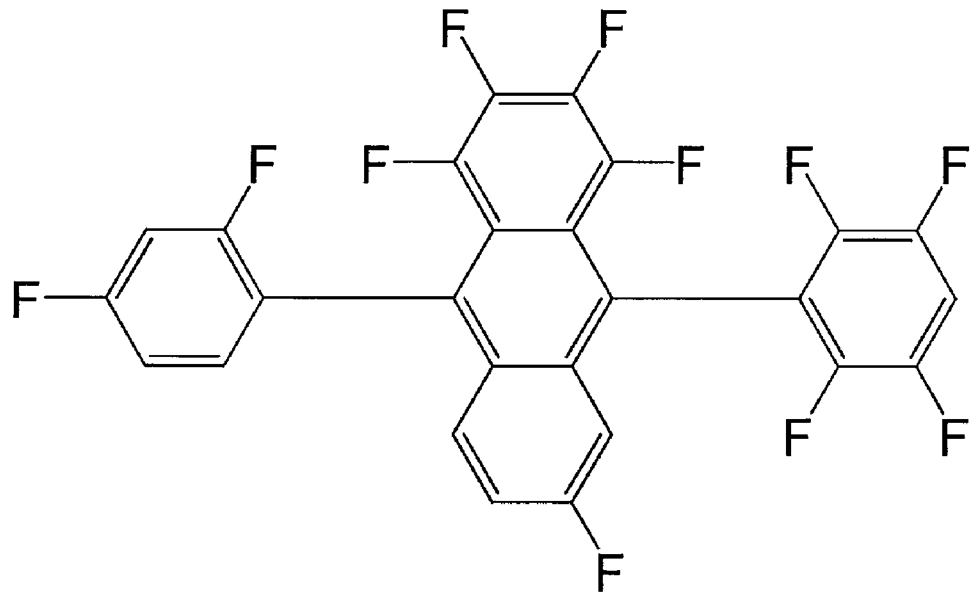
Figure 590:
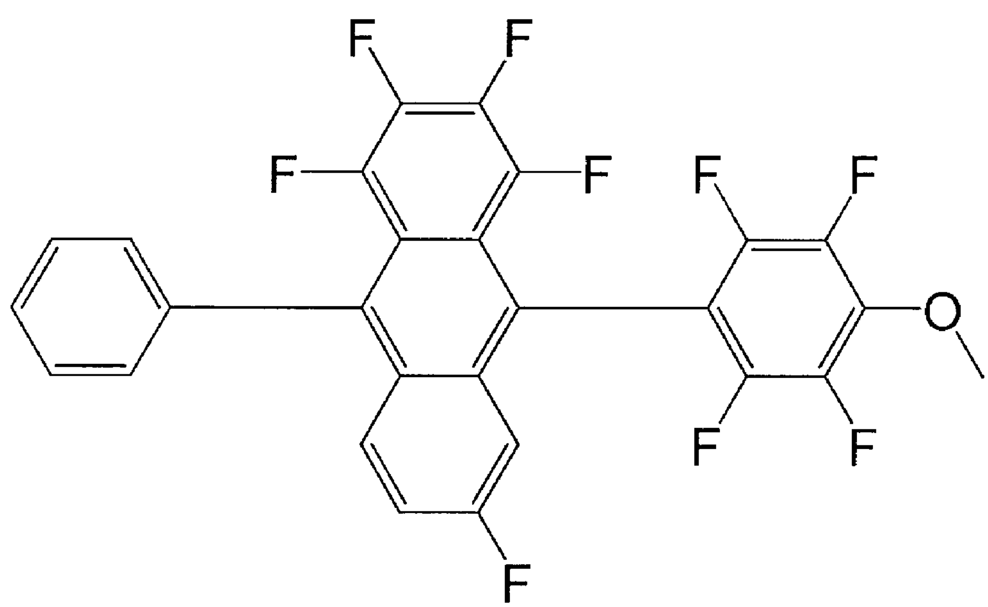
Figure 591:
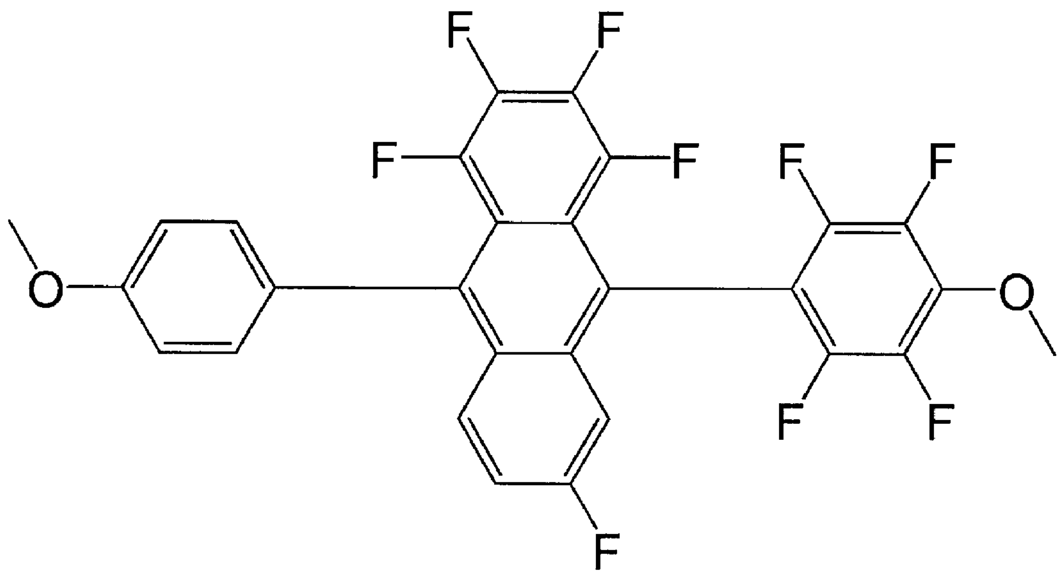
Figure 592:
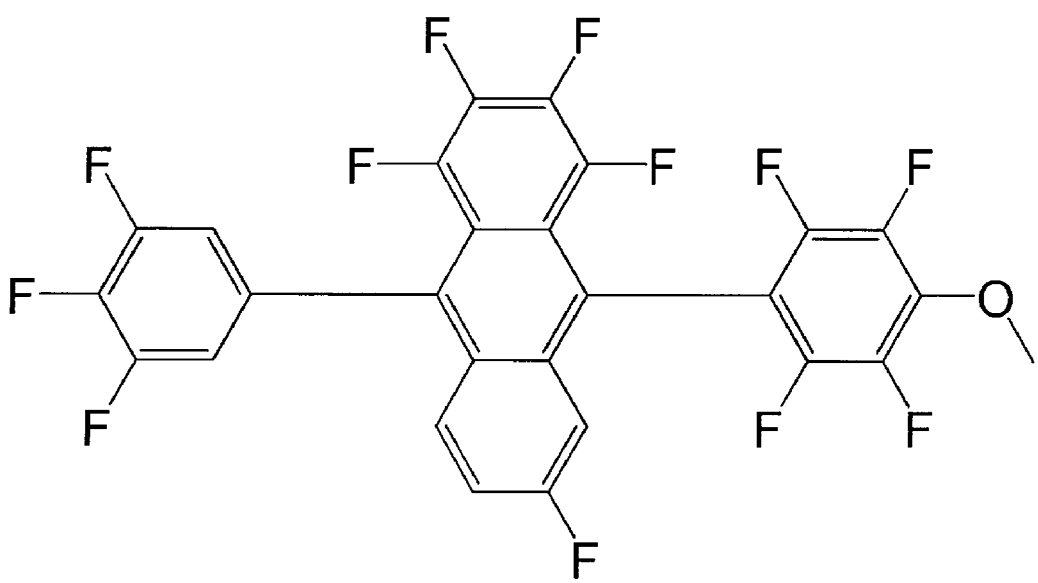
Figure 593:
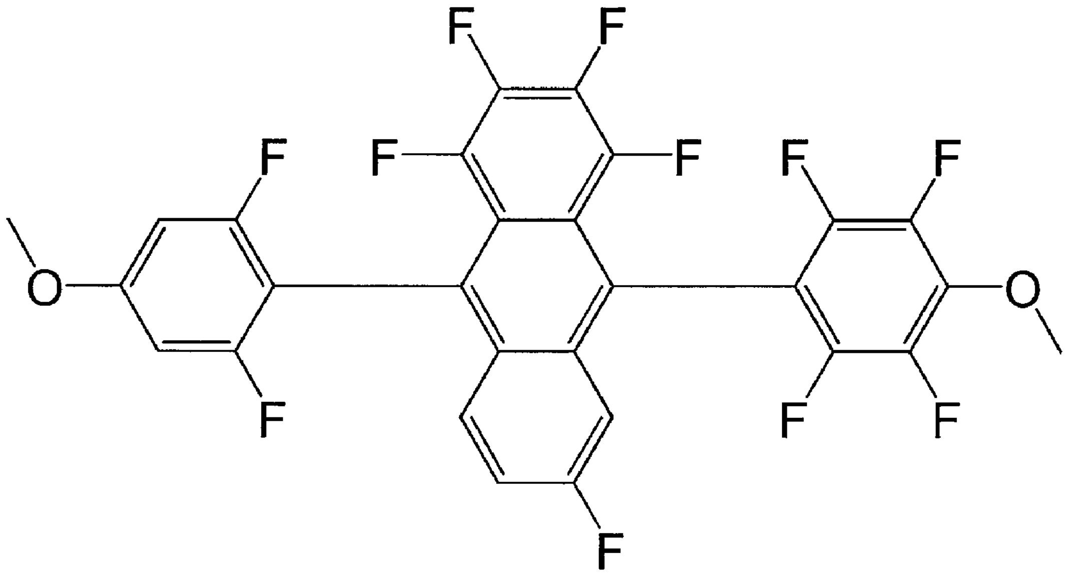
Figure 594:
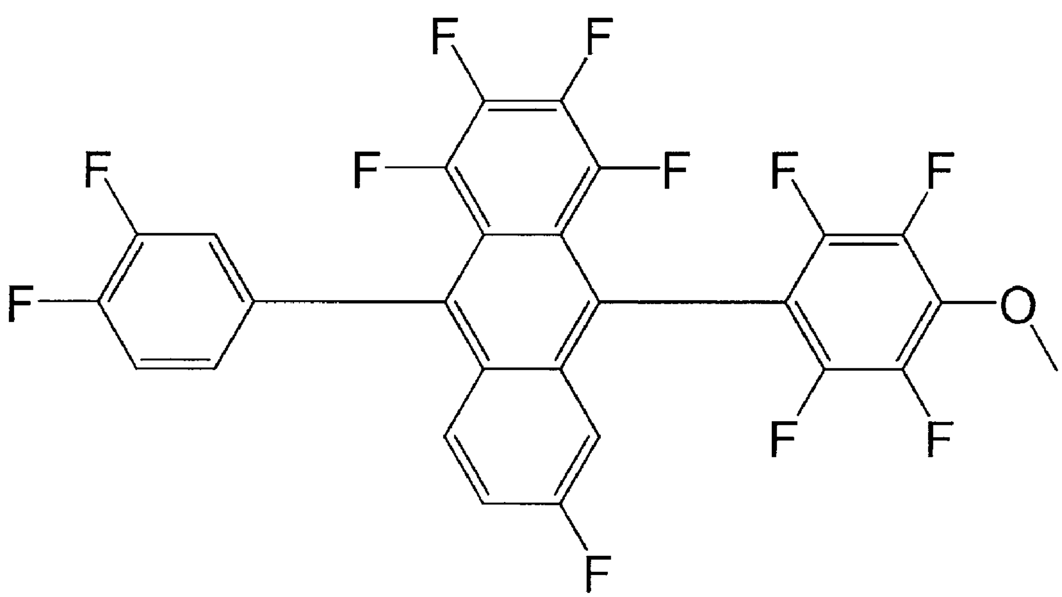
Figure 595:
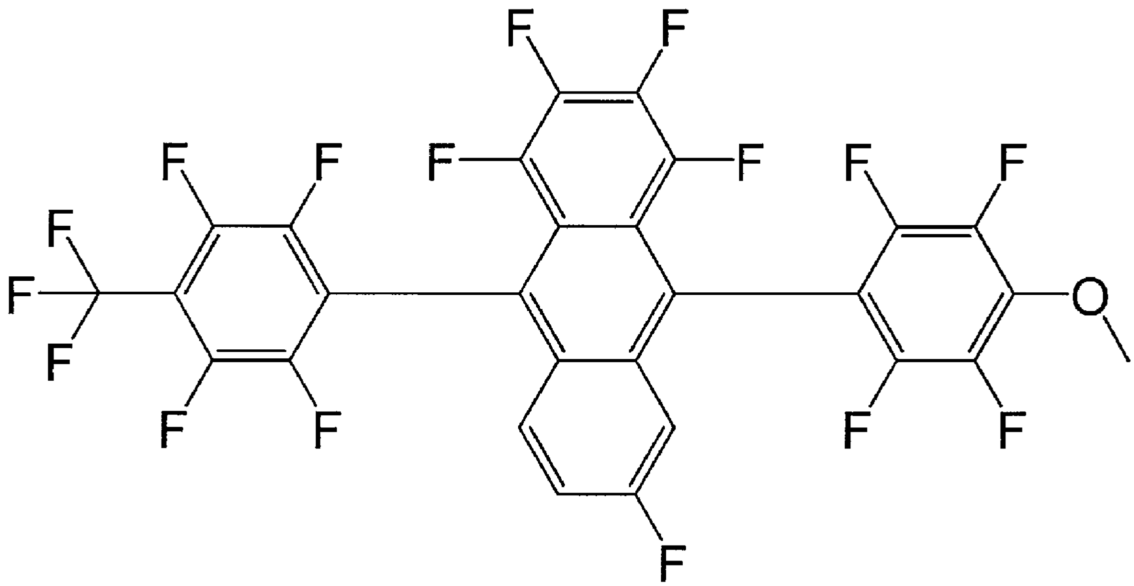
Figure 596:
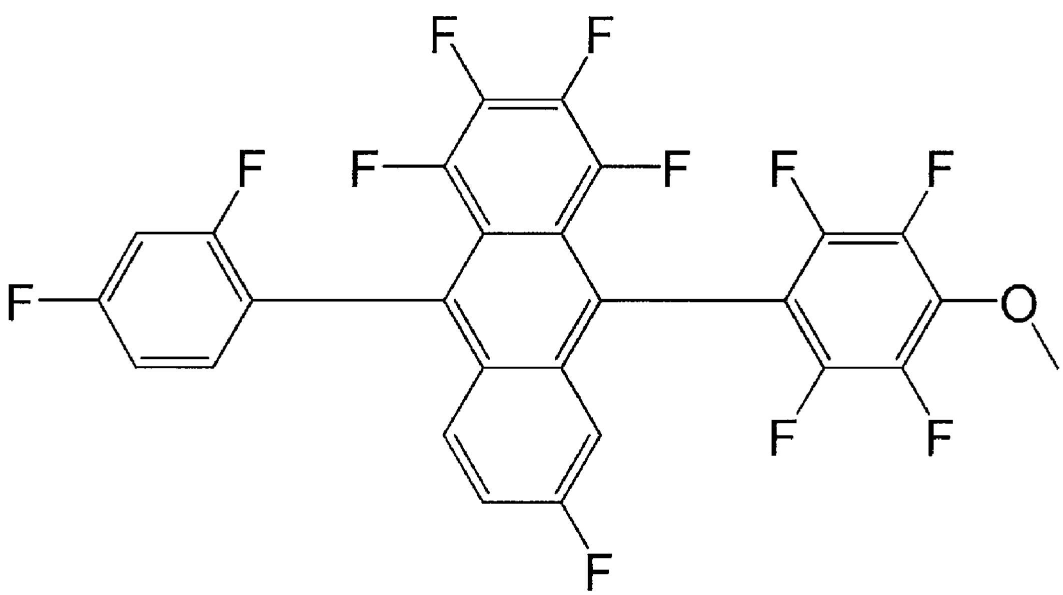
Figure 597:
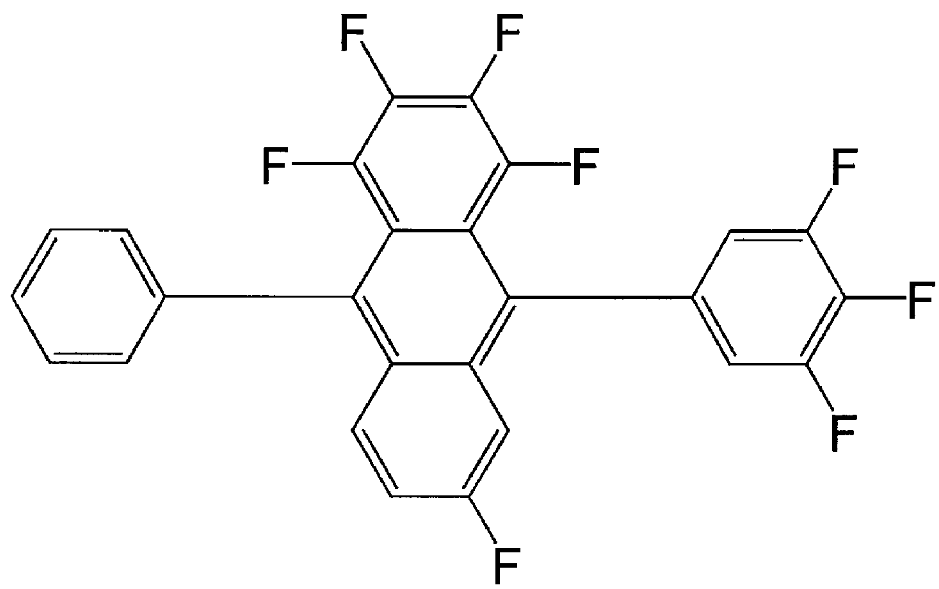
Figure 598:
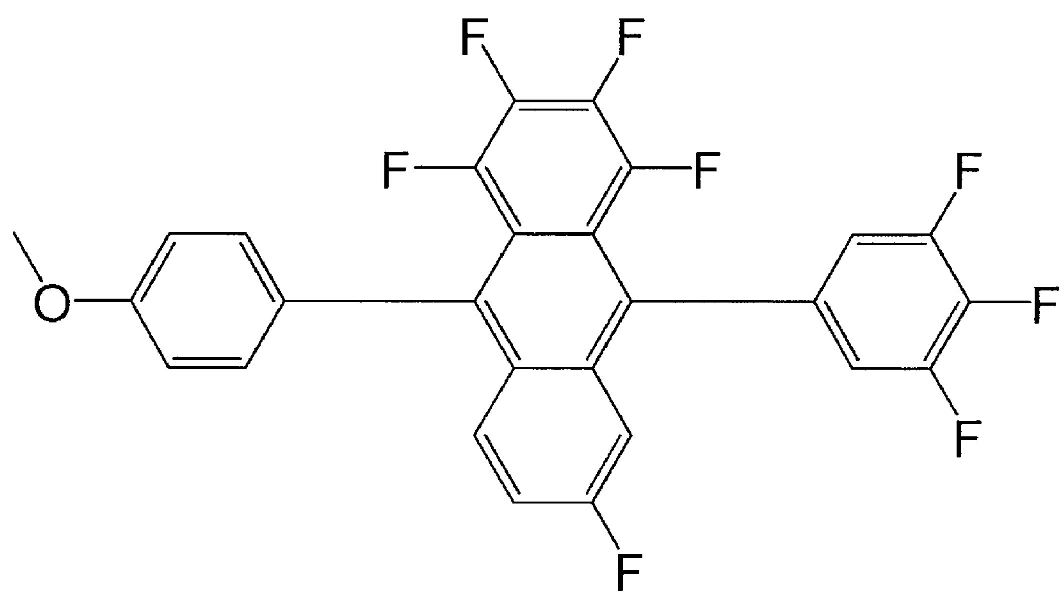
Figure 599:
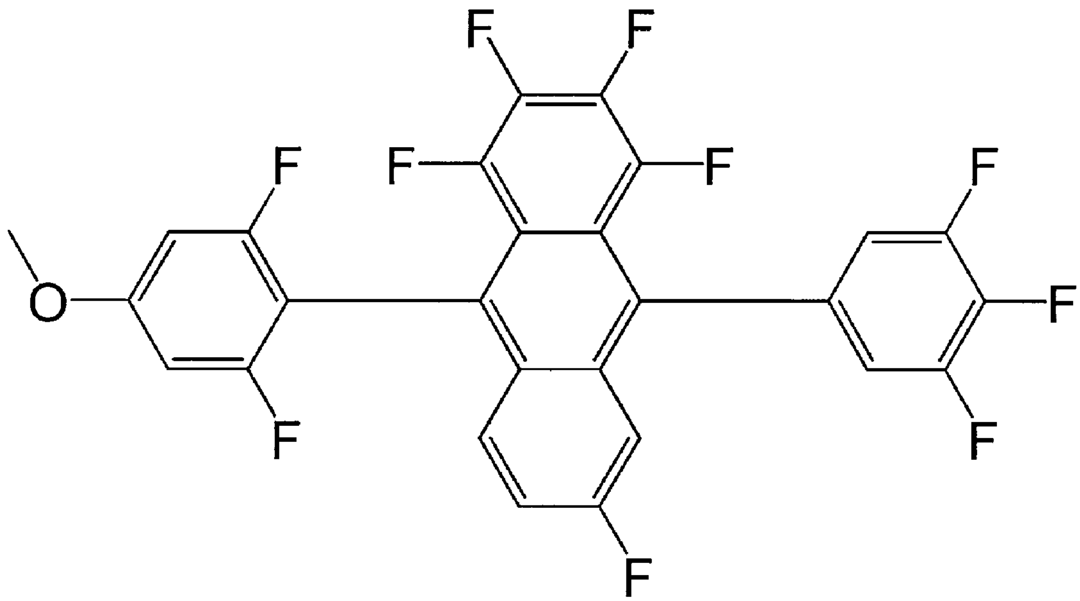
Figure 600:
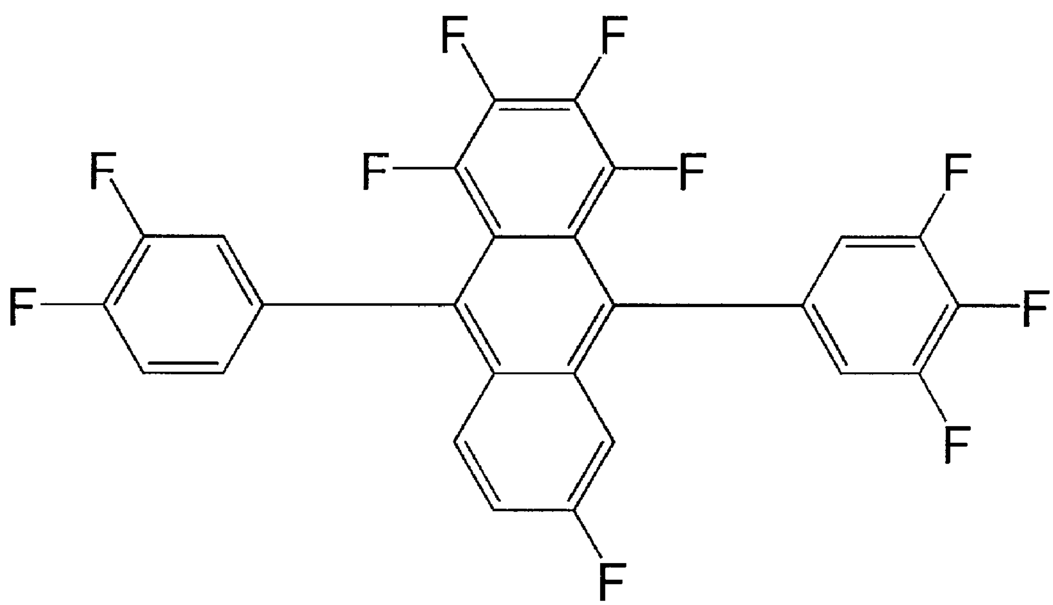
Figure 601:
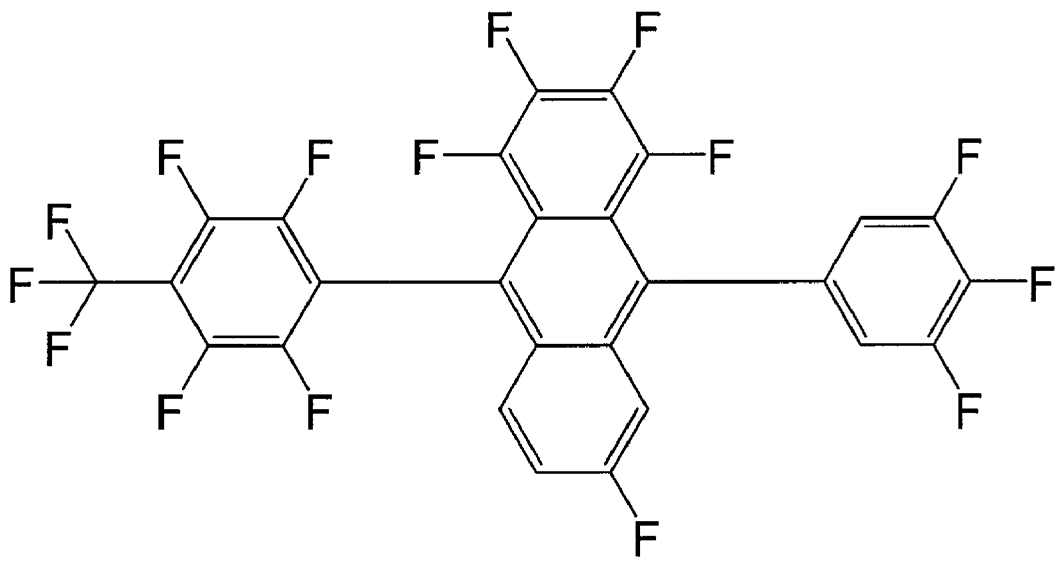
Figure 602:
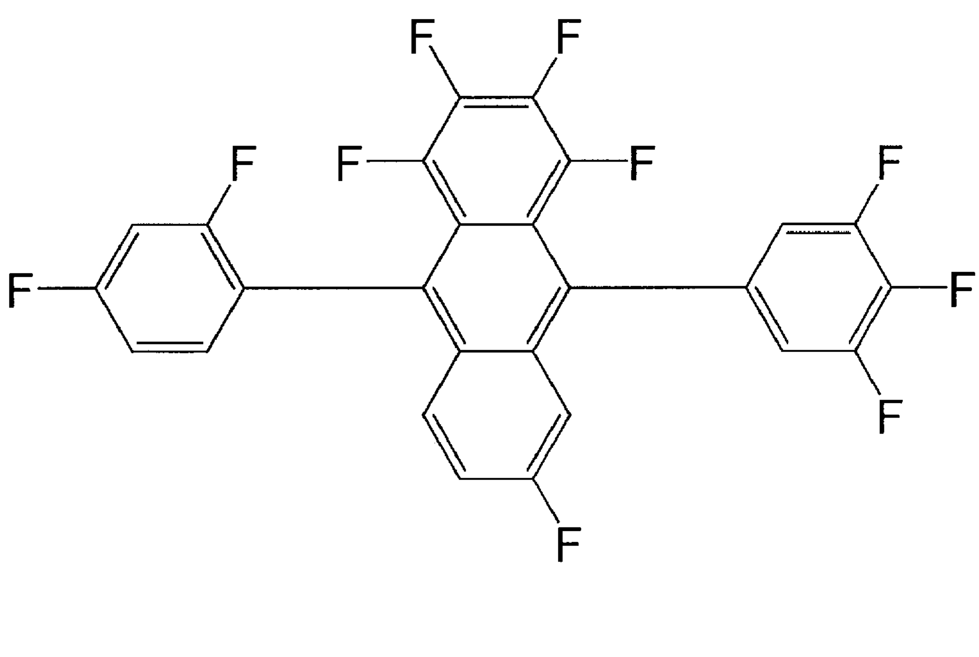
Figure 603:
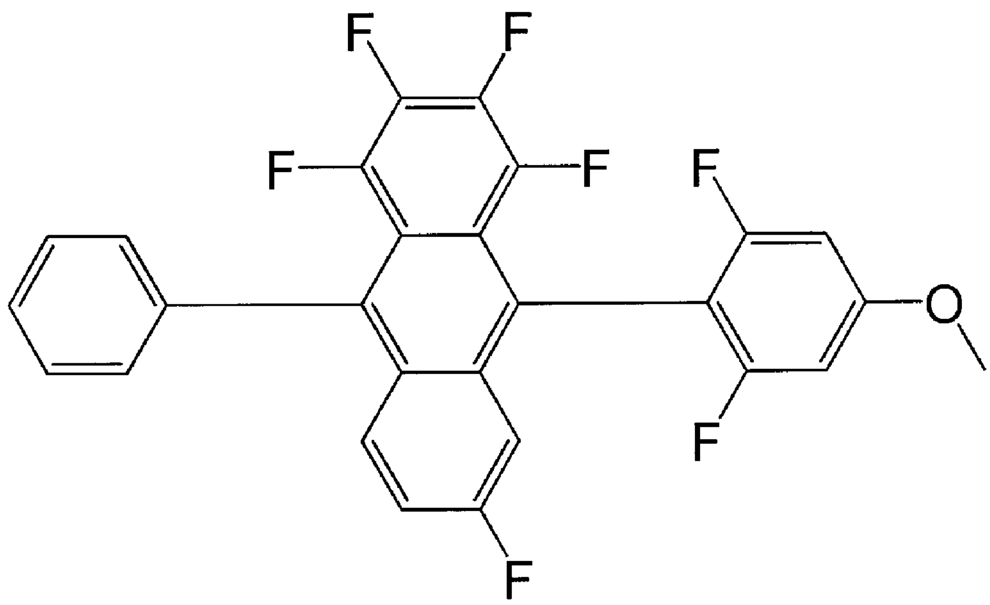
Figure 604:
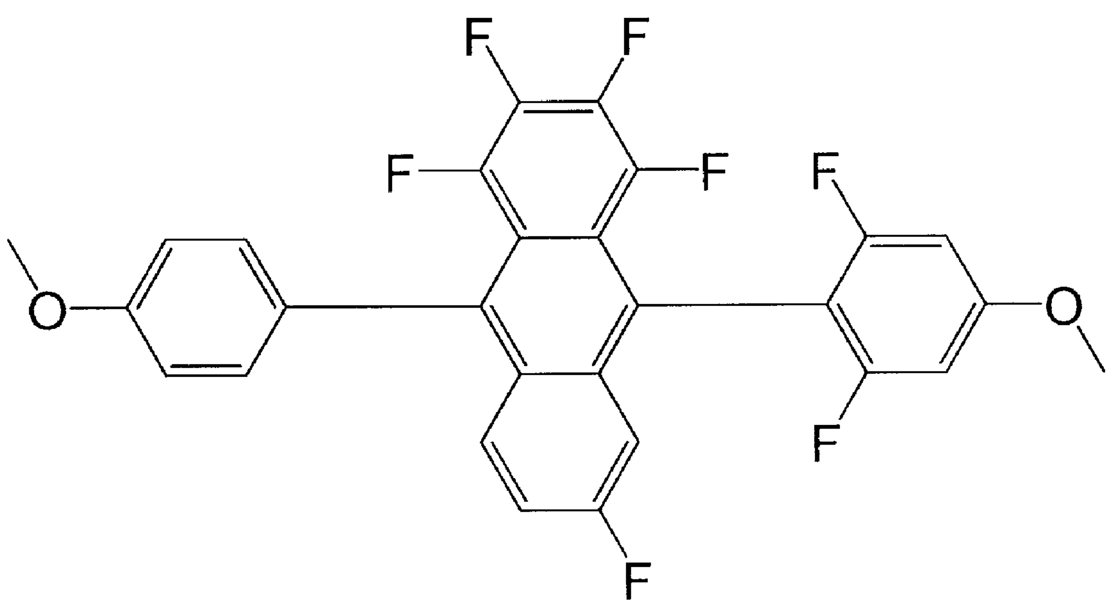
Figure 605:
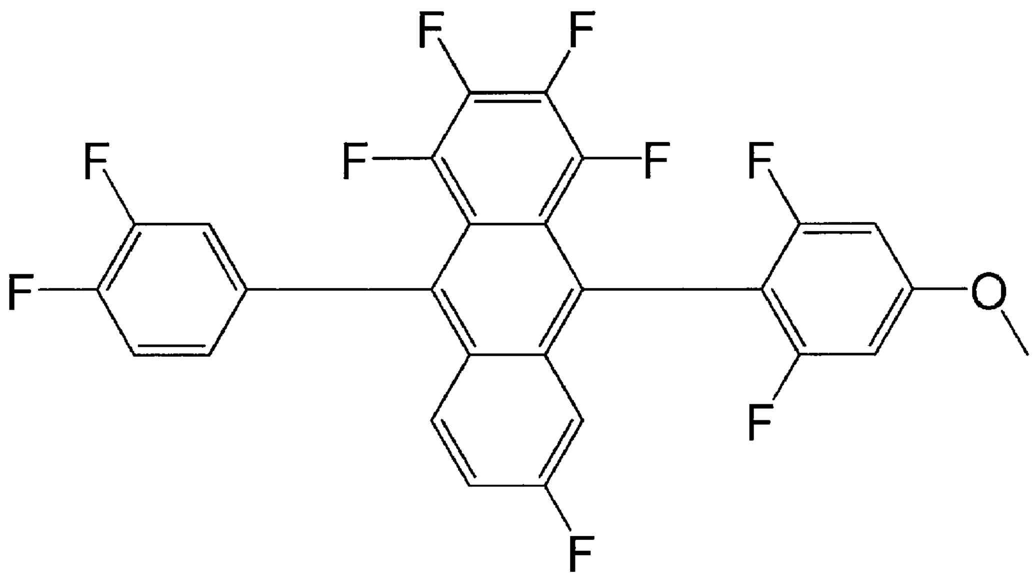
Figure 606:
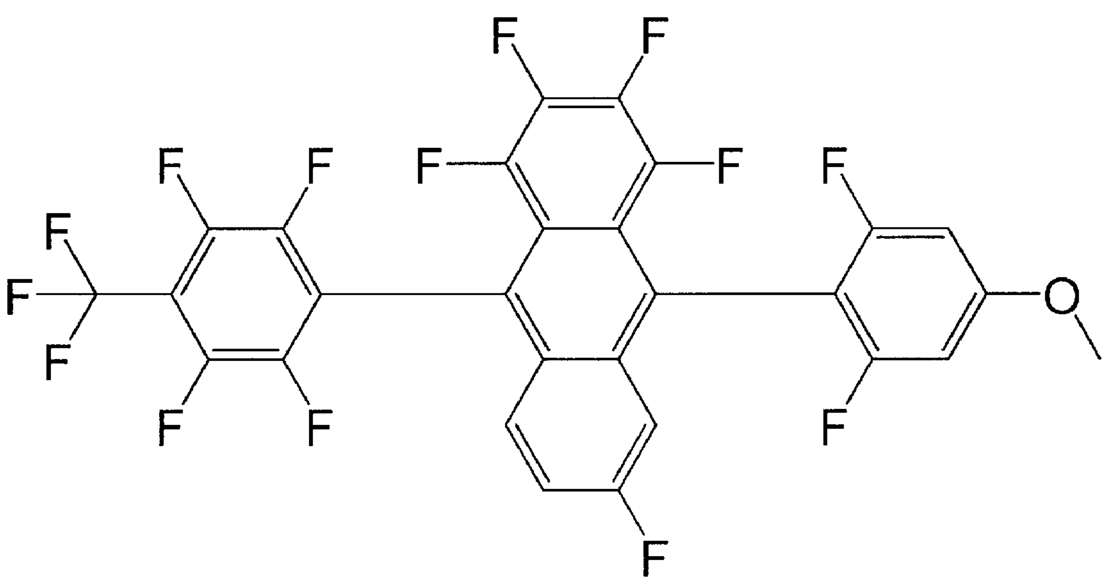
Figure 607:
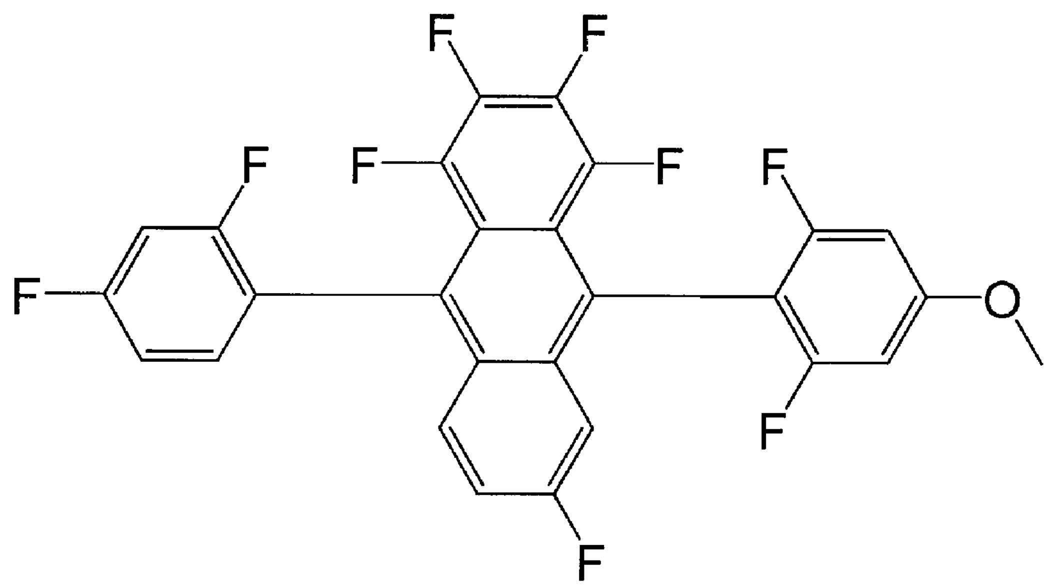
Figure 608:
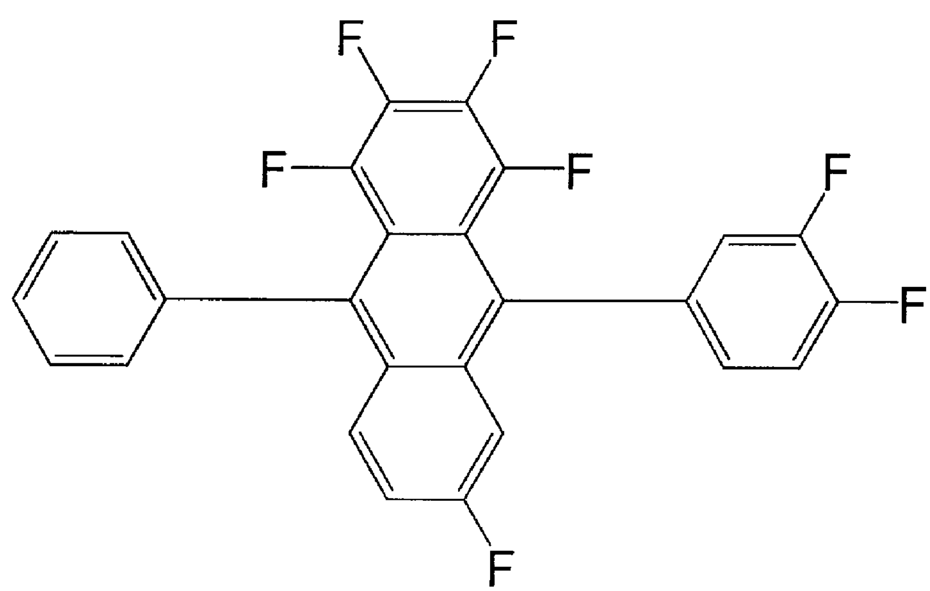
Figure 609:
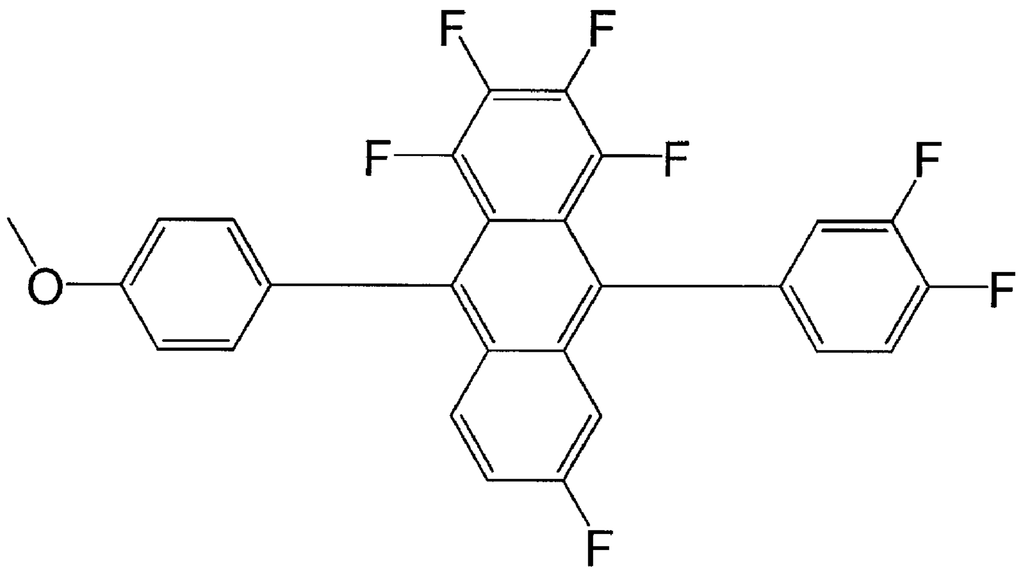
Figure 610:
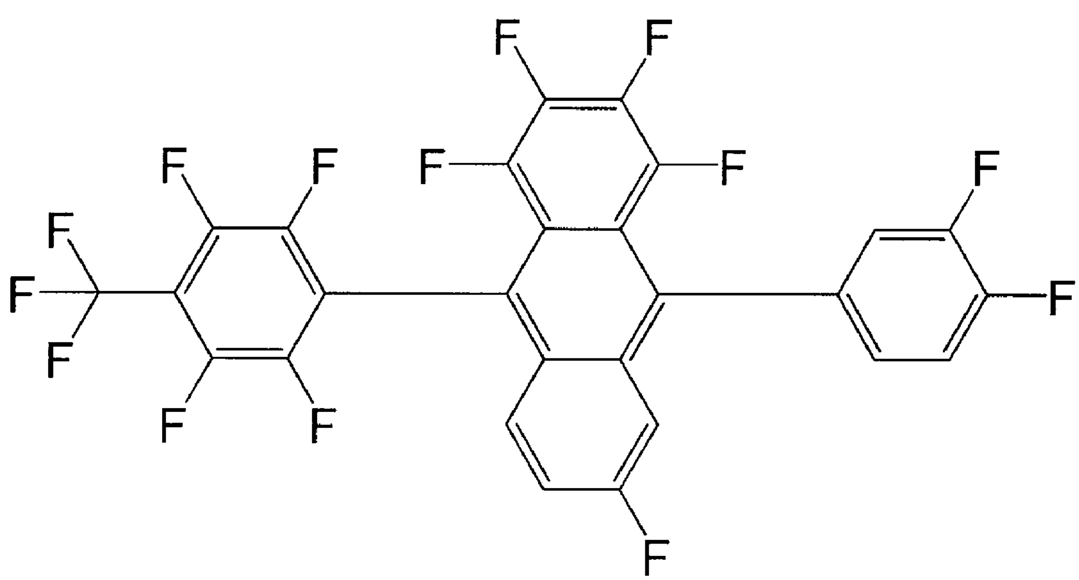
Figure 611:
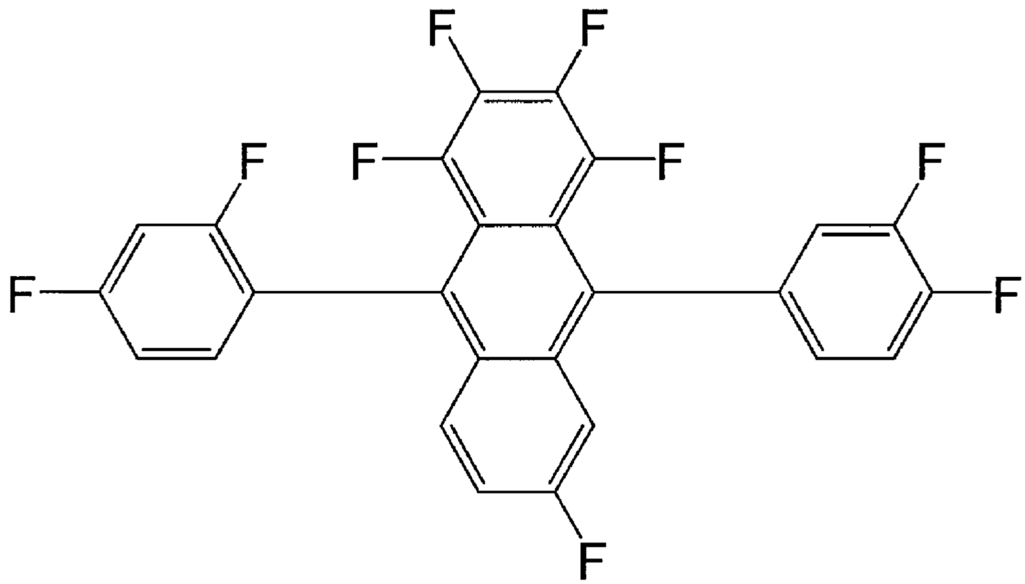
Figure 612:
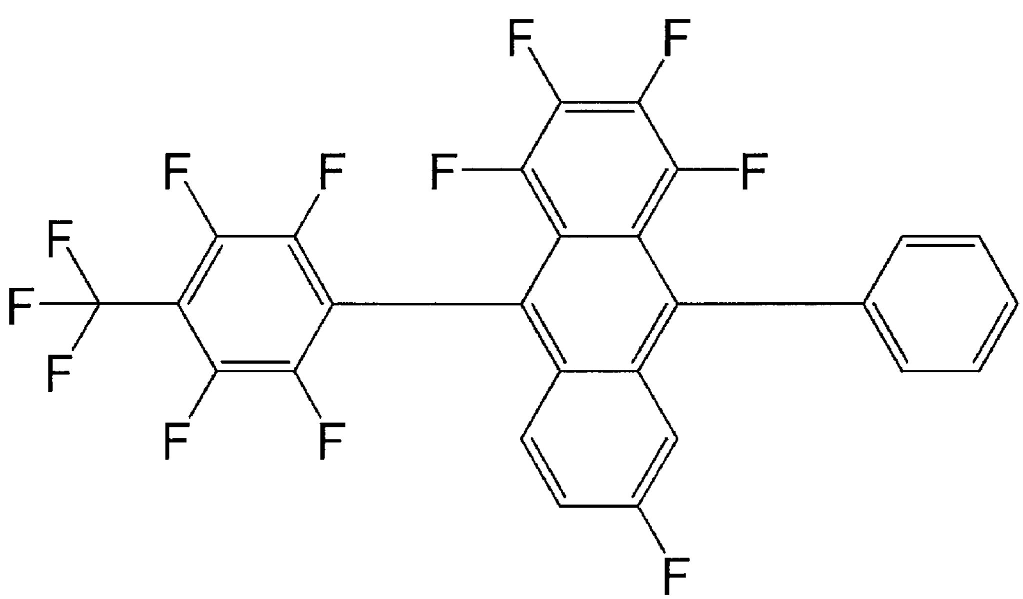
Figure 613:
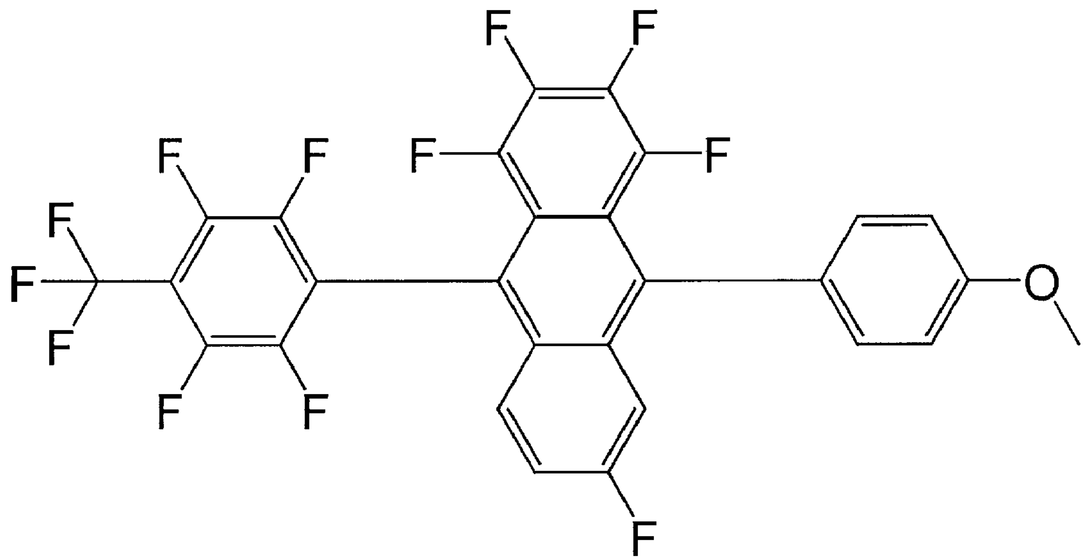
Figure 614:
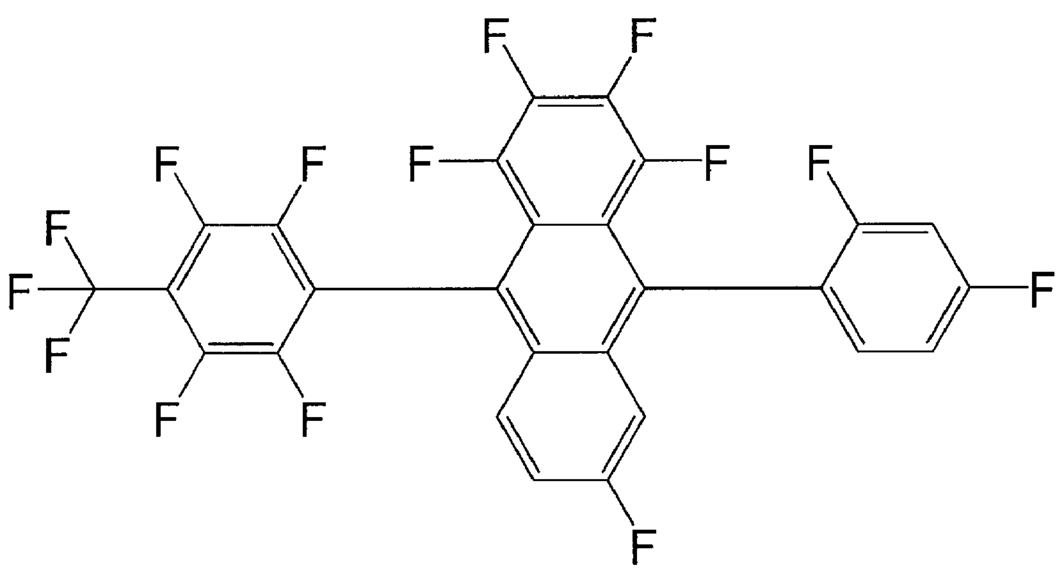
Figure 615:
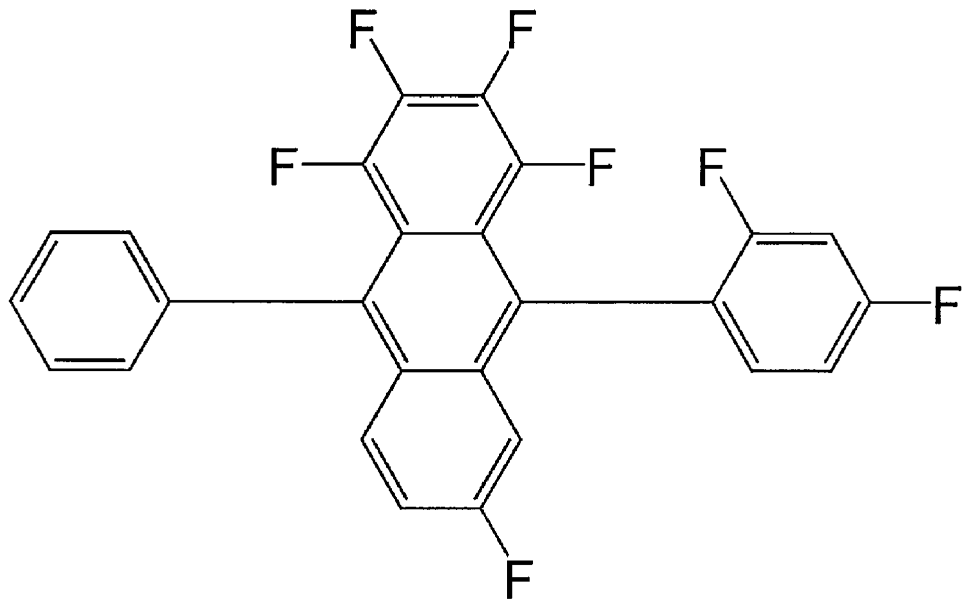
Figure 616:
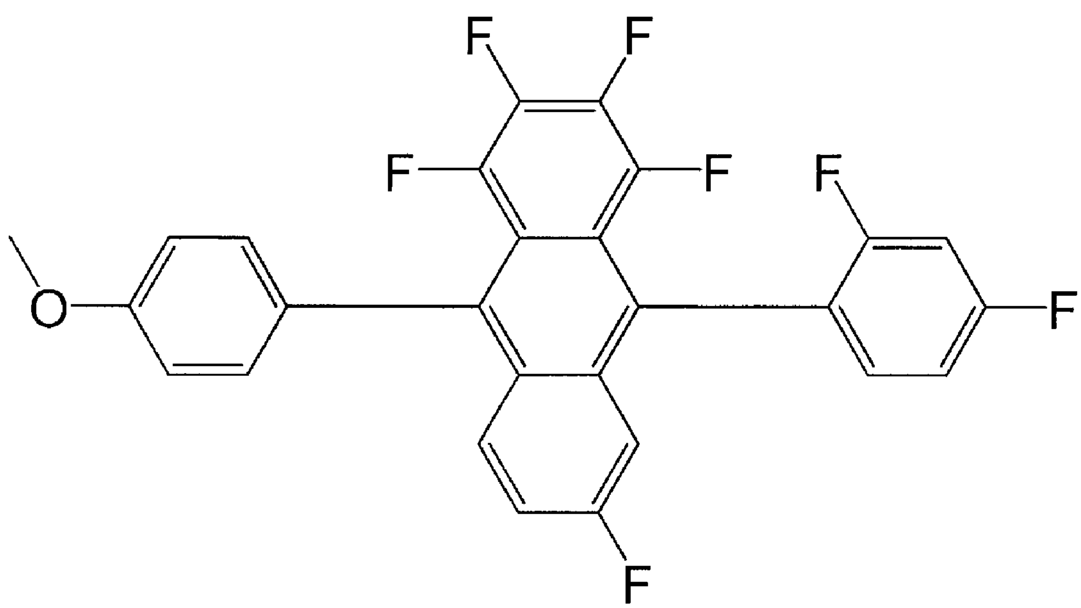
Figure 617:
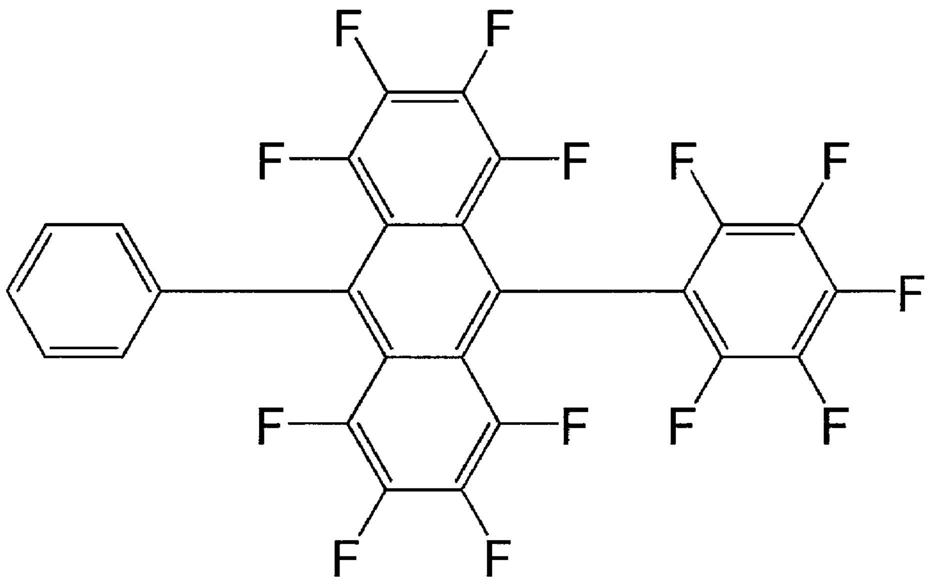
Figure 618:
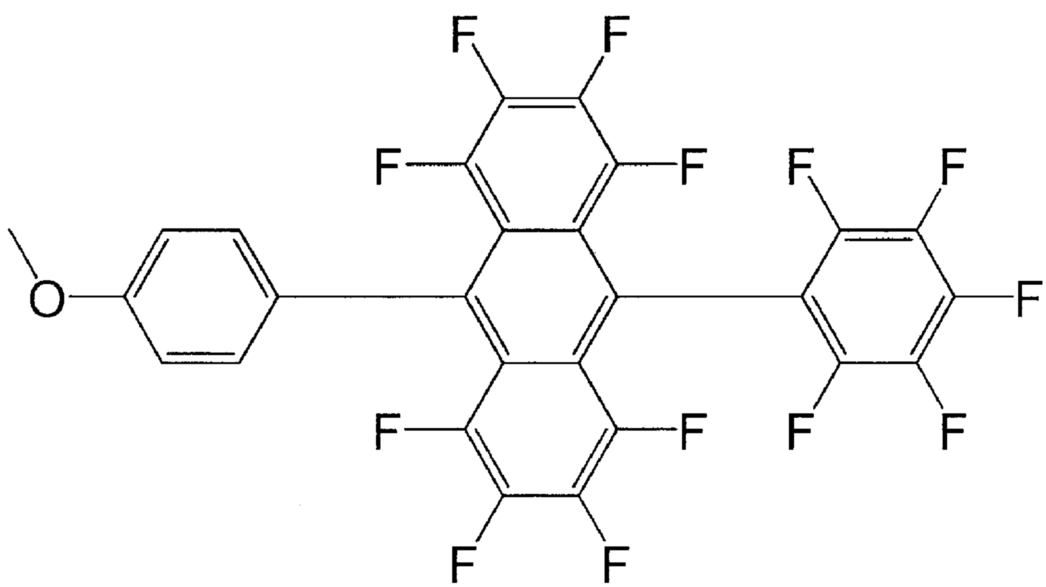
Figure 619:
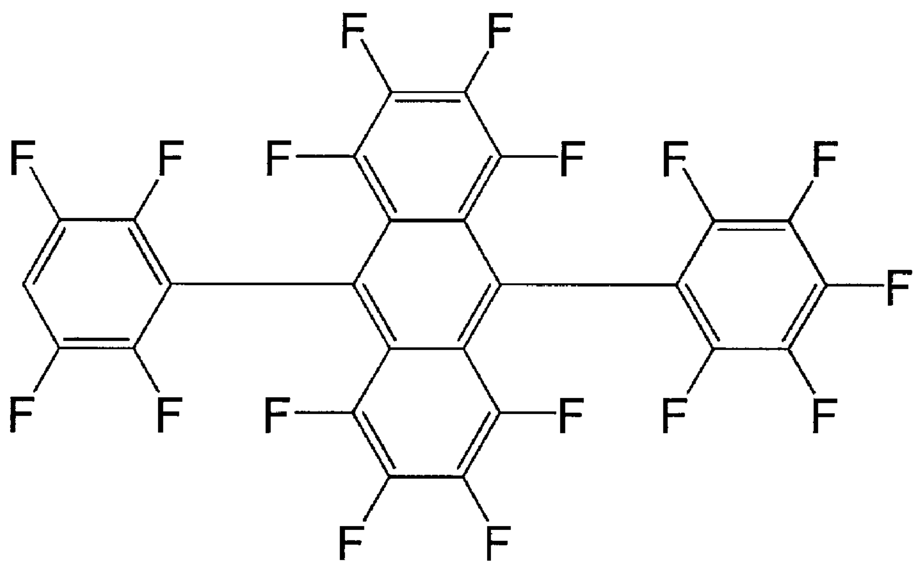
Figure 620:
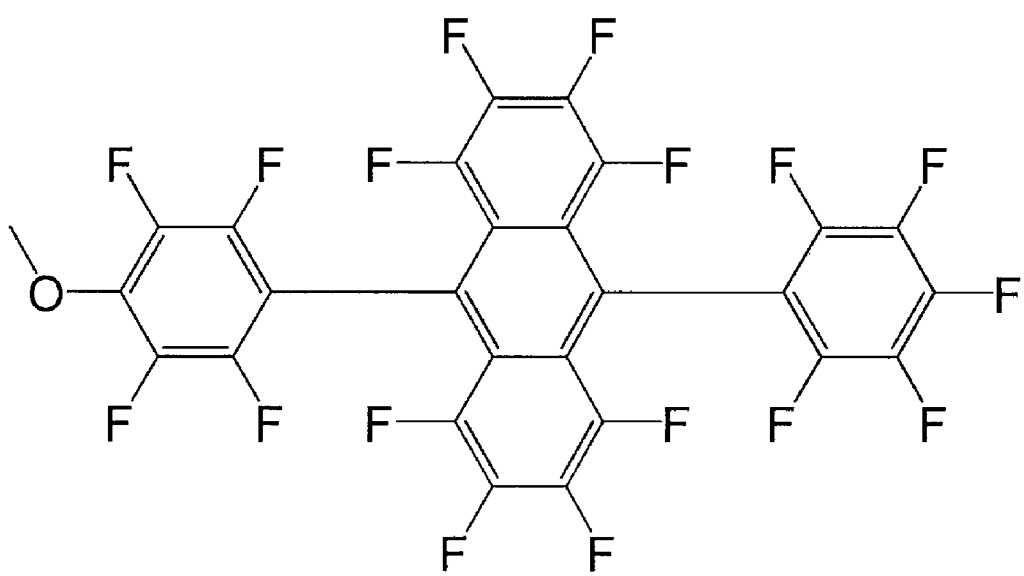
Figure 621:
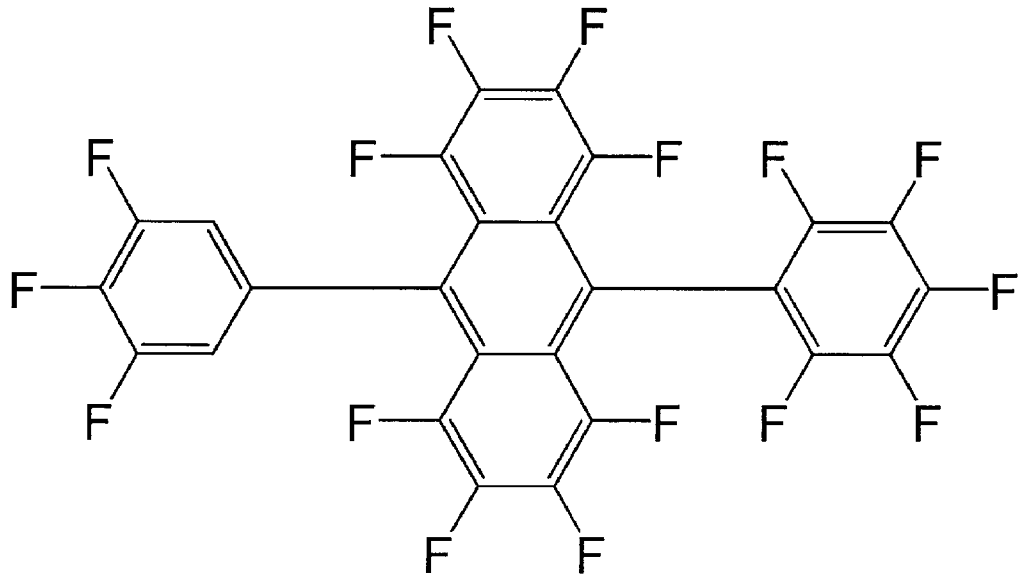
Figure 622:
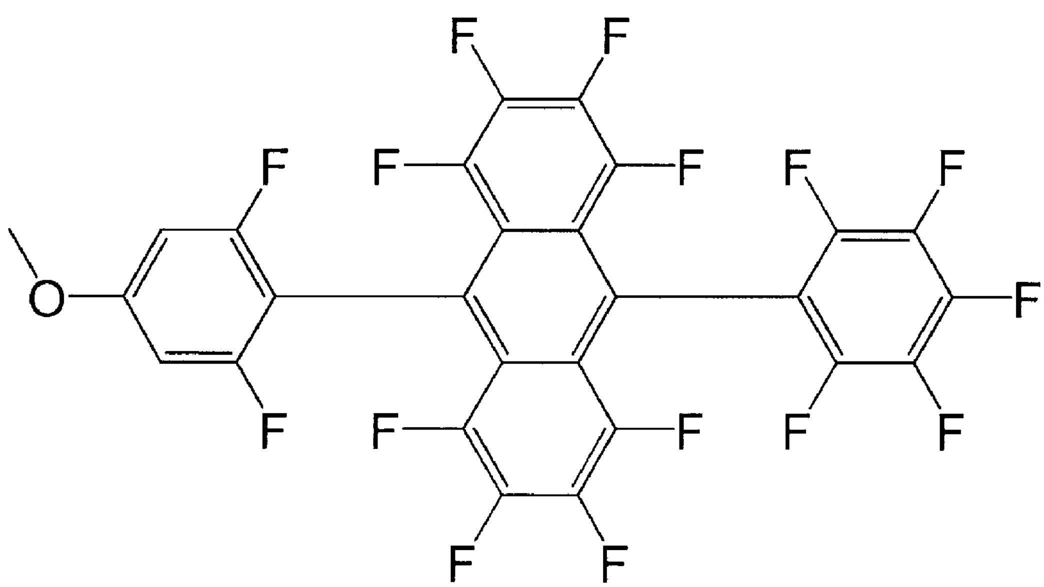
Figure 623:
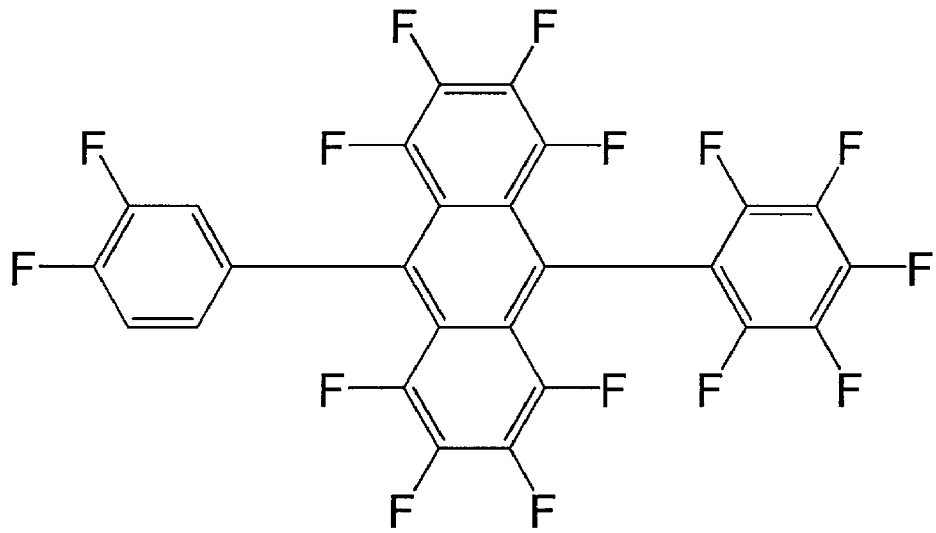
Figure 624:
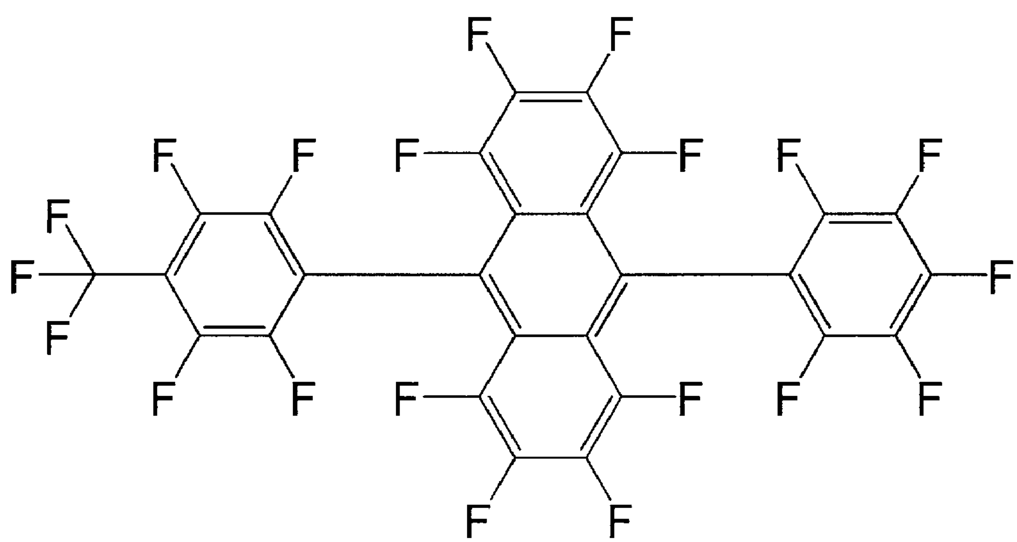
Figure 625:
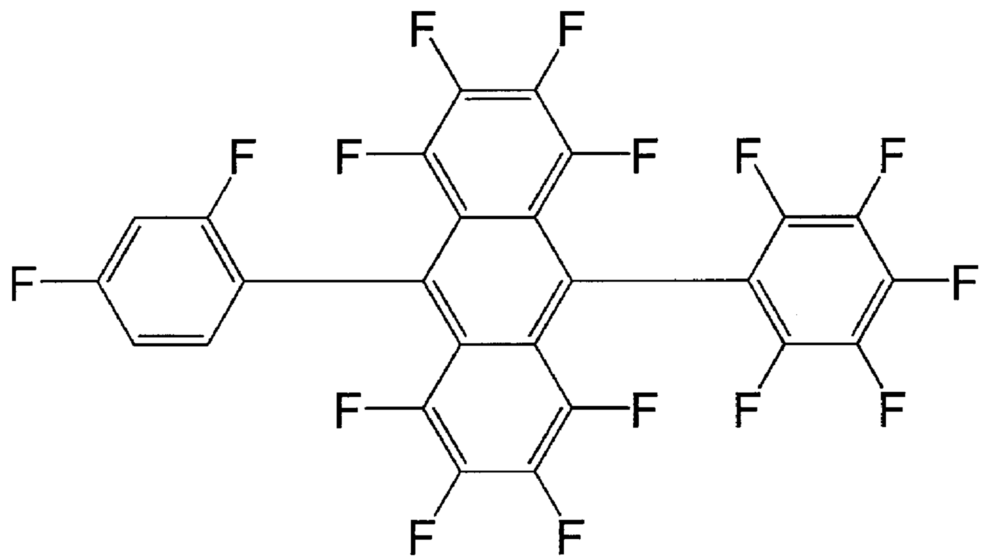
Figure 626:
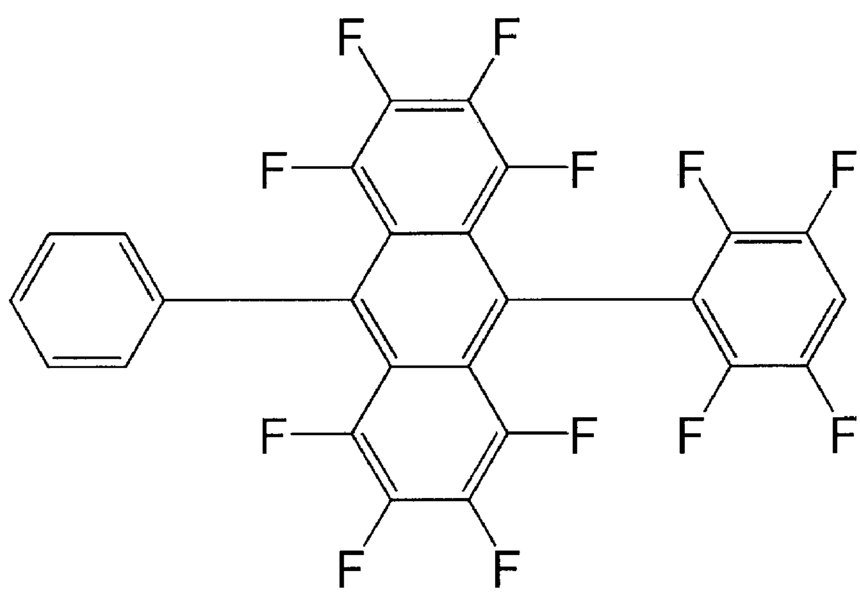
Figure 627:
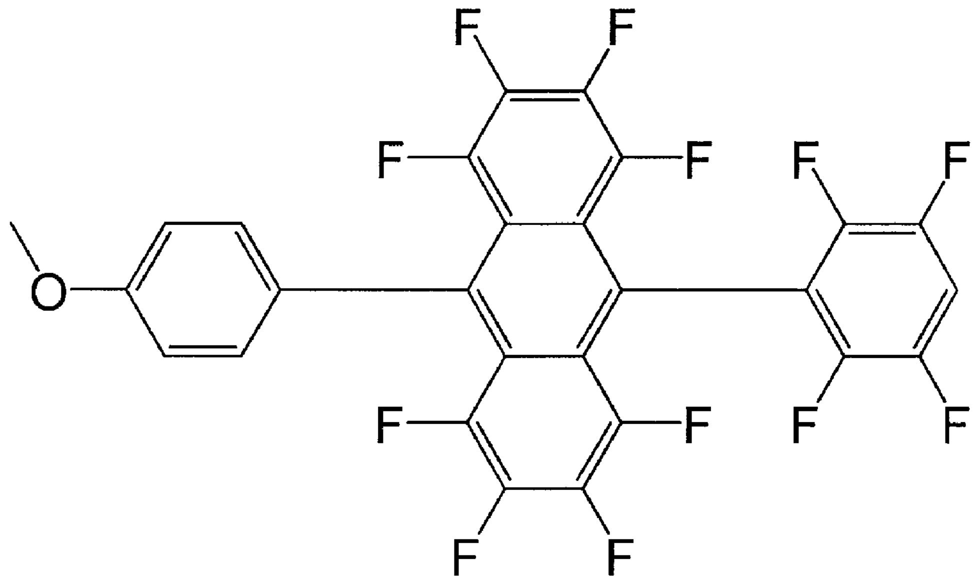
Figure 628:
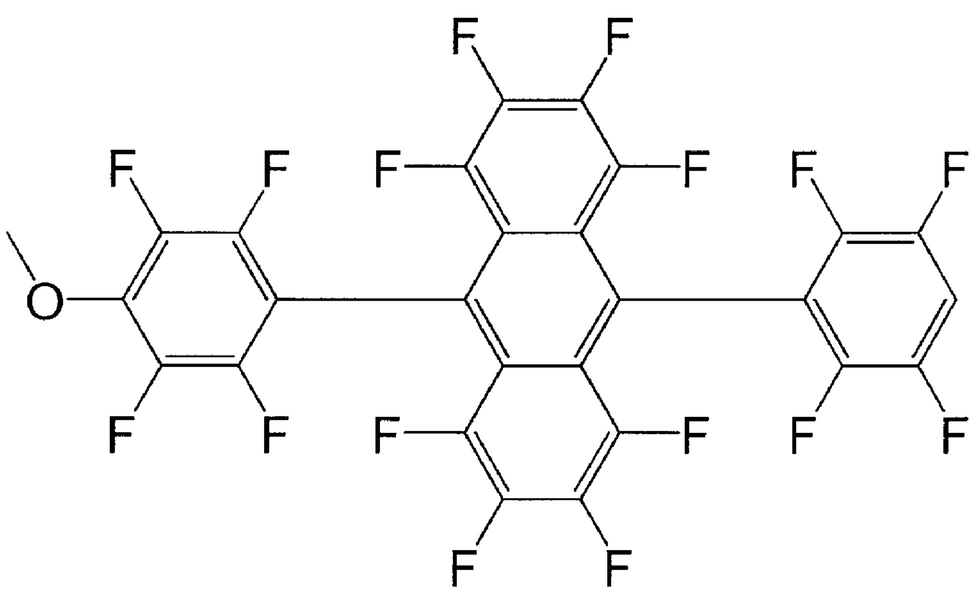
Figure 629:
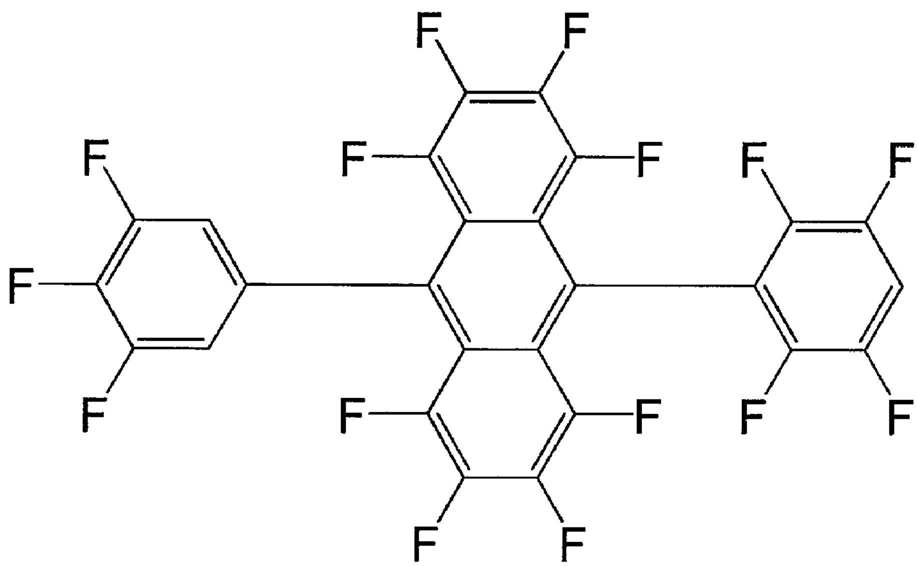
Figure 630:
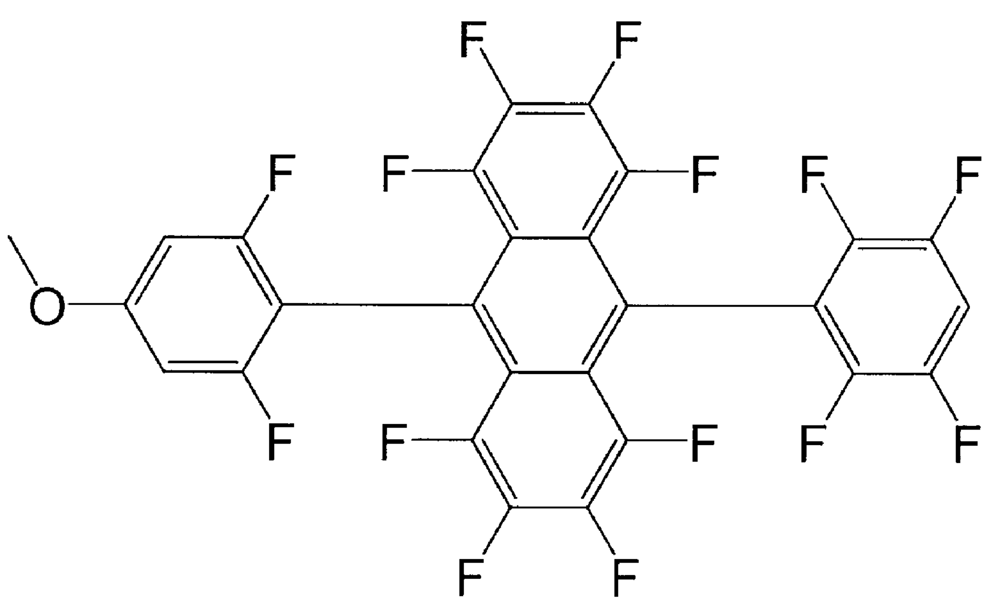
Figure 631:
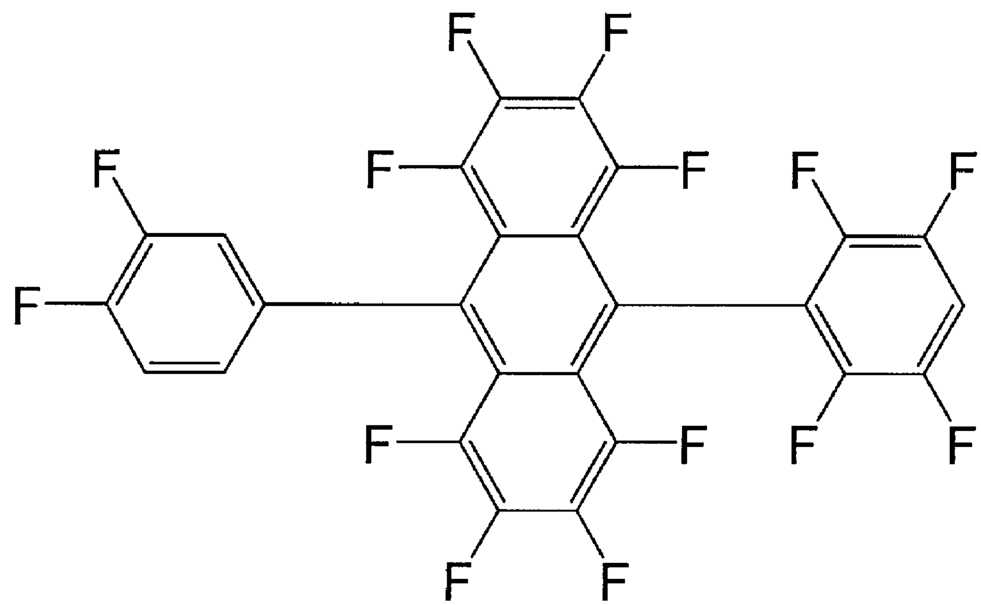
Figure 632:
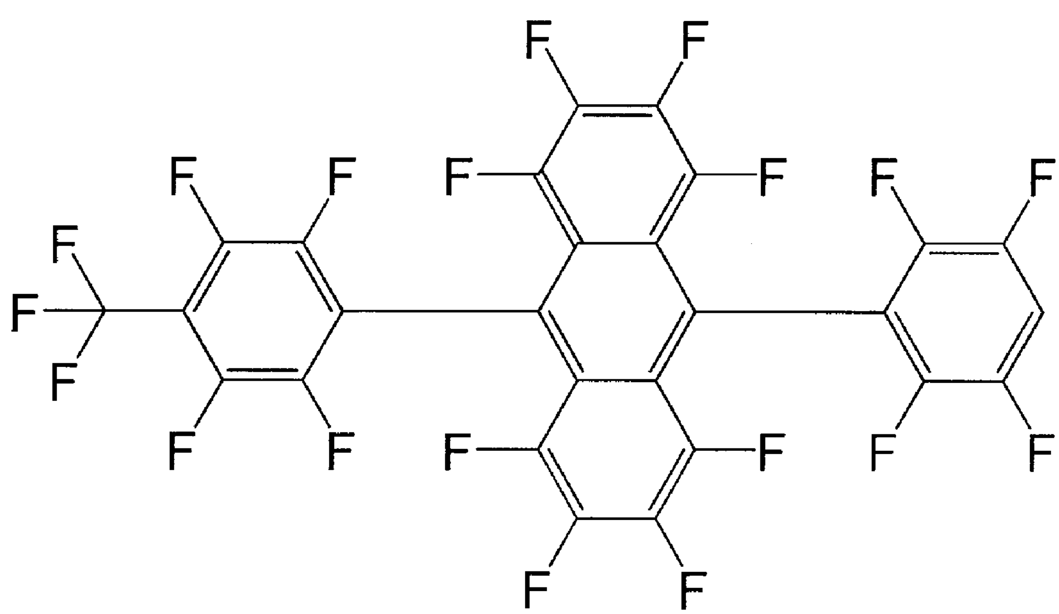
Figure 633:
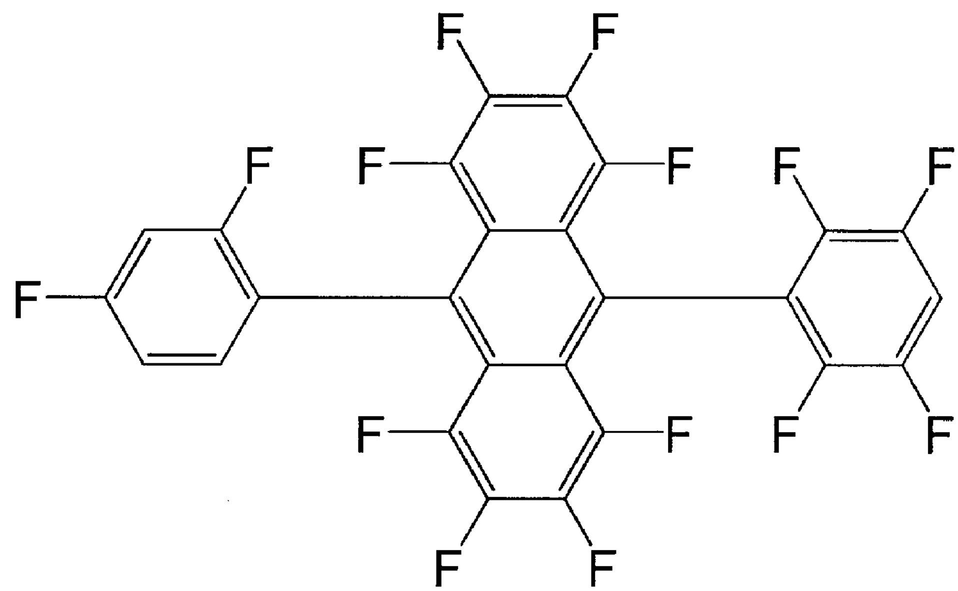
Figure 634:
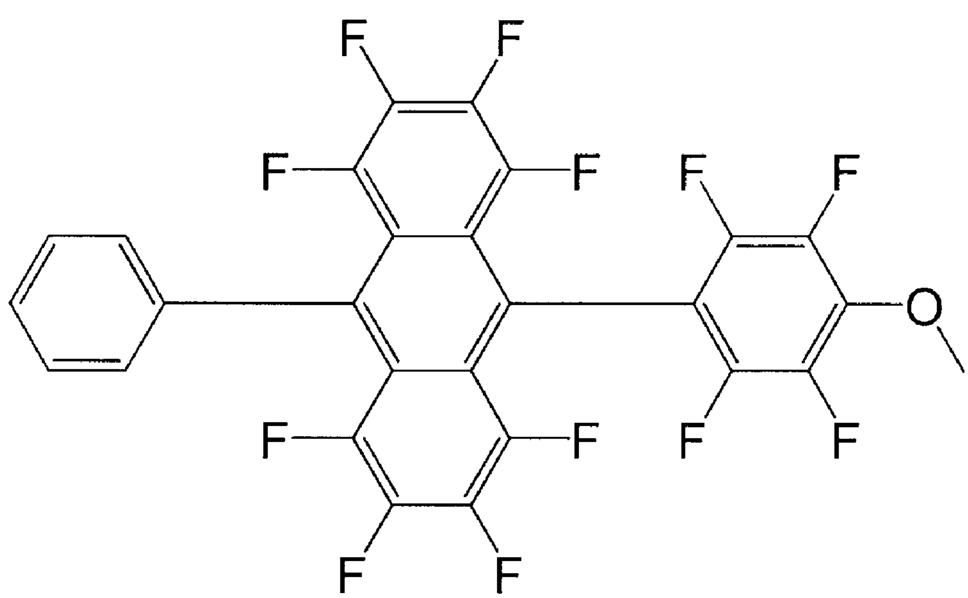
Figure 635:
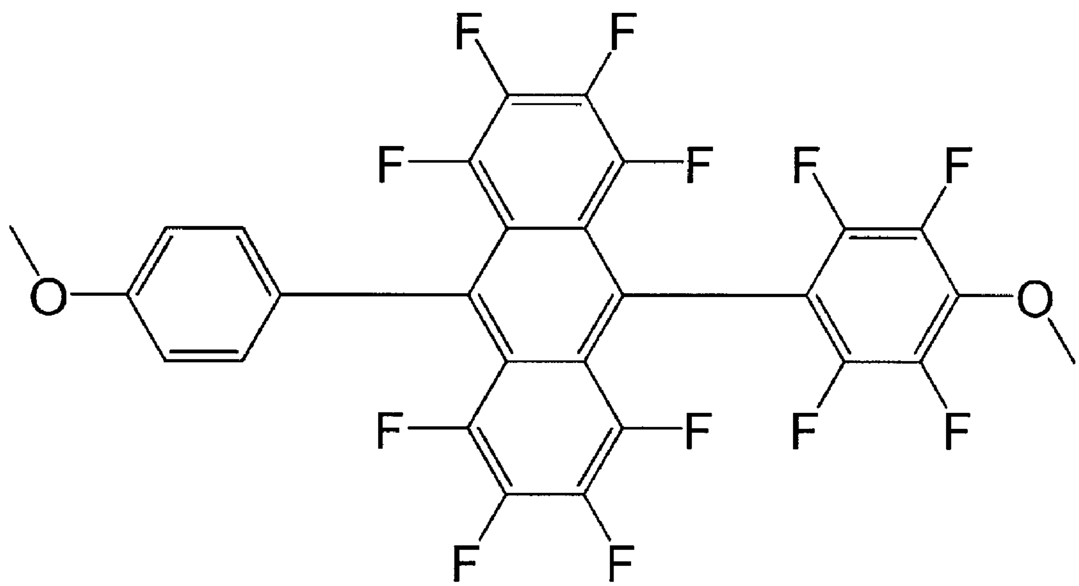
Figure 636:
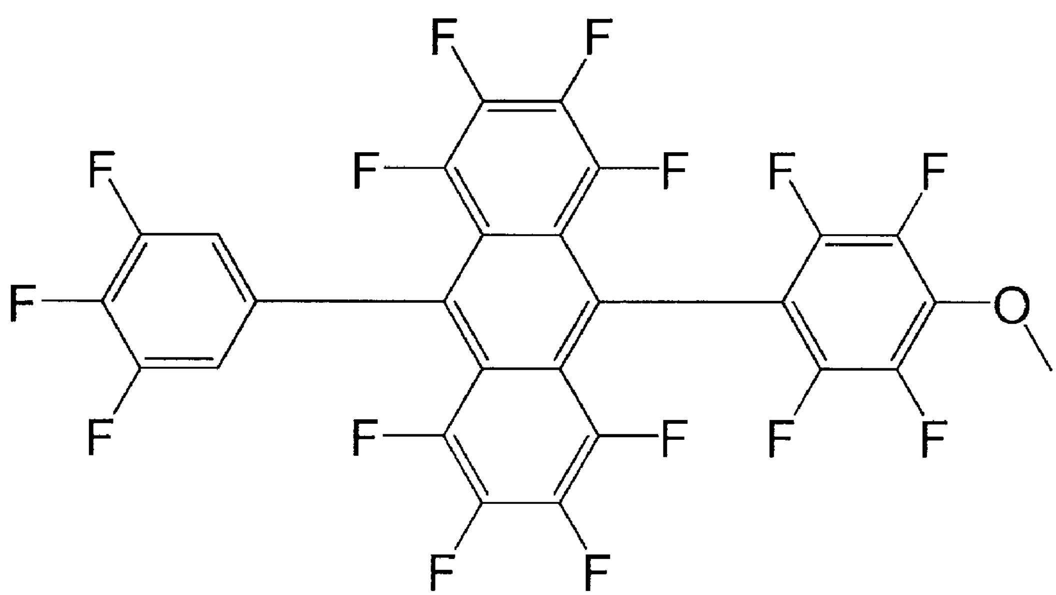
Figure 637:
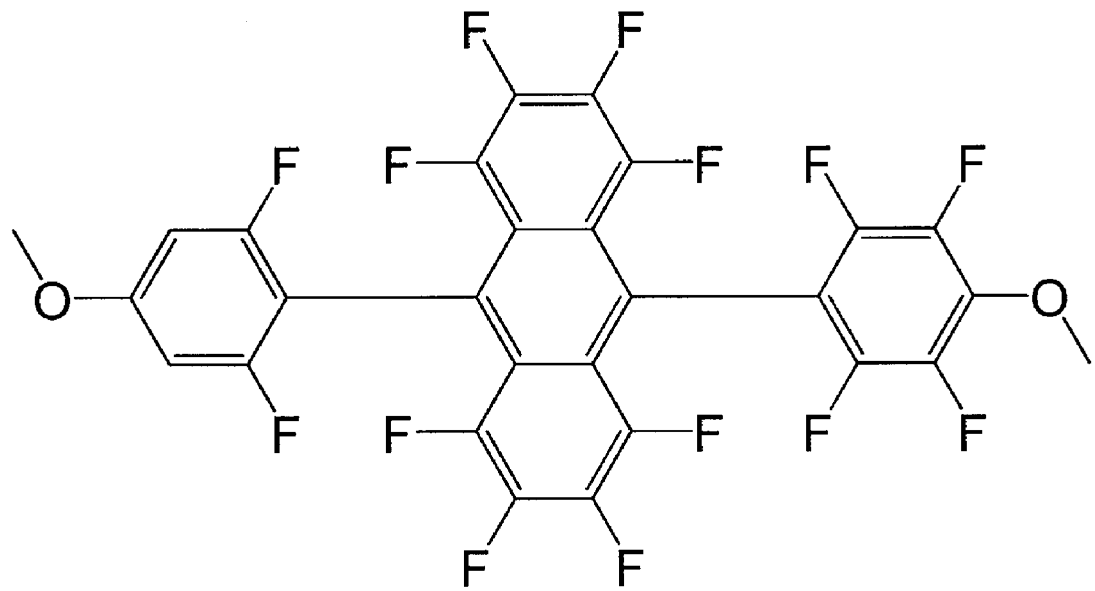
Figure 638:
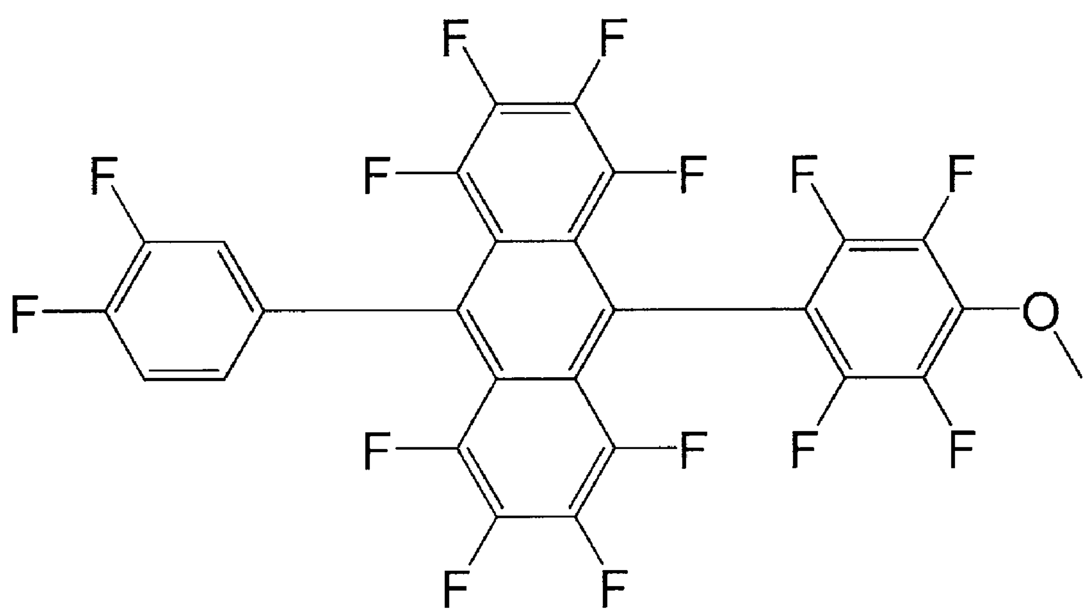
Figure 639:
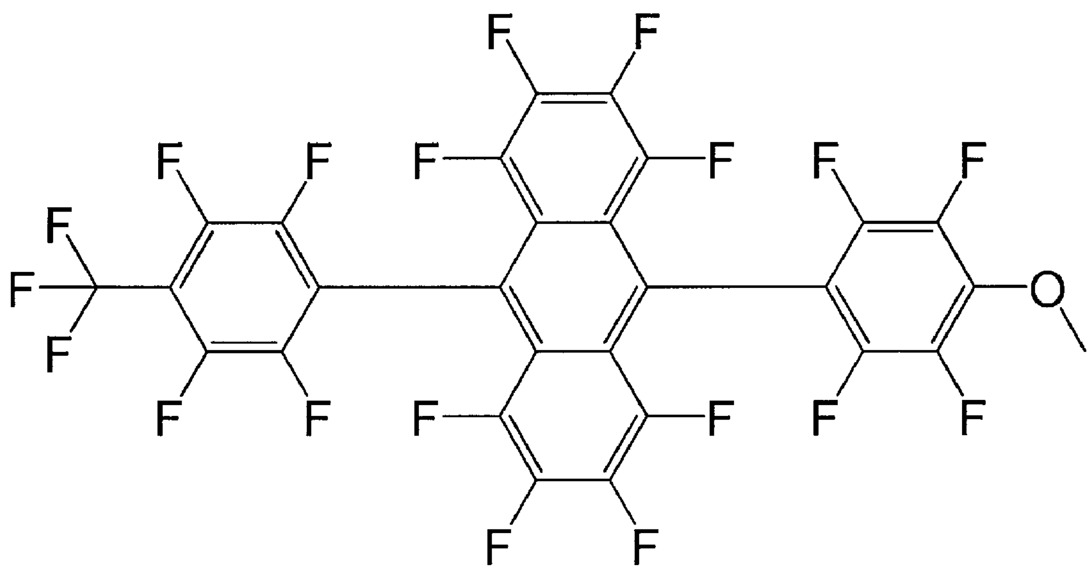
Figure 640:
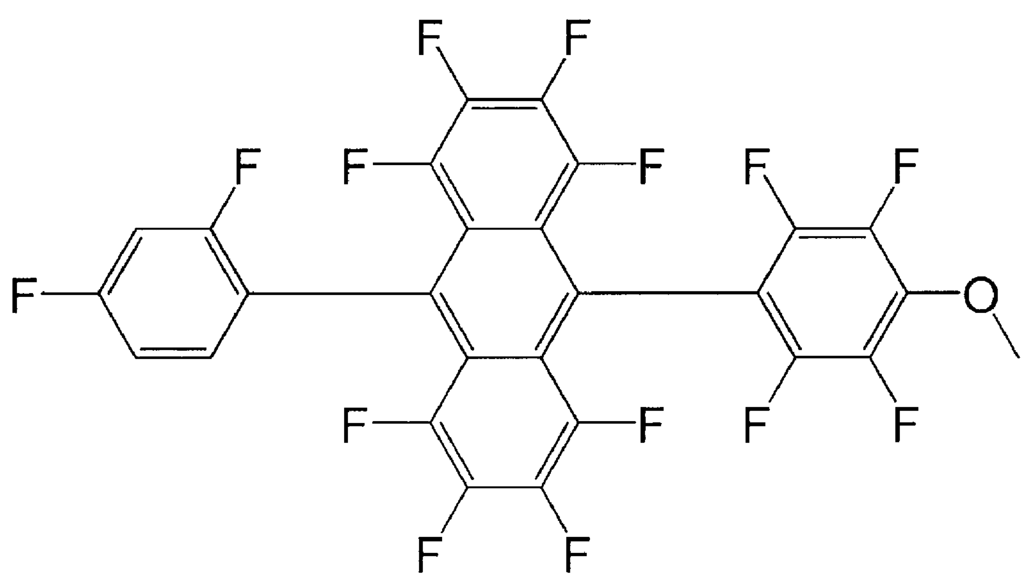
Figure 641:
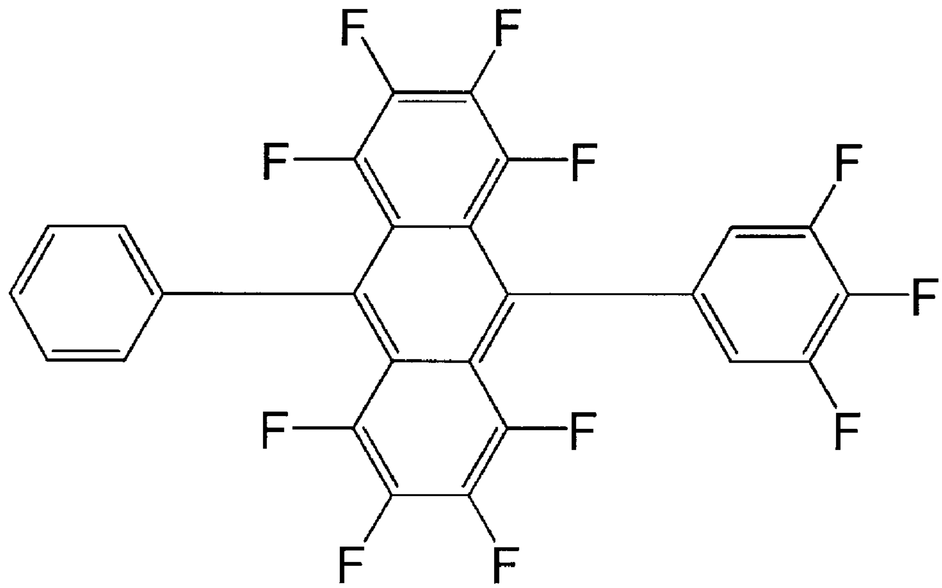
Figure 642:
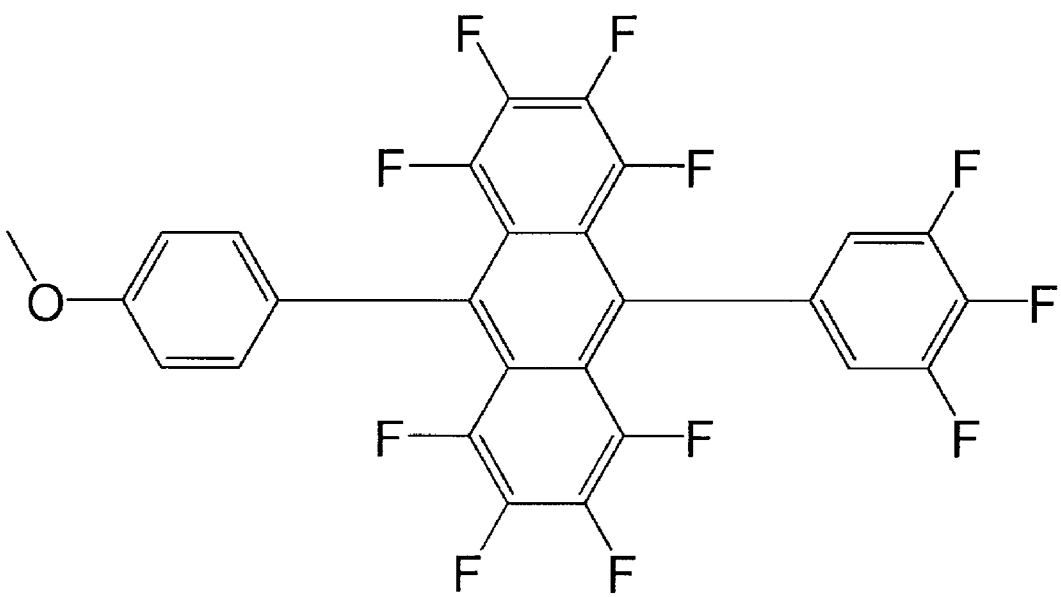
Figure 643:
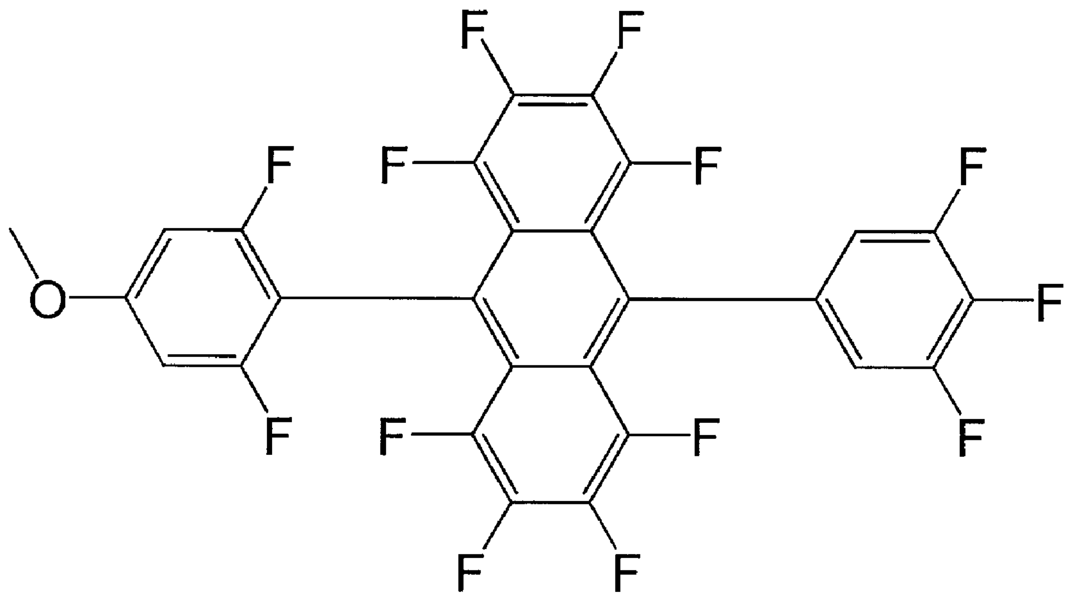
Figure 644:
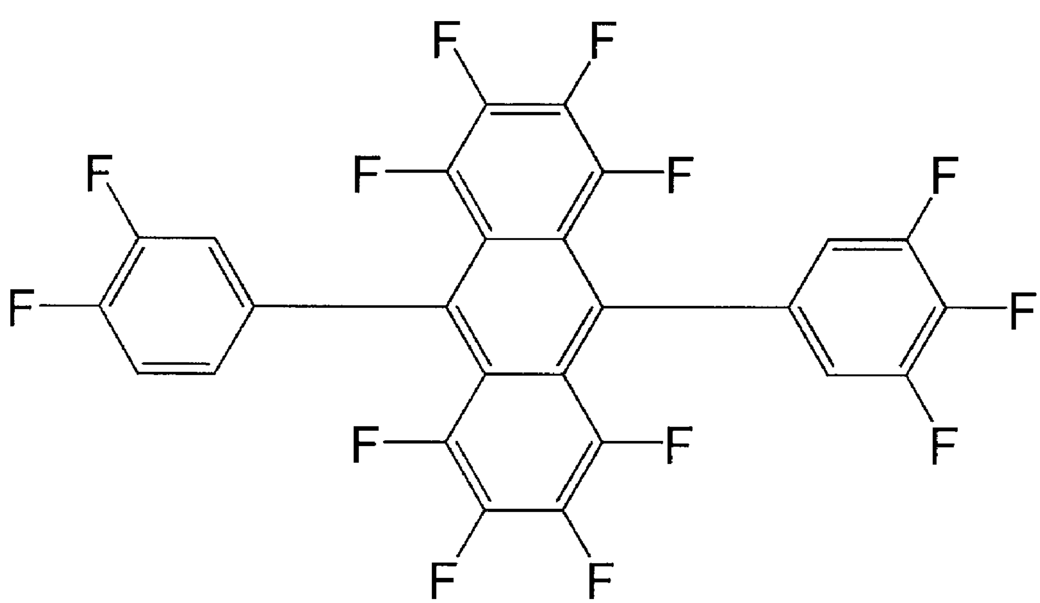
Figure 645:
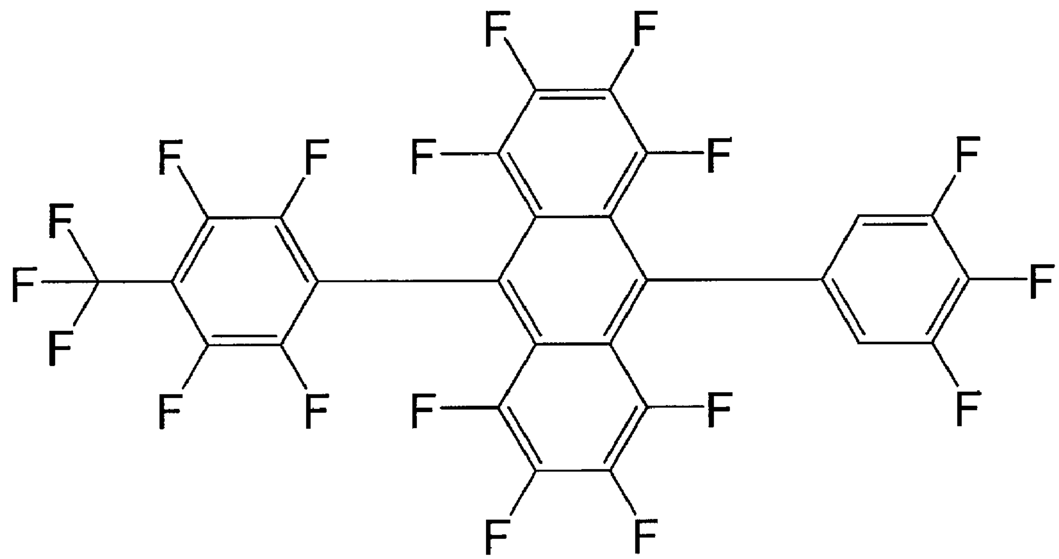
Figure 646:
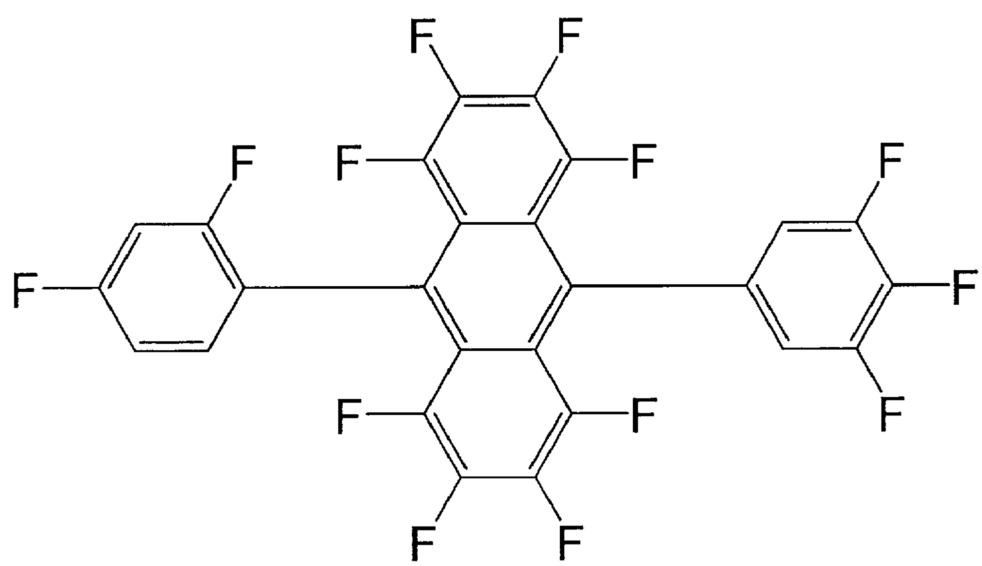
Figure 647:
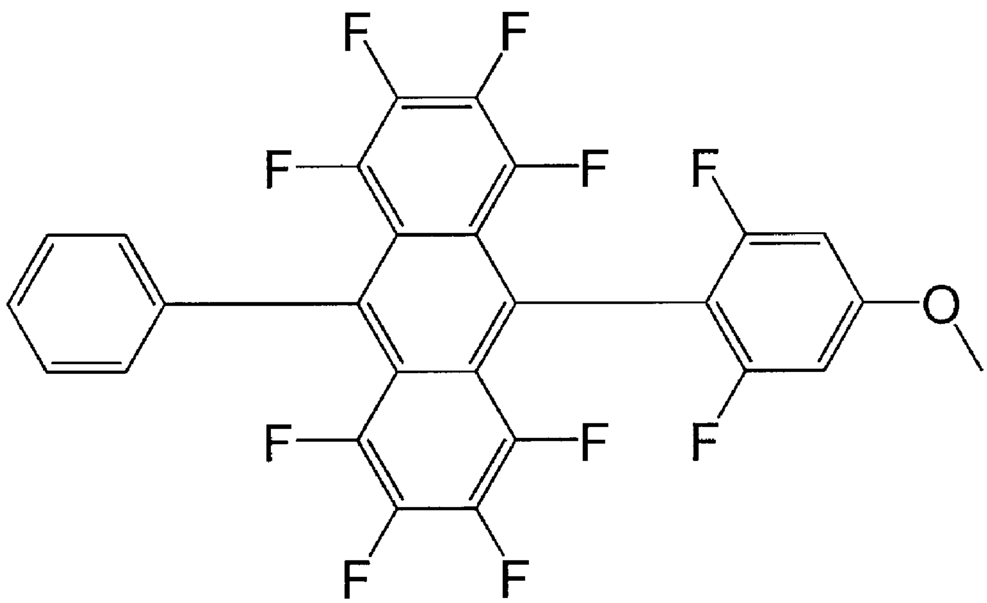
Figure 648:
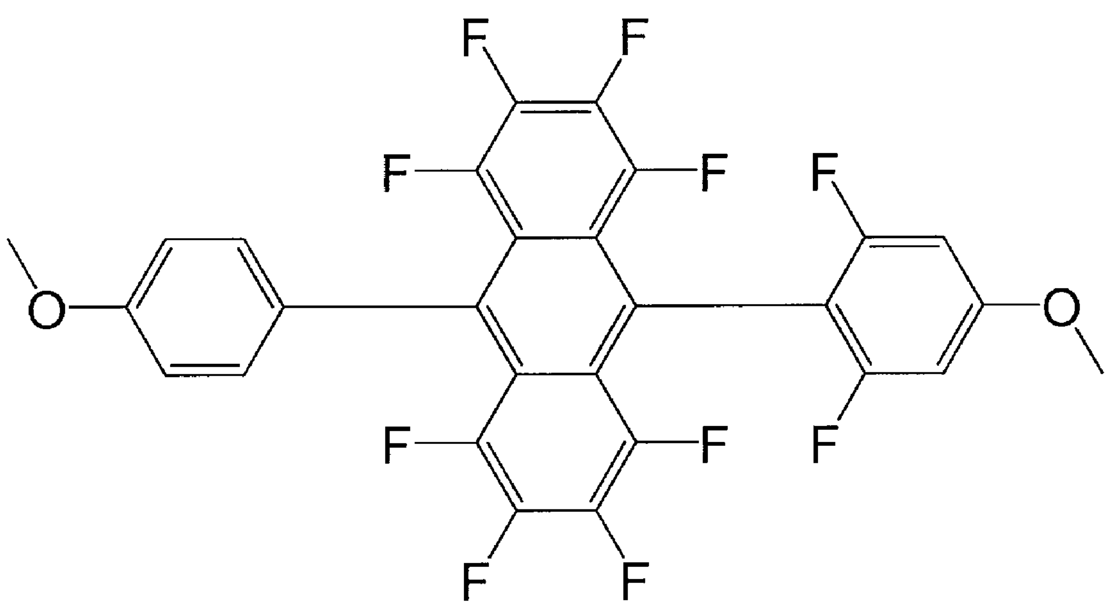
Figure 649:
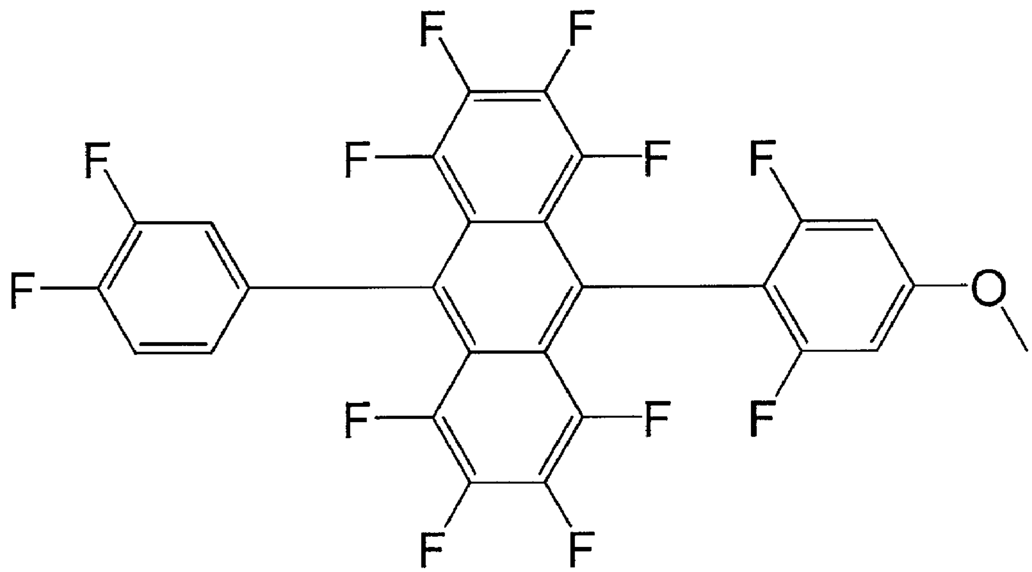
Figure 650:
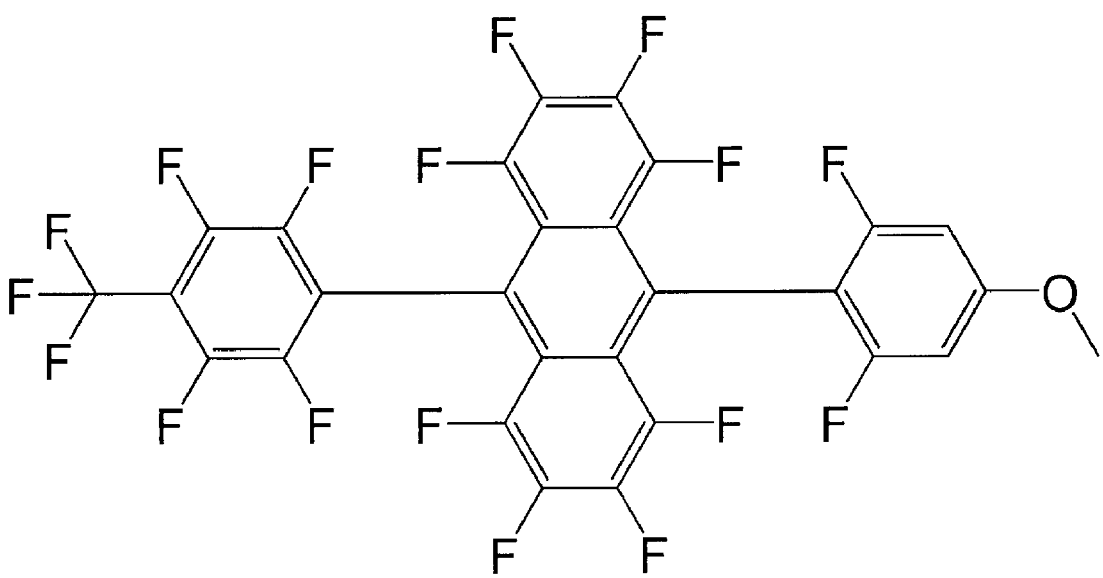
Figure 651:
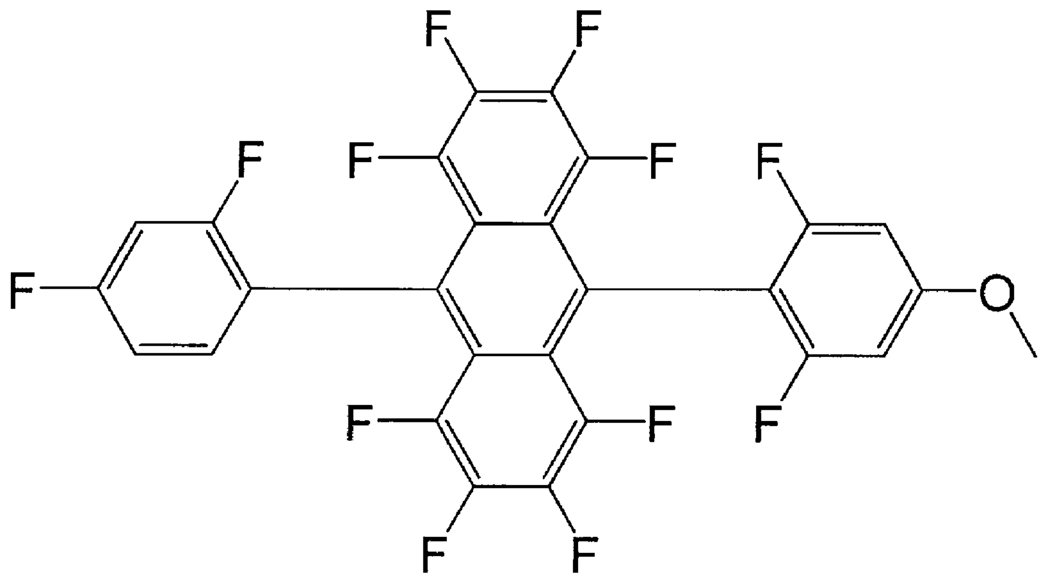
Figure 652:
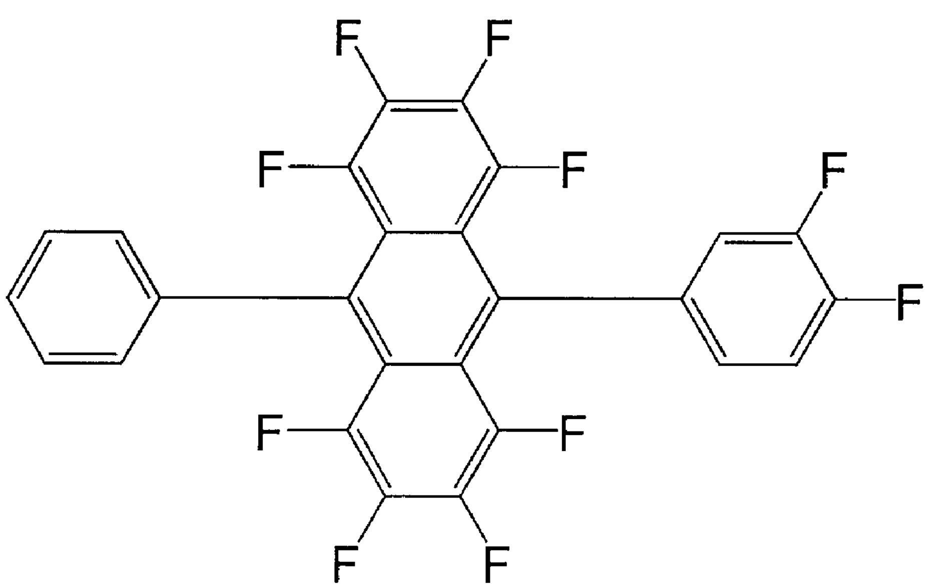
Figure 653:
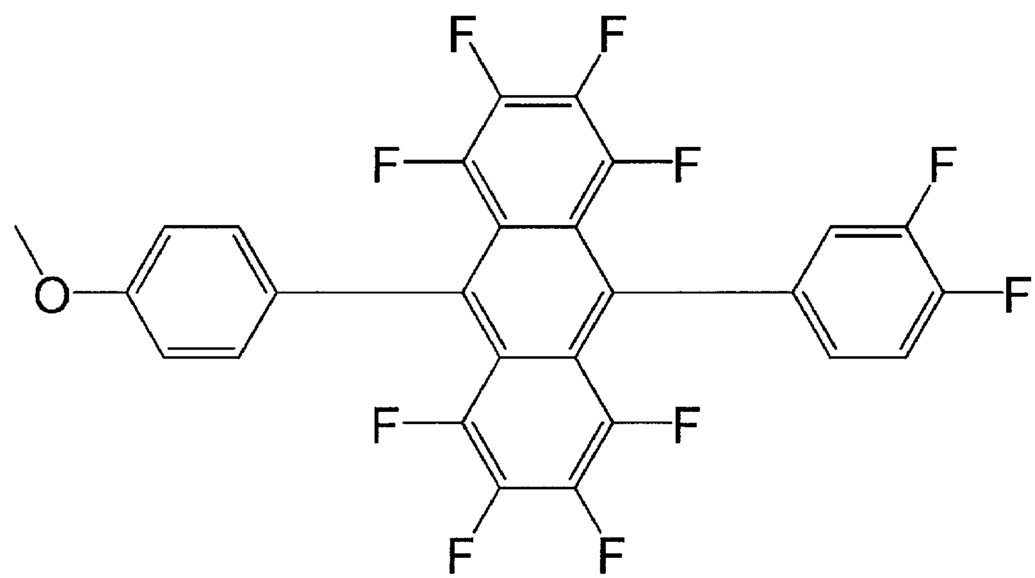
Figure 654:
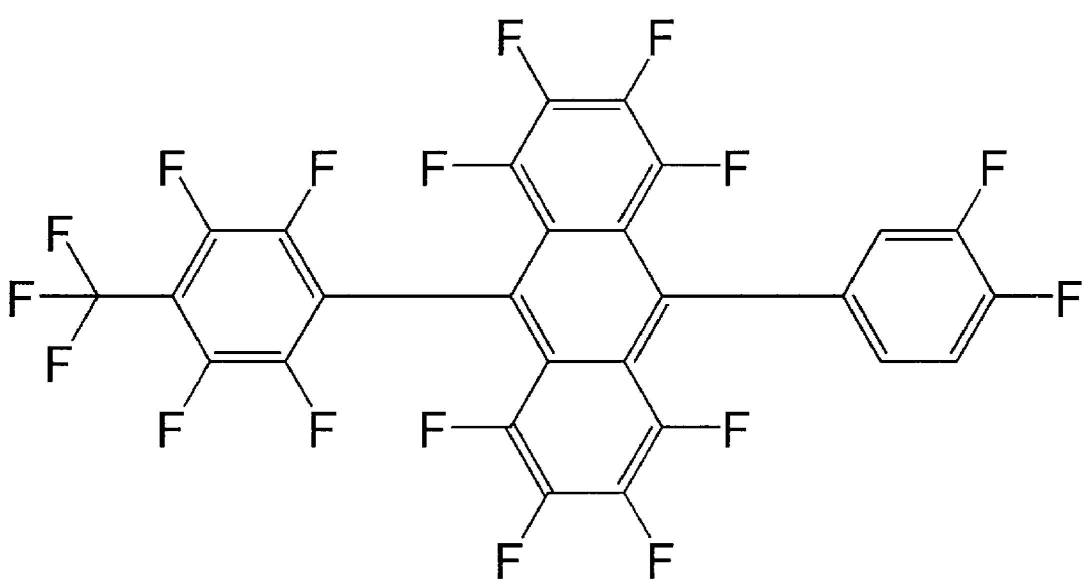
Figure 655:
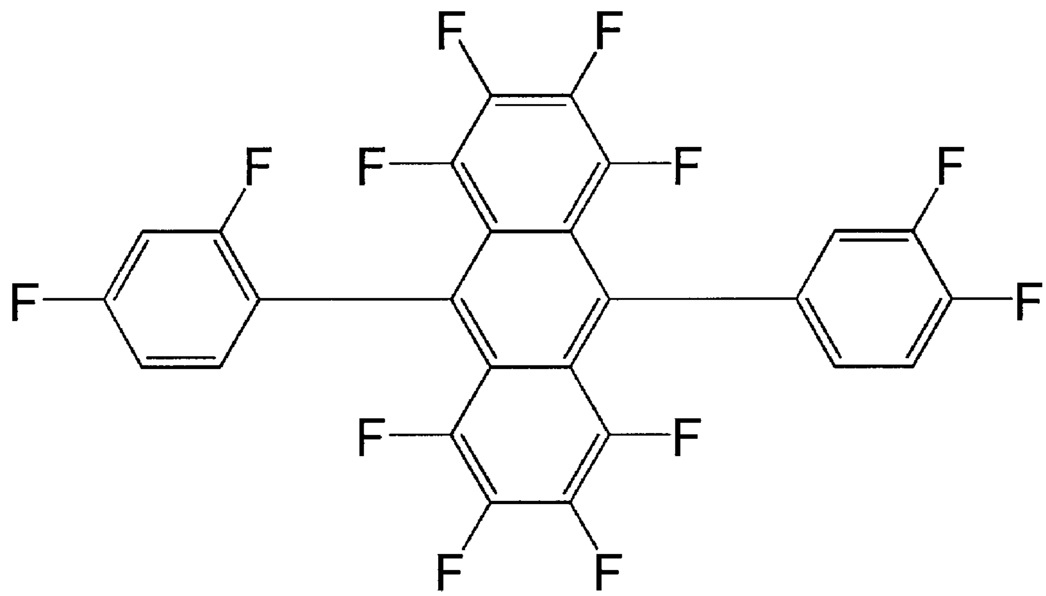
Figure 656:
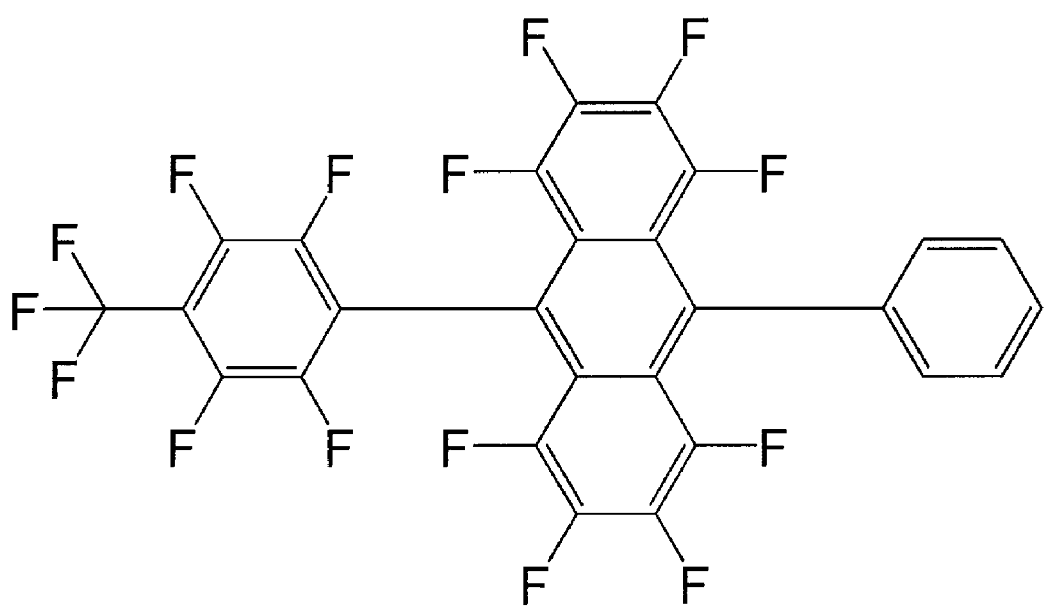
Figure 657:
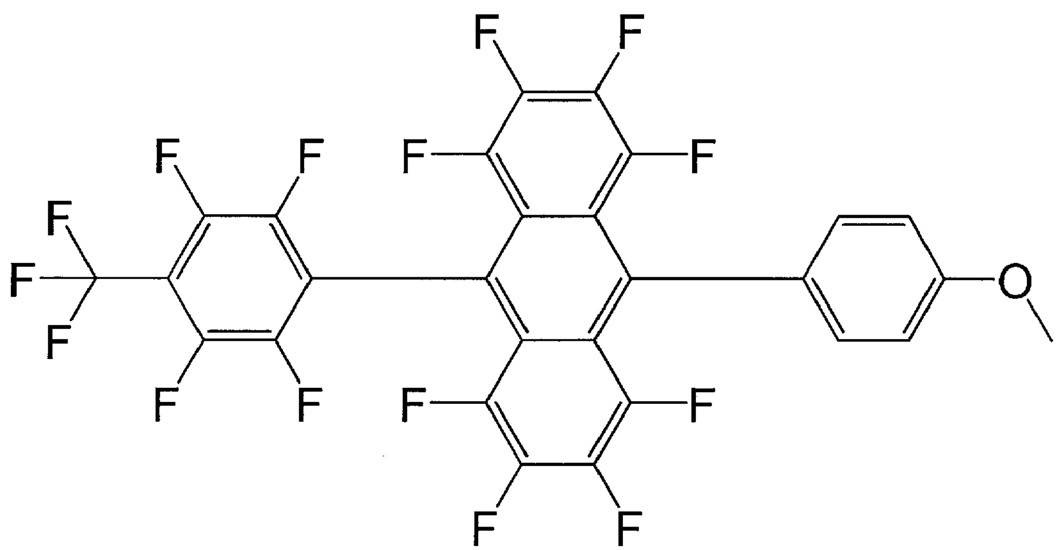
Figure 658:
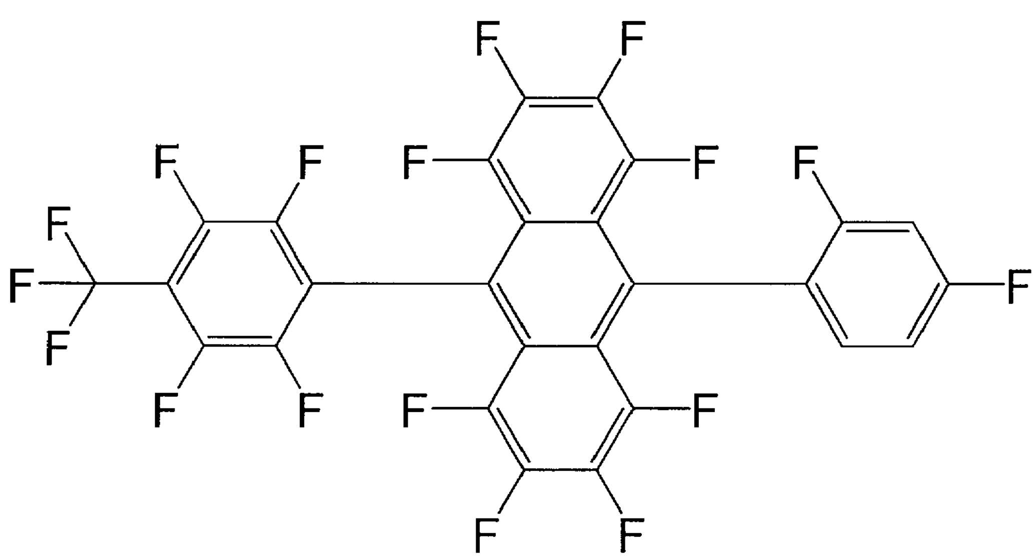
Figure 659:
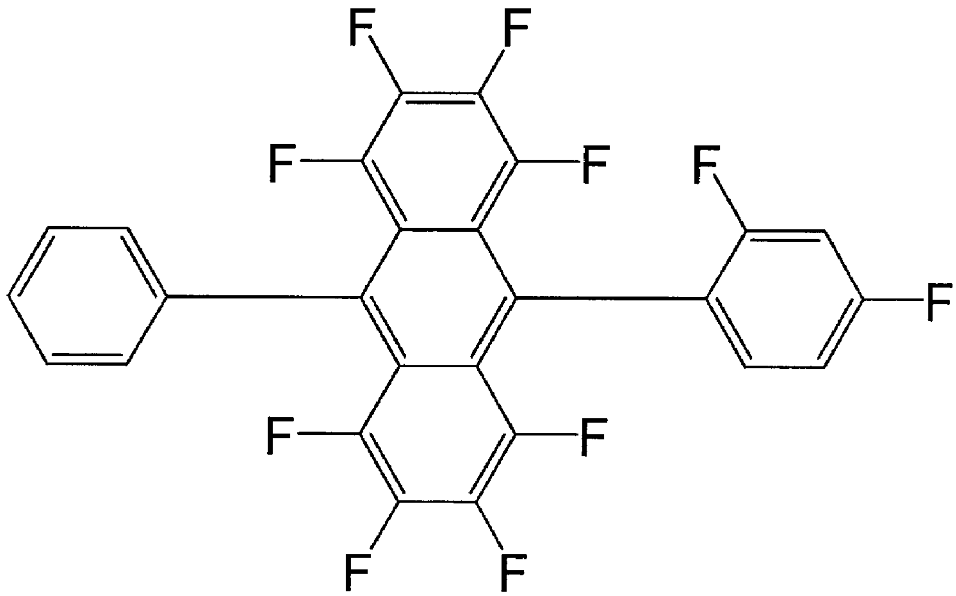
Figure 660:
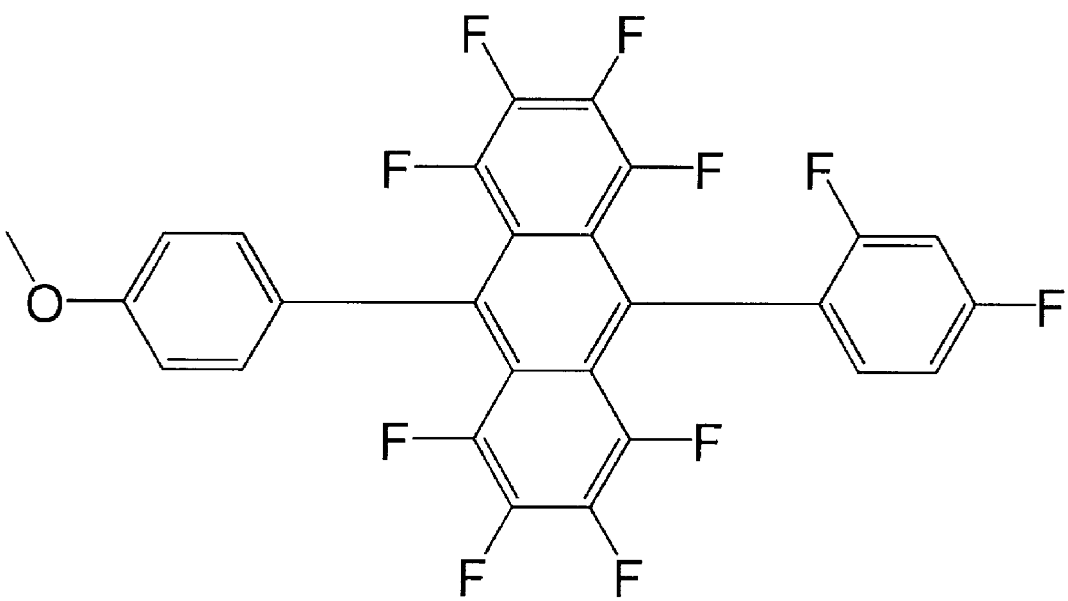
Figure 661:
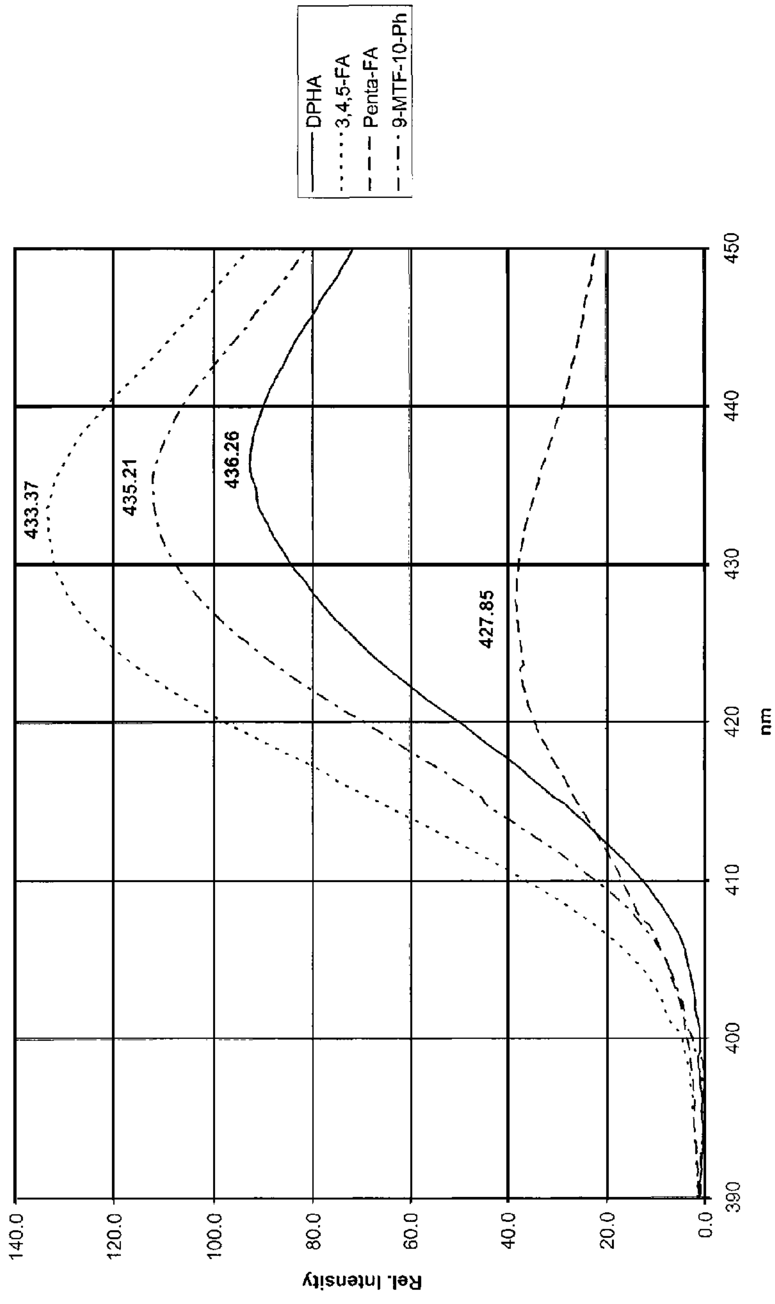

FIG. 136 illustrates a 1-fluoro-9-(2,3,4,5,6-pentafluorophenyl)-10-(2,3,5,6-tetrafluoro-4-methoxyphenyl)anthracene;

FIG. 137 illustrates a 1-fluoro-9-(2,3,4,5,6-pentafluorophenyl)-10-(3,4,5-trifluoro)anthracene;

FIG. 138 illustrates a 9-(2,6-difluoro-4-methoxyphenyl)-1-fluoro-10-(2,3,4,5,6-pentafluorophenyl)anthracene FIG. 139 illustrates a 9-(3,4-difluorophenyl)-1-fluoro-10-(2,3,4,5,6-pentafluorophenyl)anthracene;

FIG. 140 illustrates a 1-fluoro-9-(2,3,4,5,6-pentafluorophenyl)-10-[2,3,5,6-tetrafluoro-4-(trifluoromethyl)phenyl]anthracene;

FIG. 141 illustrates a 9-(2,4-difluorophenyl)-1-fluoro-10-(2,3,4,5,6-pentafluorophenyl)anthracene;

FIG. 142 illustrates a 1-fluoro-9-phenyl-10-(2,3,5,6-tetrafluorophenyl)anthracene;

FIG. 143 illustrates a 1-fluoro-9-(4-methoxyphenyl)-10-(2,3,5,6-tetrafluorophenyl)anthracene;

FIG. 144 illustrates a 1-fluoro-9-(2,3,5,6-tetrafluorophenyl)-10-(2,3,5,6-tetrafluoro-4-methoxyphenyl)anthracene;

FIG. 145 illustrates a 1-fluoro-9-(2,3,5,6-tetrafluorophenyl)-10-(3,4,5-trifluorophenyl)anthracene;

FIG. 146 illustrates a 9-(2,6-difluoro-4-methoxyphenyl)-1-fluoro-10-(2,3,5,6-tetrafluorophenyl)anthracene;

FIG. 147 illustrates a 9-(3,4-difluorophenyl)-1-fluoro-10-(2,3,5,6-tetrafluorophenyl)anthracene;

FIG. 148 illustrates a 1-fluoro-9-[2,3,5,6-tetrafluoro-4-(trifluoromethyl)phenyl]-10-(2,3,5,6-tetrafluorophenyl)anthracene;

FIG. 149 illustrates a 9-(3,4-difluorophenyl)-1-fluoro-10-(2,3,5,6-tetrafluorophenyl)anthracene;

FIG. 150 illustrates a 1-fluoro-9-phenyl-10-(2,3,5,6-tetrafluoro-4-methoxyphenyl)anthracene;

FIG. 151 illustrates a 1-fluoro-9-(4-methoxyphenyl)-10-(2,3,5,6-tetrafluoro-4-methoxyphenyl)anthracene;

FIG. 152 illustrates a 1-fluoro-9-(2,3,5,6-tetrafluoro-4-methoxyphenyl)-10-(3,4,5-trifluorophenyl)anthracene;

FIG. 153 illustrates a 9-(2,6-difluoro-4-methoxyphenyl)-1-fluoro-10-(2,3,5,6-tetrafluoro-4-methoxyphenyl)anthracene;

FIG. 154 illustrates a 9-(3,4-difluorophenyl)-1-fluoro-10-(2,3,5,6-tetrafluoro-4-methoxyphenyl)anthracene;

FIG. 155 illustrates a 1-fluoro-9-[2,3,5,6-tetrafluoro-4-(trifluoromethyl)phenyl]-10-(2,3,5,6-tetrafluoro-4-methoxyphenyl)anthracene;

FIG. 156 illustrates a 9-(2,4-difluorophenyl)-1-fluoro-10-(2,3,5,6-tetrafluoro-4-methoxyphenyl)anthracene;

FIG. 157 illustrates a 1-fluoro-9-phenyl-10-(3,4,5-trifluorophenyl)anthracene;

FIG. 158 illustrates a 1-fluoro-9-(4-methoxyphenyl)-10-(3,4,5-trifluorophenyl)anthracene;

FIG. 159 illustrates a 9-(2,6-difluoro-4-methoxyphenyl)-1-fluoro-10-(3,4,5-trifluorophenyl)anthracene;

FIG. 160 illustrates a 9-(3,4-difluorophenyl)-1-fluoro-10-(3,4,5-trifluorophenyl)anthracene;

FIG. 161 illustrates a 1-fluoro-9-[2,3,5,6-tetrafluoro-4-(trifluoromethyl)phenyl]-10-(3,4,5-trifluorophenyl)anthracene;

FIG. 162 illustrates a 9-(2,4-difluorophenyl)-1-fluoro-10-(3,4,5-trifluorophenyl)anthracene;

FIG. 163 illustrates a 9-(2,6-difluoro-4-methoxyphenyl)-1-fluoro-10-phenylanthracene:

FIG. 164 illustrates a 9-(2,6-difluoro-4-methoxyphenyl)-1-fluoro-10-(4-methoxyphenyl)anthracene:

FIG. 165 illustrates a 9-(2,6-difluoro-4-methoxyphenyl)-10-(3,4-difluorophenyl)-1-fluoroanthracene;

FIG. 166 illustrates a 9-(2,6-difluoro-4-methoxyphenyl)-1-fluoro-10-[2,3,5,6-tetrafluoro-4-(trifluoromethyl)phenyl]anthracene;

FIG. 167 illustrates a 9-(2,6-difluoro-4-methoxyphenyl)-1-fluoro-10-(2,4-difluorophenyl)anthracene;

FIG. 168 illustrates a 9-(3,4-difluorophenyl)-1-fluoro-10-phenylanthracene;

FIG. 169 illustrates a 9-(3,4-difluorophenyl)-1-fluoro-10-(4-methoxyphenyl)anthracene;

FIG. 170 illustrates a 9-(3,4-difluorophenyl)-1-fluoro-10-[2,3,5,6-tetrafluoro-4-(trifluoromethyl)phenyl]anthracene;

FIG. 171 illustrates a 9-(2,4-difluorophenyl)-1-fluoro-10-(3,4-difluorophenyl)anthracene;

FIG. 172 illustrates a 1-fluoro-9-phenyl-10-[2,3,5,6-tetrafluoro-4-(trifluoromethyl)phenyl]anthracene;

FIG. 173 illustrates a 1-fluoro-9-(4-methoxyphenyl)-10-[2,3,5,6-tetrafluoro-4-(trifluoromethyl)phenyl]anthracene;

FIG. 174 illustrates a 9-(2,4-difluorophenyl)-1-fluoro-10-[2,3,5,6-tetrafluoro-4-(trifluoromethyl)phenyl]anthracene;

FIG. 175 illustrates a 9-(2,4-difluorophenyl)-1-fluoro-10-phenylanthracene;

FIG. 176 illustrates a 9-(2,4-difluorophenyl)-1-fluoro-10-(4-methoxyphenyl)anthracene;

FIG. 177 illustrates a 2-fluoro-9-(2,3,4,5,6-pentafluorophenyl)-10-phenylanthracene;

FIG. 178 illustrates a 2-fluoro-9-(4-methoxyphenyl)-10-(2,3,4,5,6-pentafluorophenyl)anthracene;

FIG. 179 illustrates a 2-fluoro-9-(2,3,4,5,6-pentafluorophenyl)-10-(2,3,5,6-tetrafluorophenyl)anthracene;

FIG. 180 illustrates a 2-fluoro-9-(2,3,4,5,6-pentafluorophenyl)-10-(2,3,5,6-tetrafluoro-4-methoxyphenyl)anthracene;

FIG. 181 illustrates a 2-fluoro-9-(2,3,4,5,6-pentafluorophenyl)-10-(3,4,5-trifluoro)anthracene;

FIG. 182 illustrates a 9-(2,6-difluoro-4-methoxyphenyl)-2-fluoro-10-(2,3,4,5,6-pentafluorophenyl)anthracene FIG. 183 illustrates a 9-(3,4-difluorophenyl)-2-fluoro-10-(2,3,4,5,6-pentafluorophenyl)anthracene;

FIG. 184 illustrates a 2-fluoro-9-(2,3,4,5,6-pentafluorophenyl)-10-[2,3,5,6-tetrafluoro-4-(trifluoromethyl)phenyl]anthracene;

FIG. 185 illustrates a 9-(2,4-difluorophenyl)-2-fluoro-10-(2,3,4,5,6-pentafluorophenyl)anthracene;

FIG. 186 illustrates a 2-fluoro-9-phenyl-10-(2,3,5,6-tetrafluorophenyl)anthracene;

FIG. 187 illustrates a 2-fluoro-9-(4-methoxyphenyl)-10-(2,3,5,6-tetrafluorophenyl)anthracene;

FIG. 188 illustrates a 2-fluoro-9-(2,3,5,6-tetrafluorophenyl)-10-(2,3,5,6-tetrafluoro-4-methoxyphenyl)anthracene;

FIG. 189 illustrates a 2-fluoro-9-(2,3,5,6-tetrafluorophenyl)-10-(3,4,5-trifluorophenyl)anthracene;

FIG. 190 illustrates a 9-(2,6-difluoro-4-methoxyphenyl)-2-fluoro-10-(2,3,5,6-tetrafluorophenyl)anthracene;

FIG. 191 illustrates a 9-(3,4-difluorophenyl)-2-fluoro-10-(2,3,5,6-tetrafluorophenyl)anthracene;

FIG. 192 illustrates a 2-fluoro-9-[2,3,5,6-tetrafluoro-4-(trifluoromethyl)phenyl]-10-(2,3,5,6-tetrafluorophenyl)anthracene;

FIG. 193 illustrates a 9-(3,4-difluorophenyl)-2-fluoro-10-(2,3,5,6-tetrafluorophenyl)anthracene;

FIG. 194 illustrates a 2-fluoro-9-phenyl-10-(2,3,5,6-tetrafluoro-4-methoxyphenyl)anthracene;

FIG. 195 illustrates a 2-fluoro-9-(4-methoxyphenyl)-10-(2,3,5,6-tetrafluoro-4-methoxyphenyl)anthracene;

FIG. 196 illustrates a 2-fluoro-9-(2,3,5,6-tetrafluoro-4-methoxyphenyl)-10-(3,4,5-trifluorophenyl)anthracene;

FIG. 197 illustrates a 9-(2,6-difluoro-4-methoxyphenyl)-2-fluoro-10-(2,3,5,6-tetrafluoro-4-methoxyphenyl)anthracene;

FIG. 198 illustrates a 9-(3,4-difluorophenyl)-2-fluoro-10-(2,3,5,6-tetrafluoro-4-methoxyphenyl)anthracene;

FIG. 199 illustrates a 2-fluoro-9-[2,3,5,6-tetrafluoro-4-(trifluoromethyl)phenyl]-10-(2,3,5,6-tetrafluoro-4-methoxyphenyl)anthracene;

FIG. 200 illustrates a 9-(2,4-difluorophenyl)-2-fluoro-10-(2,3,5,6-tetrafluoro-4-methoxyphenyl)anthracene;

FIG. 201 illustrates a 2-fluoro-9-phenyl-10-(3,4,5-trifluorophenyl)anthracene;

FIG. 202 illustrates a 2-fluoro-9-(4-methoxyphenyl)-10-(3,4,5-trifluorophenyl)anthracene;

FIG. 203 illustrates a 9-(2,6-difluoro-4-methoxyphenyl)-2-fluoro-10-(3,4,5-trifluorophenyl)anthracene;

FIG. 204 illustrates a 9-(3,4-difluorophenyl)-2-fluoro-10-(3,4,5-trifluorophenyl)anthracene;

FIG. 205 illustrates a 2-fluoro-9-[2,3,5,6-tetrafluoro-4-(trifluoromethyl)phenyl]-10-(3,4,5-trifluorophenyl)anthracene;

FIG. 206 illustrates a 9-(2,4-difluorophenyl)-2-fluoro-10-(3,4,5-trifluorophenyl)anthracene;

FIG. 207 illustrates a 9-(2,6-difluoro-4-methoxyphenyl)-2-fluoro-10-phenylanthracene:

FIG. 208 illustrates a 9-(2,6-difluoro-4-methoxyphenyl)-2-fluoro-10-(4-methoxyphenyl)anthracene:

FIG. 209 illustrates a 9-(2,6-difluoro-4-methoxyphenyl)-10-(3,4-difluorophenyl)-2-fluoroanthracene;

FIG. 210 illustrates a 9-(2,6-difluoro-4-methoxyphenyl)-2-fluoro-10-[2,3,5,6-tetrafluoro-4-(trifluoromethyl)phenyl]anthracene;

FIG. 211 illustrates a 9-(2,6-difluoro-4-methoxyphenyl)-2-fluoro-10-(2,4-difluorophenyl)anthracene;

FIG. 212 illustrates a 9-(3,4-difluorophenyl)-2-fluoro-10-phenylanthracene;

FIG. 213 illustrates a 9-(3,4-difluorophenyl)-2-fluoro-10-(4-methoxyphenyl)anthracene;

FIG. 214 illustrates a 9-(3,4-difluorophenyl)-2-fluoro-10-[2,3,5,6-tetrafluoro-4-(trifluoromethyl)phenyl]anthracene;

FIG. 215 illustrates a 9-(2,4-difluorophenyl)-2-fluoro-10-(3,4-difluorophenyl)anthracene;

FIG. 216 illustrates a 2-fluoro-9-phenyl-10-[2,3,5,6-tetrafluoro-4-(trifluoromethyl)phenyl]anthracene;

FIG. 217 illustrates a 2-fluoro-9-(4-methoxyphenyl)-10-[2,3,5,6-tetrafluoro-4-(trifluoromethyl)phenyl]anthracene;

FIG. 218 illustrates a 9-(2,4-difluorophenyl)-2-fluoro-10-[2,3,5,6-tetrafluoro-4-(trifluoromethyl)phenyl]anthracene;

FIG. 219 illustrates a 9-(2,4-difluorophenyl)-2-fluoro-10-phenylanthracene;

FIG. 220 illustrates a 9-(2,4-difluorophenyl)-2-fluoro-10-(4-methoxyphenyl)anthracene;

FIG. 221 illustrates a 1,4-difluoro-9-(2,3,4,5,6-pentafluorophenyl)-10-phenylanthracene;

FIG. 222 illustrates a 1,4-difluoro-9-(4-methoxyphenyl)-10-(2,3,4,5,6-pentafluorophenyl)anthracene;

FIG. 223 illustrates a 1,4-difluoro-9-(2,3,4,5,6-pentafluorophenyl)-10-(2,3,5,6-tetrafluorophenyl)anthracene;

FIG. 224 illustrates a 1,4-difluoro-9-(2,3,4,5,6-pentafluorophenyl)-10-(2,3,5,6-tetrafluoro-4-methoxyphenyl)anthracene;

FIG. 225 illustrates a 1,4-difluoro-9-(2,3,4,5,6-pentafluorophenyl)-10-(3,4,5-trifluoro)anthracene;

FIG. 226 illustrates a 9-(2,6-difluoro-4-methoxyphenyl)-1,4-difluoro-10-(2,3,4,5,6-pentafluorophenyl)anthracene FIG. 227 illustrates a 9-(3,4-difluorophenyl)-1,4-difluoro-10-(2,3,4,5,6-pentafluorophenyl)anthracene;

FIG. 228 illustrates a 1,4-difluoro-9-(2,3,4,5,6-pentafluorophenyl)-10-[2,3,5,6-tetrafluoro-4-(trifluoromethyl)phenyl]anthracene;

FIG. 229 illustrates a 9-(2,4-difluorophenyl)-1,4-difluoro-10-(2,3,4,5,6-pentafluorophenyl)anthracene;

FIG. 230 illustrates a 1,4-difluoro-9-phenyl-10-(2,3,5,6-tetrafluorophenyl)anthracene;

FIG. 231 illustrates a 1,4-difluoro-9-(4-methoxyphenyl)-10-(2,3,5,6-tetrafluorophenyl)anthracene;

FIG. 232 illustrates a 1,4-difluoro-9-(2,3,5,6-tetrafluorophenyl)-10-(2,3,5,6-tetrafluoro-4-methoxyphenyl)anthracene;

FIG. 233 illustrates a 1,4-difluoro-9-(2,3,5,6-tetrafluorophenyl)-10-(3,4,5-trifluorophenyl)anthracene;

FIG. 234 illustrates a 9-(2,6-difluoro-4-methoxyphenyl)-1,4-difluoro-10-(2,3,5,6-tetrafluorophenyl)anthracene;

FIG. 235 illustrates a 9-(3,4-difluorophenyl)-1,4-difluoro-10-(2,3,5,6-tetrafluorophenyl)anthracene;

FIG. 236 illustrates a 1,4-difluoro-9-[2,3,5,6-tetrafluoro-4-(trifluoromethyl)phenyl]-10-(2,3,5,6-tetrafluorophenyl)anthracene;

FIG. 237 illustrates a 9-(3,4-difluorophenyl)-1,4-difluoro-10-(2,3,5,6-tetrafluorophenyl)anthracene;

FIG. 238 illustrates a 1,4-difluoro-9-phenyl-10-(2,3,5,6-tetrafluoro-4-methoxyphenyl)anthracene;

FIG. 239 illustrates a 1,4-difluoro-9-(4-methoxyphenyl)-10-(2,3,5,6-tetrafluoro-4-methoxyphenyl)anthracene;

FIG. 240 illustrates a 1,4-difluoro-9-(2,3,5,6-tetrafluoro-4-methoxyphenyl)-10-(3,4,5-trifluorophenyl)anthracene;

FIG. 241 illustrates a 9-(2,6-difluoro-4-methoxyphenyl)-1,4-difluoro-10-(2,3,5,6-tetrafluoro-4-methoxyphenyl)anthracene;

FIG. 242 illustrates a 9-(3,4-difluorophenyl)-1,4-difluoro-10-(2,3,5,6-tetrafluoro-4-methoxyphenyl)anthracene;

FIG. 243 illustrates a 1,4-difluoro-9-[2,3,5,6-tetrafluoro-4-(trifluoromethyl)phenyl]-10-(2,3,5,6-tetrafluoro-4-methoxyphenyl)anthracene;

FIG. 244 illustrates a 9-(2,4-difluorophenyl)-1,4-difluoro-10-(2,3,5,6-tetrafluoro-4-methoxyphenyl)anthracene;

FIG. 245 illustrates a 1,4-difluoro-9-phenyl-10-(3,4,5-trifluorophenyl)anthracene;

FIG. 246 illustrates a 1,4-difluoro-9-(4-methoxyphenyl)-10-(3,4,5-trifluorophenyl)anthracene;

FIG. 247 illustrates a 9-(2,6-difluoro-4-methoxyphenyl)-1,4-difluoro-10-(3,4,5-trifluorophenyl)anthracene;

FIG. 248 illustrates a 9-(3,4-difluorophenyl)-1,4-difluoro-10-(3,4,5-trifluorophenyl)anthracene;

FIG. 249 illustrates a 1,4-difluoro-9-[2,3,5,6-tetrafluoro-4-(trifluoromethyl)phenyl]-10-(3,4,5-trifluorophenyl)anthracene;

FIG. 250 illustrates a 9-(2,4-difluorophenyl)-1,4-difluoro-10-(3,4,5-trifluorophenyl)anthracene;

FIG. 251 illustrates a 9-(2,6-difluoro-4-methoxyphenyl)-1,4-difluoro-10-phenylanthracene:

FIG. 252 illustrates a 9-(2,6-difluoro-4-methoxyphenyl)-1,4-difluoro-10-(4-methoxyphenyl)anthracene:

FIG. 253 illustrates a 9-(2,6-difluoro-4-methoxyphenyl)-10-(3,4-difluorophenyl)-1,4-difluoroanthracene;

FIG. 254 illustrates a 9-(2,6-difluoro-4-methoxyphenyl)-1,4-difluoro-10-[2,3,5,6-tetrafluoro-4-(trifluoromethyl)phenyl]anthracene;

FIG. 255 illustrates a 9-(2,6-difluoro-4-methoxyphenyl)-1,4-difluoro-10-(2,4-difluorophenyl)anthracene;

FIG. 256 illustrates a 9-(3,4-difluorophenyl)-1,4-difluoro-10-phenylanthracene;

FIG. 257 illustrates a 9-(3,4-difluorophenyl)-1,4-difluoro-10-(4-methoxyphenyl)anthracene;

FIG. 258 illustrates a 9-(3,4-difluorophenyl)-1,4-difluoro-10-[2,3,5,6-tetrafluoro-4-(trifluoromethyl)phenyl]anthracene;

FIG. 259 illustrates a 9-(2,4-difluorophenyl)-1,4-difluoro-10-(3,4-difluorophenyl)anthracene;

FIG. 260 illustrates a 1,4-difluoro-9-phenyl-10-[2,3,5,6-tetrafluoro-4-(trifluoromethyl)phenyl]anthracene;

FIG. 261 illustrates a 1,4-difluoro-9-(4-methoxyphenyl)-10-[2,3,5,6-tetrafluoro-4-(trifluoromethyl)phenyl]anthracene;

FIG. 262 illustrates a 9-(2,4-difluorophenyl)-1,4-difluoro-10-[2,3,5,6-tetrafluoro-4-(trifluoromethyl)phenyl]anthracene;

FIG. 263 illustrates a 9-(2,4-difluorophenyl)-1,4-difluoro-10-phenylanthracene;

FIG. 264 illustrates a 9-(2,4-difluorophenyl)-1,4-difluoro-10-(4-methoxyphenyl)anthracene;

FIG. 265 illustrates a 2,3-difluoro-9-(2,3,4,5,6-pentafluorophenyl)-10-phenylanthracene;

FIG. 266 illustrates a 2,3-difluoro-9-(4-methoxyphenyl)-10-(2,3,4,5,6-pentafluorophenyl)anthracene;

FIG. 267 illustrates a 2,3-difluoro-9-(2,3,4,5,6-pentafluorophenyl)-10-(2,3,5,6-tetrafluorophenyl)anthracene;

FIG. 268 illustrates a 2,3-difluoro-9-(2,3,4,5,6-pentafluorophenyl)-10-(2,3,5,6-tetrafluoro-4-methoxyphenyl)anthracene;

FIG. 269 illustrates a 2,3-difluoro-9-(2,3,4,5,6-pentafluorophenyl)-10-(3,4,5-trifluoro)anthracene;

FIG. 270 illustrates a 9-(2,6-difluoro-4-methoxyphenyl)-2,3-difluoro-10-(2,3,4,5,6-pentafluorophenyl)anthracene FIG. 271 illustrates a 9-(3,4-difluorophenyl)-2,3-difluoro-10-(2,3,4,5,6-pentafluorophenyl)anthracene;

FIG. 272 illustrates a 2,3-difluoro-9-(2,3,4,5,6-pentafluorophenyl)-10-[2,3,5,6-tetrafluoro-4-(trifluoromethyl)phenyl]anthracene;

FIG. 273 illustrates a 9-(2,4-difluorophenyl)-2,3-difluoro-10-(2,3,4,5,6-pentafluorophenyl)anthracene;

FIG. 274 illustrates a 2,3-difluoro-9-phenyl-10-(2,3,5,6-tetrafluorophenyl)anthracene;

FIG. 275 illustrates a 2,3-difluoro-9-(4-methoxyphenyl)-10-(2,3,5,6-tetrafluorophenyl)anthracene;

FIG. 276 illustrates a 2,3-difluoro-9-(2,3,5,6-tetrafluorophenyl)-10-(2,3,5,6-tetrafluoro-4-methoxyphenyl)anthracene;

FIG. 277 illustrates a 2,3-difluoro-9-(2,3,5,6-tetrafluorophenyl)-10-(3,4,5-trifluorophenyl)anthracene;

FIG. 278 illustrates a 9-(2,6-difluoro-4-methoxyphenyl)-2,3-difluoro-10-(2,3,5,6-tetrafluorophenyl)anthracene;

FIG. 279 illustrates a 9-(3,4-difluorophenyl)-2,3-difluoro-10-(2,3,5,6-tetrafluorophenyl)anthracene;

FIG. 280 illustrates a 2,3-difluoro-9-[2,3,5,6-tetrafluoro-4-(trifluoromethyl)phenyl]-10-(2,3,5,6-tetrafluorophenyl) anthracene;

FIG. 281 illustrates a 9-(3,4-difluorophenyl)-2,3-difluoro-10-(2,3,5,6-tetrafluorophenyl)anthracene;

FIG. 282 illustrates a 2,3-difluoro-9-phenyl-10-(2,3,5,6-tetrafluoro-4-methoxyphenyl)anthracene;

FIG. 283 illustrates a 2,3-difluoro-9-(4-methoxyphenyl)-10-(2,3,5,6-tetrafluoro-4-methoxyphenyl)anthracene;

FIG. 284 illustrates a 2,3-difluoro-9-(2,3,5,6-tetrafluoro-4-methoxyphenyl)-10-(3,4,5-trifluorophenyl)anthracene;

FIG. 285 illustrates a 9-(2,6-difluoro-4-methoxyphenyl)-2,3-difluoro-10-(2,3,5,6-tetrafluoro-4-methoxyphenyl)anthracene;

FIG. 286 illustrates a 9-(3,4-difluorophenyl)-2,3-difluoro-10-(2,3,5,6-tetrafluoro-4-methoxyphenyl)anthracene;

FIG. 287 illustrates a 2,3-difluoro-9-[2,3,5,6-tetrafluoro-4-(trifluoromethyl)phenyl]-10-(2,3,5,6-tetrafluoro-4-methoxyphenyl)anthracene;

FIG. 288 illustrates a 9-(2,4-difluorophenyl)-2,3-difluoro-10-(2,3,5,6-tetrafluoro-4-methoxyphenyl)anthracene;

FIG. 289 illustrates a 2,3-difluoro-9-phenyl-10-(3,4,5-trifluorophenyl)anthracene;

FIG. 290 illustrates a 2,3-difluoro-9-(4-methoxyphenyl)-10-(3,4,5-trifluorophenyl)anthracene;

FIG. 291 illustrates a 9-(2,6-difluoro-4-methoxyphenyl)-2,3-difluoro-10-(3,4,5-trifluorophenyl)anthracene;

FIG. 292 illustrates a 9-(3,4-difluorophenyl)-2,3-difluoro-10-(3,4,5-trifluorophenyl)anthracene;

FIG. 293 illustrates a 2,3-difluoro-9-[2,3,5,6-tetrafluoro-4-(trifluoromethyl)phenyl]-10-(3,4,5-trifluorophenyl)anthracene;

FIG. 294 illustrates a 9-(2,4-difluorophenyl)-2,3-difluoro-10-(3,4,5-trifluorophenyl)anthracene;

FIG. 295 illustrates a 9-(2,6-difluoro-4-methoxyphenyl)-2,3-difluoro-10-phenylanthracene:

FIG. 296 illustrates a 9-(2,6-difluoro-4-methoxyphenyl)-2,3-difluoro-10-(4-methoxyphenyl)anthracene:

FIG. 297 illustrates a 9-(2,6-difluoro-4-methoxyphenyl)-10-(3,4-difluorophenyl)-2,3-difluoroanthracene;

FIG. 298 illustrates a 9-(2,6-difluoro-4-methoxyphenyl)-2,3-difluoro-10-[2,3,5,6-tetrafluoro-4-(trifluoromethyl)phenyl]anthracene;

FIG. 299 illustrates a 9-(2,6-difluoro-4-methoxyphenyl)-2,3-difluoro-10-(2,4-difluorophenyl)anthracene;

FIG. 300 illustrates a 9-(3,4-difluorophenyl)-2,3-difluoro-10-phenylanthracene;

FIG. 301 illustrates a 9-(3,4-difluorophenyl)-2,3-difluoro-10-(4-methoxyphenyl)anthracene;

FIG. 302 illustrates a 9-(3,4-difluorophenyl)-2,3-difluoro-10-[2,3,5,6-tetrafluoro-4-(trifluoromethyl)phenyl]anthracene;

FIG. 303 illustrates a 9-(2,4-difluorophenyl)-2,3-difluoro-10-(3,4-difluorophenyl)anthracene;

FIG. 304 illustrates a 2,3-difluoro-9-phenyl-10-[2,3,5,6-tetrafluoro-4-(trifluoromethyl)phenyl]anthracene;

FIG. 305 illustrates a 2,3-difluoro-9-(4-methoxyphenyl)-10-[2,3,5,6-tetrafluoro-4-(trifluoromethyl)phenyl]anthracene;

FIG. 306 illustrates a 9-(2,4-difluorophenyl)-2,3-difluoro-10-[2,3,5,6-tetrafluoro-4-(trifluoromethyl)phenyl]anthracene;

FIG. 307 illustrates a 9-(2,4-difluorophenyl)-2,3-difluoro-10-phenylanthracene;

FIG. 308 illustrates a 9-(2,4-difluorophenyl)-2,3-difluoro-10-(4-methoxyphenyl)anthracene;

FIG. 309 illustrates a 1,4,5-trifluoro-9-(2,3,4,5,6-pentafluorophenyl)-10-phenylanthracene;

FIG. 310 illustrates a 1,4,5-trifluoro-9-(4-methoxyphenyl)-10-(2,3,4,5,6-pentafluorophenyl)anthracene;

FIG. 311 illustrates a 1,4,5-trifluoro-9-(2,3,4,5,6-pentafluorophenyl)-10-(2,3,5,6-tetrafluorophenyl)anthracene;

FIG. 312 illustrates a 1,4,5-trifluoro-9-(2,3,4,5,6-pentafluorophenyl)-10-(2,3,5,6-tetrafluoro-4-methoxyphenyl) anthracene;

FIG. 313 illustrates a 1,4,5-trifluoro-9-(2,3,4,5,6-pentafluorophenyl)-10-(3,4,5-trifluoro)anthracene;

FIG. 314 illustrates a 9-(2,6-difluoro-4-methoxyphenyl)-1,4,5-trifluoro-10-(2,3,4,5,6-pentafluorophenyl)anthracene FIG. 315 illustrates a 9-(3,4-difluorophenyl)-1,4,5-trifluoro-10-(2,3,4,5,6-pentafluorophenyl)anthracene;

FIG. 316 illustrates a 1,4,5-trifluoro-9-(2,3,4,5,6-pentafluorophenyl)-10-[2,3,5,6-tetrafluoro-4-(trifluoromethyl)phenyl]anthracene;

FIG. 317 illustrates a 9-(2,4-difluorophenyl)-1,4,5-trifluoro-10-(2,3,4,5,6-pentafluorophenyl)anthracene;

FIG. 318 illustrates a 1,4,5-trifluoro-9-phenyl-10-(2,3,5,6-tetrafluorophenyl)anthracene;

FIG. 319 illustrates a 1,4,5-trifluoro-9-(4-methoxyphenyl)-10-(2,3,5,6-tetrafluorophenyl)anthracene;

FIG. 320 illustrates a 1,4,5-trifluoro-9-(2,3,5,6-tetrafluorophenyl)-10-(2,3,5,6-tetrafluoro-4-methoxyphenyl)anthracene;

FIG. 321 illustrates a 1,4,5-trifluoro-9-(2,3,5,6-tetrafluorophenyl)-10-(3,4,5-trifluorophenyl)anthracene;

FIG. 322 illustrates a 9-(2,6-difluoro-4-methoxyphenyl)-1,4,5-trifluoro-10-(2,3,5,6-tetrafluorophenyl)anthracene;

FIG. 323 illustrates a 9-(3,4-difluorophenyl)-1,4,5-trifluoro-10-(2,3,5,6-tetrafluorophenyl)anthracene;

FIG. 324 illustrates a 1,4,5-trifluoro-9-[2,3,5,6-tetrafluoro-4-(trifluoromethyl)phenyl]-10-(2,3,5,6-tetrafluorophenyl)anthracene;

FIG. 325 illustrates a 9-(3,4-difluorophenyl)-1,4,5-trifluoro-10-(2,3,5,6-tetrafluorophenyl)anthracene;

FIG. 326 illustrates a 1,4,5-trifluoro-9-phenyl-10-(2,3,5,6-tetrafluoro-4-methoxyphenyl)anthracene;

FIG. 327 illustrates a 1,4,5-trifluoro-9-(4-methoxyphenyl)-10-(2,3,5,6-tetrafluoro-4-methoxyphenyl)anthracene;

FIG. 328 illustrates a 1,4,5-trifluoro-9-(2,3,5,6-tetrafluoro-4-methoxyphenyl)-10-(3,4,5-trifluorophenyl)anthracene;

FIG. 329 illustrates a 9-(2,6-difluoro-4-methoxyphenyl)-1,4,5-trifluoro-10-(2,3,5,6-tetrafluoro-4-methoxyphenyl)anthracene;

FIG. 330 illustrates a 9-(3,4-difluorophenyl)-1,4,5-trifluoro-10-(2,3,5,6-tetrafluoro-4-methoxyphenyl)anthracene;

FIG. 331 illustrates a 1,4,5-trifluoro-9-[2,3,5,6-tetrafluoro-4-(trifluoromethyl)phenyl]-10-(2,3,5,6-tetrafluoro-4-methoxyphenyl)anthracene;

FIG. 332 illustrates a 9-(2,4-difluorophenyl)-1,4,5-trifluoro-10-(2,3,5,6-tetrafluoro-4-methoxyphenyl)anthracene;

FIG. 333 illustrates a 1,4,5-trifluoro-9-phenyl-10-(3,4,5-trifluorophenyl) anthracene;

FIG. 334 illustrates a 1,4,5-trifluoro-9-(4-methoxyphenyl)-10-(3,4,5-trifluorophenyl)anthracene;

FIG. 335 illustrates a 9-(2,6-difluoro-4-methoxyphenyl)-1,4,5-trifluoro-10-(3,4,5-trifluorophenyl)anthracene;

FIG. 336 illustrates a 9-(3,4-difluorophenyl)-1,4,5-trifluoro-10-(3,4,5-trifluorophenyl)anthracene;

FIG. 337 illustrates a 1,4,5-trifluoro-9-[2,3,5,6-tetrafluoro-4-(trifluoromethyl)phenyl]-10-(3,4,5-trifluorophenyl)anthracene;

FIG. 338 illustrates a 9-(2,4-difluorophenyl)-1,4,5-trifluoro-10-(3,4,5-trifluorophenyl)anthracene;

FIG. 339 illustrates a 9-(2,6-difluoro-4-methoxyphenyl)-1,4,5-trifluoro-10-phenylanthracene:

FIG. 340 illustrates a 9-(2,6-difluoro-4-methoxyphenyl)-1,4,5-trifluoro-10-(4-methoxyphenyl)anthracene:

FIG. 341 illustrates a 9-(2,6-difluoro-4-methoxyphenyl)-10-(3,4-difluorophenyl)-1,4,5-trifluoroanthracene;

FIG. 342 illustrates a 9-(2,6-difluoro-4-methoxyphenyl)-1,4,5-trifluoro-10-[2,3,5,6-tetrafluoro-4-(trifluoromethyl)phenyl]anthracene;

FIG. 343 illustrates a 9-(2,6-difluoro-4-methoxyphenyl)-1,4,5-trifluoro-10-(2,4-difluorophenyl)anthracene;

FIG. 344 illustrates a 9-(3,4-difluorophenyl)-1,4,5-trifluoro-10-phenylanthracene;

FIG. 345 illustrates a 9-(3,4-difluorophenyl)-1,4,5-trifluoro-10-(4-methoxyphenyl)anthracene;

FIG. 346 illustrates a 9-(3,4-difluorophenyl)-1,4,5-trifluoro-10-[2,3,5,6-tetrafluoro-4-(trifluoromethyl)phenyl]anthracene;

FIG. 347 illustrates a 9-(2,4-difluorophenyl)-1,4,5-trifluoro-10-(3,4-difluorophenyl)anthracene;

FIG. 348 illustrates a 1,4,5-trifluoro-9-phenyl-10-[2,3,5,6-tetrafluoro-4-(trifluoromethyl)phenyl]anthracene;

FIG. 349 illustrates a 1,4,5-trifluoro-9-(4-methoxyphenyl)-10-[2,3,5,6-tetrafluoro-4-(trifluoromethyl)phenyl]anthracene;

FIG. 350 illustrates a 9-(2,4-difluorophenyl)-1,4,5-trifluoro-10-[2,3,5,6-tetrafluoro-4-(trifluoromethyl)phenyl]anthracene;

FIG. 351 illustrates a 9-(2,4-difluorophenyl)-1,4,5-trifluoro-10-phenylanthracene;

FIG. 352 illustrates a 9-(2,4-difluorophenyl)-1,4,5-trifluoro-10-(4-methoxyphenyl)anthracene;

FIG. 353 illustrates a 2,3,5-trifluoro-9-(2,3,4,5,6-pentafluorophenyl)-10-phenylanthracene;

FIG. 354 illustrates a 2,3,5-trifluoro-9-(4-methoxyphenyl)-10-(2,3,4,5,6-pentafluorophenyl)anthracene;

FIG. 355 illustrates a 2,3,5-trifluoro-9-(2,3,4,5,6-pentafluorophenyl)-10-(2,3,5,6-tetrafluorophenyl)anthracene;

FIG. 356 illustrates a 2,3,5-trifluoro-9-(2,3,4,5,6-pentafluorophenyl)-10-(2,3,5,6-tetrafluoro-4-methoxyphenyl)anthracene;

FIG. 357 illustrates a 2,3,5-trifluoro-9-(2,3,4,5,6-pentafluorophenyl)-10-(3,4,5-trifluoro)anthracene;

FIG. 358 illustrates a 9-(2,6-difluoro-4-methoxyphenyl)-2,3,5-trifluoro-10-(2,3,4,5,6-pentafluorophenyl)anthracene FIG. 359 illustrates a 9-(3,4-difluorophenyl)-2,3,5-trifluoro-10-(2,3,4,5,6-pentafluorophenyl)anthracene;

FIG. 360 illustrates a 2,3,5-trifluoro-9-(2,3,4,5,6-pentafluorophenyl)-10-[2,3,5,6-tetrafluoro-4-(trifluoromethyl)phenyl]anthracene;

FIG. 361 illustrates a 9-(2,4-difluorophenyl)-2,3,5-trifluoro-10-(2,3,4,5,6-pentafluorophenyl)anthracene;

FIG. 362 illustrates a 2,3,5-trifluoro-9-phenyl-10-(2,3,5,6-tetrafluorophenyl)anthracene;

FIG. 363 illustrates a 2,3,5-trifluoro-9-(4-methoxyphenyl)-10-(2,3,5,6-tetrafluorophenyl)anthracene;

FIG. 364 illustrates a 2,3,5-trifluoro-9-(2,3,5,6-tetrafluorophenyl)-10-(2,3,5,6-tetrafluoro-4-methoxyphenyl)anthracene;

FIG. 365 illustrates a 2,3,5-trifluoro-9-(2,3,5,6-tetrafluorophenyl)-10-(3,4,5-trifluorophenyl)anthracene;

FIG. 366 illustrates a 9-(2,6-difluoro-4-methoxyphenyl)-2,3,5-trifluoro-10-(2,3,5,6-tetrafluorophenyl)anthracene;

FIG. 367 illustrates a 9-(3,4-difluorophenyl)-2,3,5-trifluoro-10-(2,3,5,6-tetrafluorophenyl)anthracene;

FIG. 368 illustrates a 2,3,5-trifluoro-9-[2,3,5,6-tetrafluoro-4-(trifluoromethyl)phenyl]-10-(2,3,5,6-tetrafluorophenyl)anthracene;

FIG. 369 illustrates a 9-(3,4-difluorophenyl)-2,3,5-trifluoro-10-(2,3,5,6-tetrafluorophenyl)anthracene;

FIG. 370 illustrates a 2,3,5-trifluoro-9-phenyl-10-(2,3,5,6-tetrafluoro-4-methoxyphenyl)anthracene;

FIG. 371 illustrates a 2,3,5-trifluoro-9-(4-methoxyphenyl)-10-(2,3,5,6-tetrafluoro-4-methoxyphenyl)anthracene;

FIG. 372 illustrates a 2,3,5-trifluoro-9-(2,3,5,6-tetrafluoro-4-methoxyphenyl)-10-(3,4,5-trifluorophenyl)anthracene;

FIG. 373 illustrates a 9-(2,6-difluoro-4-methoxyphenyl)-2,3,5-trifluoro-10-(2,3,5,6-tetrafluoro-4-methoxyphenyl)anthracene;

FIG. 374 illustrates a 9-(3,4-difluorophenyl)-2,3,5-trifluoro-10-(2,3,5,6-tetrafluoro-4-methoxyphenyl)anthracene;

FIG. 375 illustrates a 2,3,5-trifluoro-9-[2,3,5,6-tetrafluoro-4-(trifluoromethyl)phenyl]-10-(2,3,5,6-tetrafluoro-4-methoxyphenyl)anthracene;

FIG. 376 illustrates a 9-(2,4-difluorophenyl)-2,3,5-trifluoro-10-(2,3,5,6-tetrafluoro-4-methoxyphenyl)anthracene;

FIG. 377 illustrates a 2,3,5-trifluoro-9-phenyl-10-(3,4,5-trifluorophenyl)anthracene;

FIG. 378 illustrates a 2,3,5-trifluoro-9-(4-methoxyphenyl)-10-(3,4,5-trifluorophenyl)anthracene;

FIG. 379 illustrates a 9-(2,6-difluoro-4-methoxyphenyl)-2,3,5-trifluoro-10-(3,4,5-trifluorophenyl)anthracene;

FIG. 380 illustrates a 9-(3,4-difluorophenyl)-2,3,5-trifluoro-10-(3,4,5-trifluorophenyl)anthracene;

FIG. 381 illustrates a 2,3,5-trifluoro-9-[2,3,5,6-tetrafluoro-4-(trifluoromethyl)phenyl]-10-(3,4,5-trifluorophenyl)anthracene;

FIG. 382 illustrates a 9-(2,4-difluorophenyl)-2,3,5-trifluoro-10-(3,4,5-trifluorophenyl)anthracene;

FIG. 383 illustrates a 9-(2,6-difluoro-4-methoxyphenyl)-2,3,5-trifluoro-10-phenylanthracene:

FIG. 384 illustrates a 9-(2,6-difluoro-4-methoxyphenyl)-2,3,5-trifluoro-10-(4-methoxyphenyl)anthracene:

FIG. 385 illustrates a 9-(2,6-difluoro-4-methoxyphenyl)-10-(3,4-difluorophenyl)-2,3,5-trifluoroanthracene;

FIG. 386 illustrates a 9-(2,6-difluoro-4-methoxyphenyl)-2,3,5-trifluoro-10-[2,3,5,6-tetrafluoro-4-(trifluoromethyl)phenyl]anthracene;

FIG. 387 illustrates a 9-(2,6-difluoro-4-methoxyphenyl)-2,3,5-trifluoro-10-(2,4-difluorophenyl)anthracene;

FIG. 388 illustrates a 9-(3,4-difluorophenyl)-2,3,5-trifluoro-10-phenylanthracene;

FIG. 389 illustrates a 9-(3,4-difluorophenyl)-2,3,5-trifluoro-10-(4-methoxyphenyl)anthracene;

FIG. 390 illustrates a 9-(3,4-difluorophenyl)-2,3,5-trifluoro-10-[2,3,5,6-tetrafluoro-4-(trifluoromethyl)phenyl]anthracene;

FIG. 391 illustrates a 9-(2,4-difluorophenyl)-2,3,5-trifluoro-10-(3,4-difluorophenyl)anthracene;

FIG. 392 illustrates a 2,3,5-trifluoro-9-phenyl-10-[2,3,5,6-tetrafluoro-4-(trifluoromethyl)phenyl]anthracene;

FIG. 393 illustrates a 2,3,5-trifluoro-9-(4-methoxyphenyl)-10-[2,3,5,6-tetrafluoro-4-(trifluoromethyl)phenyl]anthracene;

FIG. 394 illustrates a 9-(2,4-difluorophenyl)-2,3,5-trifluoro-10-[2,3,5,6-tetrafluoro-4-(trifluoromethyl)phenyl]anthracene;

FIG. 395 illustrates a 9-(2,4-difluorophenyl)-2,3,5-trifluoro-10-phenylanthracene;

FIG. 396 illustrates a 9-(2,4-difluorophenyl)-2,3,5-trifluoro-10-(4-methoxyphenyl)anthracene;

FIG. 397 illustrates a 1,4,6-trifluoro-9-(2,3,4,5,6-pentafluorophenyl)-10-phenylanthracene;

FIG. 398 illustrates a 1,4,6-trifluoro-9-(4-methoxyphenyl)-10-(2,3,4,5,6-pentafluorophenyl)anthracene;

FIG. 399 illustrates a 1,4,6-trifluoro-9-(2,3,4,5,6-pentafluorophenyl)-10-(2,3,5,6-tetrafluorophenyl)anthracene;

FIG. 400 illustrates a 1,4,6-trifluoro-9-(2,3,4,5,6-pentafluorophenyl)-10-(2,3,5,6-tetrafluoro-4-methoxyphenyl)anthracene;

FIG. 401 illustrates a 1,4,6-trifluoro-9-(2,3,4,5,6-pentafluorophenyl)-10-(3,4,5-trifluoro)anthracene;

FIG. 402 illustrates a 9-(2,6-difluoro-4-methoxyphenyl)-1,4,6-trifluoro-10-(2,3,4,5,6-pentafluorophenyl)anthracene FIG. 403 illustrates a 9-(3,4-difluorophenyl)-1,4,6-trifluoro-10-(2,3,4,5,6-pentafluorophenyl)anthracene;

FIG. 404 illustrates a 1,4,6-trifluoro-9-(2,3,4,5,6-pentafluorophenyl)-10-[2,3,5,6-tetrafluoro-4-(trifluoromethyl)phenyl]anthracene;

FIG. 405 illustrates a 9-(2,4-difluorophenyl)-1,4,6-trifluoro-10-(2,3,4,5,6-pentafluorophenyl)anthracene;

FIG. 406 illustrates a 1,4,6-trifluoro-9-phenyl-10-(2,3,5,6-tetrafluorophenyl)anthracene;

FIG. 407 illustrates a 1,4,6-trifluoro-9-(4-methoxyphenyl)-10-(2,3,5,6-tetrafluorophenyl)anthracene;

FIG. 408 illustrates a 1,4,6-trifluoro-9-(2,3,5,6-tetrafluorophenyl)-10-(2,3,5,6-tetrafluoro-4-methoxyphenyl)anthracene;

FIG. 409 illustrates a 1,4,6-trifluoro-9-(2,3,5,6-tetrafluorophenyl)-10-(3,4,5-trifluorophenyl)anthracene;

FIG. 410 illustrates a 9-(2,6-difluoro-4-methoxyphenyl)-1,4,6-trifluoro-10-(2,3,5,6-tetrafluorophenyl)anthracene;

FIG. 411 illustrates a 9-(3,4-difluorophenyl)-1,4,6-trifluoro-10-(2,3,5,6-tetrafluorophenyl)anthracene;

FIG. 412 illustrates a 1,4,6-trifluoro-9-[2,3,5,6-tetrafluoro-4-(trifluoromethyl)phenyl]-10-(2,3,5,6-tetrafluorophenyl)anthracene;

FIG. 413 illustrates a 9-(3,4-difluorophenyl)-1,4,6-trifluoro-10-(2,3,5,6-tetrafluorophenyl)anthracene;

FIG. 414 illustrates a 1,4,6-trifluoro-9-phenyl-10-(2,3,5,6-tetrafluoro-4-methoxyphenyl)anthracene;

FIG. 415 illustrates a 1,4,6-trifluoro-9-(4-methoxyphenyl)-10-(2,3,5,6-tetrafluoro-4-methoxyphenyl)anthracene;

FIG. 416 illustrates a 1,4,6-trifluoro-9-(2,3,5,6-tetrafluoro-4-methoxyphenyl)-10-(3,4,5-trifluorophenyl)anthracene;

FIG. 417 illustrates a 9-(2,6-difluoro-4-methoxyphenyl)-1,4,6-trifluoro-10-(2,3,5,6-tetrafluoro-4-methoxyphenyl)anthracene;

FIG. 418 illustrates a 9-(3,4-difluorophenyl)-1,4,6-trifluoro-10-(2,3,5,6-tetrafluoro-4-methoxyphenyl)anthracene;

FIG. 419 illustrates a 1,4,6-trifluoro-9-[2,3,5,6-tetrafluoro-4-(trifluoromethyl)phenyl]-10-(2,3,5,6-tetrafluoro-4-methoxyphenyl)anthracene;

FIG. 420 illustrates a 9-(2,4-difluorophenyl)-1,4,6-trifluoro-10-(2,3,5,6-tetrafluoro-4-methoxyphenyl)anthracene;

FIG. 421 illustrates a 1,4,6-trifluoro-9-phenyl-10-(3,4,5-trifluorophenyl)anthracene;

FIG. 422 illustrates a 1,4,6-trifluoro-9-(4-methoxyphenyl)-10-(3,4,5-trifluorophenyl)anthracene;

FIG. 423 illustrates a 9-(2,6-difluoro-4-methoxyphenyl)-1,4,6-trifluoro-10-(3,4,5-trifluorophenyl)anthracene;

FIG. 424 illustrates a 9-(3,4-difluorophenyl)-1,4,6-trifluoro-10-(3,4,5-trifluorophenyl)anthracene;

FIG. 425 illustrates a 1,4,6-trifluoro-9-[2,3,5,6-tetrafluoro-4-(trifluoromethyl)phenyl]-10-(3,4,5-trifluorophenyl)anthracene;

FIG. 426 illustrates a 9-(2,4-difluorophenyl)-1,4,6-trifluoro-10-(3,4,5-trifluorophenyl)anthracene;

FIG. 427 illustrates a 9-(2,6-difluoro-4-methoxyphenyl)-1,4,6-trifluoro-10-phenylanthracene:

FIG. 428 illustrates a 9-(2,6-difluoro-4-methoxyphenyl)-1,4,6-trifluoro-10-(4-methoxyphenyl)anthracene:

FIG. 429 illustrates a 9-(2,6-difluoro-4-methoxyphenyl)-10-(3,4-difluorophenyl)-1,4,6-trifluoroanthracene;

FIG. 430 illustrates a 9-(2,6-difluoro-4-methoxyphenyl)-1,4,6-trifluoro-10-[2,3,5,6-tetrafluoro-4-(trifluoromethyl)phenyl]anthracene;

FIG. 431 illustrates a 9-(2,6-difluoro-4-methoxyphenyl)-1,4,6-trifluoro-10-(2,4-difluorophenyl)anthracene;

FIG. 432 illustrates a 9-(3,4-difluorophenyl)-1,4,6-trifluoro-10-phenylanthracene;

FIG. 433 illustrates a 9-(3,4-difluorophenyl)-1,4,6-trifluoro-10-(4-methoxyphenyl)anthracene;

FIG. 434 illustrates a 9-(3,4-difluorophenyl)-1,4,6-trifluoro-10-[2,3,5,6-tetrafluoro-4-(trifluoromethyl)phenyl]anthracene;

FIG. 435 illustrates a 9-(2,4-difluorophenyl)-1,4,6-trifluoro-10-(3,4-difluorophenyl)anthracene;

FIG. 436 illustrates a 1,4,6-trifluoro-9-phenyl-10-[2,3,5,6-tetrafluoro-4-(trifluoromethyl)phenyl]anthracene;

FIG. 437 illustrates a 1,4,6-trifluoro-9-(4-methoxyphenyl)-10-[2,3,5,6-tetrafluoro-4-(trifluoromethyl)phenyl]anthracene;

FIG. 438 illustrates a 9-(2,4-difluorophenyl)-1,4,6-trifluoro-10-[2,3,5,6-tetrafluoro-4-(trifluoromethyl)phenyl]anthracene;

FIG. 439 illustrates a 9-(2,4-difluorophenyl)-1,4,6-trifluoro-10-phenylanthracene;

FIG. 440 illustrates a 9-(2,4-difluorophenyl)-1,4,6-trifluoro-10-(4-methoxyphenyl)anthracene;

FIG. 441 illustrates a 2,3,6-trifluoro-9-(2,3,4,5,6-pentafluorophenyl)-10-phenylanthracene;

FIG. 442 illustrates a 2,3,6-trifluoro-9-(4-methoxyphenyl)-10-(2,3,4,5,6-pentafluorophenyl)anthracene;

FIG. 443 illustrates a 2,3,6-trifluoro-9-(2,3,4,5,6-pentafluorophenyl)-10-(2,3,5,6-tetrafluorophenyl)anthracene;

FIG. 444 illustrates a 2,3,6-trifluoro-9-(2,3,4,5,6-pentafluorophenyl)-10-(2,3,5,6-tetrafluoro-4-methoxyphenyl)anthracene;

FIG. 445 illustrates a 2,3,6-trifluoro-9-(2,3,4,5,6-pentafluorophenyl)-10-(3,4,5-trifluoro)anthracene;

FIG. 446 illustrates a 9-(2,6-difluoro-4-methoxyphenyl)-2,3,6-trifluoro-10-(2,3,4,5,6-pentafluorophenyl)anthracene FIG. 447 illustrates a 9-(3,4-difluorophenyl)-2,3,6-trifluoro-10-(2,3,4,5,6-pentafluorophenyl)anthracene;

FIG. 448 illustrates a 2,3,6-trifluoro-9-(2,3,4,5,6-pentafluorophenyl)-10-[2,3,5,6-tetrafluoro-4-(trifluoromethyl)phenyl]anthracene;

FIG. 449 illustrates a 9-(2,4-difluorophenyl)-2,3,6-trifluoro-10-(2,3,4,5,6-pentafluorophenyl)anthracene;

FIG. 450 illustrates a 2,3,6-trifluoro-9-phenyl-10-(2,3,5,6-tetrafluorophenyl)anthracene;

FIG. 451 illustrates a 2,3,6-trifluoro-9-(4-methoxyphenyl)-10-(2,3,5,6-tetrafluorophenyl)anthracene;

FIG. 452 illustrates a 2,3,6-trifluoro-9-(2,3,5,6-tetrafluorophenyl)-10-(2,3,5,6-tetrafluoro-4-methoxyphenyl)anthracene;

FIG. 453 illustrates a 2,3,6-trifluoro-9-(2,3,5,6-tetrafluorophenyl)-10-(3,4,5-trifluorophenyl)anthracene;

FIG. 454 illustrates a 9-(2,6-difluoro-4-methoxyphenyl)-2,3,6-trifluoro-10-(2,3,5,6-tetrafluorophenyl)anthracene;

FIG. 455 illustrates a 9-(3,4-difluorophenyl)-2,3,6-trifluoro-10-(2,3,5,6-tetrafluorophenyl)anthracene;

FIG. 456 illustrates a 2,3,6-trifluoro-9-[2,3,5,6-tetrafluoro-4-(trifluoromethyl)phenyl]-10-(2,3,5,6-tetrafluorophenyl)anthracene;

FIG. 457 illustrates a 9-(3,4-difluorophenyl)-2,3,6-trifluoro-10-(2,3,5,6-tetrafluorophenyl)anthracene;

FIG. 458 illustrates a 2,3,6-trifluoro-9-phenyl-10-(2,3,5,6-tetrafluoro-4-methoxyphenyl)anthracene;

FIG. 459 illustrates a 2,3,6-trifluoro-9-(4-methoxyphenyl)-10-(2,3,5,6-tetrafluoro-4-methoxyphenyl)anthracene;

FIG. 460 illustrates a 2,3,6-trifluoro-9-(2,3,5,6-tetrafluoro-4-methoxyphenyl)-10-(3,4,5-trifluorophenyl)anthracene;

FIG. 461 illustrates a 9-(2,6-difluoro-4-methoxyphenyl)-2,3,6-trifluoro-10-(2,3,5,6-tetrafluoro-4-methoxyphenyl)anthracene;

FIG. 462 illustrates a 9-(3,4-difluorophenyl)-2,3,6-trifluoro-10-(2,3,5,6-tetrafluoro-4-methoxyphenyl)anthracene;

FIG. 463 illustrates a 2,3,6-trifluoro-9-[2,3,5,6-tetrafluoro-4-(trifluoromethyl)phenyl]-10-(2,3,5,6-tetrafluoro-4-methoxyphenyl)anthracene;

FIG. 464 illustrates a 9-(2,4-difluorophenyl)-2,3,6-trifluoro-10-(2,3,5,6-tetrafluoro-4-methoxyphenyl)anthracene;

FIG. 465 illustrates a 2,3,6-trifluoro-9-phenyl-10-(3,4,5-trifluorophenyl)anthracene;

FIG. 466 illustrates a 2,3,6-trifluoro-9-(4-methoxyphenyl)-10-(3,4,5-trifluorophenyl)anthracene;

FIG. 467 illustrates a 9-(2,6-difluoro-4-methoxyphenyl)-2,3,6-trifluoro-10-(3,4,5-trifluorophenyl)anthracene;

FIG. 468 illustrates a 9-(3,4-difluorophenyl)-2,3,6-trifluoro-10-(3,4,5-trifluorophenyl)anthracene;

FIG. 469 illustrates a 2,3,6-trifluoro-9-[2,3,5,6-tetrafluoro-4-(trifluoromethyl)phenyl]-10-(3,4,5-trifluorophenyl)anthracene;

FIG. 470 illustrates a 9-(2,4-difluorophenyl)-2,3,6-trifluoro-10-(3,4,5-trifluorophenyl)anthracene;

FIG. 471 illustrates a 9-(2,6-difluoro-4-methoxyphenyl)-2,3,6-trifluoro-10-phenylanthracene:

FIG. 472 illustrates a 9-(2,6-difluoro-4-methoxyphenyl)-2,3,6-trifluoro-10-(4-methoxyphenyl)anthracene:

FIG. 473 illustrates a 9-(2,6-difluoro-4-methoxyphenyl)-10-(3,4-difluorophenyl)-2,3,6-trifluoroanthracene;

FIG. 474 illustrates a 9-(2,6-difluoro-4-methoxyphenyl)-2,3,6-trifluoro-10-[2,3,5,6-tetrafluoro-4-(trifluoromethyl)phenyl]anthracene;

FIG. 475 illustrates a 9-(2,6-difluoro-4-methoxyphenyl)-2,3,6-trifluoro-10-(2,4-difluorophenyl)anthracene;

FIG. 476 illustrates a 9-(3,4-difluorophenyl)-2,3,6-trifluoro-10-phenylanthracene;

FIG. 477 illustrates a 9-(3,4-difluorophenyl)-2,3,6-trifluoro-10-(4-methoxyphenyl)anthracene;

FIG. 478 illustrates a 9-(3,4-difluorophenyl)-2,3,6-trifluoro-10-[2,3,5,6-tetrafluoro-4-(trifluoromethyl)phenyl]anthracene;

FIG. 479 illustrates a 9-(2,4-difluorophenyl)-2,3,6-trifluoro-10-(3,4-difluorophenyl)anthracene;

FIG. 480 illustrates a 2,3,6-trifluoro-9-phenyl-10-[2,3,5,6-tetrafluoro-4-(trifluoromethyl)phenyl]anthracene;

FIG. 481 illustrates a 2,3,6-trifluoro-9-(4-methoxyphenyl)-10-[2,3,5,6-tetrafluoro-4-(trifluoromethyl)phenyl]anthracene;

FIG. 482 illustrates a 9-(2,4-difluorophenyl)-2,3,6-trifluoro-10-[2,3,5,6-tetrafluoro-4-(trifluoromethyl)phenyl]anthracene;

FIG. 483 illustrates a 9-(2,4-difluorophenyl)-2,3,6-trifluoro-10-phenylanthracene;

FIG. 484 illustrates a 9-(2,4-difluorophenyl)-2,3,6-trifluoro-10-(4-methoxyphenyl)anthracene;

FIG. 485 illustrates a 1,2,3,4-tetrafluoro-9-(2,3,4,5,6-pentafluorophenyl)-10-phenylanthracene;

FIG. 486 illustrates a 1,2,3,4-tetrafluoro-9-(4-methoxyphenyl)-10-(2,3,4,5,6-pentafluorophenyl)anthracene;

FIG. 487 illustrates a 1,2,3,4-tetrafluoro-9-(2,3,4,5,6-pentafluorophenyl)-10-(2,3,5,6-tetrafluorophenyl)anthracene;

FIG. 488 illustrates a 1,2,3,4-tetrafluoro-9-(2,3,4,5,6-pentafluorophenyl)-10-(2,3,5,6-tetrafluoro-4-methoxyphenyl) anthracene;

FIG. 489 illustrates a 1,2,3,4-tetrafluoro-9-(2,3,4,5,6-pentafluorophenyl)-10-(3,4,5-trifluoro)anthracene;

FIG. 490 illustrates a 9-(2,6-difluoro-4-methoxyphenyl)-1,2,3,4-tetrafluoro-10-(2,3,4,5,6-pentafluorophenyl)anthracene FIG. 491 illustrates a 9-(3,4-difluorophenyl)-1,2,3,4-tetrafluoro-10-(2,3,4,5,6-pentafluorophenyl)anthracene;

FIG. 492 illustrates a 1,2,3,4-tetrafluoro-9-(2,3,4,5,6-pentafluorophenyl)-10-[2,3,5,6-tetrafluoro-4-(trifluoromethyl) phenyl]anthracene;

FIG. 493 illustrates a 9-(2,4-difluorophenyl)-1,2,3,4-tetrafluoro-10-(2,3,4,5,6-pentafluorophenyl)anthracene;

FIG. 494 illustrates a 1,2,3,4-tetrafluoro-9-phenyl-10-(2,3,5,6-tetrafluorophenyl)anthracene;

FIG. 495 illustrates a 1,2,3,4-tetrafluoro-9-(4-methoxyphenyl)-10-(2,3,5,6-tetrafluorophenyl)anthracene;

FIG. 496 illustrates a 1,2,3,4-tetrafluoro-9-(2,3,5,6-tetrafluorophenyl)-10-(2,3,5,6-tetrafluoro-4-methoxyphenyl) anthracene;

FIG. 497 illustrates a 1,2,3,4-tetrafluoro-9-(2,3,5,6-tetrafluorophenyl)-10-(3,4,5-trifluorophenyl)anthracene;

FIG. 498 illustrates a 9-(2,6-difluoro-4-methoxyphenyl)-1,2,3,4-tetrafluoro-10-(2,3,5,6-tetrafluorophenyl)anthracene;

FIG. 499 illustrates a 9-(3,4-difluorophenyl)-1,2,3,4-tetrafluoro-10-(2,3,5,6-tetrafluorophenyl)anthracene;

FIG. 500 illustrates a 1,2,3,4-tetrafluoro-9-[2,3,5,6-tetrafluoro-4-(trifluoromethyl)phenyl]-10-(2,3,5,6-tetrafluorophenyl)anthracene;

FIG. 501 illustrates a 9-(3,4-difluorophenyl)-1,2,3,4-tetrafluoro-10-(2,3,5,6-tetrafluorophenyl)anthracene;

FIG. 502 illustrates a 1,2,3,4-tetrafluoro-9-phenyl-10-(2,3,5,6-tetrafluoro-4-methoxyphenyl)anthracene;

FIG. 503 illustrates a 1,2,3,4-tetrafluoro-9-(4-methoxyphenyl)-10-(2,3,5,6-tetrafluoro-4-methoxyphenyl)anthracene;

FIG. 504 illustrates a 1,2,3,4-tetrafluoro-9-(2,3,5,6-tetrafluoro-4-methoxyphenyl)-10-(3,4,5-trifluorophenyl)anthracene;

FIG. 505 illustrates a 9-(2,6-difluoro-4-methoxyphenyl)-1,2,3,4-tetrafluoro-10-(2,3,5,6-tetrafluoro-4-methoxyphenyl)anthracene;

FIG. 506 illustrates a 9-(3,4-difluorophenyl)-1,2,3,4-tetrafluoro-10-(2,3,5,6-tetrafluoro-4-methoxyphenyl)anthracene;

FIG. 507 illustrates a 1,2,3,4-tetrafluoro-9-[2,3,5,6-tetrafluoro-4-(trifluoromethyl)phenyl]-10-(2,3,5,6-tetrafluoro-4-methoxyphenyl)anthracene;

FIG. 508 illustrates a 9-(2,4-difluorophenyl)-1,2,3,4-tetrafluoro-10-(2,3,5,6-tetrafluoro-4-methoxyphenyl)anthracene;

FIG. 509 illustrates a 1,2,3,4-tetrafluoro-9-phenyl-10-(3,4,5-trifluorophenyl)anthracene;

FIG. 510 illustrates a 1,2,3,4-tetrafluoro-9-(4-methoxyphenyl)-10-(3,4,5-trifluorophenyl)anthracene;

FIG. 511 illustrates a 9-(2,6-difluoro-4-methoxyphenyl)-1,2,3,4-tetrafluoro-10-(3,4,5-trifluorophenyl)anthracene;

FIG. 512 illustrates a 9-(3,4-difluorophenyl)-1,2,3,4-tetrafluoro-10-(3,4,5-trifluorophenyl)anthracene;

FIG. 513 illustrates a 1,2,3,4-tetrafluoro-9-[2,3,5,6-tetrafluoro-4-(trifluoromethyl)phenyl]-10-(3,4,5-trifluorophenyl)anthracene;

FIG. 514 illustrates a 9-(2,4-difluorophenyl)-1,2,3,4-tetrafluoro-10-(3,4,5-trifluorophenyl)anthracene;

FIG. 515 illustrates a 9-(2,6-difluoro-4-methoxyphenyl)-1,2,3,4-tetrafluoro-10-phenylanthracene:

FIG. 516 illustrates a 9-(2,6-difluoro-4-methoxyphenyl)-1,2,3,4-tetrafluoro-10-(4-methoxyphenyl)anthracene:

FIG. 517 illustrates a 9-(2,6-difluoro-4-methoxyphenyl)-10-(3,4-difluorophenyl)-1,2,3,4-tetrafluoroanthracene;

FIG. 518 illustrates a 9-(2,6-difluoro-4-methoxyphenyl)-1,2,3,4-tetrafluoro-10-[2,3,5,6-tetrafluoro-4-(trifluoromethyl)phenyl]anthracene;

FIG. 519 illustrates a 9-(2,6-difluoro-4-methoxyphenyl)-1,2,3,4-tetrafluoro-10-(2,4-difluorophenyl)anthracene;

FIG. 520 illustrates a 9-(3,4-difluorophenyl)-1,2,3,4-tetrafluoro-10-phenylanthracene;

FIG. 521 illustrates a 9-(3,4-difluorophenyl)-1,2,3,4-tetrafluoro-10-(4-methoxyphenyl)anthracene;

FIG. 522 illustrates a 9-(3,4-difluorophenyl)-1,2,3,4-tetrafluoro-10-[2,3,5,6-tetrafluoro-4-(trifluoromethyl)phenyl] anthracene;

FIG. 523 illustrates a 9-(2,4-difluorophenyl)-1,2,3,4-tetrafluoro-10-(3,4-difluorophenyl)anthracene;

FIG. 524 illustrates a 1,2,3,4-tetrafluoro-9-phenyl-10-[2,3,5,6-tetrafluoro-4-(trifluoromethyl)phenyl]anthracene;

FIG. 525 illustrates a 1,2,3,4-tetrafluoro-9-(4-methoxyphenyl)-10-[2,3,5,6-tetrafluoro-4-(trifluoromethyl)phenyl] anthracene;

FIG. 526 illustrates a 9-(2,4-difluorophenyl)-1,2,3,4-tetrafluoro-10-[2,3,5,6-tetrafluoro-4-(trifluoromethyl)phenyl] anthracene;

FIG. 527 illustrates a 9-(2,4-difluorophenyl)-1,2,3,4-tetrafluoro-10-phenylanthracene;

FIG. 528 illustrates a 9-(2,4-difluorophenyl)-1,2,3,4-tetrafluoro-10-(4-methoxyphenyl)anthracene;

FIG. 529 illustrates a 1,2,3,4,5-pentafluoro-9-(2,3,4,5,6-pentafluorophenyl)-10-phenylanthracene;

FIG. 530 illustrates a 1,2,3,4,5-pentafluoro-9-(4-methoxyphenyl)-10-(2,3,4,5,6-pentafluorophenyl)anthracene;

FIG. 531 illustrates a 1,2,3,4,5-pentafluoro-9-(2,3,4,5,6-pentafluorophenyl)-10-(2,3,5,6-tetrafluorophenyl)anthracene;

FIG. 532 illustrates a 1,2,3,4,5-pentafluoro-9-(2,3,4,5,6-pentafluorophenyl)-10-(2,3,5,6-tetrafluoro-4-methoxyphenyl)anthracene;

FIG. 533 illustrates a 1,2,3,4,5-pentafluoro-9-(2,3,4,5,6-pentafluorophenyl)-10-(3,4,5-trifluoro)anthracene;

FIG. 534 illustrates a 9-(2,6-difluoro-4-methoxyphenyl)-1,2,3,4,5-pentafluoro-10-(2,3,4,5,6-pentafluorophenyl)anthracene FIG. 535 illustrates a 9-(3,4-difluorophenyl)-1,2,3,4,5-pentafluoro-10-(2,3,4,5,6-pentafluorophenyl)anthracene;

FIG. 536 illustrates a 1,2,3,4,5-pentafluoro-9-(2,3,4,5,6-pentafluorophenyl)-10-[2,3,5,6-tetrafluoro-4-(trifluoromethyl)phenyl]anthracene;

FIG. 537 illustrates a 9-(2,4-difluorophenyl)-1,2,3,4,5-pentafluoro-10-(2,3,4,5,6-pentafluorophenyl)anthracene;

FIG. 538 illustrates a 1,2,3,4,5-pentafluoro-9-phenyl-10-(2,3,5,6-tetrafluorophenyl)anthracene;

FIG. 539 illustrates a 1,2,3,4,5-pentafluoro-9-(4-methoxyphenyl)-10-(2,3,5,6-tetrafluorophenyl)anthracene;

FIG. 540 illustrates a 1,2,3,4,5-pentafluoro-9-(2,3,5,6-tetrafluorophenyl)-10-(2,3,5,6-tetrafluoro-4-methoxyphenyl) anthracene;

FIG. 541 illustrates a 1,2,3,4,5-pentafluoro-9-(2,3,5,6-tetrafluorophenyl)-10-(3,4,5-trifluorophenyl)anthracene;

FIG. 542 illustrates a 9-(2,6-difluoro-4-methoxyphenyl)-1,2,3,4,5-pentafluoro-10-(2,3,5,6-tetrafluorophenyl)anthracene;

FIG. 543 illustrates a 9-(3,4-difluorophenyl)-1,2,3,4,5-pentafluoro-10-(2,3,5,6-tetrafluorophenyl)anthracene;

FIG. 544 illustrates a 1,2,3,4,5-pentafluoro-9-[2,3,5,6-tetrafluoro-4-(trifluoromethyl)phenyl]-10-(2,3,5,6-tetrafluorophenyl)anthracene;

FIG. 545 illustrates a 9-(3,4-difluorophenyl)-1,2,3,4,5-pentafluoro-10-(2,3,5,6-tetrafluorophenyl)anthracene;

FIG. 546 illustrates a 1,2,3,4,5-pentafluoro-9-phenyl-10-(2,3,5,6-tetrafluoro-4-methoxyphenyl)anthracene;

FIG. 547 illustrates a 1,2,3,4,5-pentafluoro-9-(4-methoxyphenyl)-10-(2,3,5,6-tetrafluoro-4-methoxyphenyl)anthracene;

FIG. 548 illustrates a 1,2,3,4,5-pentafluoro-9-(2,3,5,6-tetrafluoro-4-methoxyphenyl)-10-(3,4,5-trifluorophenyl)anthracene;

FIG. 549 illustrates a 9-(2,6-difluoro-4-methoxyphenyl)-1,2,3,4,5-pentafluoro-10-(2,3,5,6-tetrafluoro-4-methoxyphenyl)anthracene;

FIG. 550 illustrates a 9-(3,4-difluorophenyl)-1,2,3,4,5-pentafluoro-10-(2,3,5,6-tetrafluoro-4-methoxyphenyl)anthracene;

FIG. 551 illustrates a 1,2,3,4,5-pentafluoro-9-[2,3,5,6-tetrafluoro-4-(trifluoromethyl)phenyl]-10-(2,3,5,6-tetrafluoro-4-methoxyphenyl)anthracene;

FIG. 552 illustrates a 9-(2,4-difluorophenyl)-1,2,3,4,5-pentafluoro-10-(2,3,5,6-tetrafluoro-4-methoxyphenyl)anthracene;

FIG. 553 illustrates a 1,2,3,4,5-pentafluoro-9-phenyl-10-(3,4,5-trifluorophenyl)anthracene;

FIG. 554 illustrates a 1,2,3,4,5-pentafluoro-9-(4-methoxyphenyl)-10-(3,4,5-trifluorophenyl)anthracene;

FIG. 555 illustrates a 9-(2,6-difluoro-4-methoxyphenyl)-1,2,3,4,5-pentafluoro-10-(3,4,5-trifluorophenyl)anthracene;

FIG. 556 illustrates a 9-(3,4-difluorophenyl)-1,2,3,4,5-pentafluoro-10-(3,4,5-trifluorophenyl)anthracene;

FIG. 557 illustrates a 1,2,3,4,5-pentafluoro-9-[2,3,5,6-tetrafluoro-4-(trifluoromethyl)phenyl]-10-(3,4,5-trifluorophenyl)anthracene;

FIG. 558 illustrates a 9-(2,4-difluorophenyl)-1,2,3,4,5-pentafluoro-10-(3,4,5-trifluorophenyl)anthracene;

FIG. 559 illustrates a 9-(2,6-difluoro-4-methoxyphenyl)-1,2,3,4,5-pentafluoro-10-phenylanthracene:

FIG. 560 illustrates a 9-(2,6-difluoro-4-methoxyphenyl)-1,2,3,4,5-pentafluoro-10-(4-methoxyphenyl)anthracene:

FIG. 561 illustrates a 9-(2,6-difluoro-4-methoxyphenyl)-10-(3,4-difluorophenyl)-1,2,3,4,5-pentafluoroanthracene;

FIG. 562 illustrates a 9-(2,6-difluoro-4-methoxyphenyl)-1,2,3,4,5-pentafluoro-10-[2,3,5,6-tetrafluoro-4-(trifluoromethyl)phenyl]anthracene;

FIG. 563 illustrates a 9-(2,6-difluoro-4-methoxyphenyl)-1,2,3,4,5-pentafluoro-10-(2,4-difluorophenyl)anthracene;

FIG. 564 illustrates a 9-(3,4-difluorophenyl)-1,2,3,4,5-pentafluoro-10-phenylanthracene;

FIG. 565 illustrates a 9-(3,4-difluorophenyl)-1,2,3,4,5-pentafluoro-10-(4-methoxyphenyl)anthracene;

FIG. 566 illustrates a 9-(3,4-difluorophenyl)-1,2,3,4,5-pentafluoro-10-[2,3,5,6-tetrafluoro-4-(trifluoromethyl)phenyl]anthracene;

FIG. 567 illustrates a 9-(2,4-difluorophenyl)-1,2,3,4,5-pentafluoro-10-(3,4-difluorophenyl)anthracene;

FIG. 568 illustrates a 1,2,3,4,5-pentafluoro-9-phenyl-10-[2,3,5,6-tetrafluoro-4-(trifluoromethyl)phenyl]anthracene;

FIG. 569 illustrates a 1,2,3,4,5-pentafluoro-9-(4-methoxyphenyl)-10-[2,3,5,6-tetrafluoro-4-(trifluoromethyl)phenyl]anthracene;

FIG. 570 illustrates a 9-(2,4-difluorophenyl)-1,2,3,4,5-pentafluoro-10-[2,3,5,6-tetrafluoro-4-(trifluoromethyl)phenyl]anthracene;

FIG. 571 illustrates a 9-(2,4-difluorophenyl)-1,2,3,4,5-pentafluoro-10-phenylanthracene;

FIG. 572 illustrates a 9-(2,4-difluorophenyl)-1,2,3,4,5-pentafluoro-10-(4-methoxyphenyl)anthracene;

FIG. 573 illustrates a 1,2,3,4,6-pentafluoro-9-(2,3,4,5,6-pentafluorophenyl)-10-phenylanthracene;

FIG. 574 illustrates a 1,2,3,4,6-pentafluoro-9-(4-methoxyphenyl)-10-(2,3,4,5,6-pentafluorophenyl)anthracene;

FIG. 575 illustrates a 1,2,3,4,6-pentafluoro-9-(2,3,4,5,6-pentafluorophenyl)-10-(2,3,5,6-tetrafluorophenyl)anthracene;

FIG. 576 illustrates a 1,2,3,4,6-pentafluoro-9-(2,3,4,5,6-pentafluorophenyl)-10-(2,3,5,6-tetrafluoro-4-methoxyphenyl)anthracene;

FIG. 577 illustrates a 1,2,3,4,6-pentafluoro-9-(2,3,4,5,6-pentafluorophenyl)-10-(3,4,5-trifluoro)anthracene;

FIG. 578 illustrates a 9-(2,6-difluoro-4-methoxyphenyl)-1,2,3,4,6-pentafluoro-10-(2,3,4,5,6-pentafluorophenyl)anthracene FIG. 579 illustrates a 9-(3,4-difluorophenyl)-1,2,3,4,6-pentafluoro-10-(2,3,4,5,6-pentafluorophenyl)anthracene;

FIG. 580 illustrates a 1,2,3,4,6-pentafluoro-9-(2,3,4,5,6-pentafluorophenyl)-10-[2,3,5,6-tetrafluoro-4-(trifluoromethyl)phenyl]anthracene;

FIG. 581 illustrates a 9-(2,4-difluorophenyl)-1,2,3,4,6-pentafluoro-10-(2,3,4,5,6-pentafluorophenyl)anthracene;

FIG. 582 illustrates a 1,2,3,4,6-pentafluoro-9-phenyl-10-(2,3,5,6-tetrafluorophenyl)anthracene;

FIG. 583 illustrates a 1,2,3,4,6-pentafluoro-9-(4-methoxyphenyl)-10-(2,3,5,6-tetrafluorophenyl)anthracene;

FIG. 584 illustrates a 1,2,3,4,6-pentafluoro-9-(2,3,5,6-tetrafluorophenyl)-10-(2,3,5,6-tetrafluoro-4-methoxyphenyl) anthracene;

FIG. 585 illustrates a 1,2,3,4,6-pentafluoro-9-(2,3,5,6-tetrafluorophenyl)-10-(3,4,5-trifluorophenyl)anthracene;

FIG. 586 illustrates a 9-(2,6-difluoro-4-methoxyphenyl)-1,2,3,4,6-pentafluoro-10-(2,3,5,6-tetrafluorophenyl)anthracene;

FIG. 587 illustrates a 9-(3,4-difluorophenyl)-1,2,3,4,6-pentafluoro-10-(2,3,5,6-tetrafluorophenyl)anthracene;

FIG. 588 illustrates a 1,2,3,4,6-pentafluoro-9-[2,3,5,6-tetrafluoro-4-(trifluoromethyl)phenyl]-10-(2,3,5,6-tetrafluorophenyl)anthracene;

FIG. 589 illustrates a 9-(3,4-difluorophenyl)-1,2,3,4,6-pentafluoro-10-(2,3,5,6-tetrafluorophenyl)anthracene;

FIG. 590 illustrates a 1,2,3,4,6-pentafluoro-9-phenyl-10-(2,3,5,6-tetrafluoro-4-methoxyphenyl)anthracene;

FIG. 591 illustrates a 1,2,3,4,6-pentafluoro-9-(4-methoxyphenyl)-10-(2,3,5,6-tetrafluoro-4-methoxyphenyl)anthracene;

FIG. 592 illustrates a 1,2,3,4,6-pentafluoro-9-(2,3,5,6-tetrafluoro-4-methoxyphenyl)-10-(3,4,5-trifluorophenyl)anthracene;

FIG. 593 illustrates a 9-(2,6-difluoro-4-methoxyphenyl)-1,2,3,4,6-pentafluoro-10-(2,3,5,6-tetrafluoro-4-methoxyphenyl)anthracene;

FIG. 594 illustrates a 9-(3,4-difluorophenyl)-1,2,3,4,6-pentafluoro-10-(2,3,5,6-tetrafluoro-4-methoxyphenyl)anthracene;

FIG. 595 illustrates a 1,2,3,4,6-pentafluoro-9-[2,3,5,6-tetrafluoro-4-(trifluoromethyl)phenyl]-10-(2,3,5,6-tetrafluoro-4-methoxyphenyl)anthracene;

FIG. 596 illustrates a 9-(2,4-difluorophenyl)-1,2,3,4,6-pentafluoro-10-(2,3,5,6-tetrafluoro-4-methoxyphenyl)anthracene;

FIG. 597 illustrates a 1,2,3,4,6-pentafluoro-9-phenyl-10-(3,4,5-trifluorophenyl)anthracene;

FIG. 598 illustrates a 1,2,3,4,6-pentafluoro-9-(4-methoxyphenyl)-10-(3,4,5-trifluorophenyl)anthracene;

FIG. 599 illustrates a 9-(2,6-difluoro-4-methoxyphenyl)-1,2,3,4,6-pentafluoro-10-(3,4,5-trifluorophenyl)anthracene;

FIG. 600 illustrates a 9-(3,4-difluorophenyl)-1,2,3,4,6-pentafluoro-10-(3,4,5-trifluorophenyl)anthracene;

FIG. 601 illustrates a 1,2,3,4,6-pentafluoro-9-[2,3,5,6-tetrafluoro-4-(trifluoromethyl)phenyl]-10-(3,4,5-trifluorophenyl)anthracene;

FIG. 602 illustrates a 9-(2,4-difluorophenyl)-1,2,3,4,6-pentafluoro-10-(3,4,5-trifluorophenyl)anthracene;

FIG. 603 illustrates a 9-(2,6-difluoro-4-methoxyphenyl)-1,2,3,4,6-pentafluoro-10-phenylanthracene:

FIG. 604 illustrates a 9-(2,6-difluoro-4-methoxyphenyl)-1,2,3,4,6-pentafluoro-10-(4-methoxyphenyl)anthracene:

FIG. 605 illustrates a 9-(2,6-difluoro-4-methoxyphenyl)-10-(3,4-difluorophenyl)-1,2,3,4,6-pentafluoroanthracene;

FIG. 606 illustrates a 9-(2,6-difluoro-4-methoxyphenyl)-1,2,3,4,6-pentafluoro-10-[2,3,5,6-tetrafluoro-4-(trifluoromethyl)phenyl]anthracene;

FIG. 607 illustrates a 9-(2,6-difluoro-4-methoxyphenyl)-1,2,3,4,6-pentafluoro-10-(2,4-difluorophenyl)anthracene;

FIG. 608 illustrates a 9-(3,4-difluorophenyl)-1,2,3,4,6-pentafluoro-10-phenylanthracene;

FIG. 609 illustrates a 9-(3,4-difluorophenyl)-1,2,3,4,6-pentafluoro-10-(4-methoxyphenyl)anthracene;

FIG. 610 illustrates a 9-(3,4-difluorophenyl)-1,2,3,4,6-pentafluoro-10-[2,3,5,6-tetrafluoro-4-(trifluoromethyl)phenyl]anthracene;

FIG. 611 illustrates a 9-(2,4-difluorophenyl)-1,2,3,4,6-pentafluoro-10-(3,4-difluorophenyl)anthracene;

FIG. 612 illustrates a 1,2,3,4,6-pentafluoro-9-phenyl-10-[2,3,5,6-tetrafluoro-4-(trifluoromethyl)phenyl]anthracene;

FIG. 613 illustrates a 1,2,3,4,6-pentafluoro-9-(4-methoxyphenyl)-10-[2,3,5,6-tetrafluoro-4-(trifluoromethyl)phenyl] anthracene;

FIG. 614 illustrates a 9-(2,4-difluorophenyl)-1,2,3,4,6-pentafluoro-10-[2,3,5,6-tetrafluoro-4-(trifluoromethyl)phenyl]anthracene;

FIG. 615 illustrates a 9-(2,4-difluorophenyl)-1,2,3,4,6-pentafluoro-10-phenylanthracene;

FIG. 616 illustrates a 9-(2,4-difluorophenyl)-1,2,3,4,6-pentafluoro-10-(4-methoxyphenyl)anthracene;

FIG. 617 illustrates a 1,2,3,4,5,6,7,8-octafluoro-9-(2,3,4,5,6-pentafluorophenyl)-10-phenylanthracene;

FIG. 618 illustrates a 1,2,3,4,5,6,7,8-octafluoro-9-(4-methoxyphenyl)-10-(2,3,4,5,6-pentafluorophenyl)anthracene;

FIG. 619 illustrates a 1,2,3,4,5,6,7,8-octafluoro-9-(2,3,4,5,6-pentafluorophenyl)-10-(2,3,5,6-tetrafluorophenyl)anthracene;

FIG. 620 illustrates a 1,2,3,4,5,6,7,8-octafluoro-9-(2,3,4,5,6-pentafluorophenyl)-10-(2,3,5,6-tetrafluoro-4-methoxyphenyl)anthracene;

FIG. 621 illustrates a 1,2,3,4,5,6,7,8-octafluoro-9-(2,3,4,5,6-pentafluorophenyl)-10-(3,4,5-trifluoro)anthracene;

FIG. 622 illustrates a 9-(2,6-difluoro-4-methoxyphenyl)-1,2,3,4,5,6,7,8-octafluoro-10-(2,3,4,5,6-pentafluorophenyl) anthracene FIG. 623 illustrates a 9-(3,4-difluorophenyl)-1,2,3,4,5,6,7,8-octafluoro-10-(2,3,4,5,6-pentafluorophenyl)anthracene;

FIG. 624 illustrates a 1,2,3,4,5,6,7,8-octafluoro-9-(2,3,4,5,6-pentafluorophenyl)-10-[2,3,5,6-tetrafluoro-4-(trifluoromethyl)phenyl]anthracene;

FIG. 625 illustrates a 9-(2,4-difluorophenyl)-1,2,3,4,5,6,7,8-octafluoro-10-(2,3,4,5,6-pentafluorophenyl)anthracene;

FIG. 626 illustrates a 1,2,3,4,5,6,7,8-octafluoro-9-phenyl-10-(2,3,5,6-tetrafluorophenyl)anthracene;

FIG. 627 illustrates a 1,2,3,4,5,6,7,8-octafluoro-9-(4-methoxyphenyl)-10-(2,3,5,6-tetrafluorophenyl)anthracene;

FIG. 628 illustrates a 1,2,3,4,5,6,7,8-octafluoro-9-(2,3,5,6-tetrafluorophenyl)-10-(2,3,5,6-tetrafluoro-4-methoxyphenyl)anthracene;

FIG. 629 illustrates a 1,2,3,4,5,6,7,8-octafluoro-9-(2,3,5,6-tetrafluorophenyl)-10-(3,4,5-trifluorophenyl)anthracene;

FIG. 630 illustrates a 9-(2,6-difluoro-4-methoxyphenyl)-1,2,3,4,5,6,7,8-octafluoro-10-(2,3,5,6-tetrafluorophenyl)anthracene;

FIG. 631 illustrates a 9-(3,4-difluorophenyl)-1,2,3,4,5,6,7,8-octafluoro-10-(2,3,5,6-tetrafluorophenyl)anthracene;

FIG. 632 illustrates a 1,2,3,4,5,6,7,8-octafluoro-9-[2,3,5,6-tetrafluoro-4-(trifluoromethyl)phenyl]-10-(2,3,5,6-tetrafluorophenyl)anthracene;

FIG. 633 illustrates a 9-(3,4-difluorophenyl)-1,2,3,4,5,6,7,8-octafluoro-10-(2,3,5,6-tetrafluorophenyl)anthracene;

FIG. 634 illustrates a 1,2,3,4,5,6,7,8-octafluoro-9-phenyl-10-(2,3,5,6-tetrafluoro-4-methoxyphenyl)anthracene;

FIG. 635 illustrates a 1,2,3,4,5,6,7,8-octafluoro-9-(4-methoxyphenyl)-10-(2,3,5,6-tetrafluoro-4-methoxyphenyl) anthracene;

FIG. 636 illustrates a 1,2,3,4,5,6,7,8-octafluoro-9-(2,3,5,6-tetrafluoro-4-methoxyphenyl)-10-(3,4,5-trifluorophenyl) anthracene;

FIG. 637 illustrates a 9-(2,6-difluoro-4-methoxyphenyl)-1,2,3,4,5,6,7,8-octafluoro-10-(2,3,5,6-tetrafluoro-4-methoxyphenyl)anthracene;

FIG. 638 illustrates a 9-(3,4-difluorophenyl)-1,2,3,4,5,6,7,8-octafluoro-10-(2,3,5,6-tetrafluoro-4-methoxyphenyl)anthracene;

FIG. 639 illustrates a 1,2,3,4,5,6,7,8-octafluoro-9-[2,3,5,6-tetrafluoro-4-(trifluoromethyl)phenyl]-10-(2,3,5,6-tetrafluoro-4-methoxyphenyl)anthracene;

FIG. 640 illustrates a 9-(2,4-difluorophenyl)-1,2,3,4,5,6,7,8-octafluoro-10-(2,3,5,6-tetrafluoro-4-methoxyphenyl)anthracene;

FIG. 641 illustrates a 1,2,3,4,5,6,7,8-octafluoro-9-phenyl-10-(3,4,5-trifluorophenyl)anthracene;

FIG. 642 illustrates a 1,2,3,4,5,6,7,8-octafluoro-9-(4-methoxyphenyl)-10-(3,4,5-trifluorophenyl)anthracene;

FIG. 643 illustrates a 9-(2,6-difluoro-4-methoxyphenyl)-1,2,3,4,5,6,7,8-octafluoro-10-(3,4,5-trifluorophenyl)anthracene;

FIG. 644 illustrates a 9-(3,4-difluorophenyl)-1,2,3,4,5,6,7,8-octafluoro-10-(3,4,5-trifluorophenyl)anthracene;

FIG. 645 illustrates a 1,2,3,4,5,6,7,8-octafluoro-9-[2,3,5,6-tetrafluoro-4-(trifluoromethyl)phenyl]-10-(3,4,5-trifluorophenyl)anthracene;

FIG. 646 illustrates a 9-(2,4-difluorophenyl)-1,2,3,4,5,6,7,8-octafluoro-10-(3,4,5-trifluorophenyl)anthracene;

FIG. 647 illustrates a 9-(2,6-difluoro-4-methoxyphenyl)-1,2,3,4,5,6,7,8-octafluoro-10-phenylanthracene:

FIG. 648 illustrates a 9-(2,6-difluoro-4-methoxyphenyl)-1,2,3,4,5,6,7,8-octafluoro-10-(4-methoxyphenyl)anthracene:

FIG. 649 illustrates a 9-(2,6-difluoro-4-methoxyphenyl)-10-(3,4-difluorophenyl)-1,2,3,4,5,6,7,8-octafluoroanthracene;

FIG. 650 illustrates a 9-(2,6-difluoro-4-methoxyphenyl)-1,2,3,4,5,6,7,8-octafluoro-10-[2,3,5,6-tetrafluoro-4-(trifluoromethyl)phenyl]anthracene;

FIG. 651 illustrates a 9-(2,6-difluoro-4-methoxyphenyl)-1,2,3,4,5,6,7,8-octafluoro-10-(2,4-difluorophenyl)anthracene;

FIG. 652 illustrates a 9-(3,4-difluorophenyl)-1,2,3,4,5,6,7,8-octafluoro-10-phenylanthracene;

FIG. 653 illustrates a 9-(3,4-difluorophenyl)-1,2,3,4,5,6,7,8-octafluoro-10-(4-methoxyphenyl)anthracene;

FIG. 654 illustrates a 9-(3,4-difluorophenyl)-1,2,3,4,5,6,7,8-octafluoro-10-[2,3,5,6-tetrafluoro-4-(trifluoromethyl)phenyl]anthracene;

FIG. 655 illustrates a 9-(2,4-difluorophenyl)-1,2,3,4,5,6,7,8-octafluoro-10-(3,4-difluorophenyl)anthracene;

FIG. 656 illustrates a 1,2,3,4,5,6,7,8-octafluoro-9-phenyl-10-[2,3,5,6-tetrafluoro-4-(trifluoromethyl)phenyl]anthracene;

FIG. 657 illustrates a 1,2,3,4,5,6,7,8-octafluoro-9-(4-methoxyphenyl)-10-[2,3,5,6-tetrafluoro-4-(trifluoromethyl)phenyl]anthracene;

FIG. 658 illustrates a 9-(2,4-difluorophenyl)-1,2,3,4,5,6,7,8-octafluoro-10-[2,3,5,6-tetrafluoro-4-(trifluoromethyl)phenyl]anthracene;

FIG. 659 illustrates a 9-(2,4-difluorophenyl)-1,2,3,4,5,6,7,8-octafluoro-10-phenylanthracene;

FIG. 660 illustrates a 9-(2,4-difluorophenyl)-1,2,3,4,5,6,7,8-octafluoro-10-(4-methoxyphenyl)anthracene;

FIG. 661 is a graph which illustrates chemiluminescent systems containing several of the instantly disclosed anthracene fluorescers, which are shown to produce light having an emission maximum from about 390 nm to less than 438 nm.

DETAILED DESCRIPTION OF THE INVENTION

The present invention can be achieved by providing a compound represented by Formula (1):

(1)

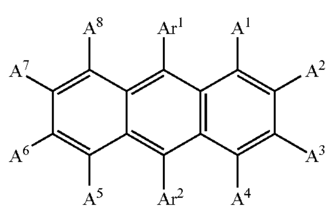

wherein $Ar^1$ has a structure represented by Formula (2), where An shows the attachment to the anthracene ring as described in Formula (1), (2)

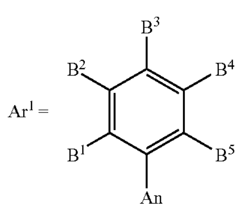

wherein $Ar^2$ has a structure represented by Formula (3), where An shows the attachment to the anthracene ring, (3)

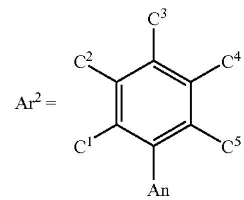

wherein $Ar^1$ and $Ar^2$ are the same or different from each other.

The new species of anthracenes according to the invention may be prepared by a method, according to one of the Reaction Schemes given below.

Reaction Scheme 1

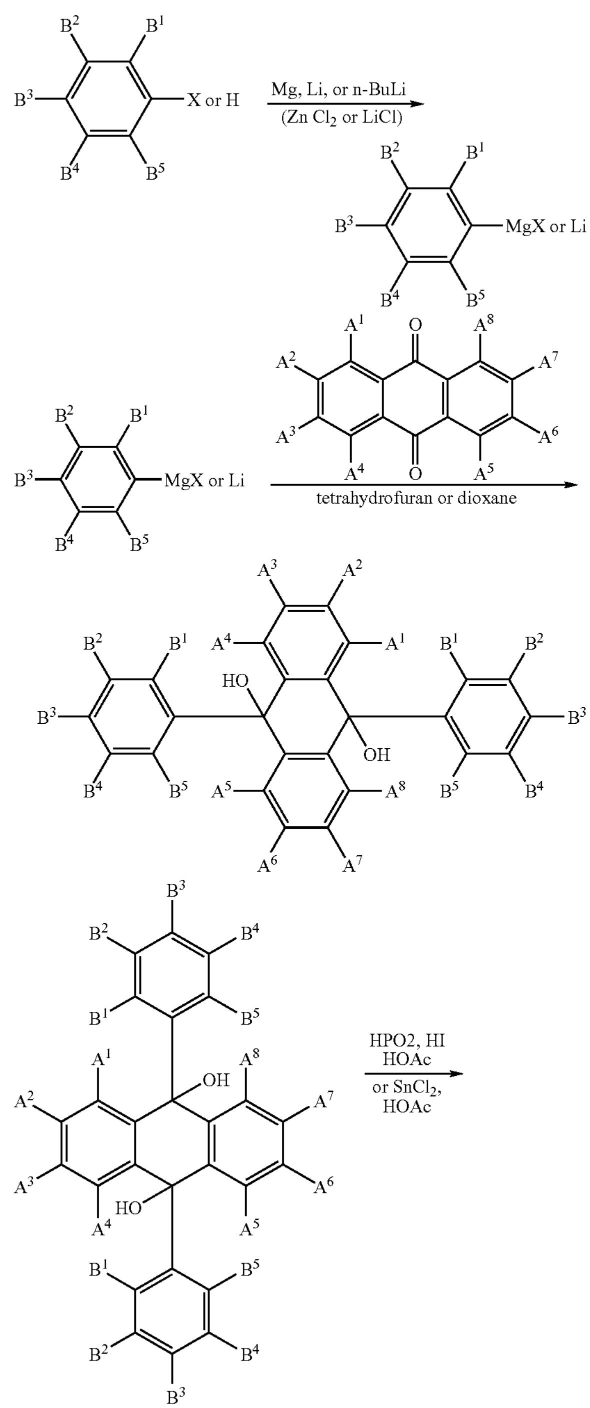

-continued

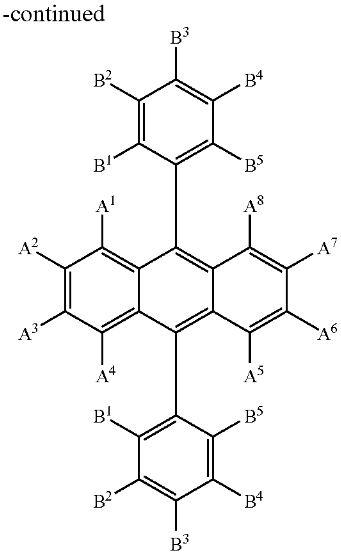

One process of the present invention, as shown in Reaction Scheme 1, to obtain derivatives in Formula (1) where $Ar^1$ and $Ar^2$ are the same may be described as a synthetic process comprising steps of:

a) generation of a fluorinated aryl organometallic metallic reagent by the reaction of an fluorinated aryl halide with magnesium or n-butyllithium or by the substitution of an aryl hydrogen using n-butyllithium;

b) reaction of the organometallic reagent [RMgX or RLi] with an anthraquinone derivative to form a diol, wherein R is represented by Formula 2 and X may be a halogen. It is further contemplated that this reaction may be carried out in the presence of lithium chloride or zinc chloride;

c) reduction of said diol to form a DPHA derivative using either a combination of sodium hypophosphite and potassium iodide in acetic acid (U.S. Pat. No. 5,232,635 to Van Moer et al) or a solution of stannous chloride in a solution of stannous chloride in glacial acetic acid (U.S. Pat. No. 6,740,263 to Park et al).

wherein, $A^1$, $A^2$, $A^3$, $A^4$, $A^5$, $A^6$, $A^7$, and $A^8$ represents one selected from the group consisting of hydrogen or fluorine, and $B^1$, $B^2$, $B^4$, and $B^5$ represents one selected from the group consisting of hydrogen and fluorine, where at least two of these are fluorine, and $B^3$ represents one selected from a group consisting of hydrogen, fluorine, trifluoromethyl, and an alkoxy group with 1-10 carbons.

(4)

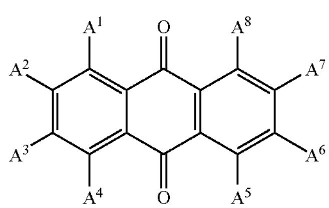

Fluorinated anthraquinones represented by Formula (4) may be purchased from commercial sources or made as described by Tannaci et al. (*J. Org. Chem.* 2007, 72, 5567-5573), Mallory et al. (*J. Am. Chem. Soc.* 1990, 112, 2577-2581), and Moer et al. (U.S. Pat. No. 5,232,635).

Reaction Scheme 2

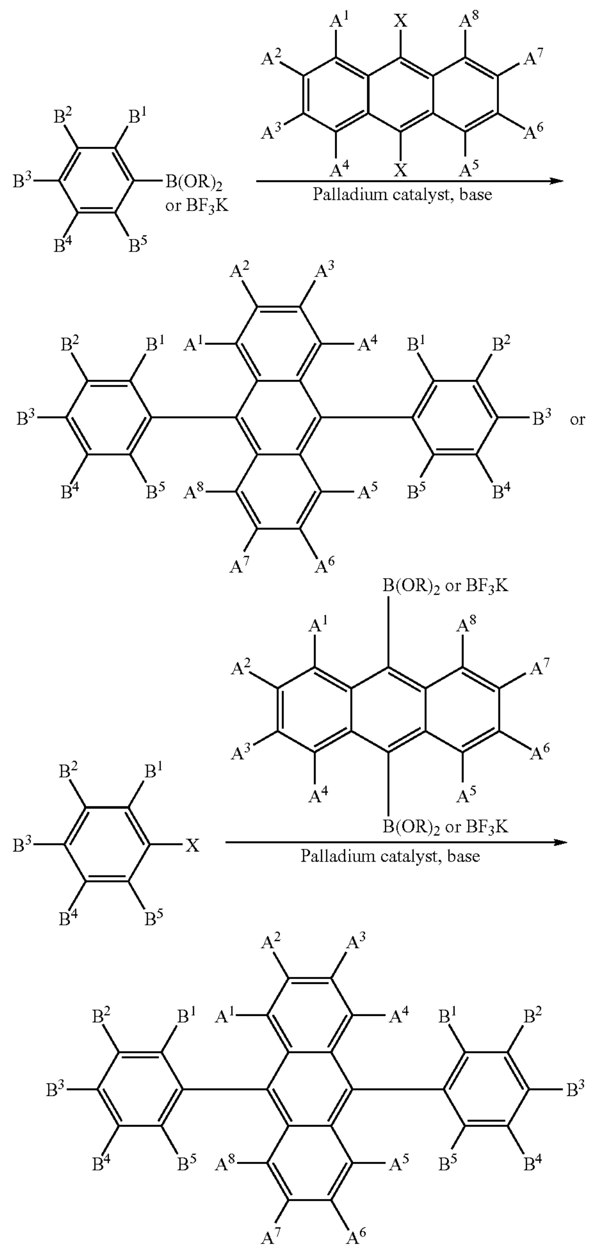

Alternatively, symmetrical derivatives may be made via the Suzuki-Miyaura reaction or variation thereof using either a 9,10-dichloroanthracene, 9,10-dibromoanthracene, or 9,10-diiodoanthracene derivative and an aryl boronic acid, boronic ester, or trifluoroborate. Additionally, a 9,10-anthracenediboronic acid, equivalent ester, or trifluoroborate can be reacted with an aryl halide or triflate. Both pathways are as shown in Reaction Scheme 2 comprising the reaction of:

a) a boronic acid, dialkylboronate ester, or trifluoroborate indicated by $B(OR)_2$, or $BF_3K$ with the preferred examples being the boronic acid, the dimethyl ester of the boronic acid, or the picolinate ester of boronic acid, an aryl species, where X is either bromine, iodine, or a triflate, with the preferred example being bromine, a palladium catalyst from a large family of commercially available compounds, with the preferred examples being palladium(II) acetate, tetrakis(triphenylphosphine)palladium(0), and dichlorobis(chlorodi-tert-butylphosphine)palladium(II), a suitable base, with the preferred examples being potassium phosphate, sodium carbonate, potassium carbonate, and potassium fluoride, a suitable solvent, with the preferred examples being toluene, tetrahydrofuran, isopropanol, and 1,2-dimethoxyethane.

Reaction Scheme 3

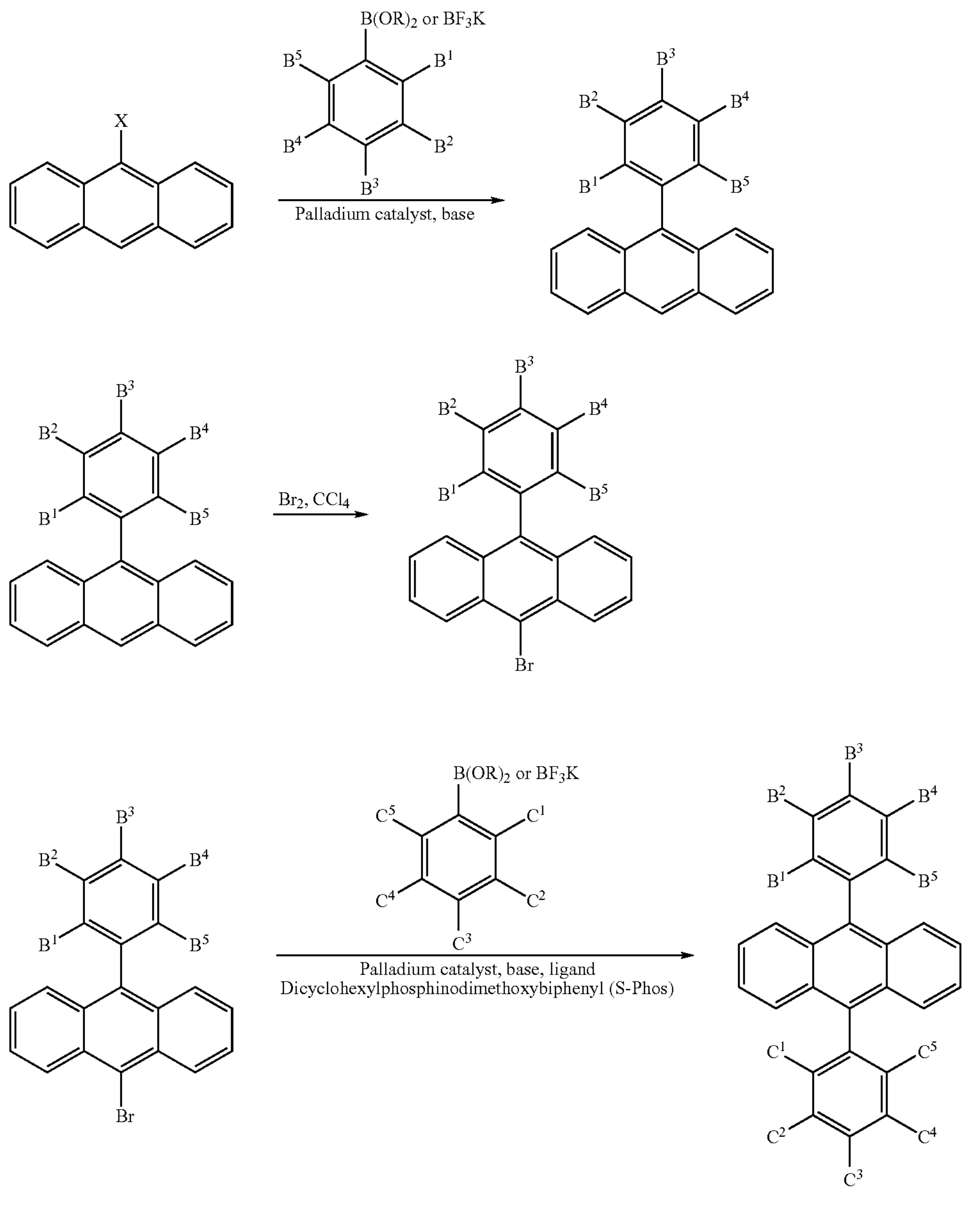

Figure 2:
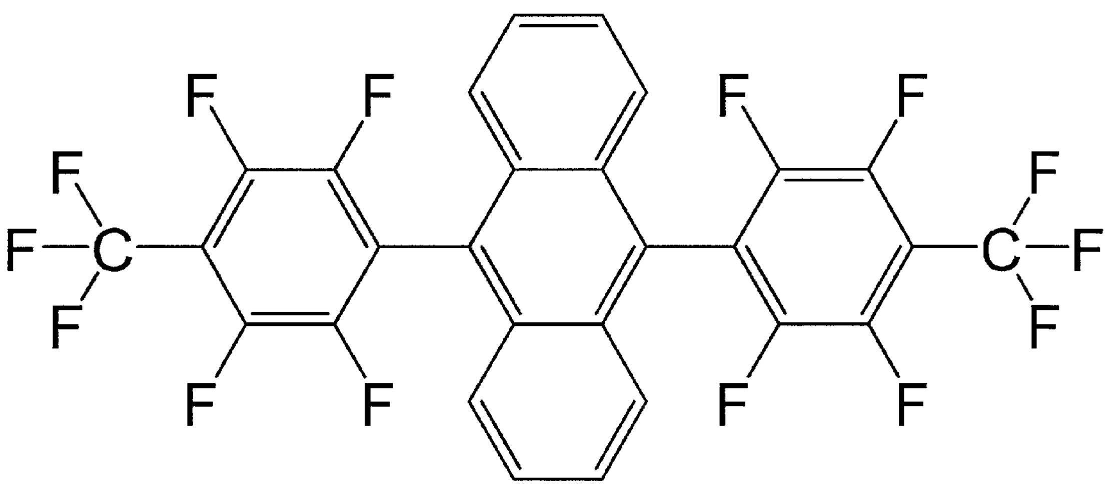
FIG. 2 illustrates a 9,10-bis[2,3,5,6-tetrafluoro-4-(trifluoromethyl)phenyl]anthracene.
Figure 3:
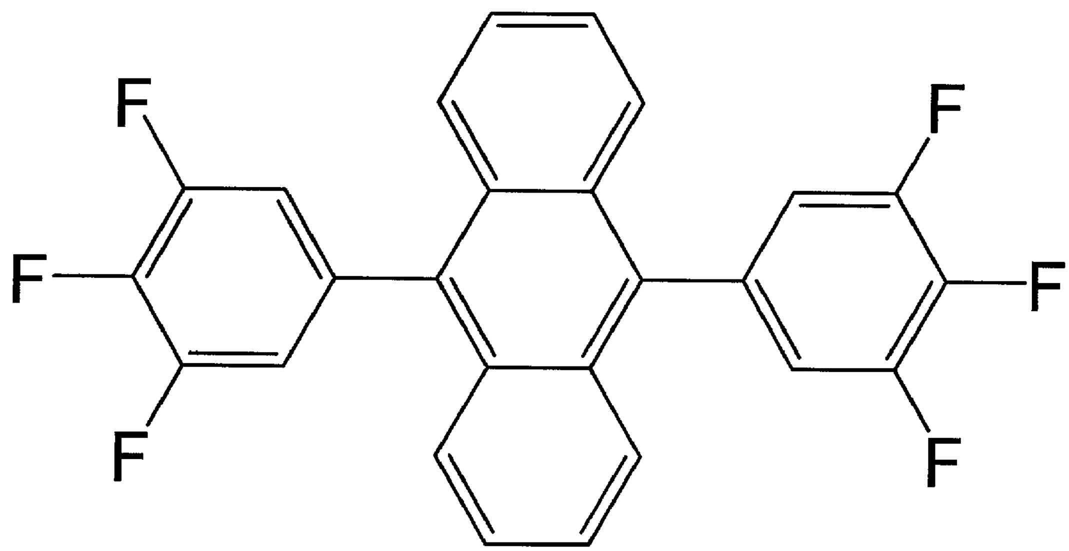
FIG. 3 illustrates a 9,10-bis(3,4,5-trifluorophenyl)anthracene
Figure 4:
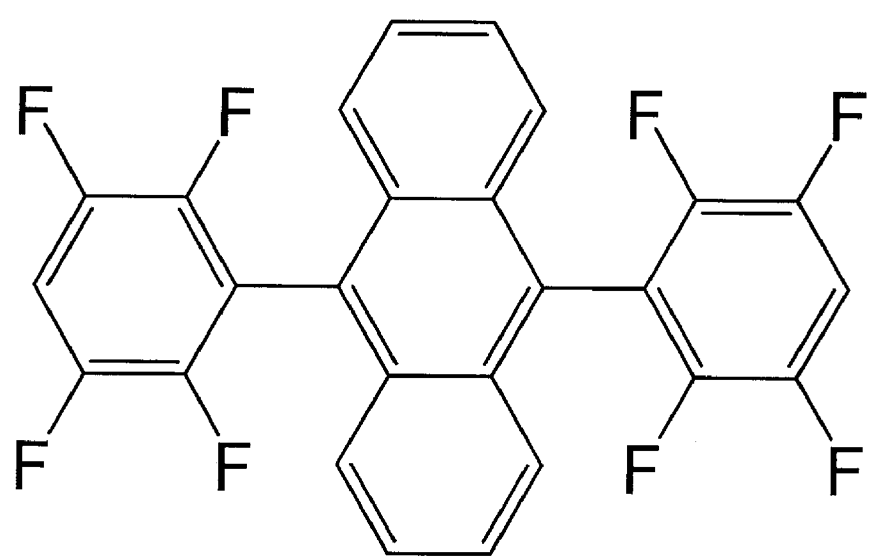
FIG. 4 illustrates a 9,10-bis(2,3,5,6-tetrafluorophenyl)anthracene.
Figure 5:
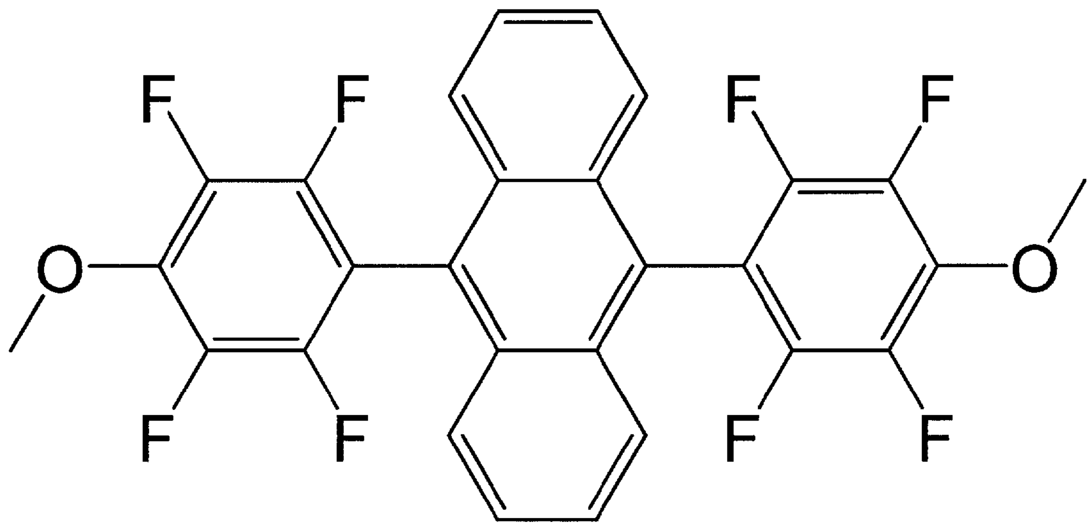
FIG. 5 illustrates a 9,10-bis(2,3,5,6-tetrafluoro-4-methoxyphenyl)anthracene.
Figure 6:
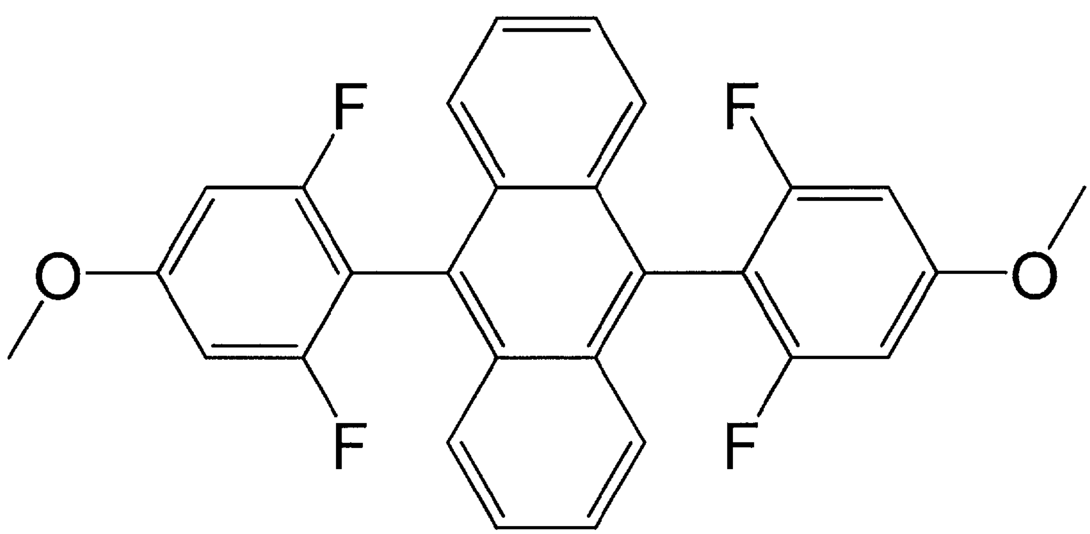
FIG. 6 illustrates a 9,10-bis(2,6-difluoro-4-methoxyphenyl)anthracene.
Figure 7:
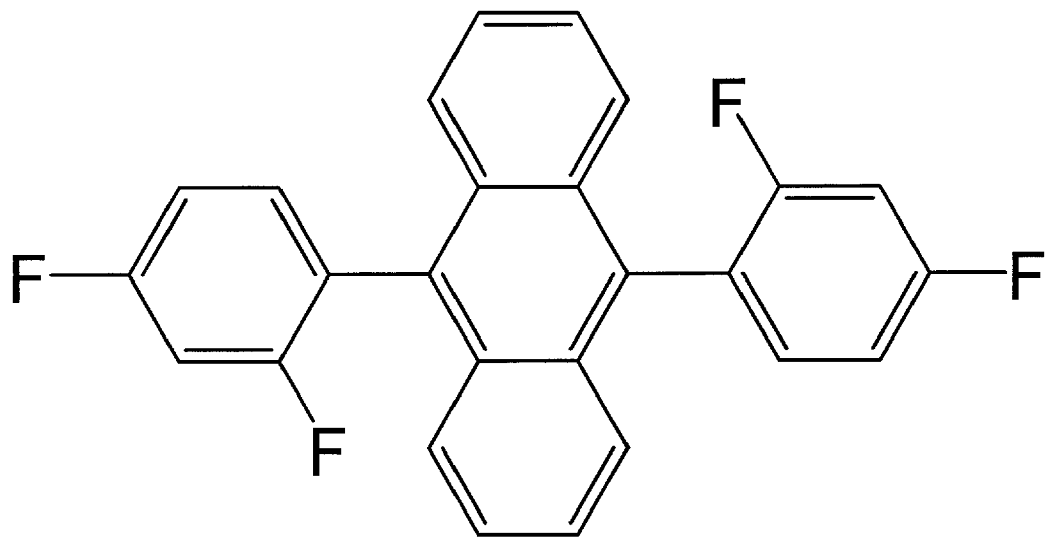
FIG. 7 illustrates a 9,10-bis(2,4-difluorophenyl)anthracene
Figure 8:
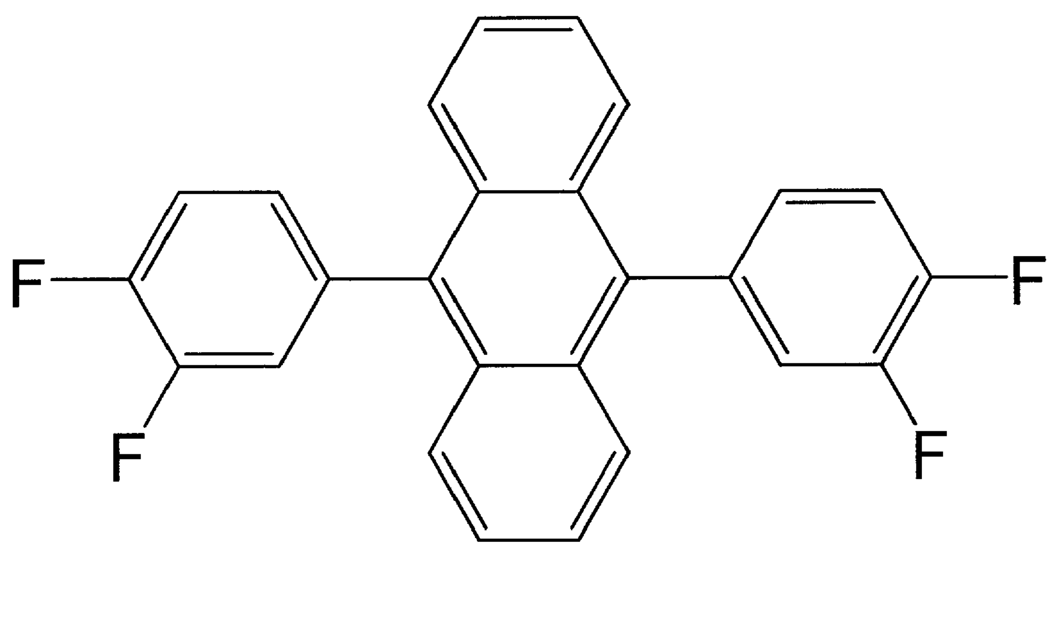
FIG. 8 illustrates a 9,10-bis(3,4-difluorophenyl)anthracene.
Figure 9:
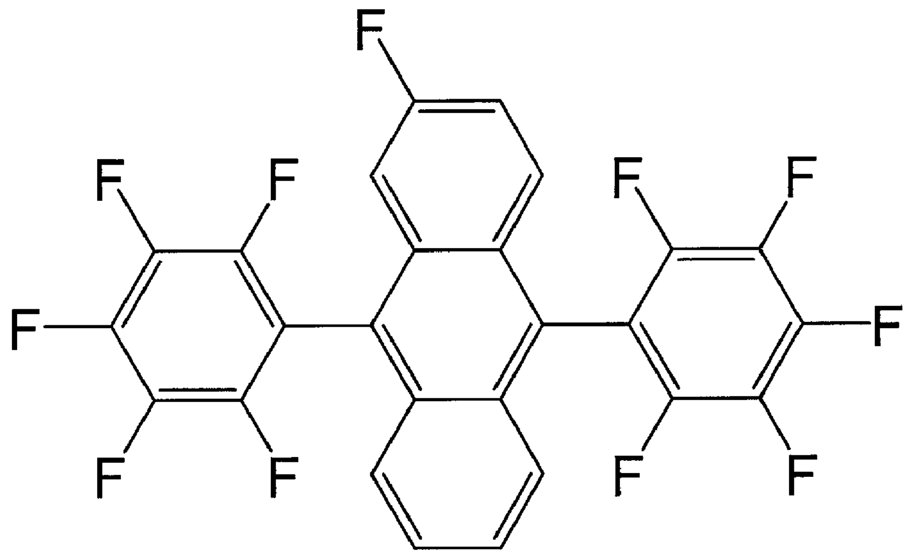
FIG. 9 illustrates a 2-fluoro-9,10-bis(2,3,4,5,6-pentafluorophenyl)anthracene.
Figure 10:
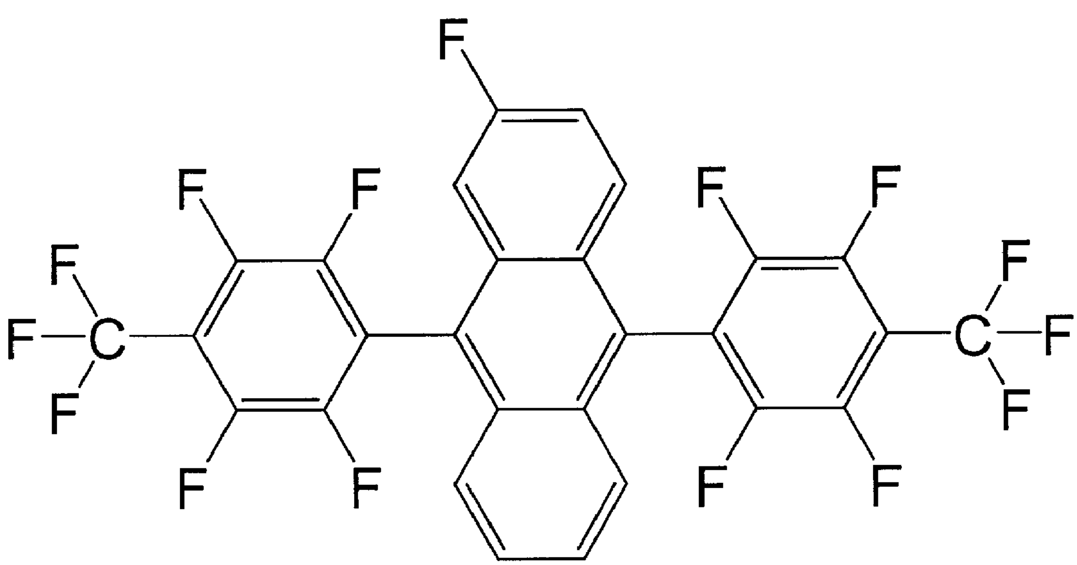
FIG. 10 illustrates a 2-fluoro-9,10-bis[2,3,5,6-tetrafluoro-4-(trifluoromethyl)phenyl]anthracene.
Figure 11:
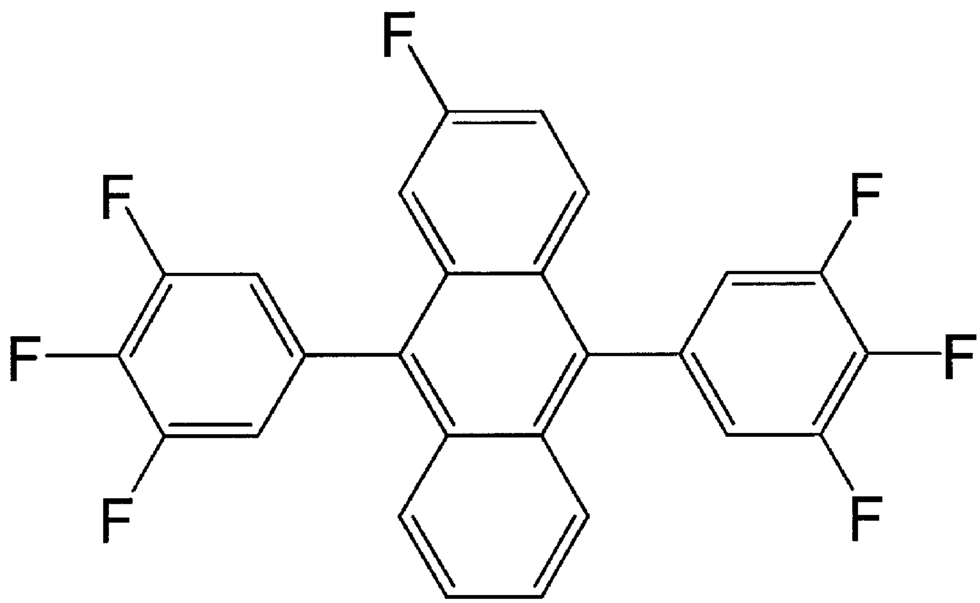
FIG. 11 illustrates a 2-fluoro-9,10-bis(3,4,5-trifluorophenyl)anthracene
Figure 12:
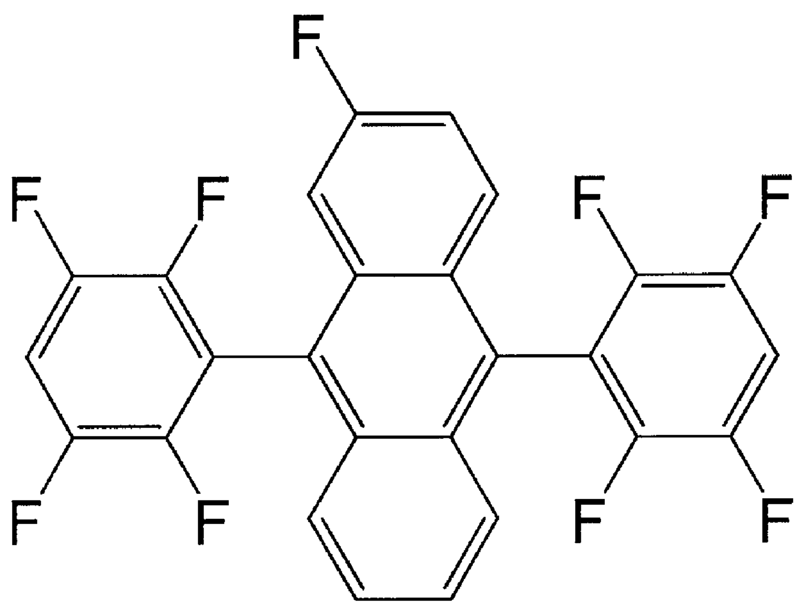
FIG. 12 illustrates a 2-fluoro-9,10-bis(2,3,5,6-tetrafluorophenyl)anthracene.
Figure 13:
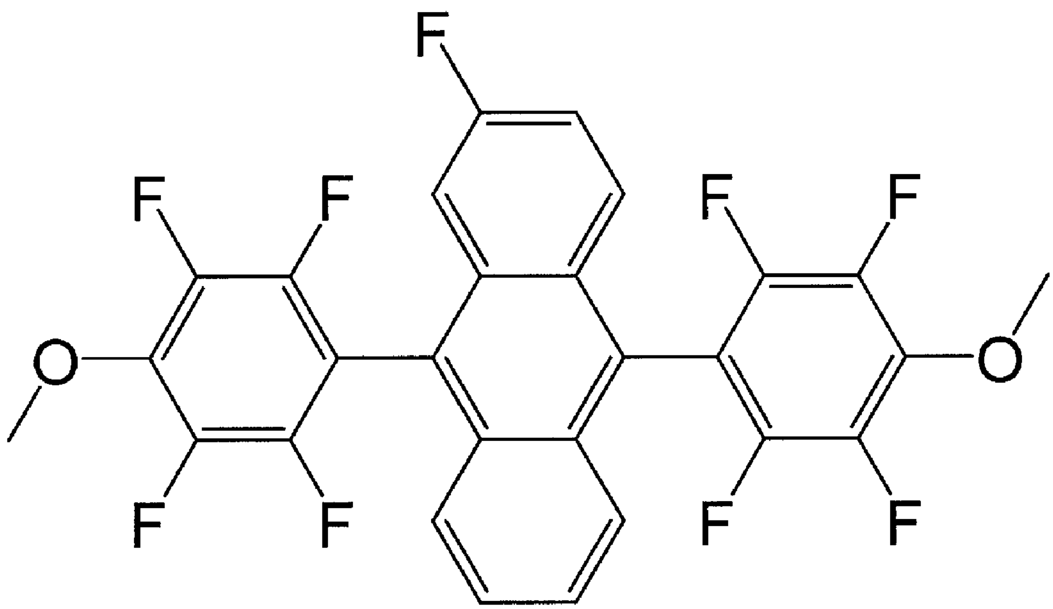
FIG. 13 illustrates a 2-fluoro-9,10-bis(2,3,5,6-tetrafluoro-4-methoxyphenyl)anthracene.
Figure 14:
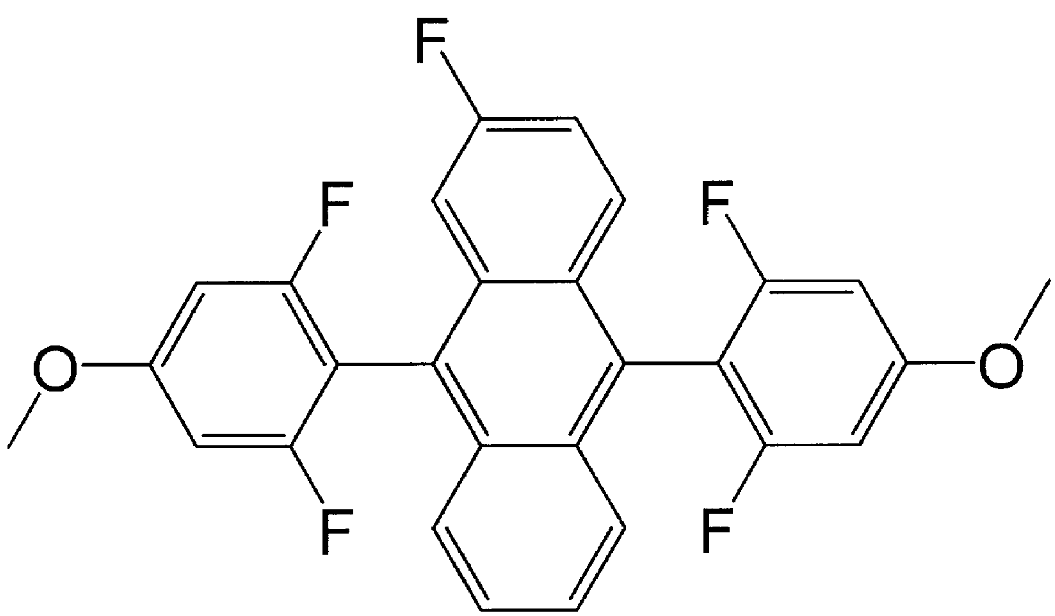
FIG. 14 illustrates a 9,10-bis(2,6-difluoro-4-methoxyphenyl)-2-fluoroanthracene.
Figure 15:
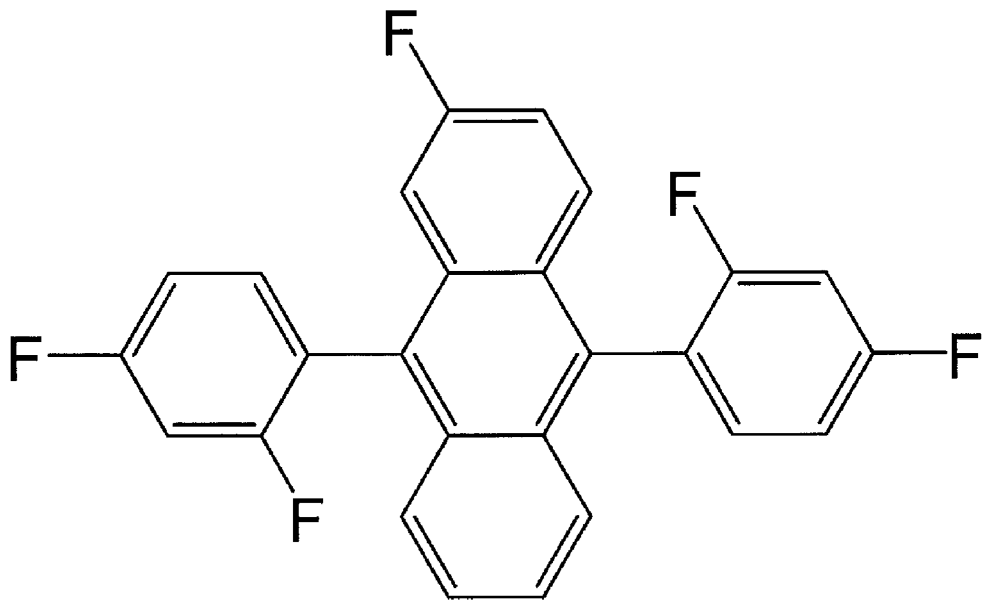
FIG. 15 illustrates a 9,10-bis(2,4-difluorophenyl)-2-fluoroanthracene.
Figure 16:
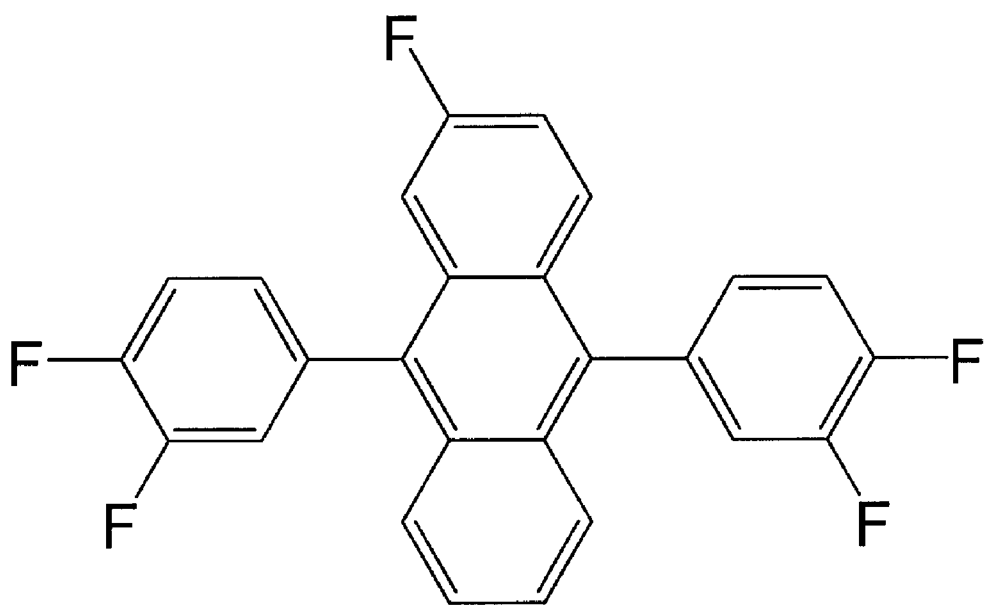
FIG. 16 illustrates a 9,10-bis(3,4-difluorophenyl)-2-fluoroanthracene anthracene.
Figure 17:
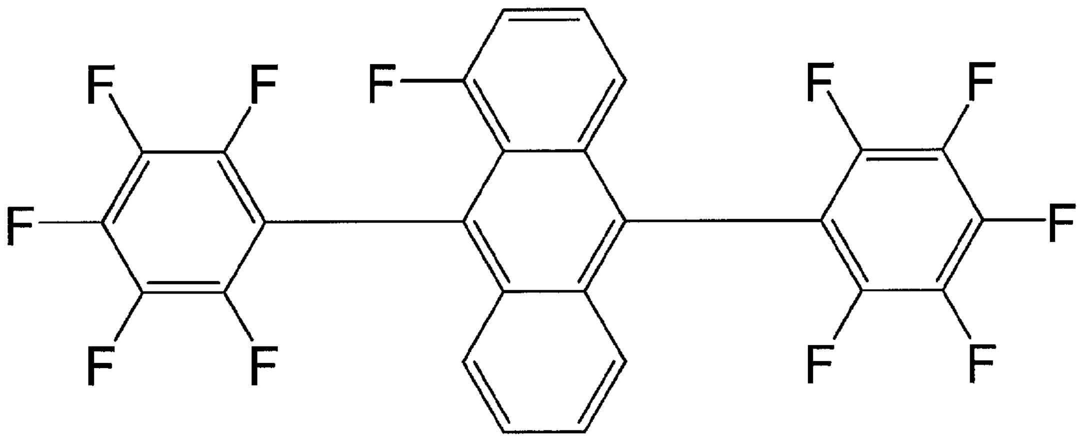
FIG. 17 illustrates a 1-fluoro-9,10-bis(2,3,4,5,6-pentafluorophenyl)anthracene.
Figure 18:
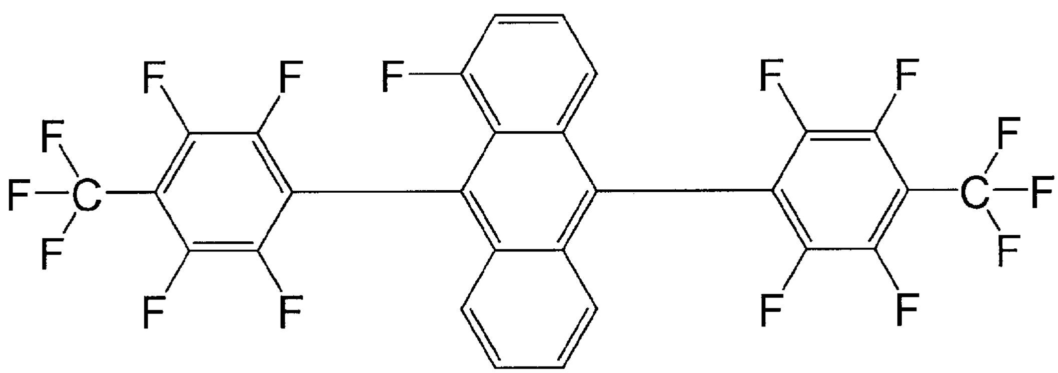
FIG. 18 illustrates a 1-fluoro-9,10-bis[2,3,5,6-tetrafluoro-4-(trifluoromethyl)phenyl]anthracene.
Figure 19:
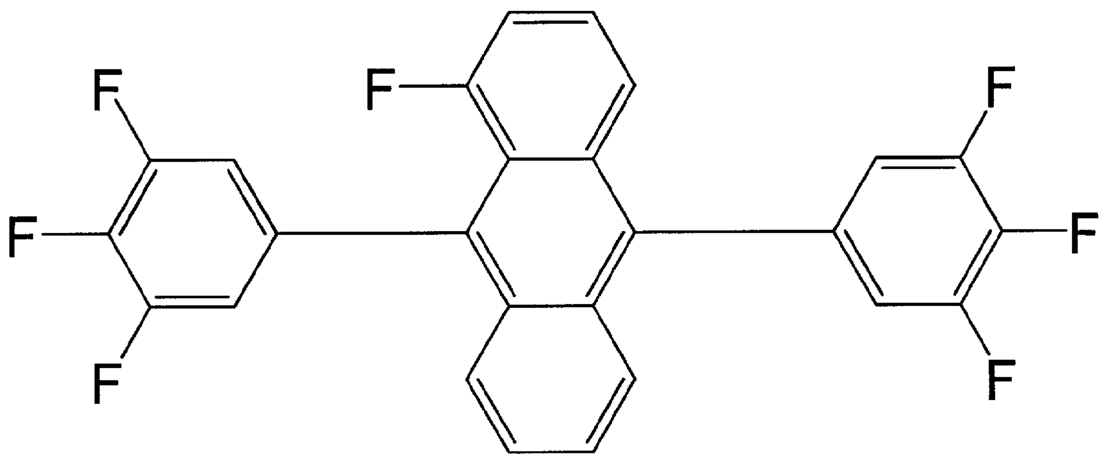
FIG. 19 illustrates a 1-fluoro-9,10-bis(3,4,5-trifluorophenyl)anthracene
Figure 20:
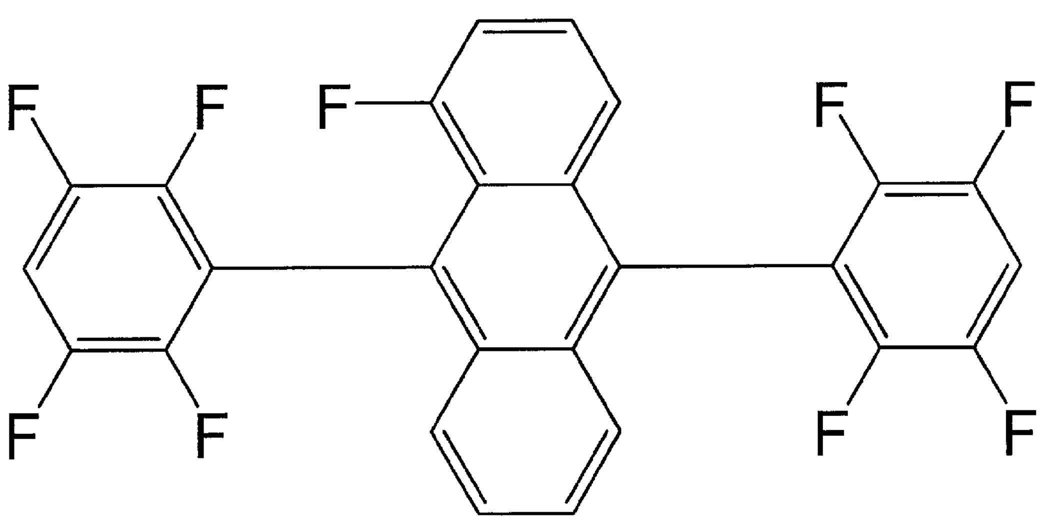
FIG. 20 illustrates a 1-fluoro-9,10-bis(2,3,5,6-tetrafluorophenyl)anthracene.
Figure 21:
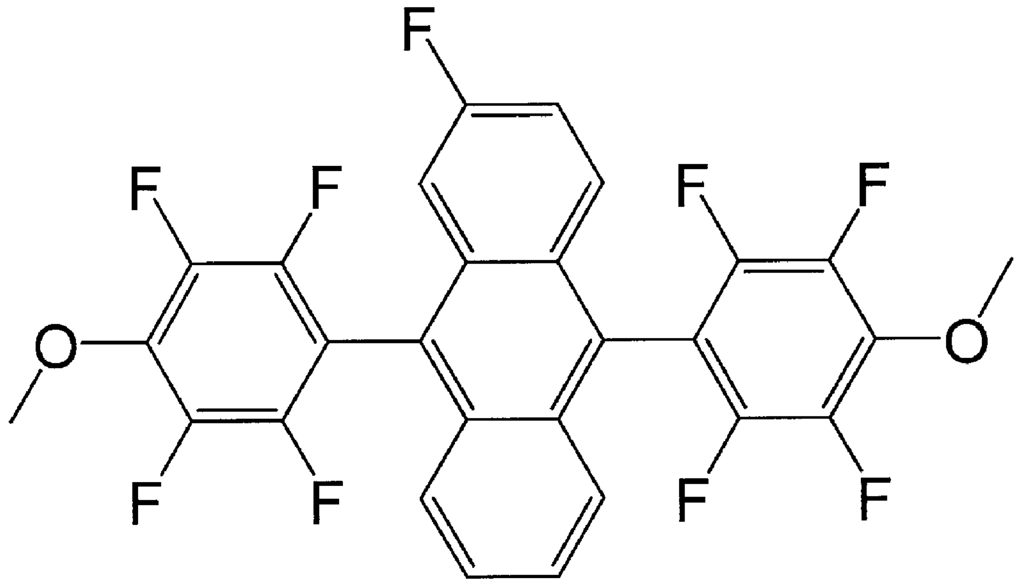
FIG. 21 illustrates a 1-fluoro-9,10-bis(2,3,5,6-tetrafluoro-4-methoxyphenyl)anthracene.
Figure 22:
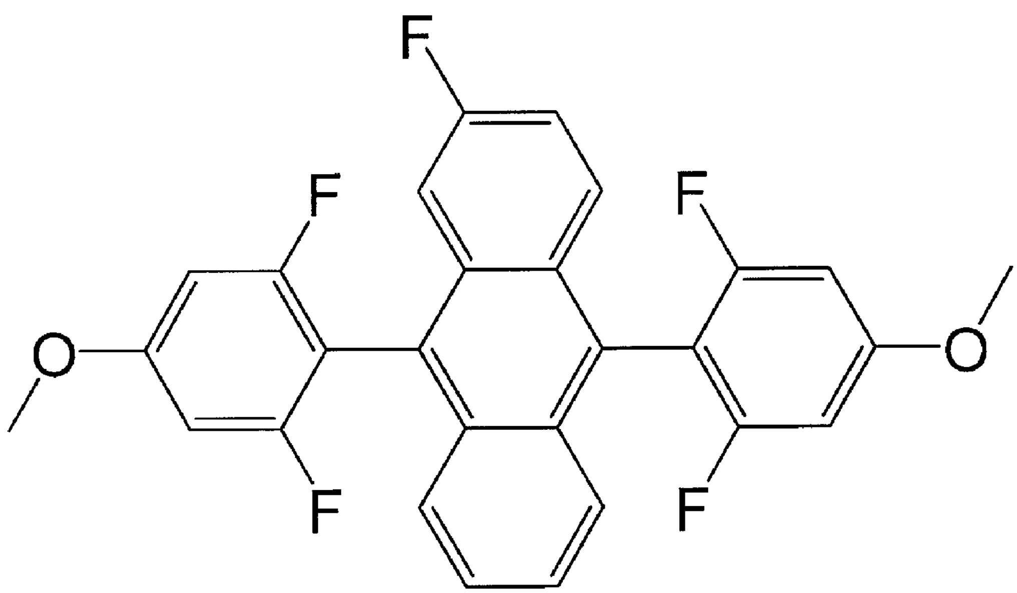
FIG. 22 illustrates a 9,10-bis(2,6-difluoro-4-methoxyphenyl)-1-fluoroanthracene.
Figure 23:
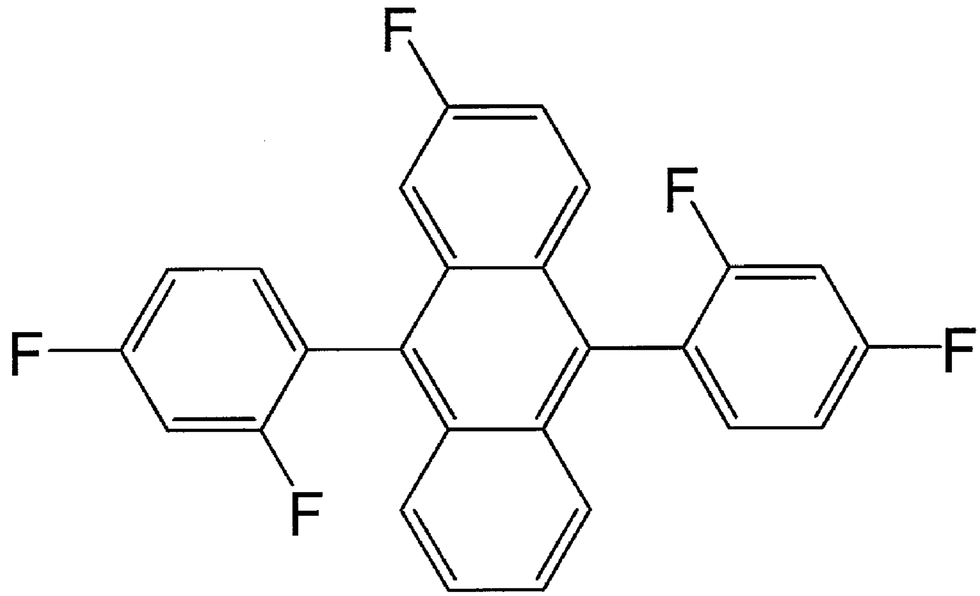
FIG. 23 illustrates a 9,10-bis(2,4-difluorophenyl)1-fluoroanthracene.
Figure 24:
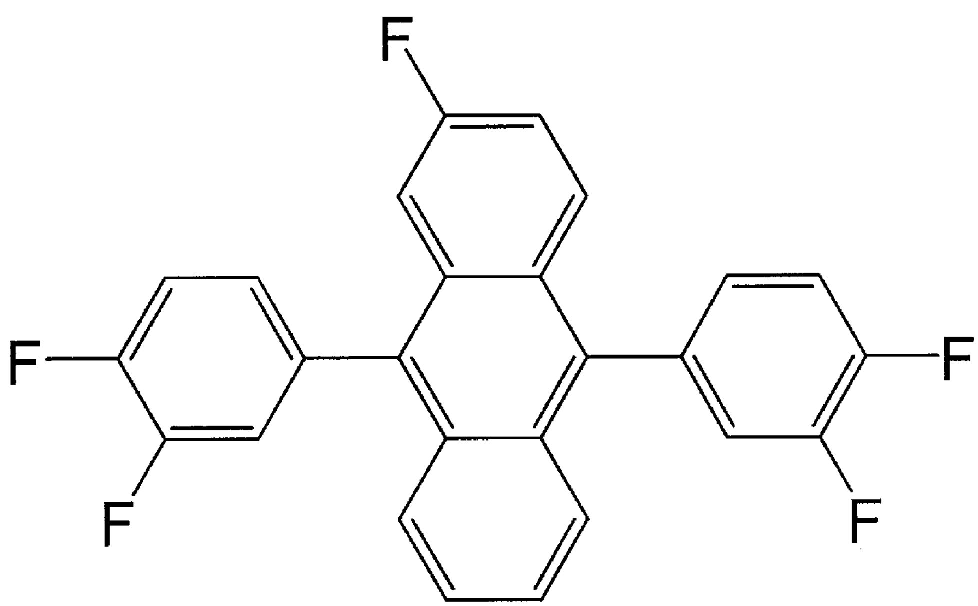
FIG. 24 illustrates a 9,10-bis(3,4-difluorophenyl)1-fluoroanthracene.
Figure 25:
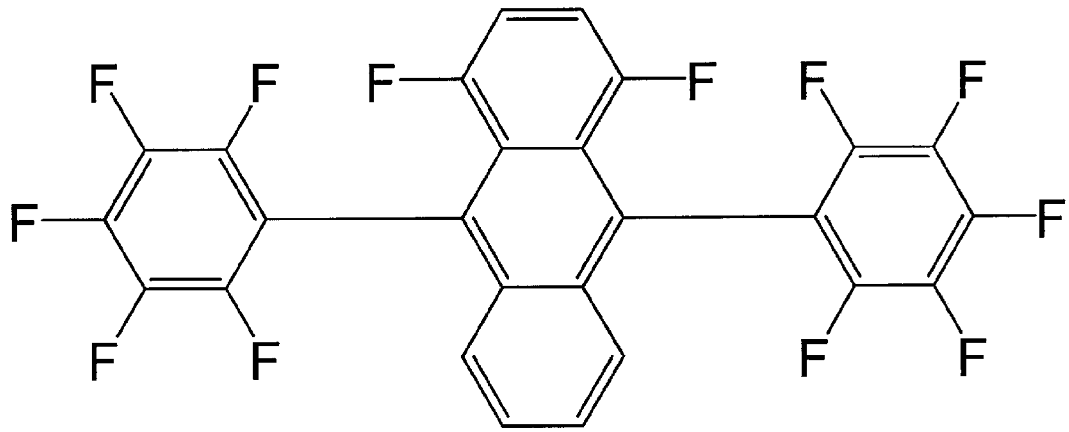
FIG. 25 illustrates a 1,4-difluoro-9,10-bis(2,3,4,5,6-pentafluorophenyl)anthracene.
Figure 26:
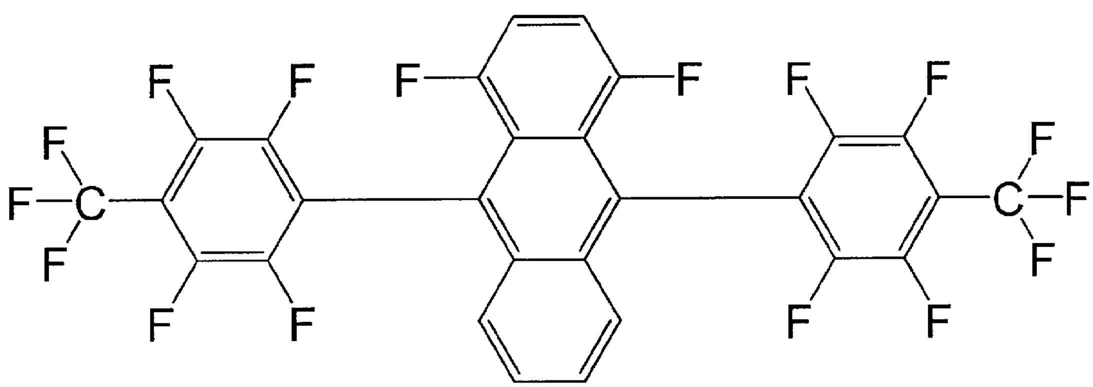
FIG. 26 illustrates a 1,4-difluoro-9,10-bis[2,3,5,6-tetrafluoro-4-(trifluoromethyl)phenyl]anthracene.
Figure 27:
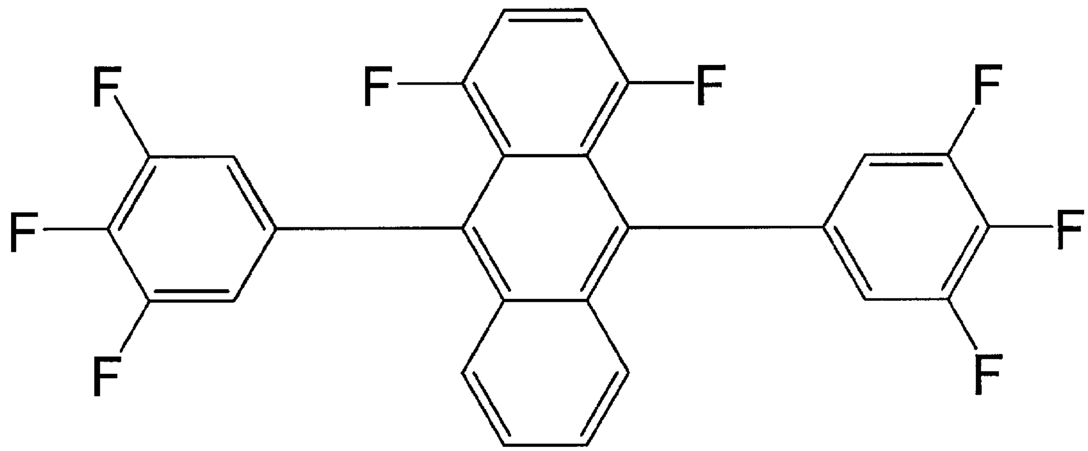
FIG. 27 illustrates a 1,4-difluoro-9,10-bis(3,4,5-trifluorophenyl)anthracene.
Figure 28:
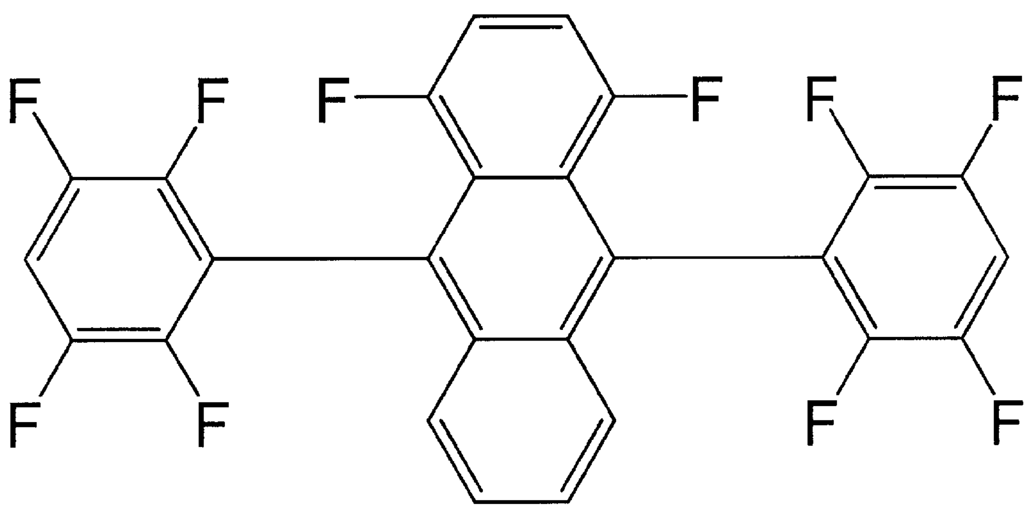
FIG. 28 illustrates a 1,4-difluoro-9,10-bis(2,3,5,6-tetrafluorophenyl)anthracene.
Figure 29:
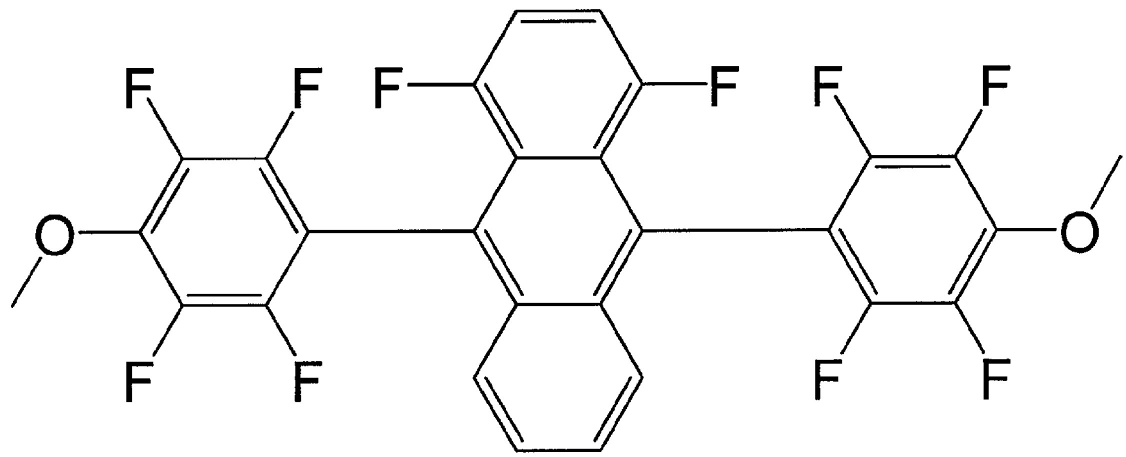
FIG. 29 illustrates a 1,4-difluoro-9,10-bis(2,3,5,6-tetrafluoro-4-methoxyphenyl)anthracene.
Figure 30:
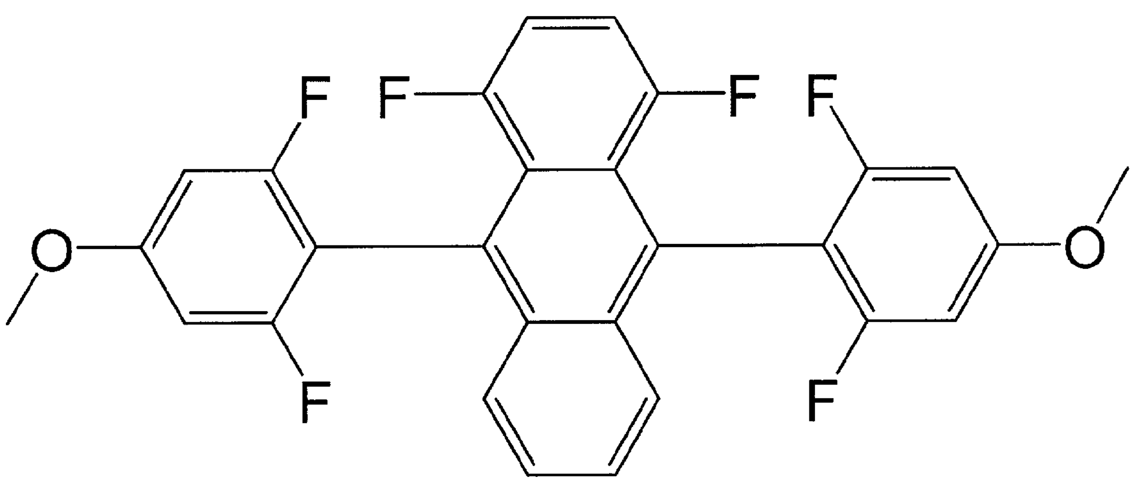
FIG. 30 illustrates a 9,10-bis(2,6-difluoro-4-methoxyphenyl)-1,4-difluoroanthracene.
Figure 31:
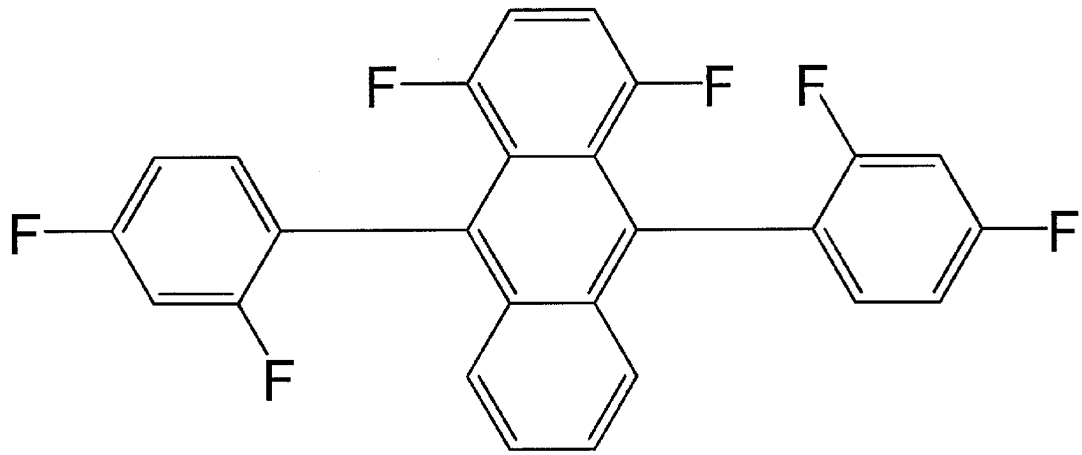
FIG. 31 illustrates a 9,10-bis(2,4-difluorophenyl)-1,4-difluoroanthracene.
Figure 32:
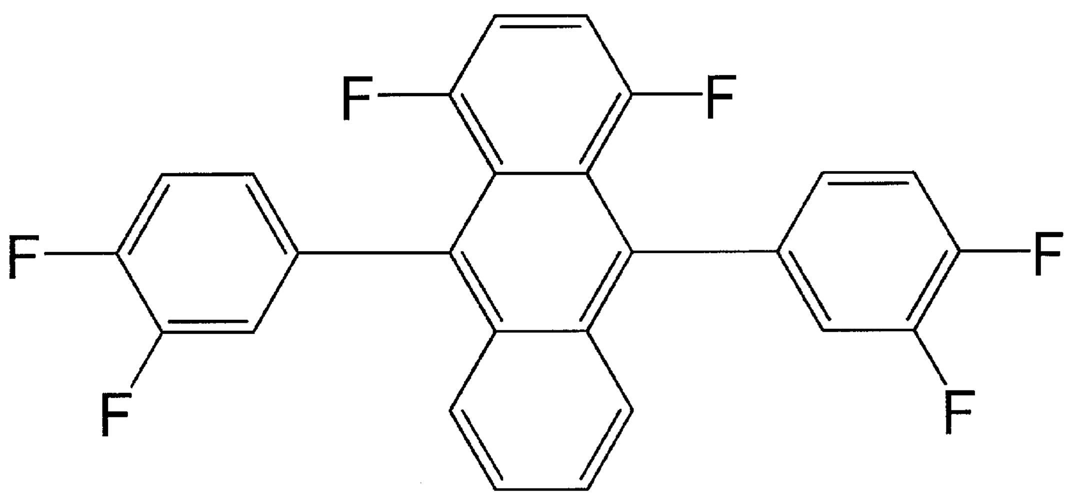
FIG. 32 illustrates a 9,10-bis(3,4-difluorophenyl)-1,4-difluoroanthracene.
Figure 33:
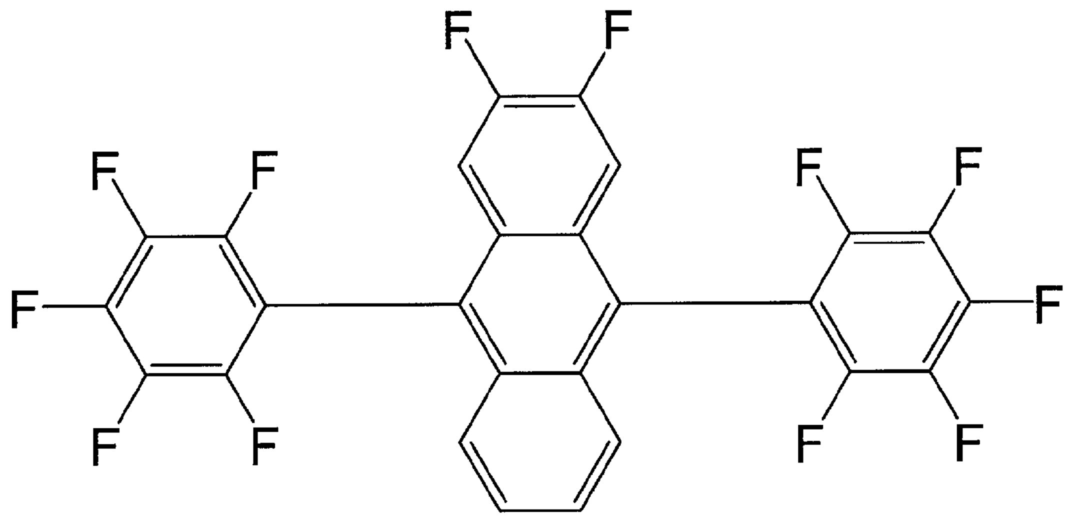
FIG. 33 illustrates a 2,3-difluoro-9,10-bis(2,3,4,5,6-pentafluorophenyl)anthracene.
Figure 34:
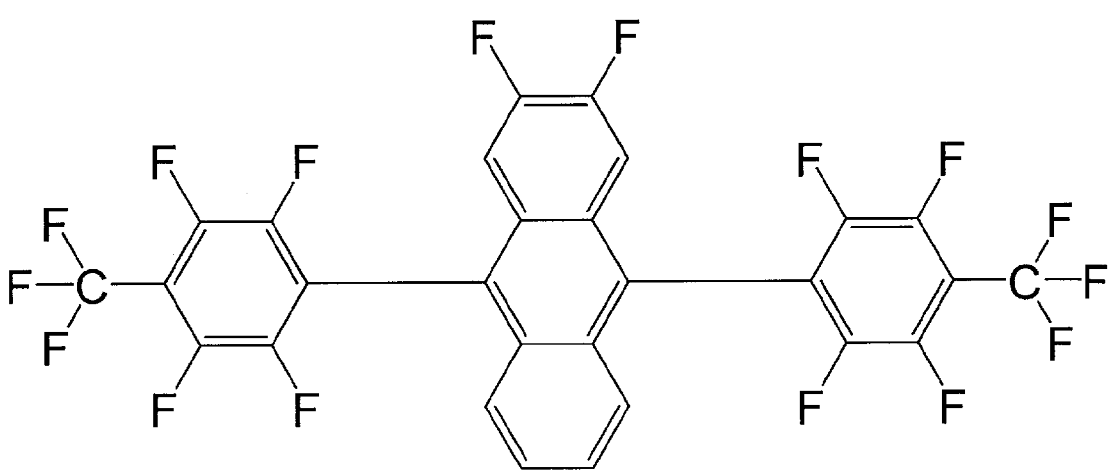
FIG. 34 illustrates a 2,3-difluoro-9,10-bis[2,3,5,6-tetrafluoro-4-(trifluoromethyl)phenyl]anthracene.
Figure 35:
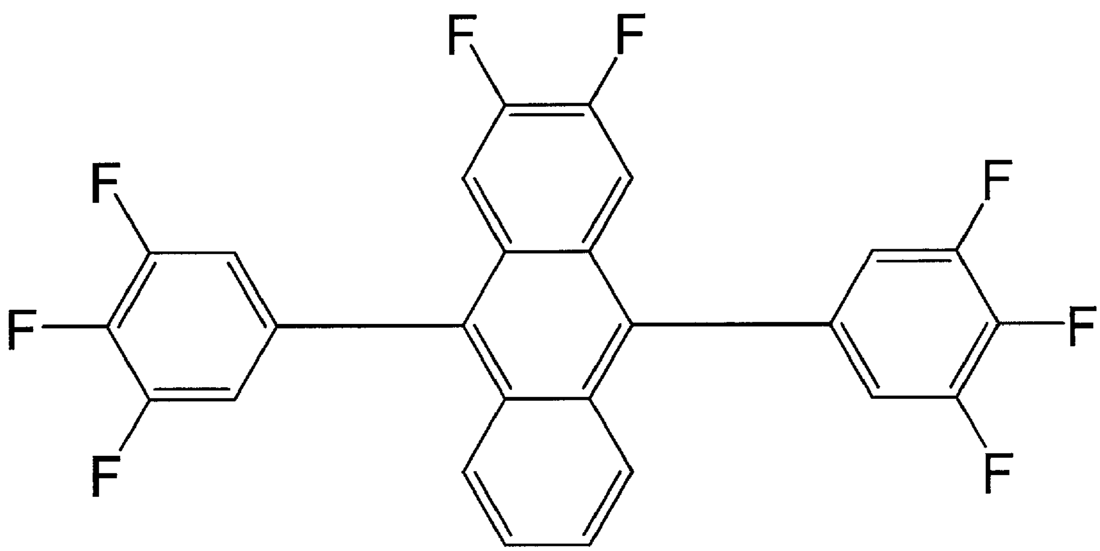
FIG. 35 illustrates a 2,3-difluoro-9,10-bis(3,4,5-trifluorophenyl)anthracene.
Figure 36:
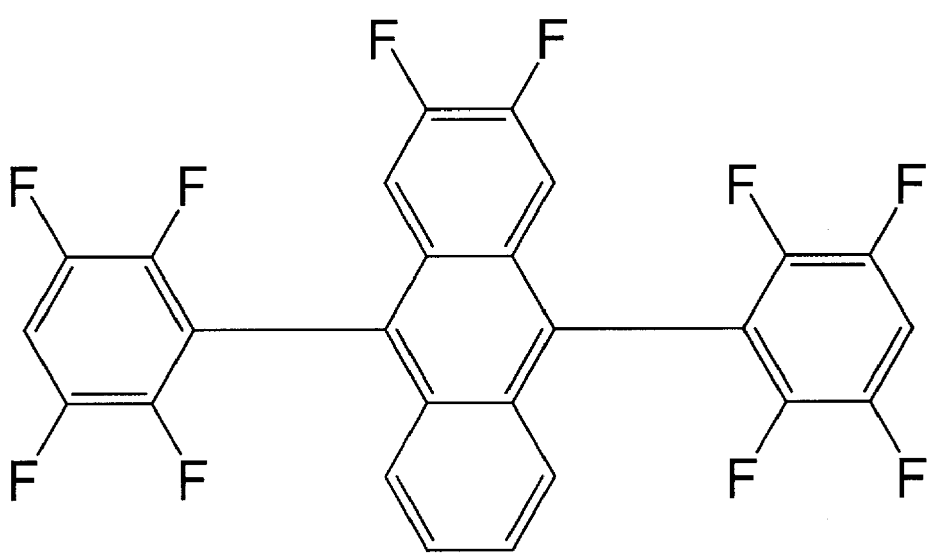
FIG. 36 illustrates a 2,3-difluoro-9,10-bis(2,3,5,6-tetrafluorophenyl)anthracene.
Figure 37:
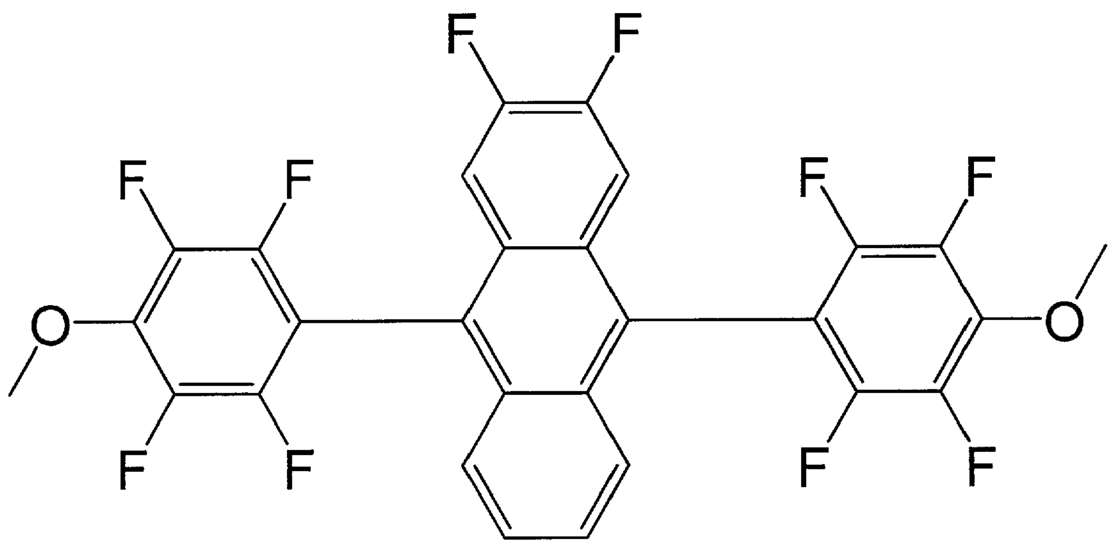
FIG. 37 illustrates a 2,3-difluoro-9,10-bis(2,3,5,6-tetrafluoro-4-methoxyphenyl)anthracene.
Figure 38:
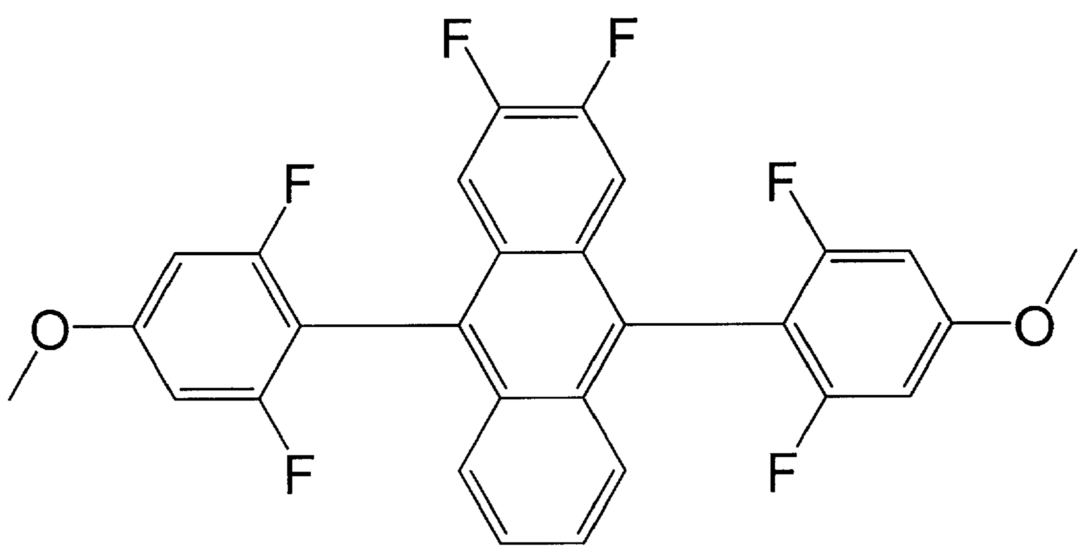
FIG. 38 illustrates a 9,10-bis(2,6-difluoro-4-methoxyphenyl)-2,3-difluoroanthracene.
Figure 39:
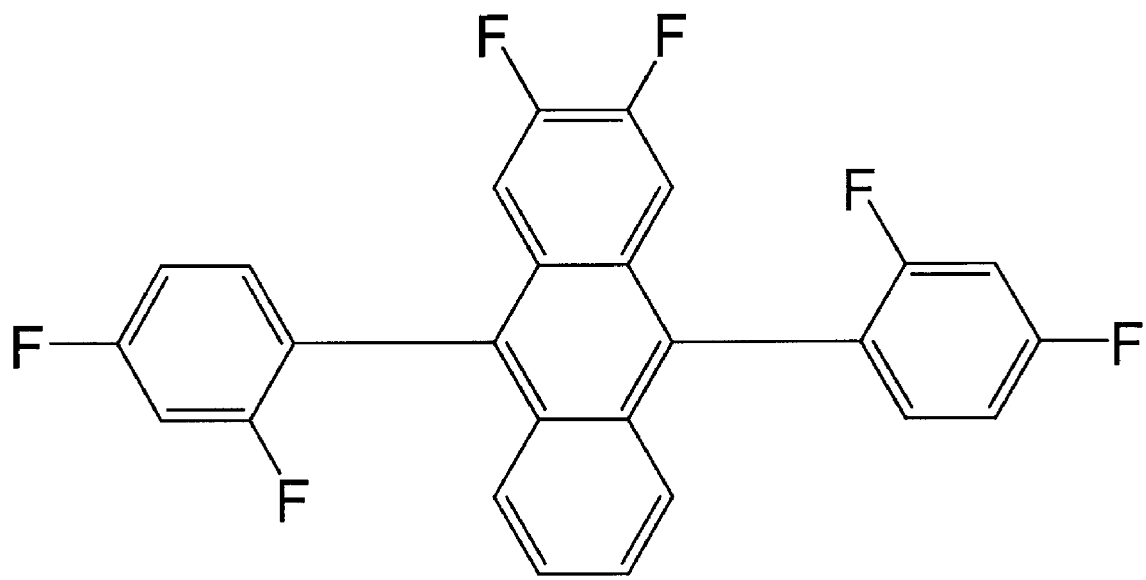
FIG. 39 illustrates a 9,10-bis(2,4-difluorophenyl)-2,3-difluoroanthracene.
Figure 40:
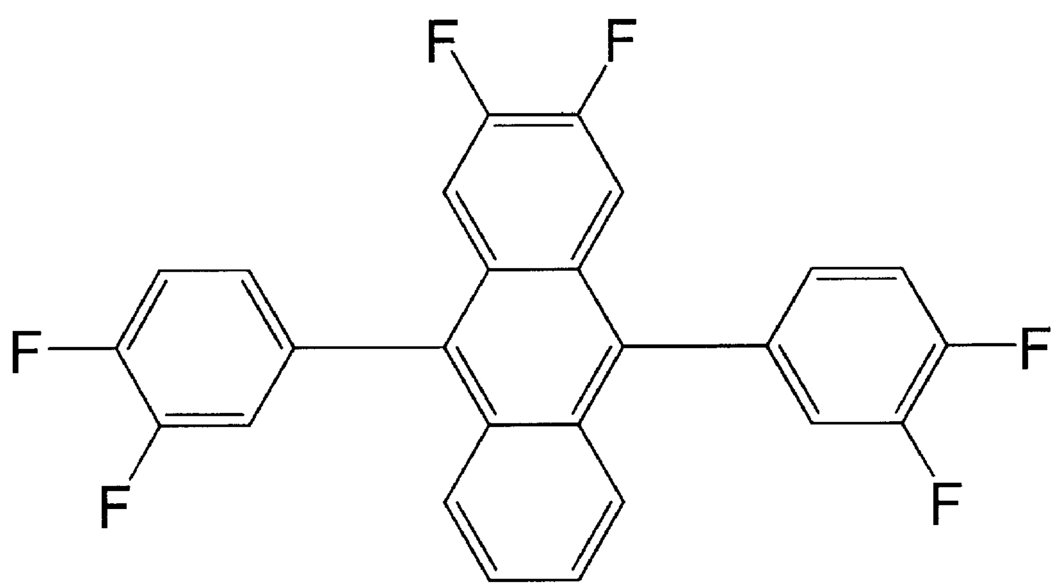
FIG. 40 illustrates a 9,10-bis(3,4-difluorophenyl)-2,3-difluoroanthracene.
Figure 41:
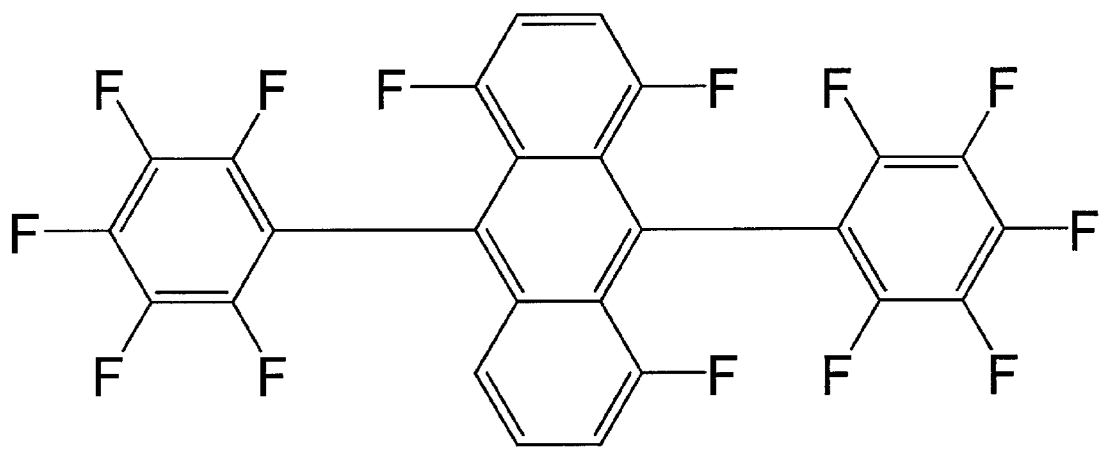
FIG. 41 illustrates a 1,4,5-trifluoro-9,10-bis(2,3,4,5,6-pentafluorophenyl)anthracene.
Figure 42:
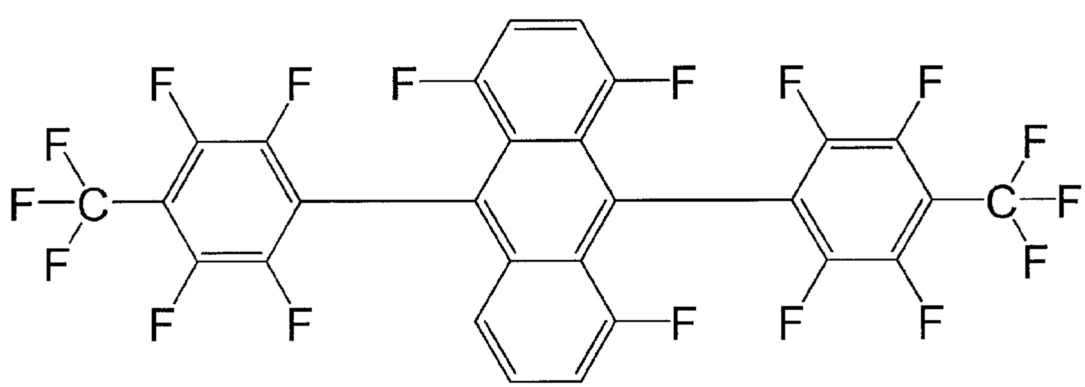
FIG. 42 illustrates a 1,4,5-trifluoro-9,10-bis[2,3,5,6-tetrafluoro-4-(trifluoromethyl)phenyl]anthracene.
Figure 43:
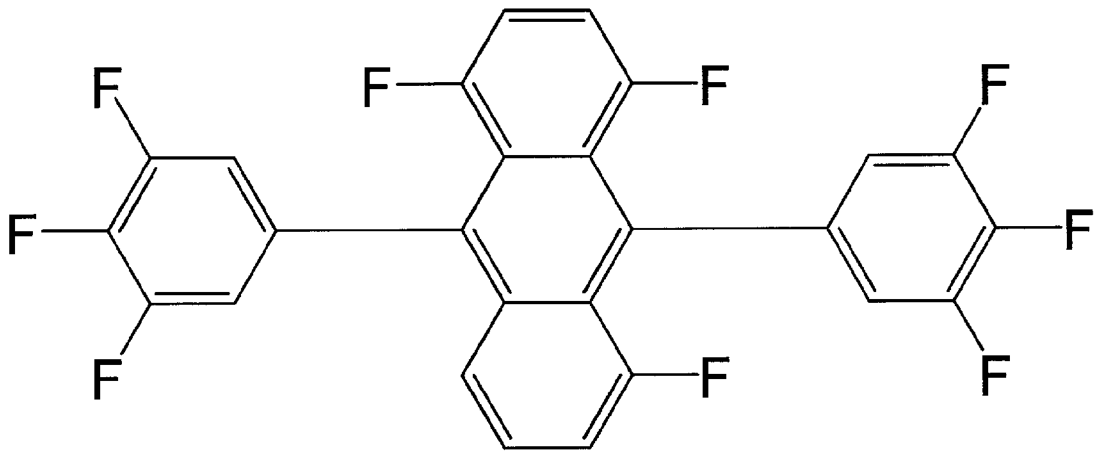
FIG. 43 illustrates a 1,4,5-trifluoro-9,10-bis(3,4,5-trifluorophenyl)anthracene.
Figure 44:
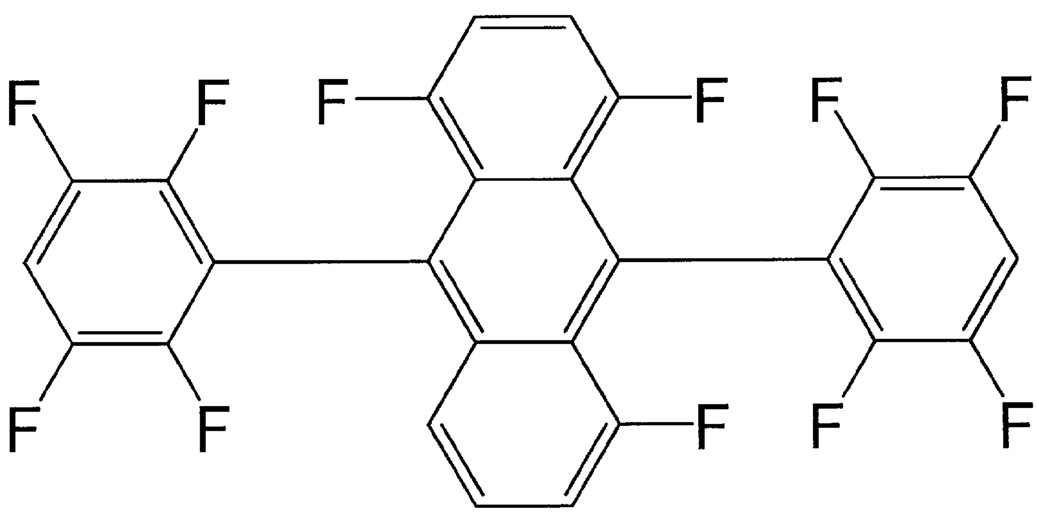
FIG. 44 illustrates a 1,4,5-trifluoro-9,10-bis(2,3,5,6-tetrafluorophenyl)anthracene.
Figure 45:
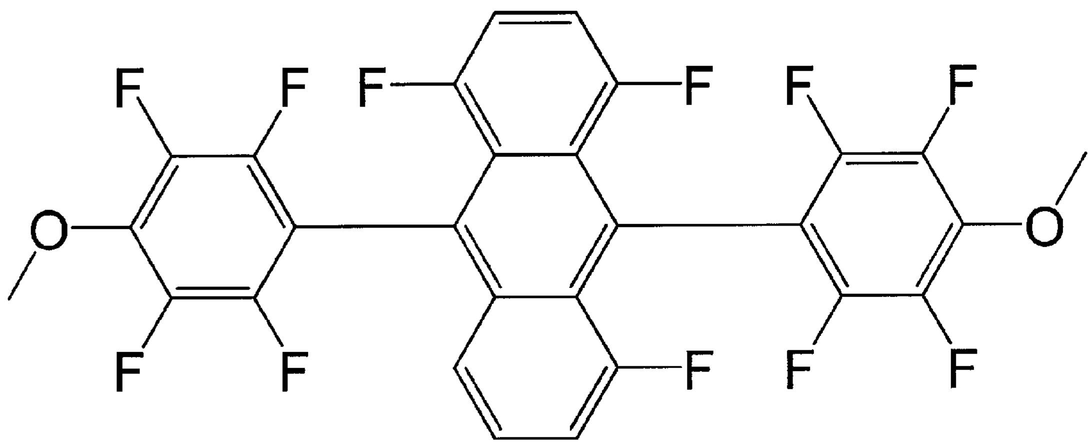
FIG. 45 illustrates a 1,4,5-trifluoro-9,10-bis(2,3,5,6-tetrafluoro-4-methoxyphenyl)anthracene.
Figure 46:
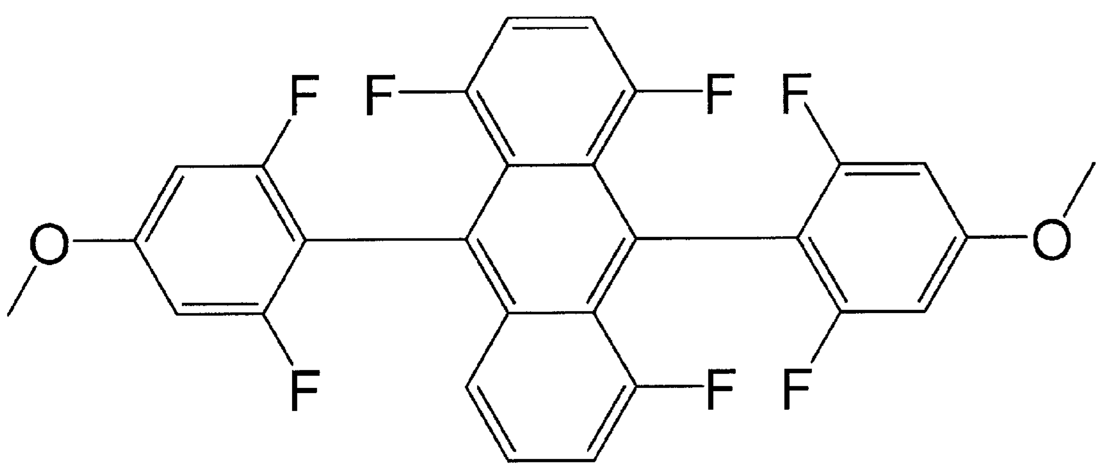
FIG. 46 illustrates a 9,10-bis(2,6-difluoro-4-methoxyphenyl)-1,4,5-trifluoroanthracene.
Figure 47:
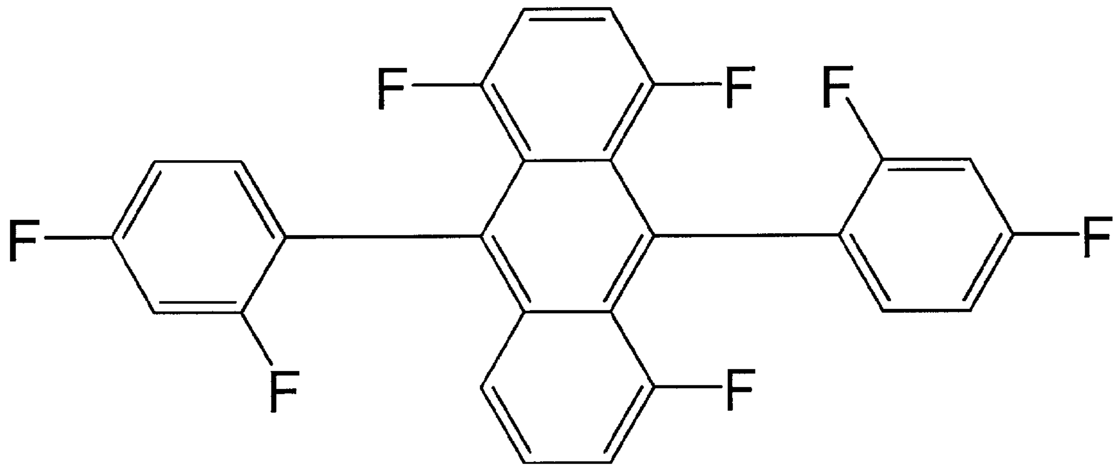
FIG. 47 illustrates a 9,10-bis(2,4-difluorophenyl)-1,4,5-trifluoroanthracene.
Figure 48:
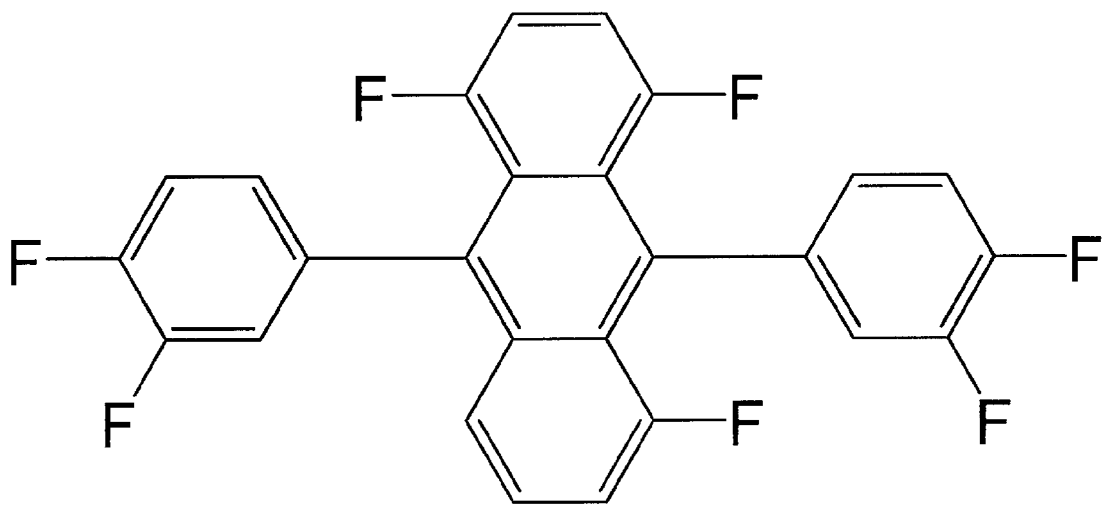
FIG. 48 illustrates a 9,10-bis(3,4-difluorophenyl)-1,4,5-trifluoroanthracene.
Figure 49:
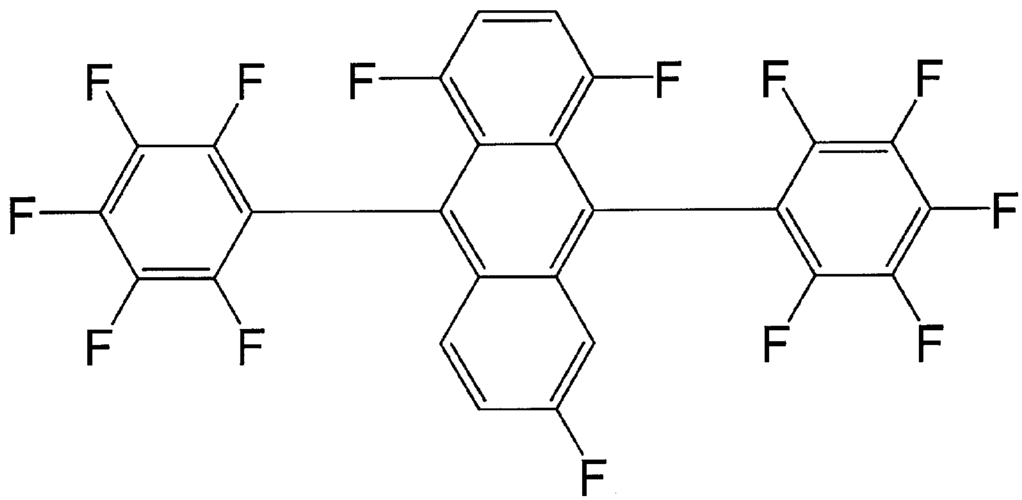
FIG. 49 illustrates a 1,4,6-trifluoro-9,10-bis(2,3,4,5,6-pentafluorophenyl)anthracene.
Figure 50:
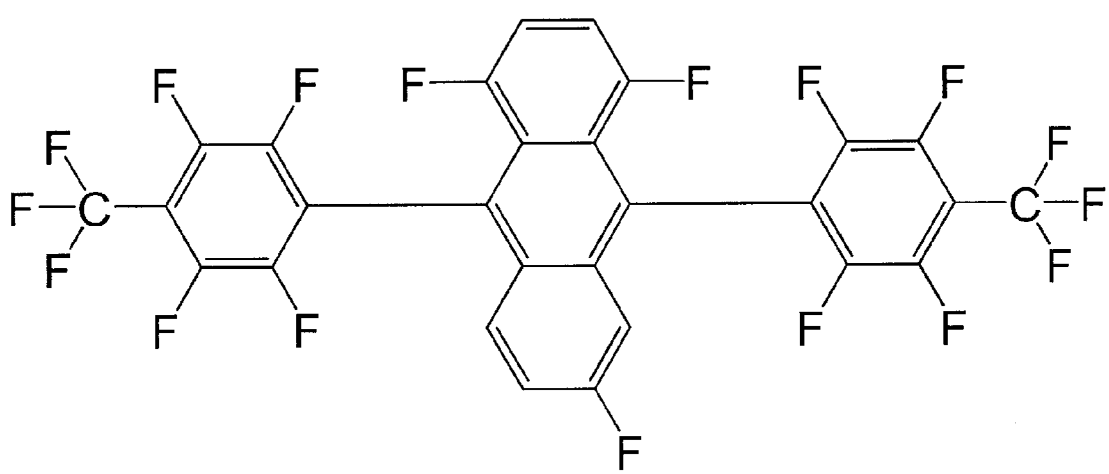
FIG. 50 illustrates a 1,4,6-trifluoro-9,10-bis[2,3,5,6-tetrafluoro-4-(trifluoromethyl)phenyl]anthracene.
Figure 51:
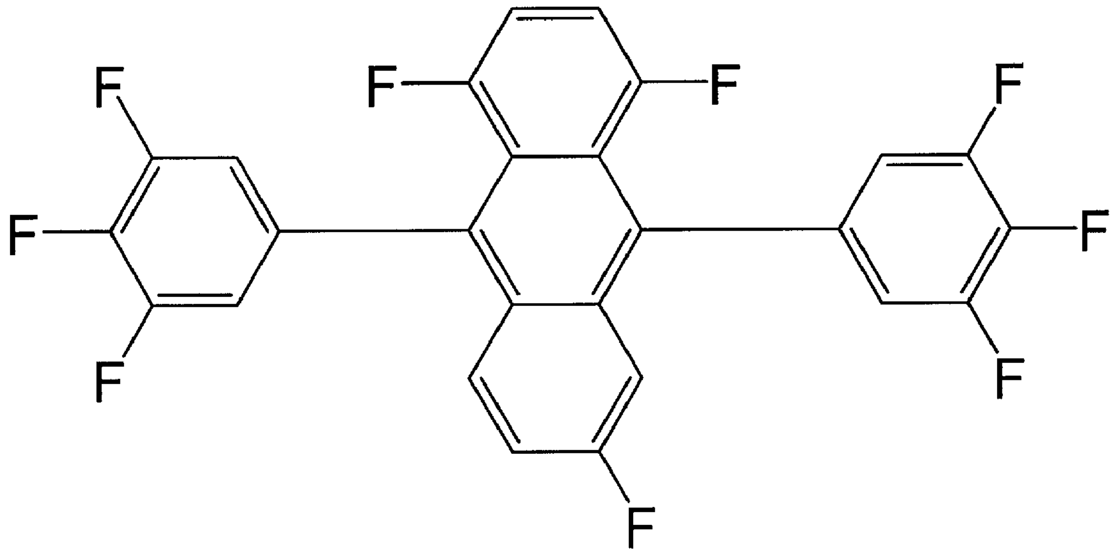
FIG. 51 illustrates a 1,4,6-trifluoro-9,10-bis(3,4,5-trifluorophenyl)anthracene.
Figure 52:
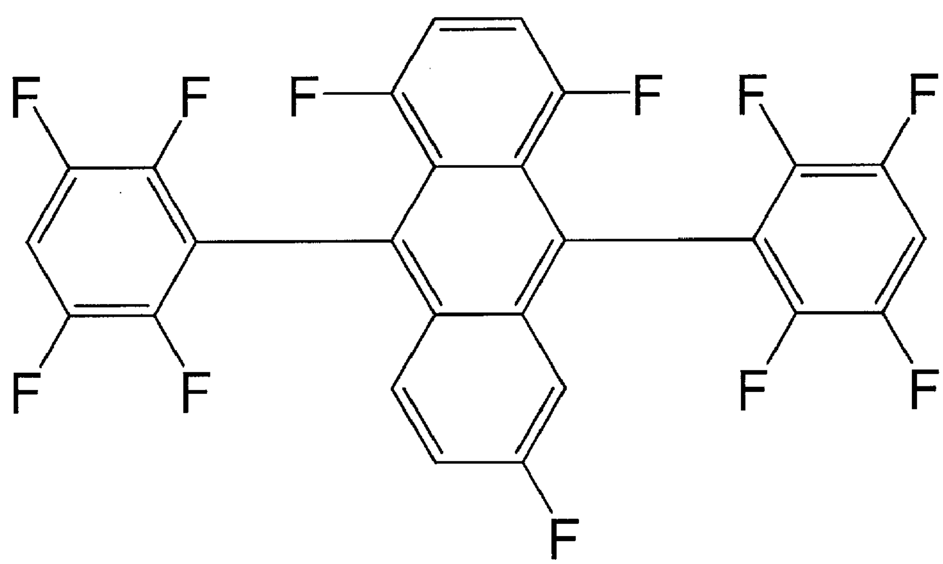
FIG. 52 illustrates a 1,4,6-trifluoro-9,10-bis(2,3,5,6-tetrafluorophenyl)anthracene.
Figure 53:
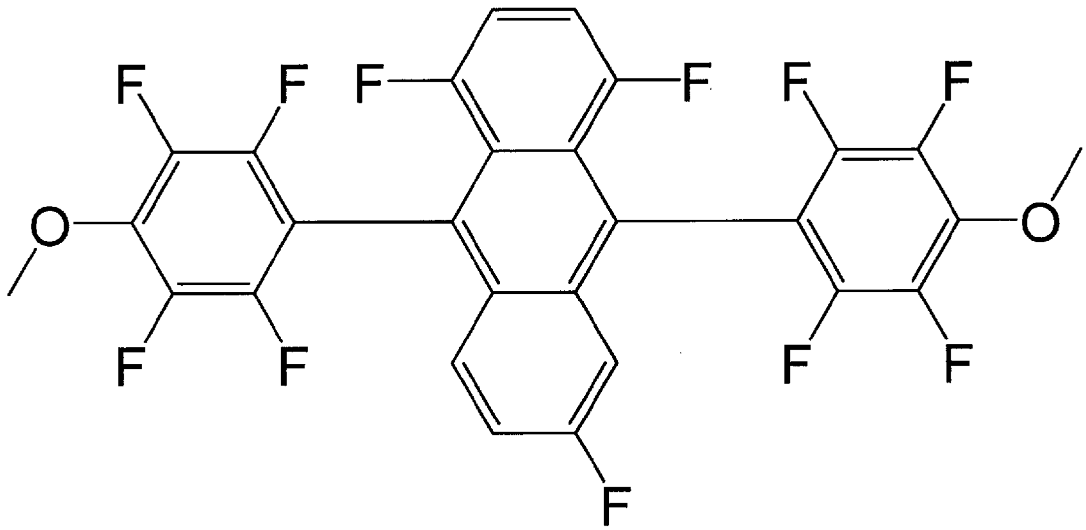
FIG. 53 illustrates a 1,4,6-trifluoro-9,10-bis(2,3,5,6-tetrafluoro-4-methoxyphenyl)anthracene.
Figure 54:
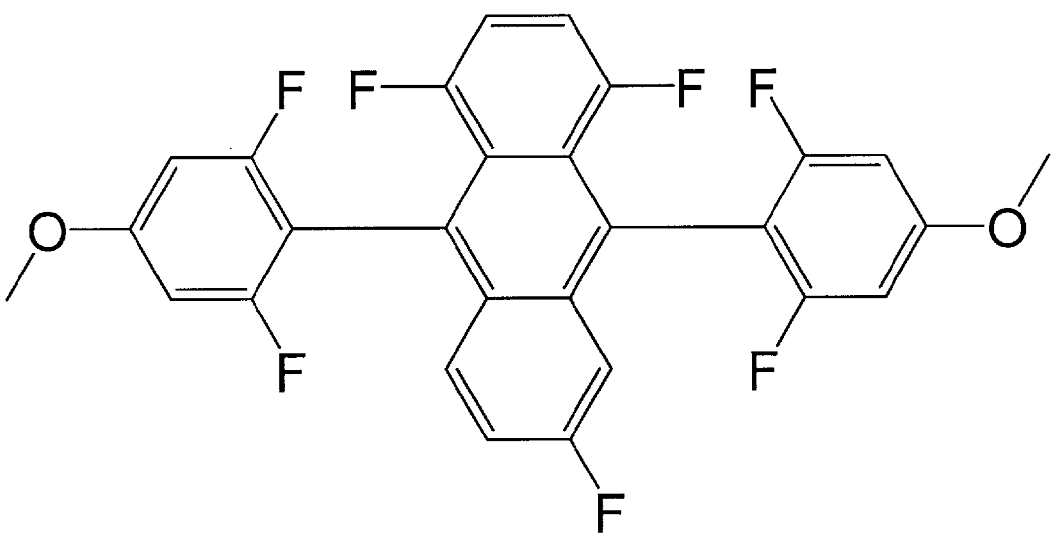
FIG. 54 illustrates a 9,10-bis(2,6-difluoro-4-methoxyphenyl)-1,4,6-trifluoroanthracene.
Figure 55:
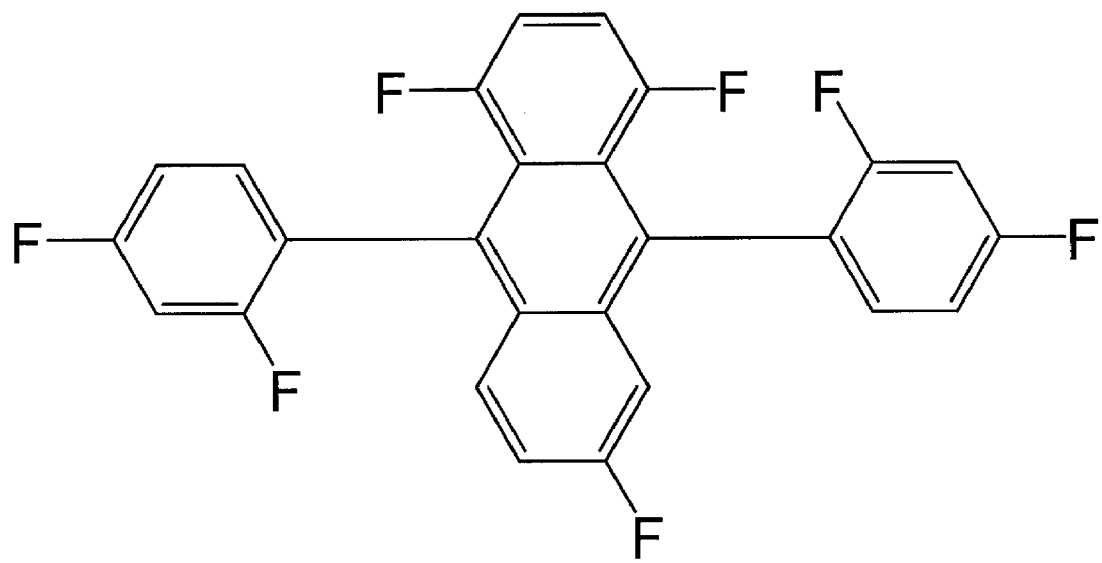
FIG. 55 illustrates a 9,10-bis(2,4-difluorophenyl)-1,4,6-trifluoroanthracene.
Figure 56:
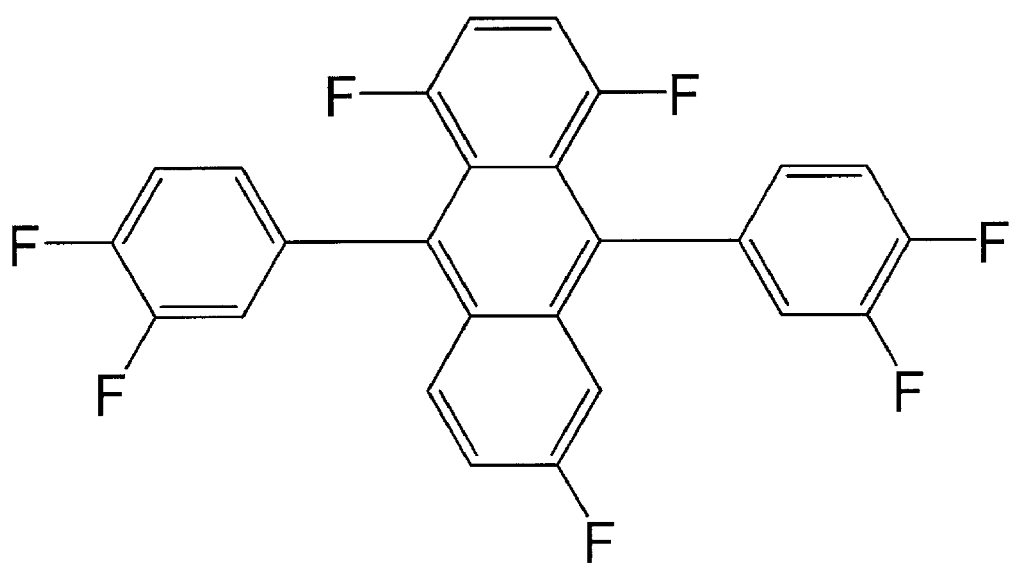
FIG. 56 illustrates a 9,10-bis(3,4-difluorophenyl)-1,4,6-trifluoroanthracene.
Figure 57:
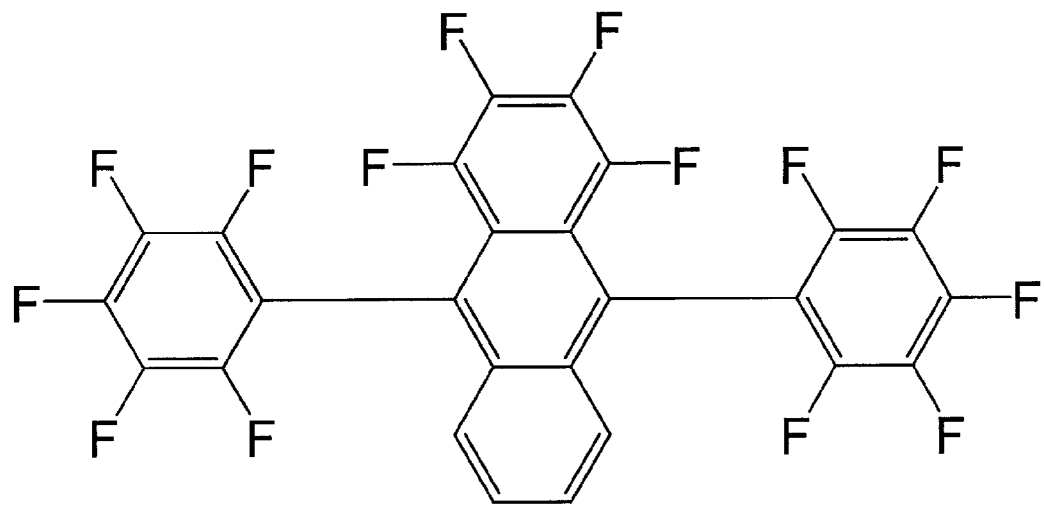
FIG. 57 illustrates a 1,2,3,4-tetrafluoro-9,10-bis(2,3,4,5,6-pentafluorophenyl)anthracene.
Figure 58:
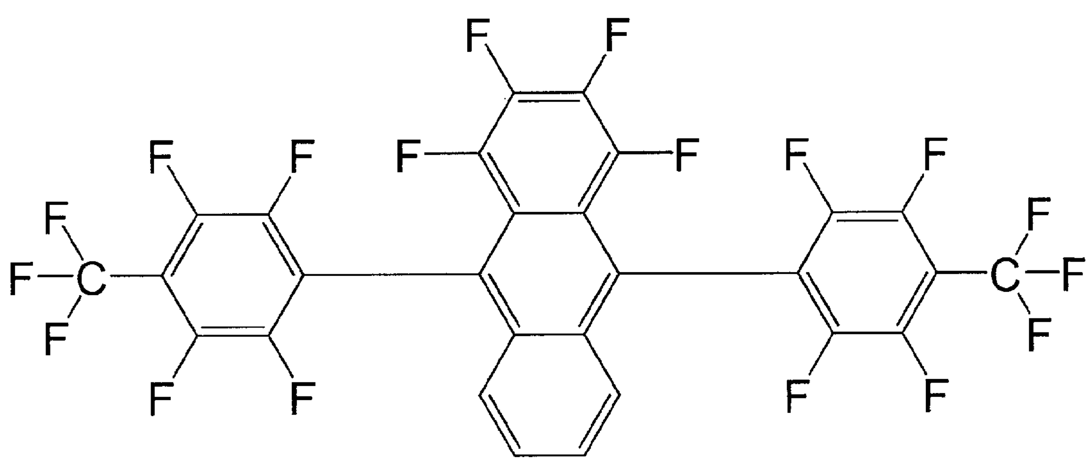
FIG. 58 illustrates a 1,2,3,4-tetrafluoro-9,10-bis[2,3,5,6-tetrafluoro-4-(trifluoromethyl)phenyl]anthracene.
Figure 59:
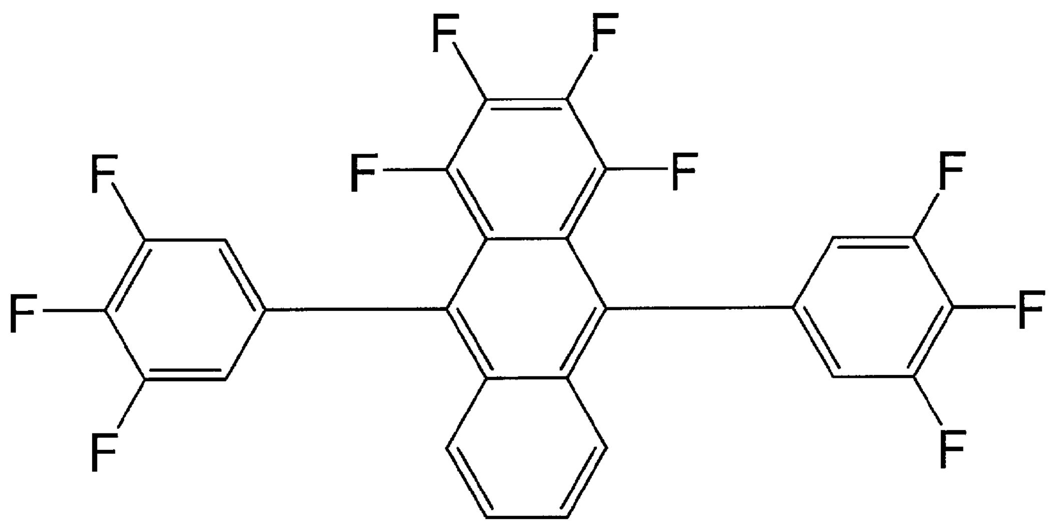
FIG. 59 illustrates a 1,2,3,4-tetrafluoro-9,10-bis(3,4,5-trifluorophenyl)anthracene
Figure 60:
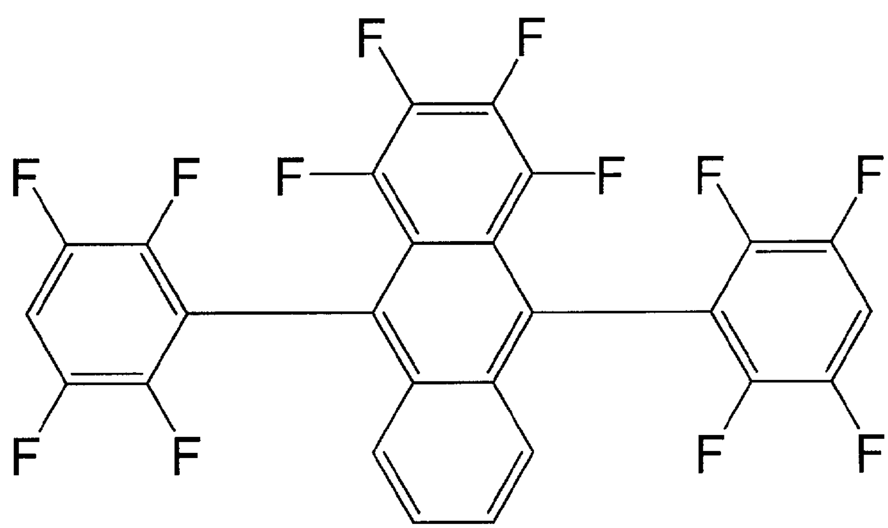
FIG. 60 illustrates a 1,2,3,4-tetrafluoro-9,10-bis(2,3,5,6-tetrafluorophenyl)anthracene.
Figure 61:
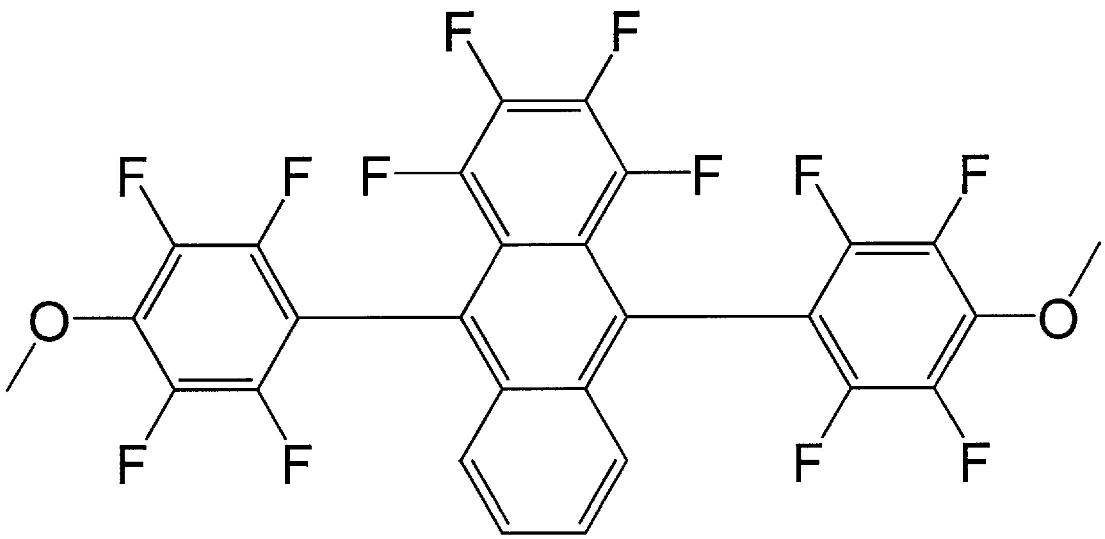
FIG. 61 illustrates a 1,2,3,4-tetrafluoro-9,10-bis(2,3,5,6-tetrafluoro-4-methoxyphenyl)anthracene.
Figure 62:
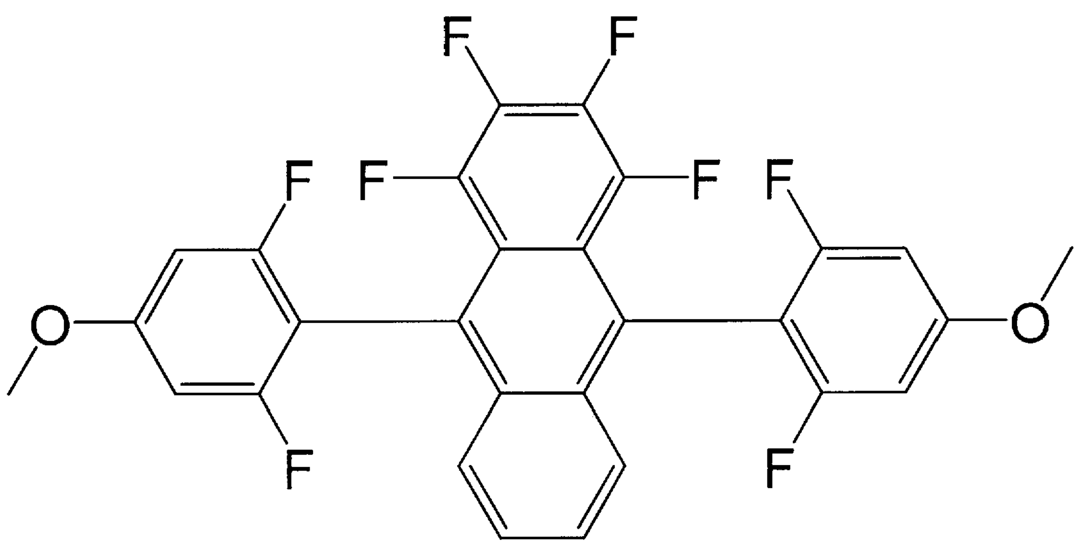
FIG. 62 illustrates a 9,10-bis(2,6-difluoro-4-methoxyphenyl)-1,2,3,4-tetrafluoroanthracene.
Figure 63:
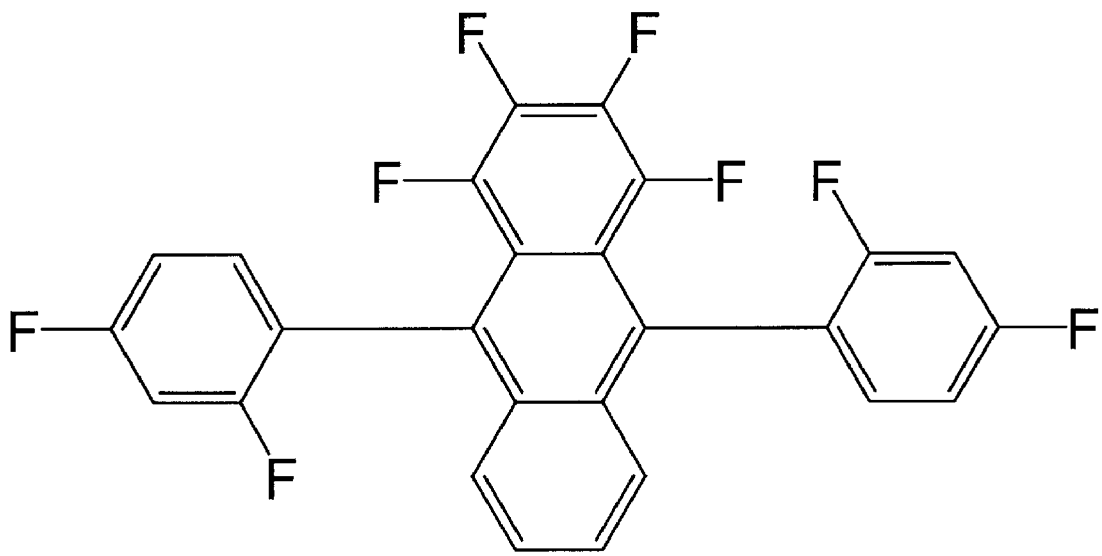
FIG. 63 illustrates a 9,10-bis(2,4-difluorophenyl)-1,2,3,4-tetrafluoroanthracene.
Figure 64:
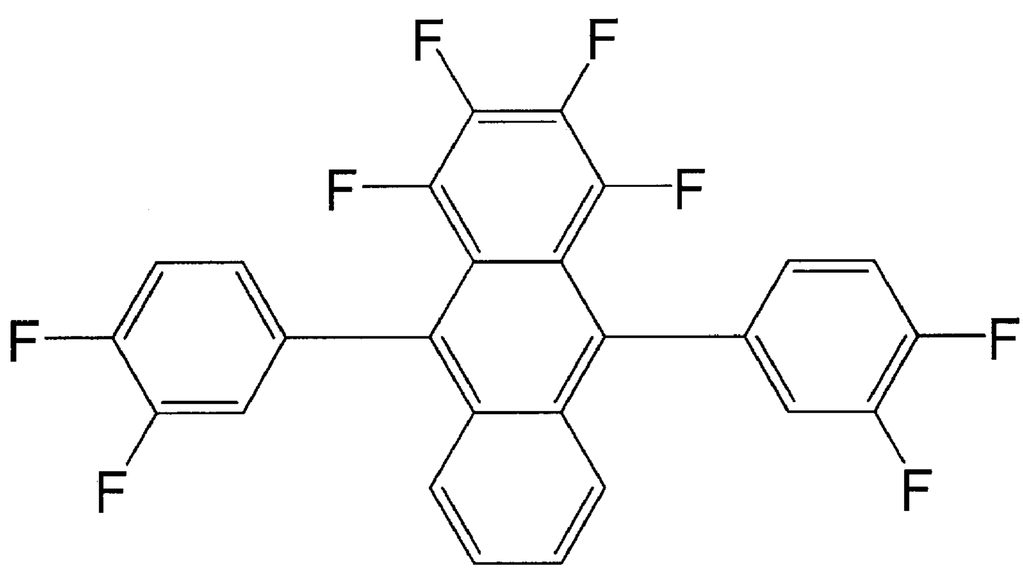
FIG. 64 illustrates a 9,10-bis(3,4-difluorophenyl)-1,2,3,4-tetrafluoroanthracene.
Figure 65:
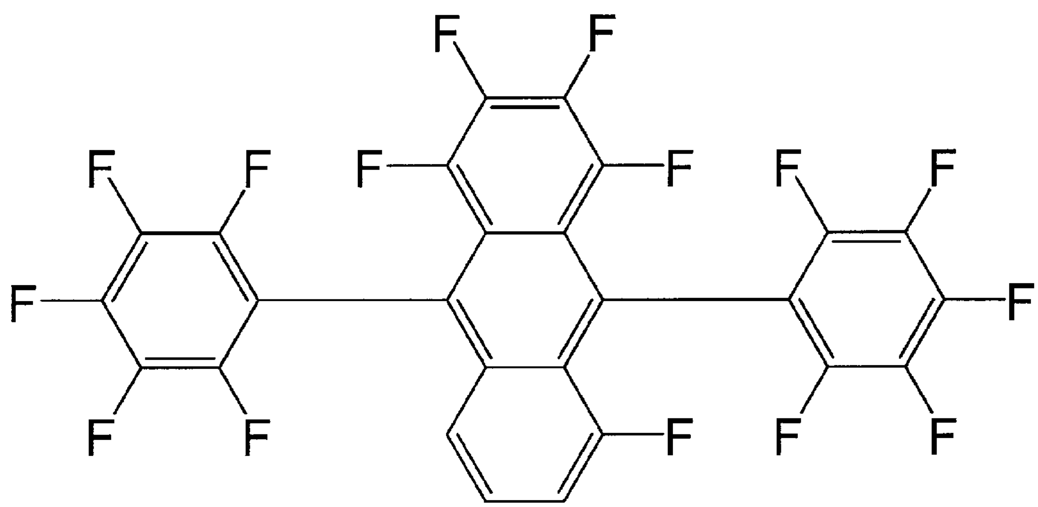
FIG. 65 illustrates a 1,2,3,4,5-pentafluoro-9,10-bis(2,3,4,5,6-pentafluorophenyl)anthracene.
Figure 66:
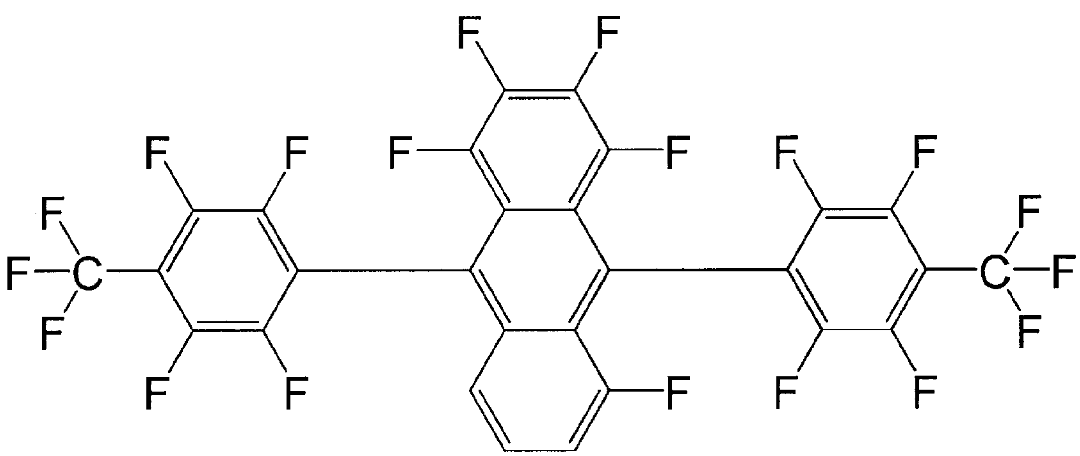
FIG. 66 illustrates a 1,2,3,4,5-pentafluoro-9,10-bis[2,3,5,6-tetrafluoro-4-(trifluoromethyl)phenyl]anthracene.
Figure 67:
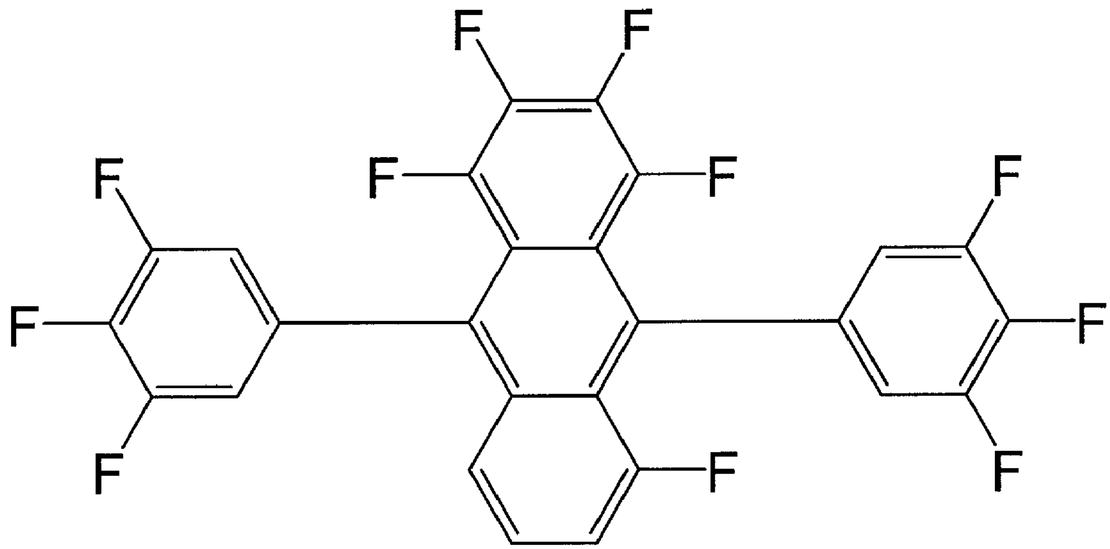
FIG. 67 illustrates a 1,2,3,4,5-pentafluoro-9,10-bis(3,4,5-trifluorophenyl)anthracene
Figure 68:
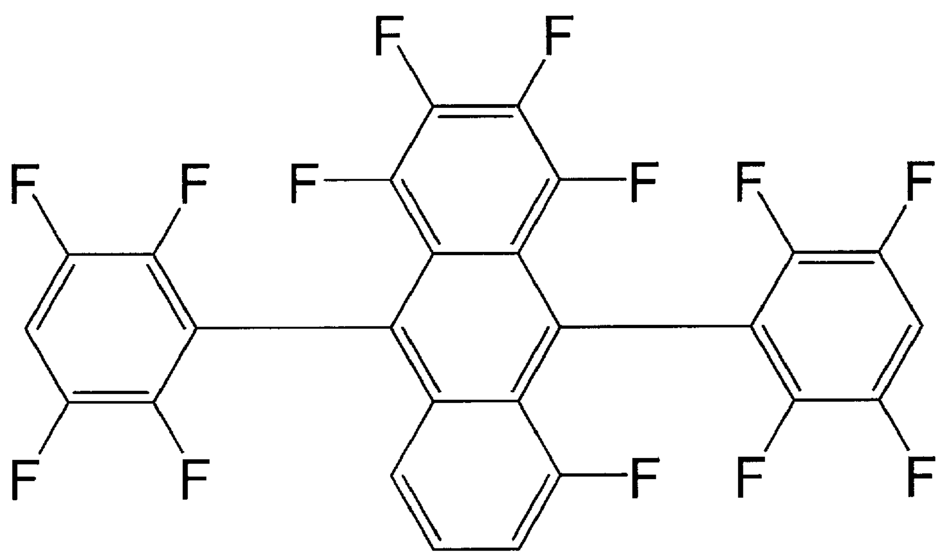
FIG. 68 illustrates a 1,2,3,4,5-pentafluoro-9,10-bis(2,3,5,6-tetrafluorophenyl)anthracene.
Figure 69:
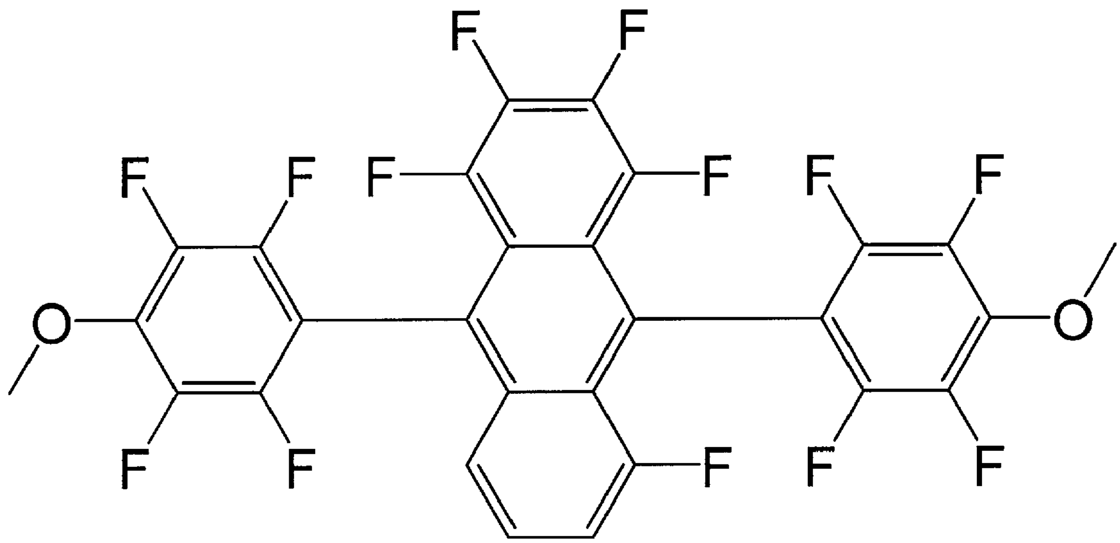
FIG. 69 illustrates a 1,2,3,4,5-pentafluoro-9,10-bis(2,3,5,6-tetrafluoro-4-methoxyphenyl)anthracene.
Figure 70:
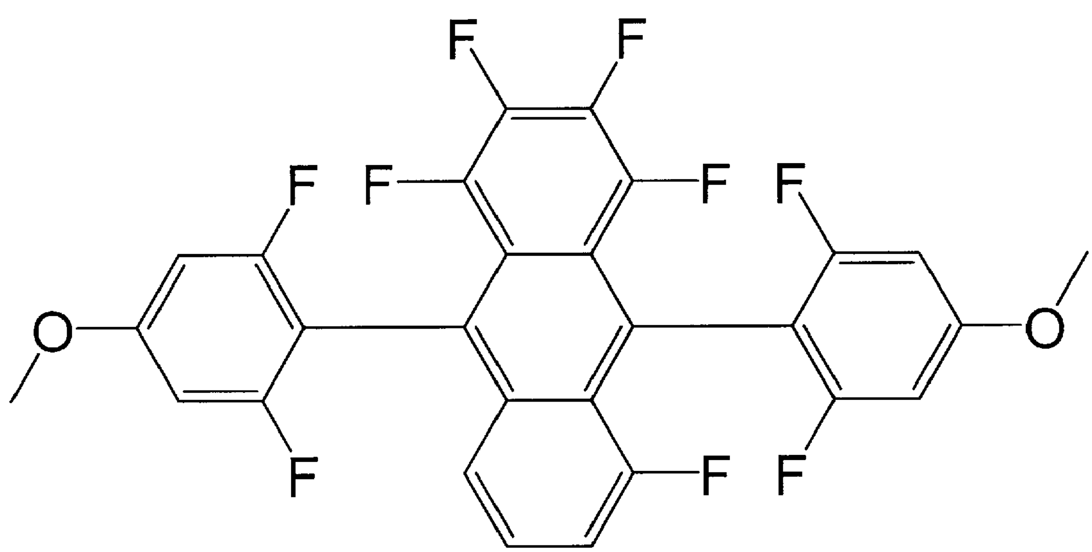
FIG. 70 illustrates a 9,10-bis(2,6-difluoro-4-methoxyphenyl)-1,2,3,4,5-pentafluoroanthracene.
Figure 71:
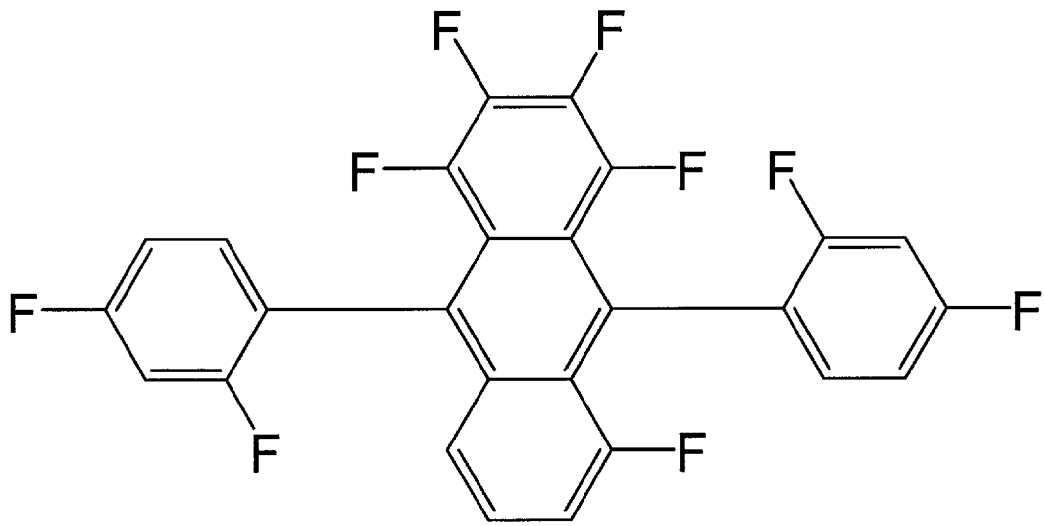
FIG. 71 illustrates a 9,10-bis(2,4-difluorophenyl)-1,2,3,4,5-pentafluoroanthracene.
Figure 72:
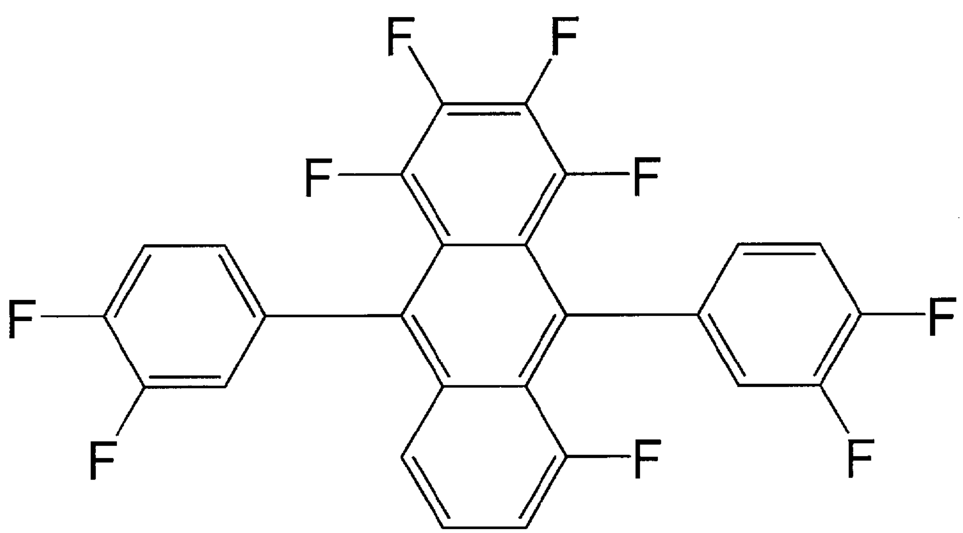
FIG. 72 illustrates a 9,10-bis(3,4-difluorophenyl)-1,2,3,4,5-pentafluoroanthracene.
Figure 73:
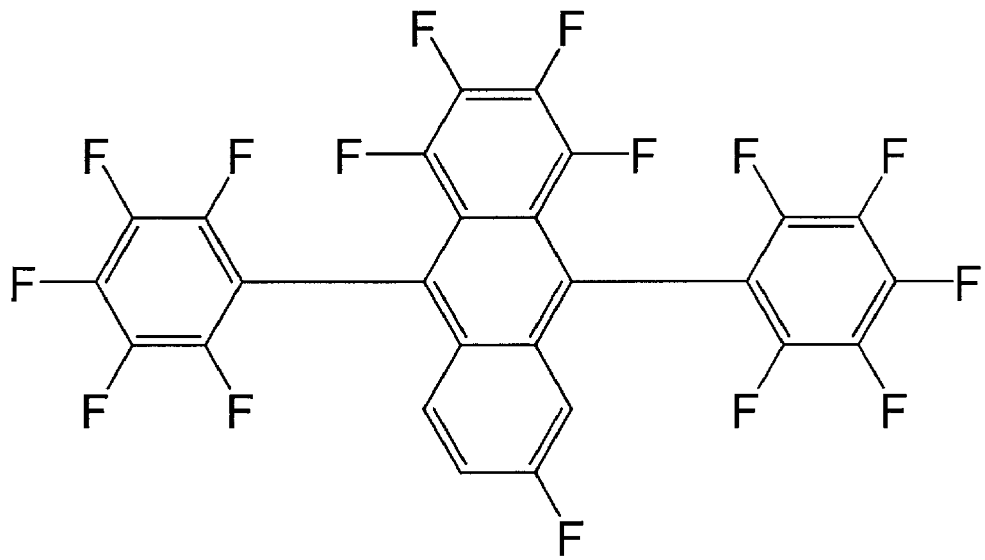
FIG. 73 illustrates a 1,2,3,4,6-pentafluoro-9,10-bis(2,3,4,5,6-pentafluorophenyl)anthracene.
Figure 74:
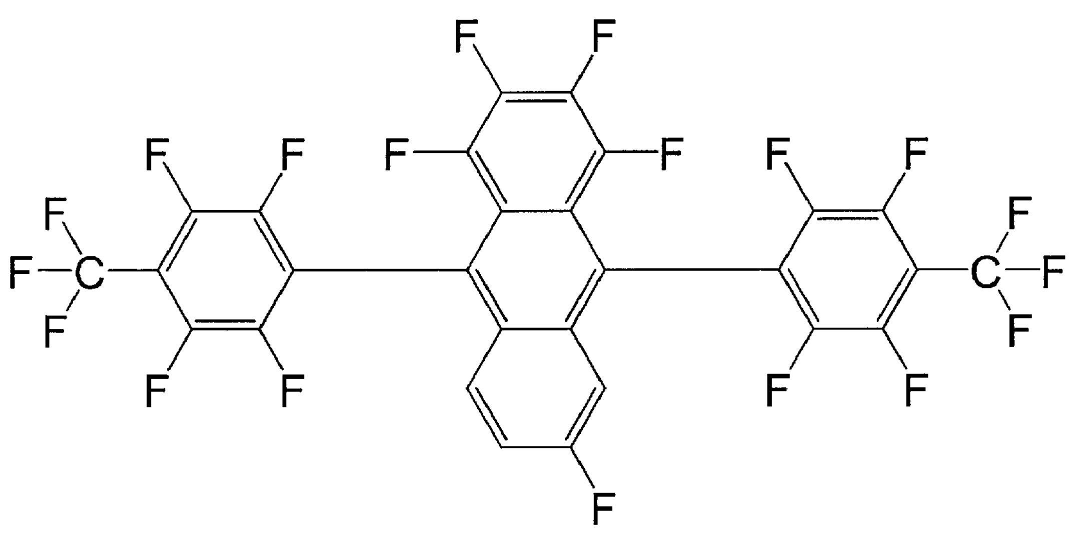
FIG. 74 illustrates a 1,2,3,4,6-pentafluoro-9,10-bis[2,3,5,6-tetrafluoro-4-(trifluoromethyl)phenyl]anthracene.
Figure 75:
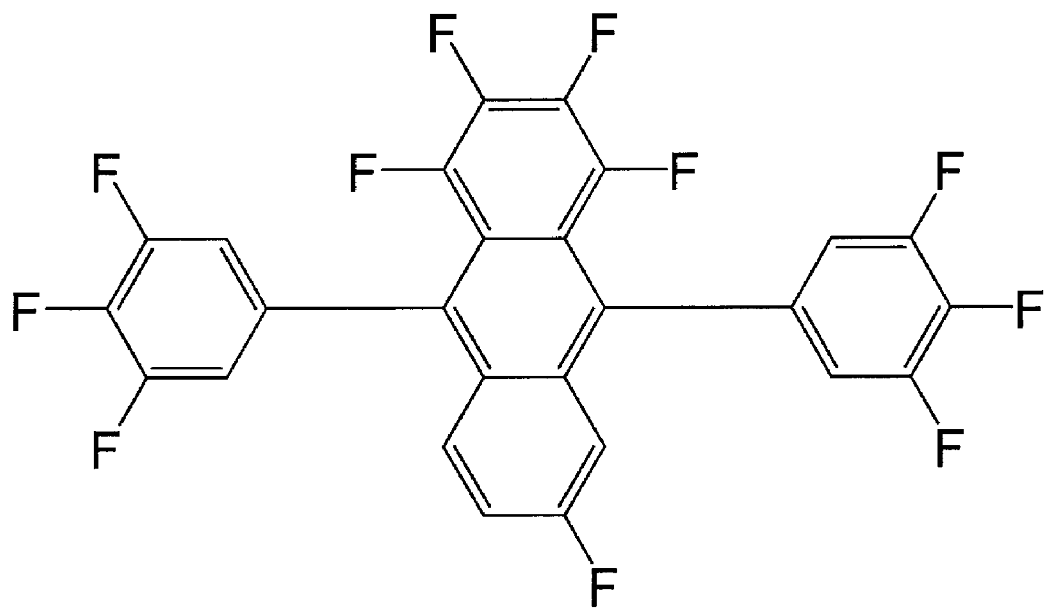
FIG. 75 illustrates a 1,2,3,4,6-pentafluoro-9,10-bis(3,4,5-trifluorophenyl)anthracene.
Figure 76:
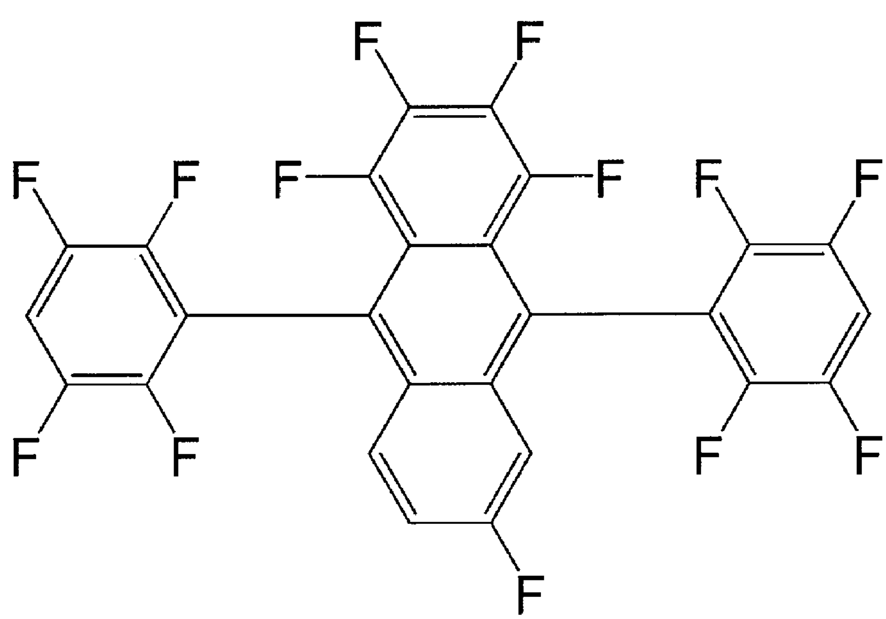
FIG. 76 illustrates a 1,2,3,4,6-pentafluoro-9,10-bis(2,3,5,6-tetrafluorophenyl)anthracene.
Figure 77:
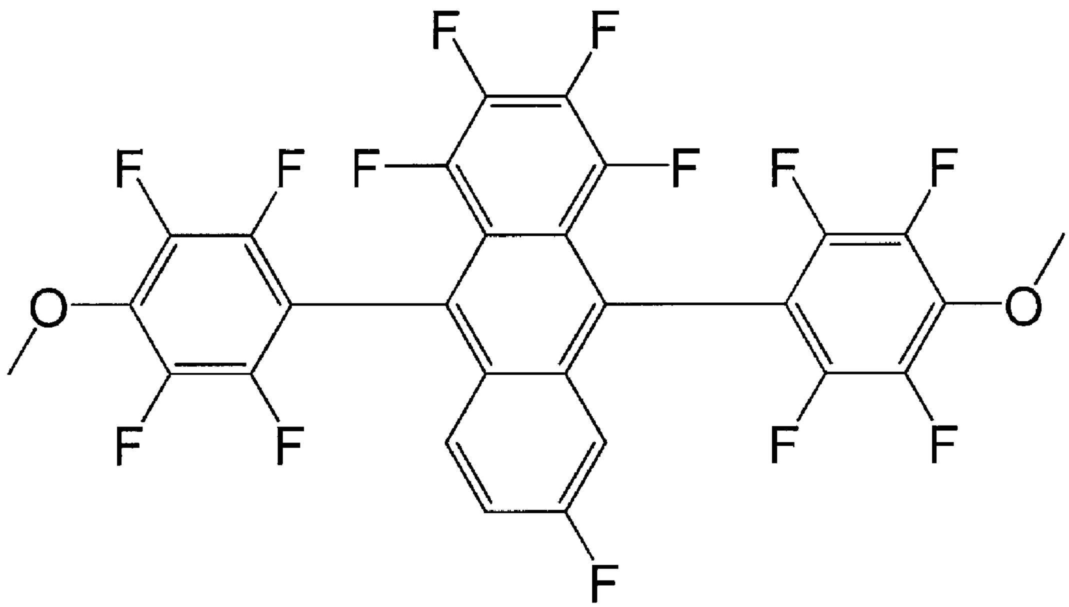
FIG. 77 illustrates a 1,2,3,4,6-pentafluoro-9,10-bis(2,3,5,6-tetrafluoro-4-methoxyphenyl)anthracene.
Figure 78:
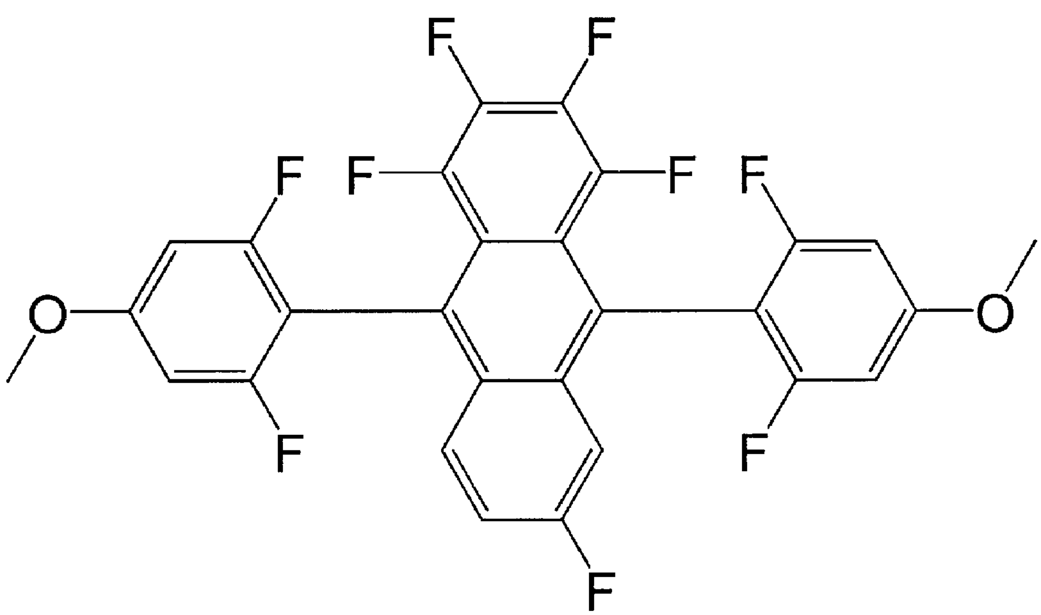
FIG. 78 illustrates a 9,10-bis(2,6-difluoro-4-methoxyphenyl)-1,2,3,4,6-pentafluoroanthracene.
Figure 79:
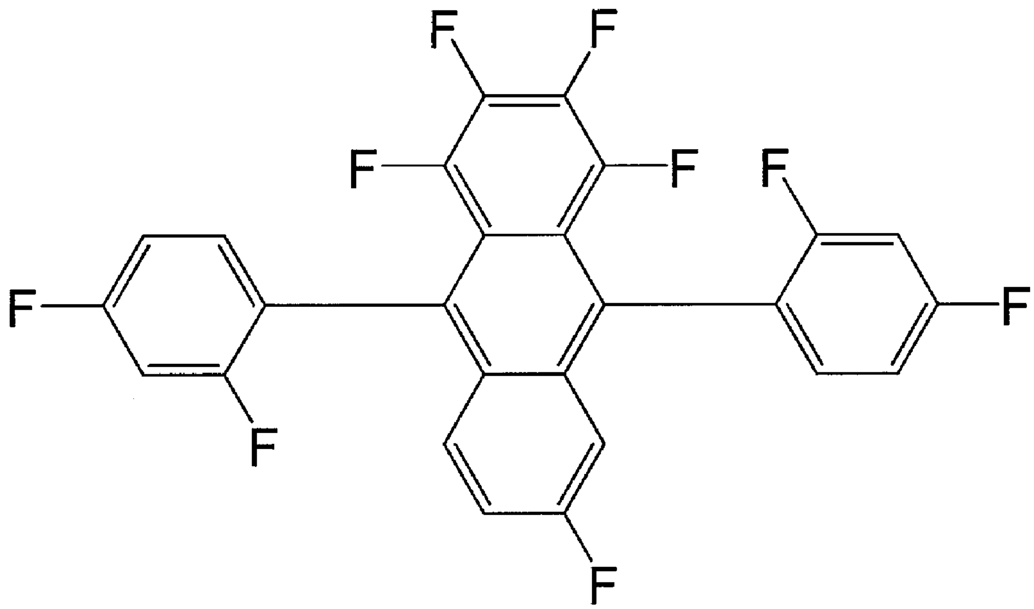
FIG. 79 illustrates a 9,10-bis(2,4-difluorophenyl)-1,2,3,4,6-pentafluoroanthracene.
Figure 80:
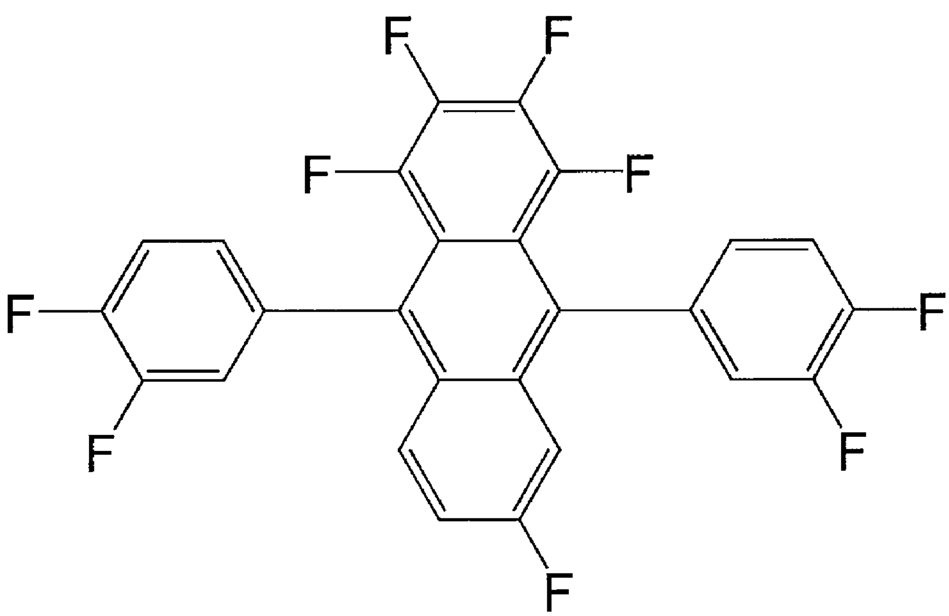
FIG. 80 illustrates a 9,10-bis(3,4-difluorophenyl)-1,2,3,4,6-pentafluoroanthracene.
Figure 81:
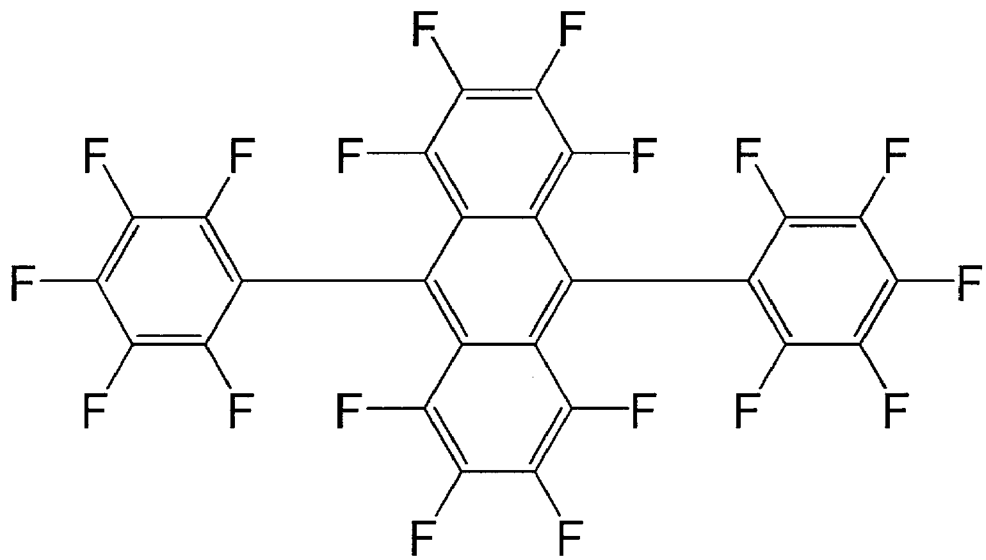
FIG. 81 illustrates a 1,2,3,4,5,6,7,8-octafluoro-9,10-bis(2,3,4,5,6-pentafluorophenyl)anthracene.
Figure 82:
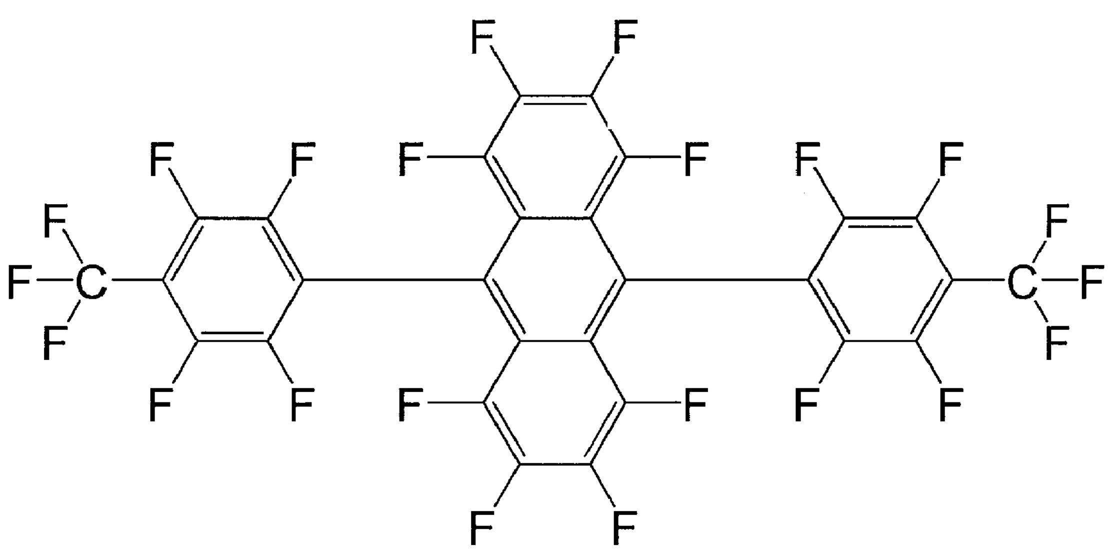
FIG. 82 illustrates a 1,2,3,4,5,6,7,8-octafluoro-9,10-bis[2,3,5,6-tetrafluoro-4-(trifluoromethyl)phenyl]anthracene.
Figure 83:
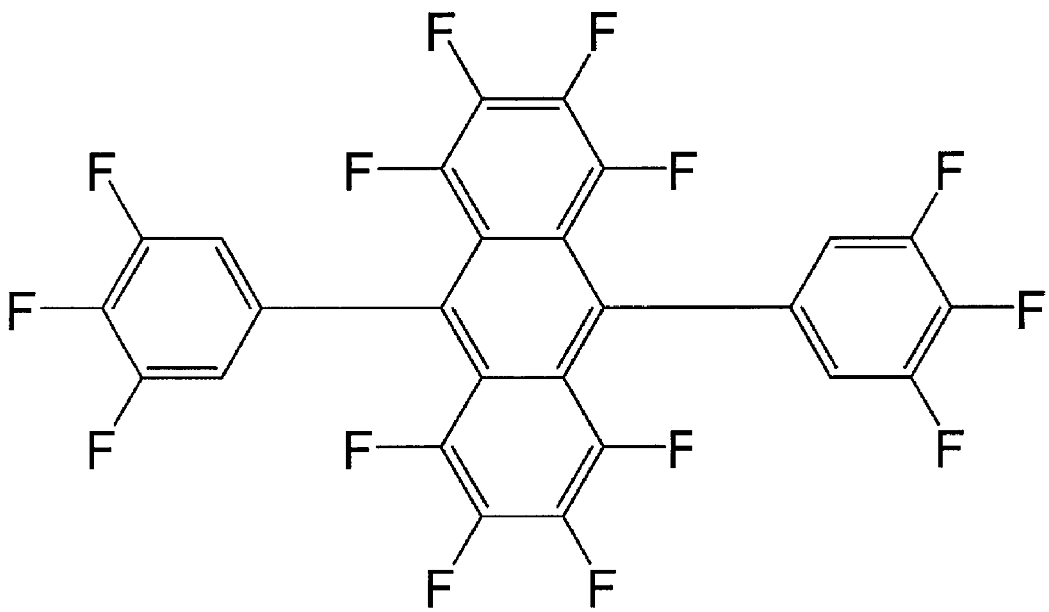
FIG. 83 illustrates a 1,2,3,4,5,6,7,8-octafluoro-9,10-bis(3,4,5-trifluorophenyl)anthracene
Figure 84:
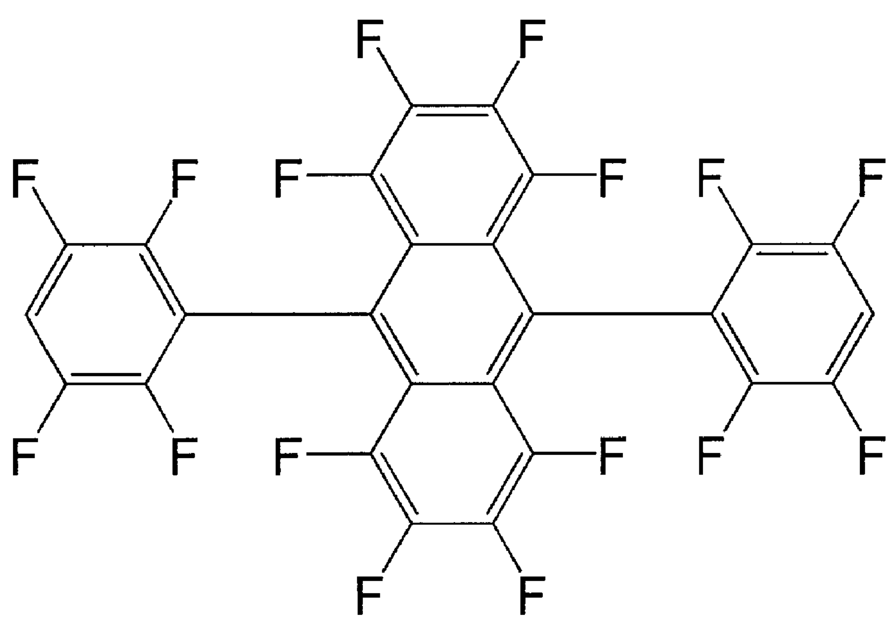
FIG. 84 illustrates a 1,2,3,4,5,6,7,8-octafluoro-9,10-bis(2,3,5,6-tetrafluorophenyl)anthracene.
Figure 85:
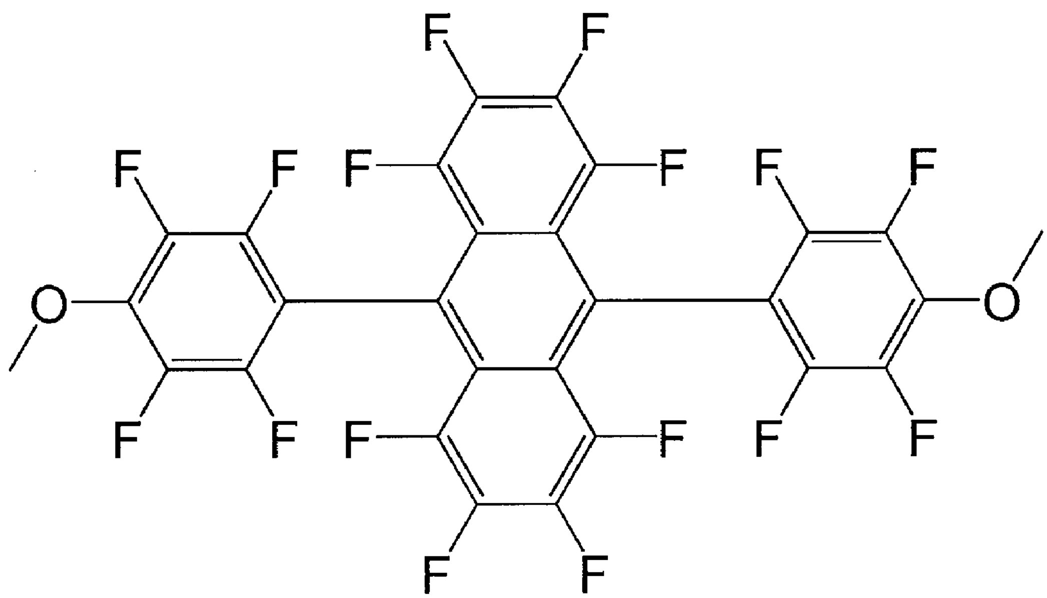
FIG. 85 illustrates a 1,2,3,4,5,6,7,8-octafluoro-9,10-bis(2,3,5,6-tetrafluoro-4-methoxyphenyl)anthracene.
Figure 86:
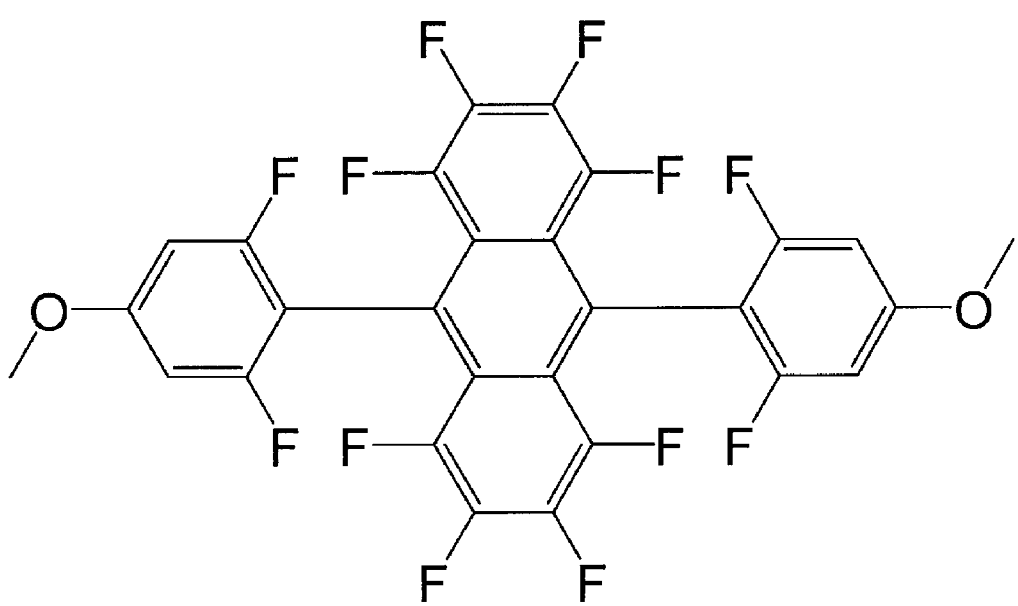
FIG. 86 illustrates a 9,10-bis(2,6-difluoro-4-methoxyphenyl)-1,2,3,4,5,6,7,8-octafluoroanthracene.
Figure 87:
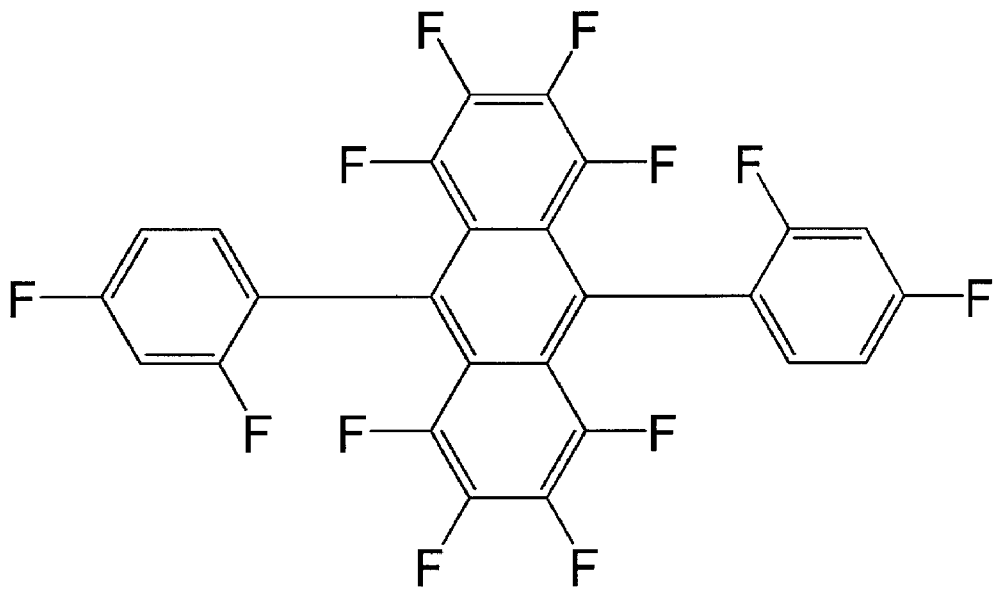
FIG. 87 illustrates a 9,10-bis(2,4-difluorophenyl)-1,2,3,4,5,6,7,8-octafluoroanthracene.

Another process of the invention, as shown is Reaction Scheme 3, to produce asymmetrical anthracene derivatives, where $Ar^1$ and $Ar^2$ are not the same, may be described as a synthetic process comprising steps of:

a) a coupling reaction between: i) a 9-substituted anthracene, where X is bromine, iodine, or triflate; ii) a fluorinated arylboronic acid, arylboronic ester, or aryltrifluoroborate, wherein the other substituents are as defined in FIG. 2; iii) a palladium catalyst from a large family of commercially available compounds, with the preferred examples being palladium(II) acetate, tetrakis(triphenylphosphine)palladium(0), and dichlorobis(chlorodi-tert-butylphosphine)palladium(II); iv) a suitable base, with the preferred examples being potassium phosphate, sodium carbonate, and potassium fluoride, and a suitable solvent, with the preferred examples being toluene, tetrahydrofuran, isopropanol, and 1,2-dimethoxyethane; v) optionally including a phosphorous ligand;

b) halogenation of the 10 position of the anthracene using, for example, bromine in tetrachloromethane as illustrated; and c) a second coupling reaction similar to the one described in part a), wherein the other substituents are as defined in FIG. 3 with the addition of a phosphorous ligand, with the preferred examples being 2-cyclohexylphosphino-2'6'-dimethoxy-1,1'-biphenyl (S-Phos) or tris(o-tolyl) phosphine.

to 20 percent by weight, with the preferred example being tert-butanol at a concentration of 5 to 15 percent may be included.

Reaction Scheme 4

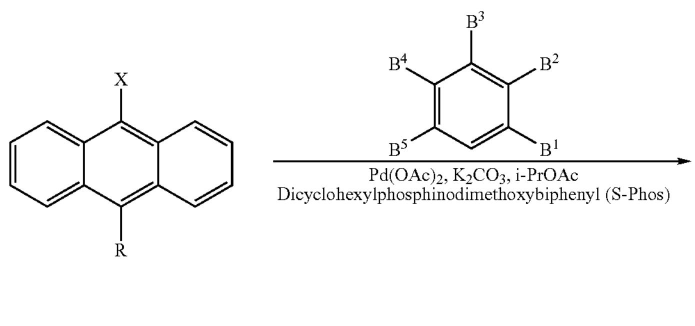

Alternatively, the asymmetric derivatives of the present invention can be made by via a synthetic coupling reaction as shown in Reaction Scheme 4 containing:

a) either a 9-haloanthracene or a 9-halo-10-arylanthracene, where the halogen is bromine or chlorine, with the preferred example being bromine and the aryl group R is described by FIG. 3; b) an aryl ring with at least 3 to 4 fluorines, at least one hydrogen, where the remaining substituent can be hydrogen, fluorine, an alkoxy group, or a trifluoromethyl group; c) palladium acetate; d) 2-cyclohexylphosphino-2'6'-dimethoxy-1,1'-biphenyl (S-Phos); e) a suitable acetate solvent, with the preferred example being isopropyl acetate.

The production of a chemiluminescent system exhibiting a blue/violet emission spectrum with a maximum in the range of about 390 nm to less than-438 nm according to the present invention is accomplished by the combination of two solutions, A and B:

wherein solution A comprises:

an oxalate selected from a family of substituted carbalkoxyphenyloxalates at a concentration of 10 to 30 percent by weight, with the preferred example being bis(2,4,5-trichloro-6-carbopentoxyphenyl)oxalate at a concentration of 14 to 23; percent, an anthracene of Formula 1 as described in this invention at a concentration of 0.025 to 0.5 percent by weight, with the preferred amount being 0.10 to 0.25 percent; and a suitable solvent from a family of phthalates, benzoates, and citrates, with the preferred solvent being butyl benzoate;

wherein solution B comprises:

a solution of 70% aqueous hydrogen peroxide at a concentration of 2 to 6.5 percent of the total weight, with the preferred amount being 3 to 4 percent; and a catalyst from a family of salicylates:

wherein said catalyst is at a concentration of 0.0015 to 0.05 percent by weight with the preferred amount being 0.005 to 0.010 percent; and a solvent from a family of phthalates, benzoates, and citrates, with the preferred example being dimethyl phthalate, dibutyl phthalate, triethyl citrate, benzyl benzoate, butyl benzoate, propylene glycol dibenzoate, ethylhexyl diphenyl phosphate, ethylene glycol dibenzoate, and n-butyl,tri-n-hexyl citrate, or the like phthalates, benzoates and citrates. Optionally, a solvent miscible in water and most organic solvents at a concentration of 5

Compounds which are generally suitable to catalyze the reaction between the activator and oxalate type esters are basic compounds, such as amines, hydroxides, alkoxides, carboxylic acid salts and phenolic salts. Preferred salts of carboxylic acids and phenols are derived from compounds having a pKa in the range of from about 1 to about 6 as measured in aqueous solution, for example tetrabutylammonium salicylate, sodium salicylate, ethyl-2-acetoxy salicylate, various tetraalkylammonium salicylates, lithium salicylate, lithium 5-t-butyl salicylate sodium-5-bromosalicylate, sodium-5-chlorosalicylate, and sodium-5-fluorosalicylate or the like, with the preferred catalyst being sodium salicylate.

EXAMPLES

Starting materials and solvents were purchased from Aldrich, Matrix, Synthonix, and Alfa Aesar. All of the desired compounds were analyzed via HPLC, and their spectra (absorption, chemiluminescent emission, and NMR) recorded.

Example 1

Figure 1:
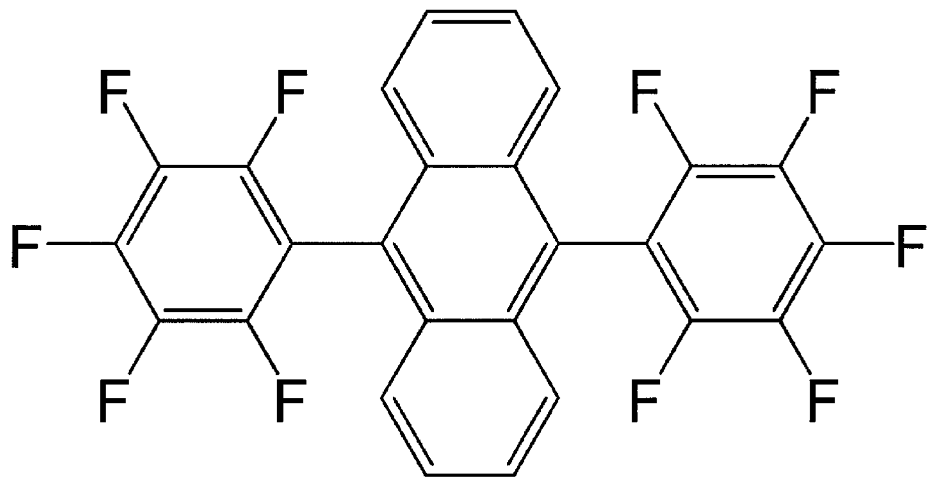
FIGS. 1-88 illustrate anthracene derivatives with the same or symmetrically substituted aryl rings in the 9 and 10 positions.

Procedure for Producing 9,10-bis(2,3,4,5,6-pentafluorophenyl)anthracene (FIG. 1)

To a suspension of 6.25 g of 9,10-anthraquinone in 60 mL of anhydrous 1,4-dioxane, was added 0.1 mole of pentafluorophenylmagnesium bromide in 30 mL of diethyl ether prepared as described in *Organic Synthesis*, Coll. Vol. 6, p. 875. The mixture was brought to a reflux and held there overnight. The reaction was quenched in a mixture of 25 mL of saturated aqueous ammonium chloride and 25 mL of water. After bringing the pH of the aqueous portion of the solution to pH 3-4 using dilute aqueous hydrochloric acid, 100 mL of ethyl acetate was added. The layers were separated, and the aqueous layer was extracted with an additional 100 mL of ethyl acetate. The combined organic extracts were dried with magnesium sulfate and concentrated. The residue was recrystallized from toluene to give 8.66 g of off-white crystals.

The reduction of the diol was accomplished by taking 5.44 g of 9,10-bis(pentafluorophenyl)-9,10-dihydro-9,10-anthracenediol in 50 mL of acetic acid and refluxing it with 9 g of potassium iodide and 9 g of sodium hypophosphite for 4 hours. After cooling, white crystals were filtered off. The crude product was recrystallized using a 1:1 mixture of tolu ene and hexane to yield 2.00 g of 9,10-bis(pentafluorophenyl) anthracene with a melting point of 337-338° C.

Figure 88:
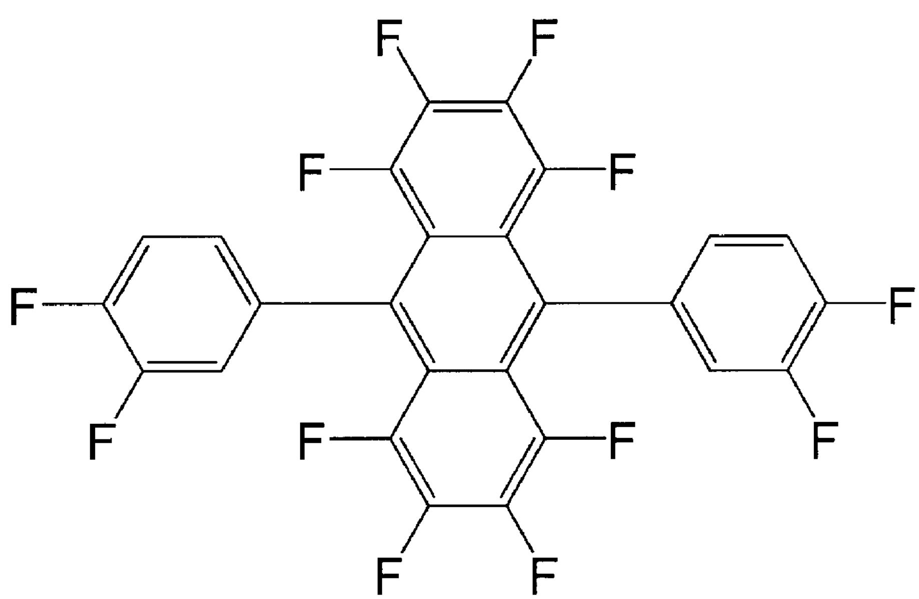
Figure 89:
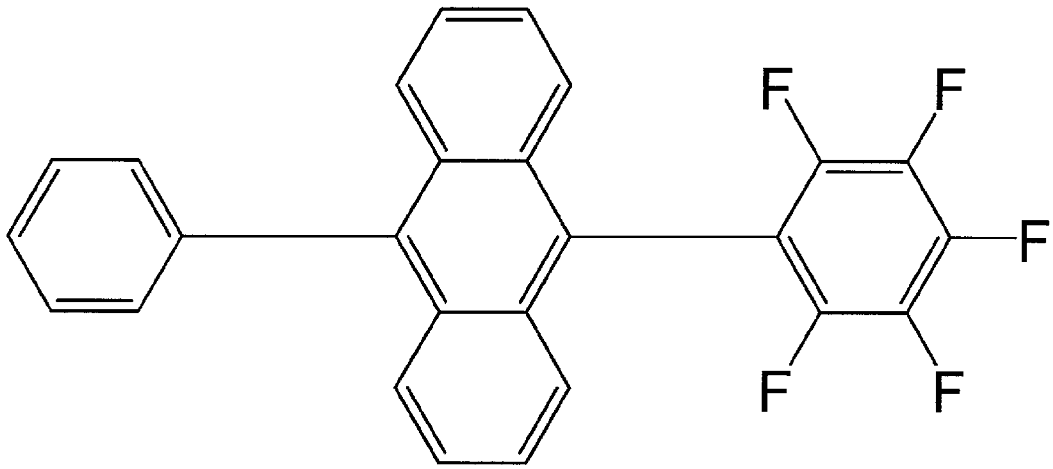
FIGS. 89-660 illustrate anthracene derivatives with different or asymmetric aryl rings in the 9 and 10 positions.
Figure 90:
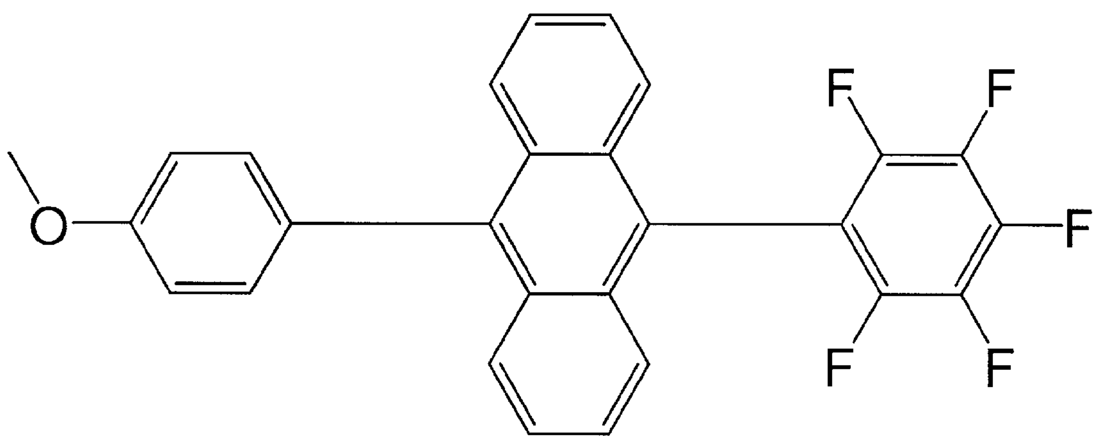
FIG. 90 illustrates a 9-(4-methoxyphenyl)-10-(2,3,4,5,6-pentafluorophenyl)anthracene.
Figure 91:
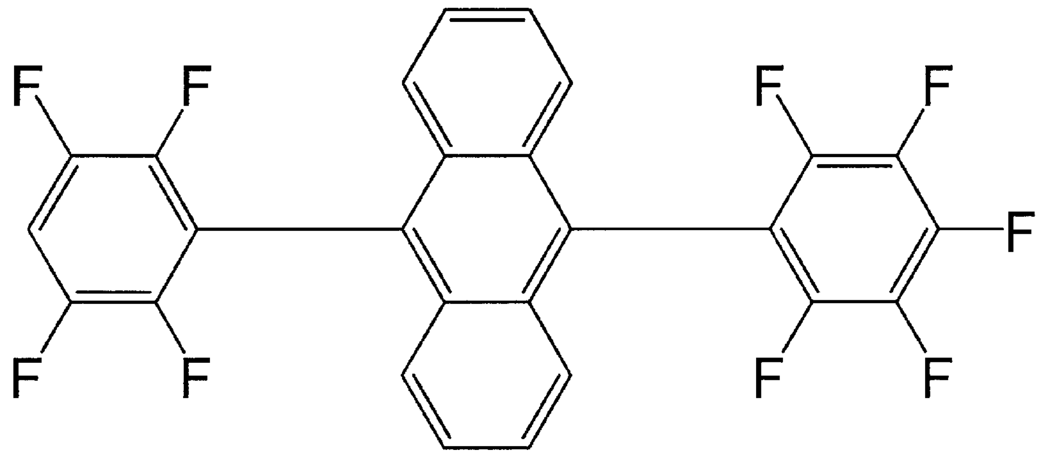
FIG. 91 illustrates a 9-(2,3,4,5,6-pentafluorophenyl)-10-(2,3,5,6-tetrafluorophenyl)anthracene.
Figure 92:
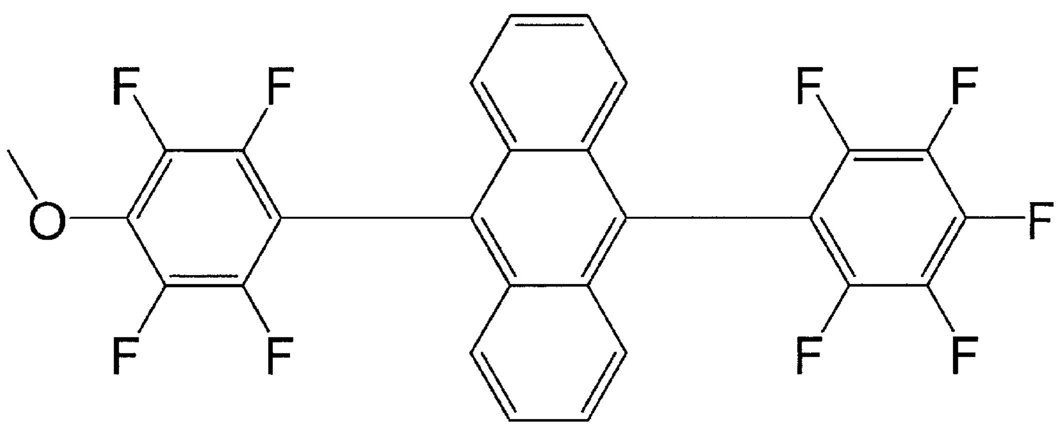
FIG. 92 illustrates a 9-(2,3,4,5,6-pentafluorophenyl)-10-(2,3,5,6-tetrafluoro-4-methoxyphenyl)anthracene.
Figure 93:
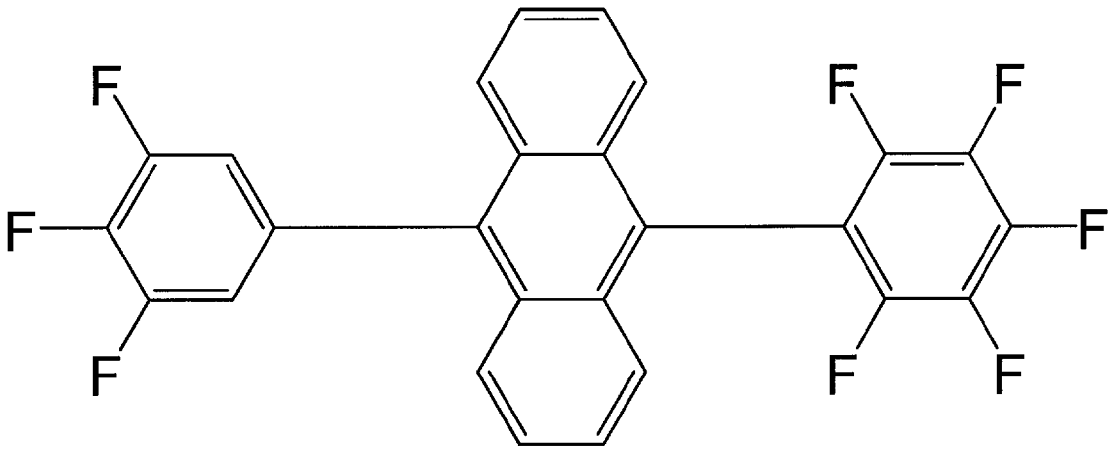
FIG. 93 illustrates a 9-(2,3,4,5,6-pentafluorophenyl)-10-(3,4,5-trifluoro)anthracene.
Figure 94:
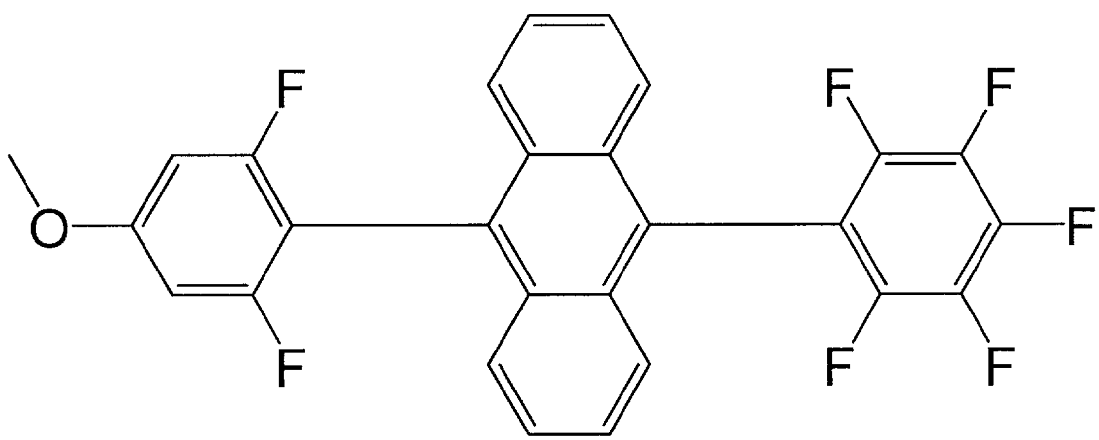
FIG. 94 illustrates a 9-(2,6-difluoro-4-methoxyphenyl)-10-(2,3,4,5,6-pentafluorophenyl)anthracene
Figure 95:
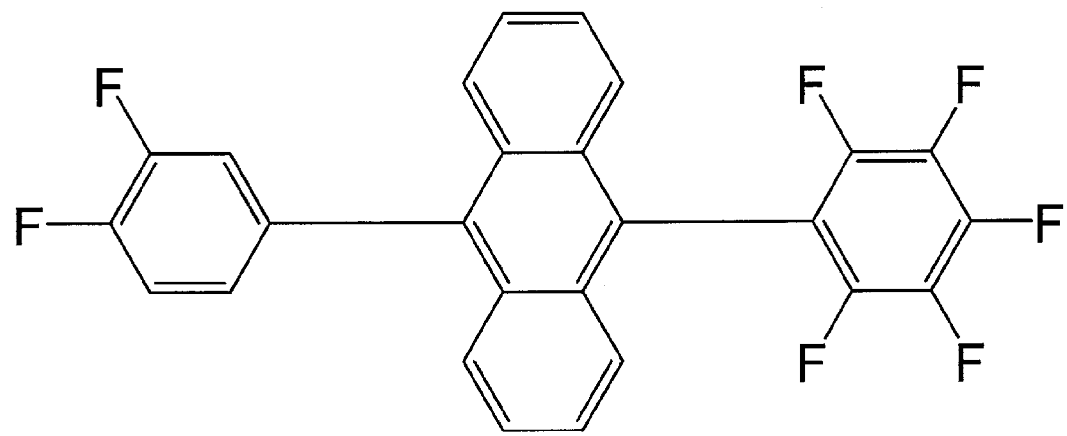
FIG. 95 illustrates a 9-(3,4-difluorophenyl)-10-(2,3,4,5,6-pentafluorophenyl)anthracene.
Figure 96:
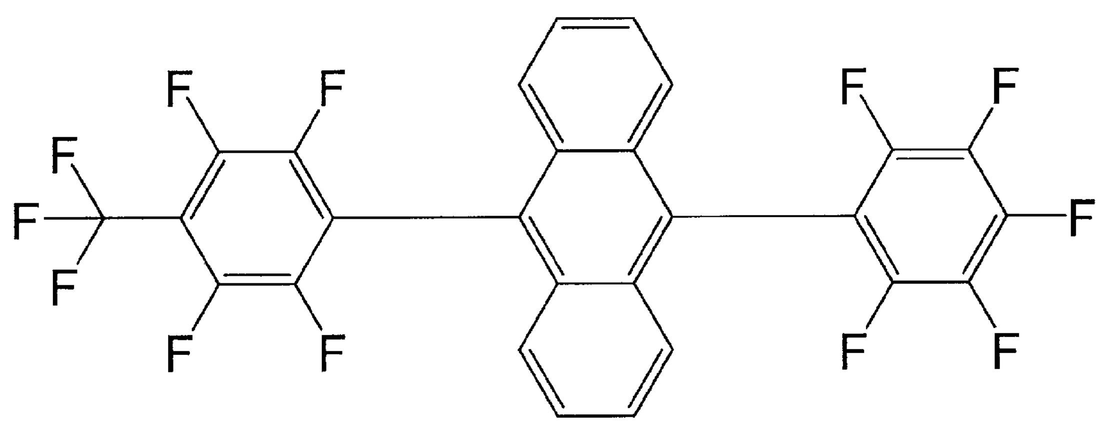
FIG. 96 illustrates a 9-(2,3,4,5,6-pentafluorophenyl)-10-[2,3,5,6-tetrafluoro-4-(trifluoromethyl)phenyl]anthracene.
Figure 97:
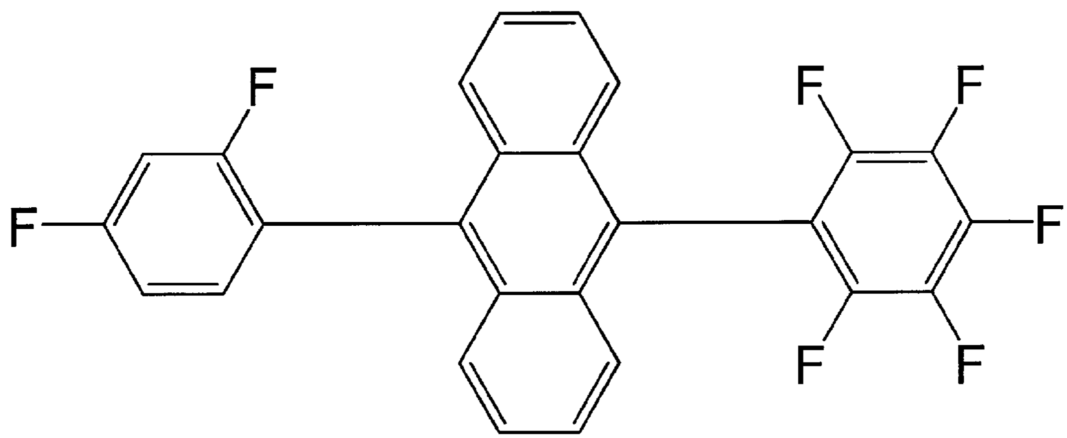
FIG. 97 illustrates a 9-(2,4-difluorophenyl)-10-(2,3,4,5,6-pentafluorophenyl)anthracene.
Figure 98:
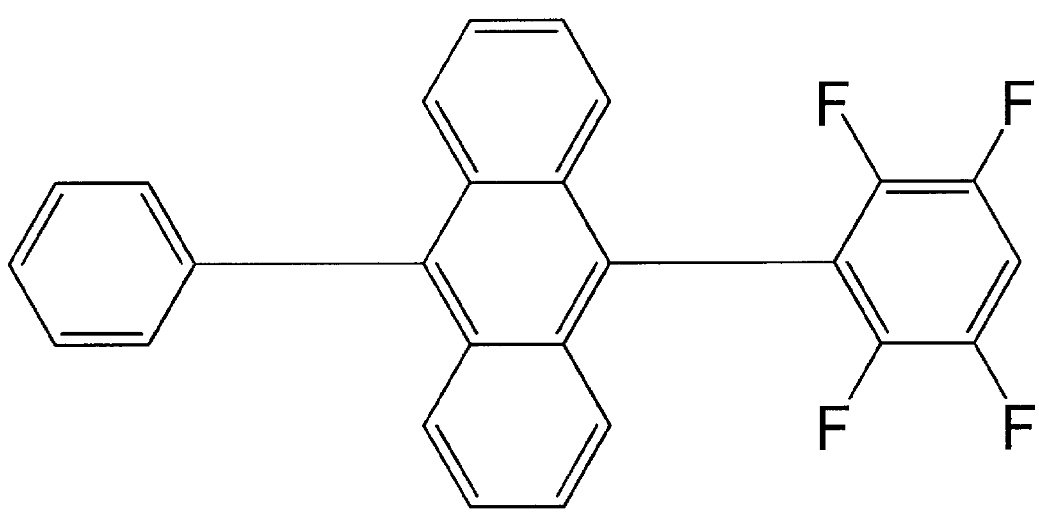
FIG. 98 illustrates a 9-phenyl-10-(2,3,5,6-tetrafluorophenyl)anthracene.
Figure 99:
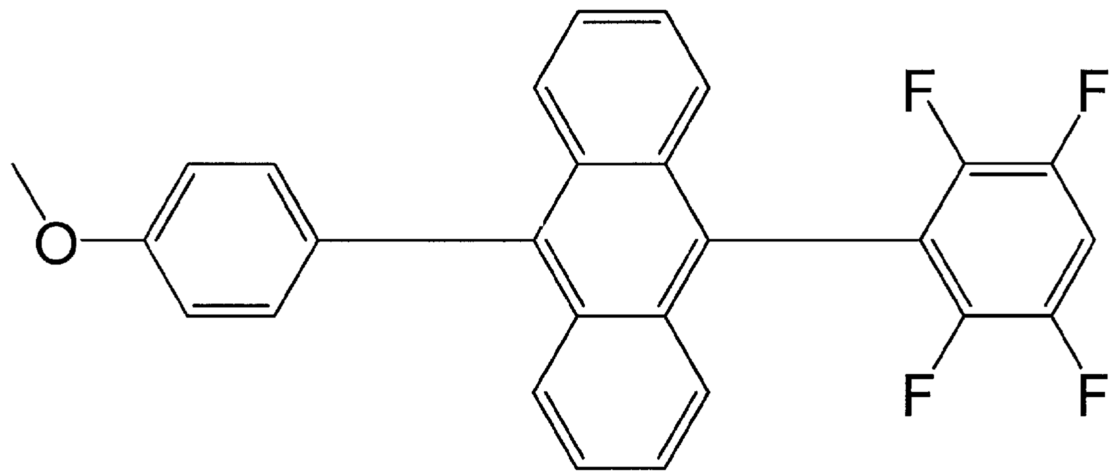
FIG. 99 illustrates a 9-(4-methoxyphenyl)-10-(2,3,5,6-tetrafluorophenyl)anthracene.
Figure 100:
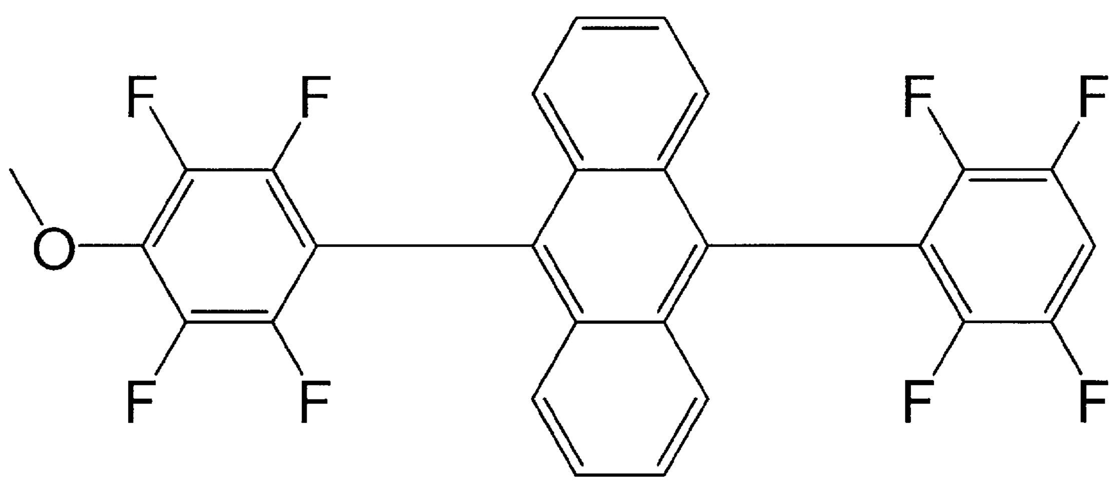
FIG. 100 illustrates a 9-(2,3,5,6-tetrafluorophenyl)-10-(2,3,5,6-tetrafluoro-4-methoxyphenyl)anthracene.
Figure 101:
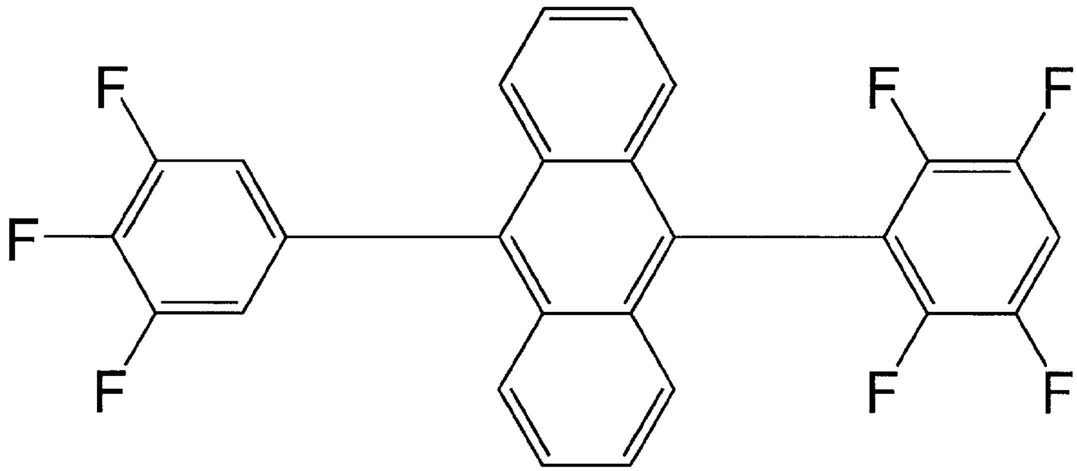
FIG. 101 illustrates a 9-(2,3,5,6-tetrafluorophenyl)-10-(3,4,5-trifluorophenyl)anthracene.
Figure 102:
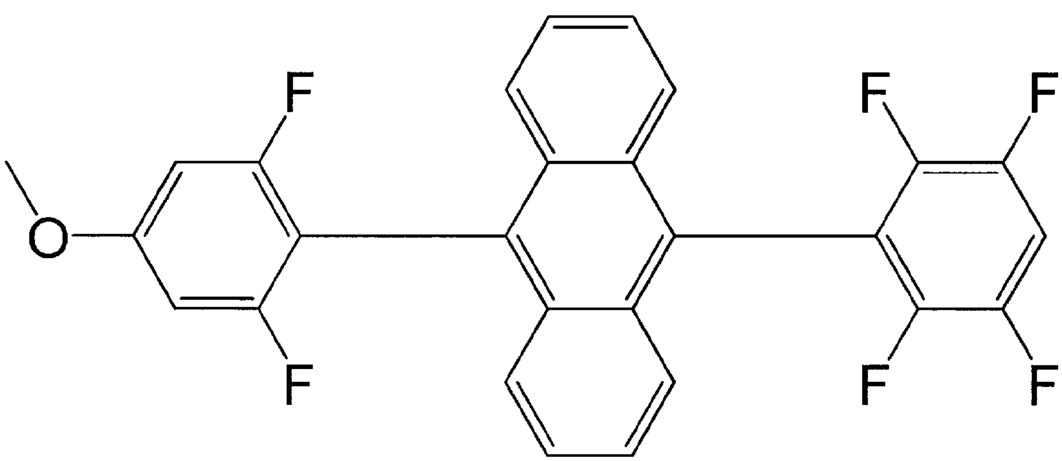
FIG. 102 illustrates a 9-(2,6-difluoro-4-methoxyphenyl)-10-(2,3,5,6-tetrafluorophenyl)anthracene.
Figure 103:
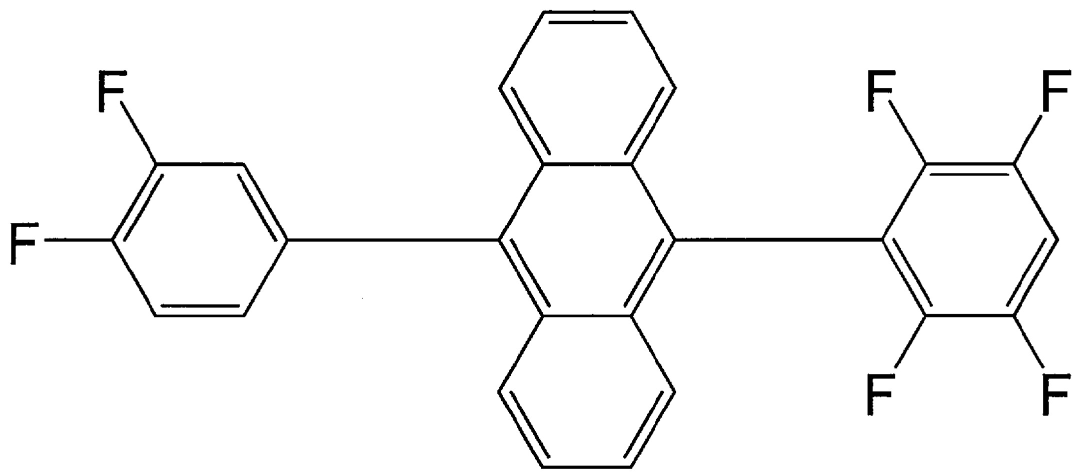
FIG. 103 illustrates a 9-(3,4-difluorophenyl)-10-(2,3,5,6-tetrafluorophenyl)anthracene.
Figure 104:
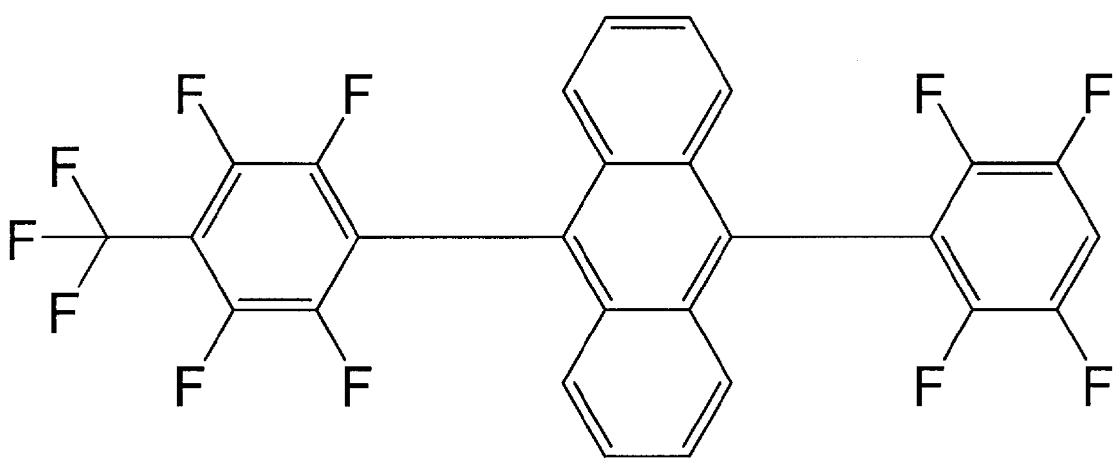
FIG. 104 illustrates a 9-[2,3,5,6-tetrafluoro-4-(trifluoromethyl)phenyl]-10-(2,3,5,6-tetrafluorophenyl)anthracene.
Figure 105:
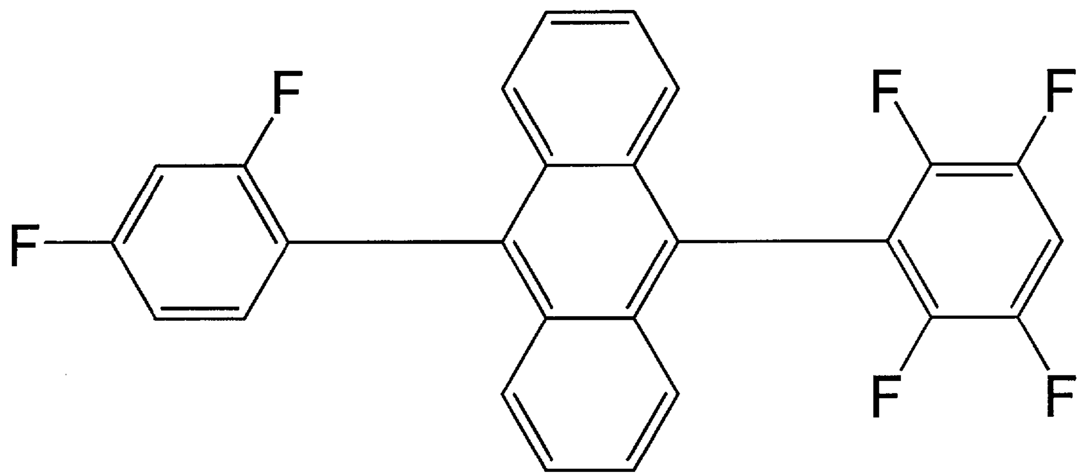
FIG. 105 illustrates a 9-(3,4-difluorophenyl)-10-(2,3,5,6-tetrafluorophenyl)anthracene.

This method was used for compounds depicted in FIGS. 1-88.

Example 2

Symmetrically and asymmetrically substituted anthracenes can be made via Reaction Scheme 2 and Reaction Scheme 3 or a variation thereof using the procedures in the following: patents and patent applications, US 2004/0161633 A1, U.S. Pat. No. 6,815,094 B2, US, 2007/0176544 A1; literature references, *Org. Lett.* 2007, 9, 4893-4896. *J. Am. Chem. Soc.* 2008, 130, 1012-1016, and *J. Org. Chem.* 2008, 73, 5589-5591; and references therein.

This method was used for the symmetrically substituted compounds depicted in FIGS. 3, 6-8, 22-24, and 38-40 and most of the asymmetrically substituted compounds or a portion thereof.

Example 3

Figure 106:
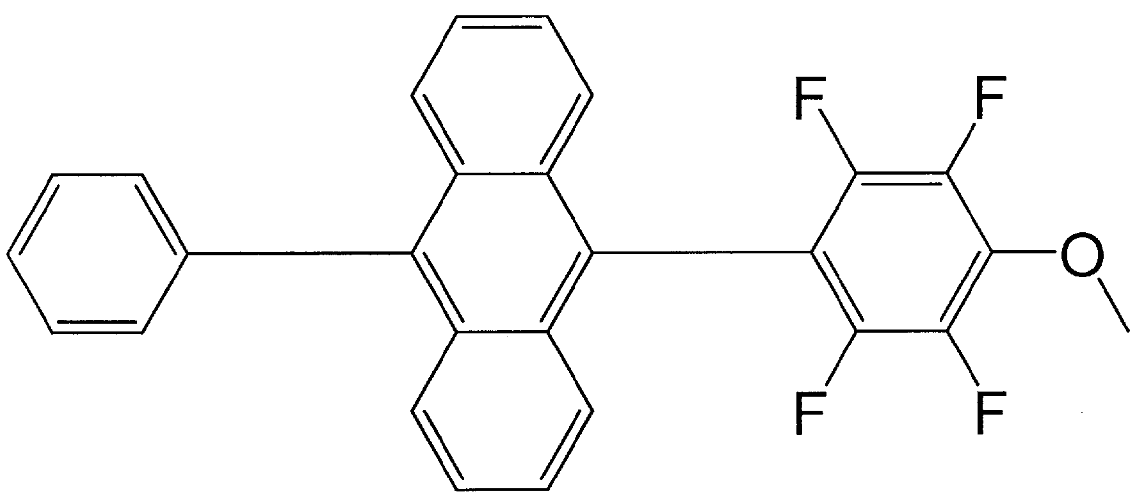
FIG. 106 illustrates a 9-phenyl-10-(2,3,5,6-tetrafluoro-4-methoxyphenyl)anthracene.
Figure 107:
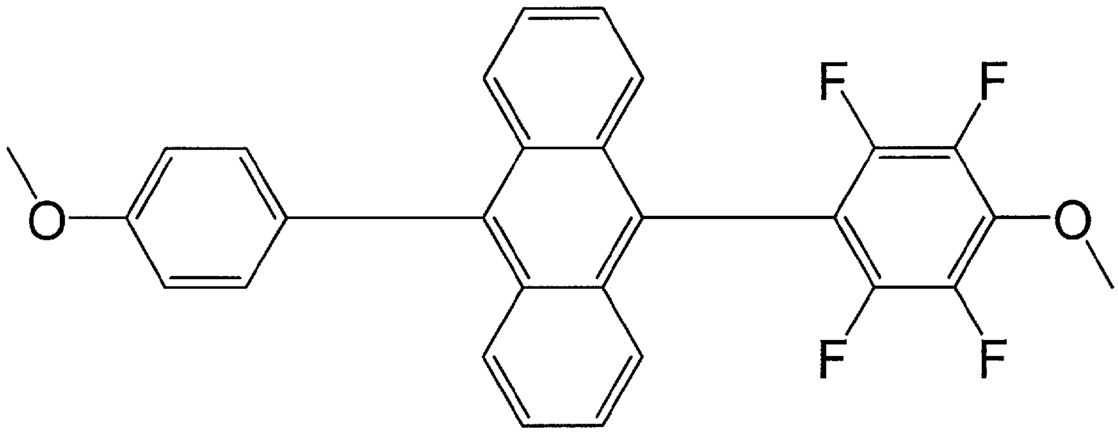
FIG. 107 illustrates a 9-(4-methoxyphenyl)-10-(2,3,5,6-tetrafluoro-4-methoxyphenyl)anthracene.
Figure 108:
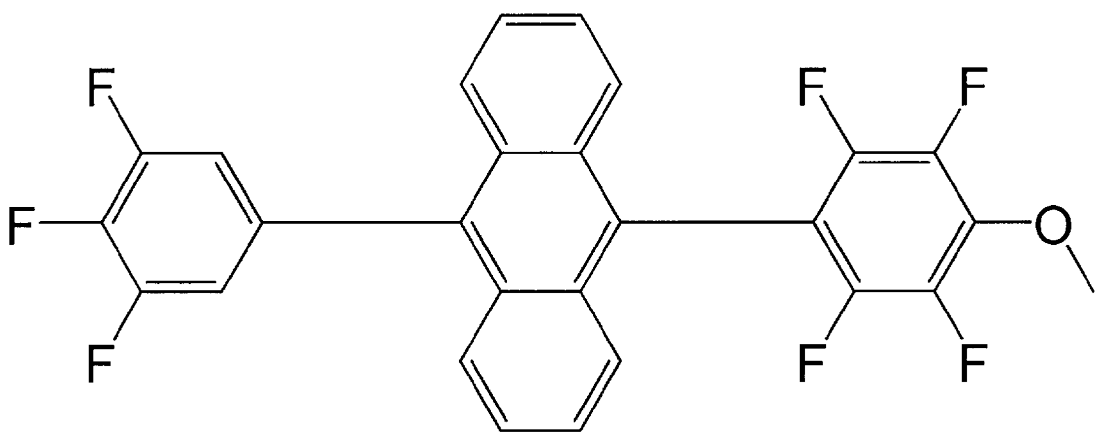
FIG. 108 illustrates a 9-(2,3,5,6-tetrafluoro-4-methoxyphenyl)-10-(3,4,5-trifluorophenyl)anthracene.
Figure 109:
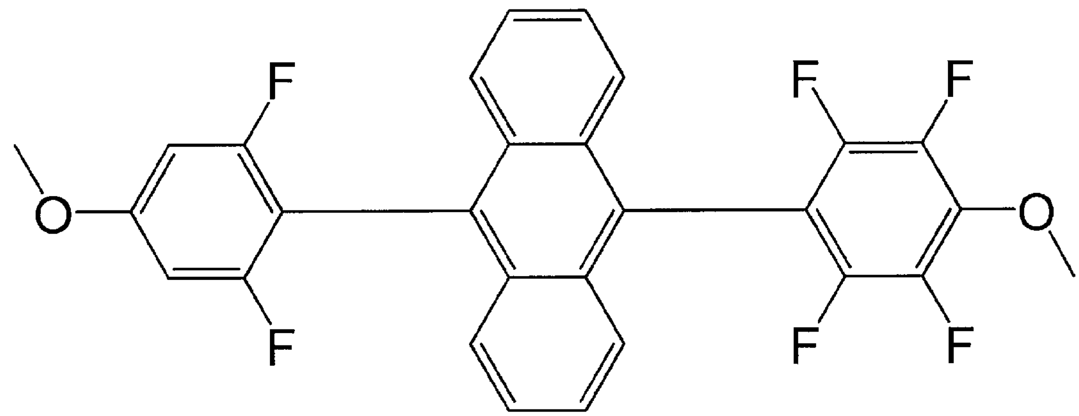
FIG. 109 illustrates a 9-(2,6-difluoro-4-methoxyphenyl)-10-(2,3,5,6-tetrafluoro-4-methoxyphenyl)anthracene.
Figure 110:
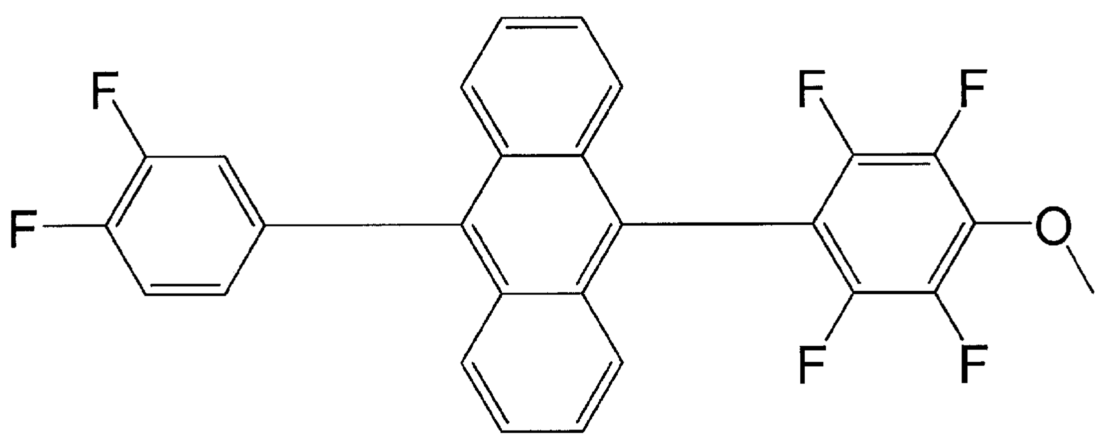
FIG. 110 illustrates a 9-(3,4-difluorophenyl)-10-(2,3,5,6-tetrafluoro-4-methoxyphenyl)anthracene.
Figure 111:
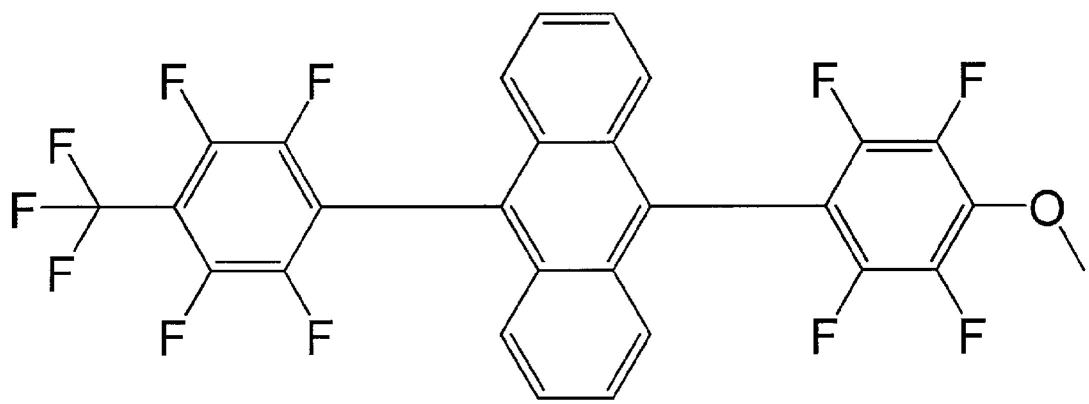
FIG. 111 illustrates a 9-[2,3,5,6-tetrafluoro-4-(trifluoromethyl)phenyl]-10-(2,3,5,6-tetrafluoro-4-methoxyphenyl)anthracene.
Figure 112:
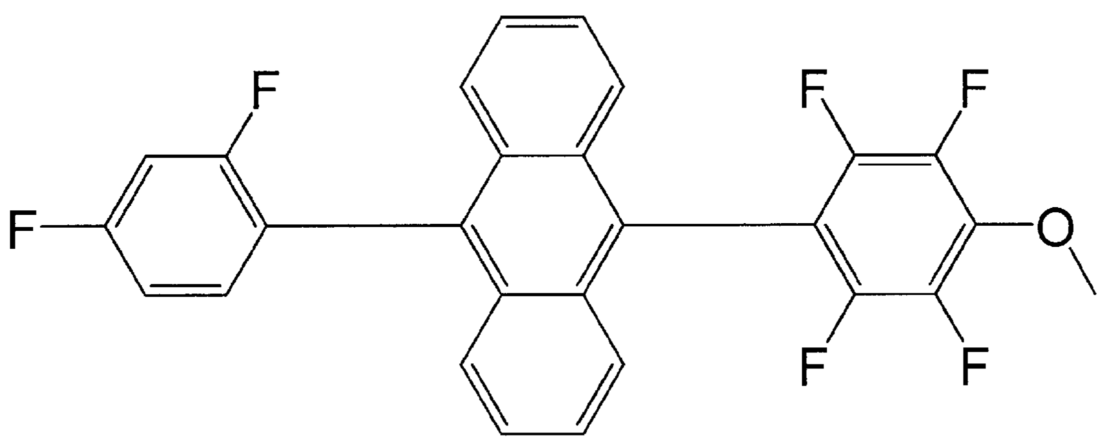
FIG. 112 illustrates a 9-(2,4-difluorophenyl)-10-(2,3,5,6-tetrafluoro-4-methoxyphenyl)anthracene.
Figure 113:
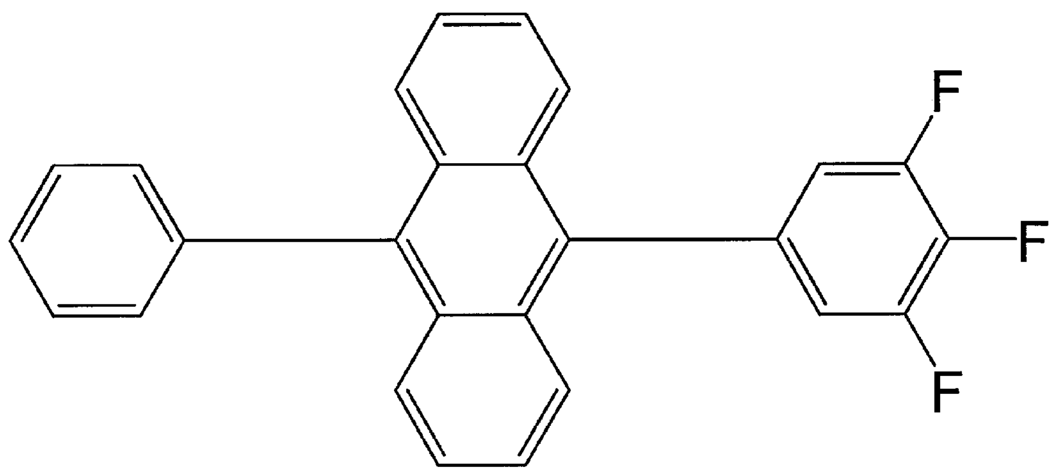
FIG. 113 illustrates a 9-phenyl-10-(3,4,5-trifluorophenyl)anthracene.
Figure 114:
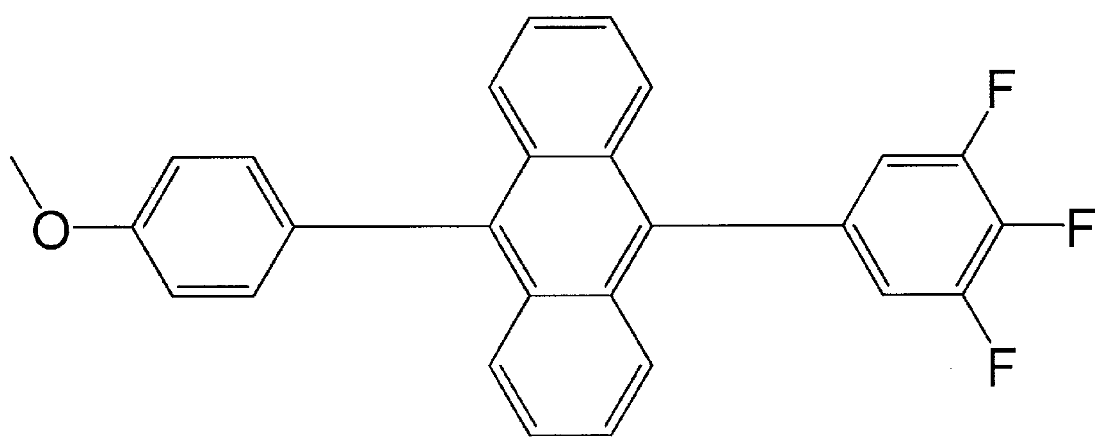
FIG. 114 illustrates a 9-(4-methoxyphenyl)-10-(3,4,5-trifluorophenyl)anthracene.
Figure 115:
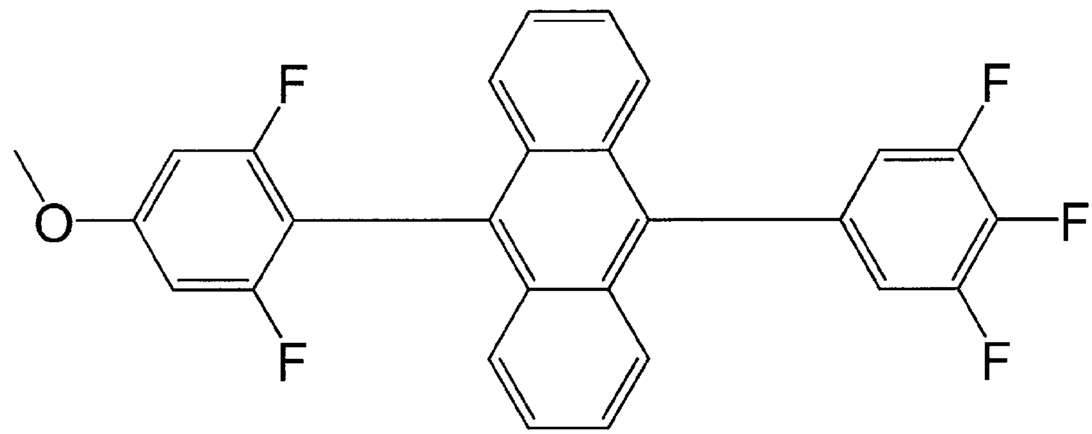
FIG. 115 illustrates a 9-(2,6-difluoro-4-methoxyphenyl)-10-(3,4,5-trifluorophenyl)anthracene.
Figure 116:
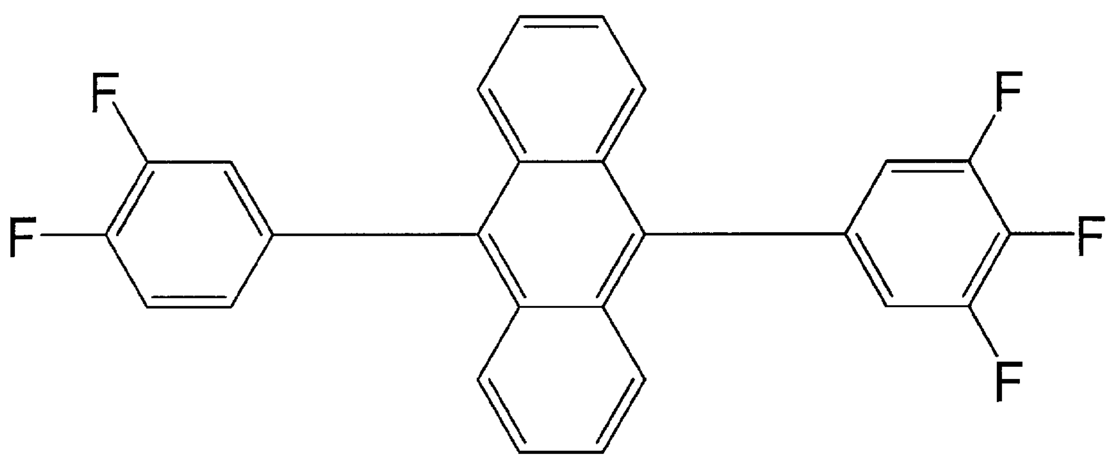
FIG. 116 illustrates a 9-(3,4-difluorophenyl)-10-(3,4,5-trifluorophenyl)anthracene.
Figure 117:
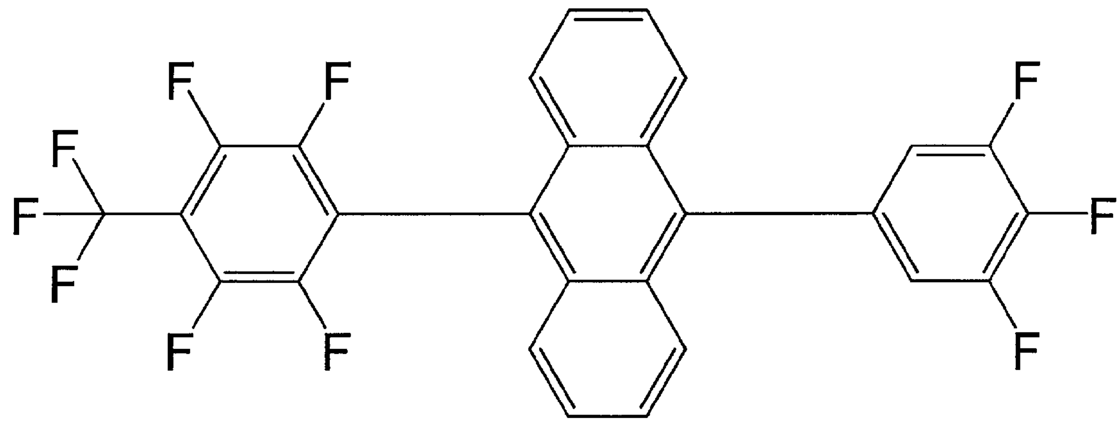
FIG. 117 illustrates a 9-[2,3,5,6-tetrafluoro-4-(trifluoromethyl)phenyl]-10-(3,4,5-trifluorophenyl)anthracene.
Figure 118:
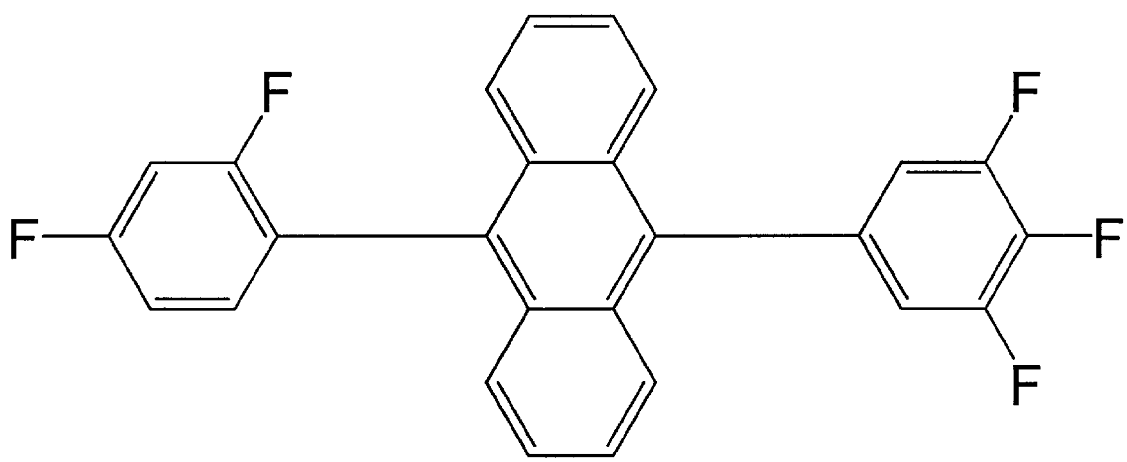
FIG. 118 illustrates a 9-(2,4-difluorophenyl)-10-(3,4,5-trifluorophenyl)anthracene.
Figure 119:
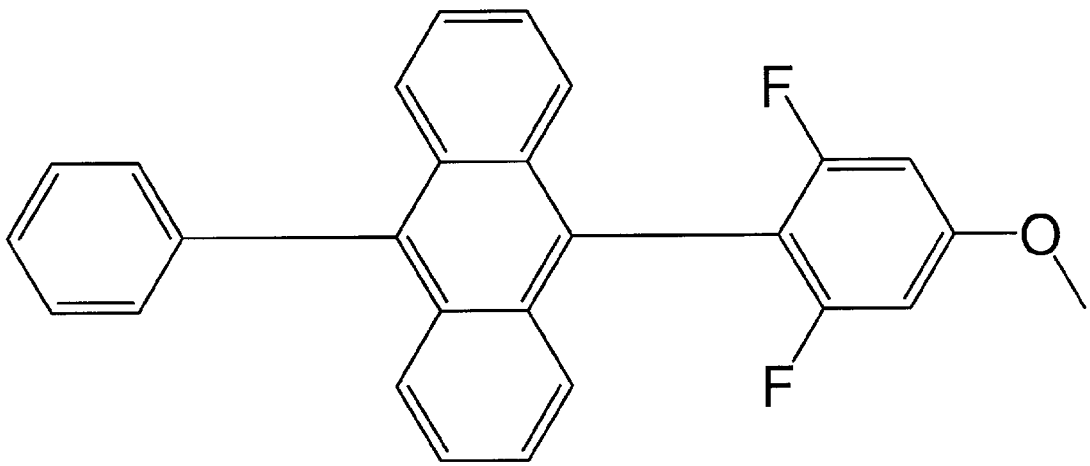
FIG. 119 illustrates a 9-(2,6-difluoro-4-methoxyphenyl)-10-phenylanthracene.
Figure 120:
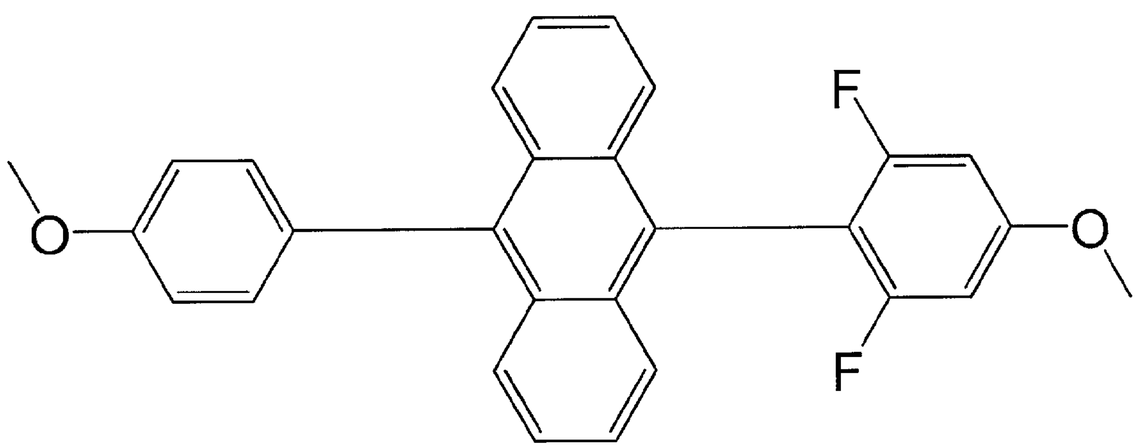
FIG. 120 illustrates a 9-(2,6-difluoro-4-methoxyphenyl)-10-(4-methoxyphenyl)anthracene.
Figure 121:
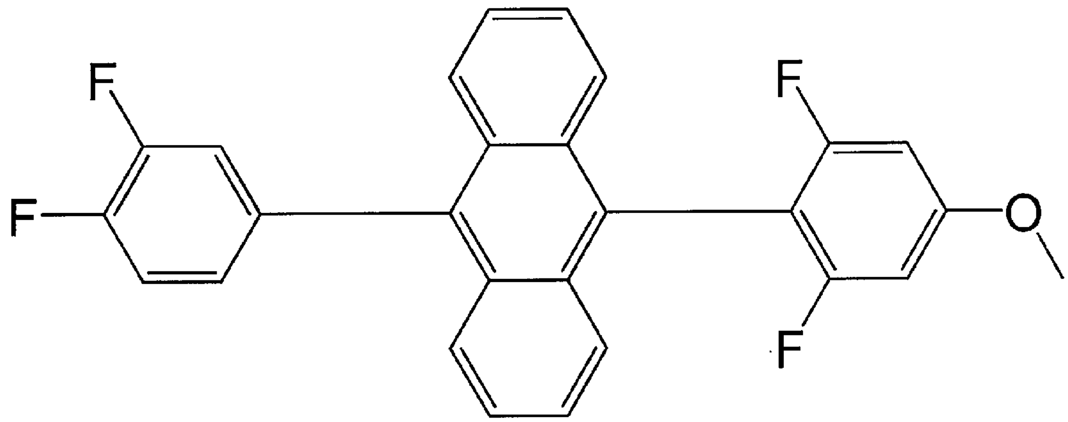
FIG. 121 illustrates a 9-(2,6-difluoro-4-methoxyphenyl)-10-(3,4-difluorophenyl)anthracene.
Figure 122:
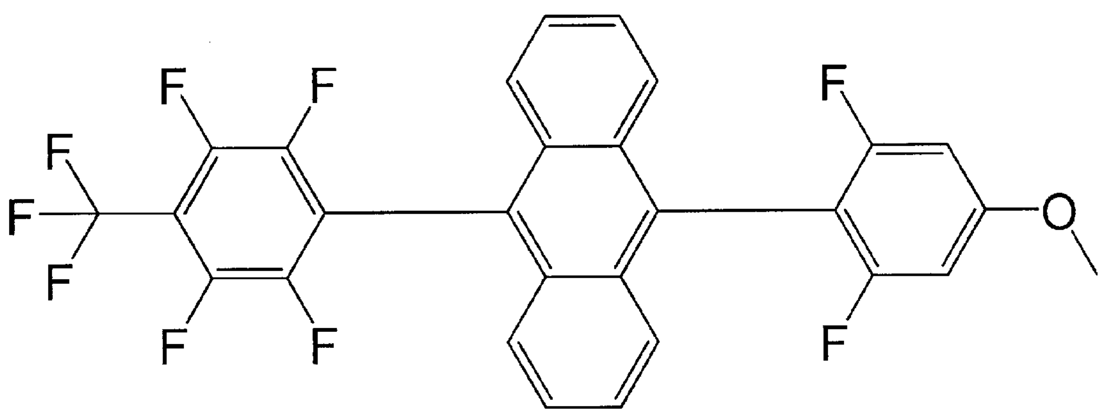
FIG. 122 illustrates a 9-(2,6-difluoro-4-methoxyphenyl)-10-[2,3,5,6-tetrafluoro-4-(trifluoromethyl)phenyl]anthracene.
Figure 123:
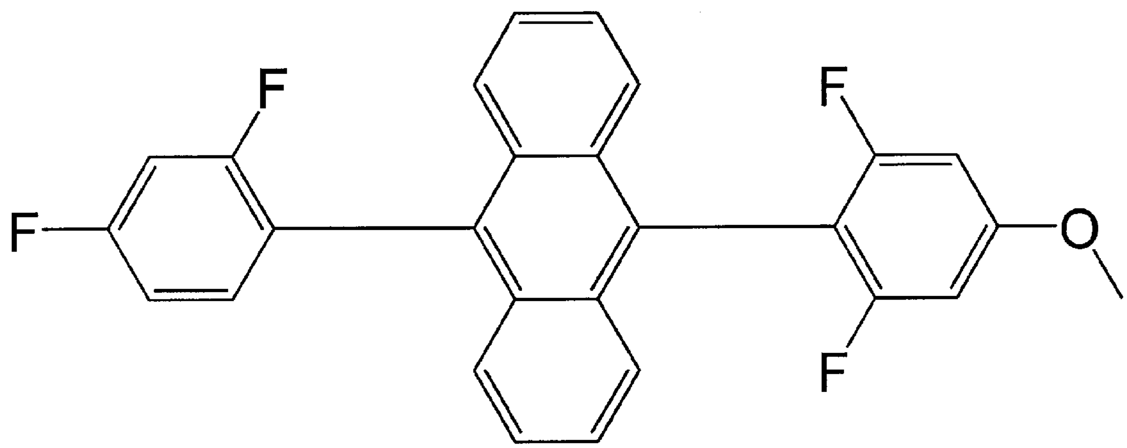
Figure 124:
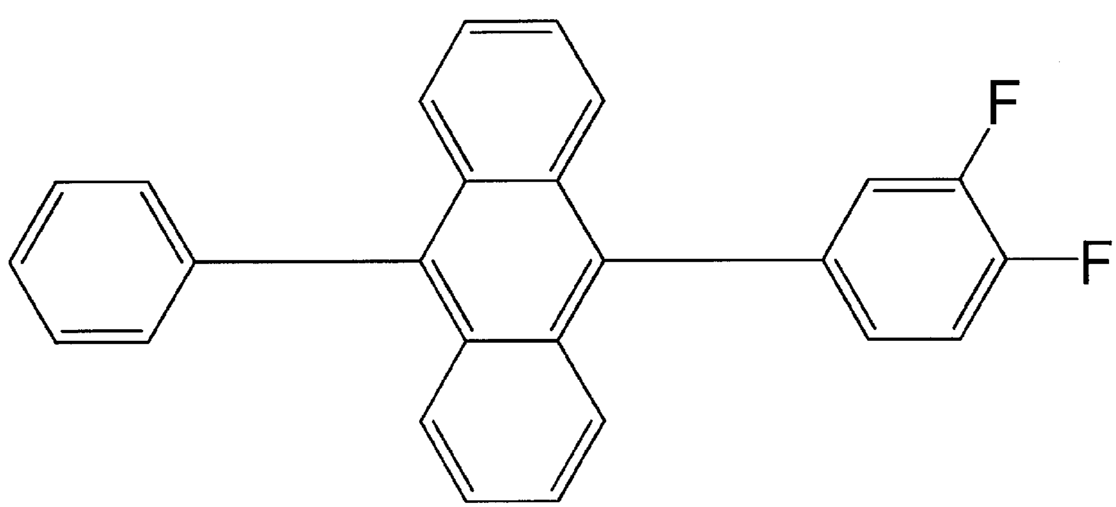
Figure 125:
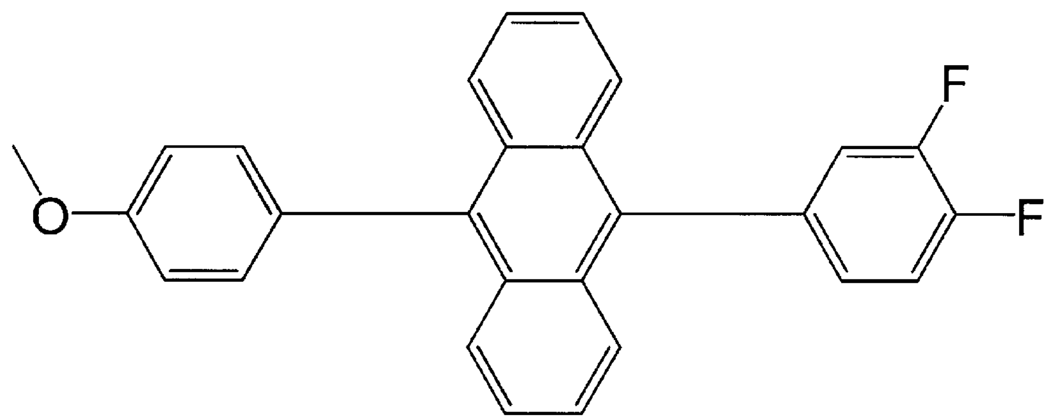
Figure 126:
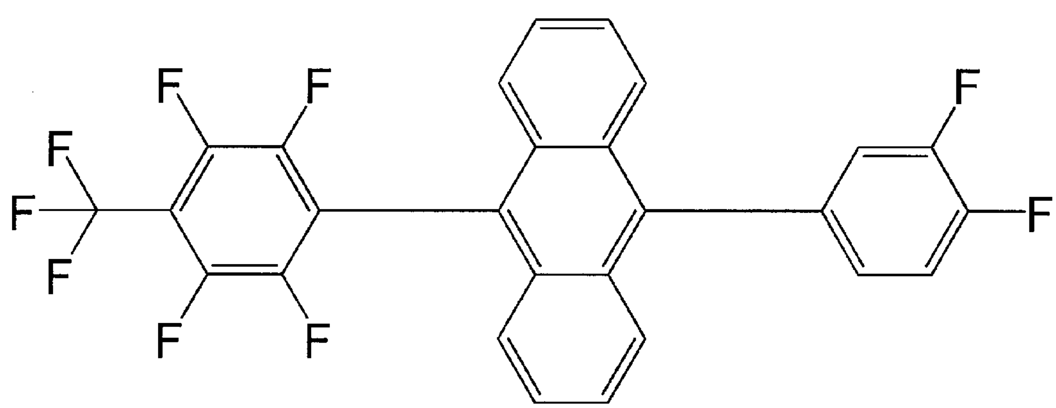
Figure 127:
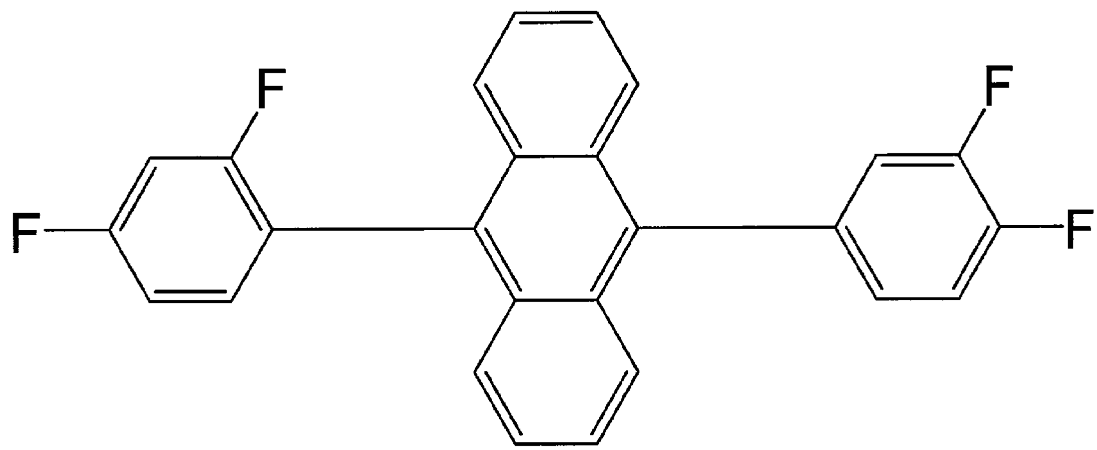
Figure 128:
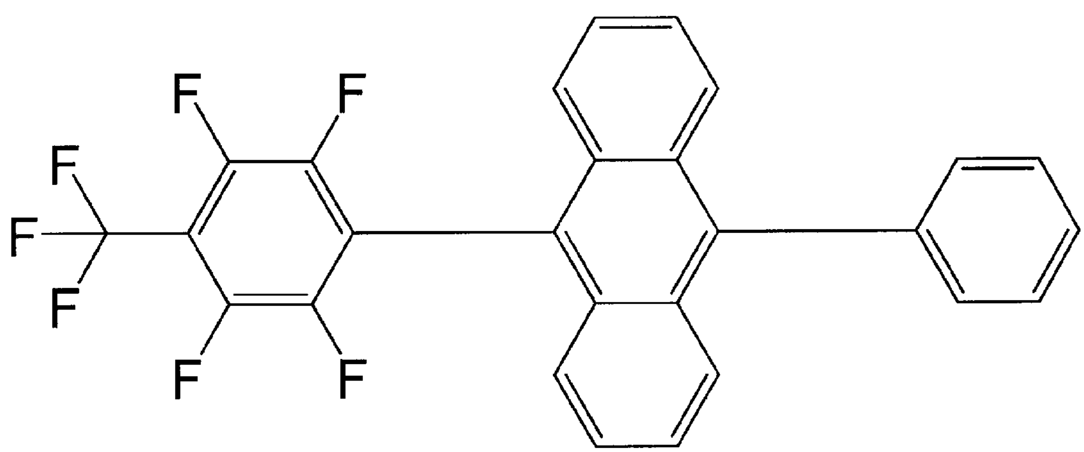
Figure 129:
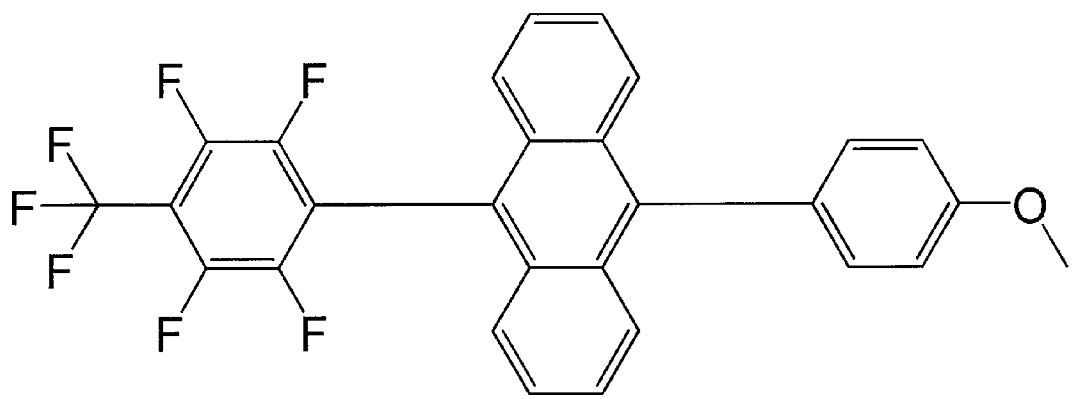
Figure 130:
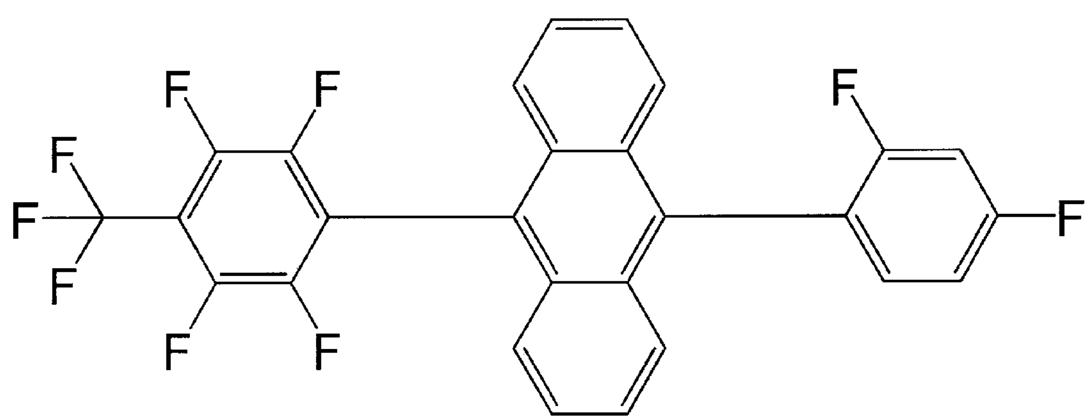
Figure 131:
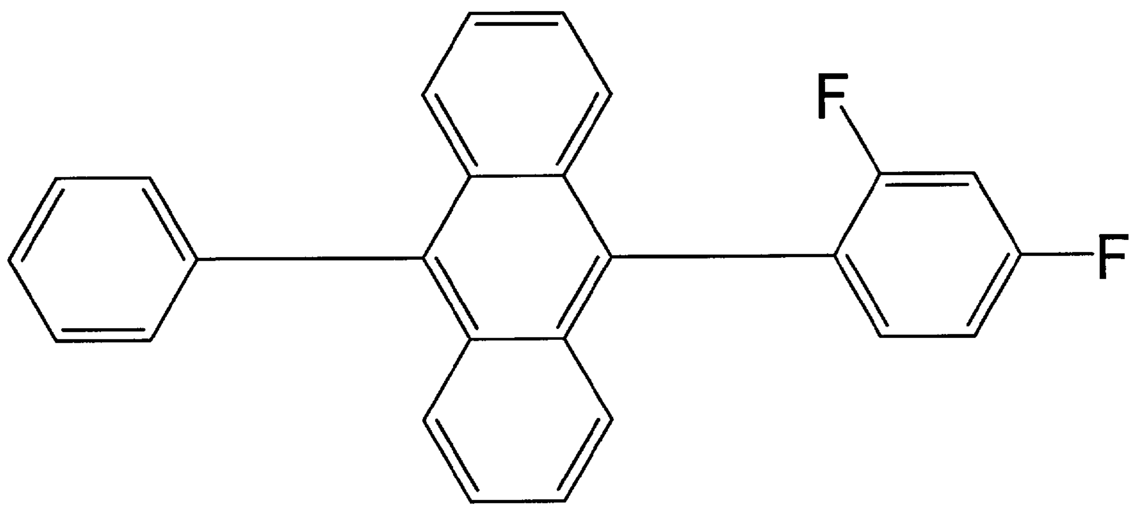
Figure 132:
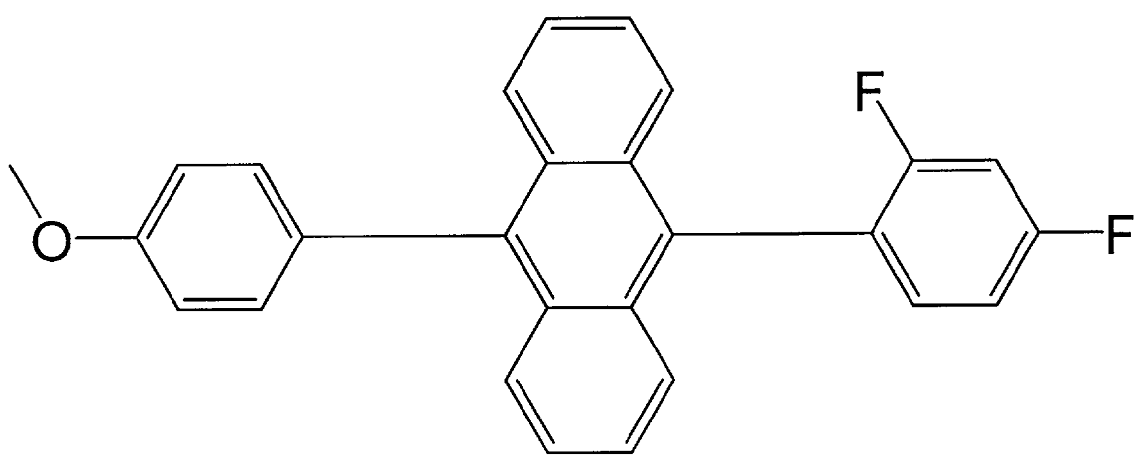
Figure 133:
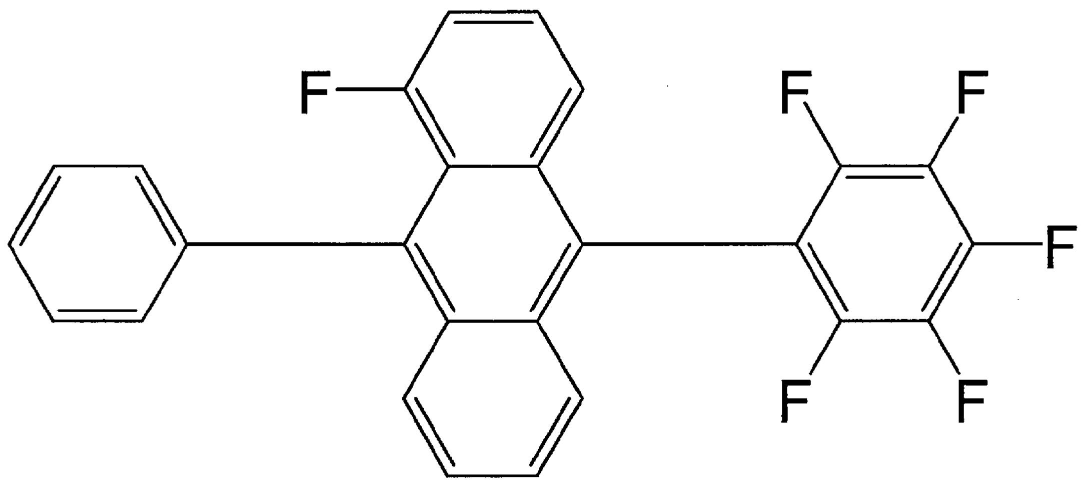
Figure 134:
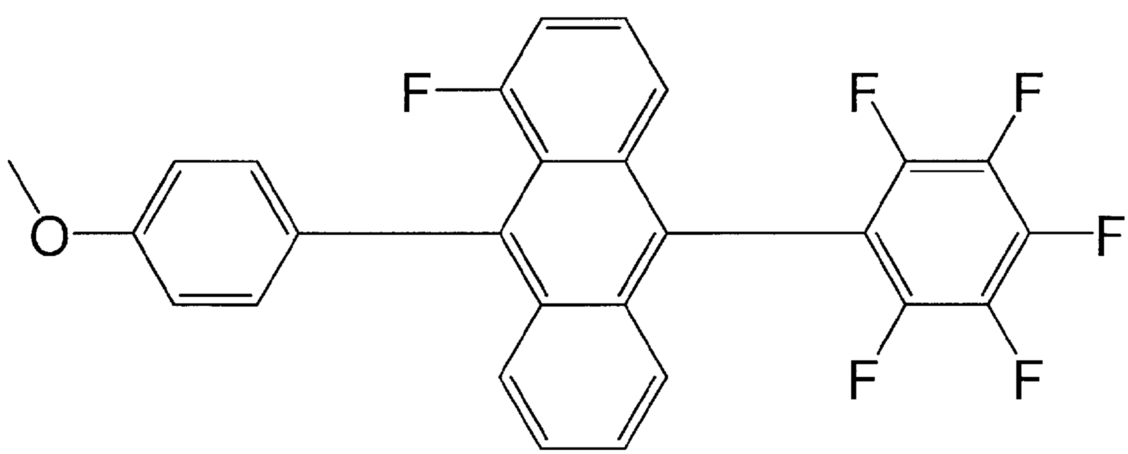
Figure 135:
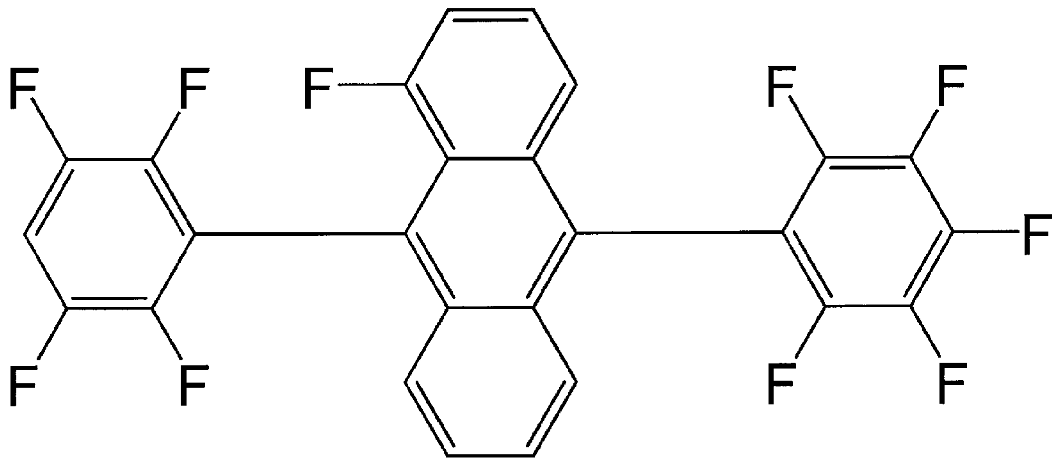

Procedure for Producing 9-(4-methoxy-2,3,5,6-tetrafluorophenyl)-10-phenylanthracene (FIG. 106)

This compound was made using the method depicted in Reaction Scheme 4. A flask with a magnetic stir bar was charged with 1.00 g of potassium carbonate, 0.15 g of dicyclohexylphosphinodimethoxybiphenyl (S-Phos), and 0.04 g of palladium acetate. The reaction vessel was evacuated and backfilled with argon three times. A solution of 1.29 g of 2,3,5,6-tetrafluoroanisole in 8 mL of isopropyl acetate was added via syringe, and the reaction mixture was stirred for one minute. A solution of 9-bromo-10-phenylanthracene in 4 mL in isopropyl acetate was added. The reaction mixture was heated to 80° C. and held at that temperature overnight. The reaction was filtered and the crude material purified via column chromatography on silica gel using 5% diethyl ether in heptane to yield 350 mg of a white solid with a melting point of 153-154° C.

This method was used to attach pentafluorophenyl, 2,3,5,6-tetrafluorophenyl, and 2,3,5,6-tetrafluoro-4-methoxyphenyl groups to a 9-haloanthracene or a 9-halo-10-arylanthracene as described in *Org. Lett.* 2006, 8, 5097-5100 and references therein.

Example 4

The light output of the compounds was also tested. The process for producing chemiluminesence is described as follows;

(A) A quantity of butyl benzoate is heated to 70° C. and purged with nitrogen gas and brought to room temperature under nitrogen. To a suitable vessel are added 85.81 parts by weight of butyl benzoate and 14.0 parts by weight of bis(2,4,5-trichloro-6-carbopentoxyphenyl) oxalate, with stirring, until the oxalate is dissolved. To the resultant solution is then added 0.19 parts by weight of the blue/violet fluorescer. The solution is allowed to cool and stored under nitrogen. The resultant solution is called Solution A.

(B) To a second vessel are added 86.7 parts by weight of dimethyl phthalate and 10.0 parts by weight of t-butyl alcohol. To this mixture are added 3.3 parts by weight of 70% hydrogen peroxide and 0.0072 parts of sodium salicylate. The resultant solution is called Solution B. Optionally, Solution B can be made by combining 96.7 parts of triethylcitrate, 0.0100 parts of sodium salicylate, and 3.3 parts of 70% hydrogen peroxide.

(C) To 4.7 parts by weight of Solution A is added 5.6 parts by weight of Solution B with thorough mixing. The result is the generation of a blue/violet chemiluminescent light.

The emission spectra for several of anthracene fluorescers are shown in FIG. 661. This figure illustrates the enhanced percentage of light in the region where the emission maximum is from about 390 nm to less than 438 nm for compounds described herein.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. An anthracene compound represented by Formula (1):

(1)

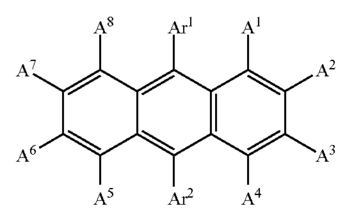

wherein $Ar^1$ and $Ar^2$ are different from each other;

wherein $Ar^1$ has a structure represented by Formula 2, where An shows the attachment to the anthracene ring as described in Formula 1, (2)

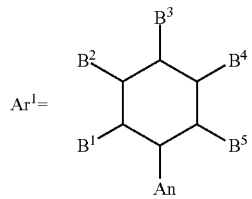

wherein $Ar^2$ has a structure represented by Formula 3, where An shows the attachment to the anthracene ring as described in Formula 1, (3)

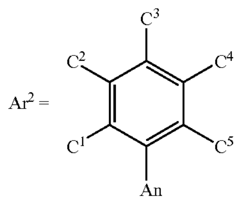

wherein each of $A^1$, $A^2$, $A^3$, $A^4$, $A^5$, $A^6$, $A^7$, and $A^8$ are selected from the group consisting of hydrogen and fluorine;

wherein at least two of the substituents, $B^1$, $B^2$, $B^3$, $B^4$, and $B^5$, as shown in Formula 2, are not hydrogen, wherein each of $B^1$, $B^2$, $B^4$, and $B^5$ are selected from the group consisting of hydrogen and fluorine, and $B^3$ is selected from the group consisting of hydrogen, fluorine, trifluoromethyl, and an alkoxy group with 1-10 carbons; and wherein at least two of the substituents, $C^1$, $C^2$, $C^3$, $C^4$, and $C^5$, as shown in Formula 3, are not hydrogen, wherein each of $C^1$, $C^2$, $C^4$, and $C^5$ are selected from the group consisting of hydrogen and fluorine, and $C^3$ is selected from the group consisting of hydrogen, fluorine, trifluoromethyl, and an alkoxy group with 1-10 carbons.

2. A chemiluminescent composition containing the anthracene compound of claim 1, which composition is adapted to be reacted with a hydrogen peroxide solution to provide chemiluminescent light.

3. The chemiluminescent composition as set forth in claim 2, further comprising a solvent.

4. The chemiluminescent composition as set forth in claim 3, wherein the solvent is selected from the group consisting of dibutyl phthalate, butyl benzoate, propylene glycol dibenzoate, ethylhexyl diphenyl phosphate and mixtures comprising at least one of the foregoing.

5. The chemiluminescent composition as set forth in claim 2, containing an oxalate compound which is a bis(phenyl) oxalate ester having the formula:

in which the phenyl groups(P) are substituted by at least one carbalkoxy group of the formula

in which R is (a) an alkyl group (1-18 carbons, straight chain, branched chain, or cyclic) or (b) a substituted alkyl group, where said substituents are selected from the group consisting of fluoro, chloro, trifluoromethyl, alkoxy, cyano, carbalkoxy, and phenyl; and in which the phenyl groups (P) are substituted by at least two additional substituents selected from the group consisting of fluoro, chloro, bromo, cyano, trifluoromethyl, carbalkoxy, nitro, alkoxy, alkoxy methyl, methyl, and higher alkyl, said additional substituents being selected so that the sum of their Hammett sigma constants for phenols lies between 1.0 and 2.

6. The chemiluminescent composition as set forth in claim 5 wherein the oxalate is bis(2,4,5-trichloro-6-carbopentoxyphenyl)oxalate.

7. A chemiluminescent system comprising the chemiluminescent composition of claim 2, in combination with a peroxide-containing component, whereby a blue/violet chemiluminescent light having an emission maximum from about 390 nm to less than 438 nm is produced.

8. The chemiluminescent system of claim 7 wherein a blue/violet light having an emission maximum in the region from about 400 nm to about 420 nm is produced.

9. The chemiluminescent system as set forth in claim 7, wherein the peroxide-containing component contains a solvent selected from the group consisting of tertiary alcohols, triethyl citrate, dimethyl phthalate, and mixtures comprising at least one of the foregoing.

10. The chemiluminescent system as set forth in claim 7, wherein the peroxide-containing component further contains a catalyst.

11. The chemiluminescent system as set forth in claim 10, wherein the catalyst is a salicylate.

* * * * *